Figure 1:
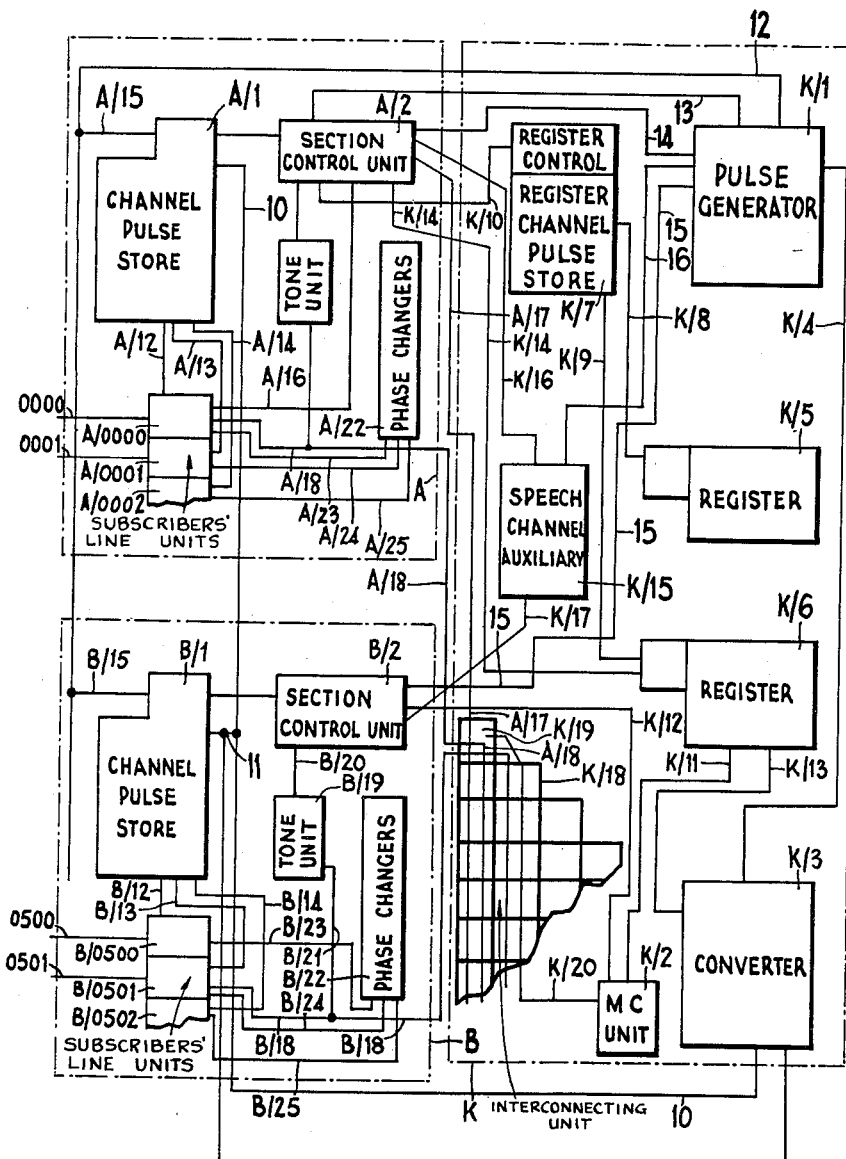

TABLE. A     Fig. 11

| NUMBER | T | NUMBER | T | NUMBER | T | NUMBER | T | NUMBER | T |
|---|---|---|---|---|---|---|---|---|---|
| 000 | 1,6,11 | 040 | 1,10,11 | 080 | 1,2,14 | 120 | 2,8,11 | 160 | 2,3,12 |
| 001 | 1,6,12 | 041 | 1,10,12 | 081 | 1,3,14 | 121 | 2,8,12 | 161 | 2,4,12 |
| 002 | 1,6,13 | 042 | 1,10,13 | 082 | 1,14,15 | 122 | 2,8,13 | 162 | 2,12,13 |
| 003 | 1,6,14 | 043 | 1,10,14 | 083 | 1,11,14 | 123 | 2,8,14 | 163 | 2,12,14 |
| 004 | 1,6,15 | 044 | 1,10,15 | 084 | 1,14,16 | 124 | 2,8,15 | 164 | 2,12,16 |
| 005 | 1,2,6 | 045 | 1,2,10 | 085 | 9,11,12 | 125 | 2,3,8 | 165 | 7,12,13 |
| 006 | 1,3,6 | 046 | 1,3,10 | 086 | 9,11,13 | 126 | 2,4,8 | 166 | 7,12,14 |
| 007 | 1,6,7 | 047 | 1,6,10 | 087 | 9,10,11 | 127 | 2,8,9 | 167 | 7,8,12 |
| 008 | 1,6,8 | 048 | 1,7,10 | 088 | 6,9,11 | 128 | 2,8,10 | 168 | 7,9,12 |
| 009 | 1,6,16 | 049 | 1,10,16 | 089 | 9,11,16 | 129 | 2,8,16 | 169 | 7,12,16 |
| 010 | 1,7,11 | 050 | 1,2,11 | 090 | 1,2,15 | 130 | 2,9,11 | 170 | 2,3,13 |
| 011 | 1,7,12 | 051 | 1,3,11 | 091 | 1,3,15 | 131 | 2,9,12 | 171 | 2,4,13 |
| 012 | 1,7,13 | 052 | 1,11,12 | 092 | 1,11,15 | 132 | 2,9,13 | 172 | 2,13,14 |
| 013 | 1,7,14 | 053 | 1,11,13 | 093 | 1,12,15 | 133 | 2,9,14 | 173 | 2,13,15 |
| 014 | 1,7,15 | 054 | 1,11,16 | 094 | 1,15,16 | 134 | 2,9,15 | 174 | 2,13,16 |
| 015 | 1,2,7 | 055 | 6,11,12 | 095 | 10,11,12 | 135 | 2,3,9 | 175 | 8,12,13 |
| 016 | 1,3,7 | 056 | 6,11,13 | 096 | 10,11,13 | 136 | 2,4,9 | 176 | 8,12,14 |
| 017 | 1,7,8 | 057 | 6,7,11 | 097 | 6,10,11 | 137 | 2,9,10 | 177 | 8,9,12 |
| 018 | 1,7,9 | 058 | 6,8,11 | 098 | 7,10,11 | 138 | 2,6,9 | 178 | 8,10,12 |
| 019 | 1,7,16 | 059 | 6,11,16 | 099 | 10,11,16 | 139 | 2,9,16 | 179 | 8,12,16 |
| 020 | 1,8,11 | 060 | 1,2,12 | 100 | 2,6,11 | 140 | 2,10,11 | 180 | 2,3,14 |
| 021 | 1,8,12 | 061 | 1,3,12 | 101 | 2,6,12 | 141 | 2,10,12 | 181 | 2,4,14 |
| 022 | 1,8,13 | 062 | 1,12,13 | 102 | 2,6,13 | 142 | 2,10,13 | 182 | 2,14,15 |
| 023 | 1,8,14 | 063 | 1,12,14 | 103 | 2,6,14 | 143 | 2,10,14 | 183 | 2,11,14 |
| 024 | 1,8,15 | 064 | 1,12,16 | 104 | 2,6,15 | 144 | 2,10,15 | 184 | 2,14,16 |
| 025 | 1,2,8 | 065 | 7,11,12 | 105 | 2,3,6 | 145 | 2,3,10 | 185 | 9,12,13 |
| 026 | 1,3,8 | 066 | 7,11,13 | 106 | 2,4,6 | 146 | 2,4,10 | 186 | 9,12,14 |
| 027 | 1,8,9 | 067 | 7,8,11 | 107 | 2,6,7 | 147 | 2,6,10 | 187 | 9,10,12 |
| 028 | 1,8,10 | 068 | 7,9,11 | 108 | 2,6,8 | 148 | 2,7,10 | 188 | 6,9,12 |
| 029 | 1,8,16 | 069 | 7,11,16 | 109 | 2,6,16 | 149 | 2,10,16 | 189 | 9,12,16 |
| 030 | 1,9,11 | 070 | 1,2,13 | 110 | 2,7,11 | 150 | 2,3,11 | 190 | 2,3,15 |
| 031 | 1,9,12 | 071 | 1,3,13 | 111 | 2,7,12 | 151 | 2,4,11 | 191 | 2,4,15 |
| 032 | 1,9,13 | 072 | 1,13,14 | 112 | 2,7,13 | 152 | 2,11,12 | 192 | 2,11,15 |
| 033 | 1,9,14 | 073 | 1,13,15 | 113 | 2,7,14 | 153 | 2,11,13 | 193 | 2,12,15 |
| 034 | 1,9,15 | 074 | 1,13,16 | 114 | 2,7,15 | 154 | 2,11,16 | 194 | 2,15,16 |
| 035 | 1,2,9 | 075 | 8,11,12 | 115 | 2,3,7 | 155 | 6,12,13 | 195 | 10,12,13 |
| 036 | 1,3,9 | 076 | 8,11,13 | 116 | 2,4,7 | 156 | 6,12,14 | 196 | 10,12,14 |
| 037 | 1,9,10 | 077 | 8,9,11 | 117 | 2,7,8 | 157 | 6,7,12 | 197 | 6,10,12 |
| 038 | 1,6,9 | 078 | 8,10,11 | 118 | 2,7,9 | 158 | 6,8,12 | 198 | 7,10,12 |
| 039 | 1,9,16 | 079 | 8,11,16 | 119 | 2,7,16 | 159 | 6,12,16 | 199 | 10,12,16 |

TABLE.B      Fig.12

| NUMBER | T | NUMBER | T | NUMBER | T | NUMBER | T | NUMBER | T |
|---|---|---|---|---|---|---|---|---|---|
| 200 | 3,6,11 | 240 | 3,10,11 | 280 | 3,4,14 | 320 | 4,8,11 | 360 | 4,5,12 |
| 201 | 3,6,12 | 241 | 3,10,12 | 281 | 3,5,14 | 321 | 4,8,12 | 361 | 1,4,12 |
| 202 | 3,6,13 | 242 | 3,10,13 | 282 | 3,14,15 | 322 | 4,8,13 | 362 | 4,12,13 |
| 203 | 3,6,14 | 243 | 3,10,14 | 283 | 3,11,14 | 323 | 4,8,14 | 363 | 4,12,14 |
| 204 | 3,6,15 | 244 | 3,10,15 | 284 | 3,14,16 | 324 | 4,8,15 | 364 | 4,12,16 |
| 205 | 3,4,6 | 245 | 3,4,10 | 285 | 9,13,14 | 325 | 4,5,8 | 365 | 7,14,15 |
| 206 | 3,5,6 | 246 | 3,5,10 | 286 | 9,13,15 | 326 | 1,4,8 | 366 | 7,11,14 |
| 207 | 3,6,7 | 247 | 3,6,10 | 287 | 9,10,13 | 327 | 4,8,9 | 367 | 7,8,14 |
| 208 | 3,6,8 | 248 | 3,7,10 | 288 | 6,9,13 | 328 | 4,8,10 | 368 | 7,9,14 |
| 209 | 3,6,16 | 249 | 3,10,16 | 289 | 9,13,16 | 329 | 4,8,16 | 369 | 7,14,16 |
| 210 | 3,7,11 | 250 | 3,4,11 | 290 | 3,4,15 | 330 | 4,9,11 | 370 | 4,5,13 |
| 211 | 3,7,12 | 251 | 3,5,11 | 291 | 3,5,15 | 331 | 4,9,12 | 371 | 1,4,13 |
| 212 | 3,7,13 | 252 | 3,11,12 | 292 | 3,11,15 | 332 | 4,9,13 | 372 | 4,13,14 |
| 213 | 3,7,14 | 253 | 3,11,13 | 293 | 3,12,15 | 333 | 4,9,14 | 373 | 4,13,15 |
| 214 | 3,7,15 | 254 | 3,11,16 | 294 | 3,15,16 | 334 | 4,9,15 | 374 | 4,13,16 |
| 215 | 3,4,7 | 255 | 6,13,14 | 295 | 10,13,14 | 335 | 4,5,9 | 375 | 8,14,15 |
| 216 | 3,5,7 | 256 | 6,13,15 | 296 | 10,13,15 | 336 | 1,4,9 | 376 | 8,11,14 |
| 217 | 3,7,8 | 257 | 6,7,13 | 297 | 6,10,13 | 337 | 4,9,10 | 377 | 8,9,14 |
| 218 | 3,7,9 | 258 | 6,8,13 | 298 | 7,10,13 | 338 | 4,6,9 | 378 | 8,10,14 |
| 219 | 3,7,16 | 259 | 6,13,16 | 299 | 10,13,16 | 339 | 4,9,16 | 379 | 8,14,16 |
| 220 | 3,8,11 | 260 | 3,4,12 | 300 | 4,6,11 | 340 | 4,10,11 | 380 | 4,5,14 |
| 221 | 3,8,12 | 261 | 3,5,12 | 301 | 4,6,12 | 341 | 4,10,12 | 381 | 1,4,14 |
| 222 | 3,8,13 | 262 | 3,12,13 | 302 | 4,6,13 | 342 | 4,10,13 | 382 | 4,14,15 |
| 223 | 3,8,14 | 263 | 3,12,14 | 303 | 4,6,14 | 343 | 4,10,14 | 383 | 4,11,14 |
| 224 | 3,8,15 | 264 | 3,12,16 | 304 | 4,6,15 | 344 | 4,10,15 | 384 | 4,14,16 |
| 225 | 3,4,8 | 265 | 7,13,14 | 305 | 4,5,6 | 345 | 4,5,10 | 385 | 9,14,15 |
| 226 | 3,5,8 | 266 | 7,13,15 | 306 | 1,4,6 | 346 | 1,4,10 | 386 | 9,11,14 |
| 227 | 3,8,9 | 267 | 7,8,13 | 307 | 4,6,7 | 347 | 4,6,10 | 387 | 9,10,14 |
| 228 | 3,8,10 | 268 | 7,9,13 | 308 | 4,6,8 | 348 | 4,7,10 | 388 | 6,9,14 |
| 229 | 3,8,16 | 269 | 7,13,16 | 309 | 4,6,16 | 349 | 4,10,16 | 389 | 9,14,16 |
| 230 | 3,9,11 | 270 | 3,4,13 | 310 | 4,7,11 | 350 | 4,5,11 | 390 | 4,5,15 |
| 231 | 3,9,12 | 271 | 3,5,13 | 311 | 4,7,12 | 351 | 1,4,11 | 391 | 1,4,15 |
| 232 | 3,9,13 | 272 | 3,13,14 | 312 | 4,7,13 | 352 | 4,11,12 | 392 | 4,11,15 |
| 233 | 3,9,14 | 273 | 3,13,15 | 313 | 4,7,14 | 353 | 4,11,13 | 393 | 4,12,15 |
| 234 | 3,9,15 | 274 | 3,13,16 | 314 | 4,7,15 | 354 | 4,11,16 | 394 | 4,15,16 |
| 235 | 3,4,9 | 275 | 8,13,14 | 315 | 4,5,7 | 355 | 6,14,15 | 395 | 10,14,15 |
| 236 | 3,5,9 | 276 | 8,13,15 | 316 | 1,4,7 | 356 | 6,11,14 | 396 | 10,11,14 |
| 237 | 3,9,10 | 277 | 8,9,13 | 317 | 4,7,8 | 357 | 6,7,14 | 397 | 6,10,14 |
| 238 | 3,6,9 | 278 | 8,10,13 | 318 | 4,7,9 | 358 | 6,8,14 | 398 | 7,10,14 |
| 239 | 3,9,16 | 279 | 8,13,16 | 319 | 4,7,16 | 359 | 6,14,16 | 399 | 10,14,16 |

TABLE. C    Fig. 13

| NUMBER | T | NUMBER | T | NUMBER | T | NUMBER | T | NUMBER | T |
|---|---|---|---|---|---|---|---|---|---|
| 400 | 5,6,11 | 420 | 5,8,11 | 440 | 5,10,11 | 460 | 1,5,12 | 480 | 1,5,14 |
| 401 | 5,6,12 | 421 | 5,8,12 | 441 | 5,10,12 | 461 | 2,5,12 | 481 | 2,5,14 |
| 402 | 5,6,13 | 422 | 5,8,13 | 442 | 5,10,13 | 462 | 5,12,13 | 482 | 5,14,15 |
| 403 | 5,6,14 | 423 | 5,8,14 | 443 | 5,10,14 | 463 | 5,12,14 | 483 | 5,11,14 |
| 404 | 5,6,15 | 424 | 5,8,15 | 444 | 5,10,15 | 464 | 5,12,16 | 484 | 5,14,16 |
| 405 | 1,5,6 | 425 | 1,5,8 | 445 | 1,5,10 | 465 | 7,11,15 | 485 | 9,11,15 |
| 406 | 2,5,6 | 426 | 2,5,8 | 446 | 2,5,10 | 466 | 7,12,15 | 486 | 9,12,15 |
| 407 | 5,6,7 | 427 | 5,8,9 | 447 | 5,6,10 | 467 | 7,8,15 | 487 | 9,10,15 |
| 408 | 5,6,8 | 428 | 5,8,10 | 448 | 5,7,10 | 468 | 7,9,15 | 488 | 6,9,15 |
| 409 | 5,6,16 | 429 | 5,8,16 | 449 | 5,10,16 | 469 | 7,15,16 | 489 | 9,15,16 |
| 410 | 5,7,11 | 430 | 5,9,11 | 450 | 1,5,11 | 470 | 1,5,13 | 490 | 1,5,15 |
| 411 | 5,7,12 | 431 | 5,9,12 | 451 | 2,5,11 | 471 | 2,5,13 | 491 | 2,5,15 |
| 412 | 5,7,13 | 432 | 5,9,13 | 452 | 5,11,12 | 472 | 5,13,14 | 492 | 5,11,15 |
| 413 | 5,7,14 | 433 | 5,9,14 | 453 | 5,11,13 | 473 | 5,13,15 | 493 | 5,12,15 |
| 414 | 5,7,15 | 434 | 5,9,15 | 454 | 5,11,16 | 474 | 5,13,16 | 494 | 5,15,16 |
| 415 | 1,5,7 | 435 | 1,5,9 | 455 | 6,11,15 | 475 | 8,11,15 | 495 | 10,11,15 |
| 416 | 2,5,7 | 436 | 2,5,9 | 456 | 6,12,15 | 476 | 8,12,15 | 496 | 10,12,15 |
| 417 | 5,7,8 | 437 | 5,9,10 | 457 | 6,7,15 | 477 | 8,9,15 | 497 | 6,10,15 |
| 418 | 5,7,9 | 438 | 5,6,9 | 458 | 6,8,15 | 478 | 8,10,15 | 498 | 7,10,15 |
| 419 | 5,7,16 | 439 | 5,9,16 | 459 | 6,15,16 | 479 | 8,15,16 | 499 | 10,15,16 |

TABLE. D

| DIGIT | RCS | RTN |
|---|---|---|
| 0 | 0/0 | 0,5 |
| 1 | 1/0 | 1,5 |
| 2 | 2/0 | 2,5 |
| 3 | 3/0 | 3,5 |
| 4 | 4/0 | 4,5 |

| DIGIT | RCS | RTN |
|---|---|---|
| 5 | 0/1 | 0,6 |
| 6 | 1/1 | 1,6 |
| 7 | 2/1 | 2,6 |
| 8 | 3/1 | 3,6 |
| 9 | 4/1 | 4,6 |

April 10, 1962 P. W. WARD 3,029,311
ELECTRIC SWITCHING SYSTEM
Filed March 7, 1957 49 Sheets-Sheet 18

INVENTOR
PETER WILLIAM WARD
BY
Hirschstein, Lindstein & Ottinger
ATTORNEYS

April 10, 1962 P. W. WARD 3,029,311
ELECTRIC SWITCHING SYSTEM
Filed March 7, 1957 49 Sheets-Sheet 19

INVENTOR
PETER WILLIAM WARD
BY Fuchstein, Fuchstein & Ottinger
ATTORNEYS

April 10, 1962  P. W. WARD  3,029,311
ELECTRIC SWITCHING SYSTEM
Filed March 7, 1957  49 Sheets-Sheet 29

Fig. 32

| | A | C | E | G | I | B | | | |
|---|---|---|---|---|---|---|---|---|---|
| A | I(1, 1) | | | | | | | | |
| C | I(1, 2) | I(2, 2) | | | | | | | |
| E | I(1, 3) | I(2, 3) | I(3, 3) | | | | | | |
| G | I(1, 4) | I(2, 4) | I(3, 4) | I(4, 4) | | | | | |
| I | I(1, 5) | I(2, 5) | I(3, 5) | I(4, 5) | I(5, 5) | | | | |
| B | I(1, 6) | I(2, 6) | I(3, 6) | I(4, 6) | I(5, 6) | I(6, 6) | | | |
| D | I(1, 7) | I(2, 7) | I(3, 7) | I(4, 7) | I(5, 7) | I(6, 7) | I(7, 7) | | |
| F | I(1, 8) | I(2, 8) | I(3, 8) | I(4, 8) | I(5, 8) | I(6, 8) | | | |
| H | I(1, 9) | I(2, 9) | I(3, 9) | I(4, 9) | I(5, 9) | I(6, 9) | | | |
| J | I(1, 10) | I(2, 10) | I(3, 10) | I(4, 10) | I(5, 10) | I(6, 10) | | | |
| K | I(1, 11) | I(2, 11) | I(3, 11) | I(4, 11) | I(5, 11) | I(6, 11) | | | |
| M | I(1, 12) | I(2, 12) | I(3, 12) | I(4, 12) | I(5, 12) | I(6, 12) | | | |
| O | I(1, 13) | I(2, 13) | I(3, 13) | I(4, 13) | I(5, 13) | I(6, 13) | | | |
| Q | I(1, 14) | I(2, 14) | I(3, 14) | I(4, 14) | I(5, 14) | I(6, 14) | | | |
| S | I(1, 15) | I(2, 15) | I(3, 15) | I(4, 15) | I(5, 15) | I(6, 15) | | | |
| L | I(1, 16) | I(2, 16) | I(3, 16) | I(4, 16) | I(5, 16) | I(6, 16) | | | |
| N | I(1, 17) | I(2, 17) | I(3, 17) | I(4, 17) | I(5, 17) | I(6, 17) | P | | |
| P | I(1, 18) | I(2, 18) | I(3, 18) | I(4, 18) | I(5, 18) | I(6, 18) | I(18,18) | R | |
| R | I(1, 19) | I(2, 19) | I(3, 19) | I(4, 19) | I(5, 19) | I(6, 19) | I(18,19) | I(19,19) | T |
| T | I(1, 20) | I(2, 20) | I(3, 20) | I(4, 20) | I(5, 20) | I(6, 20) | I(18, 20) | I(19, 20) | I(20,20) |

INVENTOR
PETER WILLIAM WARD
BY Firschein, Firschein & Ottinger
ATTORNEYS

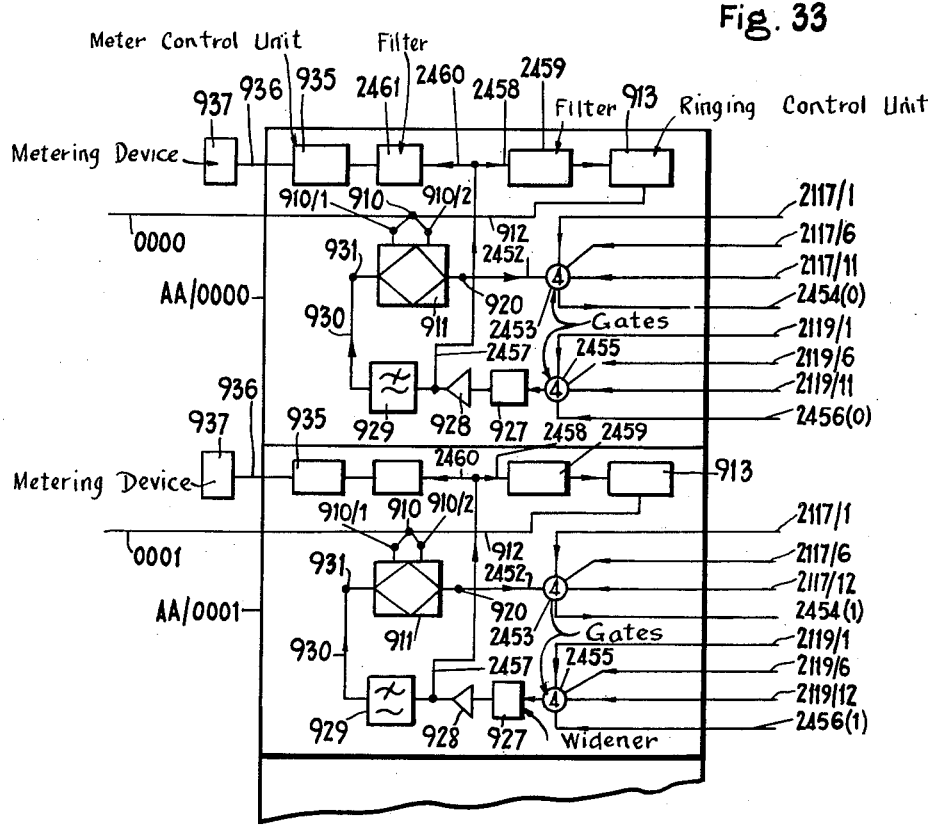
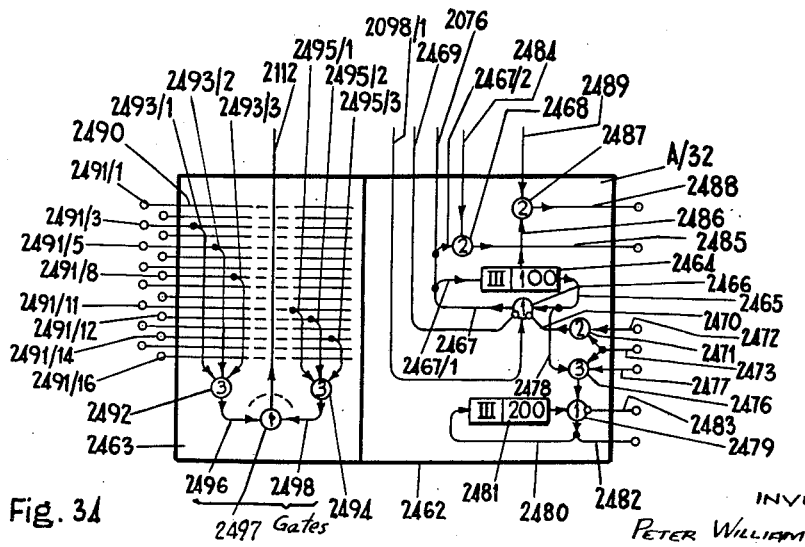
Fig. 33
Fig. 34

April 10, 1962    P. W. WARD    3,029,311
ELECTRIC SWITCHING SYSTEM
Filed March 7, 1957    49 Sheets-Sheet 36

INVENTOR
PETER WILLIAM WARD
BY
ATTORNEYS

April 10, 1962  P. W. WARD  3,029,311
ELECTRIC SWITCHING SYSTEM
Filed March 7, 1957  49 Sheets-Sheet 38
Fig.41
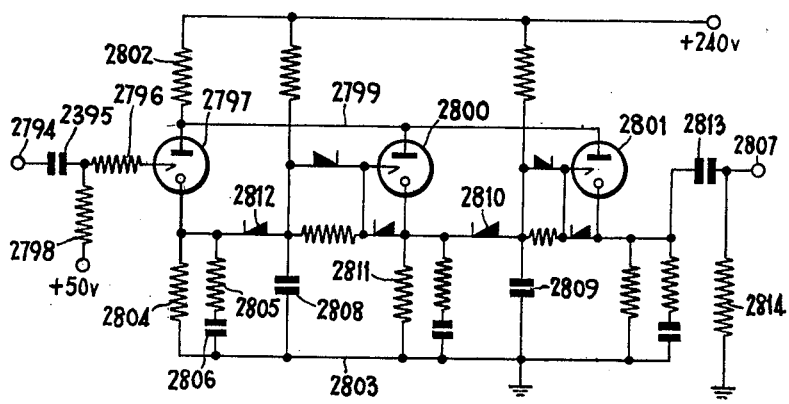
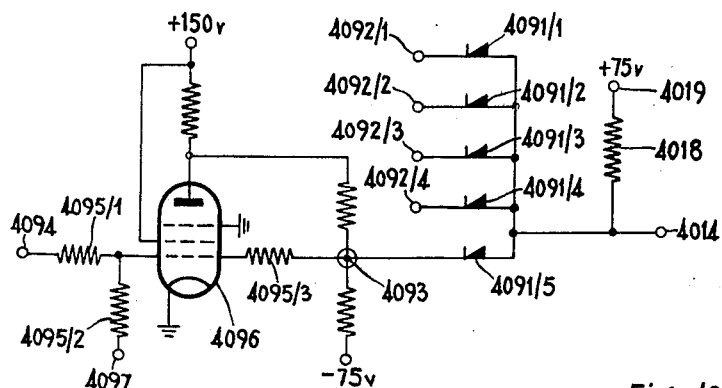
Fig.48
INVENTOR.
PETER WILLIAM WARD
BY Anschutein, Anschutein & Ottinger
ATTORNEYS April 10, 1962 P. W. WARD 3,029,311
ELECTRIC SWITCHING SYSTEM
Filed March 7, 1957 49 Sheets-Sheet 40

INVENTOR
PETER WILLIAM WARD
BY Fischtein, Fischtein & Ottinger
ATTORNEYS

April 10, 1962 P. W. WARD 3,029,311
ELECTRIC SWITCHING SYSTEM
Filed March 7, 1957 49 Sheets-Sheet 44

INVENTOR
PETER WILLIAM WARD
BY Kirschstein, Kirschstein & Ottinger
ATTORNEYS

April 10, 1962   P. W. WARD   3,029,311
ELECTRIC SWITCHING SYSTEM
Filed March 7, 1957   49 Sheets—Sheet 46

INVENTOR
PETER WILLIAM WARD
BY
ATTORNEYS

April 10, 1962  P. W. WARD  3,029,311
ELECTRIC SWITCHING SYSTEM
Filed March 7, 1957  49 Sheets-Sheet 47

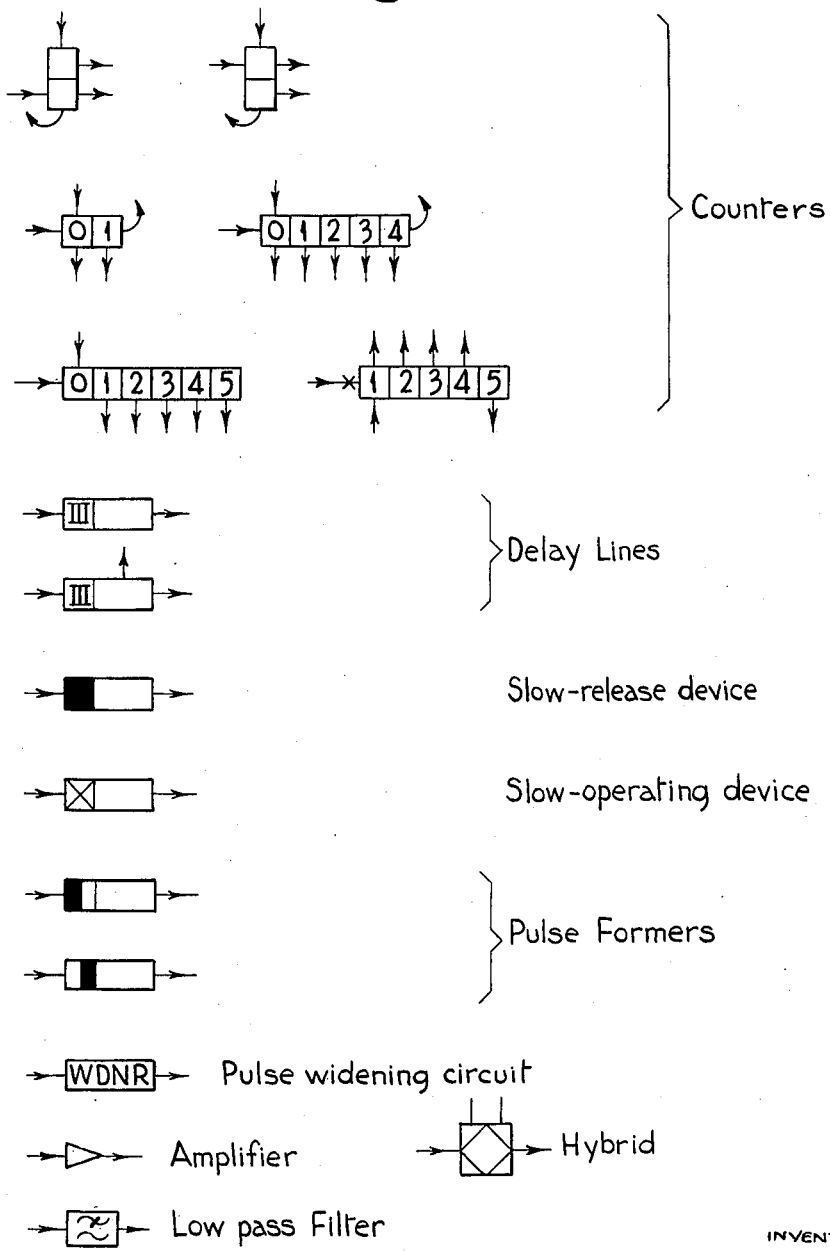

3,029,311
ELECTRIC SWITCHING SYSTEM
Peter William Ward, London, England, assignor to The General Electric Company Limited, London, England
Filed Mar. 7, 1957, Ser. No. 644,491
Claims priority, application Great Britain Mar. 10, 1956
18 Claims. (Cl. 179—15)

This invention relates to automatic electric switching systems by means of which a plurality of electrical instruments may be selectively interconnected with one another. The invention is primarily concerned with automatic telephone systems, the instruments to be selectively interconnected being, in that case, the instruments used by the various subscribers served by the said system; but it will be appreciated that the invention is in principle applicable to other systems in which electrical instruments need to be interconnected, for example in an automatic factory with centralised control. In such a factory, the centralised control might, for example, be a high speed digital computer controlling the programming of the factory and supplied with information provided by instruments installed at appropriate positions in the factory, and with a large factory it may be impractical or uneconomic for all the information from the whole factory to be fed continuously to the computer: instead, the centralised control may be arranged to be connected in turn to each of the positions in the factory at which manufacturing operations or processes are being carried out, to obtain information about the conditions at each such positions and to determine what adjustments (if any) are from time to time needed at each such position—if necessary, correlating such information with information obtained from other positions in the factory.

It will generally be necessary in an arrangement of the kind just mentioned, that the sensing devices (such as measuring or counting devices or other instruments designed to give electrical indications of the conditions they have sensed) at each position shall be arranged, in the event that conditions at such position vary beyond preassigned limits, to emit signals (hereinafter sometimes referred to as "demand signals") to the centralised control so that control operations are initiated forthwith, without awaiting the time when the centralised control would have been connected to said sensing devices in the course of the normal routine. Alternatively, instead of routine, sequential connection of the centralised control to the sensing devices, combined (as just described) with "emergency" signals from the sensing devices to the centralised control when conditions vary beyond pre-assigned limits, it may be arranged that the intervention of the centralised control is always brought about by signals emitted by the sensing devices. In many or most cases, the appropriate control operations to be carried out by actuator devices (in response to signals emitted by the centralised control after it has determined what adjustments as aforesaid are appropriate) at one position in such a factory, will depend upon the conditions obtaining at other positions in the factory; and a sensing device which emits a demand signal may, in such cases, also emit a signal or signals indicating which other sensing devices should be connected to the centralised control to provide it with information. It will be seen that, in such an arrangement, the behaviour of a sensing device is very similar to that of a telephone subscriber, provided with an inter-office conference system, who rings up several subscribers so that they may all be interconnected with a central office for purposes of consultation and appropriate action; and since the stability of operation of an automatic factory may largely depend upon the elimination of delay in the initiation of control operations, rapid automatic interconnection of the various sensing instruments and the centralised control is highly desirable, and (as will become apparent from the subsequent description) switching systems in accordance with the present invention possess the ability to provide the necessary rapid automatic interconnection.

As a relatively simple example of an automatic control arrangement of the kind just described, a chemical factory may be provided with a sensing instrument at one position (hereinafter sometimes referred to as a checking station) in the factory to measure the pH value of an intermediate product, and the sensing instrument would be arranged to transmit a warning signal to the centralised control together with signals indicating which other equipments in the factory (here called "contributory apparatus") contribute to the production of the said intermediate product, such signals causing sensing devices associated with such contributory apparatus to supply to the centralised control information about the performance of the contributory apparatus. The centralised control would then compute whether it was appropriate (for example, essential or more economical) to adjust the operations of the contributory apparatus or to vary for example the proportions of inputs of raw materials, and, if an adjustment of the said operations was desirable, would set up connections between the sensing device at the checking station and the sensing devices at the contributory apparatus, so that the actuator devices of the contributory apparatus would so adjust the performance of the contributory apparatus as to bring the pH value of the intermediate product within the desired limits, the various interconnections being disconnected when the pH value was within the said limits and the actuator devices then ceasing to make further adjustments to the apparatus they control. Reverting to the parallelism with an inter-office telephone system, it will be seen that the sensing devices may be regarded as having rung up one another, exchanged information and taken the necessary action, and have rung off when they have confirmed that the action taken has been effective.

Automatic switching systems in accordance with the invention operate on the time-division multiplex principle, that is to say, the said systems employ a plurality of trains of voltage pulses, the said voltage pulses in any one train being (at least when modulation is not being imposed on the said pulses) repeated at equal intervals of time, and the pulses forming the several trains being interlaced with one another in time. The information (speech, for example) conveyed by any one train takes the form of modulation imposed on the pulses forming that pulse train. It is generally simplest that the modulation should take the form of modulation of amplitude of the pulses belonging to a train, but, in principle, variations in pulse width or in the time position of pulses (these being known equivalents of amplitude modulation) may be the form of modulation used. Where amplitude modulation is employed, the interval of time between successive pulses is (unless some pulses are completely suppressed) independent of the presence of absence of modulation, and the time interval between successive pulses belonging to any one train is constant and independent of modulation: where modulation is by variation of pulse-width or of the time position of pulses, the successive intervals of time between the beginnings of successive pulses may vary slightly, though the mean time interval (over a plurality of pulses) will remain the same as the time interval obtaining when modulation is absent. The time interval obtaining in the absence of modulation will be hereinafter referred to as the "train repetition interval." If, during one train repetition interval, none of the pulse trains is temporarily suppressed, a pulse belonging to any one train will be followed by one pulse of every other train (in succession) before the occurrence of the next pulse of the said one train, and the phase (i.e. relative timing) of the pulses of any two trains in relation to one another can therefore conveniently be specified by taking a pulse belonging to one of the trains as a reference, assigning to it the numeral "1," counting as "2" the next pulse to occur (which will belong to the next train), counting as "3" the succeeding pulse, and so on until there occurs a pulse belonging to the second of the said trains—the numeral so assigned to the pulse belonging to the said second train thus indicating the timing of the second train (within the train repetition interval) in relation to the said train used as a reference. Thus if, for example, the selected pulse of the reference train is taken as "1," and the first pulse of the said second train were the fiftieth pulse occurring in the train repetition interval, the said second train would be described as the 50th train (or channel) relative to the selected reference train, and the phase difference between the two said trains would generally be described hereinafter as a "phase difference of 49 channels." In addition, where the pulses constituting a train are so timed in relation to a reference pulse that the times elapsing between the instant when the reference pulse occurs and the instants when the pulses constituting the said train occur, are (or would be in the absence of modulation) integral multiples of the time repetition interval for the said train, the pulses constituting the said train will sometimes be referred to as being "in phase with," or as "belonging to the same train as," or as "belonging to the same channel as," the said reference pulse.

It will be conducive to intelligibility if, by way of a skeleton example and before defining the invention precisely, an outline description (shorn of many details) is given, with reference to FIGURE 1 of the accompanying drawings, of a sequence of operations for one form of automatic telephone exchange in accordance with the invention. FIGURE 1 accordingly shows schematically a skeleton of certain portions of an automatic telephone exchange intended to serve 10,000 subscribers. These subscribers are divided into 20 groups each of 500 subscribers, each such group of 500 subscribers being connected to a section of equipment (hereinafter referred to as a "subscriber multiplex" or simply as a "multiplex"), and there being a modified section (sometimes hereinafter referred to as "J–S multiplex"), not shown in FIGURE 1, to provide services (such as dealing with enquiries, by an operator) and to provide interconnection with other exchanges. In FIGURE 1, two only of the groups of subscribers are indicated, and only two subscribers are indicated in each group—the line connections indicated at 0000 and 0001 in section A being those for the two subscribers in group A, and connections indicated at 0500 and 0501 in section B being those for the two subscribers in group B. The collection of apparatus enclosed within the chain-dotted "box" marked A constitutes subscriber multiplex A, and the collection of apparatus enclosed within the chain-dotted "box" B constitutes subscriber multiplex B. The collection of apparatus within the chain-dotted "box" K, constitutes exchange equipment which is common to all subscribers on the exchange.

For a 10,000 line exchange divided into groups of 500 subscribers each, adequate service will be given to subscribers (for all normal conditions of traffic) if 100 trains of pulses are available: each train in effect forms a communication channel which (unless already connected to some subscriber) can be connected to any subscriber desiring to use the telephone system, and a pulse train suitable for use for communication will for brevity hereinafter be frequently referred to as a "channel." Pulse trains are originated by the pulse generator K/1 indicated at the top right hand corner of "box" K in FIGURE 1, which pulse generator (as its basic function) initiates a steady stream of pulses each of which (for the purposes of the example) will be taken as lasting for ½ micro-second and as being repeated at intervals of 1 micro-second. These pulses (hereinafter sometimes referred to as "clock pulses," since they serve inter alia to ensure the proper timing of the various operations of the exchange) serve to initiate the generation (as required) of each of the 100 pulse trains forming the channels, these pulse trains consisting of ½ micro-second pulses repeated every 100 micro-seconds. The means for initiating the clock pulses also initiate, and determine the timing of, certain pulses of longer duration, viz. P,Q,X,Y and Z pulses, which are described hereinafter, and C, D and U pulses which (as hereinafter described) can be used as the equivalent of a numbering system for each of the 500 subscribers connected to any one of the subscriber multiplexes. In effect, in the group of numbers 000 to 499 and 500 to 999 the C pulses identify the hundreds in each number, the D pulses identify the tens, and the U pulses identify the units. But it should be mentioned at this point (to avoid initial misunderstanding) that the C, D and U pulses identify each subscriber by their relative timing and by being transmitted over appropriate groups of leads, and not because the number of pulses transmitted in each group is in some way related to the number of a subscriber who is to be identified. In addition, it should be mentioned that whereas the use of combinations of C, D and U pulses (corresponding to hundreds, tens and units) is convenient in a part of the equipment that is common to all subscribers on the exchange (the convenience arising from the fact that a subscriber, when dialling, causes the emission of impulses corresponding to the thousands, hundreds, tens and units in the number of the wanted subscriber), it is convenient to use, in some other parts of the equipment in the exchange, a different sort of grouping of leads as the means of establishing connection with individual subscribers. Accordingly, as part of the common equipment, there is provided a "MC Unit" (marked K/2 in "box" K in FIGURE 1), and a "Converter" (marked K/3 in "box" K in FIGURE 1) which (for the purposes of this preliminary outline) may be regarded as making possible the interconnection of leads so grouped as to be suitable for C, D and U pulses, to leads grouped in the manner needed for connection to other parts of the equipment.

In operation, the apparatus of each subscriber in each multiplex is in turn repeatedly "prepared" for use by the subscriber (provided that apparatus is not already in use by that subscriber): that is to say, the equipment of each subscriber in multiplex A is "prepared" in turn, and while these successive "preparations" of equipment ind multiplex A are being performed, successive "preparations" of equipment in multiplex B are likewise being performed; and, similarly, successive "preparations" are being performed of subscribers' equipment in each of the other subscriber multiplexes. These acts of "preparation" have only a transitory effect, unless a subscriber is attempting to make a call; and when each subscriber's equipment (in each multiplex)) has been successively "prepared" in this way, the process of "preparation" is then repeated ab initio.

In order to perform these operations, a plurality of groups of leads (indicated collectively by K/4 in FIGURE 1) carrying C, D and U pulses, connects pulse generator K/1 to converter K/3; and a group of leads 10 connects converter K/3 to equipment A/1 in multiplex A, while a group of branch leads 11 from leads 10 similarly connects converter K/3 to equipment B/1 in multiplex B. (Equipment such as A/1 and B/1 is hereinafter referred to as a "channel pulse store" and fully described.) From the channel pulse store in each multiplex, groups of leads are taken to equipment which is individual to each subscriber: thus, a group of leads A/12 connects A/1 to the subscribers line unit A/0000 to which subscribers line connection 0000 is connected, a group of leads A/13 connects A/1 to subscribers line unit A/0001, a group of leads A/14 connects A/1 to subscribers line unit A/0002, there being similar connections to each of the other 497 subscribers line units (not shown) in multiplex A; and similarly, a group of leads B/12 connects B/1 to subscribers line unit B/0500, a group B/13 connects B/1 to subscribers line unit B/0501, a group B/14 connects B/1 to subscribers line unit B/0502, with similar connections between B/1 and the remaining 497 subscribers line units (not shown) in multiplex B.

Suppose, now, that subscriber 0001, connected to multiplex A lifts his receiver (not shown) to call subscriber 0502 in multiplex B. A fraction of a second later, the C, D, U pulses corresponding to 0001 will be emitted by K/1 and transmitted over K/4 to K/3 where they are converted to a new set of pulses (of a kind adapted to "prepare" channel pulse store A/1 and subscribers line unit A/0901) and transmitted over lead group 10 to A/1. At some time during this transmission of pulses to A/1, K/1 will emit a Q pulse which is transmitted by leads 12 and thence by leads A/15 to channel pulse store A/1 and by leads B/15 to channel pulse store B/1.

Now, at the instant when subscriber 0001 is trying to make his call, other subscribers may be in process of having connections established for them. The establishment of such connections is effected with the intermediation of registers (two of which, viz K/5 and K/6, are shown in FIGURE 1) and a register control and channel pulse store unit indicated at K/7. (The actual number of registers incorporated in the common equipment of an exchange, will depend on the number of subscribers and the traffic to be expected, as explained later.) Supposing, for the purposes of this example, that register K/5 is already busy handling a call from some other subscriber, it will have signalled to K/7 (over leads in group K/8) that register K/5 is busy, thereby setting up such a condition of affairs that until K/5 signals to K/7 that K/5 has completed its operations on the call that K/5 has been handling, K/7 will not route the next call to register K/5 but to some other register—for example to register K/6 over leads in group K/9 if K/6 is free at the time when the next call is received. Now, just as the equipment of each subscriber is successively "prepared" by the application of the appropriate combination of C, D and U pulses, it is somewhat similarly arranged that each register is in turn "tested" by means of successive combinations of a C and a D pulse, a C and a U pulse, or a D and a U pulse; and K/7 will, when a subscriber lifts his receiver to initiate a call, emit a signal to that register which, being free at the time, is first thus "tested." Moreover, there is an interconnection over lead K/10 from control unit K/7 which ensures that section control unit A/2 has accepted from the pulse generator (via leads 13) a clock pulse which does not synchronise with pulses then in use by register K/6 or any other register; and control unit A/2 is arranged to repeat this pulse at intervals of 100 microseconds. The pulses forming a pulse train which is stored in A/2 ready for use by the next subscriber (connected to that section control unit) wishing to make a call, are generally hereafter referred to as "free register pulses," since they are pulses so timed as not to synchronise with the pulses in any pulse train for the time being in use by another register or registers.

The effect is thus that section control unit A/2 has "stored" in it a pulse train which is available for use by the next subscriber to originate a call in multiplex A; and, the C, D, U pulses corresponding to subscriber 0001 having been received (in the way outlined above) and having "prepared" the equipment, the result of the lifting of his receiver by subscriber 0001 is to cause one of the free register pulses to be circulated through (at repeated intervals of 100 micro-seconds) leads A/12, subscribers line unit A/0001, and through apparatus in channel pulse store A/1 which is peculiar to subscriber 0001. (It has already been mentioned that unless a subscriber is attempting to make a call, the effect of the "preparation" of his apparatus is only transitory. This statement can now conveniently be amplified by explaining that if subscriber 0001, for example, had not been trying to make a call, a free register pulse would have been supplied to his equipment, but his equipment would not, as just described above, thereafter have repeated more than once the pulse at intervals of 100 micro-seconds later— this being the reason for describing the effect as "transitory." It may be mentioned, however, to prevent misunderstanding, that it is possible that if a subscriber is not trying to make a call, his apparatus may perform a single repetition of the pulse.)

There is now circulating through the apparatus peculiar to subscriber 0001, a train of free register pulses so timed that no other synchronous train of pulses is circulating in multiplex A, pulses of this timing being also not otherwise in use in register control unit K/7. Assuming, for the purposes of this example, that register K/6 is the next to be "tested," K/7 will, when testing occurs, cause this train of previously-free register pulses to start to circulate in circuits associated with register K/6, thus effectively allocating register K/6 to subscriber 0001 for the time being. Subscriber 0001 now dials the number of the wanted subscriber (viz. 0502); and dialling impulses are transmitted (as modulations of the register pulses) through leads in A/16 from line A/0001 to A/2 and by leads K/14 to register K/6.

Register K/6 is effectively "locked" (by the pulses transmitted to it from K/7 over leads K/9) to respond only to pulses in synchronism with those "free register pulses" which were stored in control unit A/2 immediately before subscriber 0001 lifted his receiver—the "locking" being effected by K/6 being unresponsive to pulses not in synchronism with the register pulses. Those register pulses are (as just described) now being repeated in A/1 and A/0001 (and are now no longer "free," since they are being so repeated), but no pulses in synchronism with the register pulses are being used by any other subscriber in multiplex A. Accordingly, register K/6 responds only to the register pulses emitted by line unit A/0001 (and ignores any other pulses which control unit A/2 may be emitting on behalf of other subscribers); and as the dialling impulses are successively emitted by subscriber 0001, register K/6 responds and records them by means of counting devices forming part of K/6. The said counting devices are so arranged that, when they have been set to the final "conditions" by the dialling impulses, they cause circuits to be completed by which:

(i) pulses are emitted over leads K/11 to the MC unit K/2 which cause K/2 to establish connection with leads K/12 leading to the section control unit of the called subscribers' multiplex (i.e. with section control unit B/2 in multiplex B in this example), and (ii) pulses are emitted over leads K/13 to converter K/3 to cause the converter to emit pulses over the groups of leads 11 that are characteristic of the individual subscriber (viz. subscriber 0502, in this example) which is wanted in the called multiplex.

It will be remembered that, as already stated, pulse generator K/1 is continually causing the emission of successive clock pulses. These pulses are in effect offered to section control unit A/2 over leads 14 and to section control unit B/2 over leads 15, and are also offered (to increase precision of timing) over leads 16 to an auxiliary unit (here referred to as a speech channel auxiliary) indicated at K/15 which is connected by leads K/16 to section control unit A/2 and by leads K/17 to section control unit B/2. There are connections (similar to 14 and 15) to the section control units of each other subscribers multiplex, and each other subscribers multiplex is connected to speech channel auxiliary K/15 by leads similar to K/16 and K/17. The effect produced by the interconnections just described, is that when the pulses characteristic of subscriber 0502 have been emitted by converter K/3 as above described (as a result of the dialling operation performed by subscriber 0001), thus inter alia establishing connection over lead K/12 with section control unit B/2, the clock pulses offered to section control unit B/2 are repeated by B/2 back to speech channel auxiliary K/15 over lead K/17 where they are compared with those clock pulses which have been fed to section control unit A/2 by lead 14, and which have not been "suppressed" by section control unit A/2—the latter unit being so arranged as to signal back to speech channel auxiliary K/15 (over leads K/16) when A/2 receives a clock pulse not synchronised with pulses already in use in multiplex A. (A pulse not in synchronism with pulses already in use in either the calling or called multiplexes will be referred to as a "common free pulse," and a channel constituted by repetition, at the train repetition interval, of a common free pulse will be referred to as a channel having the phase of the common free pulse.) This process of "checking" to find a common free pulse which is not already in use in multiplex A or multiplex B is performed extremely rapidly; and as soon as such a common free pulse has been found, a train of pulses forming a channel having the phase of the common free pulse is caused to start in and to circulate in (the pulses being repeated at intervals of 100 micro-seconds) the apparatus peculiar to subscriber 0502. In addition, section control unit A/2 starts temporarily to repeat (at intervals of 100 micro-seconds) pulses in synchronism with the pulses circulating in the apparatus in multiplex B which is peculiar to subscriber 0502; and when the next cycle of successive "preparations" of the apparatus of subscribers in multiplex A is carried out, the fact that it is subscriber 0001 who has been using the register channel by means of which the call is being put through, causes such a condition of the circuits of subscriber 0001 that that subscriber's apparatus ceases to repeat (at 100 micro-second intervals) the pulses used for that register channel but instead starts to repeat pulses synchronised with those temporarily being repeated in section control unit A/2. This cessation of the repetition of the pulses of the register channel, acts as a signal causing the release of register K/6 from its temporary allocation to subscriber 0001; and register K/6 is now free to deal with any new call that may be made.

Thus far, therefore, the effect is that the emission by subscriber 0001 of dialling impulses corresponding to subscriber 0502, has caused the apparatus peculiar to each subscriber to repeat a series of pulses, the pulses repeated by one set of apparatus being synchronised with the pulses repeated by the other piece of apparatus. The final interconnection of subscriber 0001 and subscriber 0502 is then performed by interconnecting unit K/18.

Interconnecting unit K/18 consists of an assembly of sub-units by means of which the various subscriber multiplexes may be respectively connected to one another. There is, in unit K/18, a group of sub-units all of which are connected to section control unit A/2, all members of this group also being connected to speech-carrying circuits from all the subscribers line units (such as A/0001 in multiplex A). Each of the sub-units in the group thus connected with multiplex A, is connected to one of the other multiplexes—in particular, one sub-unit in the said group (connected to multiplex A) is connected to multiplex B. In FIGURE 1, leads are indicated at A/17 connecting section control unit A/2 to a group of sub-units in K/18, and leads are indicated at A/18 connecting subscribers line unit A/0001 to the same group of sub-units. Likewise, in FIGURE 1, leads B/18 are indicated connecting subscribers line unit B/0502 to a group of sub-units in K/18 all of which are connected to multiplex B; and it will be noted that one sub-unit, K/19, is connected both to multiplex A and multiplex B. In addition, there is an interconnection indicated at K/20 by which MC unit K/2, when it has received pulses over leads K/11 from register K/6 which are characteristic of multiplex B, transmits (over said connection K/20) signals which "prepare" the sub-units connected to K/20. Now it was mentioned above that section control unit A/2 temporarily repeated pulses which had been started by the common free pulse. Those pulses are repeated over A/17 to all sub-units in K/18 which are connected to multiplex A, and, in particular, to sub-unit K/19; but sub-unit K/19 (and only this sub-unit out of all sub-units connected to multiplex A), is also being "prepared" by pulses over leads K/20. Sub-unit K/19 is accordingly stimulated by the joint reception of pulses from section control unit A/2 and from MC unit K/2, to start repeating (at 100 micro-second intervals) pulses in synchronism with the common free pulse; and when so repeating the common free pulse, K/19 is capable of transmitting speech (in the form of modulations of this pulse train) between leads A/18 and B/18. No other sub-unit in interconnecting unit K/18 is similarly connected to section control unit A/2 and also prepared by those pulses over connection K/20 which are characteristic of multiplex B: accordingly, no sub-unit in K/18 other than K/19 "accepts" the common free pulse in question.

Accordingly multiplex A and multiplex B are now interconnected at the instant when the common free pulse is being repeated; and since no subscriber in multiplex A or multiplex B other than subscribers 0001 and 0502 is using a pulse in synchronism with the common free pulse, subscribers line units A/0001 and B/0502 are interconnected to each other (and only to each other) at the moments when pulses occur which form the pulse train initiated by the common free pulse.

The finding of the common free pulse and the interconnection of multiplexes A and B just described, has the further effect that (assuming subscriber 0502 is not already busy) the bell of subscriber 0502 is rung and tone unit B/19 (which is controlled over leads B/20 from section control unit B/2) at the same time transmits over leads B/21 (and then via leads B/18, sub-unit K/19 and leads A/18) a "ringing tone" signal to subscriber 0001. When subscriber 0502 lifts his telephone, his bell is switched off, and a signal is transmitted back through B/18 and leads B/21 to switch off the tone unit (thus cutting off the supply of ringing tone to subscriber 0001). The lifting of his telephone by subscriber 0502 also causes signals to be transmitted to section control unit A/2 indicating that the connection has been made. The release of register K/6 to deal the new calls has already been mentioned; and by the time that subscriber 0502 has lifted his receiver and started to speak to subscriber 0001, the rest of the common equipment in "box" K (with the exception of sub-unit K/19 in interconnecting unit K/18, which is transmitting the call from subscriber 0001 to subscriber 0502—and also, of course, with the exception of any equipment in "box" K which is busy dealing with other calls being made at that time) is now free to deal with any new calls that may be made.

The foregoing description is, as will be understood, a mere skeleton of a typical set of operations and has been shorn of many details in order to give a simplified picture. Facilities must naturally be provided (in an actual exchange) for indicating to a calling subscriber that the called subscriber is busy, for giving a "number unobtainable" tone if a non-existent number has been dialled, and for enabling a subscriber to make connection with the operator (or other services) when in need of help. Means must also be provided, of course, for "clearing" subscribers when their receiver is replaced. Such matters are described hereinafter; but two further preliminary points of a general nature may conveniently be mentioned at this stage.

Firstly, it will have been seen from the foregoing description that when a call is made from a subscriber connected to one multiplex to a subscriber connected to another multiplex, communication is established by a channel which is free in both multiplexes. If a calling subscriber calls another subscriber connected to the same multiplex, whatever channel is allotted to the called subscriber will appear as "in use" in that multiplex, and a section control unit (in any multiplex) is not so arranged as to be capable of connecting two subscribers (in its own multiplex) to the same channel (since the apparatus ensures the selective connection of one subscriber to another by reason of the fact that it will not allot the same channel to two subscribers in the same multiplex). Accordingly, every subscriber in multiplex A is connected to a "phase changer" A/22, the connections between this phase changer and subscribers line units A/0000, A/0001 and A/0002 being indicated respectively at A/23, A/24 and A/25. Similarly, every subscriber in multiplex B is connected to a phase changer B/22, subscribers line units B/0500, B/0501 and B/0502 being respectively connected to phase changer B/22 by connections indicated at B/23, B/24 and B/25. Similar phase changers are provided in every other subscriber multiplex.

Secondly, suppose a call has been set up on some channel between a subscriber $a$ in multiplex A and a subscriber $b$ in multiplex B, and suppose there is a call from (for example) a subscriber $d$ in (say) multiplex F to a subscriber $m$ in multiplex H (neither of which multiplexes is represented in FIGURE 1). Then it may be mentioned that if a channel consisting of pulses which are synchronous with the pulses being used by subscribers $a$ and $b$ is not already in use in multiplex F or in multiplex H, there is nothing to prevent that channel from now being allotted to subscribers $d$ and $m$. It may therefore, roughly speaking, be said that the same channel is available for use by several subscribers simultaneously—the effect being much as though each section of 500 subscribers had nearly 100 channels available to it.

For the purpose of stating the invention generally, it is convenient to use the word "subscriber" as a generic term to include not only a subscriber in the ordinary sense of the word as used in the telephone art (viz. a user of the telephone system) but also to include any instrument (such as the sensing devices referred to in connection with automatic factories) which can, in suitable circumstances, emit electrical signals which cause the switching system to perform switching operations which set up desired interconnections for the purpose of causing information to be transmitted between two or more devices that have been interconnected as a result of the said operations. In addition, it is convenient to use the expression "recording the identity of a subscriber" as a compendious expression for any operation—such as the establishment of circuit connections or states (in the switching system) that are peculiar to the subscriber whose identity is being recorded—which secures that pulses forming part of a train intended for use by the said subscriber shall be supplied to that subscriber and not to some other subscriber.

The nature of the invention may now be stated generally. According to the present invention, in an automatic switching system of the kind employing time-division multiplex, the subscribers are divided into groups and the control apparatus provided to interconnect a calling subscriber with a called subscriber comprises means by which, on receipt of a calling signal from a calling subscriber, the calling subscriber is allotted a channel which is free in the calling subscriber's group and in a register and connection is established on such free channel between the calling subscriber and the said register, there being means for recording the identity of the calling subscriber and for recording the subscriber called by the calling subscriber, means being also provided for ascertaining a channel (here referred to as "channel $(a)$") which (i) is not in use by any other subscriber in the calling subscriber's group, and to which (ii) corresponds a channel (here referred to as "channel $(b)$") having a pre-assigned phase relationship to channel $(a)$, said channel $(b)$ not being in use by any other subscriber in the called subscriber's group, and means for establishing speech connection between the calling and called subscribers over said channels $(a)$ and $(b)$. In an arrangement in accordance with the present invention, the said pre-assigned phase relationship may be a constant phase difference between channels $(a)$ and $(b)$, or may be assigned in dependence upon the sections to which the calling and called subscribers respectively belong.

For example, in a system in which there are 100 time-interlaced pulse trains each providing a communication channel (so that, when a pulse belonging to one channel has occurred, 99 further pulses, each belonging to some other channel, are potentially capable of occurring during the train repetition interval before the occurrence of the next pulse belonging to the first-mentioned channel) the relative phases of channels $(a)$ and $(b)$ may be such that, if the channels are numbered successively from 1 to 100, and if channel $(a)$ is counted as being channel 1, channel $(b)$ will be counted as channel 51—i.e. the pulses of channel $(b)$ will occur mid-way (in time) between the pulses of channel $(a)$—this being an example of a constant phase difference (viz. a phase difference equal to 50 channels in this example) between channels $(a)$ and $(b)$. Alternatively, it may be arranged that when the calling and called subscribers belong to different sections the phase difference is zero, channels $(a)$ and $(b)$ being in phase with one another (in other words, both subscribers use the pulses belonging to the same channel), whereas when the calling and called subscribers belong to the same section, there is a pre-assigned difference (preferably the same for each section) between the phase of channel $(a)$ and the phase of channel $(b)$—this being an example of a phase difference assigned in dependence upon the sections to which the calling and called subscribers respectively belong. In this latter case, there is some advantage in arranging that the phase difference should not be 50 channels, if the total number of channels is 100, but should be some number prime to 100—and generally, in arrangements in which channels $(a)$ and $(b)$ are in phase when the calling and called subscribers belong to different sections but differ in phase if the calling and called subscribers belong to the same section, there is some slight advantage in arranging that the phase difference is equal to a number of channels which is prime to the total number of channels, since such primality tends to result in a more equal distribution of business between the channels.

According to another aspect of the present invention, in an automatic switching system of the kind employing time-division multiplex, the subscribers are divided into groups and the control apparatus provided to interconnect a calling subscriber in one group (hereinafter sometimes referred to as "the calling group") with a called subscriber in another group (hereinafter sometimes referred to as "the called group") comprises (i) means associated with the called subscriber which, on receipt of a calling signal from the calling subscriber, emits pulses not in synchronism with those of any pulse train already in use in the called group, and (ii) means for comparing the said pulses with the pulses forming the pulse train or trains already in use in the calling group, and (iii) means associated with the calling group and with the called group which, upon the ascertainment that one of the said pulses is a common free pulse, respectively repeat said common free pulse at intervals of time equal to the train repetition interval, thereby to provide a channel for communication between the calling and the called subscriber.

According to a modified form of the foregoing aspect of the invention, the aforementioned means (iii) may be so arranged that, upon the ascertainment that a pulse having a pre-assigned difference of phase from one of the pulses not in synchronism with those forming any train already in use in the called group, is not in phase with any pulse belonging to any train already in use in the calling group, causes repetition, in the apparatus associated with the calling subscriber, of pulses to form a pulse train in phase with the pulse first-mentioned, and repetition, in the apparatus associated with the called subscriber, of pulses to form a pulse train having a phase difference (from the pulses of the train occurring in the apparatus associated with the calling subscriber) equal to said preassigned difference of phase, there being provided means whereby modulations imposed by either subscriber on the pulse train occurring in the apparatus associated with him, cause corresponding modulations to appear on the pulse train occurring in the apparatus associated with the other subscriber, thereby to provide a channel for communication between the calling and the called subscriber. In the modified form of the invention just described, the "calling group" and the "called group" may be the same group of subscribers.

In an automatic switching system in accordance with the present invention employing time-division multiplex and in which the subscribers are divided into groups, the control apparatus provided to interconnect a calling subscriber in one group with a called subscriber in another group may comprise means by which, on receipt of a calling signal from the calling subscriber, the calling subscriber is allotted a channel which is free in the calling subscriber's group and in a register and connection is established on such free channel between the calling subscriber and the said register, whereby signals, emitted by the calling subscriber to identify the called subscriber, may be transmitted over said channel to said register to set said register in a condition which records the identity of the called subscriber.

Before describing in detail the various pieces of apparatus shown in the accompanying drawings, it will be convenient to give preliminary information about one convention here adopted, namely the method of representing the various forms of circuit devices herein referred to as "gates," and also to give general information about these gates and about the delay lines hereinafter referred to. This information should be correlated with the illustrative codes illustrated in FIGS. 58, 59 and 60.

Figure 58:
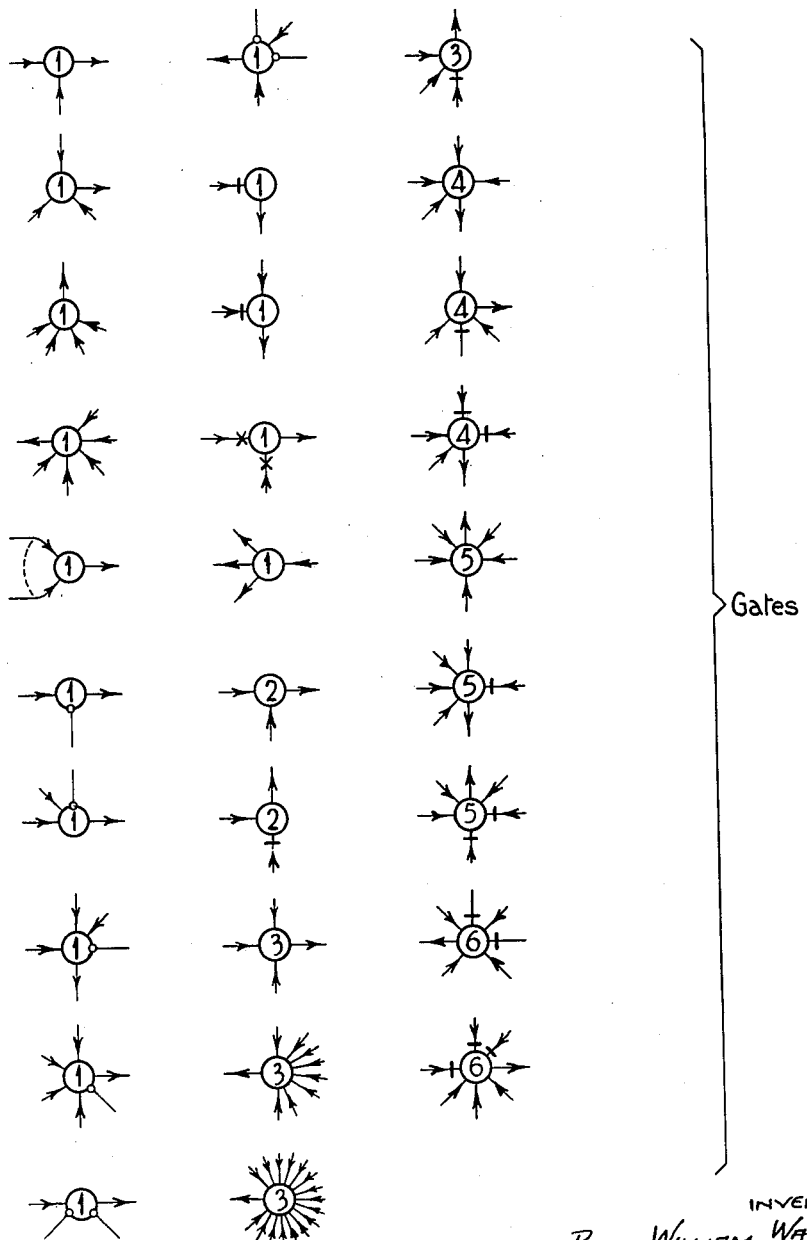

A "one-gate" is a circuit device having at least two inputs and an output, and is so arranged that it will apply voltage to its output if, but only if, there is a voltage applied to at least one input. A great variety of typical "one-gates" is shown in FIG. 58. The arrows differentiate the inputs from the outputs i.e. an arrow directed toward the gate represents an input and an arrow directed away from the gate represents an output. The circle denotes the gate and the numeral "1" inside the gate denotes that it is a "one-gate" as above described. It will be appreciated from the great variety of one-gates shown in FIG. 58 that a one-gate can take on many forms. A "two-gate" is a circuit device having at least two inputs and an output, and is so arranged that it will apply voltage to its output if, but only if, voltage is applied to at least two of its inputs. Various examples of "two-gates" also are shown in FIG. 58, these differing from the one-gates by the use of the numeral "2" inside the gate circle. Similarly, a "three-gate" has at least three inputs and an output, and applies voltage to its output if, but only if, voltage is applied to any three (but not less than three) of its inputs; and, generally, an "$n$-gate" (where $n$ is used as the general symbol for an integer not less than 2—i.e. this general definition is not intended to apply to a one-gate) is a circuit device having at least $n$ inputs and an output, and is so arranged that it will apply voltage to its output when voltages are applied to not less than $n$ of its inputs. The other gates, i.e. the 3, 4, 5, and 6 gates, are also exemplified in FIG. 58. Any one- or $n$ gate may be so arranged that voltage is applied to any input if, but only if, no voltage is applied to the lead by which that input is connected to another device: an input so arranged is herein referred to as a "negatory" input and is indicated by a short line drawn across the relevant input lead at a point near to the gate. Gates are represented in many of the accompanying figures by circles.

Figure 4:
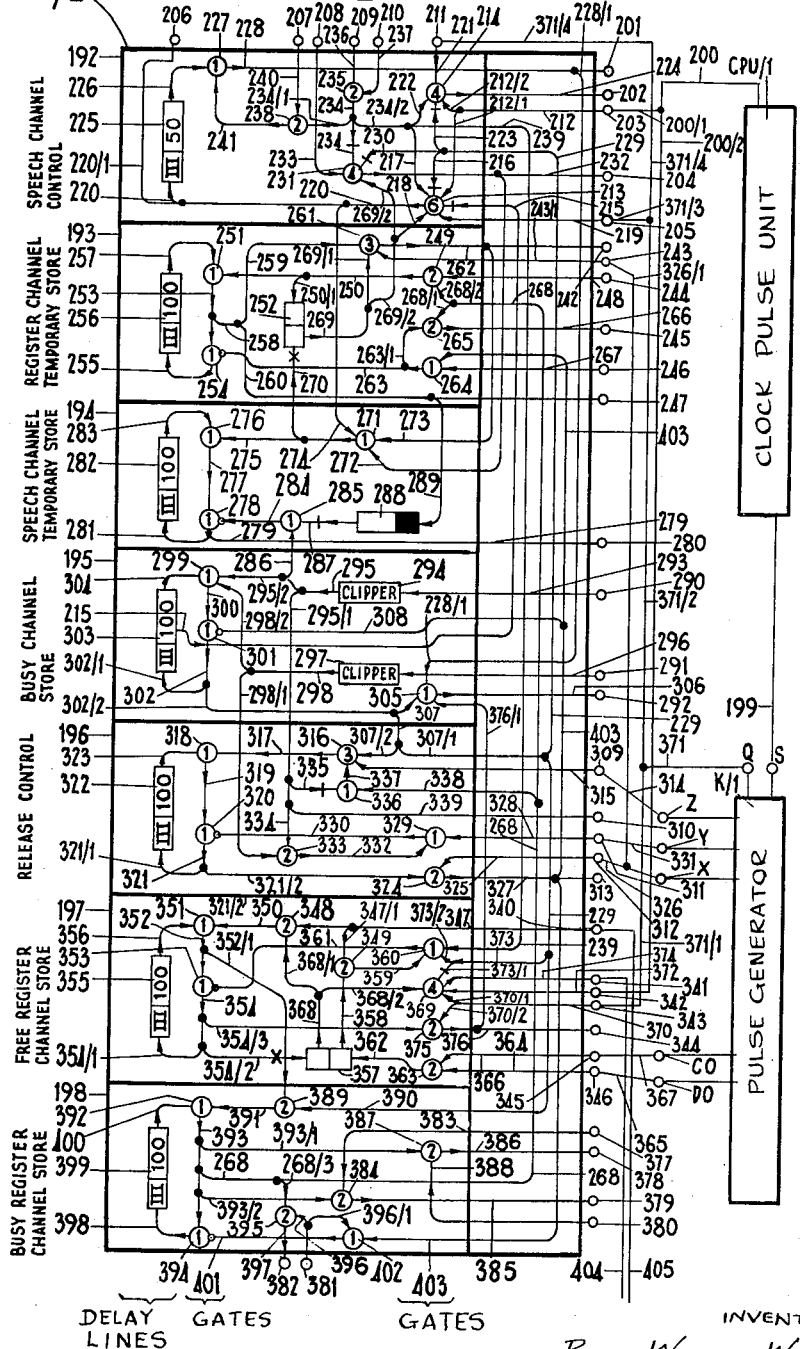

Examples of this symbolism are shown in FIGURE 4 (in addition to FIG. 58)—which will further make clear the foregoing general statements. It will be seen that the major part of FIGURE 4 is occupied by apparatus bounded by a rectangle referenced A/2. This rectangle is divided into seven horizontal main portions, in the upper one of which (reference 192) are a plurality of circles representing gates. Near the bottom right-hand corner of the portion 192 will be found a circle referenced 213 and containing the numeral "6," indicating that it is a six-gate. Lead 216 (connected to six-gate 213 at the 12 o'clock position), and lead 215 (connected to six-gate 213 at the 3 o'clock position), each have a short bar across them, indicating that these leads are negatory inputs. The remaining leads to gate 213 (other than lead 220 at the 9 o'clock position) are connected to ordinary inputs (i.e. not negatory inputs): lead 220 is the output lead. Similarly, near the top left-hand corner of portion 192 is shown a circle referenced 227 and enclosing the numeral "1." This is accordingly a one-gate, and it will be seen to have two inputs, respectively connected to leads 226 (at 9 o'clock) and 241 (at 6 o'clock), and an output connected to lead 228 (at 3 o'clock).

In addition to the inputs just mentioned, a gate may be provided with a supplementary input, herein referred to as an "inhibitory input," which is such that the gate will give no output (whatever other voltages are applied to it) when voltage is applied to the inhibitory input. An inhibitory input will be indicated by the presence of a small circle at the point at which the relevant lead is connected to a gate. Thus, in portion 193 in FIGURE 4 (which portion is immediately below portion 192), there will be found, near the bottom left-hand corner a one-gate referenced 254, having an ordinary input (at 12 o'clock) connected to lead 253, and an inhibitory input (at 3 o'clock), indicated by a small circle at 3 o'clock, to which is connected lead 263.

Figure 59:
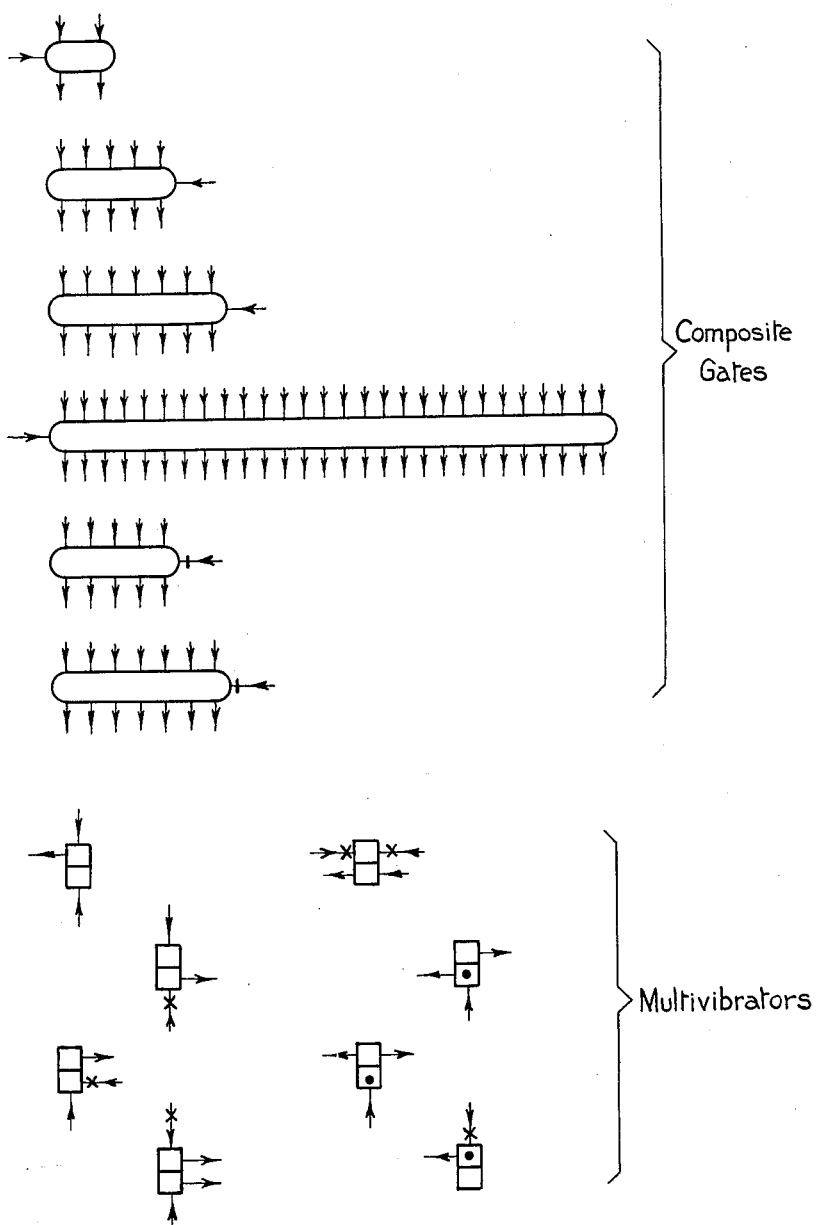

In addition to the gates just described, a symbol (hereinafter referred to as a "composite gate") is used for simplicity in some of the accompanying figures to indicate an assemblage of 2-gates. This symbol, and the corresponding assemblages of 2-gates, will be explained in due course in connection with FIGURE 7; however, it may be noted now that the term "composite gate" as used herein and various examples of which are shown in the code of FIG. 59, denotes an array of two-gates having a common permissive lead, the array being so connected that when the permissive lead is actuated and there also is actuated the input lead to any two-gate, the output lead of said two-gate is actuated.

Gates serve as a convenient means for bringing signals from a plurality of sources and applying them to produce the desired output on a single output lead. In particular, one-gates enable such signals from alternative sources to be applied to a single output lead without mutual interference between the sources. Constructionally, a one-gate can be constructed by connecting a diode in series with each input lead, the cathodes of the diodes being connected together and through a resistor to earth, the output being taken from the common cathodes. Such a gate is suitable for cases where the input signals are positive-going: where the input signals are negative-going, the diodes are reversed and the words "cathode" and "anode" in the foregoing statement should be interchanged. For short period pulses such as the ½ micro-second pulses hereinafter referred to, germanium point contact diodes are suitable: for low frequency signals (for example, the C pulses hereinafter referred to) selenium rectifiers may be found suitable (which point may be checked by test for any actual circuit) for use if cheapness is desired. Where a one-gate has a large number of inputs, it is convenient to treat the input leads in groups, the leads in any one group being connected together (through cathode-follower circuits) as above described as though to form a one-gate, and each of the sub-gates (i.e., each one-gate to which the leads of one group are connected as aforesaid) so formed may have their outputs connected to form the inputs of a further sub-gate—the whole assembly of sub-gates then forming the complete one-gate.

Two-gates for positive-going pulses can be constructed by the use of two germanium point contact diodes and a resistor of appropriately large value. The diodes are connected in series with the input leads, their anodes being connected to the resistor, the other end of which is connected to the appropriate source of positive voltage. The output is connected to anodes in common and follows the potential of the input lead, which is less positive. Thus for a positive signal to appear at the output, it is necessary that both input leads should be positive; and it will be appreciated that, for negative-going input pulses, the polarity of the diodes is reversed and the resistor is connected to a negative supply. $n$-gates are similar in general construction to the two-gates just described, but an additional diode is provided for each additional input. Where necessary, as will be appreciated by those skilled in the art, the output of any one-gate, two-gate (or other $n$-gate), or of any multivibrator or other device, should be connected to other components through an impedance-matching device such as a cathode-follower circuit. Since the need for a cathode-follower circuit depends on the circuit layout of any individual exchange and the values of the circuit components which a designer may decide to use, according to circumstances, cathode-follower circuits (or other impedance-matching devices) will not in general be shown explicitly in the circuit diagrams, but are to be deemed to have been incorporated, where necessary, in the lead or leads from the gate, multivibrator or other device which precedes them—though cathode-follower circuits will be found shown in one circuit diagram referred to later in this specification (viz. FIGURE 35($b$)), where, from the nature of the circuit there described, the use of cathode-followers is inherently desirable.

Where a gate is provided with an inhibitory input, an additional diode is provided, the inhibiting signal being arranged to be of opposite polarity to that of the normal input signal. In all gates, suitable bias voltages will be provided where necessary, as will be obvious to those skilled in the art—such use of bias voltages permitting an input to act as a negatory input, for which purpose the bias voltage will be arranged to provide the voltage which is applied to the negatory input when there is no signal voltage on the lead connected to the negatory input, and the effect of the signal voltage (when present) on the negatory input being to modify the effect of the bias voltage.

Figure 10:
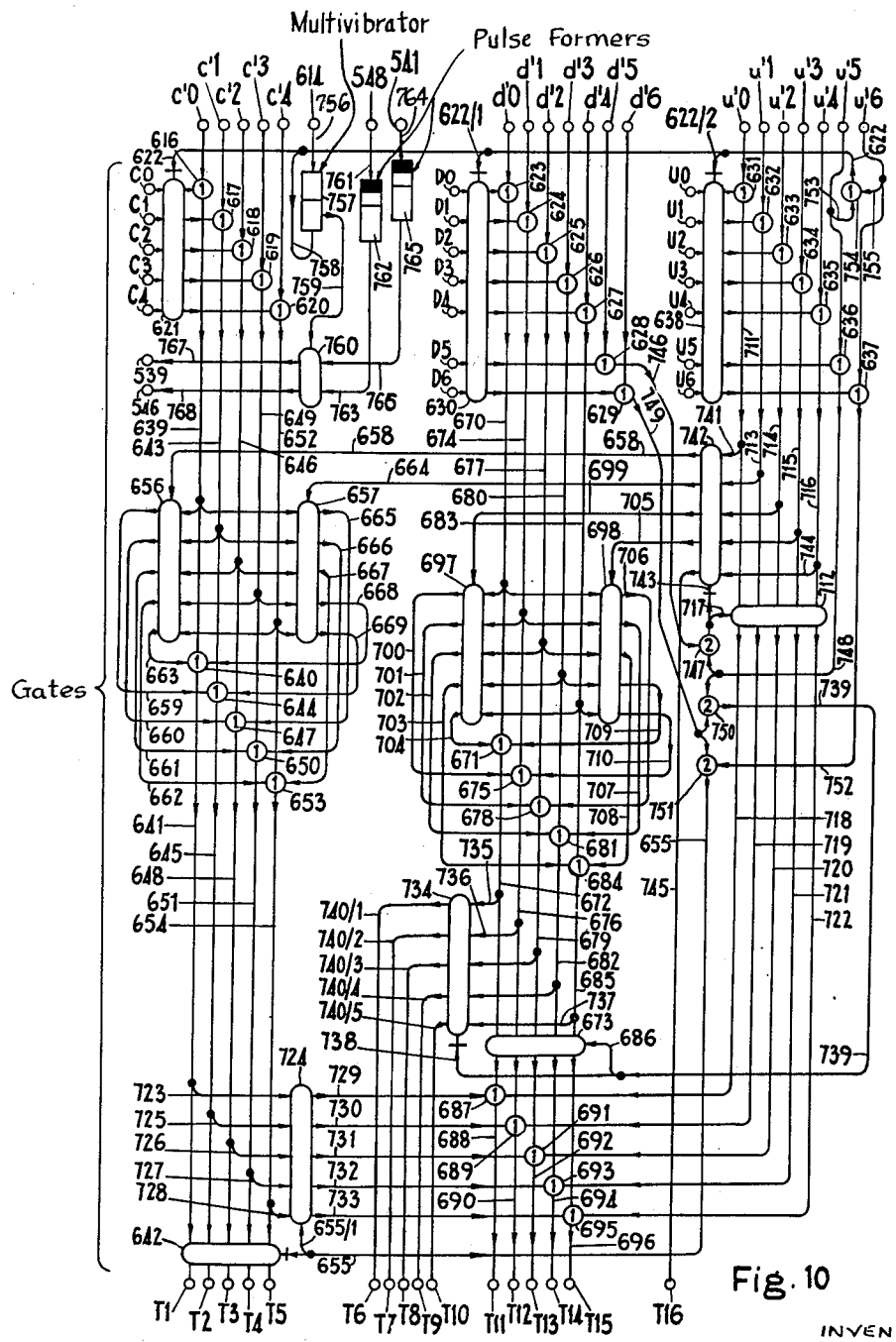

The general principles of construction of gates are well known to those skilled in the art, and reference may be made to Sections 4–3–3 and 4–3–4 of "High Speed Computing Devices," by the Staff of Engineering Research Associates Inc., published by McGraw-Hill Book Company Inc. in 1950, and to Sections 10.2 to 10.4, FIGURES 10.6 to 10.11, of volume 19 (Waveforms) of the Massachusetts Institute of Technology Radiation Laboratory Series, also published by McGraw-Hill Book Company Inc., for ample general information on gates using valves and/or crystals.

Various different symbols are used to indicate other types of electrical equipment and the codes for these symbols are shown in the remainder of FIG. 59 and in FIG. 60. For example, an oblong subdivided into a stack of squares and illustrated in FIG. 59 denotes a multivibrator. A multivibrator also may be used as a counter and, frequently although not always, when a multivibrator is employed as a counter, it will be further characterized by the presence of an arced arrow or by the inclusion of a series of integers is illustrated in FIG. 60. Delay lines will be denoted by an oblong including a square at one end containing a roman numeral as likewise shown in FIG. 60. A slow release device will be denoted by an oblong with a blacked-in square at one end, this too being shown in FIG. 60 as are the remaining symbols now to be described. Slow operating devices will be denoted by oblongs with a cross-filled square at one end thereof. Pulse formers will be denoted by an oblong having a square at one end which is half blacked-in transversely of the length of the oblong. Pulse widening circuits will be denoted by oblongs with the abbreviation "WDNR." The symbols for amplifiers, low pass filters and hybrids are conventional but, for convenience, also have been illustrated in FIG. 60.

General information about magnetostrictive delay lines such as are incorporated in the embodiments of the invention which are about to be described, is contained in "Magnetostrictive Delay Line" by E. M. Bradburd in the issue for March 1951 of Electrical Communication published by International Telephone & Telegraph Corporation. In principle, mercury delay lines can be substituted for the magnetostrictive delay lines described in connection with the said embodiments, but this substitution appears disadvantageous from the point of view of expense, mercury delay lines being (at least at the present time) considerably more expensive than magnetostrictive delay lines. Moreover, for some purposes in the described embodiments, tapped delay lines are described, and whereas it is convenient to tap a magnetostrictive delay line, tapping of a mercury delay line is inconvenient or impossible. If it be desired, despite the disadvantage of extra cost, to substitute mercury delay lines for a tapped magnetostrictive delay line, this can be done by using a pair of mercury lines, of appropriate delays, in series, the tapping being taken from a point between the two delay lines: more than one tapping can, obviously, be provided for, by providing more than two mercury delay lines and taking the necessary tappings from the necessary number of intermediate points.

Figure 2:
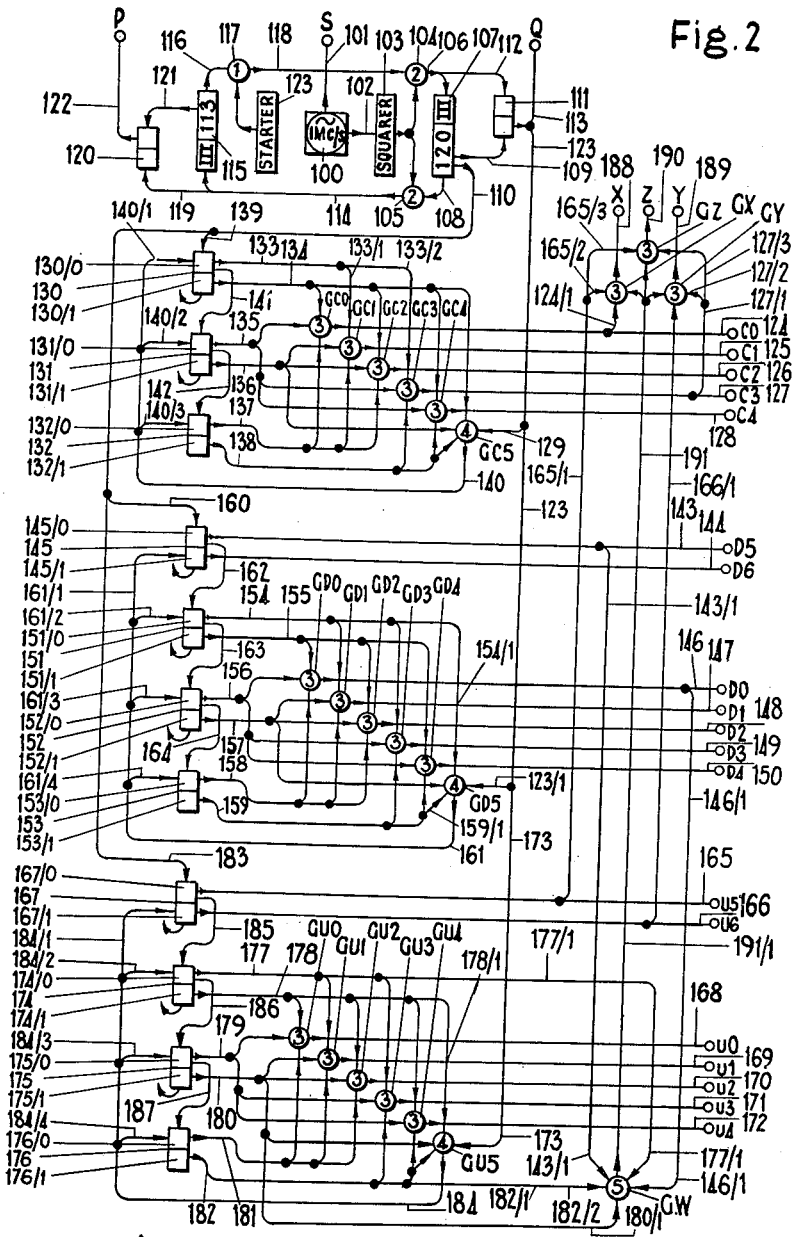

Delay lines are frequently diagrammatically represented in the accompanying drawings by a rectangle such as that shown near the top left-hand corner of FIGURE 2 and referenced "115." On the body of a delay line is entered a number (the number 113 in the case of delay line 115) indicating the delay in micro-seconds which occurs between the instant when a pulse is fed to the input of the delay line and the instant when that pulse re-appears at the output of the delay line. In some cases, tappings are shown on delay lines: for example, the tapping represented by lead 121 from delay line 115. Where a delay line has a single tapping it can be assumed unless the contrary is stated in the relevant part of the description, that the time which elapses between the instant when a pulse is fed to the input of a delay line and the instant when that pulse appears on the tapping, is one-half of the time which elapses between the instant when the pulse is fed to the delay line and the instant when that pulse reappears at the output of the delay line. (It will be found, in the subsequent description, that the delay between the input of a pulse to delay line 115 and the appearance of that pulse at tapping 121, is not one-half of 113 microseconds for delay line 115.)

Figure 51:
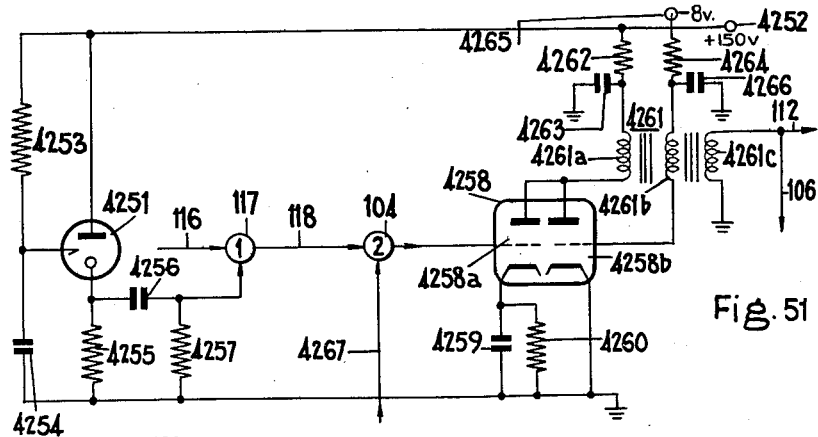
Figure 53:
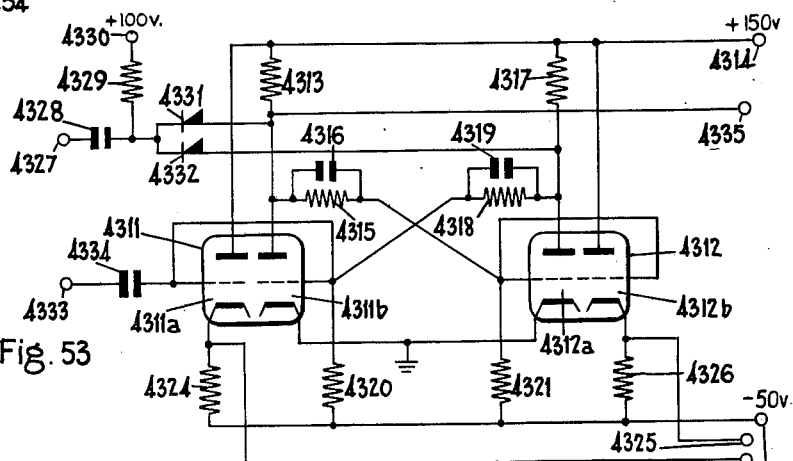
Figure 54:
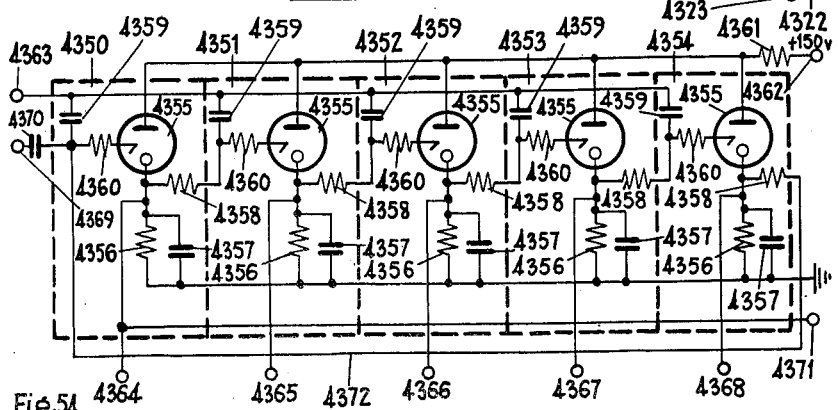
Figure 52:
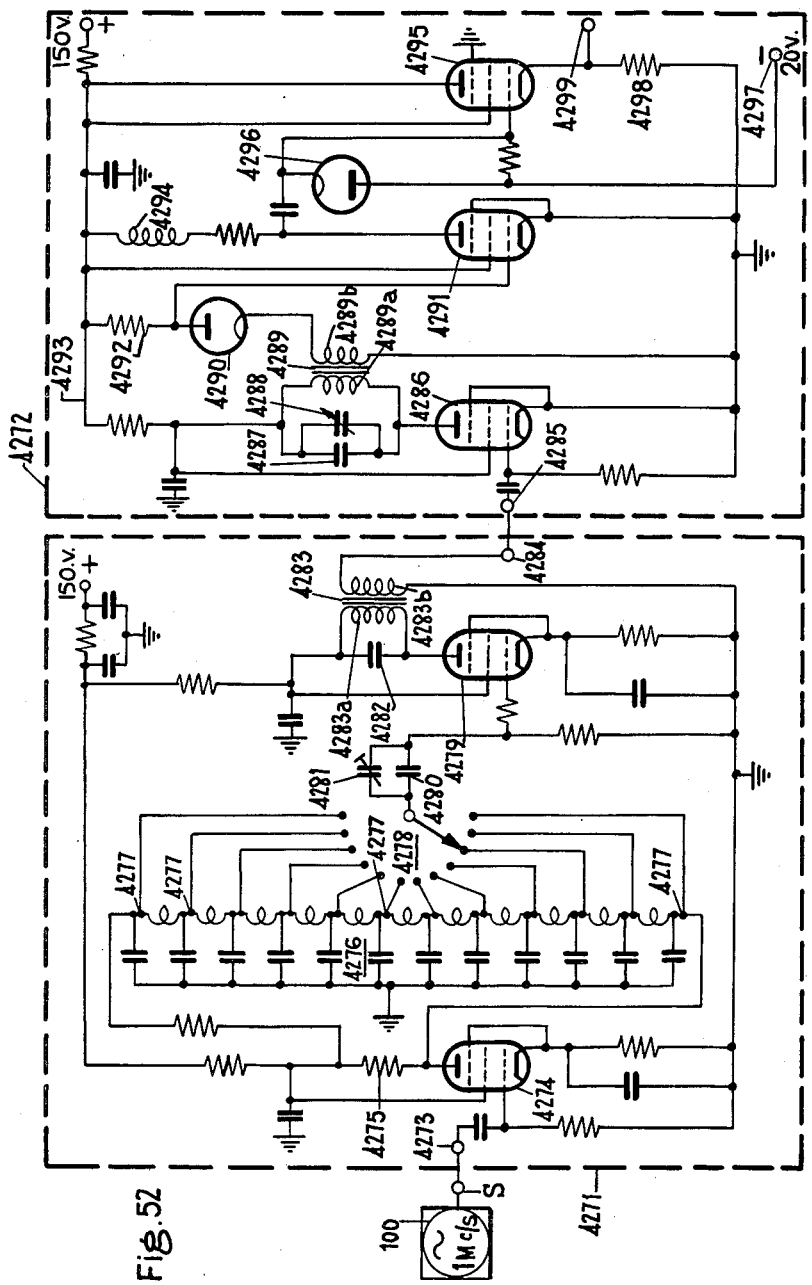
Figure 55:
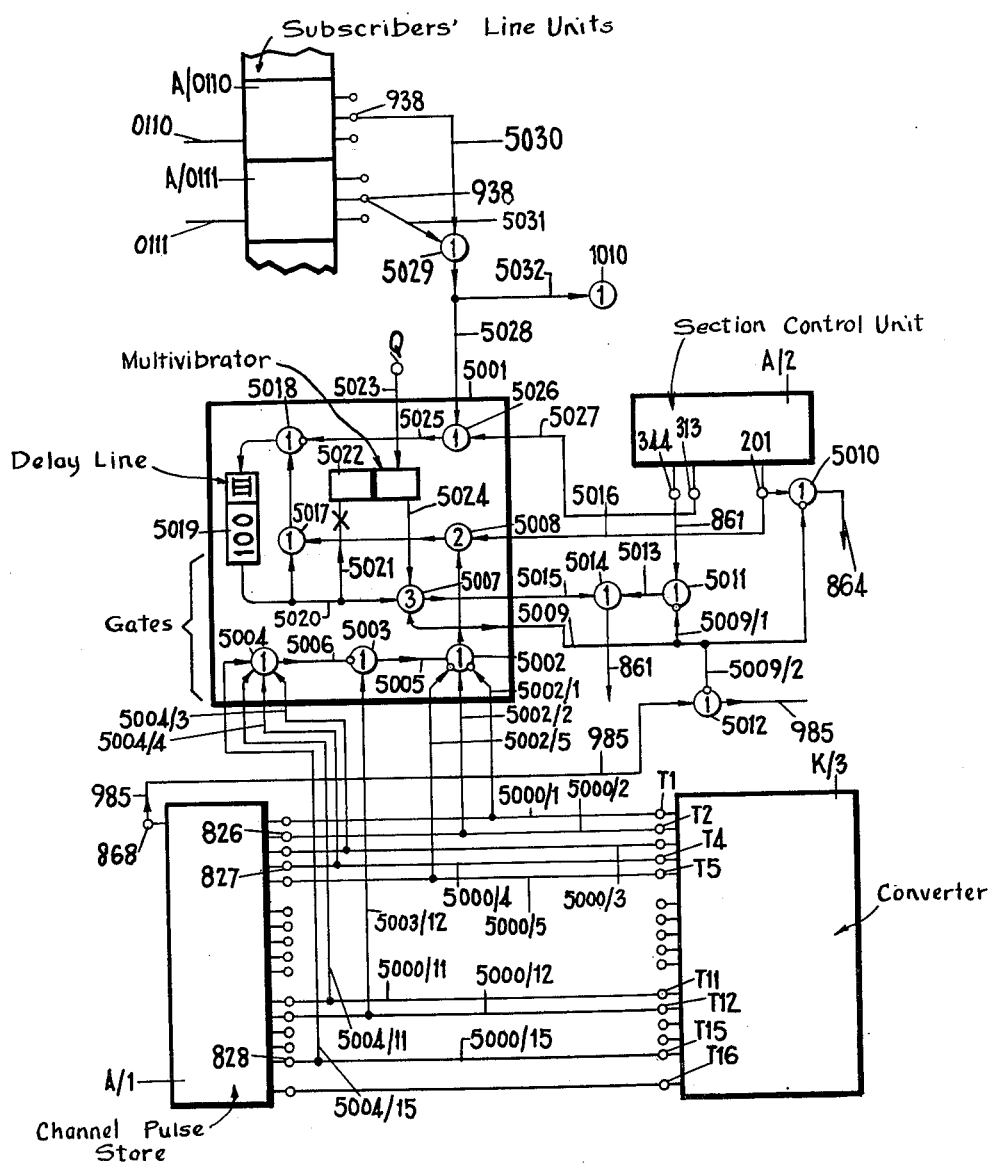
Figures 56, 57:
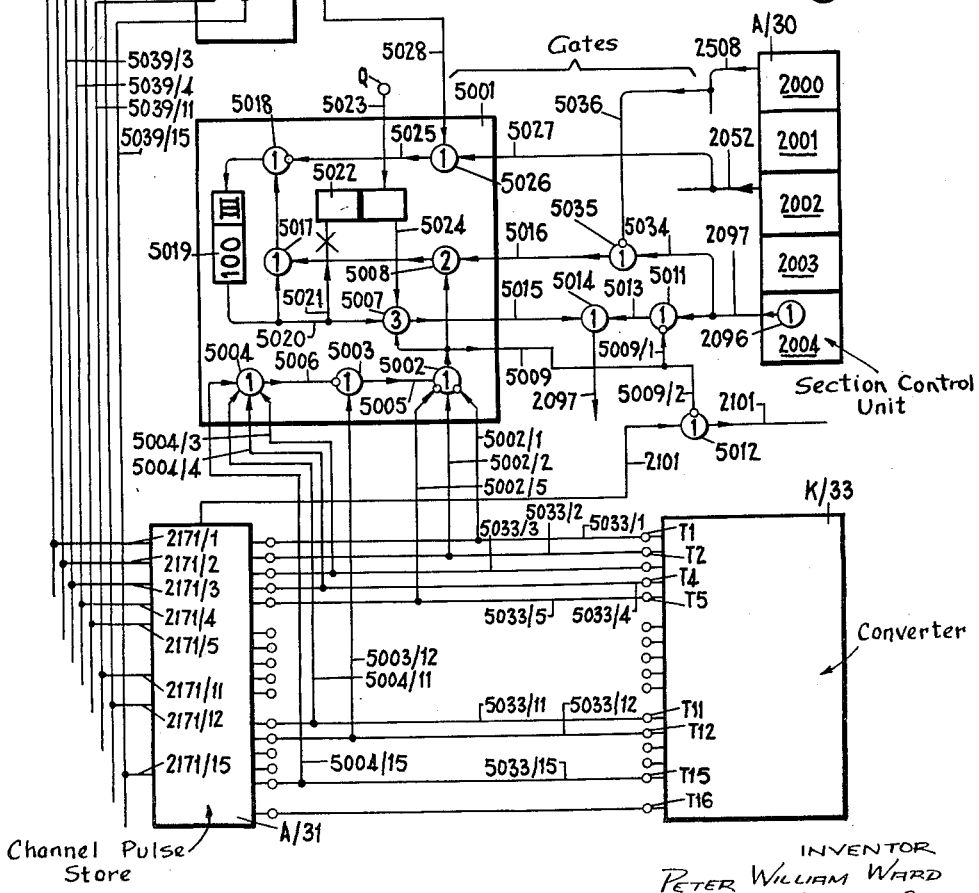

One embodiment of the invention will now be described by way of example with reference to FIGURES 2 to 23 of the accompanying drawings while a second embodiment of the invention will be described by way of example with reference to FIGURES 24 to 36 of the said drawings. FIGURES 37 to 41 of the accompanying drawings show various circuits used to form timing devices in one or other of the said embodiments, while FIGURES 42 to 48 of the said drawings show circuit arrangements for the devices hereinafter referred to as "gates," and FIGURES 49 and 50 of the said drawings show suitable forms of the devices hereinafter referred to as "delay lines." FIGURE 51 illustrates an advantageous embodiment of the starter referred to below in connection with FIGURE 2 and the connections therefrom to associated apparatus, while FIGURE 52 shows the clock pulse units referred to later in the specification and the unit referred to as a squarer in connection with FIGURE 2. FIGURES 53 and 54 show the circuits of the counters referred to in FIGURES 2, 7 and 23. FIGURES 55, 56 and 57 show auxiliary apparatus used to enable a subscriber to call an operator when necessary. FIGS. 58, 59 and 60 show the codes employed to illustrated the various symbols utilized throughout sundry preceding figures, FIG. 58 illustrating the codes for the simple gates, FIG. 59 illustrating the codes for the composite gates and for the multivibrators, and FIG. 60 illustrating the codes for the counters and divers other electrical components.

The arrangement shown in FIGURES 2 to 23 is that for an exchange intended to serve 10,000 subscribers (lines allocated to operators being counted as subscribers' lines) divided into groups of 500 each; and the arrangement is one in which channels (a) and (b), as above referred to, have zero phase difference when the calling and called subscribed belong to different groups (i.e. are connected to different multiplexes), and have a phase difference of 50 channels (the total number of channels being 100) when the calling and called subscribers belong to the same group (i.e. are connected to the same multiplex). The arrangement shown in FIGURES 24 to 36, is that for an exchange having, for the time being, only 2,500 subscribers, but extensible to accommodate 10,000 subscribers. It is again divided into groups of 500 subscribers each; and the arrangement is one in which the said channels (a) and (b) have a phase difference of 50 channels irrespective of whether the calling and called subscribers belong to the same group or to different groups—the total number of channels again being 100.

The various constituent parts of the exchange illustrated in FIGURES 2 to 23, will now be described in convenient order, with their mode of operation.

*Pulse Generator*

The diagram of the pulse generator K/1 of FIGURE 1 is shown in FIGURE 2. The purpose of this generator is to provide the following output waves and pulses:

(i) A 1 megacycle per second sine wave (hereinafter sometimes referred to as the wave S) serving as the master timing-wave for the installation, (ii) C, D and U pulse trains, (iii) P and Q pulses, (iv) X, Y and Z pulses.

Figure 3:
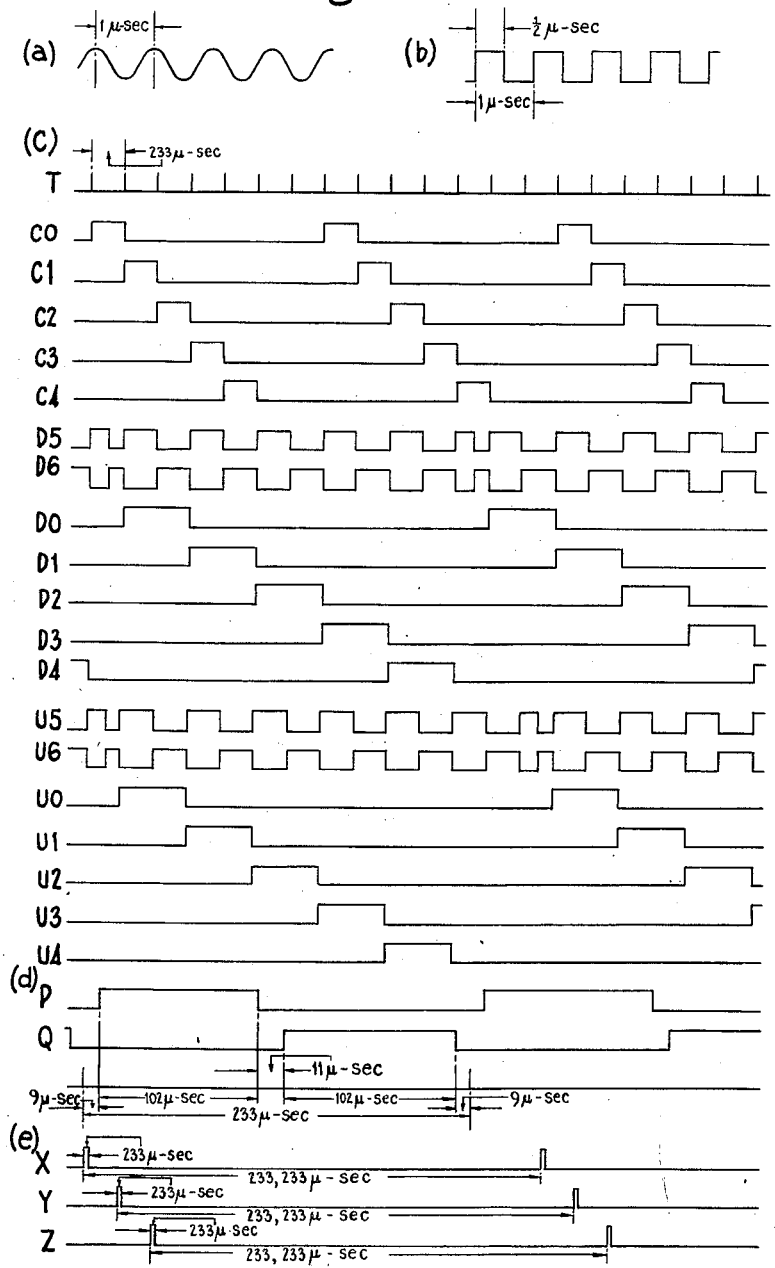

FIGURE 3 shows schematically the wave forms of the abovementioned wave S, typical clock pulses, and the remaining pulses mentioned above. FIGURE 3(a) shows the wave S, FIGURE 3(b) shows typical clock pulses as produced by the various local clock pulse generators referred to below, FIGURE 3(c) shows trains of five C-pulses (indicated as C0, C1, C2, C3, C4), seven trains of D-pulses (indicated as D5, D6, D0, D1, D2, D3, D4) and seven trains of U-pulses (indicated as U5, U6, U0, U1, U2, U3, U4).

As just mentioned, wave S is a 1 megacycle per second sine wave, and is indicated in FIGURE 3(a) as having a period of 1 micro-second. The clock pulses CP, shown in FIGURE 3(b), last for ½ micro-second and have a repetition period of 1 micro-second.

As can be seen by comparison with the time scale marked T which lies immediately above the diagram of C0 pulses in FIGURE 3(c), each of the pulses C0, C1, C2, C3, C4 lasts for 233 micro-seconds and, as shown, pulse C1 starts when pulse C0 ends, pulse C2 starts when pulse C1 ends, and so on until the end of pulse C4, whereafter there is a gap of 466 micro-seconds before the beginning of the next C0 pulse, after which the sequence of C0, C1, C2, C3, C4 pulses is repeated—so that the repetition period for each of the C0, C1, C2, C3, C4 trains of pulses is respectively 7×233=1631 micro-seconds. It was mentioned, in the description of FIGURE 1, that the C pulses serve for the identification of the hundreds in the number of each subscriber in each group, and that subscribers are divided into groups of 500: accordingly only 5 trains of C pulses are needed to effect this identification of the hundreds.

Considering next the pulses D0, D1, D2, D3, D4, it will be seen from FIGURE 3(c) that each pulse lasts 2×233=466 micro-seconds, pulse D1 starting when pulse D0 ends, pulse D2 starting when pulse D1 ends, and so on until the end of pulse D4, whereafter there is a gap of 233 micro-seconds before the beginning of the next D0 pulse, after which the sequence of D0, D1, D2, D3, D4 pulses is repeated. Pulse trains D5 and D6 behave differently. At the instant when a D0 pulse begins (which instant may conveniently be regarded, for purposes of description, as the starting point of a cycle of D pulses) a D6 pulse ends and a D5 pulse begins. After 233 micro-seconds the D5 pulse ends and a new D6 pulse begins; and this alternate occurrence of D5 and D6 pulses (each pulse lasting 233 micro-seconds in each train and being followed by a gap of 233 micro-seconds in each train) continues, as shown, until the end of the D4 pulse next following the D0 pulse regarded above as the start of the cycle of D pulses. At the end of the D4 pulse just mentioned, a D6 pulse will (as shown) end, and a short D5 pulse will begin; but this short D5 pulse ends after 122 micro-seconds, and a short D6 pulse, lasting 111 micro-seconds, then begins. After the lapse of 111 micro-seconds from the beginning of the short D6 pulse, that pulse ends, a new D5 pulse of normal length begins (there being, accordingly, a gap of only 111 micro-seconds between the end of the short D5 pulse and the D5 pulse of normal length), and at the same time a new D0 pulse begins. The above-described succession of D0, D1, D2, D3, D4, D5 and D6 pulses is then repeated. The repetition period for each train of D pulses—i.e. the period after which a pulse in one of the trains D0 to D4 will be repeated, and the period after which there is a repetition of the set of long and short pulses forming train D5 (or the set of long and short pulses forming train D6)—is accordingly 11×233=2563 micro-seconds.

From FIGURE 3(c) it can be seen that, with the foregoing series of pulses, there is, during the first half of each 466 micro-seconds of one of the pulses D0, D1, D2, D3, D4, a 233 micro-second D5 pulse (but no D6 pulse), while during the second half of each of the D0, D1, D2, D3, D4 pulses, there is a 233 micro-second D6 pulse (but no D5 pulse). Accordingly, the pulses of the five pulse trains D0, D1, D2, D3, D4, in association with a pulse from D5 serve to identify five of the possible ten digits in a subscriber's number, and pulses of the said five pulse trains in association with a pulse from D6 serve to identify the other five of the possible tens digits in a subscriber's number. The actual combinations of pulses used to effect these ten identifications of tens digits, are set out later in this specification.

Turning then to the pulses U0, U1, U2, U3, U4, it will again be seen from FIGURE 3(c) that each pulse lasts 466 micro-seconds, pulse U1 starting when pulse U0 ends, pulse U2 starting when pulse U1 ends, and so on until the end of pulse U4, whereafter there is a gap of 3×233=699 micro-seconds before the beginning of the next U0 pulse, and the sequence of U0, U1, U2, U3, U4 pulses is repeated. Pulse trains U5 and U6 are somewhat similar to pulse trains D5 and D6. At the instant when a U0 pulse begins (which instant will be regarded, for the purposes of description, as the beginning of a cycle of U pulses) a U6 pulse ends and a U5 pulse begins. After 233 micro-seconds, the U5 pulse ends and a new U6 pulse begins; and this alternate occurrence of U5 and U6 pulses (each pulse lasting 233 micro-seconds and being followed by a gap of 233 micro-seconds in each train) continues as shown until the end of the U4 pulse next following the U0 pulse regarded above as the beginning of a cycle of U pulses. At the instant at which the said U4 pulse ends, a U6 pulse ends (as shown) and a further U5 pulse of normal length 233 micro-seconds occurs, at the end of which time the said U5 pulse is followed by a gap of 233 micro-seconds, there being a 233 micro-second U6 pulse during the 233 micro-second gap (in the U5 pulse train) just mentioned. At the end of the U6 pulse last mentioned, a short U5 pulse lasting 122 micro-seconds followed by a 111 micro-second gap occurs; and the gap after the U6 pulse last mentioned is a short gap of 122 micro-seconds followed by a short U6 pulse lasting 111 micro-seconds. At the end of this short U6 pulse, a new U0 pulse begins and a new U5 pulse (of normal 233 micro-second length) begins. The above-described succession of U0, U1, U2, U3, U4, U5 and U6 pulses is then repeated. As will be seen from FIGURE 3(c), the repetition period for each train of U pulses is accordingly $13 \times 233 = 3029$ micro-seconds.

It will further be appreciated that since the period required for the repetition of the train of C pulses is $7 \times 233$ micro-seconds, the period required for the repetition of the train of D pulses is $11 \times 233$ micro-seconds, and that for the repetition of the train of U pulses is $13 \times 233$ micro-seconds, the length of time needed to go through a complete set of cycles of C, D and U pulses so that the pulse generator begins to repeat all nineteen pulse trains (C0 to C4, D0 to D6, U0 to U6) in the same time relations to another—will be $7 \times 11 \times 13 \times 233 = 233233$ micro-seconds, i.e. 0.233233 of a second. Accordingly, the complete cycle of "preparations" of subscribers' equipment, as referred to in the skeleton outline of operations given above with reference to FIGURE 1, is carried out in the period just mentioned, namely 0.233233 second— i.e. the "preparation" of each subscriber's equipment so that it may respond to a call made upon it, is repeated slightly more frequently than 4 times per second.

It will be noted that the time interval represented in FIGURE 3(c) has been so chosen as to contain the instant when pulses D0 and U0 begin simultaneously with the end of a C0 pulse.

It will be appreciated that as the cycles of C, D and U pulses are repeated there will come a time ($143 \times 233$ micro-seconds later than the simultaneous start of the C1, D0 and U0 pulses) when, for example, a C4, a D0 and a U0 pulse will start simultaneously; and similarly, after a further $143 \times 233$ micro-seconds, a C0, a D0 and a U0 pulse will start simultaneously.

As has already been mentioned, in addition to emitting the wave S and the C, D and U pulses, pulse generator K/1 also produces P and Q pulses, during each period of 233 micro-seconds. Each of these pulses lasts, as can be seen from FIGURE 3(d) for a period of 102 micro-seconds; and, taking as a reference point the instant at which pulse C0 begins, it will be noted that pulse P begins 9 micro-seconds after pulse C0 begins, endures for 102 micro-seconds and is then absent for 131 micro-seconds, and is then repeated, while pulse Q begins 122 micro-seconds after the beginning of pulse C0, endures for 102 micro-seconds, and is then absent for 131 micro-seconds, the next P pulse beginning 18 micro-seconds after the end of the Q pulse. Accordingly, after the instant at which pulse C0 begins, there is a period of 9 micro-seconds before pulse P begins, pulse P then lasts 102 micro-seconds, there is next a period of 11 micro-seconds during which there is neither a P nor a Q pulse, pulse Q then lasts for 102 micro-seconds, whereafter there is a further period of 9 micro-seconds before the beginning of the next C pulse and, after the lapse of a further 9 micro-seconds, the next P pulse begins and the above-described alternation of P and Q pulses is repeated. In effect, therefore, the P and Q pulses respectively occur during the successive halves of each period of 233 micro-seconds.

The P and Q pulses are each made 102 micro-seconds long in order that each may include a period during which 100 clock pulses occur plus a margin of 2 micro-seconds, the margin serving to eliminate the need for very accurate relative timing of the beginning or end of the P pulses and the Q pulses in relation to the clock pulses. The gaps of 18 and 11 micro-seconds respectively occurring between the end of a Q pulse and the beginning of the next P pulse, and between the end of a P pulse and the beginning of a Q pulse, make it possible to transmit the C, D and U pulses round the exchange on open-wire conductors instead of on co-axial cable. As will be appreciated, these pulses, though shown as sharp-edged in FIGURE 3, become less sharp-edged as they propagate along the open-wire conductors, and without the gaps and overlaps, transmission over co-axial cable would be needed to prevent undue degeneration of the pulse edges. For example, if the start of a P pulse were not delayed by 9 micro-seconds after the start of the C0 pulse, the C0 pulse might not (when transmitted over open-wire circuits) have grown to adequate amplitude before the P pulse started; and similarly, when transmitted over open-wire, the trailing edge of a P pulse might, but for the 11 micro-seconds delay between the end of a P pulse and the beginning of a Q pulse, still have appreciable amplitude by the time that the leading edge of the next Q pulse had grown to appreciable amplitude. Clock pulses, and other ½ micro-second pulses forming the speech channels or determining relative timing of pulses in different sections of apparatus, must be transmitted over co-axial cable if the length of the transmission path is great enough to produce appreciable degeneration of the pulse edges—the need to use, or not to use, co-axial cable being determinable by trial when necessary. Similar considerations apply to the transmission of the P and Q pulses; they must build up in 1 micro-second, and co-axial cable must be used for their transmission when the length of the transmission lead is such that their build-up, if on open wires, would be too slow.

It may also be remarked that the period of 233 micro-seconds which forms the typical "time unit" for a pair of P and Q pulses, is deliberately chosen to endure a number of micro-seconds (viz. 233) which is prime to the number of micro-seconds (viz. 100) constituting the train repetition interval of the channels. This is considered advantageous in that it ensures that the allotting of channels among the subscribers who use them (which is primarily determined by the timing of the Q pulses), is as nearly random as may be. It is not strictly random, since the channels and the Q pulses have a common repetition period of $233 \times 100$ micro-seconds; but since the making of calls by subscribers itself occurs at random time intervals, the allocation of channels is sufficiently random to ensure substantially equal average traffic on each channel.

It has already been mentioned that a complete cycle of C, D and U pulses occupies $7 \times 11 \times 13 = 1001$ periods each of 233 micro-seconds; and since combinations of these C, D and U pulses serve to identify the 500 subscribers connected to any one multiplex, only 500 of these 1001 periods are needed for identification purposes and only 500 such combinations of pulses are in fact generated by the apparatus. During the time (0.233233 second) needed for a complete cycle of C, D and U pulses, there are accordingly intervals during which no combination of C, D and U pulses is being emitted, and during certain of those intervals, the X, Y and Z pulses are emitted—each of these pulses being emitted once during the time of 0.233233 second. As shown in FIGURE 3(c), each of these pulses lasts for 233 micro-seconds, their relative timing being such that pulse Y starts $66 \times 233$ micro-seconds after the beginning of pulse X, and pulse Z starts $77 \times 233$ micro-seconds after the beginning of pulse Y. The timing of these pulses relatively to the C, D and U pulses will be made clear in the later description.

Having thus described the output required from pulse generator K/1, it will be convenient to describe its mode of operation in detail with reference to FIGURE 2.

As shown in the diagram, FIGURE 2, the pulse generator K/1 is provided with a terminal S which supplies the wave S, terminals P and Q which supply the pulse trains P and Q respectively, terminals C0, C1, C2, C3, C4 which respectively supply the respective pulse trains which have been given those references in FIGURE 3(c), terminals D5, D6, D0, D1, D2, D3, D4 and U5, U6, U0, U1, U2, U3, U4, which respectively supply the respective pulse trains which have been given those references in FIGURE 3(c), and terminals X, Y, Z which respectively supply the X pulses, the Y pulses and the Z pulses. For simplicity of comprehension of this diagram, the various components of the generator are shown as interconnected by single leads, but it will readily be understood by those skilled in the telecommunications art how return connections are provided, and the circuits and arrangement of various components are described more fully hereinafter.

Wave S is supplied to terminal S from the 1 megacycle sine wave generator 100 (shown at the centre of the top part of pulse generator K/1) over lead 101, and wave S is also supplied by lead 102 to a squaring circuit 103, by which it is converted into clock pulses CP (of the kind indicated in FIGURE 3(b) lasting ½ micro-second and repeated every micro-second) which are applied to one input terminal of a two-gate 104 and to one input terminal of a two-gate 105. The output terminal of the two-gate 104 is connected by lead 106 to the input to a magnetostrictive delay line 107 giving a delay of 120 micro-seconds between the instant at which a pulse is fed to the input of this delay line and the instant at which the said pulse re-appears at the output of this delay line, from which output it is fed by lead 108 to the other input terminal of two-gate 105. Delay line 107 is provided with two tappings, indicated by leads 109 and 110 respectively. The tapping to which lead 109 is connected, is so positioned that a pulse fed to the input of delay line 107 re-appears on lead 109 at a time 102 micro-seconds later than the instant at which the said pulse was fed to delay line 107; and the tapping to which lead 110 is connected, is so positioned that a pulse fed to the input of delay line 107 re-appears on lead 110 at a time 111 micro-seconds later than the instant at which the said pulse was fed to delay line 107. Lead 109 is connected to one input of a bi-stable multivibrator 111, whose other input is supplied by lead 112 branching from lead 106. Multivibrator 111 is so designed that when a pulse is applied to it by lead 112, it assumes a condition in which a positive-going voltage is supplied by lead 113 to terminal Q; but when a pulse is applied to multivibrator 111 by lead 109, the said multivibrator assumes a condition in which it applies no voltage to lead 113 and terminal Q. The purposes of lead 110 will be described later.

It has been mentioned that lead 108 from the output of delay line 107 is connected to one of the inputs of two-gate 105. The output of two-gate 105 is connected by lead 114 to the input of magnetostrictive delay line 115 which gives a delay of 113 micro-seconds between the instant at which a pulse is fed to its input and the instant at which the said pulse re-appears at its output, from which output said pulse is fed by lead 116 to an input of one-gate 117. The output of one-gate 117 is connected by lead 118 to the second input of two-gate 104. A lead 119 branches from lead 114 and is connected to one input of a second bi-stable multivibrator 120, whose other input is connected by lead 121 to a tapping on delay line 115 so positioned that when a pulse is applied to the input of delay line 115 the said pulse re-appears on lead 121 after a delay of 120 micro-seconds. The application of a pulse by lead 119 to multivibrator 120 causes the latter to assume a condition in which a positive-going voltage is supplied by lead 122 to terminal P; but when a pulse is applied to multivibrator 120 by lead 121, the said multivibrator assumes a condition in which it applies no voltage to lead 122 and terminal P.

In addition to the foregoing components, there is also a starter 123 which is used to set the pulse generator into operation when first started up or on starting up after a shut-down. When so started up, generator 100 supplies wave S to squarer 103 and the latter applies pulses to the two-gates 104 and 105; but since no other pulses are as yet present in the circuits, neither two-gate can give an output. Starter 123 injects a pulse of sufficient duration to include the instant at which at least one pulse is applied by squarer 103 to two-gate 104; and since two-gate 104 now has pulses applied at both its inputs, it applies an output over lead 106 to the input to delay line 107 and over lead 112 to multivibrator 111. The apparatus used for feeding pulses to delay line 107 is, as described later, such as to ensure that only one clock pulse emitted during the pulse from starter 123 will be fed to delay line 107. The circuits so far described then operate as follows.

The application of the pulse over lead 112 to multivibrator 111 causes that multivibrator to assume the condition in which a positive-going voltage is applied to terminal Q. This constitutes the start of a Q pulse. The application of the input pulse over lead 106 to delay line 107, causes the said pulse to re-appear at lead 109 after the lapse of 102 micro-seconds, thereby applying the pulse on lead 109 to multivibrator 111 and causing the latter to assume the condition in which it applies no voltage to terminal Q: the Q pulse accordingly now ends, having lasted for 102 micro-seconds.

The input pulse which has been supplied to delay line 107 continues to travel in that delay line, and after the lapse of 111 micro-seconds (i.e. 9 micro-seconds after the end of the Q pulse) the said pulse appears on lead 110 and will, in manner described below, initiate the pulses forming the C, D and U pulse trains. Moreover, the said pulse fed to the input of delay line 207 continues to travel in that delay line until, after the lapse of 120 micro-seconds from the instant of injection to said delay line, the said pulse reaches the output of the delay line and is fed by lead 108 to one input of two-gate 105. At this instant, one of the pulses from squarer 103 will be applied to the other input of two-gate 105, and this gate accordingly applies a pulse by lead 114 to the input to delay line 115 and by lead 119 to one input of multivibrator 120.

Now it will have been noted that a delay of 18 micro-seconds elapses between the appearance of the pulse on lead 109, which has the effect of the ending of the Q pulse, and the appearance of the pulse at the output of delay line 107. There is effectively no delay between the appearance of the pulse at the output of delay line 107 and the receipt of the resulting pulse (as described at the end of the preceding paragraph) by multivibrator 120; nor is there any effective delay in the response of the multivibrator to the pulse it receives, that response being the application of a positive-going voltage over lead 122 to terminal P. This constitutes the start of the P pulse, and it will be seen that the P pulse accordingly starts 18 micro-seconds after the end of the Q pulse. But at the same instant that the pulse is applied by lead 119 to multivibrator 120, the pulse is also applied by lead 114 to the input of delay line 115, so that 102 micro-seconds later, the pulse re-appears on lead 121, and is thereby applied to multivibrator 120 causing the latter to assume the condition in which no voltage is applied to lead 122 and terminal P. Accordingly, the P pulse then ends, having lasted for 102 micro-seconds.

The pulse above described as applied to the input of delay line 115 continues to travel in the delay line and re-appears at the output of the delay line 113 micro-seconds after the instant when it was applied to the delay line—i.e. 11 seconds after the end of the P pulse—and is accordingly fed by lead 116 to one input of one-gate 117 and thence by lead 118 to one of the inputs of two-gate 104. At the instant at which this pulse is applied to one input of two-gate 104, one of the pulses from squarer 103 (which is steadily emitting a pulse every microsecond) is applied to the other input of two-gate 104, which accordingly emits a pulse on lead 106 which is fed to the input to delay line 107 and (via lead 112) to one input of multivibrator 111. The emission by one-gate 117 of the pulse received from lead 116, has precisely the same effect as the emission by that one-gate of the pulse received (as described above) from starter 123. Accordingly the cycle just described, by which a Q pulse and then a P pulse are successively emitted, with proper durations and proper time relations, is repeated continually—it being noted that, as with transmission of the pulse from the output of delay line 107 through two-gate 105 to the input to delay line 115 and multivibrator 120, respectively, there is effectively no delay between the appearance of the pulse at the output of delay line 115 and the receipt of the resulting pulse at the input of delay line 107 and of multivibrator 111, respectively.

It has already been remarked that, 111 micro-seconds after the application of a pulse to the input to delay line 107, the pulse re-appears on lead 110. It may now be added that when multivibrator 111 receives a pulse on lead 112, causing it to apply the voltage of the Q pulse to terminal Q via lead 113, the said multivibrator 111 applies the Q pulse also to lead 123. The apparatus to which leads 110 and 123 are connected, and the manner in which that apparatus operates to produce the C, D, U, X, Y and Z pulses, will now be described.

Terminals C0, C1, C2, C3, C4 are respectively connected by leads 124, 125, 126, 127, 128 to outputs from three-gates GC0, GC1, GC2, GC3, GC4, respectively. With this group of three-gates there is also associated a four-gate GC5 one of whose inputs is connected to lead 123 by lead 129. The other input voltages to gates GC0, GC1, GC2, GC3, GC4 and GC5 are controlled (in manner about to be described) by the three binary chain counters 130, 131, 132 shown in FIGURE 2, each having two stages—viz. 130/0 and 130/1 for counter 130, 131/0 and 131/1 for counter 131, and 132/0 and 132/1 for counter 132.

These counters are of a well-known kind (further described below), but for the time being it is sufficient to describe their mode of operation. Counter 130 is so arranged that, when stage 130/0 is energised, a voltage is applied and maintained over leads 133 and 133/1 to an input to three-gate GC1 and over leads 133 and 133/2 to three-gate GC3; and when stage 130/1 is energised, a voltage is applied and maintained over lead 134 (and the respective leads shown in FIGURE 2 is branching from lead 134) to an input of each of the gates GC0, GC2, GC4 and GC5. Similarly, counter 131 is so arranged that, when stage 131/0 is energised, a voltage is applied and maintained by lead 135 (and the respective leads branching therefrom as shown in FIGURE 2) to an input of each of the gates GC0, GC3, GC4; and when stage 131/1 is energised, a voltage is applied and maintained by lead 136 (and the respective leads shown branching therefrom in FIGURE 2) to an input of each of the gates GC1, GC2 and GC5. Similarly, counter 132 is so arranged that, when stage 132/0 is energised, a voltage is applied and maintained by lead 137 (and the respective leads shown branching therefrom in FIGURE 2) to an output of each of the gates GC0, GC1, GC2; and when stage 132/1 is energised, a voltage is applied and maintained by lead 138 (and the respective leads shown branching therefrom in FIGURE 2) to an input of each of the gates GC3, GC4, GC5.

Lead 110 from delay line 107 is connected by branch lead 139 to one input to stage 130/0 of counter 130, and a second input to stage 130/0 is connected to the output of four-gate GC5 by lead 140 and branch lead 140/1; while a second output from stage 130/0 is connected by lead 141 to the input to counter 131 as shown. A second output from stage 131/0 of counter 131 is connected by lead 142 to one input of counter 132. A second input to counter 131 is provided by branch lead 140/2 from lead 140, and a second input to counter 132 is provided by branch lead 140/3 from lead 140. Accordingly, counters 130, 131 and 132 all receive a re-setting input when there is an output from four-gate GC5. (The nature of a re-setting input is described below).

Counter 130 is so arranged that, supposing stage 130/0 to be energised (so that there is an output voltage on lead 133) the application of an input pulse by lead 139 will cause stage 130/0 to become de-energised (thereby cutting off the output voltage on lead 133) and stage 130/1 to become energised (thereby applying an output voltage on lead 134). The application of a further input pulse on lead 139 will cause stage 130/1 to become de-energised and stage 130/0 to become re-energised—successive alternate re-energisation and de-energisation of these stages occurring each time there is an input pulse on lead 139. The application of a re-setting pulse by lead 140/1 to stage 130/0 causes stage 130/0 to become energised if it is de-energised at the time when the re-setting pulse is received (stage 130/1 of course becoming de-energised when stage 130/0 is energised): if stage 130/0 is already energised at the time when the re-setting pulse is received on lead 140/1, the re-setting pulse has no effect. It should also be noted that on each occasion when stage 130/1 is de-energised and stage 130/0 energised (whether by a pulse on lead 139 or by a re-setting pulse in lead 140/1), a pulse is applied by counter 130 over lead 141 to the input to counter 131.

Similarly, with counter 131: assuming that stage 131/0 is energised, the application of an input on lead 141 (from counter 130 will cause stage 131/0 to become de-energised and stage 131/1 to become energised, and the application of a further pulse on lead 141 will cause stage 131/1 to become de-energised and stage 131/0 to become re-energised. The application of a re-setting pulse by lead 140/2 to stage 131/0 causes that stage to become energised if not already energised at the time when the re-setting pulse is received (stage 131/1 of course becoming de-energised when stage 131/0 becomes energised); but the re-setting pulse has no effect if stage 131/0 is already energised at the time when the re-setting pulse is applied. The de-energisation of stage 131/1 and energisation of stage 131/0 (however produced) causes an input pulse (over lead 142) to be applied by counter 131 to counter 132. Again, with counter 132: assuming stage 132/0 to be energised, the application of an input on lead 142 (from counter 131) will cause stage 132/0 to become de-energised and stage 132/1 to become energised; and the application of a further pulse on lead 142 will cause stage 132/1 to become de-energised and stage 132/0 to become re-energised. The application of a re-setting pulse by lead 140/3 to stage 132/0 causes that stage to become energised if not already energised at the time when the re-setting pulse is received (stage 132/1 of course becoming de-energised when stage 132/0 becomes energised); but, once again, a re-setting pulse applied to counter 132 has no effect if stage 132/0 is already energised at the time when the re-setting pulse is applied. Counters 131 and 132 accordingly go through successive stages of energisation and de-energisation of their respective stages in a manner similar to that of counter 130.

The manner in which the gates GC0, GC1, GC2, GC3, GC4, GC5, and the counters 130, 131 and 132 co-operate in the production of the C0, C1, C2, C3, C4 pulse trains is as follows.

Consider the state of affairs immediately after the beginning of a C0 pulse—i.e. immediately after a pulse has been received on lead 110 from delay line 107. (The stage at which the receipt of a pulse on lead 110 initiates a C0 pulse, will become apparent from the ensuing description.) At this instant immediately after the beginning of a C0 pulse, there will (as already mentioned) be no P or Q pulse; and the condition of the pulse generator will be such that stage 130/1 of counter 130, stage 131/0 of counter 131, and stage 132/0 of counter 132, are energised. Accordingly, there will be voltages on leads 134, 135 and 137: that is to say, there will be input voltages applied to all three inputs of three-gate GC0, which accordingly gives an output voltage on lead 124 to terminal C0, which voltage (for so long as it endures) constitutes the C0 pulse. It can be verified from FIGURE 2 that none of the three-gates GC1, GC2, GC3, GC4 has voltages applied to all three of its inputs; and four-gate GC5 has no voltage applied to its fourth input by lead 129, since pulse Q is absent: accordingly, none of gates GC1, GC2, GC3, GC4, GC5 gives an output voltage, and therefore no pulse other than C0 is being produced at this instant. 9 micro-seconds after the receipt of the above-mentioned pulse on lead 110 (which initiated the C0 pulse, as will be described below), there is a pulse emitted from the output of delay line 107 which (as described above) initiates the P pulse and causes a pulse to travel up delay line 115, reaching the output of the latter 113 micro-seconds after the input to delay line 115—i.e. 9+113=122 micro-seconds after the pulse was received on lead 110 initiating the C0 pulse. The pulse emitted by the output of delay line 115 is (as described above) immediately applied to the input to delay line 107 and reappears on lead 110 after a lapse of 111 micro-seconds—making, of course, a total time interval of 233 micro-seconds between the time when one pulse appears on lead 110 and the time when the next pulse appears on lead 110. During the passage of the pulse through delay line 107, a Q pulse will, of course, have been emitted as above described; and it will have been noted that the Q pulse (which starts when the pulse is applied to the input to delay line 107) begins 122 micro-seconds after the appearance of the pulse on lead 110, i.e. 122 micro-seconds after the start of pulse C0 as already stated is the case in the description relating to FIGURE 3(d).

The re-appearance (referred to in the preceding paragraph) of the pulse on lead 110, 233 micro-seconds after the previous appearance of a pulse on that lead, means that a voltage pulse appears on lead 139 causing stage 130/1 of counter 130 to become de-energised and stage 130/0 to become energised. The de-energisation of stage 130/1 and energisation of stage 130/0 applies a pulse to the input of counter 131, causing stage 131/0 to be de-energised and stage 131/1 of counter 131 to become energised—stage 132/0 of counter 132 remaining energised. Accordingly, there are now voltages on leads 133, 136 and 137, so that there are inputs on all three leads of three-gate GC1, and this gate delivers an output voltage on lead 125 to terminal C1, thus starting the C1 pulse. The de-energisation of stage 130/1, however, removes the voltage from lead 134, thus removing the input voltage on one of the inputs to gate GC0, which accordingly ceases to give an output—i.e. the voltage applied to terminal C0 is cut off, and pulse C0 accordingly ends 233 micro-seconds after it started and simultaneously with the start of the C1 pulse. It can be verified from FIGURE 2 that, in the circumstances just described, no gate (in the set now being described, associated with terminals C0, C1, C2, C3, C4) other than GC1 has voltages applied to all its inputs; and gate GC1 is accordingly the only gate now supplying an output voltage.

The state of affairs described in the preceding paragraph, in which there is a voltage at terminal C1, endures while the pulse which had been travelling in delay line 107 (and which supplied the pulse on lead 110 which initiated the C1 pulse as described in the preceding paragraph) has been transmitted to and through delay line 115 and re-applied to delay line 107, and has re-appeared on lead 110—which it does 233 micro-seconds (that being the time taken by a pulse to make one circuit of the circuit through the delay lines in series) after the start of pulse C1. The re-appearance of a pulse on lead 110 and its application thereby to counter 130 causes the ending of pulse C1 and the start of pulse C2 as follows. While pulse C1 endured, stage 130/0 of counter 130 was energised. The application of the new pulse to counter 130 causes stage 130/0 to become de-energised and stage 130/1 to become energised. The de-energisation of stage 130/0 removes the voltage from leads 133 and 133/1 and thus from one of the inputs to three-gate GC1, which accordingly ceases to give an output thus ending pulse C1 on terminal C1. The energisation of stage 130/1 re-establishes a voltage on lead 134; and as there are now voltages on leads 134, 136 and 137, gate GC2 (but only gate GC2) has voltages on all its inputs—therefore giving an output on lead 126 to terminal C2 and starting the C2 pulse.

The state of affairs described in the preceding paragraph endures until the pulse which has been circulating in delay lines 115 and 107 re-appears on lead 110 and is again applied to counter 130, whereupon pulse C2 ends (after a lapse of 233 micro-seconds) and pulse C3 begins—as follows. The re-application of the pulse to counter 130 causes stage 130/1 to become de-energised and stage 130/0 to be re-energised. The de-energisation of stage 130/1 and re-energisation of stage 130/0 applies a pulse over lead 141 to counter 131 which causes stage 131/1 to be de-energised and stage 131/0 to become energised. The de-energisation of stage 131/1 and re-energisation of stage 131/0 applies a pulse over lead 142 to counter 132, causing stage 132/0 to become de-energised and stage 132/1 to become energised. The states of the counters 130, 131 and 132 are now accordingly such that stages 130/0, 131/0 and 132/1 are energised. Voltages are accordingly applied by leads 133 (and branch 133/2), 135 and 138 to the three inputs to three-gate GC3, causing the latter to apply a voltage over lead 127 to terminal C3 thus starting the C3 pulse. The de-energisation of stages 130/1, 131/1 and 132/0 removes the voltages from the three inputs to three-gate GC2, thus removing the voltage from its output and ending pulse C2.

The C3 pulse, which started as described in the preceding paragraph, endures until, 233 micro-seconds after the start of the C3 pulse, the pulse which has in the meantime been circulating in delay lines 115 and 107 re-appears on lead 110 and is again applied to counter 130. Pulse C3 then ends, and pulse C4 then starts—as follows. The re-application of the said pulse to counter 130 causes stage 130/0 to become de-energised and stage 130/1 to become energised. Counters 131 and 132 remain unaffected, and stages 131/0 and 132/1 accordingly remain energised. There are therefore voltages applied to leads 134, 135 and 138, and three-gate GC4 accordingly has voltages applied to all three of its inputs and gives an output voltage on lead 128 to terminal C4 thus starting the C4 pulse. At the same time, the de-energisation of stage 130/0 removes the voltage from one of the inputs to gate GC3, thus terminating the output from the latter gate and ending the C3 pulse.

The C4 pulse, started as described in the preceding paragraph, likewise endures for 233 micro-seconds, ending when the pulse circulating through delay lines 115 and 107 appears once more on lead 110. When the pulse so appears on lead 110, stage 130/1 of counter 130 is de-energised and stage 130/0 energised—the transfer of energisation from stage 130/1 to stage 130/0 causing a pulse to be transmitted by lead 141 to counter 131 which de-energises stage 131/0 and energises 131/1. Stage 132/1 remains energised. The de-energisation of stages 130/1 and 131/0 causes the input voltages to be removed from two of the inputs to gate GC4, thus causing the output from the latter gate to end and thus terminate the C4 pulse.

The apparatus is now in a condition in which stages 130/0, 131/1 and 132/1 are energised. The resulting voltage inputs to the various gates can conveniently be tabulated as follows—an "O" indicating that the gate indicated in the left-hand end of the line in which the "O" occurs is receiving an input voltage from the stage indicated at the head of a column, whilst the absence of an "O" indicates that no voltage is being applied by the stage concerned to the gate indicated at the left-hand end of the line.

TABLE I

| Gate | Stage 130/0 | Stage 131/1 | Stage 132/1 |
|------|-------------|-------------|-------------|
| GC0  |             |             |             |
| GC1  | O           | O           |             |
| GC2  |             | O           |             |
| GC3  | O           |             | O           |
| GC4  |             |             | O           |
| GC5  |             | O           | O           |

(For example, from the table, gate GC3 is receiving an input from stages 130/0 and 132/1, but none from stage 131/1.) Accordingly, none of the three-gates GC0, GC1, GC2, GC3, GC4 has more than two inputs energised, whilst the four-gate GC5 has only two inputs energised. Accordingly (and for 233 micro-seconds, until a further pulse appears on lead 110 none of the gates gives an output and no C pulses are emitted.

At the end of this period of 233 micro-seconds, a pulse again appears on lead 110, which de-energises stage 130/0 of counter 130 and energises stage 130/1—counters 131 and 132 remaining unaffected. The resulting voltage inputs to the various gates are then as shown in the following table:

TABLE II

| Gate | Stage 130/1 | Stage 131/1 | Stage 132/1 |
|------|-------------|-------------|-------------|
| GC0  | O           |             |             |
| GC1  |             | O           |             |
| GC2  | O           | O           |             |
| GC3  |             |             | O           |
| GC4  | O           |             | O           |
| GC5  | O           | O           | O           |

Accordingly, the state of affairs is still that none of three-gates GC0, GC1, GC2, GC3, GC4, has voltages applied to more than two of its inputs and none of these gates emits a C pulse. Gate GC5, being a four-gate, also does not yet apply any voltage to its output since there is as yet no voltage on its fourth input lead 129. However, the pulse which had been travelling in delay line 107 reaches the output of the latter delay line 9 micro-seconds after appearing at lead 110, is applied to delay line 115 and re-appears after a further 113 micro-seconds at the output of delay line 115 and is then applied to the input to delay line 107 and (over lead 112) to multivibrator 111, this application of the pulse to multivibrator 111 causing it to start to emit the Q pulse (which is applied by leads 123 and 129 to four-gate GC5, as well as being applied by lead 113 to terminal Q) at a time which is 9+113=122 micro-seconds after the previous appearance of the pulse on lead 110. This appearance of the Q pulse on lead 129 and the input to four-gate GC5, has the result (as can be seen by comparison with the last-preceding table) that four-gate GC5 now has voltages applied to all four of its inputs; and four-gate GC5 therefore now gives an output on lead 140 which is applied by branch leads 140/1, 140/2 and 140/3 to counter 130, 131 and 132 respectively. The application of these re-setting inputs to these three counters has the effect that stage 130/1 is de-energised and stage 130/0 re-energised, stage 131/1 is de-energised and stage 131/0 re-energised, and stage 132/1 is de-energised and stage 132/0 re-energised. (It should be noted that the de-energisation of 130/1 does not produce a second "step" of counter 131 additional to that resulting from the re-setting input from four-gate GC5 to counter 131, nor does the de-energisation of counter 131/1 produce a second "step" of counter 132 additional to that resulting from the re-setting input from four-gate GC5 to counter 132.) Thus the condition of the apparatus immediately after the beginning of the Q pulse last referred to, is that stages 130/0, 131/0 and 132/0 are energised, and the resulting voltage inputs to the various gates are then as shown in Table III.

TABLE III

| Gate | Stage 130/0 | Stage 131/0 | Stage 132/0 |
|------|-------------|-------------|-------------|
| GC0  |             | O           | O           |
| GC1  | O           |             | O           |
| GC2  |             |             | O           |
| GC3  | O           | O           |             |
| GC4  |             | O           |             |
| GC5  |             |             |             |

It will be noted that this has removed the voltage from all the inputs to four-gate GC5 with the exception of the input from leads 123 and 129 resulting from the Q pulse, and all of the three-gates GC0, GC1, GC2, GC3, GC4 have at most two input voltages so that they continue to give no output voltage. 102 micro-seconds after the start of the Q pulse, the Q pulse ends when the pulse in delay line 107 re-appears on lead 109; and 9 micro-seconds later, the pulse in delay line 107 re-appears on lead 110.

The re-appearance of the pulse on lead 110 causes stage 130/0 to become de-energised and stage 130/1 to become energised, stages 131/0 and 132/0 remaining energised. The energisation of stages 130/1, 131/0 and 132/0 has the result that all three inputs of three-gate GC0 have voltages applied to them, thus initiating the C0 pulses: in fact, the state of the apparatus is precisely that envisaged at the start of the foregoing description of the manner in which the C0, C1, C2, C3, C4 pulses are produced. The foregoing cycle of operations is accordingly repeated—and continues to be repeated for so long as the circulation of pulses through the delay lines 115 and 107 remains uninterrupted.

Turning now to the section of pulse generator K/1 which is particularly concerned with the production of the D pulses, it will be seen from FIGURE 2 that terminals D5 and D6 are respectively connected by leads 143 and 144 to stage 145/0 and to stage 145/1 of binary chain counter 145. Terminals D0, D1, D2, D3, D4 are respectively connected by leads 146, 147, 148, 149, 150 to outputs from three-gates GD0, GD1, GD2, GD3, GD4, respectively. With this group of three-gates is associated a four-gate GD5 one of whose inputs is connected by lead 123/1 to lead 123. The other input voltages to gates GD0, GD1, GD2, GD3, GD4 and GD5 are controlled (in manner about to be described) by three binary chain counters 151, 152, 153 each having, as shown in FIGURE 2, two stages—viz. 151/0 and 151/1 for counter 151, 152/0 and 152/1 for counter 152, and 153/0 and 153/1 for counter 153.

These counters are generally similar to counters 130, 131 and 132 described above and are further described below, but, for the time being, it is sufficient to describe their mode of operation. Counter 145 is so arranged that, when stage 145/0 is energised, a voltage is applied and maintained over lead 143 to terminal D5, while when stage 145/1 is energised a voltage is applied and maintained over lead 144 to terminal D6. Counter 151 is so arranged that when stage 151/0 is energised a voltage is applied and maintained over lead 154 (and the respective leads shown branching therefrom in FIGURE 2) to an input of each of the three-gates GD1 and GD3 and the four-gate GD5; and when stage 151/1 is energised a voltage is applied and maintained over lead 155 (and its respective branch leads shown in FIGURE 2) to an input of each of the three-gates GD0, GD2, GD4. Similarly, counter 152 is so arranged that when stage 152/0 is energised a voltage is applied and maintained over lead 156 (and the respective leads branching therefrom as shown in FIGURE 2) to an input of each of the three-gates GD0, GD3, GD4; and when stage 152/1 is energised a voltage is applied and maintained over lead 157 (and its respective branch leads shown in FIGURE 2) to an input of each of the three-gates GD1 and GD2 and to an input of four-gate GD5. Again, counter 153 is so arranged that when stage 153/0 is energised a voltage is applied and maintained over lead 158 (and its respective branch leads shown in FIGURE 2) to an input of each of the three-gates GD0, GD1, GD2; and when stage 153/1 is energised a voltage is applied and maintained over lead 159 (and its respective branch leads shown in FIGURE 2) to an input of each of the three-gates GD3 and GD4 and to an input of four-gate GD5.

Lead 110 from delay line 107 is connected by branch lead 160 to the input to stage 145/0 of counter 145. The output lead 161 from four-gate GD5 is connected by branch lead 161/1 to stage 145/1 of counter 145, by branch lead 161/2 to stage 151/0 of counter 151, by branch lead 161/3 to stage 152/0, and by branch lead 161/4 to stage 153/0 of counter 153.

Counter 145 is so arranged that if stage 145/0 is energised, the application of an input on lead 160 will cause stage 145/0 to become de-energised and stage 145/1 to become energised. The application of a further input on lead 160 will, when stage 145/1 is energised, cause that stage to become de-energised and cause stage 145/0 to become re-energised: applications of further pulses on lead 160 cause successive alternate re-energisation and de-energisation of these stages. The application of a resetting input over lead 161/1 to stage 145/1 causes that stage to become energised if not already energised: if that stage is already energised the application of the resetting pulse produces no effect. It should also be noted that each time stage 145/1 is de-energised and stage 145/0 energised, counter 145 causes an input pulse (over lead 162) to be applied to counter 151.

Similarly with counter 151: assuming stage 151/0 is energised, the application of an input on lead 162 (from counter 145) will cause stage 151/0 to become de-energised and stage 151/1 to become energised; and the application of a further pulse on lead 162 will cause stage 151/1 to become de-energised and stage 151/0 to become re-energised. The de-energisation of stage 151/1 and energisation of stage 151/0 causes an input pulse to be applied (ovel lead 163) to counter 152. Again with counter 152: assuming stage 152/0 to be energised, the application of an input on lead 163 (from counter 151) will cause stage 152/0 to become de-energised and stage 152/1 to become energised, while the application of a further pulse on lead 163 will cause stage 152/1 to become de-energised and stage 152/0 to become re-energised. The de-energisation of stage 152/1 and energisation of stage 152/0 causes an input pulse (over lead 164) to be applied to counter 153. So also with counter 153: assuming stage 153/0 to be energised, the application of an input on lead 164 (from counter 152) will cause stage 153/0 to become de-energised and stage 153/1 to become energised, while the application of a further pulse on lead 164 will cause stage 153/1 to become de-energised and stage 153/0 to become re-energised. Counters 151, 152 and 153 accordingly go through successive stages of energisation and de-energisation of their respective stages as successive pulses are applied to their respective inputs.

The application of a resetting input (from four-gate GD5) over leads 161/2, 161/3, 161/4 to stages 151/0, 152/0, 153/0, respectively, causes these stages to become energised if not already energised: any of said stages which is already energised at the time of receiving a resetting input will remain unaffected by that input.

In considering the manner in which the gates GD0, GD1, GD2, GD3, GD4, GD5, and the counters 145, 151, 152, 153 co-operate in the production of the various D pulses it is convenient to start with the receipt of a pulse over leads 110 and 160 by counter 145—this being the pulse that ended a C0 pulse and started a C1 pulse as described in the earlier paragraphs hereof, since it is assumed that the description starts during the period of time covered by the diagram of pulses forming FIGURE 3(c). Counters 145, 151, 152 and 153 require to be so set that after receipt of this said pulse on lead 160, (1) stage 145/0 of counter 145 is energised, (2) stage 151/1 of counter 151 is energised, (3) stage 152/0 of counter 152 is energised, and (4) stage 153/0 of counter 153 is energised. Matters then proceed as follows.

The energisation of stage 145/0 causes a voltage to be applied to and maintained on terminal D5 over lead 143, thus initiating a D5 pulse. Stages 151/1, 152/0 and 153/0, being energised and being connected respectively by leads 155, 156 and 158 (and their respective branches) to the three inputs of three-gate GD0, apply voltages to all the inputs of GD0; and this three-gate GD0 accordingly gives an output on lead 146 to terminal D0, thus starting a D0 pulse. 233 micro-seconds after the receipt of the aforementioned pulse on leads 110 and 160 that initiated the D0 pulse, a further pulse will be received on these leads. (For brevity, hereinafter, these pulses at 233 micro-second intervals will be referred to as being received on lead 160, it being tacitly understood that they have been applied to lead 160 by lead 110.) The application of this further pulse by lead 160 to counter 145, de-energises stage 145/0 and energises stage 145/1. The de-energisation of stage 145/0 terminates the application by stage 145/0 of voltage to lead 143 and terminal D5 thus ending the D5 pulse after it has endured for 233 micro-seconds; and the energisation of stage 145/1 causes voltage to be applied over lead 144 to terminal D6, thus starting a D6 pulse. As, however, counter 145 applies a voltage pulse to conductor 162 only when stage 145/1 is de-energised and stage 145/0 is energised (and not vice versa), the energisation of stage 145/1 has no effect on counters 151, 152 and 153, which accordingly remain in the condition in which stages 151/1, 152/0 and 153/0 are energised and apply inputs to three-gate GD0. Three-gate GD0 accordingly continues to give an output, and pulse D0 is accordingly maintained.

After a further 233 micro-seconds, a pulse is again transmitted from delay line 107 to lead 160, which causes stage 145/1 to become de-energised and stage 145/0 to become energised. The energisation of stage 145/0 causes voltage to be applied to terminal D5, thus starting a new D5 pulse, while the de-energisation of stage 145/1 removes the voltage from lead 144 and terminal D6 (thus ending a D6 pulse): the change of state of counter 145 causes a pulse to be applied over lead 162 to counter 151. Stage 151/1 is thereby de-energised and stage 151/0 energised. The de-energisation of stage 151/1 and energisation of stage 151/0 causes a pulse to be applied over lead 163 to counter 152, causing stage 152/0 to be de-energised and stage 152/1 to become energised. Counter 153 remains unaffected.

The de-energisation of stages 151/1 and 152/0, removes the voltages from leads 155 and 156, respectively, thereby removing the voltages from two of the inputs to three-gate GD0 and causing it therefore to cease to give an output voltage to terminal D0. Pulse D0 accordingly ends after having endured for 466 micro-seconds; and it will be seen from the foregoing description that during the first 233 of these 466 micro-seconds, a D5 pulse was being emitted, whilst during the second 233 of these 466 micro-seconds a D6 pulse was being emitted.

The energisation of 145/0 causes, as has already been remarked, the start of a new D5 pulse. The energisation of stages 151/0 and 152/1, and the continuing energisation of stage 153/0, together have the effect that voltages are applied by leads 154, 157 and 158 (and their respective branches) to all three inputs of three-gate GD1, which accordingly gives an output on lead 147 to terminal D1, thus starting a D1 pulse simultaneously with the start of the new D5 pulse just referred to.

After this D1 pulse has lasted for 233 micro-seconds, a further pulse is received on lead 160, de-energising stage 145/0 and energising stage 145/1. This ends the D5 pulse by removing the voltage from terminal D5, and starts a D6 pulse owing to the application of voltage to terminal D6 from stage 145/1. No effect is, however, produced in the counters 151, 152 and 153; and accordingly the D1 pulse continues for a further 233 micro-seconds, until the next pulse is received on lead 160.

When this last-mentioned pulse is received, stage 145/1 is de-energised and stage 145/0 energised. Inter alia, this has the effect (as already described) of removing the voltage previously applied to terminal D6 and applying voltage to terminal D5—thus ending a D6 pulse and starting a new D5 pulse. In addition, the de-energisation of stage 145/1 and energisation of stage 145/0 cause a pulse to be applied over lead 162 to counter 151, thus de-energising stage 151/0 and energising stage 151/1. Stages 152/1 and 153/0 remain unaffected. Accordingly, the state of affairs has become one in which stages 151/1, 152/1 and 153/0 are energised; and voltages are respectively applied by them to leads 155, 157 and 158 (and their respective branches) to the three inputs of three-gate GD2, which accordingly gives an output on lead 148 to terminal D2, thus starting a D2 pulse. The de-energisation of stage 151/0, removes the voltage from one of the inputs to gate GD1, thus causing it to cease to give a voltage output to terminal D1 and ending the D1 pulse.

After a further 233 micro-seconds another pulse appears on lead 160, de-energising stage 145/0 and energising stage 145/1, but leaving counters 151, 152 and 153 unaffected. A D5 pulse therefore ends and a new D6 pulse begins, while the D2 pulse is maintained unaffected. There has therefore been a D5 pulse during the first 233 micro-seconds of the 466 micro-seconds which the D2 pulse will last, and a new D6 pulse has been started during the second half of the duration of the D2 pulse—this D6 pulse, and the D2 pulse, will end simultaneously as about to be described (233 microseconds after the pulse which started the D6 pulse last mentioned) upon the appearance of another pulse on lead 160. This last-mentioned pulse on lead 160 causes stage 145/0 to become re-energised and stage 145/1 to become de-energised.

The re-energisation of stage 145/0 starts a new D5 pulse, and the de-energisation of stage 145/1 ends the D6 pulse mentioned above. The de-energisation of stage 145/1 and energisation of stage 145/0 also causes a pulse to be applied over lead 162 to counter 151 which de-energises stage 151/1 and energises stage 151/0: this causes a pulse to be applied over lead 163 to counter 152, thus energising stage 152/0 and de-energising stage 152/1; and the de-energisation of stage 152/1 and energisation of stage 152/0 causes a pulse to be applied over lead 164 to counter 153, thus de-energising stage 153/0 and energising stage 153/1. The effect is, therefore, that stages 151/1, 152/1 and 153/0 have all become de-energised, thus removing the voltages from the inputs to three-gate GD2, which ceases to apply voltage from its output to terminal D2: this terminates the D2 pulse (simultaneously with the termination of the D6 pulse) as mentioned above. The energisation of stages 151/0, 152/0 and 153/1, causes them to apply voltages respectively to leads 154, 156 and 159 (and their respective branches, as shown in FIGURE 2), thus supplying voltages to all three inputs of three-gate GD3 and starting the D3 pulse. (It also causes a voltage to be applied over lead 154 (and its branch 154/1) and a voltage over lead 159 (and its branch 159/1) to two of the four inputs of four-gate GD5; but since there is no input to four-gate GD5 from stage 152/1, GD5 cannot give an output during the ensuing 233 microseconds notwithstanding the application of a voltage to a third input to four-gate GD5, over leads 123 and 123/1 during the period of the next ensuing Q pulse).

233 micro-seconds from the start of the D3 pulse as above described, another pulse appears on lead 160, de-energising stage 145/0 and energising stage 145/1—thus ending the D5 pulse and starting a new D6 pulse, but having no effect on counters 151, 152 and 153. The D3 pulse is accordingly not affected and continues for a further 233 micro-seconds, at the end of which period a new pulse appears on lead 160 which ends the D3 and D6 pulses simultaneously and starts a D4 pulse and a D5 pulse—as follows.

The appearance of the pulse on lead 160 as aforesaid, energises stage 145/0 and de-energises stage 145/1. This has the effect (as will be appreciated from earlier paragraphs in the foregoing description) of ending pulse D6 and starting pulse D5. It also causes a pulse to be applied over lead 162 to counter 151, so de-energising stage 151/0 and energising stage 151/1 but leaving counters 152 and 153 unaffected. Accordingly, stages 151/1, 152/0 and 153/1 are now energised and respectively apply voltages to leads 155, 156 and 159 (and their respective branches), so that there are now voltages applied to all three inputs of three-gate GD4, which causes GD4 to give an output voltage on lead 150 to terminal D4 and thus to start the D4 pulse. (There can, however, be no output from four-gate GD5 with this setting of counters 151, 152, 153; since there is no voltage on that input of four-gate GD5 which is connected to branch lead 154/1.)

The state of affairs described in the preceding paragraph continues for 233 micro-seconds until the receipt of a further pulse on lead 160, which de-energises stage 145/0 and energises stage 145/1, thus ending the D5 pulse and starting a D6 pulse but leaving counters 151, 152 and 153 unaffected, so that the D4 pulse is unaffected for a further 233 micro-seconds at the end of which time a further pulse appears on lead 160. The receipt of the last-mentioned pulse de-energises stage 145/1 (thus ending the D6 pulse), energises stage 145/0 (thus starting a new D5 pulse), and ends the D4 pulse in the manner described in the following paragraph.

The de-energisation of stage 145/1 and re-energisation of stage 145/0 causes a pulse to be applied over lead 162 to counter 151, energising stage 151/0 and de-energising stage 151/1. The de-energisation of stage 151/1 and energisation of stage 151/0 causes a pulse to be applied over lead 163 to counter 152, de-energising stage 152/0 and energising stage 152/1. The de-energisation of stages 151/1 and 152/0 causes the voltages to be removed from leads 155 and 156, thus removing the voltage from two of the inputs to three-gtae GD4 and so removing its output voltage and thus ending the D4 pulse.

The apparatus is now in a condition in which stages 145/0, 151/0, 152/1, 153/1 are energised. Table IV accordingly now shows the voltage inputs from stages 151/0, 152/1 and 153/1 to the various gates listed in that table—as before, an "O" indicating that the gate indicated at the left-hand end of the line in which the "O" occurs is receiving an input voltage from the stage indicated at the head of a column, whilst the absence of an "O" indicates that no voltage is being applied by the stage concerned to the gate indicated at the left-hand end of the line.

TABLE IV

| Gate | Stage 151/0 | Stage 152/1 | Stage 153/1 |
|---|---|---|---|
| GD0 | --- | --- | --- |
| GD1 | O | O | --- |
| GD2 | --- | O | --- |
| GD3 | O | --- | O |
| GD4 | --- | --- | O |
| GD5 | O | O | O |

Accordingly, none of the three-gates GD0, GD1, GD2, GD3, GD4 has voltages applied to more than two of its inputs, while four-gate GD5 has voltages applied to three of its inputs; but, as will have been understood from the earlier description of the circulation of pulses through delay lines 107 and 115, there is no Q pulse at the instant when a pulse appears on lead 110 (and therefore appears on lead 160), and there is accordingly no voltage applied by leads 123 and 123/1 to the fourth input of four-gate GD5 at the instant when the apparatus first assumes the condition represented in Table IV. Accordingly, at that instant, none of the gates GD0, GD1, GD2, GD3, GD4, GD5, gives an output and no D pulses are emitted.

The pulse which had been travelling in delay line 107 (and whose appearance on lead 110 caused the ending of pulse D4 and the creation of the condition shown in Table IV), reaches the output of delay line 107 9 micro-seconds later and (as described earlier) then appears at the input of delay line 115 to re-appear at the output of delay line 115 and therefore at the input of delay 107 and (via lead 112) at the input of multi-vibrator 111 after a further 113 micro-seconds—making 9+113=122 micro-seconds in all. When the pulse is so applied to multivibrator 111, it causes it to apply voltage to lead 113 (thus starting the emission of a Q pulse) and to leads 123 and 123/1 to the fourth input to four-gate GD5. Accordingly, 122 micro-seconds after the initiation of the state of affairs shown in Table IV, voltages are being applied to all four inputs of four-gate GD5, which now gives an output voltage on lead 161 which voltage is applied by branch leads 161/1, 161/2, 161/3 and 161/4 to counters 145, 151, 152 and 153. The result of the application of this re-setting voltage to these counters is that: stage 145/0 is de-energised and stage 145/1 energised, stage 151/0 is unaffected (being already energised), stage 152/0 is energised and stage 152/1 de-energised, and stage 153/0 is energised and stage 153/1 de-energised.

The resulting state of affairs is shown in Table V.

TABLE V

|  | Stage 145/1 | Stage 151/0 | Stage 152/0 | Stage 153/0 |
|---|---|---|---|---|
| Terminal D5 | --- | --- | --- | --- |
| Terminal D6 | O | --- | --- | --- |
| Gate GD0 | --- | --- | O | O |
| Gate GD1 | --- | O | --- | O |
| Gate GD2 | --- | --- | O | --- |
| Gate GD3 | --- | O | O | --- |
| Gate GD4 | --- | --- | O | --- |
| Gate GD5 | --- | O | --- | --- |

Accordingly, as can be seen from the foregoing table, voltage is no longer applied to terminal D5 but is applied to terminal D6—thus ending the short D5 pulse 122 micro-seconds after it started and starting a D6 pulse 122 micro-seconds after the end of the D4 pulse, as previously mentioned when the D pulses were being described with reference to FIGURE 3(c). None of the three-gates GD0, GD1, GD2, GD3, GD4, has voltages applied to more than two of its inputs and accordingly none of these gates gives an output: no D pulse other than D6 is, therefore, emitted. Four-gate GD5 has an input from stage 151/0 only, and, therefore, despite the fact that a Q pulse is being emitted at this time, and there is therefore an input from leads 123 and 123/1 to one of the inputs to gate GD5, that gate gives no output.

102 micro-seconds after the initiation of the state of affairs represented in Table V, the pulse which has in the meantime been travelling in delay line 107 re-appears on lead 109, thus causing multi-vibrator 111 to cease to give an output: the Q pulse accordingly ends and the voltage which had (since the beginning of the Q pulse) been applied over leads 123 and 123/1, is removed from the corresponding input to four-gate GD5.

After a further 9 micro-seconds (i.e. 111 micro-seconds after the initiation of the state of affairs represented in Table V), a pulse reappears on leads 110 and 160, de-energising stage 145/1 and energising stage 145/0—thus causing counter 145 to transmit a pulse over lead 162 to counter 151, which de-energises stage 151/0 and energises stage 151/1, counters 152 and 153 remaining unaffected. Accordingly, the state of affairs immediately after this re-appearance of a pulse on lead 160, is that stages 145/0, 151/1, 152/0 and 153/0 are energised. This is precisely the state of affairs which was assumed to exist at the beginning of the foregoing description of the manner in which the D pulses are produced. The foregoing cycle of operations is accordingly repeated—and, as with the C pulses, continues to be repeated for so long as the circulation of pulses through the delay lines 115 and 107 remains uninterrupted.

Turning to the section of pulse generator K/1 which is particularly concerned with the production of the U pulses, it will be seen from FIGURE 2 that terminals U5 and U6 are respectively connected by leads 165 and 166 to stage 167/0 and stage 167/1 of binary chain counter 167. Terminals U0, U1, U2, U3, U4 are respectively connected by leads 168, 169, 170, 171, 172 to outputs from three-gates GU0, GU1, GU2, GU3, GU4, respectively. With this group of three-gates is associated a four-gate GU5 one of whose inputs is connected by lead 173 to lead 123. The other input voltages to gates GU0, GU1, GU2, GU3, GU4 and GU5 are controlled (in manner about to be described) by three binary chain counters 174, 175, 176 each having, as shown in FIGURE 2, two stages—viz. 174/0 and 174/1 for counter 174, 175/0 and 175/1 for counter 175, and 176/0 and 176/1 for counter 176.

These counters are generally similar to counters 151, 152 and 153 described above and are further described below, but, for the time being, it is sufficient to describe their mode of operation. Counter 167 is so arranged that, when stage 167/0 is energised, a voltage is applied and maintained over lead 165 to terminal U5, and when stage 167/1 is energised, a voltage is applied and maintained over lead 166 to terminal U6. Counter 174 is so arranged that when stage 174/0 is energised a voltage is applied and maintained over lead 177 (and the respective leads shown branching therefrom in FIGURE 2) to an input of each of the three-gates GU1 and GU3; and when stage 174/1 is energised a voltage is applied and maintained over lead 178 (and its respective branch leads shown in FIGURE 2) to an input of each of the three-gates GU0, GU2, GU4, and a voltage is also applied and maintained over lead 178/1 to one input of four-gate GU5. (It may here be convenient to point out that whereas one input to four-gate GD5 is connected, by lead 154/1, to the first stage, viz. stage 151/0, of counter 151, it is the second stage, viz. stage 174/1, of counter 174 which is connected to four-gate GU5 by lead 178/1—thus resulting in the difference between the set of D pulses and the set of U pulses to which attention has already been drawn in describing FIGURE 3(c).)

Similarly, counter 175 is so arranged that when stage 175/0 is energised a voltage is applied and maintained over lead 179 (and the respective leads branching therefrom as shown in FIGURE 2) to an input of each of the three-gates GU0, GU3, GU4; and when stage 175/1 is energised a voltage is applied and maintained over lead 180 (and its respective branch leads shown in FIGURE 2) to an input of each of the three-gates GU1 and GU2 and to an input of four-gate GU5. Again, counter 176 is so arranged that when stage 176/0 is energised a voltage is applied and maintained over lead 181 (and its respective branch leads shown in FIGURE 2) to an input of each of the three-gates GU0, GU1, GU2; and when stage 176/1 is energised a voltage is applied and maintained over lead 182 (and its respective branch leads shown in FIGURE 2) to an input of each of the three-gates GU3 and GU4 and (over branch lead 182/1) to an input of four-gate GU5.

Lead 110 from delay line 107 is connected by branch lead 183 to the input to stage 167/0 of counter 167. The output lead 184 from four-gate GU5 is connected by branch lead 184/1 to stage 167/1 of counter 167, by branch lead 184/2 to stage 174/0 of counter 174, by branch lead 184/3 to stage 175/0 of counter 175, and by branch lead 184/4 to stage 176/0 of counter 176.

Counter 167 is so arranged that if stage 167/0 is energised, the application of an input on lead 183 will cause stage 167/0 to become de-energised and stage 167/1 to become energised. The application of a further input on lead 183 will, when stage 167/1 is energised, cause that stage to become de-energised and cause stage 167/0 to become re-energised: applications of further pulses on lead 183 cause successive alternate re-energisation and de-energisation of these stages. The application of a re-setting input over lead 184/1 to stage 167/1 causes that stage to become energised if not already energised at the instant when the re-setting impulse is applied: if that stage is already energised, the application of the re-setting pulse produces no effect. It should also be noted that each time stage 167/1 is de-energised and stage 167/0 energised, counter 167 causes an input pulse (over lead 185) to be applied to counter 174.

Similarly with counter 174: assuming stage 174/0 is energised, the application of an input on lead 185 (from counter 167) will cause stage 174/0 to become de-energised and stage 174/1 to become energised; and the application of a further pulse on lead 185 will cause stage 174/1 to become de-energised and stage 174/0 to become re-energised. The de-energisation of stage 174/1 and energisation of stage 174/0 causes an input pulse to be applied (over lead 186) to counter 175. Again with counter 175: assuming stage 175/0 to be energised the application of an input on lead 186 (from counter 174) will cause stage 175/0 to become de-energised and stage 175/1 to become energised, while the application of a further pulse on lead 186 will cause stage 175/1 to become de-energised and stage 175/0 to become re-energised. The de-energisation of stage 175/1 and energisation of stage 175/0 causes an input pulse (over lead 187) to be applied to counter 176. So also with counter 176: assuming stage 176/0 to be energised, the application of an input on lead 187 (from counter 175) will cause stage 176/0 to become de-energised and stage 176/1 to become energised, while the application of a further pulse on lead 187 will cause stage 176/1 to become de-energised and stage 176/0 to become re-energised. Counters 174, 175 and 176 accordingly go through successive stages of energisation and de-energisation of their respective stages as successive pulses are applied to their respective inputs. The application of a re-setting input (from four-gate GU5) over leads 184/2, 184/3, 184/4 to stages 174/0, 175/0, 176/0, respectively, causes those stages to become energised if not already energised: any of the said stages which is already energised at the time of receiving a re-setting input will remain unaffected by that input.

The manner in which gates GU0, GU1, GU2, GU3, GU4, GU5, and the counters 167, 174, 175, 176 co-operate in the production of the various U pulses is somewhat similar to that in which gates GD0, GD1, GD2, GD3, GD4, GD5, and counters 145, 151, 152, 153 co-operate in the production of the D pulses; but since (as already remarked) the circuit connections for these two groups of gates are not identical the manner in which the U pulses are produced will be described in detail. For the purposes of this description it is convenient to start at an instant immediately following the receipt of a pulse over leads 110 and 183 by counter 167—the pulse being one which ended a C0 pulse and started a C1 pulse, since it is again assumed that the description starts during the period of time covered by the diagram of pulses forming FIGURE 3(c). Counters 167, 174, 175 and 176 need to be so set that after receipt of the said pulse on lead 183, the following state of affairs exists: (1) stage 167/0 of counter 167 is energised, (2) stage 174/1 of counter 174 is energised, (3) stage 175/0 of counter 175 is energised, and (4) stage 176/0 of counter 176 is energised. Matters then proceed as follows:

Stage 167/0 being energised, voltage is applied over lead 165 to terminal U5, so that pulse U5 has been initiated. Stages 174/1, 175/0 and 176/0 being energised, voltages are applied to leads 178, 179 and 181, so that pulse U0 has been initiated—precisely similarly to the generation of the D0 pulse. On the receipt, 233 microseconds later, of the next pulse on lead 183 (from lead 110), stage 167/0 is de-energised and stage 167/1 energised, thus ending the U5 pulse and starting a U6 pulse—but leaving counters 174, 175 and 176 unaffected, so that the U0 pulse continues. After a further 233 micro-seconds, the appearance of a further pulse on lead 183 from lead 110, de-energises stage 167/1 (thus ending the U6 pulse) and energises 167/0 (thus starting a new U5 pulse); and the de-energisation of 167/1 and energisation of 167/0 causes counter 167 to transmit a pulse over lead 185 which de-energises stage 174/1 and energises stage 174/0 of counter 174. The de-energisation of stage 174/1 and energisation of stage 174/0 causes a pulse to be transmitted over lead 186 to counter 1/5, de-energising stage 175/0 and energising stage 175/1. The de-energisation of stages 174/1 and 175/0 removes the voltages from leads 178 and 179, thus removing the inputs to two of the inputs of gate GU0 and ending the U0 pulse (after it has endured for 466 micro-seconds) contemporaneously with the aforementioned ending of the U6 pulse. Counter 176 remains unaffected.

The state of affairs is now that stages 174/0, 175/1, 176/0 are energised and apply (over leads 177, 180 and 181, respectively, and their respective branch leads as shown in FIGURE 2) voltages to the three inputs of three-gate GU1, thus starting the U1 pulse contemporaneously with the ending of the U0 pulse. After 233 micro-seconds, a further pulse appears on lead 183 from lead 110, de-energising stage 167/0 and energising stage 167/1, thus ending a U5 pulse and starting a U6 pulse. Counters 174, 175 and 176 remain unaffected, so that the U1 pulse continues for a further 233 micro-seconds until, with the appearance of a further pulse on lead 183 from lead 110, stage 167/1 is de-energised and stage 167/0 is re-energised. This ends the U6 pulse last mentioned, starts a new U5 pulse, and also ends the U1 pulse and starts the U2 pulse in manner about to be described.

As just mentioned, stage 167/1 has become de-energised and stage 167/0 has become energised. This causes a pulse to be transmitted over lead 185 to counter 174, de-energising stage 174/0 and energising stage 174/1. Counters 175 and 176 remain unaffected, so that stages 175/1 and 176/0 remain energised. Accordingly, stage 174/0 having been de-energised, voltage is removed from lead 177 and therefore from one input to gate GU1, so that pulse U1 ends; and since stages 174/1, 175/1 and 176/0 are energised, voltages are applied (by leads 178, 180 and 181) to all three inputs of three-gate GU2, thus causing it to apply a voltage over lead 170 to terminal U2 and start the U2 pulse. This state continues for 233 micro-seconds until a further pulse is received on lead 183, energising stage 167/1 and de-energising stage 167/0, but leaving counters 174, 175 and 176 unaffected—thus ending a U5 pulse and starting a U6 pulse but leaving the U2 pulse to continue for a further 233 micro-seconds, i.e. until a further pulse is received on lead 183.

The receipt of this latter pulse, 466 micro-seconds after pulse U2 started, ends that pulse, starts the U3 pulse, ends a U6 pulse and starts a new U5 pulse. The sequence of operations is: receipt of the pulse on lead 183 de-energises stage 167/1 and energises stage 167/0—thus ending the U6 pulse and starting a U5 pulse as aforesaid—and causes a pulse to be transmitted over lead 185 to counter 174, de-energising stage 174/1 and energising stage 174/0. This de-energisation and energisation of stages 174/1 and 174/0, respectively, causes a pulse to be transmitted over lead 186 to counter 175, de-energising stage 175/1 and energising stage 175/0. The de-energisation and energisation of stages 175/1 and 175/0, respectively, as just mentioned, causes a pulse to be transmitted over lead 187 to counter 176, de-energising stage 176/0 and energising stage 176/1.

Of the foregoing changes, the de-energisation of stages 174/1, 175/1 and 176/0, causes the cessation of the application of voltages to the three inputs to three-gate GU2 and thus the cessation of pulse U2; and the fact that stages 174/0, 175/0 and 176/1 are energised, has the result that voltages are applied to leads 177, 179 and 182 (and their respective branches, as shown in FIGURE 2) to the three inputs of three-gate GU3, thus causing it to apply an output voltage over lead 171 to terminal U3 and start pulse U3.

The next two pulses on lead 183 follow after successive intervals of 233 micro-seconds. The first of these two pulses de-energises stage 167/0 and energises stage 167/1, thus ending a U5 pulse and starting a U6 pulse, but leaving counters 174, 175 and 176 unchanged (so that pulse U3 continues). The second of the said two pulses on lead 183, de-energises stage 167/1 and energises stage 167/0, causing counter 167 to transmit over lead 185 a pulse to counter 174, which de-energises stage 174/0 and energises stage 174/1, but leaves counters 175 and 176 unaffected—i.e. leaves them with stages 175/0 and 176/1, respectively, still energised.

The de-energisation of stage 167/1 ends the U6 pulse and the energisation of stage 167/0 starts a new U5 pulse. The de-energisation of stage 174/0 removes the voltage from lead 177 and thus from one of the inputs to three-gate GU3, so causing that gate to cease to give an output and thus ending the U3 pulse. The fact that stages 174/1, 175/0 and 176/1 are energised, has the result that voltage is applied over leads 178, 179 and 182 (and the respective branches shown in FIGURE 2) to the three inputs of three-gate GU4, thus starting the U4 pulse.

After 233 micro-seconds, the appearance of a further pulse on lead 183 de-energises stage 167/0 and energises stage 167/1 (thus ending a U5 pulse and starting a U6 pulse in manner several times described above), but leaves pulse U4 to continue for a further 233 micro-seconds since counters 174, 175 and 176 are unaffected. Finally, after a further 233 micro-seconds, the receipt of a further pulse on lead 183 causes the ending of pulse U4 (which has endured for 446 micro-seconds), the ending of pulse U6, and the start of a new U5 pulse, as follows.

The receipt of the further pulse last-mentioned, on lead 183, de-energises stage 167/1 and energises stage 167/0, thus causing the transmission of a pulse on lead 185 to counter 174, de-energising stage 174/1 and energising stage 174/0: this in turn causes a pulse on lead 186 which de-energises stage 175/0, and energises stage 175/1, of counter 175, but leaves counter 176 unaffected. De-energisation of stage 167/1 ends pulse U6 and energisation of stage 167/0 starts pulse U5 (as stated at the end of the preceding paragraph); and de-energisation of stages 174/1 and 175/0 removes the input voltages from two of the inputs to three-gate GU4 and thus ends the U4 pulse. De-energisation of stage 174/1 also removes the input voltage from one of the inputs to four-gate GU5.

The apparatus is now in a condition in which stages 167/0, 174/0, 175/1, 176/1 are energised. Table VI now shows the stages which are energised at this time, to which of terminals U5 or U6 voltage is being applied, and to which of the gates listed in this table the aforementioned stages are applying input voltages. As before, an "O" indicates that the gate indicated at the left-hand end of the line in which the "O" occurs is receiving an input voltage from the stage indicated at the head of a column, whilst the absence of an "O" indicates that no voltage is being applied by the stage concerned to the gate indicated at the left-hand end of the line.

TABLE VI

|  | Stage 167/0 | Stage 174/0 | Stage 175/1 | Stage 176/1 |
|---|---|---|---|---|
| Terminal U5 | O |  |  |  |
| Terminal U6 |  |  |  |  |
| Gate GU0 |  |  |  |  |
| Gate GU1 |  | O | O |  |
| Gate GU2 |  | O |  |  |
| Gate GU3 |  | O |  | O |
| Gate GU4 |  |  |  | O |
| Gate GU5 |  |  | O | O |

Accordingly, none of the gates GU0, GU1, GU2, GU3, GU4, GU5 has voltages applied to more than two of its inputs. Accordingly, at that instant, none of the gates GU0, GU1, GU2, GU3, GU4, GU5 gives an output and no U pulses are emitted other than U5.

The pulse which had been travelling in delay line 107 (and whose appearance on lead 110 caused the ending of pulse U4 and the creation of the condition represented by Table VI) reaches the output of delay line 107 9 micro-seconds later and (as described earlier) then appears at the input of delay line 115, re-appearing at the output of that delay line 115 and therefore at the input of delay line 107 and at the input of multivibrator 111 after a further 113 micro-seconds—making 9+113=122 micro-seconds in all. When the pulse is so applied to multivibrator 111, it causes it to apply voltage to lead 113 (thus starting the emission of a Q pulse) and to leads 123 and 173. This applies voltage to a third input of four-gate GU5; but as there is still no input voltage on the fourth input of four-gate GU5, the latter gate gives no output. A Q pulse accordingly starts at this time, but no other pulse. The Q pulse ends (as usual) after having lasted 102 micro-seconds; and when it ends, the voltage is removed from lead 173 and the input of four-gate GU5 to which that lead is connected.

9 micro-seconds after the ending of the Q pulse last mentioned, the pulse which has been travelling in delay line 107 re-appears on leads 110 and 183 and de-energises stage 167/0 and energises stage 167/1, leaving counters 174, 175 and 176 unaffected. Conditions accordingly remain the same as in Table VI save that the de-energising of stage 167/0 ends the U5 pulse and the energisation of stage 167/1 starts the U6 pulse—no pulses being emitted from terminals U0, U1, U2, U3 or U4. The pulse in delay line 107 continues its travel, is applied to delay line 115, and in due course is re-applied to the input to delay line 107 and multivibrator 111 (with the emission of a Q pulse in manner several times previously described). The application of voltage to leads 123, and 173 (during the Q pulse last mentioned) produces no output from four-gate GU5 since the fourth input to the last-mentioned gate is receiving no voltage from counter 174, and the Q pulse of course ends before there is a further pulse on lead 183. When this latter pulse occurs, stage 167/1 is deenergised (ending the U6 pulse) and stage 167/0 is re-energised, thus producing a pulse on lead 185 which de-energises stage 174/0 and energises stage 174/1. It will be noted that counters 175 and 176 remain unaffected. It will also be seen from the foregoing description that the U5 pulse and the U6 pulse referred to earlier in the present paragraph, each endure for 233 micro-seconds.

When stages 167/0 and 174/1 have been energised as just described, the state of affairs is that indicated in Table VII.

TABLE VII

|  | Stage 167/0 | Stage 174/1 | Stage 175/1 | Stage 176/1 |
|---|---|---|---|---|
| Terminal U5 | O |  |  |  |
| Terminal U6 |  |  |  |  |
| Gate GU0 |  | O |  |  |
| Gate GU1 |  |  | O |  |
| Gate GU2 |  | O | O |  |
| Gate GU3 |  |  |  | O |
| Gate GU4 |  | O |  | O |
| Gate GU5 |  | O | O | O |

Accordingly, owing to the energisation of stage 167/0 a U5 pulse has started; but none of three-gates GU0, GU1, GU2, GU3, GU4 has voltages applied to more than two of its inputs and none, therefore, gives an output: accordingly none of the U0, U1, U2, U3, U4 pulses is being emitted. Four-gate GU5 has voltages applied, as shown in Table VII, to three (only) of its inputs, and therefore does not yet give an output, though it will do so when the next Q pulse starts.

The pulse which (travelling in delay line 107) caused the appearance on leads 110 and 183 of the pulse which produced the state of affairs represented in Table VII, continues to travel to the output of delay line 107, is applied to (and travels through) delay line 115, and is applied to the input of delay line 107 and (by lead 112) to multivibrator 111, thereby starting the next Q pulse and applying voltage (via leads 123 and 173) to the fourth input of four-gate GU5. This occurs 122 micro-seconds after the creation of the state of affairs shown in Table VII. Accordingly, at this instant, four-gate GU5 (now having voltages applied to all four of its inputs) gives an output voltage on lead 184 which constitutes a resetting pulse on leads 184/1, 184/2, 184/3, 184/4. This de-energises each of the stages listed in Table VII and sets each of the counters 167, 174, 175, 176 into the states in which, respectively, stages 167/1, 174/0, 175/0 and 176/0 are energised. The state of affairs is now that represented by Table VIII.

TABLE VIII

|  | Stage 167/1 | Stage 174/0 | Stage 175/0 | Stage 176/0 |
|---|---|---|---|---|
| Terminal U5 |  |  |  |  |
| Terminal U6 | O |  |  |  |
| Gate GU0 |  |  | O | O |
| Gate GU1 |  | O |  | O |
| Gate GU2 |  |  |  | O |
| Gate GU3 |  | O | O |  |
| Gate GU4 |  |  | O |  |
| Gate GU5 |  |  |  |  |

Thus the U5 pulse is terminated after having endured only 122 micro-seconds, and no voltages are any longer applied to four-gate GU5 from any of the counters. A short U6 pulse has, however, been started—this pulse starting simultaneously with the ending of the U5 pulse, so that the period which has elapsed since the ending of the last U6 pulse is likewise 122 micro-seconds.

The pulse which was supplied to the input to delay line 107 simultaneously (as mentioned above) with its application to multivibrator 111, continues to travel in delay line 107, appears on lead 109 after 102 micro-seconds (thus ending the Q pulse last mentioned and removing the voltage from leads 123 and 173), and (after 111 micro-seconds from its input to delay line 107) appears on leads 110 and 183. The input from lead 183 to counter 167 de-energises stage 167/1 and energises stage 167/0 (thus terminating the short U6 pulse after 111 micro-seconds and starting a new U5 pulse) and accordingly causing a pulse to be transmitted by counter 167 over lead 185 to counter 174. This de-energises stage 174/0 and energises stage 174/1, leaving counters 175 and 176 unaffected.

Accordingly, the state of affairs now is that stages 167/0, 174/1, 175/0 and 176/0 are energised. This is precisely the state of affairs which was assumed to exist at the beginning of the foregoing description of the manner in which the U pulses are produced. The foregoing cycle of operations is accordingly repeated—and, as with the C and D pulses, continues to be repeated for so long as the circulation of pulses through the delay lines 115 and 107 remains uninterrupted.

The section of pulse generator K/1 which is particularly concerned with the production of the X, Y and Z pulses, and its mode of operation, will now be described.

It will be seen from FIGURE 2 that terminals X, Y and Z are respectively connected by leads 188, 189, 190 to, respectively, three-gates GX, GY, GZ. One input of each of these three-gates is connected to lead 191 (via its branches, as shown in FIGURE 2) which is connected to the output from a five-gate GW shown at the bottom right hand corner of FIGURE 2. A further input to gate GX is supplied by branch lead 124/1 which is connected to lead 124 and thus to the output of three-gate GC0; and the third input to gate GX is supplied by branch lead 165/2 which is connected by lead 165/1 to lead 165 and thus to the output from stage 167/0 of counter 167. A further input to gate GY is supplied by lead 166/1 which is connected to lead 166 and thus to the output from stage 167/1 of counter 167; and the third input to gate GY is supplied by branch lead 127/2 which is connected to lead 127/1 and thus by lead 127 to the output of three-gate GC3. The connection of one input to gate GZ has already been described (viz. from lead 191 from five-gate GW): the other two inputs to this three-gate GZ are respectively by lead 165/3 from lead 165/1 and thus from stage 167/0 of counter 167, and by lead 127/3 from lead 127/1 and thus from lead 127 and the output of three-gate GC3. The five inputs to five-gate GW are respectively supplied, as shown, (i) by lead 143/1 from lead 143 and thus from stage 145/0 of counter 145, (ii) by lead 146/1 from lead 146 and thus from the output of three-gate GD0, (iii) by lead 177/1 from lead 177 and thus from stage 174/0 of counter 174, (iv) by lead 180/1 from lead 180 and thus from the output of stage 175/1 of counter 175, and (v) by lead 182/2 from lead 182 and thus from stage 176/1 of counter 176.

In order to see how the X, Y and Z pulses are timed in relation to the C, D and U pulses, it is simplest to begin by noting that each of the three-gates GX, GY, GZ can give an output only if there is an input on lead 191—that is to say, if five-gate GW is giving an output. This can occur only if there is an input on each of the leads 143/1, 146/1, 177/1, 180/1 and 182/2; and accordingly it is necessary that the following stages of the respective counters should be energised, viz.

145/0

151/1, 152/0, 153/0 (so that three-gate GD0 may be energised to give an output)

174/0
175/1
176/1

It will be noted from the foregoing that in order that an X, a Y and a Z pulse may be emitted, it is necessary that stages 174/0, 175/1 and 176/1 should be simultaneously energised; but it can also be seen from Table VI that when this state of affairs exists, none of the pulses U0, U1, U2, U3, U4 is being emitted. Accordingly, no complete combination of C, D and U pulses capable of identifying a subscriber connected to any multiplex, is being emitted while an X, a Y or a Z pulse is being emitted—the U pulse necessary to complete an identifying combination being absent.

In order that an X pulse may be emitted, three-gate GX, in addition to receiving an input from lead 191 as mentioned above, must have inputs on leads 124/1 and 165/2. To provide these inputs, the following stages of the respective counters must be energised, viz:

130/1, 131/0, 132/0 (so that gate GC0 may be energised to give an output)

167/0

It will therefore be noted from the particulars in this and the preceding paragraph, that when an X pulse is being emitted, pulse generator K/1 is also emitting a C0 pulse (gate GC0 being energised), a D5 pulse (stage 145/0 being energised), a D0 pulse (gate GD0 being energised), and a U5 pulse (stage 167/0 being energised). Consideration of these facts enables one to identify the stage at which the X pulse is emitted.

The state of affairs represented in Table VI is that which exists immediately after the end of a U4 pulse. Now, taking the beginning of the first (i.e. left-hand) C0 pulse shown in FIGURE 3(c) as time $t=0$, it has been explained that this C0 pulse ends, and a U0 pulse begins, at time $t=233$ micro-seconds. The next U4 pulse (i.e. the first U4 pulse after the instant chosen as $t=0$) ends $5 \times 466 = 2330$ micro-seconds later, i.e. at time $t=2563$ micro-seconds; and since the repetition period for a train of U pulses is 3029 micro-seconds (as already explained), successive U4 pulses end after the elapsing of successive periods of 3029 micro-seconds. But these are also the times at which the state of affairs represented in Table VI begins. Accordingly, the state of affairs represented in Table VI begins at times (measured in micro-seconds from $t=0$)

$$t_1 = 2563$$
$$t_2 = 2563 + 3029 = 5592$$
$$t_3 = 5592 + 3029 = 8621$$

and so on, the $m$th beginning of the state of affairs represented in Table VI occurring at time $$t_m = 2563 + 3029(m-1)$$

microseconds from time $t=0$.

Since there is always a D5 pulse during the first half of each D0 pulse and a U5 pulse during the time that the state of affairs shown in Table VI endures, it is necessary, in order to ascertain when the first X pulses (after time $t=0$) occurs, to find when the first coincidence occurs between the time of starting of a C0 pulse and the time $t_m$ given by the foregoing expression, that coincidence being one occurring when a D0 pulse is also starting. Now the first C0 pulse begins at time $t=0$, and (as already explained when FIGURE 3(c) was being described) the repetition period for a train of C pulses is 1631 micro-seconds. Accordingly, the $n$th C0 pulse begins at a time $t_n$ (measured in micro-seconds from $t=0$) given by $$t_n = 1631(n-1)$$

Similarly, the first D0 pulse begins at time $t=233$; and as the repetition period for a train of D pulses is 2563 micro-seconds, the $p$th D0 pulse begins at a time $t_p$ (measured in micro-seconds from $t=0$) given by $$t_p = 233 + 2563(p-1)$$

The smallest values of $m$, $n$ and $p$ for which the foregoing expressions for $t_m$, $t_n$ and $t_p$ become equal are $$m=40, n=75, p=48$$

all three times being then equal to 120,694 micro-seconds.

Accordingly, the first X pulse starts (in relation to the pulse trains shown in FIGURE 3(c)) at the same time that the emission of the 75th C0 pulse starts. It will also be appreciated that since this X pulse will end when stage 167/0 is de-energised (thus removing the voltage from leads 165, 165/1 and 165/2, and therefore from one of the inputs to three-gate GX), since stage 167/0 is de-energised after it has been energised for 233 micro-seconds (as appears from the description in the paragraphs following Table VI), it follows that pulse X lasts 233 micro-seconds.

In order that a Y pulse may be emitted, three-gate GY in addition to receiving an input from lead 191, must have inputs on leads 127/2 and 166/1. To provide these two latter inputs, the following stages of the respective counters must be energised, viz:

130/0, 131/0, 132/1 (so that gate GC3 may be energised to give an output)

167/1

It will accordingly be seen that in this case, when a Y pulse is being emitted, pulse generator K/1 is also emitting a C3 pulse (gate GC3 being energised), a D5 pulse (stage 145/0 being energised), a D0 pulse (gate GD0 being energised), and a U6 pulse (stage 167/1 being energised).

Reference to FIGURE 3(c) shows that, starting with (a) the D5 pulse which begins simultaneously with the left-hand D0 pulse (in the said figure) and (b) the U5 pulse which begins simultaneously with the left-hand U0 pulse (in the said figure), there is co-incidence of the times when D5 and U5 pulses exist—this co-incidence being maintained until the occurrence of the short D5 pulse immediately following the D4 pulse. But when the next D5 pulse of normal length occurs, it will be seen that it coincides with a U6 pulse. Immediately thereafter, however, the effect of the occurrence of a short U5 and a short U6 pulse, is to restore the co-incidence of the times when D5 and U5 pulses co-exist. During the next cycle of D pulses, it will be found (if examined in detail) that there are three periods of 233 micro-seconds during which a D5 pulse co-incides with a U6 pulse—and so on, from time to time, there are varying numbers of D5 pulses which coincide with U6 pulses. In order to find when a Y pulse occurs, therefore, one has to find a period when the first half of a D0 pulse (during which half it is that a D5 pulse occurs) coincides with a C3 pulse and with a period during which the state of affairs is as in Table VI as modified by the receipt of one further pulse on lead 183 (so that stage 167/1 is energised and a U6 pulse is being emitted). The modified state of affairs last-mentioned begins at times $t_q$ which are 233 micro-seconds later than $t_m$ (as given above), i.e. $t_q$ is given by the expression $$t_q = 2796 + 3039(q-1)$$

and the times ($t_r$) of beginning of C3 pulses are given by the expression $$t_r = 699 + 1631(r-1)$$

From these expressions it is found that the coincidence which results in the emission of a Y pulse starts at a time $$66 \times 233 = 15,378 \text{ micro-seconds}$$

after the beginning of an X pulse.

A Y pulse, like an X pulse, lasts for 233 micro-seconds, the Y pulse being terminated at the end of the period during which stage 167/1 is energised.

In order that a Z pulse may be emitted, the gate GZ, in addition to receiving an input from lead 191, must have inputs on leads 127/3 and 165/3. To provide these two latter inputs, the following stages of the respective counters must be energised viz:

130/0, 131/0, 132/1 (so that gate GC3 may be energised to give an output)

167/0

It will accordingly be seen that in this case, when a Z pulse is being emitted, pulse generator K/1 is also emitting a C3 pulse (gate GC3 being energised), a D0 and a D5 pulse (stages 145/0, 151/1, 152/0 and 153/0 being energised), and a U5 pulse (stage 167/0 being energised).

Accordingly, following the same type of reasoning as for the X pulses and the Y pulses, one needs a coincidence between the starting times of—

(i) The state of affairs shown in Table VI, which starting times are given by one of the expressions quoted above, viz:

$$t_m = 2563 + 3029(m-1)$$

(ii) A C3 pulse, which starting times are also given by one of the above-quoted expressions, viz:

$$t_r = 699 + 1631(r-1)$$

and, (iii) A D0 and a D5 pulse, which starting times are given by the expression $$t_p = 233 + 2563(p-1)$$

quoted above.

From these expressions it is found that the coincidence which results in the emission of a Z pulse starts at a time $$77 \times 233 = 17,941 \text{ micro-seconds}$$

after the beginning of a Y pulse.

A Z pulse, like an X pulse and a Y pulse, lasts for 233 micro-seconds, the Z pulse being terminated at the end of the period during which stage 167/0 is energised.

It may be remarked that only one X pulse, one Y pulse and one Z pulse is emitted during each period of 233,233 micro-seconds—i.e. during the time required for the complete cycle of "preparations" of subscribers' equipment described earlier in this account of the mode of operation of pulse generator K/1. It may also be mentioned that in this arrangement the X, Y and Z pulses are so timed as not to occur immediately before or immediately after a combination of C, D and U pulses that is actually used for identifying a subscriber connected to any multiplex. This is possible because the complete set of cycles of C, D and U pulses occupies $$7 \times 11 \times 13 = 1001$$

periods each of 233 micro-seconds, but there are only 500 subscribers connected to each multiplex. Accordingly, 501 of such periods are not needed for the emission of subscriber-identification combinations of C, D, U pulses: there are thus "gaps" between the used combinations of C, D, U pulses, and the existence of these "gaps" permits the used combinations of C, D, U pulses to be so selected that no used combination occurs immediately before or immediately after an X, a Y or a Z pulse. This is desirable because it makes it easier to ensure that the operations produced by the emission of an X, a Y or a Z pulse (which effects are described later) shall be completed before another used combination of C, D, U pulses is emitted and needs to carry out its own operations in the apparatus.

Section Control Unit

Having thus described the mode of operation of pulse generator K/1, it is next convenient to describe similarly section control unit A/2. It will be remembered from the skeleton description of the system that was given with reference to FIGURE 1, that it was stated that when a subscriber initiates a call, one of the first operations performed by the apparatus in the multiplex to which that subscriber is connected, was the allocation to that subscriber of a pulse train not already in use in that multiplex and also not in use in one of the registers such as K/5 and K/6. This train of free register pulses (which is "stored" in unit A/2 in manner shortly to be described) can (as will also be described) then be suppressed in the store in unit A/2, and then needs to be replaced by a new train of register pulses: it is thus convenient to take as a starting point, when describing the modus operandi of a multiplex, the manner in which a train of free register pulses is allocated to, and stored in, a section control unit.

The diagram for the section control unit A/2 of a typical subscriber multiplex is shown in FIGURE 4. It comprises the following plurality of sub-units (which are shown in FIGURE 4 as partitioned from one another for the sake of clarity):

Speech channel control sub-unit _____ 192
Register channel temporary store sub-unit _____ 193
Speech channel temporary store sub-unit _____ 194
Busy channel store sub-unit _____ 195
Release control sub-unit _____ 196
Free register channel store sub-unit _____ 197
Busy register channel store sub-unit _____ 198 these numerals appearing at the left-hand side of the figure. The sub-unit primarily concerned with receiving and storing the free register pulse train, is free register channel store 197; but it will be convenient to describe the nature of those components of all the foregoing sub-units which are shown in FIGURE 4.

FIGURE 4 also includes a block outline of pulse generator K/1 on which are marked the seven terminals immediately involved in this stage of the description, viz. terminals C0, D0, X, Y, Z, Q and S, and a block outline of a local clock pulse generator unit CPU/1 which is described hereinafter. As with the representation of pulse generator K/1 in FIGURE 2, the various interconnections are shown diagrammatically as single leads, for simplicity; and this convention will be adopted in relation to all the functional diagrams in this specification.

As will be seen from FIGURE 4, terminal S of pulse generator K/1 is connected by lead 199 to clock pulse generator unit CPU/1, and accordingly supplies continuously to generator CPU/1 the wave S. This wave, in generator CPU/1, is converted to the clock pulses shown in FIGURE 3(b), which pulses are emitted by generator CPU/1 over lead 200 and its branch leads 200/1 and 200/2.

Speed channel control sub-unit 192 is provided with terminals 201, 202, 203, 204, 205, 206, 207, 208, 209, 210, 211, terminal 203 having connected to it lead 200/1 on which clock pulses are supplied. Clock pulses fed to terminal 203 are fed therefrom by lead 212 and its branches 212/1 and 212/2 respectively to one input of a six-gate 213 and one input of a four-gate 214. The five other inputs of six-gate 213 are supplied over leads 215, 216, 217, 218, 219. The inputs respectively connected to leads 215 and 216 are negatory inputs (and so indicated in FIGURE 4 by the presence of a short line across the lead adjacent to the point of the arrow on the lead), that is to say, six-gate 213 will give a voltage output on lead 220 provided, firstly, that there are voltages on all of leads 212/1, 217, 218 and 219, and provided, secondly, that there is no input on either lead 215 or 216. The three other inputs to four-gate 214 are supplied over leads 221, 222 and 223, lead 223 being a negatory input—so that four-gate 214 will give a voltage output on lead 224 (which is connected to terminal 202) provided there are voltages on leads 212/2, 221 and 222 but no voltage on lead 223.

Lead 220 from the output of six-gate 213 is connected to the input of magnetostrictive delay line 225, the output of delay line 225 being connected by lead 226 to one input of a one-gate 227. The output of one-gate 227 is connected by lead 228 to terminal 201. Delay line 225 gives a delay of 50 micro-seconds between the instant at which a ½ micro-second pulse is fed to its input by lead 220 and the instant at which that pulse re-appears at the output of said delay line and is fed to lead 226. Lead 220 is also connected by branch lead 220/1 to terminal 206.

It may be commented at this point, that leads 216 and 223, which are connected to the negatory inputs of gates 213 and 214, respectively, are both connected to lead 229, which lead is connected (in manner described later) to an output from busy channel store sub-unit 195. The purpose of this connection is to ensure that if a clock pulse is fed to gates 213 and 214 (on leads 212, 212/1 and 212/2) at the same instant that a pulse is emitted on lead 229 by store 195, that clock pulse will not be re-emitted by either gate 213 or 214. Lead 229 is also connected by lead 230 to a negatory input on four-gate 231, whose output is connected by lead 232 to terminal 204. Four-gate 231 equally, therefore, cannot give an output to terminal 204 at the instant when a pulse is emitted by busy channel store sub-unit 195. A second input to four-gate 231 is connected to lead 269/2 (referred to below) from register channel temporary store sub-unit 193. The third input to four-gate 231 is supplied by lead 233 which is connected to terminal 208; and the fourth input to four-gate 231 is again a negatory input by lead 234 from a two-gate 235, whose two inputs are respectively connected by leads 236 and 237 to terminals 209 and 210.

The output of two-gate 235, in addition to being connected by lead 234 to one negatory input to four-gate 231, is also connected by branch lead 234/1 to one input of a two-gate 238, and by branch lead 234/2 to the junction of leads 217 and 222 (which respectively supply inputs of six-gate 213 and four-gate 214). To this junction is also connected lead 239, which is connected with free register channel store sub-unit 197. Owing to the negatory input on lead 234, four-gate 231 cannot give an output when two-gate 235 is giving an output. The second input of two-gate 238 is connected by lead 240 to terminal 207; and the output of two-gate 238 is connected by lead 241 to a second input to one-gate 227.

Register channel temporary store sub-unit 193 is provided with terminals 242, 243, 244, 245, 246, 247. Terminal 244 is connected by lead 248 to one input of a two-gate 249 whose output is connected by lead 250 to an input of one-gate 251 and by branch lead 250/1 to one input of a trigger device 252. The output of one-gate 251 is connected by lead 253 to one input of a one-gate 254 whose output is connected by lead 255 to the input of a magnetostrictive delay line 256 which gives a delay of 100 micro-seconds between the instant at which a pulse is fed to the input to this delay line and the instant at which this pulse re-appears at the output of the delay line and is so fed to lead 257 and thus to a second input to one-gate 251. To lead 253 is also connected lead 258 which branches to form leads 259 and 260, of which lead 259 is connected to one input of three-gate 261 whose output is connected by lead 262 to terminal 242, while lead 260 is connected to terminal 247. Another input of three-gate 261 is connected by lead 243/1 to terminal 243, which is in turn connected by branch lead 326/1 to lead 326 (mentioned below in the description of release control sub-unit 196) and thus to terminal X on pulse generator K/1. One-gate 254 has a second input connected to lead 263, which is an inhibitory input—that is to say, if a voltage is present on lead 263, no output will be given by gate 254 even through a voltage may be applied to its other input by lead 253.

It may be convenient at this point to digress from the description of FIGURE 4 to explain that if a ½ micro-second pulse be fed on lead 250 to one-gate 251, so that the latter gate transmits a similar pulse on lead 253 to one-gate 254, then, if there is no voltage applied by lead 263 to the inhibitory input of one-gate 254, ½ micro-second pulses will continue to circulate through delay line 256 and gates 251 and 254, at 100 micro-second intervals, in the following manner. That is to say, provided there is no voltage on lead 263, the input of a pulse to one-gate 254 causes it to give a similar pulse output on lead 255 to the input to delay line 256; and accordingly, 100 micro-seconds later, this pulse re-appears at the output of the said delay line and is applied over lead 257 to one input of one-gate 251 and accordingly appears at the output of one-gate 251 and is applied over lead 253 to the input of one-gate 254. It will accordingly be clear that provided no inhibitory input has in the meantime been applied to one-gate 254 over lead 263, one-gate 254 again applies the pulse (as just described above) to the input to delay line 256; and thus this part of the apparatus continues to cause the circulation of a ½ micro-second pulse, at intervals of 100 micro-seconds, until an inhibitory input is applied to one-gate 254. (The circuit arrangements for the delay line and the gates, including such components as amplifiers to compensate for losses, will be further described later in this specification.) It will be seen that this section of the apparatus generates a typical pulse train such as was referred to in the third paragraph of this specification in the course of the preliminary description—though it will have been appreciated that the pulse train just described with reference to this section of the equipment shown in FIGURE 4, is a pulse train used in connection with the registers and not for communicating speech.

Reverting, now, to the description of sub-unit 193 in FIGURE 4, it will be seen that lead 263 is connected to the output of one-gate 264, that output being also connected by branch lead 263/1 to one input of two-gate 265 whose output is connected by lead 266 to terminal 245. One input of one-gate 264 is connected by lead 267 to terminal 246. The second input to two-gate 265 is connected by branch lead 268/1 to lead 268, which lead is connected to an output from busy register channel store sub-unit 198 as described below. Branch lead 268/2 connects lead 268 to one of the inputs to two-gate 249 mentioned above.

It will be seen from FIGURE 4 that the output of trigger device 252 is connected to lead 269, from which lead a branch lead 269/1 is connected to the third input of three-gate 261, and a second branch lead 269/2 is connected to one input of four-gate 231, while lead 218 to six-gate 213 is also connected to branch lead 269/2. The second input to trigger device 252 is provided on lead 270—this being connected to speech channel temporary store sub-unit 194, as described below. Trigger device 252 is so arranged that on receiving a voltage pulse on lead 250/1, the said device assumes a condition (if not already in that condition) in which it gives a voltage output on lead 269. If, however, a pulse is applied to trigger device 252 by lead 270, the said device (if then giving an output on lead 269) ceases to give an output when the pulse on lead 270 ceases—i.e. trigger device 252 is operated by the lagging edge of a pulse applied on lead 270, the fact that it is operated by said lagging edge being indicated in FIGURE 4 by the "x" superposed on lead 270 adjacent to device 252.

Speech channel temporary store sub-unit 194 is provided with a one-gate 271 having three inputs—viz. an input connected by lead 272 with lead 232 to which is applied the output from four-gate 231 in speech channel control sub-unit 192, an input connected by lead 273 with lead 262 to which is applied the output from three-gate 261 in register channel temporary store sub-unit 193, and an input connected by lead 274 with lead 220 to which is applied the output from six-gate 213 in speech channel control sub-unit 192. The output of one-gate 271 is connected by lead 275 to one input of one-gate 276; and it will be noted that lead 270 (which is connected to one input of trigger device 252, as mentioned in the preceding paragraph) is also connected to lead 275 and thus to the output of one-gate 271. The output of one-gate 276 is connected by lead 277 with one input of one-gate 278 whose output is connected by lead 279 with terminal 280 and also by lead 281 with the input of magnetostrictive delay line 282. Delay line 282 is (like delay line 256) designed to give a delay of 100 microseconds between the instant at which a pulse is fed to its input and the instant at which this pulse re-appears at its output and is so fed to lead 283 and by the latter lead to the second input to one-gate 276. It will, therefore, be seen that if a ½ micro-second pulse is applied to one-gate 276, it is fed by lead 277 to one-gate 278 and (provided there is no voltage on the inhibitory input to the latter gate, as mentioned in the next paragraph) thence by lead 281 to delay line 282, whence the pulse is fed (after a delay of 100 micro-seconds) to lead 283 and to the second input of one-gate 276—accordingly re-appearing on lead 277. Thus this part of the apparatus (very similarly to the part including delay line 256 in sub-unit 193) will, once a ½ micro-second pulse has been applied to it, continue to cause the circulation of a ½ micro-second pulse, at intervals of 100 micro-seconds, until an inhibitory input is applied to one-gate 278.

The inhibitory input to one-gate 278 is connected by lead 284 to the output of one-gate 285. The last-mentioned one-gate has an input connected by lead 286 to busy channel store sub-unit 195 and a second (negatory) input on lead 287 from a "slow release" device 288 (described more fully hereinafter) whose input is connected by lead 289 with lead 260 which is fed from the output of one-gate 251 in sub-unit 193. Accordingly, there will be an inhibitory input to gate 278 (stopping the circulation of pulses through delay line 282 and gates 276 and 278) if there is an input to gate 285 from the busy channel store or if there is no negatory input to gate 285 from device 288: one-gate 285 is so designed that if there is a negatory input on lead 287, and a pulse is applied on lead 286, one-gate 285 will give an output which is applied to the inhibitory input of one-gate 278. The purpose of slow release device 288 is to ensure that if the repetition of pulses (at intervals of 100 microseconds) in delay line 256 and gates 251 and 254 (in the register channel temporary store) is interrupted (i.e. delay line 256 and its associated gates are "cleared" of the pulse train they had been repeating), one-gate 285 shall give an output on lead 284 which is applied to the inhibitory input of one-gate 278. Accordingly, slow release device 288 is so designed that, if not already giving an output, it will do so immediately it receives an input from lead 289 and will continue to give an output for (say) 150 micro-seconds (i.e. somewhat longer than the duration of the train repetition interval) after the cessation of the said input on lead 289: if slow release device 288 is already giving an output at the instant when it receives an input on lead 289, device 288 then continues to give an output for 150 micro-seconds after the cessation of the said input on lead 289. Accordingly, for so long as pulses are being repeated in delay line 256 at intervals of 100 micro-seconds, slow release device 288 continues to give an output on lead 287, and one-gate 285 does not give an output (i.e. no inhibitory input is applied to one-gate 278) unless there is in the meantime an input on lead 286 to one-gate 285.

Busy channel store sub-unit 195 is provided with terminals 290, 291 and 292. Terminals 290 and 291 are connected (by connections not shown in FIGURE 4) to the main cables over which speech is transmitted from and to the multiplex controlled by this section control unit A/2. The connections over these main cables are further described elsewhere in this specification, and it is sufficient for the purposes of this present section of the description to say that terminal 290 is connected to the cable over which speech is transmitted from multiplex A to other multiplexes, and terminal 291 is connected to the cable over which speech is transmitted to multiplex A from other multiplexes. These cables will generally be referred to hereinafter as "speech highways"; and the speech highway by which speech is transmitted from a multiplex will sometimes be referred to as an "output highway," while the speech highway by which speech is transmitted to a multiplex will sometimes be referred to as an "input highway"—the terms "output" and "input" being used (as will be clear from the context in which they occur) in relation to the multiplex to which the highways are (for the time being) described as connected. As a result of these connections between the speech highways and terminals 290 and 291, respectively, there are applied to those terminals voltage pulses (which will generally be modulated by speech signals) corresponding to the voltage pulses constituting the channels in use (from time to time) on the speech highways. (The terms "output highway" and "input highway" as here used should not be confused with the terms "outgoing highway" and "incoming highway" as sometimes used in the telephone art with reference to the calling subscriber.)

Terminal 290 is connected by lead 293 to clipper 294 which is a device which removes from the voltage pulses fed to it any speech modulations imposed on the said pulses and feeds to lead 295 an output which is (in effect) the corresponding unmodulated pulses occurring (for the time being) on the output speech highway of multiplex A. Similarly, terminal 291 is connected by lead 296 to clipper 297, which likewise removes from the voltage pulses fed to it any speech modulations imposed on the said pulses and feeds to lead 298 an output which is (in effect) the corresponding unmodulated pulses occurring (for the time being) on the input speech highway of multiplex A. Lead 295 is connected by branch lead 295/1 to release control sub-unit 196, by branch lead 295/2 to one input of a one-gate 299, and by lead 286 to one input of one-gate 285 in speech channel temporary store sub-unit 194. Lead 298 is connected by branch lead 298/1 to release control sub-unit 196 and by branch lead 298/2 to a second input to one-gate 299.

The output of one-gate 299, is connected by lead 300 to an input to one-gate 301 whose output is connected to lead 302 and thence by branch lead 302/1 to the input to a tapped magnetostrictive delay line 303. A ½ micro-second pulse fed to the input of delay line 303 re-appears 50 micro-seconds later on tapping lead 215, and 100 micro-seconds after it was fed to the input of delay line 303 the pulse re-appears at the output of delay line 303 where it is fed to lead 304 and thereby to a third input to one-gate 299. It will further be seen from FIGURE 4 (and will be recollected from an earlier paragraph of this section of this specification), that lead 215 is connected to a negatory input of six-gate 213 in speech channel control sub-unit 192. A second branch lead 302/2 from lead 302 connects the output from gate 301 to one input to one-gate 305, whose output is connected by lead 306 to terminal 292; and this branch lead 302/2 is also connected by lead 307, and branch lead 307/1, to lead 229 which (as mentioned above) is connected to speech channel control unit 192. Additionally, lead 307 is connected by a second branch lead 307/2 to release control sub-unit 196 in manner described below. Finally, another input to one-gate 305 is connected by branch lead 228/1 to lead 228 and thus to the output of one-gate 227 in speech control sub-unit 192.

It will be seen from the foregoing description that an output pulse from one-gate 301 is applied over leads 302, 302/2, 307, 307/1 and 229 as a negatory input to six-gate 213, four-gate 214 and four-gate 231 (these gates being in sub-unit 192). Accordingly, none of gates 213, 214 and 231 will pass to their outputs a pulse which synchronises with a pulse appearing at the output of one-gate 301 (i.e. synchronises with the time of appearance of a pulse at the input of delay line 303). Similarly, the re-appearance of a pulse on tapping lead 215 prevents the emission by six-gate 213 of a pulse which synchronises with the instant at which a pulse travelling in delay line 303 reaches the mid-point of that delay line—since lead 215 is connected to a negatory input to six-gate 213.

One-gate 301 has an inhibitory input to which voltage may be applied by lead 308 from release control sub-unit 196. Provided no inhibiting voltage is applied to one-gate 301, the emission of a ½ micro-second pulse by one-gate 299 and its resulting application by lead 300 to one-gate 301 will cause that gate to transmit the pulse by leads 302 and 302/1 to the input to delay line 303, whence, re-appearing after a delay of 100 microseconds at the output of said delay line the pulse will be applied via lead 304 to one-gate 299—thus leading to a circulation of ½ micro-second pulses at intervals of 100 micro-seconds through delay line 303 and gates 299 and 301 for so long as no voltage pulse which synchronises with a pulse on lead 300 is applied to the inhibiting input of gate 301.

Release control sub-unit 196 is provided with terminals 309, 310, 311, 312, 313. Terminal 309 is connected, as shown, by lead 314 to terminal Z of the pulse generator K/1 and by lead 315 to one input of a three-gate 316, another of whose inputs is connected to lead 307/2 mentioned above in connection with busy channel store sub-unit 195. The output of three-gate 316 is connected by lead 317 to one input of one-gate 318 whose output is connected by lead 319 to an input of one-gate 320 whose output is connected by lead 321 and branch lead 321/1 to the input of magnetostrictive delay line 322. A ½ micro-second pulse applied to the input of delay line 322 re-appears after a delay of 100 micro-seconds at the output of the said delay line and is thence applied by lead 323 to a second input to one-gate 318. Accordingly, delay line 322, gates 318 and 320, and their associated leads, again form a system capable of repeating ½ micro-second pulses at intervals of 100 micro-seconds; for the application of such a pulse on lead 317 to the input of one-gate 318 causes it to apply that pulse via lead 319 to one-gate 320, and (provided there is no inhibitory input applied to the latter gate in manner described below) one-gate 320 applies said pulse via leads 321 and 321/1 to the input of delay line 322, at whose output the said pulse re-appears after a delay of 100 micro-seconds and is applied via lead 323 to the input of one-gate 318, causing the latter to re-emit the pulse and repeat the cycle of pulsing. Branch lead 321/2 from lead 321 also applies the pulse output from one-gate 320 to one input of two-gate 324, whose other input is connected to lead 325 and thus to terminal 312 to which terminal X pulses are applied by lead 326 from pulse generator K/1. The output of two-gate 324 is connected by lead 327 to terminal 313.

Terminal 311 is connected by lead 328 to one input of one-gate 329, whose output is connected by lead 330 to an inhibitory input on one-gate 320. Terminal 311 is also connected by lead 331 to terminal Y on pulse generator K/1. Accordingly, when a Y pulse is emitted by pulse generator K/1, voltage is applied to one-gate 329; and when a Y pulse is being emitted by the pulse generator, the resulting voltage input to one-gate 329 causes it to apply voltage to the inhibitory input of one-gate 320: therefore, any pulse train circulating through delay line 322 and gates 318 and 320 will be stopped when a Y pulse is emitted.

A second input to one-gate 329 is supplied over lead 332 from the output of two-gate 333. One input of two-gate 333 is connected to lead 298/1, which is connected via lead 298, clipper 297 and lead 296 to terminal 291—and thence to the input speech highway of multiplex A as mentioned above. The other input of two-gate 333 is connected via lead 334 to lead 295/1 and thus to clipper 294, lead 293 and terminal 290—and thence to the output speech highway of multiplex A as mentioned above. Accordingly, if there is a pulse on the output highway of multiplex A which synchronises with a pulse on the input highway of multiplex A, clippers 294 and 297 each apply a synchronised pulse to two-gate 333, which accordingly gives an output on lead 332 to one-gate 329; and this gate 329 applies a pulse on lead 330 to the inhibitory input of one-gate 320. Accordingly, any pulse which would otherwise be emitted by one-gate 320 in synchronism with pulses both on the input and the output speech highways of multiplex A, will be suppressed and not allowed to continue to circulate in delay line 322 and its associated one-gates 318 and 320.

In addition to lead 334, mentioned in the preceding paragraph as connected to lead 295/1 from clipper 294 and the input speech highway of multiplex A, there is also a lead 335 connecting lead 295/1 with a negatory input on a one-gate 336. Output lead 337 from one gate 336 is connected to one of the inputs of three-gate 316; and a second input to one-gate 336 is connected by lead 338 to lead 268 and thus to an output from busy register channel store sub-unit 198. And finally it remains to be mentioned, as regards this sub-unit 196, that lead 295/1 from clipper 294 (and thus from the input highway of multiplex A) is connected by lead 339 to terminal 310.

Free register channel store sub-unit 197 is provided with terminals 340, 341, 342, 343, 344, 345, 346. Terminal 340 is connected by lead 347 to one input of two-gate 348 and by branch lead 347/1 to one input of two-gate 349. The output of two-gate 348 is connected by lead 350 to one input of one-gate 351, whose output is connected by lead 352 to the input of one-gate 353 and by branch lead 352/1 to busy register channel store sub-unit 198. The output of one-gate 353 is connected by lead 354 and branch lead 354/1 to the input of magnetostrictive delay line 355. A ½ micro-second pulse applied to the input of delay line 355 re-appears after a delay of 100 micro-seconds at the output of the said delay line and is thence applied by a lead 356 to a second input to one-gate 351. Accordingly, delay line 355, gates 351 and 353, and their associated leads, again form a system capable of repeating ½ micro-second pulses at intervals of 100 micro-seconds; for the application of such a pulse on lead 350 to the input of one-gate 351 causes it to apply that pulse via lead 352 to the input to one-gate 353 and (provided there is no inhibitory input applied to one-gate 353 in manner described below) one-gate 353 applies said pulse via leads 354 and 354/1 to the input of delay line 355, at whose output the said pulse re-appears after a delay of 100 micro-seconds and is applied via lead 356 to the input of one-gate 351, causing the latter to re-emit the pulse and repeat the cycle of pulsing.

Branch lead 354/2 from lead 354 causes pulses emitted by one-gate 353 also to be applied to one input of multivibrator 357, which is arranged to be energised by the lagging edge of a pulse on lead 354/2 and when so energised applies a voltage by lead 358 to two-gate 349. (The fact that it is the lagging edge of the pulse which is effective to energise multivibrator 357 is indicated by an "x" on lead 354/2 in FIGURE 4.) The output of two-gate 349 is applied by lead 359 to one input of one-gate 360 which has a second input connected to lead 239 from speech channel control sub-unit 192. The output of one-gate 360 is connected by lead 361 to an inhibitory input of one-gate 353: accordingly, any pulse circulating in delay line 355 and gates 351 and 353 will, if it is applied to one-gate 353 at the instant when one-gate 360 is giving an output, be suppressed from further circulation.

The second input to multivibrator 357 is applied by lead 362 from the output of two-gate 363, which has one input supplied over lead 364 from terminal 346 which is connected by lead 365 to terminal D0 on pulse generator K/1. A second input to two-gate 363 is connected by lead 366 to terminal 345 which is connected by lead 367 to terminal C0 of pulse generator K/1. When an output voltage from two-gate 363 is applied via lead 362 to multivibrator 357, this multivibrator is energised to apply a voltage by lead 368 and branch lead 368/1 to the second input to two-gate 348. It will thus be noted that, as further described below, when a C0 pulse and a D0 pulse are emitted simultaneously, by pulse generator K/1, both inputs to two-gate 363 are energised, the said two-gate applies a pulse (lasting for 233 micro-seconds, that being the duration of the C0 pulse though the D0 pulse endures longer) to multivibrator 357 which emits an output over leads 368 and 368/1 to two-gate 348, thus "preparing" two-gate 348 to emit any pulse received on lead 347 while said output from multivibrator 357 endures. The output voltage from multivibrator 357 is also applied, via lead 368 and a branch lead 368/2, to one input of four-gate 369. A second input to four-gate 369 is supplied by branch lead 370/1 from lead 370 from terminal 343 which is connected by branch lead 371/1 and lead 371 to terminal Q of pulse generator K/1: a third input to four-gate 369 is connected by lead 372 to terminal 342 and thence by branch lead 200/2 and lead 200 to clock pulse generator unit CPU/1; and the fourth input to four-gate 369 is connected by branch lead 373/1 and lead 373 to lead 229—this said fourth input to four-gate 369 being a negatory input. (It will also be noted that lead 373 is connected by branch lead 373/2 to one input of one-gate 360.) The output of four-gate 369 is connected by lead 374 to terminal 341. (It may also be convenient, having just mentioned lead 371 from terminal Q of pulse generator K/1, to mention at this point that lead 371 is connected to branch lead 371/2, which in turn is connected by branch lead 371/3 to terminal 205 and by branch lead 371/4 to terminal 211, terminals 205 and 211 being, as will be remembered, in speech channel control sub-unit 192. Q pulses are applied by these leads, respectively to six-gate 213 and to four-gate 214.)

It will be seen that, as a result of the connections described in the preceding paragraph, at the instant when a pulse (circulating in delay line 303 and gates 299 and 301 in busy channel store sub-unit 195) is being emitted by gate 301, so that a voltage is thereby applied to leads 302, 302/2, 307, 307/1 and 229, that voltage from lead 229 is applied via leads 373 and 373/1 as a negatory input to four-gate 369 (thus preventing four-gate 369 from emitting a pulse in synchronism with the pulse emitted by gate 301 in the busy channel store sub-unit), and is also applied from lead 229 via leads 373 and 373/2 to one-gate 360, causing one-gate 360 to emit a pulse on lead 361 which is applied to the inhibiting input of one-gate 353 (thus suppressing from circulation in delay line 355 and gates 351 and 353 any pulse whose emission from gate 353 would synchronise with the emission of the pulse by gate 301 in the busy channel store sub-unit). Thus it will be apparent that the presence of a pulse in busy channel store sub-unit 195, will prevent the circulation (in the delay line 355 and gates 351 and 353) in the free register channel store sub-unit 197 of a pulse which is in synchronism (in manner just described) with said pulse in said busy channel store sub-unit.

In addition to the branch leads so far mentioned as connected to lead 354 from one-gate 353, there is a further branch lead 354/3 which is connected to one input of two-gate 375, the second input to this two-gate being connected to branch lead 370/2 and thus to lead 370 and thence to terminal Q on pulse generator K/1. The output of two-gate 375 is connected by lead 376 to terminal 344, and by branch lead 376/1 to one input of one-gate 305 in busy channel store sub-unit 195.

Busy register channel store sub-unit 198 is provided with terminals 377, 378, 379, 380, 381, 382. Terminal 377 is connected by lead 383 to one input to two-gate 384 whose output is connected by lead 385 to terminal 379. Terminal 378 is connected by lead 386 to the output of two-gate 387 one of whose inputs is connected by lead 388 to terminal 380. This sub-unit 195 also contains a two-gate 389 one of whose inputs is connected by lead 390 with lead 229 and thus (in manner described above) with the output of one-gate 301 in busy channel store sub-unit 195, and the other of whose inputs is connected with branch lead 352/1 from one-gate 351 in free register channel store sub-unit 197. The output of two-gate 389 is connected by lead 391 to one input of one-gate 392 whose output is connected by lead 393 to one-gate 394 and is also connected by branch lead 393/1 to the second input of two-gate 387 and by branch lead 393/2 to the second input of two-gate 384. It will be seen from FIGURE 4 that lead 268 (which is connected to an input of one-gate 336 in release control sub-unit 196, and is also connected to two-gates 249 and 265 in register channel temporary store sub-unit 193) is connected to lead 393 and thus to the output of one-gate 392. It will also be seen from this figure that lead 268 is connected by branch lead 268/1 to two-gate 395 (in busy register channel store sub-unit 198 now being described), that the second input to two-gate 395 is connected by lead 396 to terminal 381, and that the output of two-gate 395 is connected by lead 397 to terminal 382.

The output of one-gate 394 is connected by lead 398 to the input of magnetostrictive delay line 399 which is so designed that a ½ micro-second pulse applied to its input will re-appear at its output after a delay of 100 micro-seconds, being thence applied by lead 400 to an input of one-gate 392. Delay line 399 and gates 392 and 394 once again form, with their associated leads, a system capable of repeating ½ micro-second pulses at intervals of 100 micro-seconds; for the application of such a pulse by lead 391 to one-gate 392 will cause said one-gate to emit the pulse on lead 393 to one-gate 394 by which (in the absence of an inhibiting input to one-gate 394 as referred to below) said pulse is applied to the input of delay line 399 and re-applied (after a delay of 100 micro-seconds) by the delay line via lead 400 to an input of one-gate 392, when it is re-emitted by the latter to repeat the cycle of pulsing. One-gate 394 is, however, provided with an inhibiting input connected to lead 401 which is connected to the output of one-gate 402 one of whose inputs is connected by branch lead 396/1 to lead 396 and thus to terminal 381, while a second input to one-gate 402 is connected by lead 403 to lead 327 from two-gate 324 in release control sub-unit 196. Lead 403 continues (as will be seen from FIGURE 4) beyond its point of junction with lead 327 to connect with one input of one-gate 264 in register channel temporary store sub-unit 193; and lead 403 is also connected by lead 308 with the inhibitory input to one-gate 301 in busy channel store sub-unit 195.

It will be seen from the foregoing that at any instant when a pulse is being emitted by two-gate 324 in release control sub-unit 196, the resulting voltage applied to lead 327 and thus to lead 403 has the following effects:

(a) An inhibitory voltage is applied to the inhibitory input of one-gate 394, thus preventing the transmission by said gate to delay line 399 of any pulse applied to gate 394 simultaneously with the emission of the aforesaid pulse by two-gate 324, i.e. simultaneously with the emission of a pulse by one-gate 320 (in sub-unit 196) if at that time an X pulse is being emitted by pulse generator K/1, (b) An inhibitory voltage is applied to the inhibitory input of one-gate 301 in busy channel store sub-unit 195, the said inhibitory voltage again being simultaneous with the emission of a pulse by one-gate 320 at a time when an X pulse is being emitted, and (c) An inhibitory voltage is applied (via one-gate 264 and lead 263) to one-gate 254 in register channel temporary store sub-unit 193; this last-mentioned inhibitory voltage also being simultaneous with the emission of a pulse by one-gate 320 at a time when an X pulse is being emitted.

OPERATION OF FREE REGISTER CHANNEL STORE SUB-UNIT

It was remarked in the opening paragraph of this description, that a train of free register channel pulses "stored" in section control unit A/2 can be "suppressed" and a new train of free register channel pulses then needs to be supplied to replace the suppressed train. These operations will now be described and explained in detail, it being assumed that a stored free register channel pulse train has been so suppressed and that, accordingly, no such train is so stored at the instant when the description of the operation begins.

Now a train of free register channel pulses is "stored" in section control unit A/2 by the repeated circulation of these pulses (which last for ½ micro-second and are repeated at intervals of 100 micro-seconds) through delay line 355 and one-gates 351 and 353 in manner set out above in the description of free register channel store sub-unit 197. Accordingly, at the instant at which the description now being given begins, no pulse is in process of circulation in delay line 355 and gates 351 and 353. It has already been mentioned that terminals 345 and 346 of sub-unit 197 are respectively connected to terminals C0 and D0 of pulse generator K/1. Accordingly, as soon as pulse generator K/1 emits a C0 and a D0 pulse which overlap in time, there will be a voltage input to both terminal 345 and terminal 346. (It will be remembered, from the description of pulse generator K/1, that pulse C0 lasts for 233 micro-seconds and pulse D0 for 466 micro-seconds, so that when an overlap in time occurs, that overlap will endure for 233 micro-seconds.) When the said overlap occurs, there being then a voltage applied to both inputs of two-gate 363, two-gate 363 applies a voltage input over lead 362 to multivibrator 357, causing it to give an output on leads 368 and 368/1 to one input of two-gate 348, and on lead 368/2 to one input of four-gate 369.

It has also been explained in the description of the operation of pulse generator K/1, that during a part of the second half of each period of 233 micro-seconds, a Q pulse is emitted. Accordingly, a Q pulse will be emitted during the 233 micro-second period of overlap of the C0 and D0 pulses, and since terminal Q is connected to terminal 343, the voltage of the Q pulse is applied via leads 370 and 370/1 to one input of four-gate 369 at some time during the period of overlap of the C0 and D0 pulses. In addition, whilst the overlap of C0 and D0 pulses occurs and whilst the Q pulse is being applied to four-gate 369, a series of clock pulses (each lasting ½ micro-second and repeated at intervals of 1 micro-second) are applied from clock pulse generator unit CPU/1 over leads 200 and 200/2 to terminal 342 and thus via lead 372 to another input of four-gate 369. At some of the instants when clock pulses are being applied to four-gate 369, negatory pulses may also be applied to that four-gate from busy channel store sub-unit 195; but assuming that multiplex A is not so busy that busy channel store sub-unit 195 is emitting a pulse every micro-second, some at least of the said clock pulses will be applied to four-gate 369 at instants when there is no negatory input to the said four-gate. At such instants, in the conditions described in the preceding sentences of this paragraph, four-gate 369 will emit a ½ micro-second pulse (each such pulse being synchronous with a clock pulse) on lead 374 to terminal 341. To prevent misunderstanding, it may however be remarked that the conditions just assumed (which make it possible for four-gate 369 to emit ½ micro-second pulses during the application of a Q pulse) will not generally endure for the whole of the Q pulse: the said conditions will generally be changed, before the end of the Q pulse, by the appearance of a pulse on lead 354/2 which will alter the condition of multivibrator 357. The operations which lead to the appearance of a pulse on lead 354/2 are explained in the next three paragraphs.

Terminal 341 is connected by a lead 404 to register control and channel pulse store unit K/7. As described later in connection with that unit, each pulse so transmitted from terminal 341 to unit K/7, is there applied to a five-gate, which is so constructed as not to give an output if the pulse received by it synchronises with any ½ microsecond pulse already occurring in unit K/7; but again assuming that the exchange is not overloaded with calls, one of the pulses emitted from terminal 341 will be reemitted by the five-gate in unit K/7 and will then be transmitted over a lead 405 from unit K/7 to terminal 340 of free register channel store sub-unit 197.

It will thus have been seen that of the clock pulses fed to free register channel store sub-unit 197, only those which are not synchronous with any pulse circulating in delay line 303 in busy channel store sub-unit 195, have been transmitted to channel pulse store unit K/7; and of the pulses so transmitted to unit K/7, the latter repeats back to sub-unit 197 the first of the said pulses which is not in use in unit K/7. Accordingly, this pulse (not so far in use in sub-unit 197 or in unit K/7) is a free register channel pulse. When this free register channel pulse is received, as mentioned above, at terminal 340, it is transmitted by lead 347 to two-gate 348; and since the above-described operation of transmitting clock pulses to register control unit K/7, and retransmission of the selected free register channel pulse back to sub-unit 197, takes less time (in general) than 233 micro-seconds, the overlap of the C0 and D0 pulses will still be continuing, so that two-gate 348 will still be receiving a voltage input from lead 368/1 at the time when it receives the free register channel pulse on lead 347. Accordingly, two-gate 348 transmits the free register channel pulse on lead 350 to one-gate 351, which in turn transmits the said pulse by lead 352 to one-gate 353 and by lead 352/1 to two-gate 389.

Assuming that, at the moment when the free register channel pulse is emitted by one-gate 351, there is no inhibitory input to one-gate 353, the free register channel pulse will now be repeated at intervals of 100 microseconds by delay line 355 and gates 351 and 353 in the manner already described above, thus storing a free register channel pulse train in free register channel store sub-unit 197. The circumstances in which the said pulse train may be suppressed in the said sub-unit, or transferred to storage in busy register channel store sub-unit 198, will be described later. It merely needs to be remarked that circulation of the said train is not dependent upon a continuing output from two-gate 348, so that circulation of the said train does not stop when the C0 pulse ends, and that the next pulse emitted by gate 353 and applied by lead 354/2 to multivibrator 357, will cause the latter to cease to give an output on lead 368 and instead to give an output on lead 358 to two-gate 349.

Two things may, however, also be noted at this point. Firstly, the cessation of an output on lead 368 also removes the input voltage on lead 368/2 to four-gate 369, which accordingly ceases to transmit clock pulses to terminal 341 and thence to register control unit K/7. Secondly, had there already been a pulse circulating in free register channel store sub-unit 197, it would still remain true that the simultaneous application of the C0 and D0 pulses would have caused multivibrator 357 to give an output on lead 368 and thus apply voltage to one of the inputs of four-gate 369; but the pulse already circulating in delay line 355 and gates 351 and 353 would have reappeared at gate 353 in not more than 100 microseconds after the start of the C0 pulse, that is to say, before the beginning of the Q pulse. Accordingly, the output from gate 353 would (if there had been a pulse stored in the free register channel store) have supplied an input on leads 354 and 354/2 to multivibrator 357, thus removing the output via leads 368 and 368/2 to the input of four-gate 369, before the beginning of the Q pulse, which pulse would then have been unable to initiate (when applied to four-gate 369) the emission of clock pulses from four-gate 369 to terminal 341 and thence to channel pulse store unit K/7. Since it is this emission of clock pulses from terminal 341 that constitutes a "demand" to unit K/7 for the allocation of a free register channel pulse, it will thus be seen that while free register channel store sub-unit 197 has a free register channel pulse train stored in it, the said sub-unit does not (on receiving C0 and D0 pulses simultaneously) demand the allocation of a further free register channel pulse.

It will have been noted in connection with the foregoing description, that section control unit A/2 is permitted to demand a free register channel pulse (if no such pulse is already stored in it) during the period when a C0 and a D0 pulse are applied to free register channel store sub-unit 197. It should at this point be explained that in section control unit B/2 for the next multiplex, instead of its terminals corresponding to terminals 345 and 346 being connected to terminals C0 and D0 on pulse generator K/1, the said corresponding terminals are connected to terminals C0 and D1 of pulse generator K/1. Similarly, the section control unit for the third multiplex, would have its corresponding terminals in its free register channel store sub-unit connected to terminals C0 and D2—and so on for the section control unit of the next multiplex, each having its free register channel store sub-unit connected to a pair of C and D terminals (on pulse generator K/1) different from the pair used for any other multiplex. It will thus be seen, in conjunction with the explanation already given of the nature of the C and D pulses, that each section control unit is energised in turn (i.e. when its own combination of C and D pulses is applied to it) to demand a free register channel pulse from register control unit K/7 if such section control unit needs a new free register channel pulse.

It has thus been explained how section control unit A/2 acquires and stores a free register channel pulse train, and it has been explained that each other section control unit (for each of the other multiplexes, B/2 for example) may similarly demand, acquire, and store, a free register channel pulse train—each of these section control units being identical in internal arrangement but differing only in that the pairs of terminals 345 and 346, and the corresponding pairs of terminals of other section control units, are respectively connected to a pair of C and D terminals (on pulse generator K/1) which are peculiar to the individual section control unit. Now it may well happen that, at some time, one of the multiplexes is much busier handling calls from subscribers than are others of the muliplexes. In that event, many pulse trains will be in use in the multiplex which is busy; and it has been remarked above that four-gate 369 can only "demand" a free register channel pulse at instants when there is no negatory input on lead 373/1— that is to say, at instants when no pulse is occurring which belongs to a train forming one of the channels in use in multiplex A for communication. If multiplex A is very busy, such instants will be relatively infrequent, and it is therefore convenient to arrange that when such an instant occurs it shall be possible to "steal" the appropriate pulse notwithstanding that that pulse is simultaneously occurring, as a free register channel pulse, in the free register channel store of some other section control unit. If the pulse is so "stolen," it must be suppressed in the free register channel store from which it had been "stolen"—that store being then permitted to demand another free register channel pulse when next energised by receiving its characteristic combination of C and D pulses. There may therefore be some considerable interchange of free register channel pulses between different section control units at busy times; but, owing to the smallness of the time needed for the pulse generator to go through a complete cycle of C and D pulses, the allocation of free register pulses among the different section control units may generally be expected to settle down quite quickly.

To describe how this "stealing" operation is performed, it is convenient slightly to modify the condition of affairs envisaged in the preceding paragraph, and to suppose that multiplex B is the multiplex whose section control unit B/2 is demanding a free register pulse, and that the free register pulse allotted to it is synchronous with one of the pulses of a free register channel pulse train already stored in sub-unit 197 of section control unit A/2. Now, at the instant when register control and channel pulse store unit K/7 emits a free register channel pulse to section control unit B/2, it will emit the same pulse to all other section control units—and in particular, to section control unit A/2 where, of course, the pulse is applied to terminal 340. Now it will be noted that the pulse in question (referred to in this paragraph as the "demanded pulse") is one emitted during a period when (since B/2 is demanding a free register channel pulse) a C0 and a D1 pulse are being emitted and when, therefore a C0 and a D0 pulse are not being applied to terminals 345 and 346 (respectively) of sub-unit 197 of control unit A/2. Accordingly, (assuming that a free register pulse train is already stored in sub-unit 197) the pulses of that train will have been applied by lead 354/2 to multivibrator 357 which will (in the absence of the C0 and D0 pulses) be giving an output on lead 358 to one input of two-gate 349. Therefore, when the demanded pulse is applied to terminal 340 and thence applied by leads 347 and 347/1 to the other input of two-gate 349, the latter two-gate gives an output on lead 359 to one-gate 360, which accordingly gives an output on lead 361 to the negatory input of one-gate 353. If the pulse circulating in delay line 355 and gates 351 and 353 does not synchronise (at gate 353) with the demanded pulse, the application of the negatory input to gate 353 has no effect, since that input will have ceased before gate 353 received its next pulse from delay line 355 and gate 351; but if the demanded pulse does synchronise (at gate 353) with the pulse previously circulating in delay line 355 and gates 351 and 353, then the said previously-circulating pulse will be suppressed, thus removing the train of free register channel pulses from free register channel store 197. The demanded pulse will of course have been fed at the same time to section control unit B/2, and will have been accepted by (and will be stored in) the free register channel store of the latter control unit, where it will circulate until removed from the latter. Section control unit A/2, having thus had its free register channel pulse "stolen" from its free register channel store will, of course, demand a new free register channel pulse when it next receives C0 and D0 pulses on terminals 345 and 346, respectively.

*Register Control and Channel Pulse Store Unit*

It has been explained in the description of the operation of the free register channel store sub-unit 197 of section control unit A/2, that when a free register channel pulse is needed by that sub-unit, it in effect demands one by sending out a pulse over lead 404 (in FIGURE 4) to register control and channel pulse store unit K/7, and it receives the allotted pulse on lead 405 from the said unit K/7. Unit K/7 will now be described with reference to the diagram shown in FIGURE 5.

Figure 5:
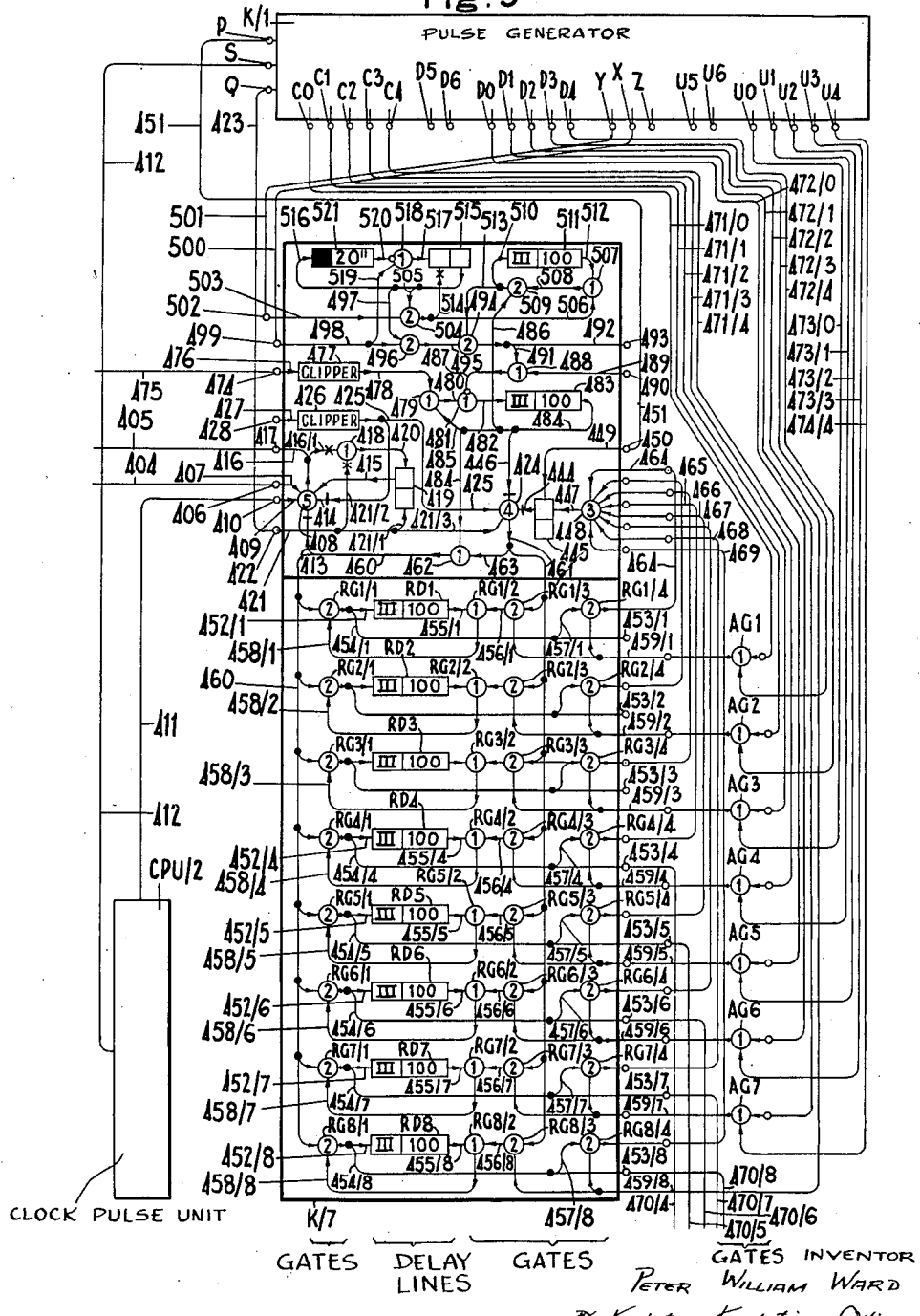

It will be seen from FIGURE 5 that lead 404 (at the left-hand side of the figure) is connected to terminal 406 and thence by lead 407 to one of the inputs of five-gate 408. A second input to five-gate 408 is connected by lead 409 to terminal 410 which is in turn connected by lead 411 to a clock pulse generator unit CPU/2. Clock pulse unit CPU/2 is fed with wave S by lead 412 which is connected to terminal S on pulse generator K/1, the said pulse generator being again represented in outline in this figure; and CPU/2 accordingly applies clock pulses of the kind shown in FIGURE 3(b) to the second of the inputs of five-gate 408. The third and fourth inputs of five-gate 408 are connected to leads 413 and 414, these being negatory inputs (that is to say, five-gate 408 can only give an output if there is no voltage applied either to lead 413 or lead 414), while the fifth input to five-gate 408 is connected to lead 415. The output of five-gate 408 is connected by lead 416 to terminal 417 to which is connected lead 405 leading to terminal 340 in free register channel store sub-unit 197 in section control unit A/2. Terminal 417 is also connected by lead 442 (not shown in FIGURE 5 but shown in FIGURE 6 described below) with the corresponding terminal 340 in the free register channel store sub-unit in section control unit B/2, and is similarly connected (by leads not shown in FIGURE 5 or FIGURE 6) to the free register channel store sub-unit in the section control unit of every other subscriber multiplex. Lead 416 is connected by branch lead 416/1 to an input of one-gate 418, this gate being so arranged (as indicated by the "x" on lead 416/1 adjacent to the point at which the said lead is connected to gate 418) that it is the lagging edge of the pulse on lead 416/1 which will cause gate 418 to give an output. (One-gate 418 also has a second input, mentioned below, and is so arranged that this one-gate gives an output at the lagging edge of a Q pulse on this second input, the fact of operation at the lagging edge of the Q pulse being indicated in FIGURE 5 by the "x" on the appropriate lead—viz. lead 421/2 mentioned below.)

Lead 415 (which, as mentioned above, is connected to the fifth input of five-gate 408) is connected to the output of a multivibrator 419, one of whose inputs is connected in by lead 420 to the output of one-gate 418. A second input to multivibrator 419 is provided by branch lead 321/1 from lead 421 which is connected to terminal 422 and thence by lead 423 to terminal Q in pulse generator K/1. Multivibrator 419 is so arranged that when a Q pulse is applied, the resulting voltage applied over leads 423, 421 and 421/1 to multivibrator 419 causes it to give an output on lead 415 which is accordingly applied to the corresponding input of five-gate 408; and the said voltage on lead 421 is at the same time applied by lead 421/2 to the second input (mentioned above) of one-gate 418. A further branch lead 421/3 from the lead 421 applies a voltage (during the existence of a Q pulse) to one input of four-gate 424.

The foregoing circuits having been described, it is now possible to complete the description of how a free register channel pulse is allotted to a free register channel store sub-unit 197 in a section control unit when such a pulse is demanded by a section control unit. It has been explained that when a section control unit is demanding such a pulse, it does so by sending out pulses on lead 404 which are applied via terminal 406 and lead 407 to five-gate 408. When the period of a Q pulse starts, voltage is applied by lead 421/1 to multivibrator 419 which then gives an output on lead 415 which is applied to another input of five-gate 408; and provided that the registers are not so busy that a negatory input occurs on lead 413 and/or lead 414 in synchronism with every pulse on lead 407, five-gate 408 will emit a pulse on the first occasion when there is a pulse on lead 404 synchronising neither with a pulse on lead 413 nor with a pulse on lead 414. The ½ micro-second pulse so emitted by five-gate 408 is transmitted by lead 416 to terminal 417 and thus to lead 405; and the lagging edge of this ½ micro-second pulse, applied by lead 416/1 to one-gate 418, causes the latter one-gate to emit a pulse on lead 420 which, applied thereby to multivibrator 419, causes multivibrator 419 to cease to give an output on lead 415 and thus prevents five-gate 418 from omitting a second pulse in response to the demand on lead 404. If, however, no pulse applied by lead 404, terminal 406 and lead 407 to five-gate 408 during the period of the said Q pulse is re-emitted by five-gate 408 during the said period, then the lagging edge of the said Q pulse (appearing on lead 421/2) will cause one-gate 418 to emit a pulse on lead 420 and thus reset multivibrator 419 (so that it ceases to give an output on lead 415 to five-gate 408) at the end of the said Q pulse.

A second input to four-gate 424 is connected by lead 425 to the output of a clipper 426 whose input is connected by lead 427 to terminal 428; and it will be seen from FIGURE 5 that lead 414 (connected to one of the negatory inputs of five-gate 408) is also connected to lead 425.

Figure 6:
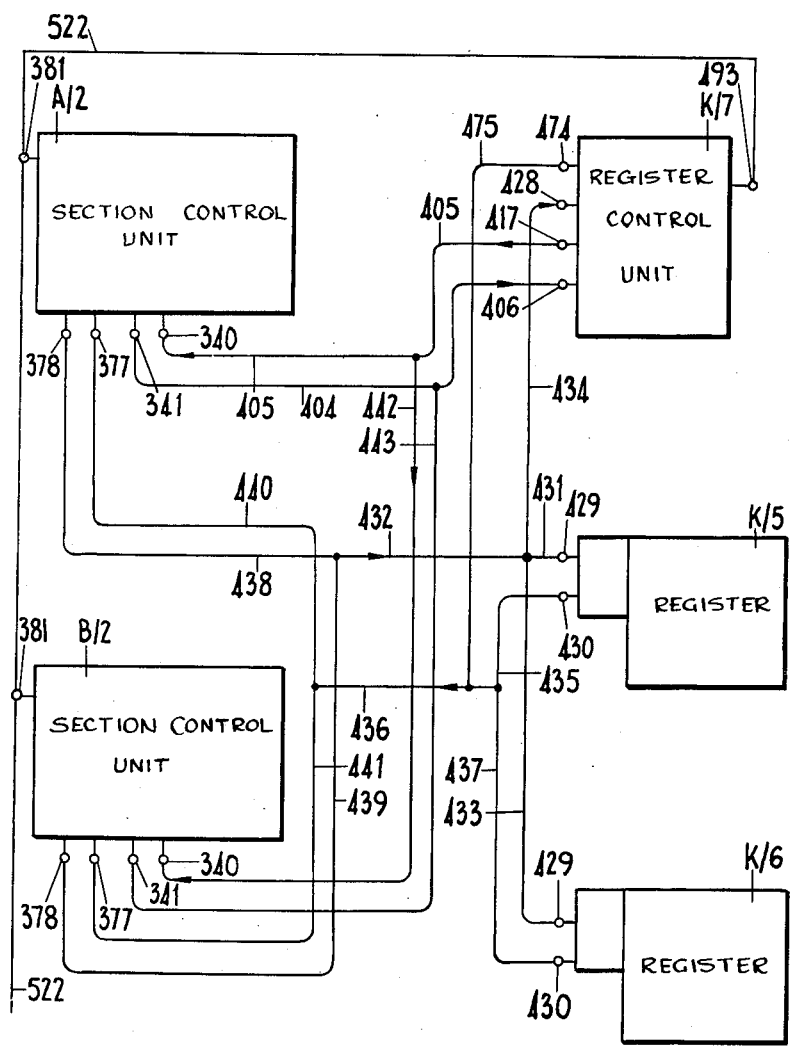

Now the registers (such as K/5 and K/6) are all connected to a pair of main register cables (hereinafter generally referred to as the "register highways") of which the ends remote from the registers are connected with the busy register channel store sub-unit in the section control unit of each multiplex. This system of interconnection is shown in FIGURE 6, in which are represented the two typical section control units A/2 and B/2, the two typical registers K/5 and K/6, and register control unit K/7. As will be seen from FIGURE 6, each of the registers K/5, K/6, is provided with an "input" terminal 429 and an "output" terminal 430. Terminal 429 of register K/5 is connected by lead 431 to output register highway 432, and terminal 429 of register K/6 is similarly connected to output register highway 432 by lead 433. Every other register has a corresponding "input" terminal similarly connected to register highway 432; and it will be seen also that register highway 432 is connected by lead 434 to terminal 428 of register control unit K/7. In like manner "output" terminal 430 of register K/5 is connected by lead 435 to input register highway 436, and terminal 430 of register K/6 is likewise connected by lead 437 to input register highway 436. Every other register has its corresponding "output" terminal similarly connected to register highway 436. The end of output highway 432 remote from the registers is connected by lead 438 to terminal 378 of busy register channel store sub-unit 198 in section control unit A/2 and by lead 439 to the corresponding terminal 378 in section control unit B/2. Every other section control unit has its terminal 378 likewise connected to output register highway 432. Similarly, the end of input register highway 436 remote from the registers is connected by lead 440 to terminal 377 of busy register channel store sub-unit 198 in section control unit A/2 and by lead 441 to the corresponding terminal 377 in section control unit B/2. Every other section control unit has its terminal 377 likewise connected to input register highway 436. It may also here be remarked that FIGURE 6 shows lead 404 which connects terminal 341 in free register channel store sub-unit 197 of section control unit A/2 to terminal 406 of register control unit K/7, and further shows lead 405 which connects terminal 417 of register control unit K/7 to terminal 340 in free register channel store sub-unit 197. FIGURE 6 also shows lead 442 referred to above as interconnecting terminal 340 of section control unit B/2 with terminal 417 of register control unit K/7, this interconnection being shown in FIGURE 6 as being produced by connecting lead 442 to lead 405; and FIGURE 6 likewise shows terminal 341 of section control unit B/2 as interconnected with terminal 406 of register control unit K/7 by means of lead 443 (which interconnection is shown as being produced by connecting lead 443 to lead 404). Every other section control unit likewise has its terminal 340 of its free register channel store sub-unit connected to terminal 417 of register control unit K/7; and, similarly, every other section control unit has its terminal 341 of its free register channel store sub-unit connected to terminal 406 of register control unit K/7.

It will now be appreciated from the foregoing description that every pulse emitted by terminal 378 of the busy register channel store sub-unit of every section control unit is fed to output register highway 432, and thence fed by lead 434 to terminal 428 of register control unit K/7. It should also now be explained that (as will be further explained below) each terminal 378 only emits pulses if the section control unit to which it is connected is in process of setting up a connection at the demand of a subscriber; and when pulses are being emitted by a terminal 378, those pulses will be pulses forming the train for the time being in use for setting up the interconnection. Accordingly, there are applied to terminal 428 all the pulses of all the trains that are at any time both (a) in use, for the setting up of connections between subscribers connected to the exchange and (b) appearing on highway 432—and all pulses so in use will appear on highway 432 except at times at which the trains to which they belong are respectively interrupted by dialling impulses. Reverting, therefore, to FIGURE 5, it will have been understood that all pulses of all trains for the time being in use in setting up interconnections between subscribers are (except at such times as any of such trains may be interrupted by dialling impulses) applied to terminal 428 and thence by lead 427 to clipper 426, from which clipper the said pulses are applied by lead 414 to the negatory input of five-gate 408 and by lead 425 to one input of four-gate 424. The purpose of the inclusion of clipper 426 is to ensure that the pulses fed from terminal 428 to gates 408 and 424 are of regular shape despite any extraneous modulations (for example, modulations due to noises picked up by a calling subscriber's microphone) which may be imposed on those pulses. It will be appreciated, too, that since the input on lead 414 to five-gate 408 is a negatory input, five-gate 408 will not emit any pulse which synchronises with any pulse which is being applied to register highway 432, i.e. will not emit a pulse which synchronises with any pulses constituting trains already in use by any register. As will appear later in this description, when a calling subscriber initiates a call, appropriately timed pulses are emitted by terminal 378 on that subscriber's section control unit A/2 and thus (see FIGURE 6) applied to terminal 428 whence they are applied to four-gate 424 and cause pulses to appear in a group of delay lines yet to be described. This in turn causes pulses to appear on lead 413 to the other negatory input to five-gate 408; and the pulses on lead 413 are not interrupted when dialling impulses are being transmitted. The combined effect produced by the pulses on lead 413 and those on lead 414 is therefore that five-gate 408 cannot emit a pulse synchronising with any pulse which belongs to a register pulse train which has been allocated to another subscriber but not yet appearing also in an allotted register (it being the primary function of lead 414 to prevent such emission), nor can five-gate 408 emit a pulse synchronising with a pulse belonging to a register pulse train in use in connection with an allotted register (irrespective of whether the last-mentioned pulse train is interrupted by dialling impulses or not), it being the primary function of lead 413 to prevent the emission last mentioned.

It has already been stated that two of the inputs to four-gate 424 are connected, respectively, to lead 421/3 (to which Q pulses are applied) and to lead 425 as mentioned in the preceding paragraph. The third and fourth inputs of four-gate 424 are connected to lead 444 from multivibrator 445, and to lead 446 which is connected as described below to a delay line 483 in which circulate all pulses from time to time in course of being circulated repeatedly through any of delay lines RD1, RD2, RD3, RD4, RD5, RD6, RD7, RD8 described below. The input connected to lead 444, and that connected to lead 446, of four-gate 424, are both negatory inputs so that four-gate 424 will only give an output at times at which no voltage is being applied either to lead 444 or to lead 446. Multivibrator 445 is so arranged that it responds to the lagging edge of a ½ micro-second pulse applied to it by lead 447 from three-gate 448, operation by the lagging edge of a pulse being, as before, indicated by an "x" on lead 447; and when multivibrator 445 has so responded, it applies a voltage on lead 444 to the negatory input of four-gate 424. Multivibrator 445 has a second input connected to lead 449 which is connected to terminal 450 and thence by lead 451 to terminal P on pulse generator K/1. When a P pulse is emitted by pulse generator K/1, the leading edge of the P pulse applied over leads 451 and 449 to multivibrator 445 causes the latter to cease to apply voltage to lead 444, if multivibrator 445 was applying voltage to lead 444 immediately before the receipt of the P pulse: if multivibrator 445 was not applying voltage to lead 444 immediately before the receipt of the P pulse, the P pulse has no effect. It will accordingly be seen that if a pulse is received by multivibrator 445 from three-gate 448, the said multivibrator will apply a negatory input to four-gate 424 until the occurrence of the next P pulse when the negatory input to four-gate 424 will be removed: accordingly, four-gate 424 cannot give an output during any period elapsing between the emission of a pulse by three-gate 448 and the beginning of the next P pulse.

It will now be convenient to describe the arrangement of the delay line stores, and their associated equipment, which serve for the storage of the pulse trains used for effecting communication between the registers and the subscribers' equipment, and which are shown in the lower part of unit K/7. Delay line storage means of this nature is described in co-pending patent application No. 33,772/53.

The number of delay lines needed for any exchange of the kind now being described, will depend on the number of subscribers, the quality of service to be given, and the amount of business to be handled by the exchange since the calling rate on the exchange and the quality of service, together determine the number of registers needed. The number of registers needed for any assumed volume of business and quality of service may readily be estimated from experience by those skilled in the art. As will be explained shortly, three delay lines are associated with each register, and if $r$ be the number of registers, the number of delay lines $n$ which is needed, is such that $^nC_3$ (using $^nC_3$ in its usual mathematical meaning of the number of combinations of $n$ things taken three at a time) shall be not less than $r$. In the present example of a 10,000 line exchange, it will be assumed that fifty registers are used, this number of registers being large enough to give high quality service (i.e. a negligibly small proportion of calls will suffer an undue delay before registers become free to handle them) for any usual calling rate on an exchange having 10,000 lines. Accordingly, with 50 registers, $^nC_3$ must be not less than 50; and $n$ is therefore chosen to be 8, since $^7C_3$ is equal only to 35, while $^8C_3$ is equal to 56. (Obviously, $n$ would not in this instance be chosen larger than 8, since a larger $n$ would mean that more delay lines, and associated circuitry, were used than were necessary.) It is also assumed that the typical registers K/5 and K/6, shown in FIGURES 1 and 6, are the last two of the total of 50.

It will accordingly be seen from FIGURE 5 that there are eight magnetostrictive delay lines RD1, RD2, RD3, RD4, RD5, RD6, RD7, RD8, each of which is so designed that if a ½ micro-second pulse is applied to its input, that pulse will re-appear at its output after a delay of 100 micro-seconds.

With delay line RD1 there are associated the following gates:

Two-gate RG1/1 whose output is connected to the input of delay line RD1 by lead 452/1, lead 452/1 also being connected with terminal 453/1 by lead 454/1:

One-gate RG1/2, whose input is connected with the output of delay line RD1 by lead 455/1:

Two-gate RG1/3, whose output is connected to a second input of one-gate RG1/2 by lead 456/1:

Two-gate RG1/4, one of whose inputs is connected with lead 454/1 by lead 457/1.

In addition to the connecting leads mentioned above it will be seen from FIGURE 5 that the output of one-gate RG1/2 is connected by lead 458/1 to one input of two-gate RG1/1, while the two-gates RG1/3 and RG1/4 each have an input connected to a corresponding branch from lead 459/1 which is connected to the output of auxiliary one-gate AG1.

Owing to the similarity in the connections and mode of operation of these delay lines, it is not necessary to describe the connections of all of them in equal detail, since the similarity of the connections of, for example, delay lines RD2 and RD3 to the connections of delay line RD1 will immediately be obvious from FIGURE 5. Attention is merely drawn, for purposes of later reference, to two-gates RG2/1 and RG2/3 and one-gate AG2 and terminal 453/2 and lead 459/2 associated with delay line RD2, and to two-gates RG3/1 and RG3/3 and one-gate AG3 and terminal 453/3 and lead 459/3 associated with delay line RD3. Since, however, the mode of operation will be described in detail below with reference to delay lines RD4, RD5, RD6, RD7, RD8, the associated gates, leads and terminal will be tabulated in detail, as follows:

| Delay line | Associated gates | Associated leads | Associated terminal |
|---|---|---|---|
| RD4 | RG4/1, RG4/2, RG4/3, RG4/4; AG4 | 452/4, 454/4, 455/4, 456/4, 457/4, 458/4, 459/4 | 453/4 |
| RD5 | RG5/1, RG5/2, RG5/3, RG5/4; AG5 | 452/5, 454/5, 455/5, 456/5, 457/5, 458/5, 459/5 | 453/5 |
| RD6 | RG6/1, RG6/2, RG6/3, RG6/4; AG6 | 452/6, 454/6, 455/6, 456/6, 457/6, 458/6, 459/6 | 453/6 |
| RD7 | RG7/1, RG7/2, RG7/3, RG7/4; AG7 | 452/7, 454/7, 455/7, 456/7, 457/7, 458/7, 459/7 | 453/7 |
| RD8 | RG8/1, RG8/2, RG8/3, RG8/4 | 452/8, 454/8, 455/8, 456/8, 457/8, 458/8, 459/8 | 453/8 |

The anode of interconnection will be clear from FIGURE 5 in the light of the foregoing detailed description for the connections of delay line RD1, but attention is drawn to the fact that no auxiliary gate similar to AG1 is provided in association with delay line RD8, though auxiliary gates similar to AG1 (e.g. auxiliary gate AG3) are associated with the other delay lines. Accordingly, lead 459/8 (unlike the other leads in the set bearing a reference beginning "459/") is not connected to an auxiliary one-gate.

It will further be seen from FIGURE 5 that one input of each of two-gates RG1/1, RG2/1, RG3/1, RG4/1, RG5/1, RG6/1, RG7/1, RG8/1, is connected to lead 460, while one input of each of two-gates RG1/3, RG2/3, RG3/3, RG4/3, RG5/3, RG6/3, RG7/3, RG8/3 is connected to lead 461 and thus to the output of four-gate 424. Lead 460 is connected to the output of one-gate 462, one of whose inputs is connected to lead 463 which is in turn connected to lead 461 and thus to the output of four-gate 424. The output of the right-hand two-gate associated with delay line RD1 (viz. two-gate RG1/4) is connected by lead 464 to one input of three-gate 448. There is a similar connection from the output of the right-hand two-gate associated with each other delay line to an input of three-gate 448: thus, in particular, two-gate RG4/4 is connected by lead 465 to an input of three-gate 448, two-gate RG5/4 is connected by lead 466 to an input of gate 448, gate RG6/4 is connected by lead 467 to an input of gate 448, gate RG7/4 is connected by lead 468 to an input of gate 448, and two-gate RG8/4 is connected by lead 469 to an input of three-gate 448.

It has already been remarked that each of the 50 registers is associated with three of the delay lines—no one selection of three delay lines being connected to more than one register. The selection is, of course, at the discretion of the designer of the exchange; and a suitable selection for the present example is given in the following table:

| Register No. | Associated delay line Nos. | Register No. | Associated delay line Nos. | Register No. | Associated delay line Nos. |
|---|---|---|---|---|---|
| 1 | 1, 2, 3 | 18 | 1, 6, 7 | 35 | 2, 7, 8 |
| 2 | 1, 2, 4 | 19 | 1, 6, 8 | 36 | 3, 4, 6 |
| 3 | 1, 2, 5 | 20 | 1, 7, 8 | 37 | 3, 4, 7 |
| 4 | 1, 2, 6 | 21 | 2, 3, 4 | 38 | 3, 4, 8 |
| 5 | 1, 2, 7 | 22 | 2, 3, 5 | 39 | 3, 5, 6 |
| 6 | 1, 3, 4 | 23 | 2, 3, 6 | 40 | 3, 5, 7 |
| 7 | 1, 3, 5 | 24 | 2, 3, 7 | 41 | 3, 5, 8 |
| 8 | 1, 3, 6 | 25 | 2, 3, 8 | 42 | 3, 6, 7 |
| 9 | 1, 3, 7 | 26 | 2, 4, 5 | 43 | 3, 6, 8 |
| 10 | 1, 3, 8 | 27 | 2, 4, 6 | 44 | 3, 7, 8 |
| 11 | 1, 4, 5 | 28 | 2, 4, 7 | 45 | 4, 5, 6 |
| 12 | 1, 4, 6 | 29 | 2, 4, 8 | 46 | 4, 5, 7 |
| 13 | 1, 4, 7 | 30 | 2, 5, 6 | 47 | 4, 5, 8 |
| 14 | 1, 4, 8 | 31 | 2, 5, 7 | 48 | 4, 6, 7 |
| 15 | 1, 5, 6 | 32 | 2, 5, 8 | 49 | 4, 6, 8 |
| 16 | 1, 5, 7 | 33 | 2, 6, 7 | 50 | 5, 6, 7 |
| 17 | 1, 5, 8 | 34 | 2, 6, 8 | | |

Thus, register 49 (i.e. register K/5) is associated with delay lines RD4, RD6 and RD8, while register 50 (i.e. register K/6) is associated with delay lines RD5, RD6 and RD7. Details of the manner of interconnection with registers RD6 and RD7 are given later: it is sufficient to say at this stage that the manner of association with the delay lines, as regards register K/5 and K/6, is that (i) register K/5 is connected to lead 470/4 and thus to terminal 453/4, is connected to lead 470/6 and thus to terminal 453/6, and to lead 470/8 and thus to terminal 453/8, while (ii) register K/6 is connected to lead 470/5 and thus to terminal 453/5, is connected to lead 470/6 and thus to terminal 453/6, and is connected to lead 470/7 and thus to terminal 453/7. Accordingly, when two-gate RG4/1 gives a voltage output, that output is applied via leads 452/4, 454/4 and 470/4 to register K/5. When two-gate RG6/1 gives an output, that output is applied via leads 452/6, 454/6 and 470/6 both to register K/5 and to register K/6. When two-gate RG8/1 gives an output, that output is applied over the corresponding leads to register K/5; and when two-gates RG5/1 and RG7/1 each give an output, those outputs are applied over the respective leads to register K/6.

The auxiliary one-gates, AG1, AG2, AG3, AG4, AG5, AG6, AG7, each have two inputs which are respectively connected to terminals on pulse generator K/1 as follows:

AG1: by lead 471/0 to terminal C0, and
 by lead 472/3 to terminal D3;
AG2: by lead 471/1 to terminal C1, and
 by lead 472/4 to terminal D4;
AG3: by lead 471/2 to terminal C2, and
 by lead 473/0 to terminal U0;
AG4: by lead 471/3 to terminal C3, and
 by lead 473/1 to terminal U1;
AG5: by lead 471/4 to terminal C4, and
 by lead 473/2 to terminal U2;
AG6: by lead 472/0 to terminal D0, and
 by lead 473/3 to terminal U3;
AG7: by lead 472/1 to terminal D1, and
 by lead 473/4 to terminal U4.

Lead 459/8 is connected to lead 472/2, and thus to terminal D2, without the intermediation of a one-gate.

On the left-hand side of register control unit K/7, near the top of that unit in FIGURE 5, will be found a terminal bearing the reference 474 to which is connected lead 475. Lead 475 is, as shown in FIGURE 6, connected to input register highway 436, and accordingly every pulse appearing on highway 436 is applied by lead 475 to terminal 474—that is to say, every pulse of every pulse train in use at any time by the registers, is applied to terminal 474. Terminal 474 is connected by lead 476

61 to clipper 477, which removes any modulations (for example, dialling tone, as will appear later) from the pulses fed to it, and delivers to its output lead 478 pulses corresponding to those fed to said clipper but deprived of modulation. Output lead 478 is connected to one input of one-gate 479, whose output is connected by lead 480 to one input of one-gate 481, the output of which is conected by lead 482 to the input of a magneto-strictive delay line 483. Delay line 483 is so designed that a ½ microsecond pulse fed to its input re-appears at its output after a delay of 100 micro-seconds, and is fed to lead 484 which is connected to a second input of one-gate 462. Lead 446 (mentioned earlier) to one of the negatory inputs of four-gate 424, is connected to lead 434, as is lead 485 to a second input of one-gate 479. A further lead 486 (referred to again below) is also connected to lead 484. One-gate 481 has a second (inhibitory) input connected to lead 487, the purpose of which will be described later.

As stated above, every pulse in use by all the registers is fed to terminal 474 and thence by clipper 477 and lead 478 to one-gate 479. Each pulse so received by one-gate 479 is fed by its output to lead 480, one-gate 481, lead 482, and the input of delay line 483. Each such pulse re-appears at the output of delay line 483 after a delay of 100 micro-seconds and is fed to lead 484, and thence via lead 485 to the second input of one-gate 479. Each pulse so fed to one-gate 479 is then re-applied by the latter one-gate, in manner just described, to the input of delay line 483; and accordingly this said delay line, in conjunction with gates 479 and 481, and leads 482, 484 and 485, causes a continual repetition and re-circulation of such pulses, at 100 micro-second repetition intervals, for so long as there is no inhibitory input applied on one-gate 481. Delay line 483, and the associated circuit elements just mentioned, accordingly form a device which "records" or "stores" all pulses in use in all registers at any given time. It will be noted, too, that since lead 446 connects lead 484 with a negatory input on four-gate 424, the latter four-gate cannot emit a new pulse (applied to it by lead 425 from clipper 426) which synchronises with the instant at which a pulse (which had previously been stored in delay line 483) is being re-applied to delay line 483. On the other hand, through four-gate 424 cannot thus emit a new pulse to lead 463 and thus apply it to one input of one-gate 462, the pre-existing pulse which prohibited the emission of a new pulse, is applied to one-gate 462 by lead 484 at the same instant that the said pre-existing pulse is applied to the input of delay line 483. (The time of application of the said pre-existing pulse to one-gate 462 and the time of application of the said pulse to the input of delay line 483, can effectively be regarded as simultaneous, since the transmission of pulses through gates 479 and 481 and the associated leads is effectively instantaneous—that is to say, occupies a time which is short in comparison with ½ micro-second.)

As so far described, there is nothing (other than the shutting-down of the exchange) to prevent a pulse, once it has been fed to delay line 483, from being repeated indefinitely. It is for this reason that an inhibitory input is provided on one-gate 481 connected to lead 487, since it is necessary to stop the repetition of pulses belonging to a train which has served its purpose (i.e. has enabled a calling subscriber to be connected to a called subscriber), and also to stop the repetition of pulses in some other circumstances, for example if a subscriber dials three digits of a four digit number and then ceases to complete the dialling operation within a reasonable time. The circuit elements about to be described collaborate to serve these purposes.

Lead 487, which supplies the inhibitory input of one-gate 481, is connected to the output of one-gate 488, one of whose inputs is connected by lead 489 to terminal 490, and the other of whose inputs is connected by lead 491 to

62 lead 492. One end of lead 492 is connected to terminal 493 and the other end of lead 492 is connected to the output of two-gate 494. One input of two-gate 494 is connected by lead 495 to the output of two-gate 496, one of whose inputs is connected to lead 497 and the other to lead 498 which is connected to terminal 499 and thence by lead 500 to terminal X on pulse generator K/1. Terminal Y on pulse generator K/1 is connected by lead 501 to terminal 502 which is connected by lead 503 to one input of two-gate 504, the other of whose inputs is connected to lead 505. The output of two-gate 504 is connected to lead 506 which is connected to one input of one-gate 507. The ouput of one-gate 507 is connected by lead 508 to one input of two-gate 509, whose other input is connected to lead 486 (mentioned above as connected to lead 484, and thus to the output of delay line 483); and the output of two-gate 509 is connected by lead 510 to the input of magneto-strictive delay line 511. Delay line 511 is so designed that a pulse fed to its input by lead 510 will re-appear at the output of the said delay line after a delay of 100 micro-seconds, and is there fed to lead 512 which is connected to a second input to one-gate 507—whence it will be fed by lead 508 to two-gate 509 and (as will be understood from previous descriptions of the repeated circulation of pulses through delay lines) re-circulated through delay line 511 provided that, at the instant when the said pulse is fed to two-gate 509 by lead 508, a pulse is also fed to two-gate 509 via lead 486.

The output of two-gate 509 is also connected by lead 513 to the second input of two-gate 494 mentioned above.

Lead 506 from the output of two-gate 504 is connected by lead 514 to one input of multivibrator 515, this multivibrator being so designed that, on receipt of the lagging edge to a pulse fed to it on lead 514, it ceases to give an output on lead 516. On the other hand, the receipt by multivibrator 515 of a pulse on lead 517 from one-gate 518, causes the said multivibrator to give an ouput on lead 516. One input of one-gate 518 is connected to lead 519, which is connected to lead 498 and thus to terminal 499 and thence to terminal X on pulse generator K/1. The other input to one-gate 518 is connected to lead 520, this being an inhibitory input to which a voltage may be applied by slow release device 521. Slow release device 521 (described more fully later) is so designed that on receiving a pulse on its input (which is connected by lead 516 to multivibrator 515) it immediately gives an output on lead 520 to the inhibitory input of one-gate 518 and continues to give that output until 20 seconds have elapsed from the end of the input to the said slow release device 521. It will also be seen from FIGURE 5 that lead 497 (to two-gate 496) and lead 505 (to two-gate 504) are each connected to lead 516.

Particulars have been given above of the way in which a combination of three delay lines is associated with each register. It will now be described how pulse trains circulate between the delay lines and their associated registers. Let it be assumed that, at the instant when the present section of the description begins, register K/5 is not in use, and that ½ micro-second pulses (at 100 micro-second intervals) are being received from terminal 378 on section control unit A/2 over lead 438, highway 432 and lead 434 (see FIGURE 6), and are accordingly being applied to terminal 428. These ½ micro-second pulses have such a timing that the first of them synchronised with a pulse in the pulse train previously stored in free register channel store sub-unit 197 in section control unit A/2, which train was (as previously described) not previously in use in register control unit K/7: these pulses are now being emitted from terminal 378 because a subscriber connected to multiplex A is in process of initiating a call, and this has caused the pulse train in question to be transferred (in manner described later) from storage in free register channel store sub-unit 197 to busy register channel store sub-unit 198—this pulse train having thus now been allotted to the calling subscriber for the purpose of setting up the connections for his call. And since ½ micro-second pulses of the timing of those now being emitted by terminal 387 were selected as not synchronising with any pulses already in use in register control unit K/7, it follows that when the said pulses (having passed from terminal 378 over lead 438, highway 432, lead 434, terminal 428, lead 427, clipper 426, lead 425) are applied to four-gate 424, there will not be negatory pulses applied on leads 444 and 446 to four-gate 424 during the next Q pulse. Accordingly, when the next Q pulse occurs and is applied by leads 421 and 421/3 to four-gate 426, that four-gate will emit on leads 461 and 463 a pulse synchronising with the first of the ½ micro-second pulses applied on lead 425 to four-gate 426 after the beginning of the said Q pulse. Lead 461 applies the pulse emitted by four-gate 426, to one input of each of two-gates RG1/3, RG2/3, RG3/3, RG4/3, RG5/3, RG6/3, RG7/3, RG8/3. Lead 463 applies the same pulse, via one-gate 462 and lead 460, to one input of each of two-gates RG1/1, RG2/1, RG3/1, RG4/1, RG5/1, RG6/1, RG7/1, RG8/1.

Now it has already been explained (in the section of this specification headed "Operation of Free Register Channel Store Sub-Unit") how each section control unit is energised in turn by the emission of a corresponding pair of C and D pulses, to permit it to demand a free register channel pulse if it needs one. In very similar manner, the delay lines in unit K/7 are repeatedly "tested" by the application of C, D, or U pulses, to ascertain whethey they are in use. It has already been supposed that register K/5 is not in use, and accordingly delay lines RD4, RD6 and RD8, which are connected by leads 470/4, 470/6 and 470/8 to register K/5, will not each have a pulse circulating in it which synchronises with a pulse in both the other delay lines. It has also been mentioned that delay lines RD4, RD6, and RD8 have associated with them the auxiliary gates AG4, AG6 and AG8, to which are applied C, D and/or U pulses as shown in the following scheme:

Delay line RD4: Gate AG4: Pulses C3, U1.
Delay line RD6, Gate AG6: Pulses D0, U3.
Delay line RD8: Gate AG8: Pulse D2.

Accordingly, of these pulses, the three that can be applied simultaneously to these three delay lines, are pulses C3, U3, and D2; and when pulse generator K/1 next emits these pulses simultaneously, they are simultaneously applied to gates AG4, AG6, AG8, respectively, which respectively give outputs on leads 459/4, 459/6 and 459/8.

Firstly, it will be noted that when the voltages on leads 459/4, 459/6 and 459/8 are applied to two-gates RG4/4, RG6/4 and RG8/4 respectively, then, since it is assumed that delay lines RD4, RD6 and RD8 are not already carrying pulses which synchronises in all three lines (since pulses cannot synchronise in all three if, as assumed, register K/5 is not in use), at least one of the leads 457/4, 457/6 and 457/8, respectively associated with the said delay lines, will not receive a pulse while the C3 pulse endures: accordingly, one or more of two-gates RG4/4, RG6/4, RG8/4 will not give an output during the period of the C3 pulse, and there will therefore not be three simultaneous inputs to three-gate 448 during the said period. Accordingly, three-gate 448 does not, if register K/5 is not busy, emit a pulse during the period of the C3 pulse, and therefore does not cause multivibrator 445 (which had been re-set, by the leading edge of the P pulse during the first half of the C3 pulse, not to give an output on lead 444) to revert to giving a negatory voltage on lead 444 to the corresponding negatory input of four-gate 424. This is why, as stated above, there will not be a negatory input on lead 444 during the C3 pulse.) Secondly, it will be noted that when the voltages on lead 459/4, 459/6 and 459/8 are applied to two-gates RG4/3, RG6/3 and RG8/3, these two-gates are thereby made ready to emit an output as soon as each of them receives a voltage on its second input; and it will be seen that this voltage is applied as soon as four-gate 424 gives its next output and thus applies voltage to lead 461. This application of voltage to lead 461 occurs during the second half of the C3 pulse; for during that second half the Q pulse occurs (and is applied to four-gate 424), and one of the ½ micro-second pulses omitted by terminal 378 and thus applied to terminal 428, will also be transmitted to four-gate 424 during the Q pulse. A ½ micro-second pulse, synchronous with a pulse emitted by terminal 378 on the busy register channel store sub-unit 198 of multiplex A, is therefore emitted by two-gate RG4/3 on lead 456/4 and applied to one input of one-gate RG4/2; and one-gate RG4/2 therefore gives a ½ micro-second pulse output on lead 458/4 which is applied to the second input of two-gate RG4/1 and synchronises with the ½ microsecond pulse applied to the first input of two-gate RG4/1 by lead 460 from four-gate 424. Four-gate 424 accordingly emits a ½ micro-second pulse which is applied by lead 452/4 to the input of delay line RD4 and by lead 454/4 to terminal 453/4 and thence lead 470/4 to one of the input terminals of register K/5.

The pulse thus fed to the input of delay line RD4 re-appears at the output of delay line RD4 after the lapse of 100 micro-seconds, and is thence re-applied substantially instantaneously to one input of two-gate RG4/1 via lead 455/4, one-gate RG4/2 and lead 458/4. At the same time that this ½ micro-second pulse is re-applied to one input of two-gate RG4/1, a "second" ½ microsecond pulse will be applied to the other input of two-gate RG4/1 from lead 460, for reasons explained below. Two-gate RG4/1 accordingly re-applies the pulse to the input of delay line RD4. This cycle of repeated pulsing in delay line RD4 will therefore continue until interrupted upon completion of the setting up of the call or until clearance occurs by the forced clearance means or by the replacement of the calling subscriber's receiver.

At the same time as the foregoing operations by which register channel pulses are being "stored" (by repeated pulsing) in delay line RD4, synchronous pulses are being similarly "stored" in the other two delay lines associated with register K/5, as follows.

It has been explained above, in the description of the operations connected with delay line RD4, that no negatory output is being emitted by multivibrator 445 at the time when the leading edge of the Q pulse is applied to four-gate 424 and that the latter gate emits a ½ microsecond pulse which is fed to delay line RD4. This pulse emitted by four-gate 424 and thus applied to leads 461 and 463 is at the same time applied (as will be clear from FIGURE 5) to two-gate RG6/3 and two-gate RG6/1. Since the U3 pulse is being applied to auxiliary gate AG6 while pulse C3 is being applied to auxiliary gate AG4, gate AG6 gives an output which is applied via lead 459/6 to two-gate RG6/3; and two-gate RG6/3 accordingly gives a ½ micro-second pulse output on lead 456/6 at the same time that two-gate RG4/3 gives an output on lead 456/4. The said pulse on lead 456/6 is fed via one-gate RG6/2 and lead 458/6 to the second input of two-gate RG6/1; and two-gate RG6/1 therefore gives a ½ micro-second pulse output which is applied to the input of delay line RD6 at the same time that the ½ micro-second pulse was (as described above) applied to the input of delay line RD4. The said pulse applied to the input of delay line RD6 re-appears at the output of the said delay line RD6 after a delay of 100 micro-seconds, whence it is re-applied via lead 455/6, one-gate RG6/2 and lead 458/6 to one input of two-gate RG6/1, where (just as with two-gate RG4/1) it synchronises with the abovementioned "second" ½ micro-second pulse then appearing on lead 460 and described above as applied to two-gate RG4/1. Accordingly, a ½ micro-second pulse is re-applied to delay line RD6 at the same time as the ½ microsecond pulse was re-applied to delay line RD4 as explained above. Unless interrupted, therefore, delay line RD6 undergoes repeated pulsing, at 100 micro-second intervals, the pulses synchronising with the pulses in delay line RD4.

There is likewise a repeated, and synchronous, pulsing in the third delay line associated with register K/5, viz. delay line RD8, in very similar manner. Pulse D2 is applied via lead 459/8 to two-gate RF8/3 while pulse C3 is being applied to two-gate RF4/3; and in a manner precisely similar to that described in the preceding paragraphs, two-gate RG8/3 therefore emits the ½ micro-second pulse received by it from lead 461 at the same time that two-gate RG4/3 emits the ½ micro-second pulse received by it from lead 461. The pulse so emitted by two-gate RG8/3 is applied via lead 456/8, one-gate RG8/2 and lead 458/3 to two-gate RG8/1; and two-gate RG8/1 receives simultaneously a ½ micro-second pulse on its second input, from lead 460, at the same time that two-gate RG4/1 receives the pulse from lead 460. The ½ micro-second pulse output from two-gate RG8/1 is thus fed by lead 452/8 to the input of delay line RD8 at the same time that the ½ micro-second pulse is fed by two-gate RG4/1 to the input of delay line RD4. The pulse so fed to delay line RD8 is re-emitted from the said delay line after a delay of 100 micro-seconds; and it will be clear that there will be a repetition of ½ micro-second pulses in delay line RD8, in synchronism, with those in delay line RD4.

It is thus clear that a state of affairs has been created in which all three of delay lines RD4, RD6 and RD8 have synchronous ½ micro-second pulses passing through them at 100 micro-second intervals. To complete this part of the description, however, it is necessary to explain how, as mentioned above, the said "second" ½ micro-second pulse is fed to lead 460 and thus to the inputs of two-gates RG4/1, RG6/1 and RG8/1. Now it has been mentioned that when two-gate RG4/1 gives a ½ micro-second output pulse, that pulse is applied by lead 454/4 to terminal 453/4 and thus to lead 470/4. In the same way, when two-gate RG6/1 gives a ½ micro-second output pulse, that pulse is applied via lead 454/6 and terminal 453/6 to lead 470/6; and when two-gate RG8/1 gives a ½ micro-second output pulse, that pulse is applied via lead 454/8 and terminal 453/8 to lead 470/8. These leads 470/4, 470/6 and 470/8 are respectively connected to three inputs of a three-gate in register K/5 described later. Each time it receives a simultaneous pulse from leads 470/4, 470/6 and 470/8, the said three-gate gives an output, these output pulses being modulated with dialling tone and transmitted to input register highway 436 via terminal 430 and lead 435, as shown in FIGURE 6. All pulses so transmitted to input highway 436 are also received on lead 475 and transmitted to terminal 474 of register control unit K/7. Referring back to FIGURE 5, then, it will therefore be seen that all pulses on input register highway 436 are transmitted by lead 475 to terminal 474 and thence via lead 476 and clipper 477 to lead 478 and to one input of one-gate 479. (Clipper 476 serves, it will be remembered, to remove modulations present in the pulses fed to it.) One-gate 479 accordingly receives ½ micro-second pulses which respectively synchronise with those various pulses which from time to time appear at the inputs of delay lines RD1, RD2, RD3, RD4, RD5, RD6, RD7, RD8 and are repeated to terminal 474 via one or other of the registers; and, on receiving any such pulse, one-gate 479 gives a corresponding ½ micro-second pulse at its output which is applied by lead 480 to one input of one-gate 481. Assuming, for the time being, that there is no inhibitory voltage applied to the inhibitory input of one-gate 481, the latter one-gate gives an output on lead 482 which is applied to the input of magnetostrictive delay line 483, which is again so designed that a ½ micro-second pulse fed to its input re-appears at its output after a delay of 100 micro-seconds, whence it is fed to lead 484. On appearing on lead 484, the said pulse is fed—

(i) By lead 484 to one input of one-gate 462 and thus to lead 460—thus inter alia providing the "second" ½ micro-second pulse on lead 460 for application to two-gates RG4/1, RG6/1 and RG8/1, and continuing (for so long as pulses continue to pass through delay line 483) to supply pulses on lead 460 which respectively synchronize with each pulse applied to any of the two-gates RG1/1, RG2/1, RG3/1, RG4/1, RG5/1, RG6/1, RG7/1, RG8/1 by leads 458/1, 458/2, 458/3, 458/4, 458/5, 458/6, 458/7, 458/8 respectively:

(ii) By leads 484 and 485 to one input of one-gate 479 and thence by lead 480 and one-gate 481 (for so long as there is no inhibitory input on one-gate 481) to lead 482, by which the said pulse is re-applied to the input of delay line 483:

(iii) By leads 484 and 446 to the negatory input to four-gate 424, thus ensuring that four-gate 424 cannot give an output pulse at an instant which synchronises with the time of application of a pulse to delay line 483 or with the time of application of any pulse to any of delay lines RD1, RD2, RD3, RD4, RD5, RD6, RD7, RD8:

(iv) By leads 484 and 486 to one input of two-gate 509—for reasons described below.

It will be noted from point (i) above, that once a pulse from a register has appeared on input register highway 436 it is its repetition by delay line 483 (and associated equipment) that provides for the application of later repetitions of that pulse (at 100 micro-second intervals) to two-gates RG1/1, RG2/1, RG3/1, RG4/1, RG5/1, RG6/1, RG7/1 and RG8/1, and not the repetition of such pulses via terminal 428, clipper 426 and four-gate 424. It will be noted from point (ii) above, that delay line 483, with leads 480, 482, 484 and 485, and one-gates 480 and 481 form (for so long as there is no inhibitory input to one-gate 481) a system which itself maintains the repetition of a ½ micro-second pulse (at intervals of 100 micro-seconds) once such a pulse has been applied to it.

(It may also be noted, to prevent misunderstanding in connection with the foregoing description of the pulses received by one-gate 479, that certain pulses are applied to the inputs of delay lines RD1, RD2, RD3, RD4, RD5, RD6, RD7, RD8 which are not repeated via any of the registers to terminal 474.. For example, a ½ micro-second pulse might appear on lead 461 at a time when pulse generator K/1 was emitting only, say, a C and a D pulse, but not a U pulse: in that event, pulses would appear at the inputs of two of the said delay lines but not at the inputs of three of the said delay lines, and no pulse would in that event be transmitted via any register to terminal 474. It does not appear necessary to set out in detail all the cases in which pulses appear at the inputs of one or more of the said delay lines but do not result in there being a corresponding output from a register to output register highway 436 and thus to terminal 474.)

The foregoing description has set out the way in which, if register control unit K/7 is receiving on terminal 428 a train of pulses from the busy channel store sub-unit of the section control unit of a multiplex, the receipt of that train causes a synchronous pulse train to be stored in the three delay lines associated with a free register. The three delay lines in which the said said pulse train will be stored, will be those three which are temporarily the first to be (a) simultaneously tested by C, D and U pulses after the pulse train is received on terminal 428, and (b) which are found not to be "simultaneously busy" (i.e. carrying pulses which synchronise in all three lines when so tested). If the first trio of delay lines to be tested by a combination of C, D, and U pulses be found to be "simultaneously busy," no pulse is passed by four-gate 424, to the "busy" trio so tested; but the pulse train continues to be applied to terminal 428, and shortly thereafter the pulse generator will emit a new triad of C, D and U pulses which tests another group of three delay lines associated with another register, and if that group of delay lines is not "simultaneously busy," that group will store a pulse train synchronising with the train applied to terminal 428—the testing continuing in this way until a free register is found. This testing of course takes place very rapidly, for since all possible combinations of C, D and U pulses are emitted by pulse generator K/1 in less than ¼ second (and most of the relevant combinations are emitted at least four times in ¼ second), the delay line groups for all the registers will have been tested within ¼ second, and the subscriber will not notice a delay unless all registers are busy at the time he attempts to make his call. If all registers are busy, the subscriber may become aware that he is not receiving dialling tone; but if he should continue to wait until a register becomes free (which should in all ordinary circumstances occur within a few seconds), he will then secure the use of the register which has become free and will then receive dialling tone.

It will probably have become clear from the foregoing description of the way in which a free register is secured by a calling subscriber, how it is that a pulse train received on terminal 428 is prevented from being fed to a trio of delay lines which are "simultaneously busy." To prevent misunderstanding, however, the process will now be briefly described. Suppose, register K/6 is busy, so that a pulse train is being repeated in its associated delay lines RD5, RD6, and RD7. Suppose further that at the instant when a pulse train (from terminal 378 on the section control unit of a subscriber seeking to make a call) begins to be received on terminal 428, delay lines RD5, RD6 and RD7 happen to be those which are being tested. Since it is these three delay lines which are being tested, auxiliary gates AG5, AG6, and AG7 will be receiving C, D and U pulses—a possible combination being a C4 pulse on gate AG5, a D0 pulse on gate AG6 and a U4 pulse on gate AG7. Shortly after the beginning of the C4 pulse (and while, of course, pulses D0 and U4 are in being) a P pulse will be emitted by pulse generator K/1 and applied by lead 451 to multivibrator 445, the leading edge of the P pulse thus setting the multivibrator to the state in which it gives no output voltage on lead 44. The P pulse endures for 102 micro-seconds, but the pulses in the busy delay lines RD5, RD6 and RD7 are repeated at intervals of 100 micro-seconds: at least once, therefore, during the period of the P pulse, two-gates RG5/1, RG6/1 and RG7/1 will emit a ½ micro-second pulse, simultaneously, and these pulses will be applied by leads 454/5, 454/6 and 454/7, respectively, to two-gate RG5/4, RG6/4 and RG7/4, respectively. These gates respectively have applied to them the C4 pulse, the D0 pulse, and the U4 pulse, at this time; and each of gates RG5/4, RG6/4 and RG7/4 therefore emits, at the same instant, a ½ micro-second pulse (on leads 466, 467, and 468, respectively), which is applied to an input of three-gate 448. Since three-gate 448 is receiving a ½ micro-second pulse simultaneously on three of its inputs, it emits a ½ micro-second pulse on lead 447 which causes multivibrator 445 to apply voltage on lead 444 which is applied to the negatory input of four-gate 424. This negatory input continues during the remainder of the P pulse and during the ensuing Q pulse, and until the leading edge of the next P pulse is received by multivibrator 447. By reason of the said negatory input, four-gate 424 cannot emit a pulse during the Q pulse just referred to; and therefore no further pulse is passed to delay lines RD5, RD6 and RD7 while the aforementioned C4 pulse continues. The three busy delay lines are thus guarded against having a fresh pulse passed to all of them simultaneously.

When a connection has been successfully set up by a calling subscriber to a called subscriber, it is necessary to stop the repetition of the pulse train used for operating the register used in setting up that connection. This is one of the purposes for which an inhibitory input is provided on one-gate 481. In outline what happens at the end of the successful completion of such a connection, is that a ½ micro-second pulse is applied to terminal 490 which synchronises with one of the pulses forming the pulse train which it is desired to stop. The way in which the said pulse is applied to terminal 490 is described later; but it will be seen from FIGURE 5 that when such a pulse is applied to terminal 490, it is applied by lead 489 to the input of one-gate 488, which accordingly emits a ½ micro-second pulse on lead 487 which is applied to the inhibitory input of one-gate 481. This prevents the passage through one-gate 481 of the pulse belonging to the pulse train which it is desired to suppress (though not, of course, suppressing other pulse trains, since the pulses constituting such other pulse trains are applied to one-gate 481 at other instants). The pulses of the train so suppressed in gates 479 and 481 and delay line 483, therefore no longer occur on lead 484 and are therefore not applied via one-gate 462 to lead 460. They therefore are not applied to any of two-gates RG1/1, RG2/1, RG3/1, RG4/1, RG5/1, RG6/1, RG7/1, RG8/1 and none of these two-gates can any longer give output pulses synchronised with the pulses of the train which is being suppressed. The pulse trains in those delay lines RD1, RD2, RD3, RD4, RD5, RD6, RD7, RD8 which contained pulses synchronising with the train suppressed in delay line 483 are therefore likewise suppressed—thus cutting off the supply of pulses to the register which has completed, for the time being, its work of setting up a connection, and so releasing the said register for use in setting up some other connection when required.

The other purpose of the inhibitory input on one-gate 481 is that of providing a means whereby if a calling subscriber has secured the use of a register as above described, but does not complete the dialling operation within a reasonable time, the register will be "forcibly" disconnected from the delinquent subscriber. This is done with the help of the X and Y pulses from pulse generator K/1. Y pulses are applied by terminal Y of pulse generator K/1 to lead 501 and thus to terminal 502 on register control unit K/7, as will be seen from FIGURE 5. From terminal 502, the Y pulse is applied by lead 503 to one input of two-gate 504. It will be here assumed (the reason being explained later) that when the Y pulse under consideration is applied to two-gate 504, there is also a voltage on lead 505 to the second input of two-gate 504. Two-gate 504 accordingly gives an output on lead 506 which is applied to the input of one-gate 507 which in turn gives an output on lead 508 which is applied to one input of two-gate 509. The other input of two-gate 509 is connected by lead 486 to lead 484 and there is thus applied to two-gate 509 every pulse which appears on lead 484 during the existence of the said Y pulse. That is to say, every pulse which, during the existence of the Y pulse, is applied to the input of delay line 483 (i.e. every pulse which, during the Y pulse, has been simultaneously applied to any three of delay lines RD1, RD2, RD3, RD4, RD5, RD6, RD7, RD8) is applied to two-gate 509. Every such pulse is, while two-gate 504 continues to give an output, emitted by the latter two-gate on lead 510 and applied to the input to magnetostrictive delay line 511. Delay line 511 is again so designed that a pulse applied to its input re-appears at its output after a delay of 100 microseconds; and each pulse so appearing at the output of delay line 511 is applied to lead 512 and thus to a second input of one-gate 507.

Thus, during the period for which the Y pulse endures, two-gate 504 will continue to give an output, one-gate 507 will continue to give an output, and two-gate 509 will feed to the input of delay line 511 every pulse occurring in delay line 483 during the said period. The re-application to one-gate 507 of the said pulses from the output of delay line 511 is, in a sense, superfluous for so long as two-gate 504 continues to give an output—since that output causes one-gate 507 to give an output which provides the second input to two-gate 509 and thus permits two-gate 509 to transmit to delay line 511 the pulses corresponding to those appearing in the delay line 483. But when the Y pulse ends and two-gate 504 therefore ceases to give an output, the application to one-gate 507 of pulses appearing at the output of delay line 511 causes one-gate 507 to emit corresponding pulses which are applied to two-gate 509 and are re-emitted by two-gate 509 provided that synchronous pulses are still circulating in delay line 483 and therefore being applied to the other input of two-gate 509. Because delay line 511 has a delay period of 100 micro-seconds it will, at the end of the Y pulse, have stored in it all the pulses that were applied to its input during the 100 micro-seconds preceding the end of the Y pulse; and the pulses so store in delay line 511 will continue to be repeated by the said delay line in conjunction with gates 507 and 509 provided that corresponding synchronous pulses continue to circulate in delay line 483—i.e. provided that synchronous pulses continue to be used in one or more of delay lines RD1, RD2, RD3, RD4, RD5, RD6, RD7, RD8 and their respectively associated registers. If any pulse train which has been circulating in delay line 483 ceases so to circulate (because a register has completed the setting up of a call between a calling and a called subscriber or because the calling subscriber has replaced his receiver), the pulses of that train will no longer be applied to two-gate 509, and the corresponding synchronous pulses will therefore not be passed by two-gate 509 to delay line 511 and will therefore be suppressed from circulation in delay line 511 and gates 507 and 509. Accordingly, it will be seen that, at the instant at which the Y pulse ends, delay line 511 contains (in the form of stored pulses) a "record" of the pulses in use by all registers during the 100 microseconds preceding the end of the Y pulse, that "rceord" being subsequently "amended" by the "erasure" of those pulses which subsequently cease to remain in use by the registers.

The "record" just referred to, is then used to "check" the behaviour of calling subscribers in a manner which can be described in outline as follows. After the lapse of a "check period" of about 20 seconds from the end of the Y pulse with whose application to two-gate 504 the description in the preceding paragraph started, the pulses still remaining in the amended "record" in delay line 511 are compared with the pulses in use in delay lines RD1, RD2, RD3, RD4, RD5, RD6, RD7 and RD8. As has already been explained, any pulses still appearing in the "record" in delay line 511, will be pulses, which were fed to it before the end of that Y pulse whose ending constituted the beginning of the "check period"—that is to say, such pulses will have been undergoing repetition for at least 20 seconds. If pulses forming a register channel have been undergoing repetition for so long a time, then (assuming a fault has not developed in the exchange) there will have been an abuse, by the subscriber who is ostensibly making use of that channel, of the exchange facilities: that subscriber will have failed to complete his dialling within a reasonable time of initiating his call. The pulses in the amended "record" are, therefore, at the end of the "check period," used to suppress the corresponding pulses in delay line 483, thus effectively disconnecting the delinquent subscriber from the register which had been allocated to him. In detail, the manner in which the operations described in the present paragraph are carried out, is as follows:

It has already been mentioned that multivibrator 515 is so designed that on receipt of the lagging edge of a pulse fed to it on lead 514, multivibrator 515 ceases to give an output on lead 516. Accordingly, at the end of a Y pulse which constitutes the beginning of a "check period," two-gate 504 ceases to give an output and the cessation of that output constitutes the lagging edge of a pulse on lead 514. Multivibrator 515 therefore ceases to give an output on lead 516 to slow release device 521; and 20 seconds after the cessation of the said output on lead 516, slow release device 521 ceases to give an output on lead 520, thus ending the application of voltage to the inhibitory input of one-gate 518. There has thus been a period of 20 seconds (viz. the "check period") during which there has been no output voltage on lead 516 (and therefore no voltage on leads 497 and 505, so that neither two-gate 496 nor two-gate 504 could give an output). But when the next X pulse is emitted by pulse generator K/1 after the end of the "check period," that pulse is applied from terminal X via lead 500, terminal 499 and leads 498 and 519 to an input of one-gate 518, causing the latter one-gate to give an output on lead 517 which is applied to multivibrator 515 and causes the latter once more to apply voltage to lead 516. The application of voltage to lead 516 of course causes slow release device 521 to give an output again which is applied via lead 518 to the inhibitory input of one-gate 517; and it also applies voltage via leads 497 and 505 to one input each of two-gates 496 and 504, respectively. The application of voltage to one input of two-gate 504 has no effect, since there is no Y pulse at this time; but the application of voltage by lead 497 to one input of two-gate 496 causes it to give an output, since the X pulse is still continuing and is being applied to the other input of two-gate 496 by lead 498. Two-gate 496 accordingly gives an output (which lasts for the remainder of the X pulse, i.e. for substantially 233 micro-seconds, since the gates operate substantially instantaneously) which is applied by lead 495 to two-gate 494. The other input of two-gate 494 has applied to it, via lead 513, a ½ microsecond pulse each time such a pulse is applied to the input to delay line 511. Accordingly, every pulse which, at the end of the "check period," still remains in delay line 511 is applied to two-gate 494 causing it to emit corresponding ½ micro-second pulses which are applied via leads 492 and 491 to one input of one-gate 488. One-gate 488 accordingly emits corresponding ½ micro-second pulses on lead 487 which are applied to the inhibitory input of one-gate 481; and these pulses accordingly suppress from further repetition in delay line 483 and gates 479 and 481 those pulses in delay line 483 which synchronise with pulses still "recorded" in delay line 511. Pulses so suppressed in delay line 483 will, of course, no longer appear on lead 486, and they are accordingly thereafter suppressed in delay line 511, because they no longer appear at one of the inputs of two-gate 509. There is thus, at this stage, a mutual suppression by delay lines 483 and 511, of pulses which have been "recorded" in delay line 511 for about 20 seconds.

As the pulses previously repeated in delay line 483 are suppressed in manner just described, the said pulses cease to be applied by lead 484, one-gate 462 and lead 460 to two-gates RG1/1, RG2/1, RG3/1, RG4/1, RG5/1, RG6/1, RG7/1 and RG8/1; and synchronous pulses previously occurring in any of delay lines RD1, RD2, RD3, RD4, RD5, RD6, RD7 and RD8 are therefore suppressed likewise, thus cutting off the supply of pulses to those registers which have been continuously "busy" for more than about 20 seconds, so releasing any such registers for use in setting up other connections as required. Thus delinquent subscribers are "forcibly" disconnected from the registers which have been respectively allotted to them; but it will be noted that registers which have not been continuously "busy" for more than about 20 seconds are not interfered with, so that the setting up of calls which are proceeding normally is not interfered with.

It will be seen that with the re-application of voltage to lead 516 at the start of the X pulse as described above, the state of affairs assumed to exist at the beginning of the foregoing description of the method of "forcibly" disconnecting delinquent subscribers, has been restored. Accordingly, the receipt of the next Y pulse after the X pulse just mentioned, will initiate a new checking operation and forcible disconnection of further delinquent subscribers. It will also be noted that when two-gate 494 emits ½ micro-second pulses during the operation of forcible clearance, each such pulse is transmitted by lead 492 to terminal 493. Terminal 493 is connected by lead 522, as shown in FIGURE 6, to terminal 381 of busy register channel store 198 of section control unit A/2, of section control unit B/2, and of every other section control unit in the exchange. As will be seen from FIGURE 4, the application of a pulse to terminal 381 causes the said pulse to be applied via lead 396/1, one-gate 402 and lead 401 to the inhibitory input of one-gate 394, thus clearing (in manner described more fully below) from circulation through delay line 399 and gates 392 and 394 any pulse whose instant of application to delay line 399 synchronises with the instant of the emission of a pulse by two-gate 494 (in FIGURE 5). Thus, as register control unit K/7 is cleared of register pulse trains which have been allotted to delinquent subscribers, so also are the corresponding busy register channel stores in the section control units cleared of those same pulse trains.

*Registers*

In the foregoing section a description has been given of the manner in which register control unit K/7 allots a free register channel pulse to each section control unit (A/2, for example), and how, when a subscriber initiates a call—which initiation causes, in manner yet to be described, pulses to be emitted from terminal 378 of the section control unit to which that calling subscriber is connected—register control unit K/7 (under the influence of C, D and U pulses from pulse generator K/1) selects a free register (assuming there to be a register free) and connects the calling subscriber to that free register by setting up a pulse train (whose pulses synchronise with those of the pulses emitted by terminal 378) in the trio of delay lines (from the set RD1, RD2, RD3, RD4, RD5, RD6, RD7, RD8) which are associated with that free register. It has been assumed, in the foregoing description, that register K/5 is free and that it is in the three delay lines (viz. RD4, RD6 and RD8) associated with register K/5 that the register pulse train is being repeated. Register K/5 will accordingly now be described with reference to the diagram shown in FIGURE 7. All other registers are similar in construction to register K/5, and they are differentiated from one another only by having certain input terminals supplied with respectively different combinations of C and D pulses—as is described below—and by being connected to different trios of delay lines in register control unit K/7 as already described.

It has been explained in connection with FIGURE 5, that register K/5 is connected to leads 470/4, 470/6 and 470/8: these leads can be seen at the top of FIGURE 7, where they will be seen connected to terminals 523, 524 and 525, respectively. There will also be seen, at the left-hand side of FIGURE 7, terminals 429 and 430 which (as shown in FIGURE 6) are respectively connected by lead 431 to output register highway 432 and by lead 435 to input register highway 436. In addition to the terminals already mentioned, register K/5 is provided with terminal 526 which is connected by lead 527 with dial tone generator 528 (which is similarly connected to terminal 526 on every other register), and with terminals 529, 530 and 531 (at the right-hand side of FIGURE 7) and terminal 532 (at the left-hand side of FIGURE 7, below terminal 430), which are connected as shown in FIGURE 8.

Figure 8:
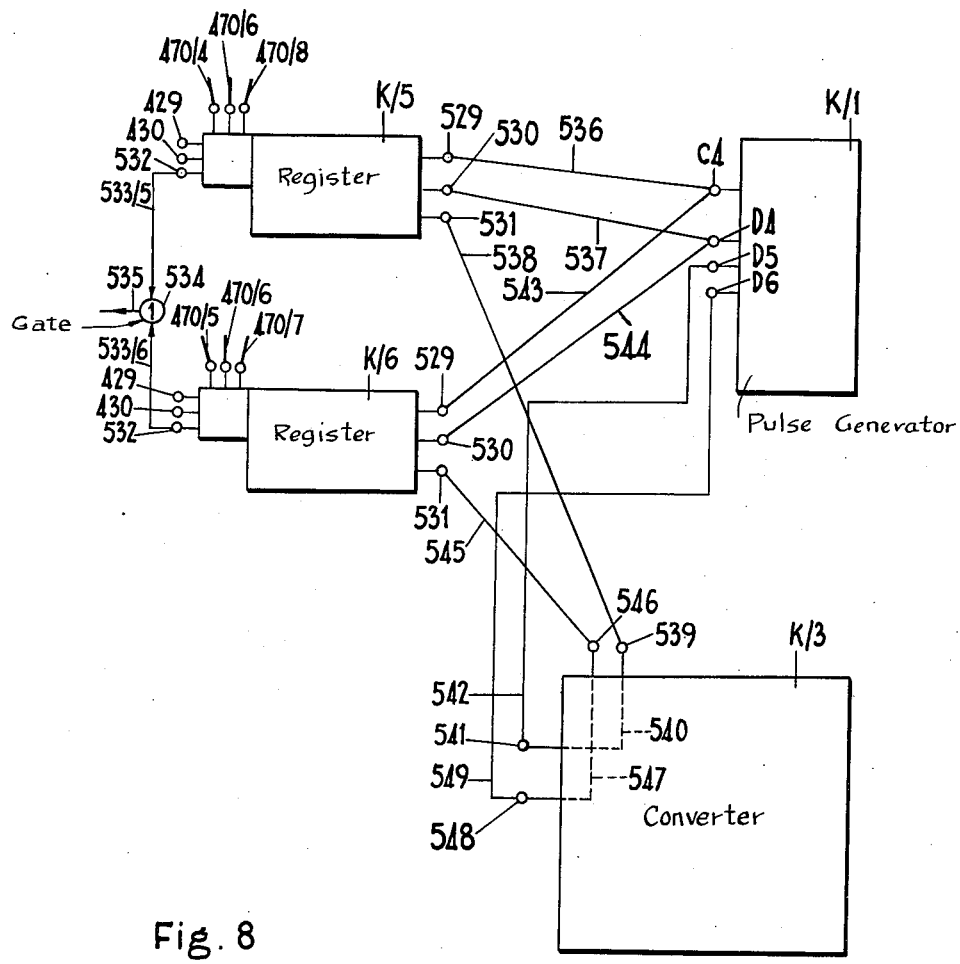

Turning to FIGURE 8, it will be seen that it shows in outline the typical register K/5 connected to leads 470/4, 470/6 and 470/8, and the equally typical register K/6 connected to leads 470/5, 470/6 and 470/7—the interconnection between the two parts of lead 470/6 not being shown, to avoid confusing the figure. It will also be seen from this figure that terminal 532 on register K/5 is connected by lead 533/5 to one input of one-gate 534, while terminal 532 on register K/6 is connected by lead 533/6 to another input of one-gate 534. Terminal 532 of each of the other forty-eight registers (which are not shown in FIGURE 8) is likewise connected to one input of one-gate 534. The output of one-gate 534 is connected by lead 535 to terminal 244 in register channel temporary store sub-unit 193 in section control unit A/2 and to the corresponding terminal in every other section control unit.

As will appear below in the detailed description of the operation of register K/5, the effect upon a register of the reception of the dialling impulses is that counting devices in the register are set to a condition corresponding to the number which has been dialled. Each register makes use of converter K/3, which is common to them all; and it is therefore necessary to ensure that two registers shall not simultaneously operate the converter. In order to ensure that they do not do so, each register is provided with a four-gate (as described below), and each of the said four-gates has combinations of C and D pulses (derived from pulse generator K/1) applied to its inputs. Thus register K/5 is arranged (if in process of setting up a call) to apply the appropriate voltages to converter K/3 when, but only when, pulses C4, D4 and D5 are being contemporaneously emitted by pulse generator K/1; and register K/6 is arranged likewise (if engaged in setting up a call) to apply voltages to converter K/3 when, but only when, pulses C4, D4 and D6 are being contemporaneously emitted by pulse generator K/1. Every other register likewise has its four-gate so supplied with one of pulses C0 to C4, one of pulses D0 to D4, and a D5 or a D6 pulse, as to ensure that that register can only actuate converter K/3 when no other register is actuating the converter. The selection is, of course, at the discretion of the designer of the exchange; but a suitable selection of the pulses appropriate to the fifty registers envisaged as employed in the exchange now being described by way of example, is set out in the following table:

| Register No. | Pulses | Register No. | Pulses | Register No. | Pulses |
|---|---|---|---|---|---|
| 1 | C0, D0, D5 | 18 | C1, D3, D6 | 35 | C3, D2, D5 |
| 2 | C0, D0, D6 | 19 | C1, D4, D5 | 36 | C3, D2, D6 |
| 3 | C0, D1, D5 | 20 | C1, D4, D6 | 37 | C3, D3, D5 |
| 4 | C0, D1, D6 | 21 | C2, D0, D5 | 38 | C3, D3, D6 |
| 5 | C0, D2, D5 | 22 | C2, D0, D6 | 39 | C3, D4, D5 |
| 6 | C0, D2, D6 | 23 | C2, D1, D5 | 40 | C3, D4, D6 |
| 7 | C0, D3, D5 | 24 | C2, D1, D6 | 41 | C4, D0, D5 |
| 8 | C0, D3, D6 | 25 | C2, D2, D5 | 42 | C4, D0, D6 |
| 9 | C0, D4, D5 | 26 | C2, D2, D6 | 43 | C4, D1, D5 |
| 10 | C0, D4, D6 | 27 | C2, D3, D5 | 44 | C4, D1, D6 |
| 11 | C1, D0, D5 | 28 | C2, D3, D6 | 45 | C4, D2, D5 |
| 12 | C1, D0, D6 | 29 | C2, D4, D5 | 46 | C4, D2, D6 |
| 13 | C1, D1, D5 | 30 | C2, D4, D6 | 47 | C4, D3, D5 |
| 14 | C1, D1, D6 | 31 | C3, D0, D5 | 48 | C4, D3, D6 |
| 15 | C1, D2, D5 | 32 | C3, D0, D6 | 49 | C4, D4, D5 |
| 16 | C1, D2, D6 | 33 | C3, D1, D5 | 50 | C4, D4, D6 |
| 17 | C1, D3, D5 | 34 | C3, D1, D6 | | |

It will be remembered that register K/5 has been assumed to be register No. 49, and register K/6 has been assumed to be register No. 50. Accordingly, a register K/5 is enabled to actuate converter K/3 when register K/5 receives pulses resulting from the contemporaneous emission of pulses C4, D4 and D5 by pulse generator K/1.

The necessary connecting leads for the application of these pulses to registers K/5 and K/6 are shown in FIGURE 8. It will be seen that terminal 529 on register K/5 is connected by lead 536 to terminal C4 on pulse generator K/1, while terminal 530 on register K/5 is connected to terminal D4 on pulse generator K/1 by lead 537. Terminal 531 on register K/5 is not connected directly to terminal D5 on pulse generator K/1, but is connected via lead 538 to terminal 539 on converter K/3, whence it is connected through equipment in the said converter (which equipment is described later and is indicated in FIGURE 8 merely by the dotted line 540) to terminal 541 on converter K/3 and thence via lead 542 to terminal D5 on pulse generator K/1. Similarly (since register K/6 is to operate converter K/3 upon simultaneously rereiving pulses C4, D4, and D6), terminal 529 on register K/6 is connected by lead 543 to terminal C4 on pulse generator K/1, terminal 530 on register K/6 is connected by lead 544 to terminal D4 on pulse generator K/1, and terminal 531 on register K/6 is connected by lead 545 to terminal 546 on converter K/3 whence it is connected via equipment indicated by dotted line 547 to terminal 548 and thence via lead 549 to terminal D6 on pulse generator K/1. The terminal 529 on each other register in the exchange is similarly connected to one of the terminals C0 to C4 on pulse generator K/1, the terminal 530 on each other register is connected to one of the terminals D0 to D4 on pulse generator K/1, and the terminal 531 on each other register is connected either to terminal 539 or to terminal 546 on converter K/3 (and thus through the intervening equipment 540 or 547 to lead 542 or 549 and to terminal D5 or D6 on pulse generator K/1)—in accordance with the scheme set out in the immediately preceding table. The equipment represented by the dotted lines 540 and 547 in converter K/3 is so designed as to give a short pulse output at the beginning of the D5 pulse and at the beginning of the D6 pulse, respectively, and in addition, to give that short pulse only if a clearing pulse has been received indicating the register which last operated previously has completed its operations or has otherwise been cleared.

Figure 7:
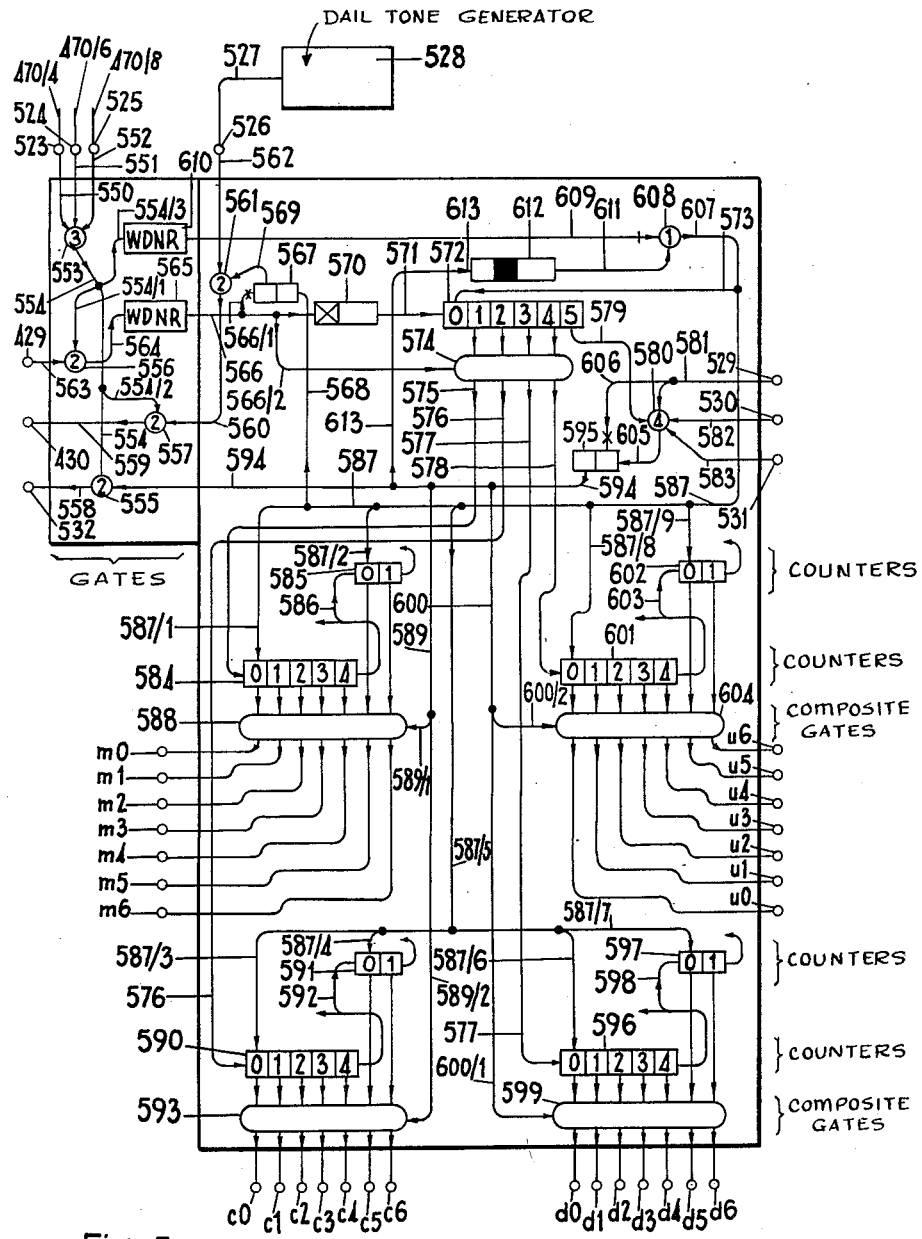

Reverting now to FIGURE 7, it will be seen that terminals 523, 524, and 525 are respectively connected by leads 550, 551 and 552 to the three inputs of three-gate 553, whose output is connected by lead 554 to two-gate 555 and by branch leads 554/1 and 554/2 to one input of two-gate 556 and to one input of two-gate 557, respectively. The output of the two-gate 555 is connected by lead 558 to terminal 532. The output of two-gate 557 is connected by lead 559 to terminal 430, while the second input of two-gate 557 is connected by lead 560 to the output of two-gate 561, one of whose inputs is connected by lead 562 to terminal 526 and thence to dial tone generator 528.

The second input to two-gate 556 is connected by lead 563 to terminal 429. The output of two-gate 556 is connected by lead 564 to a widening circuit 565. It will be remembered that terminal 429 is (as shown in FIGURE 6) connected to output register highway 432, and terminal 429 therefore has applied to it the pulses of all register channels currently in use. Two-gate 556, out of the pulses applied to it, transmits to circuit 565 those pulses which synchronise with the pulses received by three-gate 553, i.e. those pulses which emanate from the calling subscriber to whom register K/5 has been allotted for the purpose of setting up the connection he wants. When the said calling subscriber dials his wanted number, the register channel pulses which emanate from his instrument are modulated (in fact interrupted) by his dialling impulses; and it is the register channel pulses so modulated that are applied by lead 564 to circuit 565. Circuit 565 in effect acts as a demodulator, passing to lead 566, for so long as register channel pulses are being transmitted by two-gate 556, a steady voltage which is periodically interrupted to correspond with the dialling impulses produced by the calling subscriber.

Lead 566 is connected by branch lead 566/1 to one input of a multivibrator 567 whose other input is connected to lead 568. Multivibrator 567 is so designed that the trailing edge of a pulse on lead 566/1 causes it to cease to give an output on lead 569 whereas, after receiving an input on lead 568, it gives an output voltage on lead 569 to the second input of two-gate 561. As will appear later, the operation of the register is such that, when it has completed the setting up of a connection between a calling and a called subscriber, or when the register is forcibly released under the action of slow release device 521 (see FIGURE 5) and the X and Y pulses (as described in the preceding section of this specification), or if a subscriber secures the use of a register and then replaces his instrument without (or without finishing) dialling (i.e. whenever a register is released), a voltage is applied on lead 568 thus causing multivibrator 567 to give an output on lead 569 which is applied to two-gate 561. In this state two-gate 561 applies to lead 560 voltage fluctuations which represent dialling tone; and when register K/5 is allotted to a calling subscriber (by the operation of register control unit K/7 as described in the preceding section of this specification), the pulses of the register channel which are then applied by leads 470/4, 470/6 and 470/8 to three-gate 553 and therefore appear at the output of three-gate 553 and are applied via leads 554 and 554/2 to two-gate 557, are emitted by two-gate 557 as modulated by the dial tone voltage fluctions applied to two-gate 557 by lead 560. Accordingly, the modulated register channel pulses are applied by two-gate 557 to lead 559 and terminal 430 and thence to input highway 436 (as shown in FIGURE 6). From input highway 436, the modulated register channel pulses are supplied (in manner described later) to the apparatus of the calling subscriber, who accordingly hears the dialling tone. When, however, the calling subscriber dials the first digit of the wanted number, and his register channel pulses (modulated by the first dialling impulse) are received by circuit 565 as described above, the first dialling impulse is applied by circuit 565 to leads 566 and 566/1 and thus to multivibrator 567; and, as already remarked, multivibrator 567 is so designed that the interruption of voltage on lead 566/1 at the beginning of the first dialling impulse causes it to cease to give an output on lead 569 (until reset by a further pulse on lead 568). The cessation of an output on lead 569, removes the voltage from one input to two-gate 561, which then ceases to transmit dialling tone from lead 562 to lead 560: accordingly, when the first dialling impulse is received from the calling subscriber, the application of dialling tone to two-gate 557 ends, and the calling subscriber ceases to hear dialling tone.

Lead 566 continues beyond its point of junction with branch lead 566/1 and is connected to the input of a slow-operate device 570. This device is so designed that if an input voltage is applied to it by lead 566, the said device will give a short pulse output on lead 571 (which said short pulse may conveniently last 5 milliseconds, for example) if but only if an input voltage is maintained upon it for 200 milli-seconds or more from the time when the leading edge of the pulse on lead 566 is applied to device 570, the said short pulse being emitted 200 milli-seconds after the time of application of said leading edge. Device 570 is also so arranged that if the input on lead 566 is interrupted before 200 milliseconds have elapsed and a further input is thereafter received by device 570, device 570 will not then give an output until 200 milli-seconds have elapsed from the time of receipt of the leading edge of the said further input, and will give the said output only if the said further input is maintained for at least 200 milli-seconds. The purpose of this arrangement is to ensure that device 570 does not give a pulse output between the dialling impulses which constitute a single digit, but does give a pulse during the inter-digital pauses. It achieves this result because, as already described, register channel pulses are applied to terminal 429 upon the allocation of a register to a calling subscriber, and these pulses are applied through two-gate 556, widener 565 and lead 566 to slow operate device 570; and since (when correctly operating dialling equipment as installed by the British Post Office) the calling subscriber will not cause the first dialling impulse to be omitted in less than 200 milli-seconds, device 570 will give a pulse output between the time when register channel pulses are first applied to terminal 429 and the time when the first dialling impulse is emitted. As stated above, the dialling impulses (of which there may be from one to ten) produce interruptions in the voltage applied to lead 566, the said voltage being restored between each dialling impulse; but the restored voltage (between the suppressions which constitute dialling impulses) lasts for not more than 53 milli-seconds before it is interrupted by the next dialling impulse, unless the digit which is being dialled consists of a single impulse or is the last of the impulses constituting a digit, so that device 570 cannot operate during the emission of the pulses representing a single digit. However, between the emission of the impulses constituting any one digit and the impulses constituting the next digit, a period of at least 400 milli-seconds must elapse with British Post Office equipment, so that the voltage on lead 566 must be restored for at least 400 milli-seconds; and device 570 accordingly gives a pulse output during that inter-digital period of at least 400 milli-seconds (namely, gives a pulse output when 200 milli-seconds have elapsed after the restoration of voltage to lead 566). It will thus be seen that the delay of 200 milli-seconds is chosen as a convenient period intermediate in length between the maximum length of time (viz. 53 milli-seconds) elapsing between successive dialling impulses (where there is more than one) constituting a single digit, and the minimum length of time (viz. 400 milli-seconds) of an inter-digital pause. It will be clear to the competent designer, from the foregoing statement, how the delay of 200 milli-seconds should be altered to suit dialling equipment having a different maximum time between the successive dialling impulses constituting a single digit and/or a different minimum length of inter-digital pause.

As will be seen from FIGURE 7, lead 571 is connected to the input of a six-stage counter 572, the stages of which are marked 0, 1, 2, 3, 4, 5. In its "inoperative" condition, stage 0 of counter 572 is energised; and it will be seen that counter 572 is provided with a re-setting lead 573 connected to stage 0, and is so arranged that if a voltage input be applied by lead 573, stage 0 becomes energised, any other stage which was energised before the said input then becoming de-energised. If stage 0 be energised, and a voltage pulse be applied on lead 571, stage 0 becomes de-energised and stage 1 becomes energised; if stage 1 be energised, and a further pulse be applied on lead 571, stage 1 becomes de-energised and stage 2 becomes energised, stage 0 remaining de-energised; and the application of further successive pulses, up to three in number (making five pulses in all) will cause stages 3, 4 and 5 to be energised in turn, each of stages 2, 3 and 4 becoming de-energised when the next succeeding stage is energised, and the stages previously de-energised remaining de-energised. Unless a fault develops in the exchange, not more than five pulses will be applied by lead 571 to counter 572 before a re-setting pulse is applied by lead 573, thus re-energising stage 0 and preparing the counter for renewed stepping on the next occasion of its use.

Lead 566 is also connected by branch lead 566/2 to the "permissory" input of a composite gate 574. The circuit arrangement of a composite gate of this kind is described later. It is, in essence, an assembly of two-gates; but it is conducive to the intelligibility of a diagram such as FIGURE 7 to treat the assembly as a single entity. As is indicated by the arrow below counter 572, each of stages 1, 2, 3 and 4, is arranged to apply a voltage input (over the respective leads shown) to composite gate 574 when the respective stage is energised; and gate 574 is so designed that if, while a voltage is being applied by any stage to gate 574, voltage is also applied by lead 566/2 to the permissory input of gate 574, that gate will, when the leading edge of the pulse appears on lead 566/2, give an output voltage on the output lead (shown below gate 574) corresponding to the stage which is applying voltage to gate 574. Thus if there is voltage pulse input on lead 566/2 and stage 1 of counter 572 is energised, gate 574 will give an output voltage on lead 575; if there is a voltage pulse on lead 566/2 and stage 2 of counter 572 is energised, an output voltage will appear on lead 576; and, similarly, a voltage pulse on lead 566/2 and energisation of stage 3, will produce an output voltage on lead 577, while a voltage pulse on lead 566/2 and energisation of stage 4 will produce an output on lead 578. Stage 5 of counter 572 is connected by lead 579 to one input of four-gate 580, whose other three inputs are connected by leads 581, 582 and 583 to terminals 529, 530 and 531, respectively.

Lead 575 is connected to the input of a counter 584 having five stages marked 0, 1, 2, 3, 4, respectively, as shown—hereinafter sometimes referred to in this description as stages 584/0, 584/1, 584/2, 584/3 and 584/4, respectively—with which is associated a counter 585 having two stages marked 0 and 1, respectively and sometimes respectively referred to in this description as stages 585/0 and 585/1. In its "unoperated" condition, stage 0 of counter 584 is energised; and this counter is so designed that if stage 584/0 is energised and a voltage pulse is applied to it on lead 575, stage 584/0 becomes de-energised and stage 584/1 energised. Similarly, the application of a further voltage pulse on lead 575 will then cause stage 584/1 to become de-energised (stage 584/0 remaining de-energised) and stage 584/2 to become energised and the application of two further voltage pulses in succession on lead 575 will in turn first cause stage 584/2 to become de-energised and stage 584/3 to become energised, and next cause stage 584/3 to become de-energised and stage 584/4 to become energised. The application of a further pulse on lead 575, will now cause stage 584/4 to become de-energised and stage 584/0 to become re-energised; and it also causes counter 584 to emit a voltage pulse on lead 586 which is connected to the input of counter 585. In its "unoperated" condition, stage 0 of counter 585 is energised; but this counter is so designed that the application of a pulse on lead 586 causes stage 585/0 to become de-energised and stage 585/1 to become energised. The application of a further pulse on lead 586 would cause stage 585/1 to become de-energised and stage 585/0 to become re-energised. Accordingly, assuming that counters 584 and 585 both start in their "unoperated" condition, the application of four successive pulses on lead 575 will cause stages 1, 2, 3 and 4 of counter 584 to be energised in succession, stage 0 of counter 585 remaining energised during these four operations: the application of a fifth pulse on lead 575 will cause stage 584/4 to become de-energised and stage 584/0 to become re-energised, and also cause stage 585/0 to become de-energised and stage 585/1 to become energised; and the application of four more successive pulses on lead 575 will again cause stages 1, 2, 3 and 4 of counter 584 to be energised in succession, while stage 1 of counter 585 remains energised during the four operations last mentioned. The state of affairs at the end of the ninth pulse is thus that stages 584/4 and 585/1 are energised; and the application of a tenth pulse on lead 575 will cause stage 584/4 to become de-energised and stage 584/0 to become re-energised, the resulting pulse on lead 586 then causing stage 585/1 to become de-energised and stage 585/0 to become re-energised. Counters 584 and 585 are thus both restored to their "unoperated" condition after the tenth pulse.

Counter 584 is also provided with a re-setting lead 587/1 connected to stage 584/0. The application of a voltage pulse on lead 587/1 will, if any stage of counter 584 other than stage 0 is energised immediately before the application of such pulse, cause such other stage to become de-energised and stage 584/0 to become energised: if stage 584/0 is already energised at the time when a pulse is applied on lead 587/1, the said pulse will have no effect. Similarly, counter 585 is provided with a re-setting lead 587/2 connected to stage 585/0; and the application of a pulse on lead 587/2 will cause stage 585/1 (if energised immediately before the application of the said pulse) to become de-energised and stage 585/0 to become energised, whereas if stage 585/0 is already energised immediately before the receipt of a pulse on lead 587/2, the application of such pulse to counter 585 will have no effect. Loads 587/1 and 587/2 are both connected to lead 587, as is also lead 568, as will be seen from FIGURE 7.

As will also be seen from FIGURE 7, there is shown, below counters 584 and 585, a composite gate 588. Gate 588 has a permissory input connected to branch lead 589/1; and, as indicated by the arrows below each of the stages of counter 584 and each of the stages of counter 585, each such stage is arranged to apply (when energised) a voltage (over the respective lead shown) to composite gate 588. For as long as a voltage is applied by lead 589/1, gate 588 will, if stage 0 of counter 584 is energised, apply voltage to terminal $m0$ as indicated in FIGURE 7 by the adjacent lead and arrow; and if stage 584/1 is energised at the time of said leading edge, gate 588 will apply voltage to terminal $m1$. Similarly, if stage 584/2, 584/3 or 584/4 is energised, the energised stage will, if the leading edge of a pulse appears on lead 589/1, cause gate 588 to apply voltage to terminal $m2$, terminal $m3$ or terminal $m4$, respectively. Energisation of stage 0 of counter 585 will cause gate 588 to apply voltage to terminal $m5$, while energisation of stage 1 of counter 585 will cause gate 588 to apply voltage to terminal $m6$—in either case the voltage being applied to terminal $m5$ or $m6$ (as the case may be) when the leading edge of a pulse appears on lead 589/1.

The equipment associated with lead 576, is identical with that associated with lead 575. Lead 576 is, as shown, connected to the input of counter 590 having five stages marked 0, 1, 2, 3, 4, respectively. In the "unoperated" state of counter 590, stage 590/0 is energised; and four successive voltage pulses applied on lead 576 will respectively cause stages 1, 2, 3 and 4 to become energised in succession, the previously-energised stage being de-energised when the succeeding stage is energised. The application of a fifth pulse on lead 576 will (if stage 590/4 is energised) cause stage 590/4 to become de-energised, stage 590/0 to become re-energised, and counter 591 to receive a voltage pulse on lead 592. Counter 591 has the two stages, respectively marked 0 and 1, stage 0 being energised when counter 591 is in its "unoperated" condition. If stage 591/0 is energised and counter 591 receives a voltage pulse on lead 592, stage 591/0 becomes de-energised and stage 591/1 becomes energised; and the receipt of a further pulse on lead 592 then causes stage 591/1 to become de-energised and stage 591/0 to become re-energised. Counters 590 and 591 are respectively provided with re-setting leads 587/3 and 587/4, both of which leads are connected to lead 587/5 and thus to lead 587, as shown; and the application of a voltage pulse on leads 587/3 and 587/4 will, if any stages of these counters other than stages 590/0 and 591/0 (respectively) are energised immediately before the application of the said voltage pulse, cause such other stages to become de-energised and stages 590/0 and 591/0 to become energised, while if stage 590/0 or 591/0 is already energised at the time when the said pulse is applied, the already energised stage 590/0 and/or 591/0 will remain unaffected (i.e. will remain energised). Counters 590 and 591 are connected with composite gate 593 in precisely the same manner as counters 584 and 585 are connected with composite gate 588: accordingly, when voltage is applied by lead 589/2 to the permissory input of composite gate 593, energisation of stage 590/0 will cause gate 593 to apply voltage to terminal $c0$, energisation of stage 590/1 will cause voltage to be applied by the said gate to terminal $c1$, energisation of stage 590/2 will cause voltage to be applied to terminal $c2$, and energisation of stages 590/3 and 590/4, respectively, will cause voltage to be applied to terminal $c3$ and to terminal $c4$, respectively. Equally, when voltage is being applied by lead 589/2 to the permissory input of gate 593, energisation of stage 591/0 will cause voltage to be applied to terminal $c5$ and energisation of stage 591/1 will cause voltage to be applied to terminal $c6$.

Leads 589/0 and 589/1 are both connected to lead 589 which is in turn connected to lead 594. One end of lead 594 is connected to one of the inputs to two-gate 555, and the other end of lead 594 is connected to the output of multivibrator 595.

The equipment associated with lead 577, is again identical with that associated with lead 575. Lead 577 is, as shown, connected to the input of counter 596 having five stages marked 0, 1, 2, 3, 4 respectively. In the "unoperated" condition of counter 596, stage 596/0 is energised; and four successive voltage pulses applied on lead 599 will respectively cause stages 1, 2, 3 and 4 to become energised in succession, the previously-energised stage being de-energised when the succeeding stage is energised. The application of a fifth pulse on lead 577 will (if stage 596/4 is energised) cause stage 596/4 to become de-energised, stage 596/0 to become re-energised, and counter 597 to receive a voltage pulse on lead 598. Counter 597 has two stages, respectively marked 0 and 1, stage 0 being energised when counter 597 is in its "unoperated" condition. If stage 597/0 is energised and counter 597 receives a voltage pulse on lead 598, stage 597/0 becomes de-energised and stage 597/1 becomes energised; and the receipt of a further pulse on lead 598 then causes stage 597/1 to become de-energised and stage 597/0 to become re-energised. Counters 596 and 597 are respectively provided with re-setting leads 587/6 and 587/7, both of which leads are connected to lead 587/5 and thus connected to lead 587, as shown; and the application of a voltage pulse on leads 587/6 and 587/7 will, if any stages of these counters other than stages 596/0 and 597/0 (respectively) are energised immediately before the application of the said voltage pulse, cause such other stages to become de-energised and stages 596/0 and 597/0 to become energised, while if stage 596/0 or stage 597/0 is already energised at the time when the said pulse is applied, the already-energised stage 596/0 and/or 597/0 will remain unaffected (i.e. will remain energised). Counters 596 and 597 are connected with composite gate 599 in precisely the same manner as counters 584 and 585 are connected with composite gate 588: accordingly, when voltage is applied by lead 600/1 to the permissory input of composite gate 599, energisation of stage 596/0 will cause gate 599 to apply voltage to terminal $d0$, energisation of stage 596/1 will cause voltage to be applied by the said gate to terminal $d1$, energisation of stage 596/2 will cause voltage to be applied to terminal $d2$, and energisation of stages 596/3 and 596/4, respectively, will cause voltage to be applied to terminal $d3$ and to terminal $d4$, respectively. Equally, when voltage is applied by lead 600/1 to the permissory input of gate 599, energisation of stage 597/0 will cause voltage to be applied to terminal *d*5 and energisation of stage 597/1 will cause voltage to be applied to terminal *d*6.

Once again, the equipment associated with lead 578 is identical with that associated with lead 575. Lead 578 is, as shown, connected to the input of counter 601 having five stages marked 0, 1, 2, 3 and 4 respectively. In the "un-operated" condition of counter 601, stage 601/0 is energised, and four successive voltage pulses applied on lead 578 will respectively cause stages 1, 2, 3 and 4 to become energised in succession, the previously-energised stage being de-energised when the succeeding stage is energised. The application of a fifth pulse on lead 578 will (if stage 601/4 is energised) cause stage 601/4 to become de-energised, stage 601/0 to become reenergised, and counter 602 to receive a voltage pulse on lead 603. Counter 602 has two stages, respectively marked 0 and 1, stage 0 being energised when counter 602 is in its "unoperated" condition. If stage 602/0 is energised and counter 602 receives a voltage pulse on lead 603, stage 602/0 becomes de-energised and stage 602/1 becomes energised; and the receipt of a further pulse on lead 603 then causes stage 602/1 to become de-energised and stage 602/0 to become re-energised. Counters 601 and 602 are respectively provided with re-setting leads 587/8 and 587/9, both of which leads are connected to lead 587, as shown; and the application of a voltage pulse on leads 587/8 and 587/9 will, if any stages of these counters other than stages 601/0 and 602/0 (respectively) are energised immediately before the application of the said voltage pulse, cause such other stages to become de-energised and stages 601/0 and 602/0 to become energized, while if stage 601/0 or stage 602/0 is already energised at the time when the said pulse is applied, the already-energized stage 601/0 and/or 602/0 will remain energised. Counters 601 and 602 are connected with composite gate 604 in precisely the same manner as counters 584 and 585 are connected with composite gate 588: accordingly, when voltage is applied by lead 600/2 to the permissory input of composite gate 604, energisation of stage 601/0 will cause gate 604 to apply voltage to terminal *u*0, energisation of stage 601/1 will cause voltage to be applied by the said gate to terminal *u*1, energisation of stage 601/2 will cause voltage to be applied to terminal *u*2, and energisation of stages 601/3 and 601/4, respectively, will cause voltage to be applied to terminal *u*3 and terminal *u*4, respectively. Equally, when voltage is applied by lead 600/2 to the permissory input of gate 604, energisation of stage 602/0 will cause voltage to be applied to terminal *u*5 and energisation of stage 602/1 will cause voltage to be applied to terminal *u*6.

Leads 600/1 and 600/2 are connected to lead 600, which is in turn connected to lead 594 and thus to the output of multivibrator 595.

One input of multivibrator 595 is connected by lead 605 to the output of four-gate 580; and when a pulse is applied from four-gate 580 via lead 605 to multivibrator 595, the said multivibrator gives an output voltage on lead 594. The other input to multivibrator 595 is connected by lead 606 to lead 581 and thus to terminal 529. This input is a re-setting input, and operates on the lagging edge of the pulse applied on lead 606 (as is indicated by the "*x*" on lead 606 adjacent to multivibrator 595). Thus when there is applied to four-gate 580, (i) voltage on lead 579 from stage 5 of counter 572, (ii) a C4 pulse from terminal 529 and lead 581, (iii) a D4 pulse from terminal 530 lead 582, and (iv) a pulse (derived from a D5 pulse) from terminal 531 and lead 583, four-gate 580 gives an output on lead 605 to multivibrator 595 which causes that multivibrator to give an output voltage on lead 594. But when the C4 pulse ends, the lagging edge of the C4 pulse on lead 606 re-sets multivibrator 595 to a condition in which it gives no output on lead 594.

Lead 587 (with which, it will be remembered, are connected the re-setting leads 587/1, 587/2, 587/3, 587/4, 587/6, 587/7, 587/8, 587/9, of counters 584, 585, 590, 591, 596, 597, 601, 602, respectively), and lead 573 (which is connected to the re-setting input of counter 572), are connected by lead 607 to the output of a one-gate 608 which has two inputs. The first of these inputs is a negatory input on lead 609 which is connected to the output of a widening circuit 610 whose input is fed by branch lead 554/3 from lead 554 and thus from the output of three-gate 553. The second input to one gate 608 is connected by lead 611 to the output of a trailing edge pulse former 612, which gives an output at the lagging edge of a pulse applied to the input of device 612 by lead 613 which is connected to lead 594. One-gate 608 accordingly gives an output voltage on lead 607 (which voltage is applied by the respective leads, as already described, to reset all the counters) if:

(i) No voltage is applied to the negatory input of one-gate 608 by lead 609 (i.e. if there is no output from three-gate 553, because no pulses are being received by the latter three-gate from register control unit K/7), or (ii) Notwithstanding the application of voltage by lead 609 to the negatory input of one-gate 608, if one-gate 608 receives an input on lead 611 from device 612.

Widening circuit 610 is, like widener 565, designed to give a steady voltage output on lead 609 for so long as there is applied to it a steady train of ½ micro-second pulses at intervals of 100 micro-seconds, but to detect (i.e. its output is interrupted) if the said train is interrupted for a milli-second or more.

*Operation of Register*

It has already been explained, in the course of the foregoing description, that when a calling subscriber lifts his receiver to initiate a call, a register will, as soon as one is available, be allocated to his use and that this causes a train of ½ micro-second register channel pulses (repeated at intervals of 100 micro-seconds) to be applied via terminals 523, 524 and 525 to three-gate 553, thus causing this three-gate to emit a synchronous train of pulses on leads 554, 554/1, 554/2 and 554/3. It has also been explained that:

(i) The pulses on lead 554/3 cause a negatory input to be applied to one-gate 608;

(ii) The pulses on lead 554/2 cause two-gate 557 to apply to terminal 430 (and thus to transmit to the calling subscriber) corresponding pulses modulated by dialling tone (since multivibrator 567 will, when the register was previously cleared for use by another subscriber, have been set to give an output on lead 569 to two-gate 561), and (iii) The pulses on lead 554/1 cause two-gate 556 to apply synchronous pulses from terminal 429 to widening circuit 565.

It has also been remarked that the pulses applied to widening circuit 565 are those of the register channel train allocated to the calling subscriber now under consideration, to whom this register (viz. register K/5) has been allocated. Thus widening circuit 565 starts to give an output as soon as the register channel pulses are applied to it. This steady voltage output is applied by lead 566/1 to multivibrator 567, which does not respond (since this initial application of voltage constitutes the leading edge of the pulse applied to the said multivibrator); and this voltage is also applied by lead 566 to slow operate device 570, which does give an output after 200 milli-seconds on lead 571 which de-energises stage 0 and energises stage 1 of counter 572. The said steady voltage from circuit 565 is further applied by leads 566 and 566/2 to the permissory input of composite gate 574; but since the initial application of such voltage to said permissory input constitutes the leading edge of the pulse on lead 566/2, and since stage 572/1 is not energised until 200 milli-seconds after the instant when the said leading edge occurs on lead 566/2, gate 574 does not give an output at the instant when the said leading edge occurs. The register is, however, now in a condition to respond to dialling impulses.

Suppose the calling subscriber now begins to dial. It has already been explained that a dialling impulse is constituted by an interruption of the register pulse train. Accordingly, at the beginning of the first dialling impulse, the register pulse train is interrupted and the voltage from widener 565 is interrupted. This interruption constitutes the lagging edge of the voltage output from widener 565, and the appearance of this lagging edge on lead 566/1 actuates multivibrator 567, causing it to cease to give an output on lead 569, thus stopping the output from two-gate 561 (i.e. suppressing the supply of dialling tone to two-gate 555 and thus to the calling subscriber). At the end of the interruption of the register pulse train (i.e. at the end of the first dialling impulse), the register pulse train re-appears at terminal 429 and is applied via lead 563, two-gate 556 and lead 564 to widener 565, so that a steady voltage re-appears on lead 566. This constitutes the leading edge of a new pulse on lead 566: the said leading edge has no effect on multivibrator 567; but the said leading edge also appears on lead 566/2 (from lead 566) and is applied to the permissory input of gate 574 which, since stage 1 of counter 572 is now energised, accordingly gives an output pulse on lead 575 which is applied to the input of counter 584 causing stage 0 of that counter to be de-energised and stage 1 to become energised.

The next operation in the sequence depends on whether this first dialling impulse results from the dialling of the digit 1 or from the dialling of some other digit. If it results from the dialling of the digit 1, this first dialling impulse will be followed by an inter-digital pause and there will (as previously set out in the explanation of the operation of slow operate device 570) then be time for device 570 to operate; and if device 570 does operate, it will emit a pulse on lead 571 which will cause stage 1 of counter 572 to become deenergised and stage 572/2 to become energised. If that occurred, the next dialling impulse would cause a pulse next to be emitted on lead 576 to counter 590 (as will become clear as this description proceeds); but it will be assumed that the number which is being dialled by the calling subscriber is 0502, so that the first dialling impulse is not followed by an inter-digital pause but merely by the short pause between dialling impulses forming a single digit. In this case, therefore, there is not time for device 570 to give an output to counter 572 before the register pulse train is interrupted by the next dialling impulse (of which there are 10 for the first digit, since the first digit is 0). When the register pulse train is interrupted by the said next dialling impulse there is, of course, a further trailing edge of the voltage pulse which had previously existed on leads 566 and 566/1 from widener 565 to multivibrator 567; but since multivibrator 567 has already been so set (by the previous trailing edge) as to give no output on lead 569, the said further trailing edge has no effect on multivibrator 567. At the end of the interruption of the register pulse train by the said next dialling impulse, the said train is restored at terminal 429, widener 565 again gives a voltage output on lead 566, which voltage is applied by lead 566/2 to the permissory input of composite gate 574; and since the re-application of voltage on lead 566/2 constitutes a new leading edge of a pulse, and since stage 1 of counter 572 is still energised, gate 574 gives out a second pulse on lead 575 to counter 584, de-energising stage 584/1 and energising stage 584/2.

It will thus be seen that the first two interruptions of the register pulse train by the first two dialling impulses have caused two pulses to be emitted on lead 575; and since it is the digit 0 which is first being dialled (for the wanted number 0502), there will be ten interruptions (before the first inter-digital pause) and accordingly ten pulses will be emitted by gate 574 on lead 575 to constitute the first digit. It has already been explained in the course of the description relating to counters 584 and 585, that ten such pulses take both counters through one complete cycle, resulting in a final state in which stage 0 of counter 584 and stage 0 of counter 585 are energised.

The dialling of the first digit of the number 0502 having thus been completed, there follows the first inter-digital pause. Slow operate device 570 now has time to operate; and it accordingly emits a voltage pulse on lead 571 which causes stage 1 of counter 572 to become de-energised and stage 2 to become energised.

The calling subscriber now dials the second digit (viz. 5) of the wanted number. This causes, as will be appreciated from the foregoing description, five interruptions of the register pulse train. The interruptions (which constitute trailing edges of the voltage applied to leads 566 and 566/1) have no effect on multivibrator 567, since it has remained in the state in which it gives no output on lead 569; but at the end of each of the five interruptions (i.e. the end of each of the five dialling impulses) there is a restoration of voltage on leads 566 and 566/2 from widener 565, and each such restoration constitutes the leading edge of a new pulse input to the permissory input of composite gate 574 which, since stage 2 of counter 572 is now energised, accordingly gives five output pulses on lead 576 to the input of counter 590, the first four pulses causing stages 590/1, 590/2, 590/3 and 590/4 to be energised in succession (preceding stages becoming de-energised) and the fifth pulse causing stage 590/4 to be de-energised, stage 590/0 to be re-energised and (owing to the pulse emitted on lead 592 when stage 590/4 is de-energised) stage 591/0 to be de-energised and stage 591/1 to be energised (in counter 591). There has, of course, been no inter-digital pause during the emission of the five dialling impulses corresponding to the digit 5, and slow operate device 570 has accordingly not had time to operate; but those five dialling impulses having been emitted, an inter-digital pause follows, device 570 emits a pulse on lead 571, and stage 2 of counter 572 is accordingly now de-energised and stage 572/3 becomes energised.

The calling subscriber now dials the third digit (viz. 0) of the wanted number. This causes ten interruptions of the register pulse train, having no effect on multivibrator 567, but producing ten leading edges of voltage pulses (at the end of each interruption by each dialling impulse) on leads 566 and 566/2 which are applied to the permissory input of composite gate 574. Since stage 3 of counter 572 is now energised, gate 574 accordingly emits ten voltage pulses on lead 577 which are applied to counter 596; and just as the application of ten pulses to counter 584 caused counters 584 and 585 to step through one complete cycle, so does the application of ten pulses to counter 596 cause counters 596 to 597 to step through a complete cycle, leaving them in the state in which stage 0 of counter 596 and stage 0 of counter 597 are energised.

During the emission of the ten pulses constituting the third digit aforesaid there is, of course, no inter-digital pause and slow operate device 570 does not have time to operate. At the end of the third digit, however, device 570 operates during the inter-digital pause, giving an output pulse on lead 571 which de-energises stage 3 and energises stage 4 of counter 572. Accordingly, when the calling subscriber now dials the last digit (viz. 2) of the wanted number, the two interruptions (constituting the dialling impulses) of the register pulse train have the effect that, at each restoration of the register pulse train at the end of each dialling impulse, a new leading edge of a pulse is transmitted via leads 566 and 566/2 to the permissory input of composite gate 574. Gate 574 therefore emits two pulses; and since stage 572/4 is now energised, these pulses are emitted over lead 578 to the input of counter 601. This first de-energises stage 601/0 and energises stage 601/1, and then de-energises stage 601/1 and energises stage 601/2. Counter 602 receives, as will be appreciated, no impulse on lead 603, since not enough pulses have been received by counter 601 to energise and then de-energise stage 601/4: counter 602 accordingly remains in its "unoperated" condition, with stage 0 energised and stage 1 de-energised.

Dialling having thus been completed and the register pulse train having been restored at terminal 429, voltage will have been re-applied by widener 565 to lead 566 and thus to the input of slow operate device 570, which, after 200 milli-seconds, applies voltage to lead 571, thus de-energising stage 4 of counter 572 and energising stage 5 of that counter. An output voltage is accordingly now applied by stage 572/5 to lead 579 and thus to one of the inputs of four-gate 580. There will next come a time, a fraction of a second later, when pulse generator K/1 omits pulses C4, D4 and D5 contemporaneously; and when pulses C4 and D4, and the short pulse coinciding with the beginning of the D4 pulse, are respectively applied to terminals 529, 530 and 531, and thus to the three remaining inputs of four-gate 580, four-gate 580 will give a pulse output on lead 605 which is applied to the input of multivibrator 595, and causes the latter to give an output voltage on lead 594. As has already been remarked, the fact that register K/5 cannot complete its operations until it has simultaneously received pulses C4, D4 and the short pulse derived from D5, ensures that it cannot complete its operations while some other register is giving an output; and it may here be pointed out that should pulses C4, D4 and D5 be simultaneously emitted by pulse generator K/1 at a time before the completion of the operation of setting counters 584, 585, 590, 591, 596, 597, 601 and 602 by the dialling impulses had been completed, there would have been no output from register K/5 at the time last mentioned, because stage 572/5 does not give an output (and there is therefore no voltage applied by lead 579 to the corresponding input to four-gate 580) before the dialling operation has been completed.

The appearance of a voltage on lead 594 (as mentioned in the preceding paragraph) causes voltage to appear on leads 589 and 600 and thus on leads 589/1, 589/2, 600/1 and 600/2, respectively; and the appearance of these voltages accordingly causes gates 588, 593, 599 and 604 to apply voltages to the terminals corresponding to their respectively energised stages, as follows:

| Gate | Energised stages | Terminals receiving voltage |
| --- | --- | --- |
| 588 | 584/0, 585/0 | m0, m5 |
| 593 | 590/0, 591/1 | c0, c6 |
| 599 | 596/0, 597/0 | d0, d5 |
| 604 | 601/2, 602/0 | u2, u5 |

The voltage on lead 594 is also applied to two-gate 555; and since the latter two-gate is receiving, at 100 micro-second intervals, ½ micro-second pulses from lead 554 in synchronism with the register pulse train, it now re-emits such synchronous pulses on lead 558 and applies them to terminal 532, whence they are applied to lead 535 (see FIGURE 8) and thus to terminal 244 in register channel temporary store sub-unit 193 in every section control unit. As will appear later in this description, the only section control unit which responds to these pulses is that section control unit which (initially) had stored in it the free register pulse train which synchronised with the register pulse train now being emitted on lead 535.

The voltage on lead 594 is in addition applied to lead 613 and thus to the input of trailing edge pulse former 612. Since device 612 is a trailing edge pulse former, it does not respond to the initial application of this voltage. But at the end of the C4 pulse when, as already mentioned, the lagging edge of the C4 pulse resets multi-vibrator 595 so that it no longer gives a voltage output on lead 594, the voltage applied to lead 613 and thus to the input to device 612 is likewise removed; and this provides the lagging edge of the pulse which operates device 612. Device 612 accordingly now applies a voltage pulse to lead 611 and thus to the input of one-gate 608, which accordingly emits a re-setting pulse on lead 607 which in turn applies this re-setting pulse to leads 573 and 587. This pulse re-sets all the counters to their "unoperated" condition, as follows:

(i) The re-setting pulse on lead 573 is applied to stage 0 of counter 572, thus energising stage 0 and de-energising stage 572/5 (and incidentally removing voltage from lead 579 to one input of four-gate 580):

(ii) The re-setting pulse on lead 587 is applied by leads 587/1 and 587/2 to counters 584 and 585 respectively, by lead 587/5 and leads 587/3, 587/4, 587/6, 587/7 to counters 590, 591, 596, 597 respectively and is applied by leads 587/8 and 587/9 to counters 601 and 602 respectively—thus ensuring that it is stage 0 of every counter which is energised after the application of the said re-setting pulse.

By the time that the said re-setting pulse is applied to the said counters, the voltages previously applied to terminals m0, m5, c0, c6, d0, d5, u2, u5 will have performed their functions via converter K/3 as described in the next section of this specification. The register having thus fulfilled its function when the dialling has been properly completed by a calling subscriber, is now ready to be released to serve another subscriber who wishes to make a call. The details of the release operation are described later, but it may be stated here that the basic operation in releasing a register consists in the stoppage of the application of pulses of the register train to three gate 553. It will be remembered that it was pointed out, at the end of the preceding section of this specification (describing the register control and channel pulse store unit K/7), that when a call has been successfully set up from a calling to a called subscriber, the register pulse train (previously allotted to the call) ceases to be emitted by K/7, and that the emission of the said register pulse train similarly ceases if the forced release arrangements in unit K/7 operate. Similarly, the said register pulse train will cease if the calling subscriber replaces his instrument before his call to the called subscriber has been completely set up.

Now it has been above described how re-setting pulses are applied to the counters in register K/5, after the completion of dialling, by the action of device 612. For completeness, it should be added that if, before the operation of device 612 in the way just mentioned, pulses of the register pulse train cease to be applied to three-gate 553, re-setting pulses will likewise be applied to the counters in register K/5. For when the pulses of the register train cease to be applied to three-gate 553 and that gate accordingly ceases to give an output, the input on lead 554/3 to widener 610 ceases, and the steady voltage which widener 610 had been applying to lead 609 for so long as the register pulse train was being applied to three-gate 553, accordingly ceases likewise. The cessation of the application of voltage to lead 609 means that there is no longer a negatory input to one-gate 608; and this gate accordingly gives a voltage output on lead 607 which has the effect of re-setting all of counters 572, 584, 585, 590, 591, 596, 597, 601 and 602 to their "unoperated" condition in which stage 0 of all of the said counters is energised.

*Converter*

Figure 9:
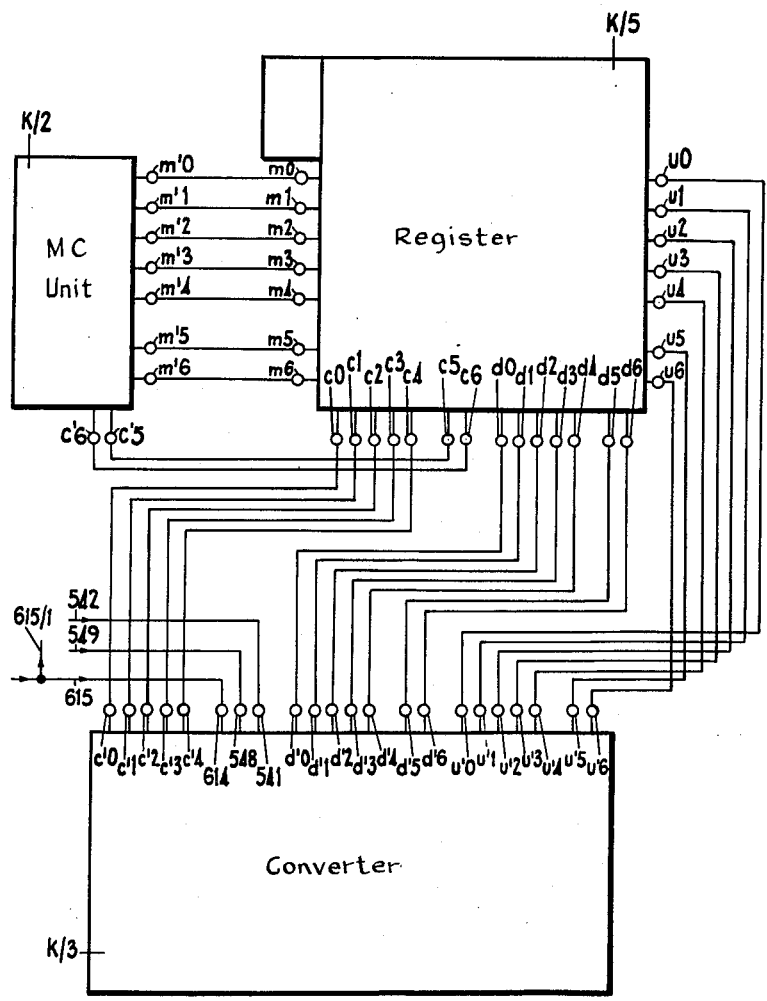

A description has been given in the preceding section of this specification of the manner in which dialling impulses transmitted by a calling subscriber set counters in a register to states corresponding to the numbers of dialling impulses received by the register. The result of so setting these counters is that, at the appropriate instant, voltages are applied (as described) to terminals belonging to the set $m0, m1, m2, m3, m4, m5, m6$, to terminals belonging to the set $c0, c1, c2, c3, c4, c5, c6$, to terminals belonging to the set $d0, d1, d2, d3, d4, d5, d6$, and to terminals belonging to the set $u0, u1, u2, u3, u4, u5, u6$. FIGURE 9 shows the manner in which these sets of terminals are connected to MC unit K/2 and converter K/3, while FIGURE 10 shows a diagram of converter K/3.

As shown in FIGURE 9, each of terminals $m0, m1, m2, m3, m4, m5, m6$, on register K/5 is respectively connected to a corresponding terminal $m'0, m'1, m'2, m'3, m'4, m'5$, or $m'6$ on MC unit K/2; and terminals $c5$ and $c6$ are likewise respectively connected to terminals $c'5$, and $c'6$ on MC unit K/2. Terminals $c0, c1, c2, c3, c4$ are respectively connected, as shown, to terminals $c'0, c'1, c'2, c'3, c'4$, on converter K/3: terminals $d0, d1, d2, d3, d4, d5, d6$ on register K/5 are respectively connected to terminals $d'0, d'1, d'2, d'3, d'4, d'5, d'6$ on converter K/3; and terminals $u0, u1, u2, u3, u4, u5, u6$ on register K/5 are respectively connected to terminals $u'0, u'1, u'2, u'3, u'4, u'5, u'6$ on converter K/3.

None of the other 49 registers incorporated in the exchange is shown in FIGURE 9; but, as regards connections of the kind referred to in the preceding paragraph, the arrangements are similar to those for register K/5. That is to say, terminals $m'0, m'1, m'2, m'3, m'4, m'5, m'6$ on MC unit K/2 are connected to terminals $m0, m1, m2, m3, m4, m5, m6$ respectively, on register K/6, and to the respectively corresponding terminals on every other register. Terminals $c'5$ and $c'6$ are connected to terminals $c5$ and $c6$, respectively, on register K/6 and to the respectively corresponding terminals on every other register. Terminals $c'0, c'1, c'2, c'3, c'4$ on converter K/3 are connected to terminals $c0, c1, c2, c3, c4$, respectively, on register K/6 and to the respectively corresponding terminals on every other register. Terminals $d'0, d'1, d'2, d'3, d'4, d'5, d'6$ on converter K/3 are connected to terminals $d0, d1, d2, d3, d4, d5, d6$ respectively on register K/6, and to the respectively corresponding terminals on every other register. Terminals $u'0, u'1, u'2, u'3, u'4, u'5, u'6$, on converter K/3 are connected to terminals $u0, u1, u2, u3, u4, u5, u6$ respectively on register K/6 and to the respectively corresponding terminals on every other register.

In addition to the terminals already enumerated, FIGURE 9 shows terminal 541 to which is connected lead 542, and terminal 548 to which is connected lead 549, which terminals 541 and 548, and leads 542 and 549, are shown in FIGURE 8. FIGURE 9 further shows converter K/3 as provided with terminal 614 to which is connected lead 615, whose end (not shown in FIGURE 9) remote from converter K/3 is connected to terminal 345 in register channel temporary store sub-unit 193 in section control unit A/2 and to terminal 345 in the register channel temporary store sub-unit in every other section control unit; and lead 615 is also connected by lead 615/1 to terminal 490 in register control unit K/7.

Turning now to FIGURE 10, it will be seen that terminals $c'0, c'1, c'2, c'3, c'4$ (to be found in the top left-hand corner of the figure) are each connected respectively to one input of one-gates 616, 617, 618, 619, 620 (which are shown below the said terminals). To the left of these one-gates is shown a composite gate 621. gate 621 is (like gate 574 described in connection with FIGURE 7) in essence an assembly of two-gates, but is again treated as a single entity for clarity of presentation. Composite gate 621 has, as will be seen from FIGURE 10, five input terminals, respectively marked C0, C1, C2, C3, C4, which are respectively connected (by leads not shown) to terminals C0, C1, C2, C3, C4 on pulse generator K/1. Gate 621 is so arranged that, provided no voltage is applied on its negatory input by lead 622, the said gate will, if voltages be applied as set out below to any one of its input terminals, give a corresponding output voltage which is applied to a second input of the respective one-gate specified below:

| Terminal of converter K/3 to which voltage is applied | One-gate having voltage applied to its second input |
|---|---|
| C0 | 616 |
| C1 | 617 |
| C2 | 618 |
| C3 | 619 |
| C4 | 620 |

If voltage is being applied on lead 622 at the time when voltage is applied to any of terminals C0, C1, C2, C3, C4 of converter K/3, composite gate 621 does not, of course, apply voltage to the second input of any of one-gates 616, 617, 618, 619, 620.

It will similarly be seen from FIGURE 10 that terminals $d'0, d'1, d'2, d'3, d'4, d'5, d'6$ are each connected respectively to one input of one-gates 623, 624, 625, 626, 627, 628, 629. To the left of these one-gates is shown a composite gate 630 provided with seven input terminals respectively marked D0, D1, D2, D3, D4, D5, D6, which are respectively connected (by leads not shown) to terminals D0, D1, D2, D3, D4, D5, D6 on pulse generator K/1. Gate 630 is so arranged that, provided no voltage is applied on its negatory input by lead 622/1 (which is connected to lead 622), the said gate will, if voltage be applied as set out below to any one if its input terminals, give a corresponding output voltage which is applied to a second input of the respective one-gate specified below:

| Terminal of converter K/3 to which voltage is applied | One-gate having voltage applied to its second input |
|---|---|
| D0 | 623 |
| D1 | 624 |
| D2 | 625 |
| D3 | 626 |
| D4 | 627 |
| D5 | 628 |
| D6 | 629 |

If voltage is being applied on lead 622/1 at the time when voltage is applied to any of terminals D0, D1, D2, D3, D4, D5, D6 of converter K/3, composite gate 630 does not, of course, apply voltage to the second input of any of one-gates 623, 624, 625, 626, 627, 628, 629.

It will again be seen from FIGURE 10 that terminals $u'0, u'1, u'2, u'3, u'4, u'5, u'6$ are each connected respectively to one input of one-gates 631, 632, 633, 634, 635, 636, 637. To the left of these one-gates is shown a composite gate 638 provided with seven input terminals respectively marked U0, U1, U2, U3, U4, U5, U6, which are respectively connected (by leads not shown) to terminals U0, U1, U2, U3, U4, U5, U6 on pulse generator K/1. Gate 638 is so arranged that, provided no voltage is applied on its negatory input by lead 622/2 (which is connected to lead 622), the said gate will, if voltage be applied as set out below to any one of its input terminals, give a corresponding output voltage which is applied to a second input of the respective one-gate specified below:

| Terminal of converter K/3 to which voltage is applied | One-gate having voltage applied to its second input |
|---|---|
| U0 | 631 |
| U1 | 632 |
| U2 | 633 |
| U3 | 634 |
| U4 | 635 |
| U5 | 636 |
| U6 | 637 |

If voltage is being applied on lead 622/2 at the time when voltage is applied to any of terminals U0, U1, U2, U3, U4, U5, U6 of converter K/3, composite gate 638 does not, of course, apply voltage to the second input of any of one-gates 631, 632, 633, 634, 635, 636, 637.

Reverting now to the group of one-gates connected to terminals $c'0$, $c'1$, $c'2$, $c'3$, $c'4$, it will be seen that the output of one-gate 616 is connected by lead 639 with one input of one-gate 640 whose output is in turn connected by lead 641 with one input of composite gate 642. Similarly:

One-gate 617 is connected by lead 643 with one input of one-gate 644 whose output is connected by lead 645 with a second input of composite gate 642:

One-gate 618 is connected by lead 646 with one input of one-gate 647 whose output is connected by lead 648 with a third input of composite gate 642:

One-gate 619 is connected by lead 649 with one input of one-gate 650 whose output is connected by lead 651 with a fourth input of composite gate 642:

One-gate 620 is connected by lead 652 with one input of one-gate 653 whose output is connected by lead 654 with a fifth input of composite gate 642.

Composite gate 642 is so arranged that, provided no voltage is applied on its negatory input by lead 655, the application of voltage on lead 641 will result in the application of voltage to output terminal T1 of gate 642, the application of voltage on lead 645 will result in the application of voltage on to terminal T2 of gate 642, and similarly, the application of voltage on leads 648, 651, and 654 will result in the application of voltage on terminals T3, T4, T5, respectively, of gate 642. If voltage is applied by lead 655 to the negatory input of gate 642, no output voltage will appear on any of terminals T1, T2, T3, T4, T5 when voltage is applied to any of leads 641, 645, 648, 651, 654.

It will further be seen from FIGURE 10 that a pair of composite gates, 656 and 657, respectively, are associated with the group of leads 639, 643, 646, 649, 652, to provide additional interconnections between the leads of the said group and one-gates 640, 644, 647, 650, 653. That is to say, as indicated by the leads and arrows, lead 639 is connected to a first input of gate 656 and to a first input of gate 657, lead 643 is connected to a second input of gate 656 and to a second input of gate 657; and leads 646, 649, and 652 are connected respectively to a third, a fourth and a fifth input of gate 656, and the said leads are likewise connected to a third, a fourth and a fifth input of gate 657 respectively. Provided there is a voltage applied by lead 658 to the permissory input of gate 656, the said gate will, if voltage be applied as set out below to any one of the said leads 639, 643, 646, 649, 652, give an output voltage on the corresponding lead specified below, which voltage is accordingly applied to a second input of the corresponding one-gate likewise specified below.

| Lead to which voltage is applied | Lead receiving voltage from composite gate 656 | One-gate having voltage applied to its second input |
|---|---|---|
| 639 | 659 | 644 |
| 643 | 660 | 647 |
| 646 | 661 | 650 |
| 649 | 662 | 653 |
| 652 | 663 | 640 |

Similarly, provided there is a voltage applied by lead 664 to the permissory input of gate 657, the said gate will, if voltage be applied as set out below to any one of leads 639, 643, 646, 649, 652, give an output voltage on the corresponding lead specified below and accordingly apply voltage to a second input of the corresponding one-gate likewise specified below.

| Lead to which voltage is applied | Lead receiving voltage from composite gate 657 | One-gate having voltage applied to its second input |
|---|---|---|
| 639 | 665 | 647 |
| 643 | 666 | 650 |
| 646 | 667 | 653 |
| 649 | 668 | 640 |
| 652 | 669 | 644 |

Considering next the group of one-gates connected to terminals $d'0$, $d'1$, $d'2$, $d'3$, $d'4$, it will be seen that the output of one-gate 623 is connected by lead 670 with one input of one-gate 671 whose output is in turn connected by lead 672 with one input of composite gate 673. Similarly:

One-gate 624 is connected by lead 674 with one input of one-gate 675 whose output is connected by lead 676 with a second input of composite gate 673:

One-gate 625 is connected by lead 677 with one input of one-gate 678 whose output is connected by lead 679 with a third input of composite gate 673:

One-gate 626 is connected by lead 680 with one input of one-gate 681 whose output is connected by lead 682 with a fourth input of composite gate 673:

One-gate 627 is connected by lead 683 with one input of one-gate 684 whose output is connected by lead 685 with a fifth input of composite gate 673.

Composite gate 673 is so arranged that provided a voltage is applied to its permissory input by lead 686, the application of voltage on a lead of the group 672, 676, 679, 682, 685 will have results as follows:

Voltage on lead 672 causes voltage to be applied by gate 673 to one input of one-gate 687 which then gives an output voltage on lead 688 which is applied to terminal T11:

Voltage on lead 676 causes voltage to be applied by gate 673 to one input of one-gate 689 which then gives an output voltage on lead 690 which is applied to terminal T12:

Voltage on lead 679 causes voltage to be applied by gate 673 to one input of one-gate 691 which then gives an output voltage on lead 692 which is applied to terminal T13:

Voltage on lead 682 causes voltage to be applied by gate 673 to one input of one-gate 693 which then gives an output voltage on lead 694 which is applied to terminal T14:

Voltage on lead 685 causes voltage to be applied by gate 673 to one input of one-gate 695 which then gives an output voltage on lead 696 which is applied to terminal T15.

It will likewise be seen from FIGURE 10 that a pair of composite gates 697 and 698 (shown near the centre of the figure), respectively, are associated with the group of leads 670, 674, 677, 680, 683, to provide additional interconnections between the leads of the said group and one-gates 671, 675, 678, 681, 684. That is to say, as indicated by the leads and arrows, lead 670 is connected to a first input of gate 697 and to a first input of gate 698, lead 674 is connected to a second input of gate 697 and to a second input of gate 698; and leads 677, 680 and 683 are connected respectively to a third, a fourth and a fifth input of gate 697, and the said leads are likewise connected to a third, a fourth and a fifth input of gate 698, respectively. Provided there is a voltage applied by lead 699 to the permissory input of gate 697, the said gate will, if voltage be applied as set out below to any one of the said leads 670, 674, 677, 680, 683, give an output voltage on the corresponding lead specified below and accordingly apply voltage to a second input of the corresponding one-gate likewise specified below.

| Lead to which voltage is applied | Lead receiving voltage from composite gate 697 | One-gate having voltage applied to its second input |
|---|---|---|
| 670 | 700 | 675 |
| 674 | 701 | 678 |
| 677 | 702 | 681 |
| 680 | 703 | 684 |
| 683 | 704 | 671 |

Similarly, provided there is a voltage applied by lead 705 to the permissory input of gate 698, the said gate will, if voltage be applied as set out below to any one of leads 670, 674, 677, 680, 683, give an output voltage on the corresponding lead specified below and accordingly apply voltage to a second input of the corresponding one-gate likewise specified below.

| Lead to which voltage is applied | Lead receiving voltage from composite gate 698 | One-gate having voltage applied to its second input |
|---|---|---|
| 670 | 706 | 678 |
| 674 | 707 | 681 |
| 677 | 708 | 684 |
| 680 | 709 | 671 |
| 683 | 710 | 675 |

Considering thirdly the group of one-gates connected to terminals $u'0$, $u'1$, $u'2$, $u'3$, $u'4$, it will be seen that the output of one-gate 631 is connected by lead 711 with one input of composite gate 712. Similarly, one-gates 632, 633, 634, 635 are respectively connected by leads 713, 714, 715, 716 with the second, third, fourth and fifth input of composite gate 712. Composite gate 712 is so arranged that provided a voltage is applied to its permissory input by lead 717, the application of voltage on lead 711 will cause gate 712 to apply voltage to lead 718, the application of voltage on lead 713 will cause the said gate to apply voltage to lead 719, and, similarly, the application of voltage to leads 714, 715, 716 will cause voltage to be applied respectively to leads 720, 721, 722. Lead 718 is connected to a second input of one-gate 687; and accordingly the application of voltage to lead 718 causes one-gate 687 to give a voltage output on lead 688 which is applied to terminal T11. Similarly, lead 719 is connected to a second input of one-gate 689, so that the application of voltage to lead 719 causes one-gate 689 to apply voltage to terminal T12 via lead 690; and lead 720 is connected to a second input of one-gate 691, so that the application of voltage on lead 720 causes one-gate 691 to apply voltage to terminal T13 via lead 692. Likewise, leads 721 and 722 are respectively connected to a second input on one-gate 693 and on one-gate 695, so that the application of voltage on lead 721 and on lead 722 will respectively cause voltage to be applied to terminal T14 and T15 (via leads 694 and 696, respectively).

Again it will be seen from FIGURE 10 that the group of leads 641, 645, 648, 651, 654 (in the lefthand lower quadrant of the said figure) are also interconnected with terminals T11, T12, T13, T14, T15, as follows:

Lead 641 is connected by lead 723 to a first input of composite gate 724, while lead 645 is connected by lead 725 to a second input of composite gate 724; and similarly, leads 648, 651 and 654 are connected to a third, fourth and fifth input respectively, of gate 724, by leads 726, 727, 728, respectively. Provided a voltage is applied by lead 655/1 to the permissory input of composite gate 724, then, if voltage be applied to lead 723, gate 724 will give an output voltage on lead 729 which is applied to the third input of one-gate 687 causing voltage to be applied to terminal T11, while if voltage be applied to lead 725, gate 724 will give an output voltage on lead 730 which is applied to the third input of one-gate 689 thus causing voltage to be applied to terminal T12; and similarly, the application of voltage to leads 726, 727, 728 respectively will cause voltage to be applied (via lead 731, one-gate 691 and lead 692, via lead 732, one-gate 693 and lead 694, or via lead 733, one-gate 695 and lead 696, as the case may be) to terminal T13, T14, T15.

It will also be seen that leads 672, 676, 679, 682, 685 (lying in the lower half of FIGURE 10 vertically below terminals $d'0$, $d'1$, $d'2$, $d'3$, $d'4$) are respectively connected to the first, second, third, fourth and fifth inputs of a composite gate 734: for example, lead 672 is connected to the first input of gate 734 by lead 735, lead 676 is connected to the second input of gate 734 by lead 736, lead 685 is connected to the fifth input of gate 734 by lead 737. Composite gate 734 is so arranged that provided there is no voltage applied to its negatory input by lead 738 (which, it will be seen, is connected, as is lead 686, to lead 739), the application of voltage to lead 672 (and thus by lead 735 to the first input of gate 734) causes gate 734 to give a voltage output on lead 740/1 to terminal T6: similarly, provided there is no voltage on lead 738, the application of voltage to lead 676 causes gate 734 to give a voltage output on lead 740/2 to terminal T7; and, likewise, the application of voltage to leads 679, 682, 685 will cause gate 734 to give a voltage output to terminal T8, T9, T10, respectively, via leads 740/3, 740/4, 740/5, respectively as shown.

Again, it will be seen that, as indicated by the side lead 741 and arrow, lead 711 (in the upper right-hand quadrant of FIGURE 10, vertically below terminal $u'0$) is connected to the first input of composite gate 742; and provided that no voltage is applied by lead 743 to the negatory input of gate 742, the application of voltage to lead 711 (and thus to lead 741) will cause gate 742 to give a voltage output on lead 658 which is connected to the permissory input of composite gate 656. Similarly, leads 713, 714, 715, 716 are respectively connected as indicated by the side leads and arrows shown to the second, third, fourth and fifth inputs of composite gate 742 (for example, lead 716 is connected to the fifth input of gate 742 by lead 744). Accordingly, provided that no voltage is applied by lead 743 to the negatory input of gate 742, a voltage on lead 713 will cause gate 742 to apply voltage to lead 664 and thus to the permissory input of composite gate 657. Again, provided that no voltage is applied by lead 743 to the negatory input of gate 742, a voltage on lead 714 will cause gate 742 to apply voltage to lead 699 and thus to the permissory input of composite gate 697. Likewise, provided that no voltage is applied by lead 743 to gate 742, a voltage on lead 715 will cause gate 742 to apply voltage to lead 705 to the permissory input of composite gate 698. Finally, provided that no voltage is applied by lead 743 to gate 742, a voltage on lead 716 will cause gate 742 to apply voltage to lead 745 and thus to terminal T16. (Lead 745 will be found running vertically upwards from terminal T16—which is the right hand terminal at the bottom of FIGURE 10—to the fifth output of composite gate 742.)

Reverting now to terminals $d'5$, $d'6$, $u'5$ and $u'6$, it has already been mentioned that these terminals are connected respectively to one input of one-gates 628, 629, 636, 637. It will be seen that the output of one-gate 628 is connected by lead 746 to one input of two-gate 747 whose second input is connected (as shown) to lead 748 and thus to the output of one-gate 636, the output of two-gate 747 being (as shown) connected to lead 717 (and thus to the permissory input of composite gate 712) and also connected to lead 743 (and thus to the negatory input of composite gate 742). The output of one-gate 629 is connected to lead 749 and thus (as shown) to one input of two-gate 750 and to one input of two-gate 751. The second input of two-gate 750 is, as will be seen, connected to lead 748 and thus to the output of one-gate 636; and the output of two-gate 750 is connected to lead 739, thus being connected (via lead 686) to the permissory input of composite gate 673, and being connected (via lead 738) to the negatory input of composite gate 734. The second input of two-gate 751 is connected by lead 752 to the output of one-gate 637; and the output of two-gate 751 is connected to lead 655, thus being connected to the negatory input of composite gate 642 and also being connected (via lead 655/1) to the permissory input of composite gate 724.

Continuing with the description of the connections to terminals $u'5$ and $u'6$, it will be seen that the lead connecting terminal $u'5$ to one-gate 636 is provided with branch lead 753 which is connected to one input of one-gate 754; and the lead connecting terminal $u'6$ to one-gate 637 is similarly connected by branch lead 755 with a second input to one-gate 754. The output of one-gate 754 is connected to lead 622 and thus to the negatory inputs of composite gates 621, 630 and 638.

Turning now to terminals 614, 548 and 541 (which lie to the right of terminals $c'0$, $c'1$, $c'2$, $c'3$, $c'4$ at the top of the left-hand side of FIGURE 10), it will be seen that terminal 614 is connected by lead 756 to one input of multivibrator 757 whose other input is connected by lead 758 to lead 622. Multivibrator 757 is so designed that, after receiving a voltage input on lead 756, it will give a voltage output on lead 759 which is connected to the permissory input of composite gate 760; and multivibrator 757, if giving an output on lead 759 will cease to do so upon receiving a voltage input on lead 758. Multivibrator 757 is, however, so arranged that, after receiving a voltage input on lead 758 it will, after the lapse of one second, revert to the condition in which it gives a voltage output on lead 759 even if it has not, during the said one second, received a voltage input on lead 756; this is to ensure that if, when the converter is first switched on, the said multivibrator is in the condition in which it gives no voltage output on lead 759, it shall not be able to remain indefinitely in that condition, and it also prevents the said multivibrator from being accidentally left indefinitely in that condition after a forced clearance of a register. Terminal 548 is connected by lead 761 to the input of pulse former 762, which device last-mentioned is designed to give a short pulse output at the beginning of a voltage pulse applied to it from terminal 548 (i.e. at the beginning of the D6 pulse, that being the pulse which is applied to terminal 548, as mentioned earlier in this specification in connection with the description of FIGURE 8); and the output of pulse former 762 is connected by lead 763 to the second input of composite gate 760. Similarly, terminal 541 is connected by lead 764 to pulse former 765, which is likewise designed to give a short pulse output at the beginning of a voltage pulse applied to it from terminal 541 (i.e. at the beginning of the D5 pulse, that being the pulse which, as mentioned in connection with the description of FIGURE 8, is applied to terminal 541); and the output of pulse former 765 is connected by lead 766 to the first input of composite gate 760. Composite gate 760 is so designed that if voltage is being applied by lead 759 to its permissory input, a voltage pulse appearing on lead 766 is re-applied by the said gate to lead 767 and thus to terminal 539, and a voltage pulse appearing on lead 763 is re-applied by the said gate to lead 768 and thus to terminal 546. It may now be remarked that lead 764, pulse former 765, lead 766 and the components of composite gate 760 that cause voltage to appear on lead 767 when voltage is applied to leads 759 and 766, together with lead 767, together constitute the equipment indicated in FIGURE 8 by the dotted line reference 540; and, similarly, lead 761, pulse former 762, lead 763, and the components of composite gate 760 that cause voltage to appear on lead 768 when voltage is applied to leads 759 and 763, together with lead 768, together constitute the equipment indicated in FIGURE 8 by the dotted line referenced 547.

Operation of Converter

It will probably have been appreciated from earlier sections of this specification that converter K/3 has two distinct states of operation: firstly, a state in which no register is giving an output, in which state the function of the converter is to convert C, D and U pulses received from the pulse generator into voltage outputs (from the converter) suitable for "preparing" the equipment associated with each subscriber in each multiplex, and secondly, a state in which, when a register is giving an output, the cyclical "preparation" of the said equipment ceases and, instead, the function of the converter is to convert pulses received from the register giving the output and convert them into voltage outputs suitable for furthering the operation of connecting the calling subscriber to the called subscriber. Those two states of operation will now be described.

As will appear later, at the time when a register is released for use by other subscribers because it has completed its operations on behalf of a calling subscriber, and when a register is released for any other reason, a pulse is received on terminal 614 which ensures that multivibrator 757 is in the state in which it gives a voltage output on lead 759. In addition, from the time when one register is released until the time when another register starts to give an output to converter K/3, no voltage will be being applied by terminal $u5$ or terminal $u6$ of any register to terminal $u'5$ of terminal $u'6$ (respectively) on converter K/3 (cf. FIGURE 9). Accordingly, one-gate 754 (at the top right-hand corner of FIGURE 10) will not be receiving voltage from lead 753 or lead 755 on either of its inputs; and one-gate 754 therefore gives no output voltage on lead 622 so that there is no voltage applied to the negatory input of composite gate 621, of composite gate 630, or of composite gate 638. Converter K/3 is now in the state in which it converts C, D and U pulses received from the pulse generator K/1 into voltage outputs suitable for "preparing" the equipment associated with each subscriber in each multiplex. This state will be hereinafter referred to, for brevity, as the "preparation state." of converter K/3—whereas the state in which the converter is handling pulses received from a register will be referred to as the "interconnection state" of converter K/3.

It has already been noted that, in the "preparation state" of converter K/3, no voltages are applied to terminals $u'5$ and $u'6$ (and no voltage is applied, therefore, to the negatory input of composite gate 621, 630 or 638); and it may similarly be noted, for completeness, that in the "preparation state" of converter K/3, no voltage is applied to any of terminals $c'0$, $c'1$, $c'2$, $c'3$, $c'4$, $d'0$, $d'1$, $d'2$, $d'3$, $d'4$, $u'0$, $u'1$, $u'2$, $u'3$, $u'4$.

Now the combinations of pulses emitted by pulse generator K/1 which serve for the "preparation" of equipment associated with each subscriber, consist of one of the pulses C0, C1, C2, C3, C4, one of the pulses D0, D1, D2, D3, D4 together with a D5 pulse or a D6 pulse, and one of the pulses U0, U1, U2, U3, U4 together with a U5 pulse or a U6 pulse. The manner in which terminals C0, C1, C2, C3, C4, D0, D1, D2, D3, D4, U0, U1, U2, U3, U4 are at any time interconnected with terminals T1, T2, T3, . . . T16, is determined by which combination of emission of a D5 or a D6 pulse with simultaneous emission of a U5 or a U6 pulse is being produced by pulse generator K/1 at that time. Accordingly, it will be convenient first to describe the effect of the emission of each of the relevant combinations—of which there are four, viz. D5 and U5, D5 and U6, D6 and U5, D6 and U6.

Case.—(i)—D5 and U5

If the D5 and U5 pulses are emitted simultaneously by pulse generator K/1, the application of the D5 pulse to terminal D5 on composite gate 630 causes that gate to apply voltage to one input of one-gate 628 which in turn applies voltage to lead 746 and thus to one input of two-gate 747. The application of the U5 pulse to terminal U5 on composite gate 638 causes that gate to apply voltage to one input of one-gate 636 which applies voltage to lead 748, which lead in turn applies voltage to one input of two-gate 747 and to one input of two-gate 750. Two-gate 747 accordingly has voltage applied to both of its inputs and therefore gives a voltage output on lead 717 to the permissory input of composite gate 712; and two-gate 747 likewise gives a voltage output on lead 743 to the negatory input of composite gate 742.

Two-gate 750 does not give an output when the D5 and U5 pulses are being emitted simultaneously, since voltage is then applied to only one of the said two-gate's inputs. Two-gate 751 likewise does not give an output when the D5 and U5 pulses are being emitted simultaneously, since voltage is then being applied to neither of the said two-gate's inputs.

The effect of the voltage output from two-gate 747 is as follows. The presence of voltage on lead 743 has the result that gate 742 cannot give an output; and it accordingly does not apply voltage to any of leads 658, 664, 699, 705. None of composite gates 656, 657, 697, 698 can give an output, therefore. The presence of voltage on lead 717 to the permissory input to composite gate 712 will permit that gate to give the appropriate output if voltage is applied to it by any of leads 711, 713, 714, 715, 716. (The presence of voltage on lead 743 will, of course, also have the effect that gate 742 cannot apply voltage to lead 745 and thus to terminal T16.)

The absence of an output voltage from two-gate 750, has the result that no voltage is applied (by leads 739, 686 and 738) either to the permissory input of composite gate 673 or to the negatory input of composite gate 734. Composite gate 673 accordingly cannot apply voltage to any of its outputs; but composite gate 734 will apply voltage to the appropriate one of its ouputs if it receives a voltage input.

The absence of an output voltage from two-gate 751, has the result that no voltage is applied by leads 655 and 655/1 either to the negatory input of composite gate 642 or to the permissory input of composite gate 724. Accordingly, gate 724 cannot apply voltage to any of its outputs; but composite gate 642 will apply voltage to the appropriate one of its ouputs if it receives a voltage input.

It is convenient to list for reference the state of the various composite gates just referred to, when a D5 and a U5 pulse are being simultaneously emitted by pulse generator K/1—the word "open" being used to denote that the gate in question will give an output if supplied with the appropriate input, and the word "closed" being used to denote that the gate in question cannot give an output—as follows:

D5 AND U5 PULSES SIMULTANEOUSLY
Composite gates:
712 _____ Open.
742 _____ Closed.
with, consequentially,
Composite gates:
656 _____ Closed.
657 _____ Do.
697 _____ Do.
698 _____ Do.
642 _____ Open.
724 _____ Closed.
673 _____ Do.
734 _____ Open.

*Case (ii).—D5 and U6*

If the D5 and U6 pulses are emitted simultaneously by pulse generator K/1, the application of the D5 pulse to terminal D5 on composite gate 630 causes voltage to be applied to one input of two-gate 747 in the manner just traced out above. The application of the U6 pulse to terminal U6 of composite gate 638 causes that gate to apply voltage to one input of one-gate 637 which applies voltage to lead 752 and thus to one input of two-gate 751. The absence of a D6 pulse and of a U5 pulse, however, has the result that none of two-gates 747, 750, 751 has a voltage applied to its second input: accordingly, none of the two-gates 747, 750, 751 can give an output voltage.

There is therefore no voltage applied (by two-gate 747) to the negatory input of composite gate 742 (which is therefore open), and there is no voltage applied to the permissory input of composite gate 712 (which is therefore closed). Since composite gate 742 is open, it will, on receiving a voltage input from any one of leads 711, 713, 714, 715, give a voltage output on lead 658, lead 664, lead 699, or lead 705 to the permissory input of composite gate 656, 657, 697 or 698, as the case may be. None of the four composite gates last mentioned is, of course, actually open until one or other of them actually receives a voltage on its permissory input; but it is convenient to describe the state of these four composite gates as "potentially open" when composite gate 742 is open.

The fact that no voltage is applied by two-gate 750 to lead 739 and thus to the inputs of composite gates 673 and 734, has the result that gate 673 is closed and gate 734 open. The fact that no voltage is applied by two-gate 751 to lead 655 and thus to the inputs of composite gates 642 and 724, has the result that gate 642 is open and gate 724 closed.

The state of the composite gates when a D5 and a U6 pulse are being simultaneously emitted by pulse generator K/1, can accordingly be listed as follows:

D5 AND U6 PULSES SIMULTANEOUSLY
Composite gates:
712 _____ Closed.
742 _____ Open.
with, consequentially,
Composite gates:
656 _____ Potentially open.
657 _____ Do.
697 _____ Do.
698 _____ Do.
642 _____ Open.
724 _____ Closed.
673 _____ Do.
734 _____ Open.

*Case (iii).—D5 and U6*

If the D6 and U5 pulses are emitted simultaneously by pulse generator K/1, the application of the D6 pulse to terminal D6 on composite gate 630 causes that gate to apply voltage to one input of one-gate 629 which in turn applies voltage to lead 749, which in turn applies voltage to one input of two-gate 750 and to one input of two-gate 751. The application of the U5 pulse of terminal U5 of composite gate 638 causes voltage to be applied (in the manner traced out above) to one input of two-gate 747 and to one input of two-gate 750. The absence of the D5 pulse has the result that no voltage is applied to the second input of two-gate 747; and the absence of the U6 pulse has the result that no voltage is applied to the second input of two-gate 751. Accordingly, each of two-gates 747 and 751 has voltage applied to one only of its inputs; but two-gate 750 has voltage applied to both its inputs and accordingly gives an output voltage on lead 739 which voltage is applied by lead 686 to the permissory input of composite gate 673 and by lead 738 to the negatory input of composite gate 734. Gate 673 is accordingly open and gate 734 is closed.

The absence of an output voltage from two-gate 747 (by reason of the fact that it has voltage applied to one input only, as just mentioned) has the effect that no voltage is applied by lead 717 to the permissory input of composite gate 712, and that no voltage is applied by lead 743 to the negatory input of composite gate 742: gate 712 is accordingly closed and gate 742 is accordingly open. The absence of an output voltage from two-gate 751 (again by reason of the fact, just mentioned that it has voltage applied to one input only) has the effect that no voltage is applied by lead 655 to the negatory input of composite gate 642, and that no voltage is applied to the permissory input of composite gate 724: gate 642 is accordingly open and gate 724 is accordingly closed. As before, since composite gate 742 is open, one of composite gates 656, 657, 697, 698 can be opened by receiving from gate 742 an input voltage on its permissory input; and gates 656, 657, 697, 698 are in the state of being potentially open.

The state of the composite gates when a D6 and a U5 pulse are being simultaneously emitted by pulse generator K/1, can acordingly be listed as follows:

D6 AND U5 PULSES SIMULTANEOUSLY

Composite gates:
   712 _____ Closed.
   742 _____ Open.
with, consequentially,
Composite gates:
   656 _____ Potentially open.
   657 _____ Do.
   697 _____ Do.
   698 _____ Do.
   642 _____ Open.
   724 _____ Closed.
   673 _____ Open.
   734 _____ Closed.

*Case (iv).—D6 and U6*

If the D6 and U6 pulses are emitted simultaneously by pulse generator K/1 the application of the D6 pulse to terminal D6 on composite gate 630 causes voltage to be applied to one input of two-gate 750 and to one input of two-gate 751, in the manner traced out above. The application of the U6 pulse to terminal U6 of composite gate 638 causes that gate to apply voltage to one input of one-gate 637; which then applies voltage to lead 752 and thus to the second input of two-gate 751. The absence of the D5 and U5 pulses has the effect (as will be clear from the preceding description) that voltage is applied to neither input of two-gate 747; and the absence of the U5 pulse has the effect (as will again be clear from the preceding description) that no voltage is applied to the second input of two-gate 750.

Accordingly, neither two-gate 747 nor two-gate 750 gives an output voltage. The absence of an output from two-gate 747 has the effects already described—viz. that composite gate 712 is closed and composite gate 742 is open (so that composite gates 656, 657, 697, 698 are potentially open). Then absence of an output voltage from two-gate 750 has the effect that no voltage is applied to lead 739 and therefore that no voltage is applied by lead 686 to the permissory input of composite gate 673, or by lead 738 to the negatory input of composite gate 734: accordingly, gate 686 is closed and gate 734 is open.

Two-gate 571 has, as just explained, voltages applied to both its inputs and accordingly gives a voltage output on lead 655 which is applied to the negatory input of composite gate 642, and is also applied by lead 655/1 to the permissory input of composite gate 724: gate 642 is therefore closed, and gate 724 is open.

Accordingly, the state of the composite gates when a D6 and U6 pulse are being simultaneously emitted by pulse generator K/1 can therefore be listed as follows:

D6 AND U6 PULSES SIMULTANEOUSLY

Composite gates:
   712 _____ Closed.
   742 _____ Open.
with, consequentially,
Composite gates:
   656 _____ Potentially open.
   657 _____ Do.
   697 _____ Do.
   698 _____ Do.
   642 _____ Closed.
   724 _____ Open.
   673 _____ Closed.
   734 _____ Open.

With the foregoing lists in mind, it is easy to trace out the effect of the emission of a set of simultaneous pulses by pulse generator K/1.

For example, suppose pulse generator K/1 simultaneously emits pulses C3, D2, U1, D6, U5. Then, since D6 and U5 pulses are being emitted, the state of affairs is that listed above for Case (iii). Accordingly, the application of pulse C3 to terminal C3 of composite gate 621 causes that gate to apply voltage to one input of one-gate 619 which in turn applies voltage to lead 649 and thus to one input of one-gate 650. The resulting voltage output from one-gate 650 is applied to lead 651 and thus to the corresponding input of composite gate 642; and since composite gate 642 is open (as stated in the list at the end of Case (iii)), gate 642 applies voltage to terminal T4 (since terminal T4 is connected to the output of gate 642 which corresponds to lead 651 as an input).

The application of voltage to lead 649 also causes voltage to be applied to the fourth input of composite gate 656 and the fourth input of composite gate 657. Reference to the list at the end of Case (iii) shows that gates 656, 657, 697 and 698 are potentially open. Which of these gates is in fact open, depends on the U pulse for the time being applied by pulse generator K/1 to converter K/3, since composite gate 742 is open in Case (iii). Since it is pulse U1 which is being applied to terminal U1 of converter K/3, composite gate 638 applies a voltage to one input of one-gate 632 which accordingly applies voltage to lead 713 and thus to the second input of composite gate 742; and since gate 742 is open, it applies voltage to lead 664 and thus to the permissory input of composite gate 657. No voltage is applied to any other input of composite gate 742, and this gate therefore does not apply voltage to any of leads 658, 699, 705. There is therefore no voltage applied to the permissory input of composite gate 656, 697 or 698: accordingly, though potentially open, the three composite gates last mentioned are actually closed and none of them gives a voltage at any of its outputs.

Since there is a voltage applied to the permissory input of composite gate 657 and the said gate has voltage applied to one of its inputs from lead 649, gate 657 gives an output voltage on lead 668 which is applied thereby to one input of one-gate 640. One-gate 640 accordingly gives an output voltage on lead 641 which is applied to the first input of composite gate 642 which, being open, accordingly applies voltage to terminal T1.

The application of pulse D2 to terminal D2 of composite gate 630 causes that gate to apply voltage to one input of one-gate 625, which therefore applies voltage to lead 677 and thus to one input of one-gate 678. The resulting output voltage from one-gate 678 is applied to lead 679. A stated in the list at the end of Case (iii), composite gate 734 is closed (and therefore gives no output voltage despite the voltage applied to lead 679); but composite gate 673 is open, and the voltage applied to its input by lead 679 therefore causes gate 673 to apply voltage to one input of one-gate 691, which in turn applies voltage to lead 692 and thus to terminal T13.

The application of pulse U1 to terminal U1 of composite gate 638 has already been stated to cause voltage to be applied to lead 713 and thus to cause composite gate 742 to give a voltage output as described above. Composite gate 712 is, however, closed in Case (iii); and accordingly the voltage applied to lead 713, which is in turn applied to one input of composite gate 712, does not cause the latter gate to apply an output voltage to lead 719.

It will therefore have been seen that the simultaneous application of pulses C3, D2, U1, D6, U5 to converter K/3 causes the converter to apply voltage to terminals T1, T4 and T13.

Suppose, as a second example, that the pulses simultaneously applied to converter K/3, instead of being C3, D2, U1 and D6 and U5, had been C0, D3, U3, together (as in the preceding example) with D6 and U5. The state of affairs is again that described as Case (iii), since the D6 and U5 pulses are being emitted; but now the U3 pulse is being emitted instead of the U1 pulse, so that voltage is now applied to terminal U3 on composite gate 638 and therefore applied to one-gate 634. One-gate 634 therefore applies voltage to lead 715, so that voltage is applied to the fourth input of composite gate 742 which (being open) applies voltage to lead 705 and thus to the permissory input of composite gate 698. Accordingly, out of composite gates 656, 657, 697, 698, which are potentially open, only gate 698 is actually open, gates 656, 657, 697 being actually closed. Composite gate 712 is closed (since Case (iii) is concerned), so that the application of voltage by lead 715 to gate 712 does not cause gate 712 to apply voltage to lead 721.

The application of the C0 pulse to terminal C0 of composite gate 621 causes that gate to apply voltage to one input of one-gate 616, which accordingly applies voltage to lead 639 and thus to one input of one-gate 640. (Since composite gates 656 and 657 are closed, as just mentioned, neither gives an output.) One-gate 640 gives an output voltage on lead 641 which voltage is in turn applied by the said lead to the first input of composite gate 642 and applied by lead 723 from lead 641 to the first input of composite gate 724. Gate 724, being closed in Case (iii), gives no output; but gate 642, being open, applies voltage to terminal T1 in consequence of the voltage applied to the input of the said gate by lead 641.

The application of the D3 pulse to terminal D3 of composite gate 630, causes that gate to apply voltage to one input of one-gate 626. One-gate 626 accordingly applies voltage to lead 680 and thus to the fourth input of composite gates 697 and 698, and to the input of one-gate 681. Gate 697, being actually closed, gives no output. Gate 698 being actually open (as stated two paragraphs earlier), the application of voltage to lead 680 causes gate 698 to apply voltage to lead 709 and thus to one input of one-gate 671. One-gate 671 accordingly applies voltage to lead 672, thus applying voltage to the first input of composite gate 673 and also (via lead 735) to the first input of composite gate 734; and one-gate 681 likewise applies voltage to lead 682, thus applying voltage to the fourth input of composite gate 673 and to the fourth input of composite gate 734. Gate 734 is closed (in Case (iii)) and gives no output; but gate 673 is open, and, since it is receiving input voltages on lead 672 and 682, gate 673 applies voltage to one input of each of one-gates 687 and 693. The two one-gates last mentioned both give an output, thus respectively applying voltage to lead 688 and terminal T11 and to lead 694 and terminal T14.

Thus the simultaneous application of pulses C0, D3, U3, D6, U5 to converter K/3 causes the coverter to apply voltage to terminals T1, T11, T14.

Suppose, as a third example, that the pulses simultaneously applied to converter K/3 and C4, D1, U2, D5, U5. The state of affairs is now that described as Case (i), since the D5 and U5 pulses are being applied: accordingly, composite gates 656, 657, 697, 698 are all closed and give no voltage at any output.

The application of the C4 pulse to terminal C4 of composite gate 621 causes that gate to apply voltage to one input of one-gate 620, which accordingly applies voltage to lead 652 and thus to one input of one-gate 653. One-gate 653 accordingly applies voltage to lead 654 and to the fifth input of composite gate 642 and (via lead 723) to the fifth input of composite gate 724. As shown in the list at the end of Case (i), composite gate 724 is closed, and accordingly gives no voltage at any of its outputs: composite gate 642 is open, and the application of voltage to lead 654 accordingly causes gate 642 to apply voltage to terminal T5.

The application of the D1 pulse to terminal D1 of composite gate 630 causes that gate to apply voltage to one input of one-gate 624 which accordingly applies voltage to lead 674 and thus to one input of one-gate 675. The resulting output voltage of one-gate 675 is applied by lead 676 to the second input of composite gate 673, and is applied from lead 676 by lead 736 to the second input of composite gate 734. Gate 673 is closed in Case (i) and accordingly gives no output. Gate 734 is open in Case (i); and the application of voltage to lead 736 therefore causes gate 734 to apply voltage to lead 740/2 and thus to terminal T7.

The application of the U2 pulse to terminal U2 of composite gate 638 causes that gate to apply voltage to one input of one-gate 633, which accordingly applies voltage to lead 714 and thus to the third input of composite gate 712 and to the third input of composite gate 742. Composite gate 742, being closed, gives no output; but composite gate 712, being open in Case (i), gives an output voltage on lead 720 (since the input voltage is applied on lead 714) which is applied by lead 720 to one input of one-gate 691. One-gate 691 accordingly applies voltage to lead 692 and thus to terminal T13.

The simultaneous application of pulses C4, D1, U2, D5, U5 to converter K/3 thus causes the converter to apply voltage to terminals T5, T7, T13.

In all three of the examples so far given, composite gate 642 has been open and composite gate 724 has been closed, with the result that the application of a C pulse has caused voltage to be applied to at least one of Terminals T1, T2, T3, T4, T5. As a fourth and last example, consider the case in which the pulses simultaneousyl applied to converter K/3 are C1, D0, U4, D6, U6. This is Case (iv) above and accordingly (as shown in the list at the end of Case (iv)), composite gate 642 is closed and composite gate 724 is open. In addition, it will be seen from the said list that composite gates 656, 657, 697, 698 are potentially open; but since none of pulses U0, U1, U2, U3 is being applied to composite gate 638, there is no output voltage from the said gate to any of one-gates 631, 632, 633, 634, no output voltage applied by any of the said one-gates to any of leads 711, 713, 714, 715, and, accordingly, no voltage applied from any of the said leads to any of the first four inputs of composite gate 742. Therefore, gate 742, though open, does not apply voltage (via any of leads 658, 664, 699, 705, respectively) to the permissory input of composite gate 656, 657, 697 or 698. Accordingly, gates 656, 657, 697 and 698 though potentially open, are actually closed in this example.

It will now at once be apparent that the application of the C1 pulse to terminal C1 of composite gate 621 causes that gate to apply voltage to one-gate 617 which in turn applies voltage to lead 643 and one-gate 644. One-gate 644 applies voltage to lead 645 and thus to composite gate 642 (which gives no output, being closed), and to lead 725 and thus to the second input of composite gate 724. Composite gate 724, being open and having voltage applied by lead 725, gives an output voltage on lead 730 which is applied to one input of one-gate 689;

and one-gate 689 accordingly gives an output voltage on lead 690 which is applied to terminal T12.

The application of the D0 pulse to terminal D0 of composite gate 630 causes that gate to apply voltage to one-gate 623 which then applies voltage to lead 670 and one-gate 671. One-gate 671 applies voltage to lead 672 and thus to composite gate 673 (which gives no output, being closed), and to lead 735 and thus to the first input of composite gate 734. Composite gate 734, being open and having voltage applied by lead 735, gives an output voltage on lead 740/1, which voltage is thus applied to terminal T6.

The application of the U4 pulse to terminal U4 of composite gate 638 causes that gate to apply voltage to one-gate 635 which then applies voltage to lead 716. This voltage is applied by lead 716 to the fifth input of composite gate 712 (which is closed, this being Case (iv) and to lead 744 and thus to the fifth input of composite gate 742. Composite gate 742 is open: accordingly, the application of voltage to the fifth input of composite gate 742 causes that gate to apply voltage to lead 745 and thus to terminal T16.

It is thus seen that the simultaneous application of pulses C1, D0, U4, D6, U6, to converter K/3 causes the converter to apply voltage to terminals T6, T12, T16.

Turning now to the second state of operation of converter K/3 (viz. the state which it assumes when a register is given an output for the purpose of furthering the operation of connecting a calling to a called subscriber), the preliminary point to be noted is that, when a register does give an output, voltage is always applied to terminal $u5$ or $u6$ of the register—see FIGURES 7 and 9—and voltage is therefore always applied (see FIGURE 9) to terminal $u'5$ or terminal $u'6$ of converter K/3. Accordingly, as shown in FIGURE 10, voltage is always then applied from terminal $u'5$ or terminal $u'6$ (via branch lead 753 or branch lead 755, respectively) to one input of one-gate 754. One-gate 754 thus always applies voltage to lead 622 when a register is giving an output, and the voltage on lead 622 is applied to the negatory input of composite gate 621: and at the same time, the voltage on lead 622 is applied by lead 622/1 to the negatory input of composite gate 630 and by lead 622/2 to the negatory input of composite gate 638. Accordingly, when a register is giving an output, none of composite gates 621, 630, 638 can give an output voltage; and thus, for so long as there is an output from any register, no effect is produced on converter K/3 by any of the pulses applied to any of terminals C0, C1, C2, C3, C4, D0, D1, D2, D3, D4, D5, D6, U0, U1, U2, U3, U4, U5, U6 of the said converter by pulse generator K/1.

It will have been noted from FIGURE 10 that one input of one-gate 616 is connected (via composite gate 621) with terminal C0 and its other input is connected to terminal $c'0$: similarly, one-gate 617 is connected to terminal C1 and to terminal $c'1$. A similar relation exists for all the other one-gates of the sets 616 to 620 (inclusive), 623 to 629 (inclusive) and 631 to 637 (inclusive): that is to say, where one of these one-gates has one of its inputs connected with a terminal having a given capital letter and a given numeral as its reference, the other input of the said one-gate is connected to a terminal having the same small letter (primed) and the same numeral as its reference. It therefore follows that if voltage is applied simultaneously to $d'5$ and $u'5$, the state of composite gates 712, 742, 656, 657, 697, 698, 724, 673, 734, is exactly that listed at the end of Case (i) (for the D5 and U5 pulses simultaneously) above. Similarly, the simultaneous application of voltage to terminals $d'5$ and $u'6$ produces, as regards the composite gates enumerated in the preceding sentence, the state set out in the list at the end of Case (ii) above: the simultaneous application of voltage to terminals $d'6$ and $u'5$, produces in the said gates the state set out in the list at the end of Case (iii) above; and the simultaneous application of voltage to terminals $d'6$ and $u'6$, produces in the said gates the state set out in the list at the end of Case (iv) above.

It follows similarly, comparing with the first of the above examples, that if voltages are simultaneously applied to terminals $c'3$, $d'2$, $u'1$, $d'6$, $u'5$, then converter K/3 will apply voltage to terminals T1, T4 and T13. Analogously with the second example, the simultaneous application of voltage to terminals $c'0$, $d'3$, $u'3$, $d'5$, $u'5$, will cause converter K/3 to apply voltage to terminals T1, T11, T14—and so on.

As a final example, consider the case where (as described in connection with register K/5), the calling subscriber has dialled the number 0502. This in due course will, as already described, cause register K/5 (when that register has simultaneously applied to it pulses C4, D4 and a short pulse derived from pulse D5) to apply voltage to its terminals $m0$, $m5$, $c0$, $c6$, $d0$, $d5$, $u2$, $u5$. The voltage applied to terminals $c0$, $d0$, $u2$, $d5$, $u5$, causes voltage to appear on terminals $c'0$, $d'0$, $u'2$, $d'5$, $u'5$ (in FIGURE 10). The appearance of voltage on terminal $u'5$ causes (as previously mentioned) one-gate 754 to apply voltage to the negatory input of composite gates 621, 630, 638—thus preventing those gates from responding to C, D and U pulses applied to them by pulse generator K/1. The simultaneous application of voltages to terminals $d'5$ and $u'5$, means that the state of affairs listed at the end of Case (i) above exists.

Accordingly, the voltage applied to terminal $c'0$ causes one-gate 616 to give an output, which in turn causes one-gate 640 to give an output and causes composite gate 642 to apply voltage to terminal T1. The voltage applied to terminal $d'0$ causes one-gate 623 to give an output, which in turn causes one-gate 671 to give an output; and (since composite gate 673 is closed and composite gate 734 open, in Case (i)) composite gate 734 applies voltage to lead 740/1 and terminal T6. The voltage applied to terminal $u'2$ causes one-gate 633 to give an output which is applied to the third input of composite gate 712 which (being open) applies voltage to lead 720 and thus to one-gate 691, which accordingly applies voltage to lead 692 and terminal T13.

Thus, if a calling subscriber dials 0502, converter K/3 will (when actuated by receiving the resulting output voltages from the register that is busy with setting up the call) apply voltage to terminals T1, T6, T13. (The effect of the voltages appearing on terminals $m0$, $m5$, $c6$, of the register, is ignored for the time being, since those terminals are, as shown in FIGURE 9, not connected to converter K/3 but to MC unit K/2.)

To complete this description of the operation of converter K/3, it is necessary to describe the manner in which the said converter and the registers co-operate to bring about the application of voltage to terminals $m0$, $m5$, $c0$, $c6$, $d0$, $d5$, $u2$, $u5$ of the register (which we shall continue to suppose is register K/5, for the purposes of the example) and thus to terminals $c'0$, $d'0$, $u'2$, $d'5$, $u'5$ of converter K/3. It has already been explained (near the end of the description of the operation of the register) that when dialling has been completed, the several counters in the register have been set to the appropriate states, and that register K/5 then waits a fraction of a second until pulse generator K/1 next emits pulses C4, D4 and D5 contemporaneously.

In making the foregoing statement that register K/5 waits a fraction of a second until pulse generator K/1 next emits pulses C4, D4, and D5 contemporaneously, it was tacitly assumed that converter K/3 was in its "preparation state" immediately before the said contemporaneous emission of pulses C4, D4 and D5. The statement should now be amplified by adding that if, after dialling has been completed and the several counters in register K/5 have been set to their appropriate states, converter K/3 is in its "interconnection state" (that is to say, is in process of setting up a call which is being handled by some other register) at the time when pulse generator K/1 next emits pulses C4, D4 and D5 contemporaneously, converter K/3 continues with the setting up of the call from such other register, and the contemporaneous emission of the C4, D4 and D5 pulses has no effect: register K/5 in such a case will remain in the state in which its counters have been set, until the arrival of a time at which, firstly, converter K/3 is not in its "interconnection state," and, secondly, pulses C4, D4 and D5 are again emitted contemporaneously—that is to say, register K/5 waits a slightly longer fraction of a second before it obtains the use of converter K/3. (The reason for this longer wait is set out below.) In any case, when the time comes at which, immediately before the contemporaneous emission of pulses C4, D4 and D5, converter K/3 was in its "preparation state," multivibrator 757 will be in the condition in which it applies voltage via lead 759 to the permissory input of composite gate 760. When, therefore, a C4, a D4 and a D5 pulse are emitted contemporaneously by pulse generator K/1, the C4 pulse is applied to terminal 529 and the D4 pulse is applied to terminal 530 (of the register, see FIGURE 7); and the D5 pulse is applied to terminal 541 of converter K/3 (see FIGURES 8 and 10). The application of the D5 pulse to terminal 541 (FIGURE 10) causes voltage to be applied by lead 764 to pulse former 765 which emits a short pulse output voltage (at the beginning of the D5 pulse) on lead 766 which is applied to the corresponding input of composite gate 760. Since there is a voltage applied to the permissory input of gate 760, the application of voltage to its input by lead 766 causes gate 760 to apply voltage correspondingly to lead 767 and terminal 539. Terminal 539 applies voltage to lead 538 (see FIGURE 8) and thus to terminal 531 of register K/5; and since dialling has been completed, four-gate 580 (FIGURE 7) is receiving voltage on lead 579 from counter 572 as well as receiving the short pulse input from terminal 531 via lead 583. Four-gate 580 therefore now gives an output, causing voltage to be applied to terminals $m0$, $m5$, $c0$, $c6$, $d0$, $d5$, $u2$, $u5$—and causing the remaining operations already described in the description of register K/5 as resulting from an output from four-gate 580. The appearance of voltage on terminals $c'0$, $d'0$, $u'2$, $d'5$, $u'5$, causes converter K/3 to apply voltages to terminals T1, T6, T13 as described above; but it should also be noted that the application of voltage to lead 622 (FIGURE 10) consequential upon the appearance of voltage on terminal $u5$ (and its resulting application to terminal $u'5$), causes voltage to be applied by lead 758 to the second input of multivibrator 757, so causing the latter to cease to give an output and thus removing voltage from lead 759 and the permissory input to composite gate 760.

The voltage output from multivibrator 595 (FIGURE 7)—which output began when four-gate 580 gave its output pulse—continues until multivibrator 595 is reset in manner described in the description of the operation of register K/5; and until this event occurs, voltage continues to be applied to terminal $u'5$ (FIGURE 10), the negatory input on composite gates 621, 630, 638 being maintained until voltage is removed from terminal $u'5$. When the voltage is removed from terminal $u'5$, by which time the register will have completed its function, converter K/3 reverts to its "preparation state"; and when the setting up of the connection between the calling and called subscribers has been completed a voltage pulse is applied (in manner to be described later) to terminal 614, thus re-setting multivibrator 757 to apply voltage on lead 759 to the permissory input of composite gate 760.

Converter K/3 has now reverted to the state assumed to exist at the beginning of the description of its modes of operation.

It has been mentioned that if, on the occasion when pulse generator K/1 first contemporaneously emits pulses C4, D4 and D5 after the completion of the setting (by dialling) of the counters in register K/5, converter K/3 is in its "interconnection state," converter K/3 continues with the setting up of the call on which it is engaged and the emission of the said pulses does not cause converter K/3 immediately to handle the call recorded in register K/5. The reason for this is that, when converter K/3 is already in the "interconnection state," multivibrator 757 is applying no voltage via lead 759 to the permissory input of composite gate 760; and accordingly gate 760 does not give an output voltage on lead 767 to terminal 539 when the D5 pulse is applied to terminal 541. Since no voltage is applied to terminal 539, no voltage pulse is applied to terminal 531 on register K/5 (see FIGURES 7 and 8), and four-gate 580 in register K/5 (FIGURE 7) cannot give an output at this time. Accordingly, as will be clear from the description previously given of this register, the counters in it remain in the settings which have been given to them by the dialling impulses, and composite gates 588, 593, 599, 604 (in register K/5) have no voltage applied to their respective permissory inputs and therefore apply no voltage to any of their output terminals and therefore apply no voltage to the terminals of converter K/3. Register K/5 is thus left in the state in which it has been set by the dialling impulses and remains in this state until a time arrives when, because converter K/3 is in its "preparation state," it can, on the contemporaneous emission of C4, D4 and D5 pulses by pulse generator K/1, transmit the D5 pulse (via gate 760, which has voltage applied to its permissory input when converter K/3 is in the "preparation state") to register K/5. It will further be appreciated that since each register can (as already described) give an output to converter K/3 only in response to the contemporaneous emission of the appropriate three C and D pulses, and since (i) One of the three said pulses is either a D5 or a D6 pulse, and (ii) Composite gate 750 (FIGURE 10) transmits a D5 or a D6 pulse (as the case may be) to any register only if converter K/3 is in the "preparation state."

It follows that, just as with register K/5, each other register will apply voltage to the terminals of converter K/3 only when converter K/3 is in its "preparation state" immediately before the contemporaneous emission of the three pulses appropriate to that register.

It is convenient at this point to tabulate, for reference purposes, the various stages of counters 584 and 585, 590 and 591, 596 and 597, 601 and 602 (FIGURE 7), in a register which are energised in response to the dialling of a digit by a calling subscriber, the numbers of the terminals (of the operative register) to which voltage is applied as a result of the dialling of such digit, and the numbers of the terminals T1, T2 . . . T16, of the converter (see FIGURE 10) to which voltage is applied as the result of the dialling of a number.

It has been explained that the exchange which is being described by way of example is one having a capacity of 10,000 lines. Accordingly, the numbers which may be dialled by a calling subscriber range from 0000 to 9999, inclusive. It has also been seen, in the course of the description of FIGURE 7, that the dialling of the thousands digit in the wanted number determines which of the stages of counters 584 and 585 are energised, the dialling of the hundreds digit determines which of the stages of counters 590 and 591 are energised, the dialling of the tens digit determines which stages of counters 596 and 597 are energised, and the dialling of the units digit determines which of the stages of counters 601 and 602 are energised. It has also been seen that if, for example, the dialling of an assigned thousands digit results in the energisation of stages $p$ and $q$ of counters 584 and 585, the dialling of the same digit for the hundreds in a wanted number will result in the energisation of stages p and q of counters 590 and 591, the dialling of the same digit for the tens in a wanted number will result in the energisation of stages p and q of counters 596 and 597, and the dialling of the same digit for the units in a wanted number will result in the energisation of stages p and q of counters 601 and 602. A single table, viz. Table D of FIGURE 13, therefore serves to give the necessary information for each pair of counters, it being merely necessary for the reader to remember (from the statment already made in this paragraph) which pair of counters is concerned in dependence upon whether the digit under consideration relates to the thousands, the hundreds, the tens, or the units in the wanted number.

Thus, taking a specific example, suppose the number dialled is 3377, reference to Table D shows that, in the column headed "RCS" (an abbreviation for "register counter stages") there appears the entry 3/0 opposite the digit 3, and the entry 2/1 opposite the digit 7. The number appearing before the solidus is the number of the stage of the five-stage counter (584, 590, 596, or 601, as the case may be) that is energised, while the figure after the solidus is the number of the stage of the two-stage counter (585, 591, 597 or 602, as the case may be) that is energised. Thus the entry 3/0 in column RCS of Table D opposite the digit 3, shows that the dialling of 3 as a thousands digit of a wanted number results in the energisation of stage 3 of counter 584 and stage 0 of counter 585; and the dialling of 3 as a hundreds digit of a wanted number results in the energisation of stage 3 of counter 590 and stage 0 of counter 591. Similarly, the entry 2/1 in column RCS of Table D opposite the digit 7, shows that the dialling of 7 as a tens digit of a wanted number results in the energisation of stage 2 of counter 596 and stage 1 of counter 597, while the dialling of 7 as a units digit of a wanted number results in the energisation of stage 2 of counter 601 and stage 1 of counter 602.

Table D also shows, by the entry in the columns headed "RTN" (an abbreviation for "register terminals numbers"), which output terminals on the register have voltage applied to them in consequence of the energisation of the corresponding stages of the counters above referred to. It will be remembered, from the description of the manner of operation of the registers, that the dialling of the thousands digit of a wanted number results in the application of voltage to two of the terminals $m0$, $m1$, $m2$, $m3$, $m4$, $m5$, $m6$; the dialling of the hundreds digit of a wanted number results in the application of voltage to two of the terminals $c0$, $c1$, $c2$, $c3$, $c4$, $c5$, $c6$; the dialling of the tens digit results in the application of voltage to two of the terminals $d0$, $d1$, $d2$, $d3$, $d4$, $d5$, $d6$; and the dialling of the units digit results in the application of voltage to two of the terminals $u0$, $u1$, $u2$, $u3$, $u4$, $u5$, $u6$. The columns headed RTN in Table D show the numerical affixes of the two terminals to which voltage is applied as the result of the dialling of each digit. Thus, taking the example previously given in which the number dialled is 3377, Table D shows that the numerical affixes corresponding to the digit 3 are 3, 5 and the numerical affixes coresponding to the digit 7 are 2, 6: achordingly, in the number 3377, the dialling of the digit 3 in the thousands place results in the application of voltage to terminals $m3$ and $m5$, the dialling of the digit 3 in the hundreds place results in the application of voltage to terminals $c3$ and $c5$, the dialling of the digit 7 in the tens clace results in the application of voltage to terminals $d2$ and $d6$, and the dialling of 7 in the units place results in the application of voltage to terminals $u2$ and $u6$.

Similarly, if the number dialled were 5708, the entries in the RCS columns of Table D are 0/1 for digit 5, 2/1 for digit 7, 0/0 for digit 0, 3/1 for digit 8; and the counter stages which would in the result be energised would accordingly be:

| | |
|---|---|
| 584/0 | 585/1 |
| 590/2 | 591/1 |
| 596/0 | 597/0 |
| 601/3 | 602/1 |

Likewise, for this number 5708, the entries in the RTN columns of Table D are: 0, 6 for digit 5: 2, 6 for digit 7: 0, 5 for digit 0: and 3, 6 for digit 8. Accordingly, the register terminals to which voltage would be applied would be:

| | |
|---|---|
| $m0$ | $m6$ |
| $c2$ | $c6$ |
| $d0$ | $d5$ |
| $u3$ | $u6$ |

Turning next to the application of voltage to terminals T1, T2 . . . T16, inclusive, it will have been noted from FIGURES 9 and 10 that terminals $c0$, $c1$, $c2$, $c3$, $c4$, but not terminals $c5$, $c6$, of the registers, are connected to corresponding terminals on converter K/3. The reason for this, is that each multiplex is designed to have 500 subscribers connected to it. Thus the possible total of 10,000 subscribers which can be connected to the exchange is in effect divided into groups of 1000, and each of these groups of 1000 is subdivided into groups of 500 each. The presence of voltage on terminal $c5$ of any register ensures that the call being handled by the register will be routed to a called subscriber the last three digits of whose number lie within the range 000 to 499 inclusive, while the presence of voltage on terminal $c6$ of any register ensures that the call will be routed to a called subscriber the last three digits of whose number lie within the range 500 to 999 inclusive. In effect, terminals $c5$ and $c6$ (which are connected to the MC unit), with the terminals bearing the reference letter $m$, determine to which multiplex a call is to be connected, while terminals $c0$, $c1$, $c2$, $c3$, $c4$, $d0$, $d1$, $d2$, $d3$, $d4$, $d5$, $d6$, $u0$, $u1$, $u2$, $u3$, $u4$, $u5$, $u6$ determine which of the 500 subscribers in each multiplex is finally to be selected. It is converter K/3 which performs this latter function, and in effect counts from 000 to 499 for this purpose. Thus, for example, if the last three digits of a called subscriber's number are 372, the operating register treats this number as the 372nd subscriber in the range 000–499 (and identifies this range by the application of voltage to terminal $c5$); but if the last three digits of a called subscriber's number are 872, the operating register treats this number as the 372nd subscriber in the range 500–999 (and identifies this latter range by the application of voltage to terminal $c6$). Accordingly, converter K/3 applies voltage to the same triad of terminals (from the set T1, T2 . . . T16) when the last three digits in a dialled number are 872 as it does when the last three digits in the dialled number are 372—it being left to the MC unit to ensure that the call is routed to the correct multiplex, i.e. to the correct group of 500 subscribers. Tables A, B and C (in FIGURES 11, 12 and 13, respectively) show which triads of terminals (from the set T1, T2 . . . T16) have voltage applied to them as a result of the dialling of any four-figure number whose last three digits lie in the range 000 to 499. If the last three digits in the dialled number lie in the range 500 to 999, the triad of terminals to which voltage is applied can be found by subtracting 500 from the last three digits of the dialled number and looking up the entry in Table A, Table B or Table C corresponding to the last three digits as they stand after the subtraction of 500. Table A gives, in the columns headed "T," the number of the triads of T-terminals corresponding to dialled numbers whose last three digits lie in the range 000–199 (inclusive), Table B gives, in the columns heaed "T," the numbers of the triads of T-terminals corresponding to dialled numbers whose last three digits lie in the range 200–399 (inclusive), and Table C gives, likewise in the columns headed "T," the numbers of the T-terminals corresponding to dialled numbers whose last three digits lie in the range 400–499.

Suppose, for example, that the dialled number is 6229. The last three digits being 229 (and thus lying in the range 000–499), the required entry is to be found in Table B; and opposite the entry "229" in the column headed "Number," will be found the entry "3, 8, 16" in the adjacent column headed "T." Accordingly, the dialling of the number 6229 will result in the application of voltage to terminals T3, T8 and T16 of converter K/3. Suppose, as a second example, that the dialled number is 4635. The last three digits, being 635, lie in the range 500–999. Accordingly, 500 is subtracted from these three digits, giving the number 135, and it will be found in Table A that opposite the entry "135" in the column headed "Number" there is the entry "2, 3, 9" in the adjacent column headed "T." Accordingly, the dialling of the number 4635 will result in the application of voltage to terminals T2, T3, T9 of converter K/3.

MC Unit

It has been explained in the preceding section of this specification that terminals $m0$, $m1$, $m2$, $m3$, $m4$, $m5$ and $m6$, and terminals $c5$ and $c6$, of register K/5 are connected to terminals $m'0$, $m'1$, $m'2$, $m'3$, $m'4$, $m'5$ and $m'6$, and terminals $c'5$ and $c'6$, respectively, on MC unit K/2. Every other register is similarly connected to the MC unit, the $m0$ terminal on every register being connected to terminal $m'0$ (on the MC unit) the $m1$ terminal on every other register being connected to terminal $m'1$ (on the MC unit), and so on: this is exemplified in FIGURE 14, which shows these inter-connections for registers K/5 and K/6 and a diagram of the circuits incorporated in MC unit K/2.

Figure 14:
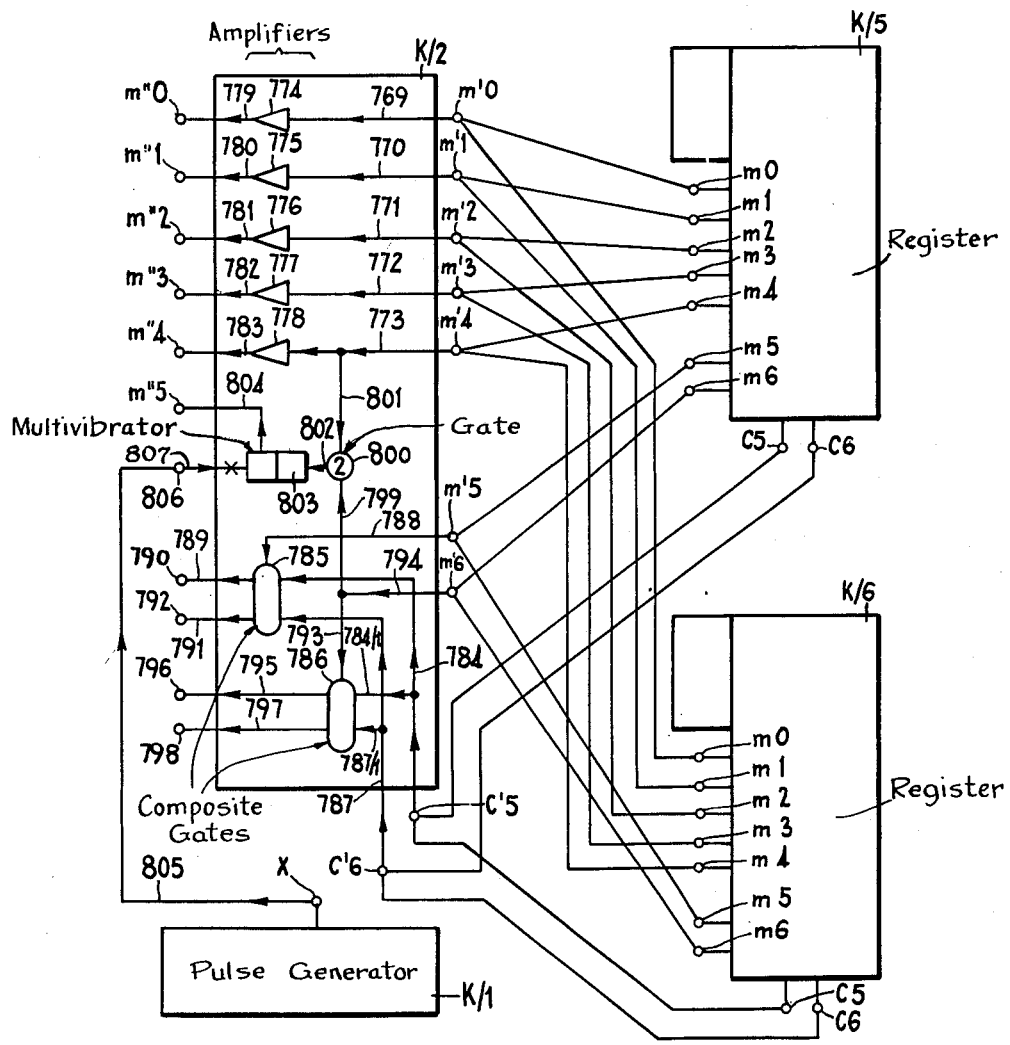

As will be seen from FIGURE 14, terminals $m'0$, $m'1$, $m'2$, $m'3$, $m'4$ on K/2 are respectively connected by leads 769, 770, 771, 772, 773 to amplifiers 774, 775, 776, 777, 778 the outputs of which amplifiers are in turn respectively connected by leads, 779, 780, 781, 782, 783 to output terminals $m''0$, $m''1$, $m''2$, $m''3$, $m''4$. It will further be seen that terminals $c'5$ on unit K/2 is connected by lead 784 to the upper imput of composite gate 785, while lead 784 is connected by branch lead 784/1 to the upper input of composite gate 786. Terminal $c'6$ on unit K/2 is connected by lead 787 to the lower input of composite gate 785, and by branch lead 787/1 to the lower input of composite gate 786. Gate 785 has its permissory input connected by lead 788 to terminal $m'5$; and if, when voltage is being applied by lead 788 to the permissory input of composite gate 785, voltage is applied to lead 784, gate 785 will apply voltage by lead 789 to terminal 790, while the application of voltage to lead 787 (while voltage is applied to lead 788) will cause gate 785 to apply voltage by lead 791 to terminal 792. Gate 786 has its permissory input connected by leads 793 and 794 to terminal $m'6$. Accordingly, while voltage is being applied to the permissory input of gate 786, the application of voltage to lead 784/1 will cause the said gate to apply voltage to lead 795 and terminal 796, and the application of voltage to lead 787/1 will cause the said gate to apply voltage to lead 797 and terminal 798.

Lead 794 is also connected by lead 799 to one input of two-gate 800, the other input of which is connected by lead 801 to lead 773. The output of two-gate 800 is connected by lead 802 to one input of multivibrator 803; and upon receipt of a voltage input on lead 802, multivibrator 803 gieves a voltage output on lead 804 to terminal $m''5$, which terminal is connected (by leads not shown) to one input of the tone units of each multiplex. Multivibrator 803 is arranged to be re-set (so as to cease to apply voltage to lead 804 if already so doing) by the lagging edge of each X pulse; and for this purpose terminal X on pulse generator K/1 is (as shown in FIGURE 14) connected by lead 805 to terminal 806 on unit K/2 and thence by lead 807 to the re-setting input of multivibrator 803. (The fact that it is the lagging edge of the X pulse which re-sets multivibrator 803 is indicated, as usual, by an "$x$" on lead 807 adjacent to its point of connection with the said multivibrator.)

Multivibrator 803 and its associated elements are included for the purpose of enabling a "number unobtainable" signal to be given to a calling subscriber if that calling subscriber should dial a number which belongs to a section of the exchange which has not yet been installed. It will be supposed, for the purpose of describing this feature of the exchange, that only 18 sections (of the full 20 needed for 10,000 subscribers) have been installed—that is to say, only multiplexes A, B, C, . . . to R have been installed, so that the subscribers' numbers for which theer is actual provision in the exchange run from 0000 to 8999, inclusive (it being understood, of course, that some of the numbers in the range 0000 to 8999 may not actually be obtainable because, for example, they are temporarily not in service). Subscribers who would (when installed) have numbers in the range 9000 to 9999 will therefore be unobtainable and multiplexes S and T will not have been installed and embodied in the exchange. If, then, a subscriber connected to, say, multiplex B, misguidedly dials one of numbers in the range 9000 to 9999, it is arranged that the tone unit in the dialling subscriber's own multiplex shall give that subscriber a "number unobtainable" signal by imposing suitable modulations on the pulses of the channel which is circulating in the calling subscriber's line unit. Now each multiplex is identified by two $m$ voltages (i.e. a voltage appearing on one of the set of terminals $m0$, $m1$, $m2$, $m3$, $m4$, and a voltage appearing on one or other of the terminals $m5$, $m6$ of a register) together with a voltage appearing on one or other of terminals $c5$, $c6$. For numbers lying in the range 9000 to 9999, voltage always appears on terminals $m4$ and $m6$ of a register) together with a voltage appearing on one or other of terminals $c5$, $c6$. For numbers lying in the range 9000 to 9999, voltage always appears on terminals $m4$ and $m6$ of the register assigned to the calling subscriber (such voltage appearing, of course, when the register gives its output). It is for this reason that, as shown in FIGURE 14, terminal $m6$ is connected via terminal $m'6$ and leads 794 and 799 to one input of two-gate 800, and lead 773 (from terminal $m'4$ and thus from terminal $m4$) is likewise connected via lead 801 to the second input of two-gate 800. For the result of this interconnection is that, if a number in the range 9000 to 9999 is dialled, two-gate 800 gives an output on lead 802 which causes multivibrator 803 to apply voltage via lead 804 to terminal $m''5$ and thus to the tone unit of the calling subscriber's multiplex, this in turn causing "number obtainable" tone to be applied to the calling subscriber's receiver. Had multiplex S been installed, and multiplex T alone been not installed, two-gate 800 would have been replaced by a three-gate two of whose three inputs would have been respectively connected to terminal $m'6$ and to $m'4$, as in FIGURE 14, while the third input would have been connected to terminal $c6$ of every register (since voltage appears on terminal $c6$ of the operative register whenever it gives an output resulting from the dialling of a number the last three of whose digits lie in the range 500 to 999 inclusive). It will be clear from this that the general rule for giving "number unobtainable" tone as the reult of the dialling of a number belonging to an uninstalled multiplex, is that multivibrator 803 shall be connected to the output of a gate which gives an output if, but only if, the voltages identifying the uninstalled multiplex appear at the output terminals of a register, and that, accordingly, the inputs of the last-mentioned gate must be severally connected to those terminals (of every register) which, collectively, serve to identify the uninstalled multiplex.

Figure 15:
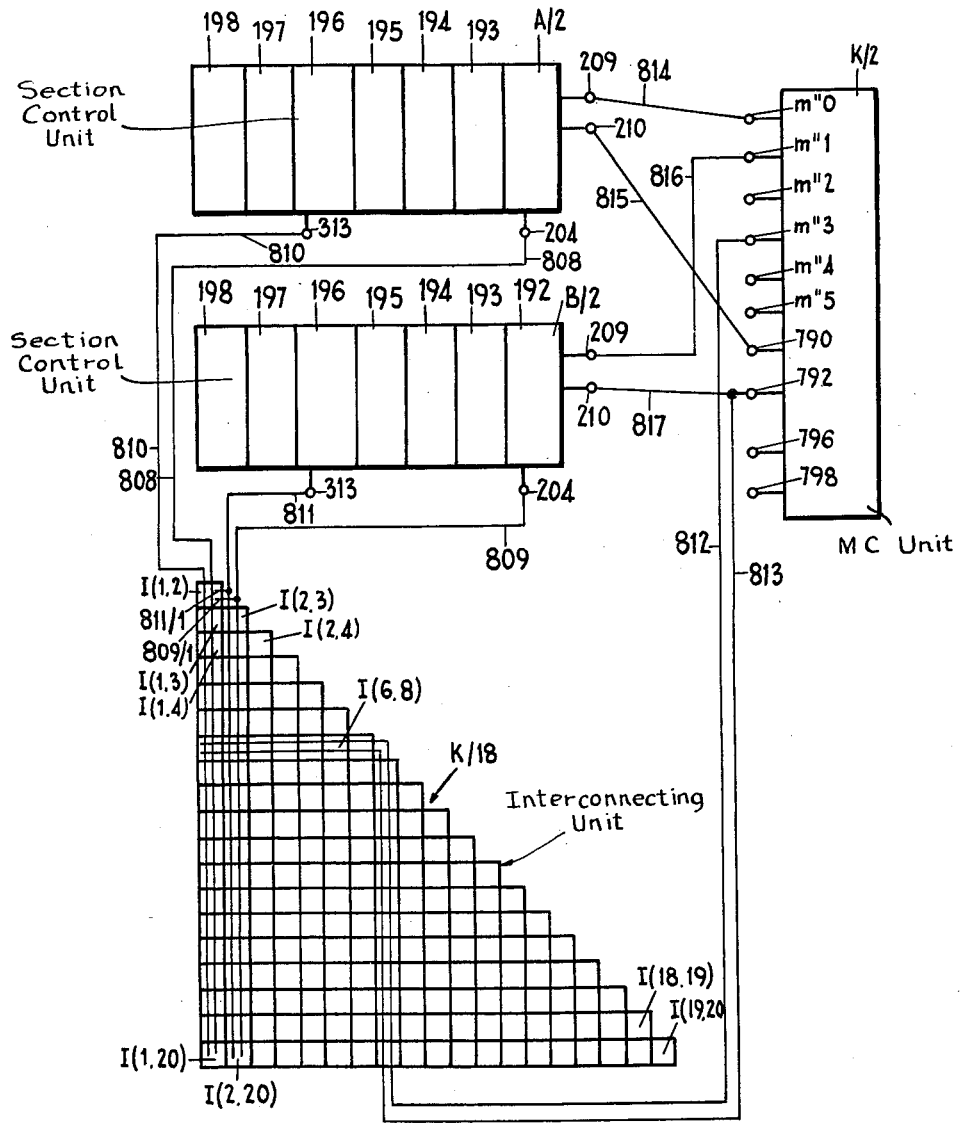

FIGURE 15 shows the way in which the MC unit

K/2 is interconnected with section control units A/2 and B/2 (these being typical of the mode of interconnecttion with the section control unit of each installed multiplex) and with the interconnecting unit K/18.

It will now be assumed, initially, for simplicity, that all twenty multiplexes forming the complete exchange, have been installed. It is therefore necessary to be able to interconnect each multiplex with every other multiplex in the exchange. To enable this to be done, unit K/18 is composed of a set of units, each of which is adapted to connect some one multiplex to some other multiplex. In the introductory description with reference to FIGURE 1, one such typical sub-unit was referred to as K/19; but for the purpose of the present detailed description it is more convenient to use a systematic form of referencing which indicates which pair of multiplexes each sub-unit is adapted to interconnect. It will be seen that in FIGURE 15 of the sub-units composing K/18 are each represented by a small square cell. (The apparatus constituting each sub-unit will be described later.) Each cell in the left-hand column in unit K/18 as shown in FIGURE 15, is adapted to interconnect multiplex A to some other multiplex: thus cell I(1, 2) is adapted to interconnect multiplex A with multiplex B, cell I(1, 3) is adapted to interconnect multiplex A with multiplex C, cell I(1, 4) is adapted to interconnect multiplex A with multiplex D, and so on—the bottom-most cell in the left hand column, referenced I(1, 20), being adapted to interconnect multiplex A with multiplex T. Similarly, the top-most cell in the next column, cell I(2, 3) is adapted to interconnect multiplex B with multiplex C, cell I(2, 4) in that column is adapted to interconnect multiplex B with multiplex D, and so on down the said column, the bottom-most cell in this column being adapted to interconnect multiplex B with multiplex T. No cell is needed in this column to interconnect multiplex B with multiplex A, since such interconnection is already provided for by cell I(1, 2) in the left-hand column. Similarly, the cells in the third column respectively interconnect multiplex C with every other multiplex except multiplex A and B, with which multiplexes multiplex C is adapted to be interconnected by the corresponding cells I(1, 3) and I(2, 3), respectively, already referred to. Each succeeding column thus naturally contains one cell fewer than the column on its left, until the last column contains on cell only, cell I(19, 20) which is adapted to interconnect the nineteenth multiplex (multiplex S) with the twentieth multiplex (multiplex T). It is thought that the manner of allotting reference numerals to the cells interconnecting the various multiplexes will be clear from the foregoing; and it will be recognised that if there are $n$ multiplexes in an exchange, the number of cells needed for their interconnection will be $\frac{1}{2}n$ $(n-1)$—there thus being $$\frac{1}{2} \times 20 \times 19 = 190$$

cells in the present example.

As will be seen represented diagrammatically in FIGURE 15, every cell in the left hand column (that is to say, every cell capable of interconnecting multiplex A with one of the other multiplexes) is connected to lead 808 and thus to terminal 204 in speech channel control sub-unit 192 in section control unit A/2. (The manner in which lead 808 is connected to the cells is described below: the fact of such interconnection is indicated diagrammatically in FIGURE 15 by the passage of lead 808 across all cells to which it is connected.) Similarly every cell capable of interconnecting multiplex B with any other multiplex is connected by lead 809 with terminal 204 in sub-unit 192 of section control unit B/2 (the connection between lead 809 and cell I(1, 2) being indicated by branch lead 809/1). In the same way, terminal 204 on the section control unit for each other multiplex (not shown), is connected to every cell capable of interconnecting that multiplex with any other multiplex.

Again, every cell capable of interconnecting multiplex A with any other multiplex, is connected by lead 810 with terminal 313 in release control sub-unit 196 in section control unit A/2. Similarly, lead 811 connects terminal 313 in sub-unit 196 in section control unit B/2 with every cell capable of interconnecting multiplex B with any other multiplex (the connection between lead 811 and cell I(1, 2) being indicated by branch lead 811/1). And in the same way, terminal 313 on the section control unit for each other multiplex (not shown) is connected to every cell capable of interconnecting that multiplex with any other multiplex.

As has been explained, each cell in unit K/18 is adapted to interconnect some one multiplex with some other multiplex—for example to interconnect multiplex F with multiplex H, in which case the cell concerned would be cell I(6, 8) since multiplex F is the 6th multiplex and multiplex H is the 8th multiplex. In order that this may come about, it is necessary that when the voltages identifying the called subscriber appear on the appropriate $m$, $c$, $d$ and $u$ terminals of a register, those of these voltages which identify the multiplex to which the called subscriber belongs shall be applied to every cell of the set which is adapted to interconnect the called subscriber's multiplex with any other multiplex. (The particular cell to be brought into operation, out of the said set of calls, will be determined by the application of a voltage pulse from the calling subscriber's multiplex to every call of the set which is adapted to interconnect the calling subscriber's multiplex with any other multiplex; and since the set associated with the called subscriber has one, but only one, cell in common with the set associated with the calling subscriber, the result is, that only that one common cell is brought into operation.) Now if the called subscriber's number lies in the range 0000 to 0499, the called subscriber is connected to multiplex A, if the called subscriber's number lies in the range 0500 to 0999, he is connected to multiplex B: similarly, subscribers connected to multiplex C have numbers in the range 1000 to 1499, and subscribers connected to multiplex D have numbers in the range 1500 to 1999—and so on. Each multiplex is thus identified by the register output voltages which specify the first digit of the dialled number, in combination with the register output voltage that specifies whether the second digit lies in the range 0 to 4 or 5 to 9. That is to say, each multiplex is identified by a voltage on one of terminals $m0$, $m1$, $m2$, $m3$, $m4$ and a voltage on terminal $m5$ or $m6$, in combination with a voltage on terminal C5 or C6 (as will be clear from the description already given of the registers). Supposing, therefore, in the foregoing example, the calling subscriber were connected to multiplex F and the called subscriber to multiplex H, the number of the called subscriber would lie in the range 3500 to 3999. The first digit being 3, register output voltages would appear on terminals $m3$ and $m5$ of the register handling the call, and (since the second digit lies in the range 5 to 9) on terminal C6 of the said register. These voltages would accordingly be applied to terminals $m'3$, $m'5$ and $c'6$ of unit K/2. As will be seen from FIGURE 14, the voltage applied to terminal $m'3$ would (suitably amplified) be applied to terminal $m''3$: the voltage applied to terminal $m'5$ would be applied to the permissory input of gate 785: the voltage applied to terminal $c'6$ would be conveyed by lead 787 to the lower input of gate 785; and since the said gate has voltage applied to its permissory input also, the said gate would apply voltage to lead 791 and terminal 792.

Thus the dialling, in another multiplex, of the number of a subscriber connected to multiplex H, causes voltage to be applied to terminals $m''3$ and 792 of unit K/2; and these terminals are accordingly connected with every cell of the set associated with multiplex H—as indicated by leads 812 and 813 in FIGURE 15. This set is, of course, the set I(1, 8), I(2, 8), I(3, 8), I(4, 8), I(5, 8), I(6, 8), I(7, 8), I(8, 9), I(8, 10), I(8, 11), I(8, 12), I(8, 13),

I(8, 14), I(8, 15), I(8, 16), I(8, 17), I(8, 18), I(8, 19), I(8, 20).

Every other multiplex (when, like multiplex H in the foregoing example, it is a called multiplex) is similarly identified by the appearance of a voltage at one of the terminals $m''0$, $m''1$, $m''2$, $m''3$, $m''4$, and by the appearance of a voltage at one of the terminals 790, 792, 796, 798 (as can readily be seen by tracing out a few more examples), and a pair of leads from the appropriate pair of terminals for each multiplex is taken to every cell associated with that multiplex. The pair of terminals for each of the 20 multiplexes in the exchange now being described by way of example, is set out in the following list:

TABLE E

| Multiplex | Terminals | Multiplex | Terminals |
|---|---|---|---|
| A | $m''0$, 790 | K | $m''0$, 796 |
| B | $m''0$, 792 | L | $m''0$, 798 |
| C | $m''1$, 790 | M | $m''1$, 796 |
| D | $m''1$, 792 | N | $m''1$, 798 |
| E | $m''2$, 790 | O | $m''2$, 796 |
| F | $m''2$, 792 | P | $m''2$, 798 |
| G | $m''3$, 790 | Q | $m''3$, 796 |
| H | $m''3$, 792 | R | $m''3$, 798 |
| I | $m''4$, 790 | S | $m''4$, 796 |
| J | $m''4$, 792 | T | $m''4$, 798 |

The cells associated with each multiplex are:

Multiplex A: all cells having 1 as one reference number
Multiplex B: all cells having 2 as one reference number
Multiplex C: all cells having 3 as one reference number
Multiplex D: all cells having 4 as one reference number
Multiplex E: all cells having 5 as one reference number
Multiplex F: all cells having 6 as one reference number
Multiplex G: all cells having 7 as one reference number
Multiplex H: all cells having 8 as one reference number
Multiplex I: all cells having 9 as one reference number
Multiplex J: all cells having 10 as one reference number
Multiplex K: all cells having 11 as one reference number
Multiplex L: all cells having 12 as one reference number
Multiplex M: all cells having 13 as one reference number
Multiplex N: all cells having 14 as one reference number
Multiplex O: all cells having 15 as one reference number
Multiplex P: all cells having 16 as one reference number
Multiplex Q: all cells having 17 as one reference number
Multiplex R: all cells having 18 as one reference number
Multiplex S: all cells having 19 as one reference number
Multiplex T: all cells having 20 as one reference number (It will have been noted that each cell I is identified by two reference numbers—cell I(6, 8) being identified by the numbers "6" and "8" and cell I(19, 20) by the numbers "19" and "20" for example.)

In addition to applying voltages (as just described) to every cell associated with a called multiplex, the MC unit must similarly prepare the section control unit of a called multiplex for the emission of pulses in the phase of the channel over which speech is to be transmitted between the calling and called subscribers. To effect this preparation, terminals 209 and 210 of each section control unit are connected to that pair of terminals of unit K/2 (as listed above in Table E) which, when voltage is applied to them, identify that multiplex. Thus, for example, Table E shows that voltage applied to terminals $m''0$ and 790 identifies multiplex A: terminal $m''0$ is accordingly connected by lead 814 to terminal 209 on section control unit A/2, and terminal 790 is connected by lead 815 to terminal 210 on section control unit A/2, as shown in FIGURE 15. Similarly, Table E shows that voltage applied to terminals $m''0$ and 792, identifies multiplex B: terminal 209 on section control unit B/2 is accordingly connected by lead 816 to terminal $m''0$ of unit K/2, and terminal 210 on section control unit B/2 is accordingly connected by lead 817 to terminal 792 of unit K/2. Similar connections are made, in accordance with Table E, between terminals 209 and 210 of every other section control unit and the respectively appropriate terminals on unit K/2.

*Channel Pulse Store in Subscribers' Multiplexes*

Figure 16:
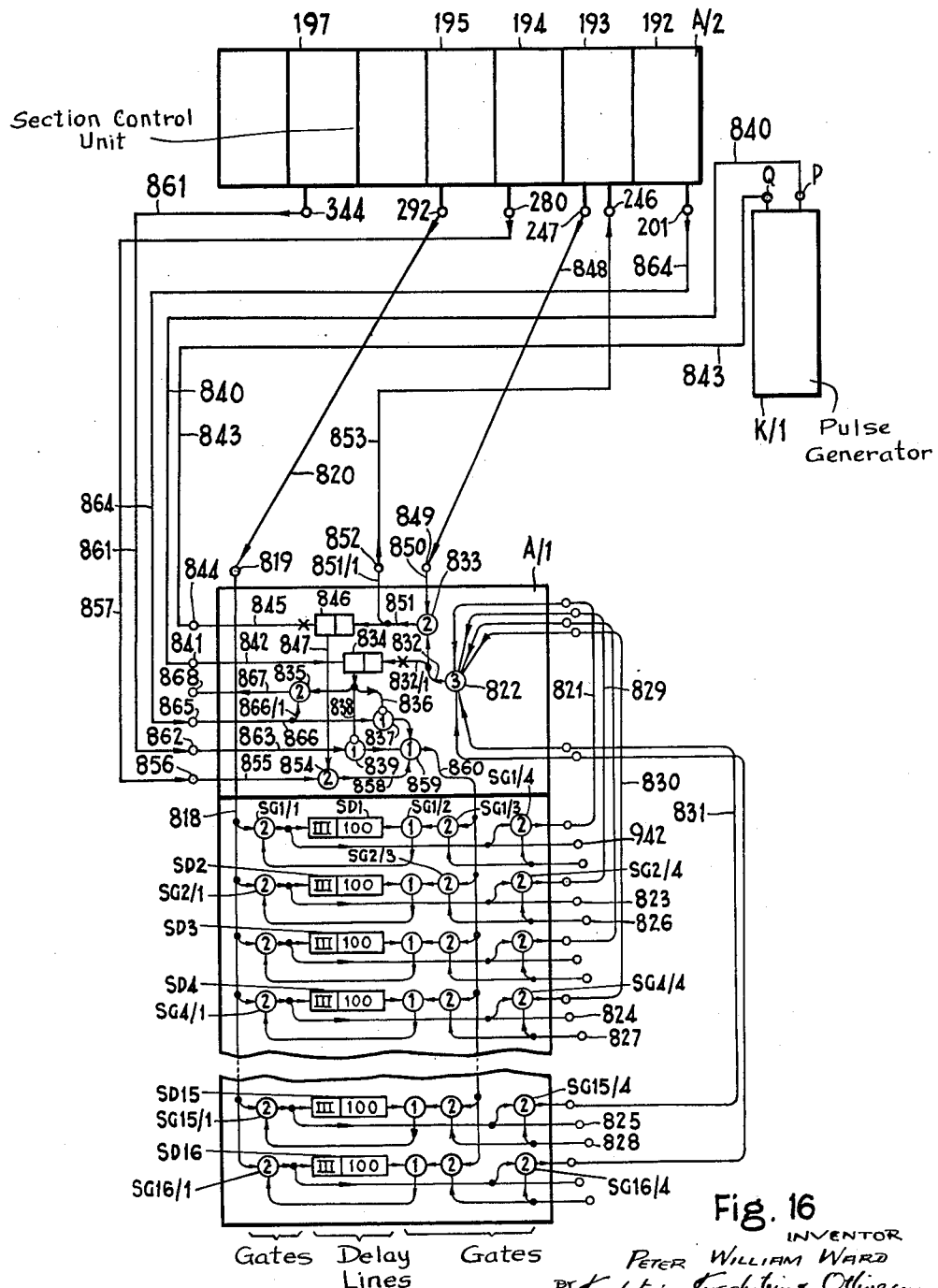

The diagram of the channel pulse store as used in each multiplex is shown in FIGURE 16 of the accompanying drawings (the channel pulse store being referenced as channel pulse store A/1 but being typical of all) together with the inter-connections between said channel pulse store and the associated section control unit of the multiplex (section control unit A/2, in this instance, since store A/1 is illustrated) and the connections between A/1 and pulse generator K/1. The channel pulse store in each multiplex is similarly inter-connected with the section control unit in that multiplex, and similarly connected to pulse generator K/1.

As will be seen from FIGURE 16, channel pulse store A/1 is provided with a plurality of magnetostrictive delay lines generally similar to those used in register control and channel pulse store unit K/7. The purpose of the said delay lines in unit K/7 was to store the pulse trains used in connection with the registers (such as K/5 and K/6); and the system there employed was to connect each register with a group of three delay lines, said group being different for each register. It was there explained that the total number $(n)$ of delay lines was to be such that $^nC_3$ (i.e. the number of different combinations of three delay lines selectable from the total set of $n$ delay lines) should not be less than, but preferably not unnecessarily greater than, the number of registers used. Store A/1 is intended similarly to store pulses used in connection with each subscriber in multiplex A, there being one characteristic combination of three delay lines associated with each subscriber. Accordingly, if the number of delay lines in store A/1 be $p$, $p$ must likewise be a number such that $^pC_3$ is not less than, but preferably not unnecessarily greater than, the number of subscribers it is intended that multiplex A shall have connected to it. The number of subscribers to be served by multiplex A is, in the present example, 500; and it will be noted that $^{15}C_3$ is equal to 455 (which is less than 500) whereas $^{16}C_3$ is equal to 560, which is greater than 500. Accordingly, 16 delay lines are used in store A/1, 16 being the smallest number $p$ giving a value of $^pC_3$ larger than 500. The channel pulse store in every other subscribers' multiplex is likewise provided with 16 delay lines, since each such multiplex is intended to serve 500 subscribers.

FIGURE 16 shows the first four of these delay lines, respectively marked SD1, SD2, SD3, SD4, and the last two of these delay lines, respectively marked SD15, SD16. Each is so designed that if a ½ micro-second voltage pulse be applied to its input, that pulse reappears at its output after a delay of 100 micro-seconds. Delay line SD1 has associated with it a two-gate SG1/1, a one-gate SG1/2, a two-gate SG1/3 and a two-gate SG1/4 in exactly the same manner that two-gate RG1/1, one-gate RG1/2, two-gate RG1/3 and two-gate RG1/4 are associated with delay line RD1 in unit K/7 (see FIGURE 5). As will be seen from FIGURE 16, every other delay line in unit A/1 has three two-gates and one one-gate associated with it in the same way as SG1/1, SG1/2, SG1/3 and SG1/4 are associated with delay line SD1. One input of two-gate SG1/1 (and one input of every other corresponding two-gate in unit A/1 and lying to the left of its respective delay line) is, as shown, connected to lead 818 and thus to terminal 819 on unit A/1, whence it is connected by lead 820 to terminal 292 of busy channel store sub-unit 195 of section control unit A/2; and a voltage pulse will be applied to lead 818 (and thus to one input of every two-gate connected to that lead) each time one-gate 305 in sub-unit 195 (see FIGURE 4) gives a voltage pulse output. Terminal 819 on channel pulse store B/1 of multiplex B is likewise connected to terminal 292 on the section control unit B/2 for multiplex B, there being similar connections for every other multiplex.

The output of the right-hand two-gate SG1/4 associated with delay line SD1 is as shown connected by lead 821 with one input of three-gate 822; and it will be seen that the output of the right-hand two-gate associated with each delay line is likewise connected with one of the sixteen inputs to three-gate 822.

Now, Tables A, B and C together show the numbers of the T-terminals on converter K/3 at which voltage appears when a subscriber belonging to any group of 500 has been dialled. Thus, for example, if a number is dialled whose last three digits are 191 or 691, voltage is applied, as shown in Table A, to terminals T2, T4 and T15. Each subscriber whose number ends with the digits 191 (in any multiplex to which is connected a subscriber having a number ending in those digits) is accordingly connected (in manner yet to be described) with delay lines SD2, SD4 and SD15 of the channel pulse store of his multiplex. Similarly, each subscriber whose number ends with the digits 691 (in any multiplex to which is connected a subscriber having a number ending in those digits) is likewise connected with delay lines SD2, SD4 and SD15 of the channel pulse store of his own multiplex. And, generally, if the T-terminals of converter K/3 to which voltages are applied by the dialling of a number ending in the digits $p$, $q$, $r$, are the terminals T$s$, T$t$, T$u$ ($p$, $q$, $r$, $s$, $t$, and $u$ being, of course general symbols for the appropriate digits as set out in Table A, Table B or Table C, whichever is applicable), then the subscriber whose number ends in the digits $p$, $q$, $r$ is connected with delay lines SD$s$, SD$t$ and SD$u$ of the channel pulse store in the multiplex to which that subscriber belongs.

Thus subscriber 0191, who belongs to multiplex A, is connected with delay lines SD2, SD4 and SD15 in his channel pulse store (as just stated), and this connection is effected by three leads (not shown in FIGURE 16) which are respectively connected to terminals 823, 824 and 825. Since synchronous pulses will (when any group of three delay lines in unit A/1 is operating) be repeated in them in the same way as pulses were above described as being repeated in any group of three delay lines in operation in unit K/7, it will be seen that when pulses are being repeated in delay lines SD2, SD4, SD15 in unit A/1, voltage pulses will be applied to terminals 823, 824 and 825 each time two-gates SG2/1, SG4/1, SG15/1 respectively give an output pulse. In addition, each time two-gates SG2/1, SG4/1, SG15/1 give a synchronised pulse output voltage is applied (as shown) to one input of each of two-gates SG2/4, SG4/4 and SG15/4; and for so long as voltages are present on terminals T2, T4 and T15 of converter K/3 (which terminals are connected respectively, by leads not shown, to terminals 826, 827, 828 of unit A/1), the application of the said inputs to two-gates SG2/4, SG4/4 and SG15/4 causes each said two-gate to give a voltage pulse output simultaneously on leads 829, 830, 831, respectively. When these three simultaneous pulse outputs occur on leads 829, 830, 831, there are, as will be seen, three simultaneous inputs to three-gate 822, which accordingly gives a pulse output on lead 832 to one input of two-gate 833, and a pulse output on branch-lead 832/1 to multivibrator 834. Multivibrator 834 is thus caused to apply voltage, by the leads, shown, to one input of two-gate 835, to the inhibitory input (via lead 836) of one-gate 837 and (via lead 838) to the inhibitory input of one-gate 839.

It will be seen to result from these connections that while converter K/3 is applying a voltage to terminals T2, T4, T15 (for the purpose of connecting some calling subscriber to subscriber 0191), a first pulse can be fed from terminal 292 of busy channel store sub-unit 195 in section control unit A/2 over lead 820 and 818 to one input of each of two-gates SG2/1, SG4/1, SG15/1; but once such a first pulse has begun to be repeated in this group of delay lines, no other pulse can be passed by gates 837 and 839 (since such first pulse causes gate 822 to cause multivibrator 834 to apply voltage to the inhibitory inputs of gates 837 and 839) until multivibrator 834 is re-set by the next P pulse which is emitted by pulse generator K/1 from terminal P over lead 840 to terminal 841 and lead 842 to the re-setting input of multivibrator 834. (Attention is here drawn to the "$x$" on branch lead 832/1, indicating that multivibrator 834 is caused to give an output voltage by the lagging edge of the pulse from three-gate 822, just as, in FIGURE 5, multivibrator 447 was caused to give an output by the lagging edge of a pulse from three-gate 448.)

It is thought that, with the foregoing description of the circuit connections of a typical trio of delay lines (viz. delay lines SD2, SD4, SD15), the mode of connection of every other trio of delay lines will be clear from FIGURE 16 in conjunction with FIGURE 5. The remaining circuit components of channel pulse store A/1, will accordingly now be described.

As will be seen from FIGURE 16, terminal Q on pulse-generator K/1 is connected by lead 843 to terminal 844 and thence by lead 845 to the re-setting input of multivibrator 846, the lagging edge of a pulse (lagging edge being again indicated by an "$x$" on lead 845) causing multivibrator 846 to cease to apply voltage to lead 847 (if applying such voltage at the time when said lagging edge occurs). Terminal 247 on register channel temporary store sub-unit 193 is connected by lead 848 to terminal 849 and thence by lead 850 to the second input of two-gate 833, whose output is connected by lead 851 to the input of multivibrator 846—so that a voltage pulse emitted by two-gate 833 causes multivibrator 846 to apply voltage to lead 847. Lead 851 is connected by branch lead 851/1 to terminal 852 and thus by lead 853 to terminal 246 on sub-unit 193, so that a pulse emitted by two-gate 833 is applied via lead 853 and terminal 247 and thence to one terminal of one-gate 264 in sub-unit 193 (see FIGURE 4).

Lead 847 is connected to one input of two-gate 854, whose other input is connected by lead 855 to terminal 856 and thence by lead 857 to terminal 280 on speech channel temporary store sub-unit 194. The output of two-gate 854 is connected by lead 858 to one input of one-gate 859, which has a second input conected (as shown) to the output of one-gate 837, and a third input connected (as shown) to the output of one-gate 839. The output of one-gate 859 is connected over lead 860 (and the respective branch leads shown) to one of the inputs of two-gate SG1/3, one of the inputs of two-gate SG2/3, and to one input of the corresponding two-gate associated with each other delay line.

Terminal 344 on free register channel store sub-unit 197 in section control unit A/2 is connected by lead 861 to terminal 862 and thence by lead 863 to the input of one-gate 839. Terminal 201 on speech channel control sub-unit 192 in unit A/2 is connected by lead 864 to terminal 865 and thence by lead 866 to the input to one-gate 837. Lead 866 is connected by branch lead 866/1 to the second input of two-gate 835 whose output is connected by lead 867 to terminal 868.

*Interconnecting Unit and Cells*

Figure 17:
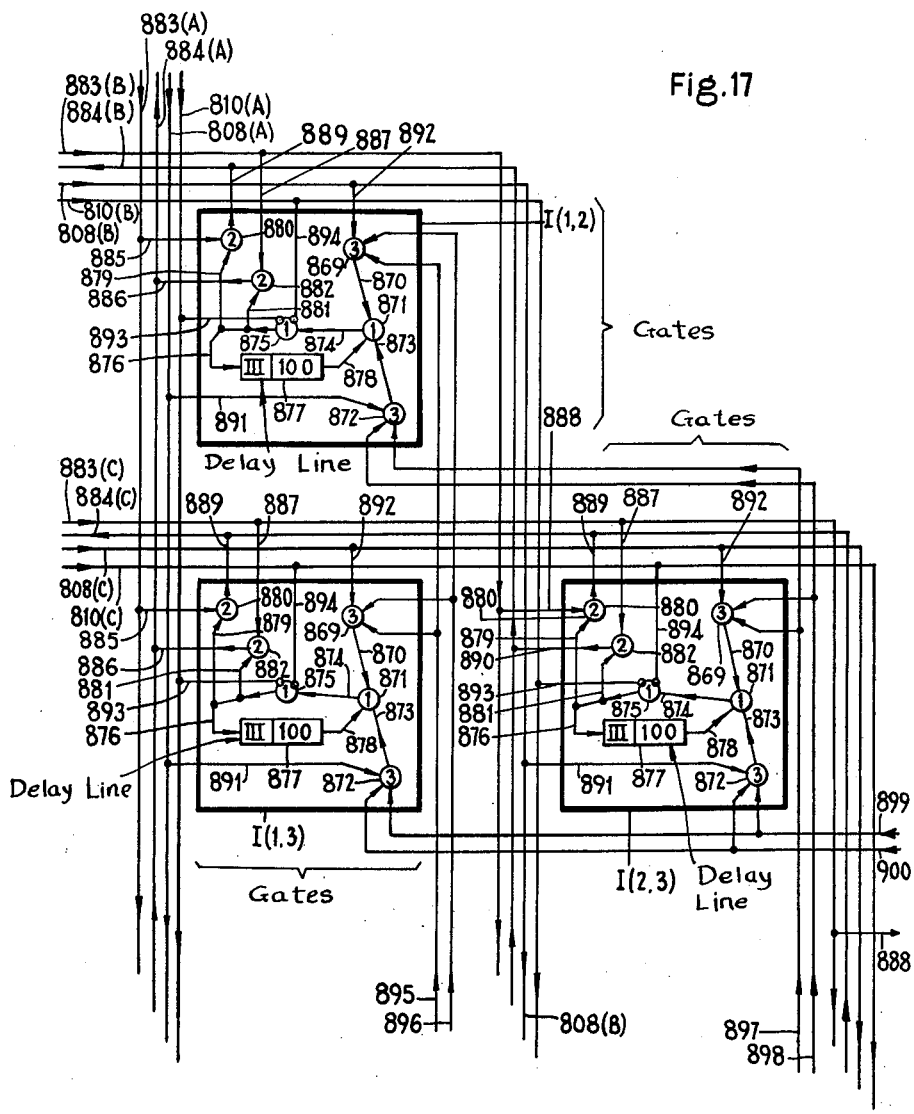

FIGURE 15 of the accompanying drawings and the description relating thereto, have explained the way in which the section control units (A/2, B/2, and every other section control unit), and MC unit K/2, are interconnected with interconnecting unit K/18—that is to say, with the various interconnecting cells I(1, 2) to I(19, 20) of which unit K/18 is composed. FIGURE 17 of the accompanying drawings shows three such cells in detail (all cells being identical in their internal circuit arrangement). The three cells chosen for illustration are cells I(1, 2), I(1, 3) and I(2, 3), as indicated.

Each cell contains a three-gate 869 (shown near the top right-hand corner of each) whose output is connected by lead 870 to one-gate 871, and a three-gate 872 (shown near the bottom right-hand corner of each) whose output is connected by lead 873 to a second input of one-gate 871. The output of one-gate 871 is connected by lead 874 to the input of one-gate 875 whose output is connected by lead 876 to the input of magnetostrictive delay line 877 (having a delay period of 100 micro-seconds), the output of delay line 877 being connected by lead 878 to a second input of one-gate 871 to form therewith a system capable of repeating ½ microsecond pulses (at a pulse repetition interval of 100 microseconds) of the kind already described several times. Lead 876 is connected, as shown, by lead 879 to one input of two-gate 880, and by lead 881 to one input of two-gate 882.

The manner in which the interconnecting cells are interconnected with the main speech cables, with converter K/3, with the section control units A/2, B/2 (and all other section control units), and with speech channel auxiliary K/15, will best be understood if attention is directed to the geometrical arrangement of the leads shown in FIGURE 17 and about to be described, since a diagram constructed in accordance with the instructions about to be given in connection with FIGURE 17 will automatically provide the appropriate connections to each cell.

A lead 883(A) will be seen starting at the top left-hand corner of FIGURE 17 and running down to the left of cells I(1, 2), I(1, 3) and all other cells (not shown) in the first (i.e. left-hand) column of cells (i.e. all cells I(1, 2) to I(1, 20) that have the numeral "1" as their first reference number). Lead 883(A) has the letter "A" added to the reference number "883" to indicate that it is connected to one of the main speech-conveying coaxial cables (viz. the output speech highway) of multiplex A. Similarly, an adjacent lead 884(A) will be seen which likewise runs down to the left of all cells I(1, 2) to I(1, 20) having numeral "1" as their first reference number, being the cells in the left-hand column. Lead 884(A) is connected to the other of the main speech-conveying co-axial cables (viz. the input speech highway) of multiplex A. Lead 883(A) is connected, as shown, to one input of two-gate 880 in every cell in the left-hand column, each of the requisite connecting leads being marked with the same reference 885, since they correspond to one another. Similarly, lead 884(A) is connected, as shown, to one input of two-gate 882 in every cell in the left-hand column, each of the requisite connecting leads being marked with the same reference 886, since they correspond to one another.

Again, a lead 883(B) will be seen starting at the top left-hand corner of FIGURE 17, which lead runs across the top of cell I(1, 2) and then down on the left-hand side of the second column of cells (i.e. all cells I(2, 3), I(2, 4) to I(2, 20) that have the numeral "2" as their first reference number). Lead 883(B) is connected by lead 887 to two-gate 882 in cell I(1, 2), and (after having become a vertically-running lead) is connected by leads 888 to one input of two-gate 880 in the second column of cells (one cell of the said second column, and one lead 888, only, being shown in FIGURE 17). Lead 883(B) is connected to the output speech highway of multiplex B.

Similarly, above cells I(1, 3) and I(2, 3), is shown lead 883(C), which is connected to the output speech highway of multiplex C. Lead 883(C) runs horizontally above cells I(1, 3) and I(2, 3) and then vertically down on the left-hand side of the third column of cells (i.e. all cells that have the numeral "3" as their first reference numeral). It will be seen that, for so long as lead 883(C) runs horizontally, it is connected by leads to one input of two-gate 882 in each cell immediately below it: once lead 883(C) runs vertically, it is connected by leads (such as lead 888 in the bottom right-hand corner of the figure) to two-gate 880 in every cell immediately to the right of it (such cells to the right of lead 883(C) not being shown in the figure) in precisely the same way that lead 883(B)—when running vertically—is connected by corresponding lead 888 to every two-gate 880 lying immediately to the right of lead 883(B).

In the same way, lead 883 from the output speech highway of each multiplex, first runs horizontally above every cell by which the said multiplex is connected to preceding multiplexes, and then runs vertically to the left of every cell by which the said multiplex is connected to succeeding multiplexes. During its horizontal run, each lead 883 is connected to one input of two-gate 882 in each cell lying immediately below it: during its vertical run, each lead 883 is connected to one input of two-gate 880 in each cell lying immediately to its right.

In similar manner, lead 884(B) is connected to the input speech highway of multiplex B just as lead 884(A) was connected to the input speech highway of multiplex A; and lead 884(C) is likewise connected to the input speech highway of multiplex C. The input speech highway of each multiplex is likewise connected to a corresponding lead 884 (not shown). Lead 884(B) is, as shown, connected by lead 889 to the output of two-gate 880 in cell I(1, 2) (during the horizontal run of lead 884(B)), and is connected by leads such as 890 (of which one only is shown, for cell I(2, 3)) during the vertical run of lead 884(B). Again, lead 884(C) is connected by corresponding leads 889 to the output of two-gate 880 in each of cells I(1, 3) and I(2, 3) during the horizontal run of lead 884(C), and is connected to the output of two-gate 882 of every cell (not shown) lying to the right of lead 884(C) during the vertical run of the said lead.

In the same way, that lead 884 which is connected to the input speech highway of each multiplex first runs horizontally above every cell by which the said multiplex is connected to preceding multiplexes, and then runs vertically to the left of every cell by which the said multiplex is connected to succeeding multiplexes. During its horizontal run, each lead 884 is connected to the output of two-gate 880 in each cell lying immediately below it: during its vertical run, each lead 884 is connected to the output of two-gate 882 in each cell lying immediately to its right.

It is now convenient to modify the reference numerals used in FIGURE 15. In that figure, the lead connected to terminal 313 in section control unit A/2, was referenced 810, and the lead connected to terminal 204 in unit A/2 was referenced 808; and the lead connected to terminal 313 in section control unit B/2 was referenced 811, while the lead connected to terminal 204 in unit B/2 was referenced 809. In connection with FIGURE 17, it is convenient to give the reference 808(A) to the lead referenced 808 in FIGURE 15, and to give the reference 810(A) to the lead referenced 810 in FIGURE 15—so indicating explicity that said leads are connected to the section control unit of multiplex A. Likewise, the lead referenced 809 in FIGURE 15 and connected to terminal 204 of section control unit B/2, will now be referenced 808(B) in FIGURE 17, and the lead referenced 811 in FIGURE 15 and connected to terminal 313 of section control unit B/2, will now be referenced 810(B)—indicating explicity that said leads are connected to the section control unit of multiplex B. Similarly, terminal 204 of every other section control unit will be regarded as connected to a lead bearing the reference numeral 808 with a letter added to indicate to which multiplex belongs the section control unit to which it is connected; and terminal 313 of every other section control unit will be regarded as connected to a lead bearing the reference numeral 810 with a letter added to indicate to which multiplex belongs the section control unit to which it is connected.

115

It will be seen from FIGURE 17 that lead 808(A) is connected, by a lead 891, to one input of three-gate 872 in every cell lying immediately to the right of lead 808(A). Lead 808(B) (from terminal 204 of section control unit B/2) runs horizontally above cell I(1, 2) and vertically to the left of every cell in the second vertical column. During its horizontal run, lead 808(B) is connected by lead 892 to one input of three-gate 869; and during its vertical run, lead 808(B) is connected by leads such as lead 891 in cell I(2, 3) to one input of three-gate 872 (in the same way that lead 808(A), during its vertical run, is connected by leads 891 to two-gate 872). Lead 808(C) is, as will be seen, connected by leads 892 to two-gates 869 in cells I(1, 3) and I(2, 3) lying immediately below it; and during its vertical run, it is similarly connected by a lead 891 (not shown) to two-gate 872 (not shown) in every cell (not shown) lying immediately to its right.

Thus the general rule is that the lead 808 from the section control unit of each multiplex, first runs horizontally above every cell by which the said multiplex is connected to preceding multiplexes, and then runs vertically to the left of every cell by which the said multiplex is connected to succeeding multiplexes. During its horizontal run, each lead 808 is connected to one input of three-gate 869 in each cell lying immediately below it; during its vertical run, each lead 808 is connected to one input of three-gate 872 in each cell lying immediately to its right.

In view of the detailed descriptions already given, it will be sufficient to state the general rule for the disposition (in the diagram) and mode of connection of the lead 810 from terminal 313 of the section control unit of each multiplex. This rule is that the lead 810, for each multiplex, runs horizontally above every cell by which the said multiplex is connected to preceding multiplexes, and then runs vertically to the left of every cell by which the said multiplex is connected to succeeding multiplexes. Each lead 810 is connected by a lead 893 to an inhibitory input of one-gate 875 in every cell lying immediately to its right during the vertical run of said lead 810; and each lead 810 is connected by a lead 894 to a second inhibitory input of one-gate 875 in every cell lying immediately below it during the horizontal run of said lead 810. These connections are well exemplified in FIGURE 17 by the connections to lead 810(B).

It has been explained in connection with FIGURES 14 and 15 how the multiplex to which a called subscriber belongs is identified by the appearance (at the appropriate time) of voltages on one of terminals $m''0$, $m''1$, $m''2$, $m''3$, $m''4$, and on one of terminals 790, 792, 796, 798 of MC unit K/2; the terminals to which voltage is applied to identify any assigned multiplex being listed in Table E.

Now the cells in the first (left-hand) column of FIGURES 15 and 17 interconnect multiplex A with all other multiplexes. Any subscriber (in another multiplex) calling a subscriber in multiplex A, will dial 00, 01, 02, 03 or 04 as the first two digits and voltage will appear on terminals $m''0$ and 790 (see Table E). To the right of the first column of cells in FIGURE 17 are shown leads 895 and 896 which, as shown, are respectively connected to two inputs of each three-gate 869 in that column; and lead 895 is connected at its remote end to terminal 790 on MC unit K/2 (c.f. FIGURE 15), while lead 896 is connected at its remote end to terminal $m''0$ of unit K/2. Similarly, to the right of the second column of cells in FIGURE 17 are shown leads 897 and 898 of which lead 897 is connected to terminals 792 on MC unit K/2 while lead 898 is connected to terminal $m''0$ on unit K/2—i.e. leads 897 and 898 are connected to that pair of terminals on unit K/2 which identify multiplex B. Leads 897 and 898, after running upwards vertically to the right of the second column of cells, run horizontally across to, and below (for a short distance), cell I(1, 2). During their vertical run, leads 897 and

116

898 are respectively connected to one (each) of two inputs to three-gate 869 in every cell lying immediately to their left (of which only cell I(2, 3) is shown); and during their horizontal run, leads 897 and 898 are respectively connected to one (each) of two inputs to three-gate 872 in every cell lying immediately above them (in this instance, there is only one such cell, viz. cell I(1, 2)). Similarly, leads 899 and 900, which (after running vertically upwards to the right of the third column of cells, not shown in FIGURE 17), run horizontally below cells I(1, 3) and I(2, 3) and are connected as shown to two inputs of two-gate 872 in each of said cells I(1, 3) and I(2, 3) lying immediately above them. (Leads 899 and 900, which respectively identify multiplex C when a subscriber on that multiplex is called, are of course connected to terminals $m''1$ and 790 on MC unit K/2 in accordance with Table E.)

The general rule for connecting the cells to MC unit K/2 will now be obvious. It is that a pair of leads, for any assigned multiplex, is connected to the terminals shown in Table E as corresponding to the said multiplex, and is carried vertically upwards to the right of every cell by which that multiplex is connected to succeeding multiplexes: the said pair of leads is then led horizontally below every cell by which the said multiplex is connected with any preceding multiplex; and during the vertical run, each of said pair of leads is connected to an input of three-gate 869 in each cell lying immediately to the left of said pair, while during the horizontal run, each of said pair of leads is connected to an input of three-gate 872 in each cell lying immediately above said pair.

It will be found that by arranging cells systematically in a triangular array, ordered in the manner shown in FIGURES 15 and 17, and by applying the general rules above stated to the positioning of leads and the manner of connecting leads to the several gates contained in each cell, a diagram will be produced which is suitable for connecting up the circuits of the necessary cells for interconnecting any pre-assigned number of multiplexes.

Speech Channel Auxiliary

Figure 18:
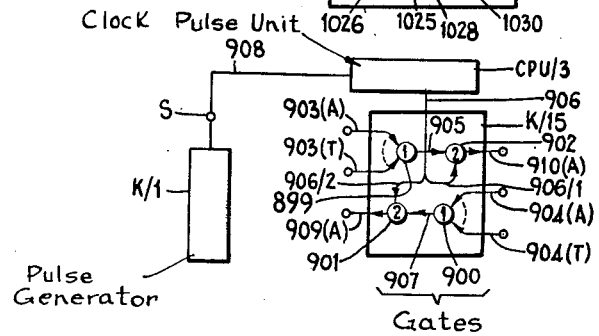

Speech channel auxiliary K/15 is shown in FIGURE 18 and is provided with a pair of one-gates, 899 and 900, respectively, and a pair of two-gates 901 and 902, respectively.

One-gate 899 has as many inputs as there are multiplexes in the exchange, each input being connected by a lead to terminal 202 on speech channel control sub-unit 192 of the section control unit for one multiplex. Assuming for the moment that the full 20 multiplexes have been installed in the exchange now being described by way of example, with the multiplexes lettered A to T for reference purposes (as before), input lead 903(A) is connected to terminal 202 on section control unit A/2, input lead 903(B) would be connected to terminal 202 on section control unit B/2, input lead 903(C) to terminal 202 on section control unit C/2, and so on, input lead 903(T) being connected to terminal 202 on section control unit T/2: for simplicity, only leads 903(A) and 903(T) are shown in this figure. One-gate 900 likewise has as many inputs as there are multiplexes in the exchange: again, the first lead, lead 904(A) (which is connected to lead 808(A), see FIGURE 17, and thus to terminal 208 on speech channel control sub-unit 192 of section control unit A/2), and the last lead, lead 904(T) (which is connected to lead 808(T) and thus to terminal 208 on section control unit T/2), are alone actually shown in FIGURE 18.

The output of one-gate 899 is connected by lead 905 to one input of two-gate 902, whose second input is connected by branch lead 906/1 to lead 906 and thus to clock pulse unit CPU/3 (whose function, like that of the clock pulse units previously mentioned, is to emit ½ micro-second clock pulses with a repetition period of one micro-second, as shown in FIGURE 3(*b*)). The output of one-gate 900 is connected by lead 907 to one input of two-gate 901, whose second input is connected by branch lead 906/2 to lead 906 and thus to clock pulse unit CPU/3. The input to unit CPU/3 is connected by lead 908 to terminal S on pulse generator K/1.

The output of two-gate 901 is connected by lead 909(A) to terminal 207 of speech channel control sub-unit 192 in section control unit A/2, and is similarly connected, respectively, by leads 909(B) to 909(T), not shown, to terminal 207 of the section control unit of each other multiplex. The output of two-gate 902 is connected by lead 910(A) to terminal 208 of speech channel control sub-unit 192 in section control unit A/2, and is similarly connected, respectively, by leads 910(B) to 910(T), not shown, to terminal 208 of the section control unit of each other multiplex.

*Subscribers Line Unit*

Figure 19:
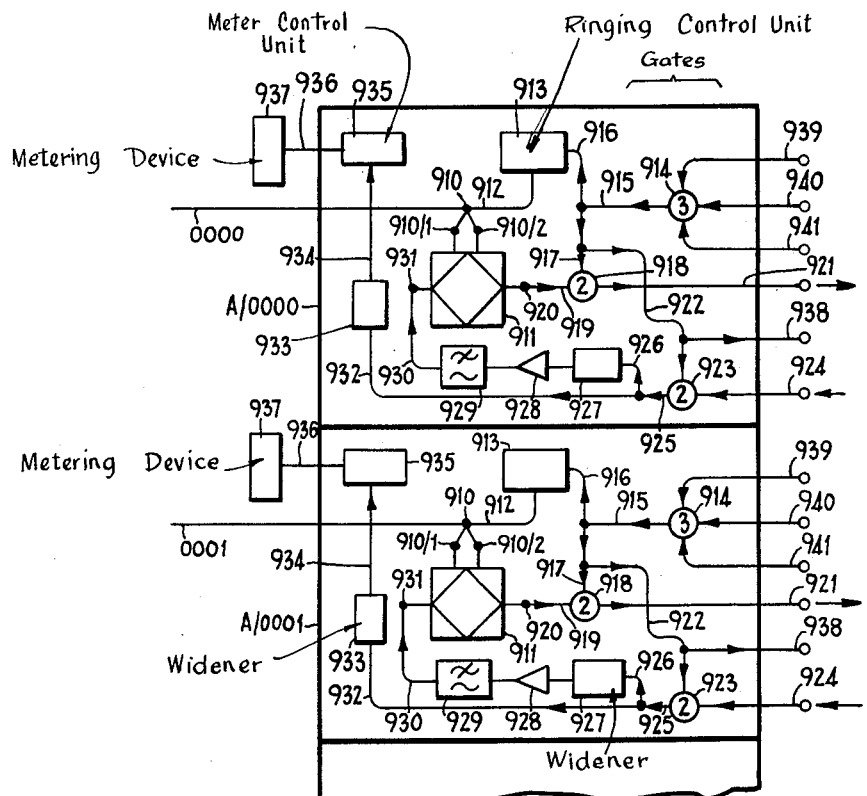

Subscribers line units A/0000 and A/0001 are shown in FIGURE 19—every unit for every subscriber connected to the exchange being identical, save, of course, for the fact that the incoming leads, referenced as 0000 and 0001, respectively, are connected to individual subscriber's instruments (i.e. hand sets, bells and similar conventional equipment customarily provided for each subscriber). Line 0000, for example, contains all the leads necessary for making connections to such instruments, but, being well known to all skilled in the art, is represented as a single line connected to terminal 910 of hybrid 911 (which is here represented by the customary symbol for a hybrid, but is further described below with reference to FIGURE 20 of the accompanying drawings). Terminal 910 is, as will be seen, shown as connected to terminals 910/1 and 910/2, to indicate at this point separate leads forming go and return leads for the speech circuit. Terminal 910 also has connected to it line 912 by which currents for ringing the subscriber's bell may be impressed on line 0000 from ringing control unit 913. Ringing control unit 913 is caused to supply such currents to line 0000 when pulses are transmitted to it from three-gate 914, to whose output it is connected by leads 915 and 916 as shown. The transmission of signals on lead 916 to unit 913 is arranged to trigger off a cold-cathode tube in unit 913 to cause it to apply ringing current to lead 912, in the manner described in a paper by T. H. Flowers, in the Proceedings of the Institution of Electrical Engineers, volume 99, Part I, No. 119, September 1952, on page 186 with reference to FIGURE 7 of the said paper, where ringing current is derived from the transformer there referenced T2 in conjunction with the cold-cathode tube lying below it and a 17 c.p.s. power supply lying above it.

Lead 915 is also connected by lead 917 to one input of two-gate 918, whose second input is connected by lead 919 to terminal 920 on hybrid 911. The output of two-gate 918 is connected by lead 921 to the outgoing speech highway of multiplex A in manner described later. The effect of these connections to two-gate 918 (which is the modulator gate of unit A/0000) is that when speech channel pulses are impressed on gate 918 from three-gate 914, and subscriber 0000 speaks into his instrument, the said pulses as emitted on lead 921 are modulated in accordance with the said subscriber's speech.

Lead 917 is also connected by lead 922 to one input of two-gate 923, to whose second input is connected lead 924 which is connected to the incoming speech highway of multiplex A. When the pulses of a speech channel are received on lead 924 from some other subscriber, they are passed by gate 923 to lead 925 from which they are supplied by lead 926 to widener 927 and amplifier 928 and thence through low-pass filter 929 and lead 930 to terminal 931 of hybrid 911 (927 and 929 together acting as a demodulator). Two-gate 923 is accordingly sometimes referred to as the demodulator gate for the subscribers line unit. Lead 925 is also connected by lead 932 to widener 933 and thence by lead 934 to meter control unit 935, whence current is supplied over the conductors in line 936 to operate a conventional metering device 937—which will, as will be appreciated, be arranged to operate only when speech channel pulses (modulated by metering signals) are being received on lead 924 from a called subscriber. (Unit 935 is, like unit 913, provided with a cold-cathode tube which is triggered-off when signals are received on lead 934 indicating that a called subscriber has lifted his instrument, suitable circuit arrangements being again shown in FIGURE 7 of the paper by T. H. Flowers above referred to.) Lead 922 is also connected to lead 938 as shown. The three inputs to three-gate 914 are respectively connected to leads 939, 940 and 941, as shown.

The parts so far described in unit A/0000 are identical with the correspondingly numbered parts in unit A/0001 and in every other subscribers line unit in multiplex A and in every other multiplex. The inputs of three-gate 914 in unit A/0000 are differently connected, however, from those of three-gate 914 in unit A/0001. As was explained in the description of the channel pulse store in subscriber's multiplex, each subscriber is connected, according to the last three digits of his number, to three assigned delay lines in the channel pulse store in his own multiplex, according to the scheme described with reference to Tables A, B and C. Thus, it was there stated that subscriber 0191, for example, is connected with delay lines SD2, SR4, SD15 in his channel pulse store: this is effected by connecting lead 939 in subscribers line unit A/0191 to terminal 823 (in FIGURE 16), by connecting lead 940 in subscribers line unit A/0191 to terminal 824 (in FIGURE 16), and by connecting lead 941 in subscribers line unit A/091 to terminal 825 (in FIGURE 16). Similarly since, from Table A, subscriber 0000 (whose last three digits are 0's) is associated with delay lines SD1, SD6 and SD11 (these being the numbers in the "T" column of Table A corresponding to 000 as the three final digits) lead 939 in line unit A/0000 is connected to terminal 942 in FIGURE 16 (which is associated with delay line SD1 in that subscriber's multiplex) lead 940 in unit A/0000 would be connected to the corresponding terminal associated with delay line SD6, and lead 941 would be connected to the corresponding terminal associated with delay line SD11 (neither of which delay lines, nor the corresponding associated terminals, is shown in FIGURE 16 but whose positioning is clear from the figure since all these delay lines and their associated terminals are similarly situated).

In every other multiplex, the subscribers line units are similarly constructed, and each has the input leads (939, 940, 941, respectively) of its three gate 914 connected to its associated set of delay lines in its own multiplex in accordance with the principles described above with reference to Tables A, B and C.

Figure 20:
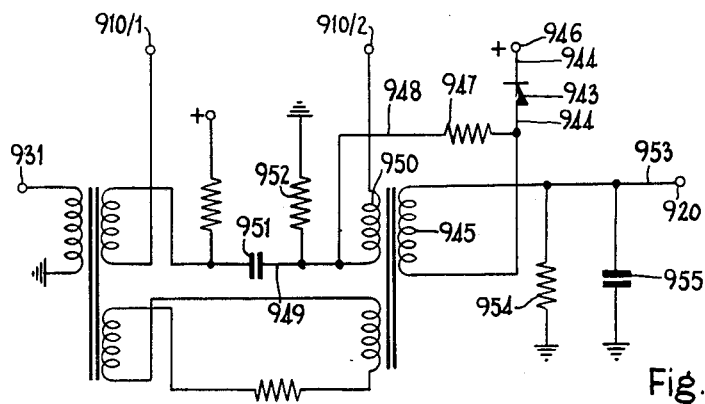

Turning now to FIGURE 20 of the accompanying drawings, it will be seen that the hybrid is of standard form except for the addition of biassing means. In FIGURE 20 it will be seen terminals 910/1 and 910/2, terminal 920 and terminal 931, are those already shown in FIGURE 19. The hybrid is, as just remarked, of a standard form well known in the art, and the basic operation of the circuit diagram therefore does not need to be supplemented by verbal description. It will, however, be seen that a point-contact diode 943 is provided in lead 944 one end of which is connected to one end of speech output winding 945, whose other end is connected, as shown, to terminal 920. The other end of lead 944 is connected to terminal 946 to which is connected a 5 volt positive supply. Resistor 947 has one end connected as shown to a point on lead 944 between the anode of diode 943 and winding 945, and the other end of resistor 947 is connected by lead 948 to a point on lead 949 lying between winding 950 (in the line input circuit of the hybrid) and condenser 951 in said input circuit. Between condenser 951 and the point at which leads 948 and 949 are joined, lead 949 is connected to earth through resistor 952. Lead 953 connecting terminal 920 to winding 945 is, as shown, connected to earth by impedance-matching resistance 954 and also by condenser 955 whose purpose is about to be described.

The effect of these connections is that terminal 920 is effectively at earth potential when no current is flowing in the line circuit of hybrid 911 between terminals 910/1 and 910/2. When line current flows in the said circuit, the anode of diode 943 is raised to a mean voltage great enough for the said diode to conduct and the mean potential of terminal 920 rises to a value of about +5 volts, thus changing the bias on modulator two-gate 918 and rendering it capable of giving an output. Condenser 955 then serves to ensure that the mean voltage on lead 953 does not rise substantially above the mean voltage intended to be applied to terminal 920 (as just stated), though, of course, permitting the voltage fluctuations due to speech signals from the subscriber using the circuit; and the capacity of condenser 955 is chosen, on well-known principles, in dependence on the design constants of the various other components, and of modulator two-gate 918 to which it is connected, so as to apply the appropriate input to the latter.

Tone Unit

Figure 21:
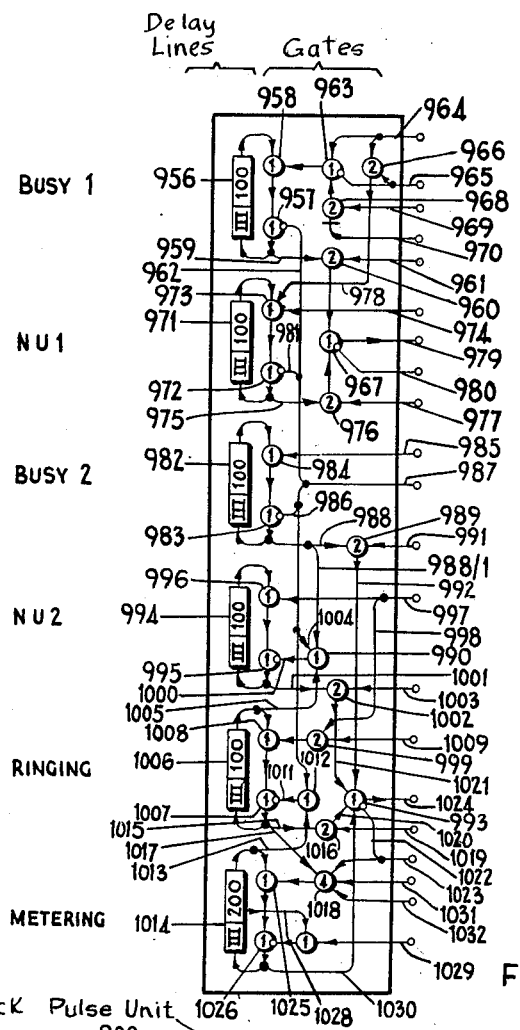

FIGURE 21 of the accompanying drawings shows the tone unit (such as B/19 in FIGURE 1, all tone units in all multiplexes being identical), which unit controls the signals which cause "Busy Tone," "Number Unobtainable Tone" or "Ringing Tone" to be heard by a subscriber, and also controls the metering of calls.

It will be seen from FIGURE 21 that the unit is labelled as comprising six sub-units, whose functions are as follows:

"Busy 1"—to control the supply of busy tone to a calling subscriber if either (i) he cannot be connected to a called subscriber belonging to some other multiplex, because no common free channel can be found for interconnecting them through interconnecting unit K18, or (ii) he cannot be connected to a called subscriber, belonging to the same multiplex as the called subscriber, because the phase changer (e.g. A/22) in the said multiplex is fully occupied in dealing with other calls.

"NU 1"—to control the supply of number-unobtainable tone to a calling subscriber if either (i) he has dialled the number of a subscriber which would belong (when installed) to a multiplex not yet installed (see explanation in the description already given of MC unit K/2), or (ii) there has been a forced release of a register as above explained in connection with the description of register control unit K/7.

"Busy 2"—to control the supply of busy tone where a calling subscriber has dialled a called subscriber who is actually already busy. (It will be seen that "Busy 1" may be described as dealing with cases where the exchange equipment is busy, whereas "Busy 2" may be described as dealing with cases where the individual subscriber is busy.)

"NU 2"— to control the supply of number-unobtainable tone to a calling subscriber who has dialled a number belonging to an installed multiplex if no subscriber having that number is in fact connected to the latter multiplex.

"Ringing"—to control the supply of ringing tone to a called subscriber connected to the multiplex to which the tone unit belongs.

"Metering"—to control the supply of metering signals to the meter control unit 935 of the calling subscriber whose call is to be metered.

Taking these sub-units in order, it will be seen that they are arranged as follows.

"Busy 1" is provided with magnetostrictive delay line 956 (having a delay period of 100 microseconds) whose input is fed from the output of one-gate 957 and whose output is connected to one input of one-gate 958. The output of one-gate 957 is also connected by lead 959 to one input of two-gate 960, whose second input is connected by lead 961 to a voltage source which so modulates the output of two-gate 960 that when modulated pulses from two-gate 960 are fed to the demodulating two-gate in a subscribers line unit, that subscriber hears the usual busy tone. The input of one-gate 957 is connected as shown to the output of one-gate 958; and one-gate 957 is provided with an inhibitory input connected to lead 962.

The input of one-gate 958 is connected to the output of one-gate 963 whose input is connected by lead 964 to terminal 242 on register channel temporary store sub-unit 193 (see FIGURE 4) of the section control unit of the multiplex to which the tone unit belongs. One-gate 963 has also an inhibitory input connected by lead 965 to terminal $m''5$ on MC unit K/2 (see FIGURE 14), and thus has voltage applied to it if a subscriber dials a number belonging to a multiplex which has not yet been installed. (It will be appreciated that the tone unit in each multiplex is connected in this way to terminal $m''5$.)

Lead 965 is also connected to one input of two-gate 966, whose second input is connected as shown to lead 964, and whose output is connected by lead 978 to one input of one-gate 973 in sub-unit "NU 1."

A second input of one-gate 963 is connected to the output of two-gate 968, one of whose inputs is connected to lead 969 and thus to the phase changer (such as A/22) in the multiplex to which the tone unit belongs. Two-gate 968 is also provided with a negatory input connected to lead 970 which is connected to the last phase changing unit (as described later) in the phase changer belonging to the multiplex to which the tone unit belongs.

"NU 1" is provided with magnetostrictive delay line 971 (having a delay period of 100 microseconds) whose input is connected to the output of one-gate 972 and whose output is connected to one input of one-gate 973, which has a second input connected to lead 974 and by that lead to terminal 382 on busy register channel store sub-unit 198 of the section control unit of the multiplex to which the tone unit belongs.

The output of one-gate 972 is also connected by lead 975 to one input of two-gate 976 whose second input is connected to lead 977 to which is connected a voltage source which so modulates the output of two-gate 976 that when modulated pulses from two-gate 976 are fed to the demodulating two-gate in a subscriber's line unit, that subscriber hears the usual number-unobtainable tone. The output of two-gate 976 is connected to a second input of one-gate 967, this one-gate having also (i) an output connected by lead 979 to the input speech highway of the multiplex to which the tone unit belongs, and (ii) an inhibitory input connected to lead 980 which is connected to terminal Z on pulse generator K/1.

It will also be seen that one-gate 972 has an inhibitory input connected by lead 981 to lead 962.

"Busy 2" is provided with magnetostrictive delay line 982 (having a delay period of 100 microseconds) whose input is fed from the output of one-gate 983 and whose output is connected to one input of one-gate 984. One-gate 984 has a second input connected to lead 985 which is connected to terminal 868 on the channel pulse store (e.g. unit A/1) in the subscribers' multiplex to which the tone unit belongs. The output of one-gate 984 is connected as shown to the input of one-gate 983, and the latter one-gate has also an inhibitory input connected by lead 986 to lead 962.

It is convenient at this point to draw attention to adjacent lead 987, one end of which is connected to lead 962, and the other end of which is connected to terminal 313 of release control sub-unit 196 (see FIGURE 4) of the section control unit to which the tone unit belongs.

121

The output of one-gate 983 is also connected by lead 988 to one input of two-gate 989 and by branch lead 988/1 to one input of one-gate 990 in sub-unit "NU 2." The second input of two-gate 989 is connected to lead 991 and thence to the voltage source providing busy tone already mentioned as connected to lead 961. The output of two-gate 989 is connected by lead 992 to one input of one-gate 993 in the "Ringing" sub-unit.

"NU 2" is provided with magnetostrictive delay line 994 (having a delay period of 100 microseconds) whose input is fed from the output of one-gate 995 and whose output is connected to one input of one-gate 996. One-gate 996 has a second input connected to lead 997, which lead is also connected as shown, by lead 998 to one input of two-gate 999 in the "Ringing" sub-unit. The output of one-gate 996 is connected to the input of one-gate 995; and one-gate 995 has in addition an inhibitory input connected to lead 1000 and thus to the output of one-gate 990. The output of one-gate 995 is also connected by lead 1001 to one input of two-gate 1002, whose input is connected by lead 1003 to the voltage source mentioned above in connection with lead 977 that provides number-unobtainable tone.

One-gate 990 has, as shown, a second input connected by lead 1004 to lead 962, and a third input connected by lead 1005 to magnetostrictive delay line 1006.

In the "Ringing" sub-unit, delay line 1006 (just mentioned) has a delay period of 100 micro-seconds and its input is fed from the output of one-gate 1007. The output of delay line 1006 is, as already stated, connected to lead 1005, and the latter lead is also connected (as shown) to one input of one-gate 1008, whose output is connected to the input of one-gate 1007. One-gate 1008 has a second input connected to the output of two-gate 999 as shown, the second input of two-gate 999 being connected to lead 1009, which is connected to the output of a one-gate referenced 1010 shown in FIGURE 23 which has 500 inputs which are respectively connected to each of the 500 terminals referenced 940 (see FIGURE 19), one for each subscriber in the multiplex to which the tone unit belongs.

One-gate 1007 also has an inhibitory input connected by lead 1011 to the output of one-gate 1012, which has one input connected to lead 962 and a second input connected by lead 1013 to the output of magnetostrictive delay line 1014 in "Metering" sub-unit. One-gate 1007, in addition to having its output connected to the input of delay line 1006, has its output connected (i) by lead 1015 to one input of two-gate 1016 and (ii) by lead 1017 to one input of four-gate 1018 in the "Metering" sub-unit.

The second input of two-gate 1016 is connected by lead 1019 to a voltage source which so modulates the output of two-gate 1016 that when modulated pulses from the said two-gate are fed to the demodulating two-gate in a subscribers' line unit, that subscriber hears the usual ringing tone. The output of two-gate 1016 is connected by lead 1020 to a further input to one-gate 993, which has its third input connected by lead 1021 to the output of two-gate 1002. One-gate 993 has in addition an inhibitory input connected to lead 1022 which is connected to lead 1023 which is connected to terminal Z on pulse generator K/1. The output of one-gate 993 is connected to lead 1024 which is connected to the output speech highway of the multiplex to which the tone unit belongs.

The "Metering" sub-unit is, as already mentioned, provided with magnetostrictive delay line 1014. This delay line is a tapped delay line and has a delay period of 200 micro-seconds. Its output is, as already stated, connected to lead 1013, and that lead is also connected, as shown, to one input of one-gate 1025. The second input of one-gate 1025 is connected, as shown, to the output of four-gate 1018, and the output of one-gate 1025 is connected to the input of one-gate 1026 whose output is connected to the input of delay line 1014 as shown. One-gate 1026 is additionally provided with an inhibitory input con-

122 nected to the output of one-gate 1027, which has one input connected by lead 1028 to the tap on delay line 1014 and has a second input connected by lead 1029 to terminal Y on pulse generator K/1. In addition to being connected to the input of delay line 1014, the output of one-gate 1026 is connected by lead 1030 to a fourth input of one-gate 993 in the "Ringing" sub-unit.

Four-gate 1018 has already been mentioned as having one input connected by lead 1017 to the output of one-gate 1007. The second input of four-gate 1018 is connected as shown to lead 1023 (and thus, as mentioned, to terminal Z on pulse generator K/1), the third input of four-gate 1018 is connected by lead 1031 to terminal Q on pulse generator K/1; and the fourth input to four-gate 1018 is connected to lead 1032 and thus to terminal 310 of release control sub-unit 196 of the section control unit of the multiplex to which the tone unit belongs.

*Phase Changers*

Figure 22:
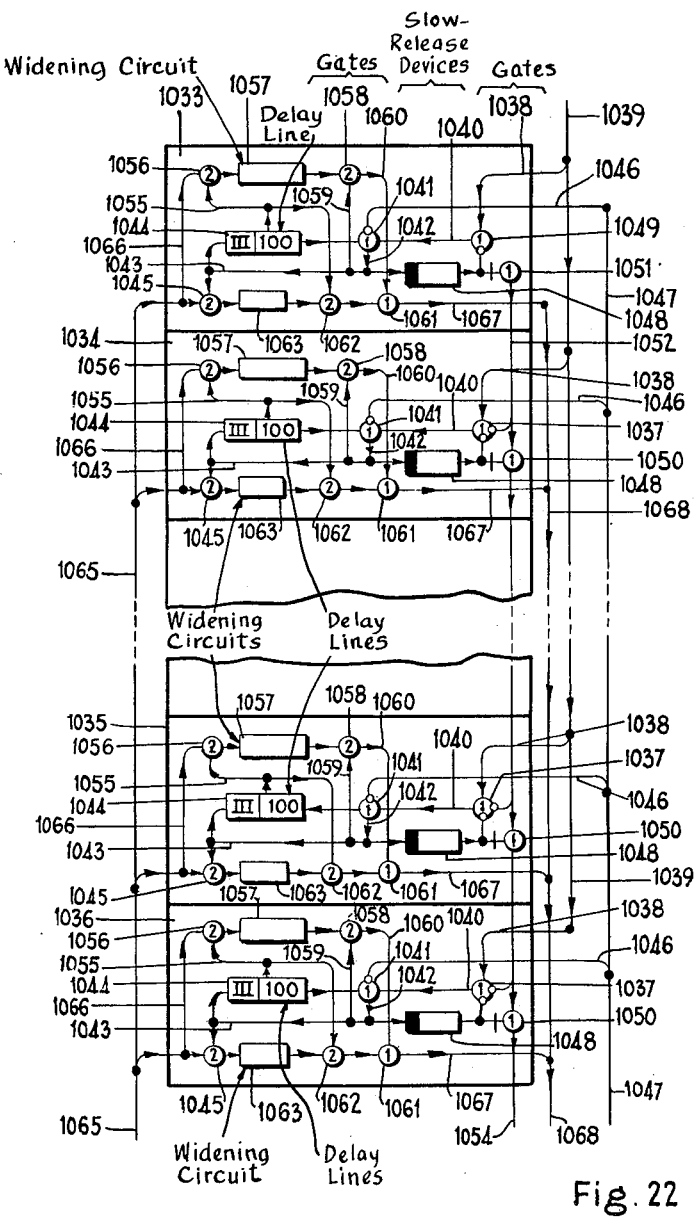

As mentioned earlier, when a calling subscriber connected to the exchange at present being described, wishes to talk to a subscriber connected to the same multiplex, each of these two subscribers will (when interconnected) be allotted a speech channel which has a phase difference of 50 channels from the speech channel allotted to the other. To effect this, a phase changer (such as B/22 for multiplex B) is provided in each multiplex and is connected to the output speech highway and to the input speech highway, of the multiplex to which it belongs. A typical phase changer is shown in FIGURE 22 of the accompanying drawings.

It will be seen from FIGURE 22 that a phase changer consists of an assemblage of sub-units which are identical save for two one-gates in the first sub-unit, as explained later. Just as it was explained earlier that the number of registers needed in an exchange depends on the number of subscribers to be served, the calling rate on the exchange, and the quality of service to be provided, so does the number of sub-units in each phase changer depend on the number of subscribers intended to be connected to the multiplex served by that phase changer, the calling rate and the quality of service, and can, like the number of registers needed, be estimated from experience by those skilled in the art. For the exchange now being described with 500 subscribers connected to each multiplex, it will be assumed that six sub-units in each phase changer will give the service required. FIGURE 22 shows the first two sub-units (referenced 1033 and 1034, respectively) and the last two of the six sub-units (referenced 1035 and 1036, respectively). Every sub-unit except 1033 is identical with sub-unit 1034, and all parts that are identical are given the same reference number, irrespective of the sub-unit in which they occur.

In sub-unit 1034, there will be found (near the right-hand side) a one-gate 1037 whose input is connected by lead 1038 to lead 1039 which is connected to terminal 206 on speech channel control sub-unit 192 (FIGURE 4) of the section control unit of the multiplex to which the phase changer belongs. The output of one-gate 1037 is connected by lead 1040 to one input of one-gate 1041 whose output is connected by lead 1042 to lead 1043. The left-hand end of lead 1043 is shown connected to the input of magnetostrictive delay line 1044 (which has a delay period of 100 micro-seconds) and to one input of two-gate 1045. The output of delay line 1044 is connected as shown to a second input of one-gate 1041; and one-gate 1041 has an inhibitory input connected to lead 1046 which is connected to lead 1047. Lead 1047 is connected to terminal 313 of release control sub-unit 196 (FIGURE 4) of the section control unit of the multiplex to which the phase changer belongs.

The right-hand end of lead 1043 is connected to the input of slow-release device 1048. This device comprises a condenser which is charged to a pre-assigned voltage by each ½ micro-second pulse applied to its input, said condenser being connected to discharge through a resistance such as to give the discharge a time constant which is relatively long in comparison with the pulse repetition interval of 100 micro-seconds, the resistance-capacity combination being connected to a cathode-follower circuit acting as an impedance-matching device and giving a virtually steady signal on its output for so long as ½ micro-second pulses are repeated at the input to device 1048 at the pulse repetition interval.

The output voltage produced by device 1048 is, in sub-unit 1034 and in sub-units identical with it, applied as shown to one of the inhibitory inputs of one-gate 1037. In sub-unit 1033 the output of device 1048 is connected to the single inhibitory input of one-gate 1049, whose ordinary input is connected to lead 1038 for that sub-unit and whose output is connected to lead 1040 for that sub-unit.

The output of device 1048 is, in sub-unit 1034 and every sub-unit identical therewith also connected to a negatory input of one-gate 1050. The output of device 1048 in sub-unit 1033 is connected to a negatory input of one-gate 1051. The output of one-gate 1051 is connected by lead 1052 to a second input to one-gate 1050 in sub-unit 1034, and to a second inhibitory input on one-gate 1037 in sub-unit 1034. The output one-gate 1050 in sub-unit 1034 is connected by lead 1053 to a second inhibitory input on one-gate 1037 in the third sub-unit (not shown) and to the input of one-gate 1050 in the said third sub-unit. Similar connections are made between the third sub-unit and the fourth sub-unit (not shown) and between the fourth sub-unit and the fifth sub-unit (sub-unit 1035) and between sub-unit 1035 and the sixth sub-unit (sub-unit 1036). The output of one-gate 1050 in sub-unit 1036 is connected to lead 1054 which is connected to terminal 970 on "Busy 1" sub-unit of the tone unit (see FIGURE 21) of the multiplex to which the phase changer belongs.

Delay line 1044 in every sub-unit of the phase changer is tapped as shown and connected to lead 1055.

The left-hand end of lead 1055 is connected to one input of two-gate 1056, whose output is connected to widening circuit 1057 whose output is connected to one input of two-gate 1058, which has its second input connected by lead 1059 to lead 1043. The output of two-gate 1058 is connected by lead 1060 to one input of one-gate 1061.

The other end of lead 1055 is connected to one input of two-gate 1062. The input of two-gate 1062 is connected to the output of widening circuit 1063, whose input is connected to the output of two-gate 1045. The second input to two-gate 1045 is connected to lead 1065 which is connected to the output speech highway of the multiplex to which the phase changer belongs. Lead 1065 is also connected, as shown, in every sub-unit, by lead 1066 to the second input of two-gate 1056.

The output of one-gate 1061 in every sub-unit is connected to lead 1067 and thus to lead 1068. Lead 1068 is connected to the input speech highway of the multiplex to which the phase changer belongs.

*Speech Highways*

Figure 23:
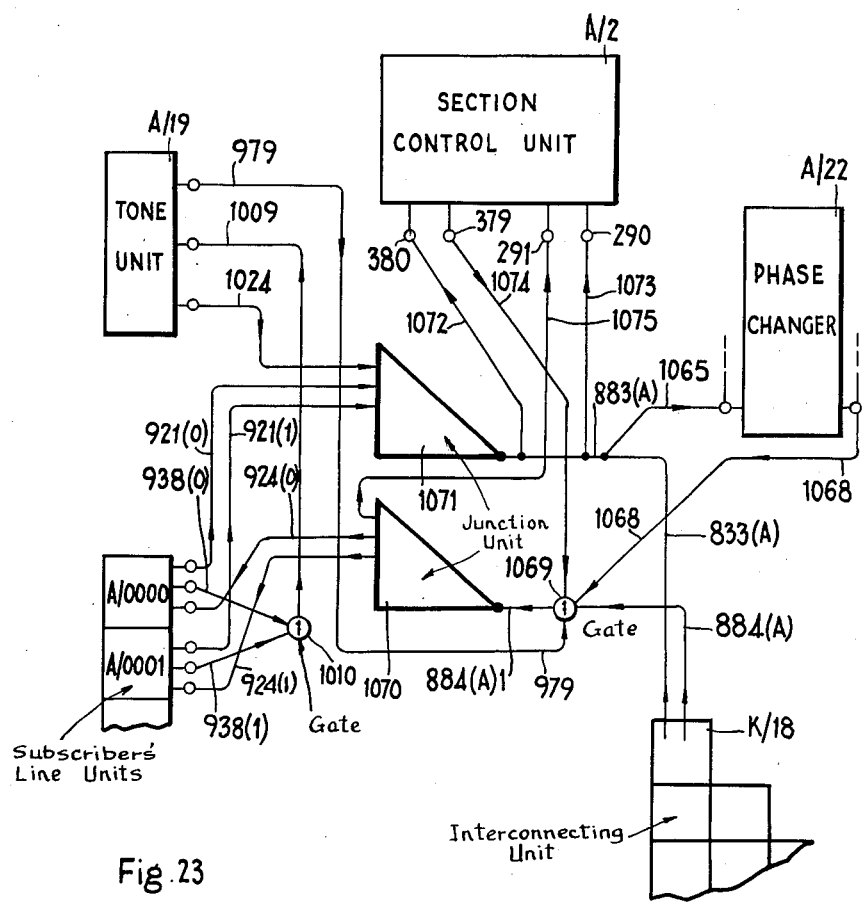

FIGURE 23 of the accompanying drawings shows the main speech highways for one multiplex (multiplex A being taken by way of example, the speech highways for all other multiplexes being similar) and their interconnections with the subscribers line units, the section control units, the tone unit and the phase changer, of the multiplex to which the said highways belong, and the interconnection of the said highways with interconnecting unit K/18.

Near the centre of FIGURE 23 will be seen a one-gate 1069. The output of one-gate 1069 is connected to co-axial cable 884(A)/1, which forms part of the input speech highway of multiplex A, the remainder of the input speech highway of multiplex A being constituted by co-axial cable 884(A) (mentioned earlier in connection with the description of interconnecting unit K/18) which is connected as shown to one input of one-gate 1069 and to interconnecting unit K/18 (as previously described in connection with the unit last-mentioned). The left-hand end of co-axial cable 884(A)/1 is shown connected to a junction unit 1070 which serves to connect the main input speech highway of multiplex A to the lead 924 (see FIGURE 19) of the line unit of each subscriber. In FIGURE 23, lead 924 to subscriber 0000 (and therefore connected to subscribers line unit A/0000) has had the identifying symbol "(0)" added to it and is referenced 924(0) and is seen connected between junction unit 1070 and unit A/0000: similarly, lead 924 to subscriber 0001 has had the identifying symbol "(1)" added to it and is referenced 924(1), being connected between junction unit 1070 and subscribers line unit A/0001—thus preserving as far as possible, the similar referencing of corresponding parts for each unit, while providing individual means of identification of such parts where needed.

Vertically above junction unit 1070 in FIGURE 23, is a second junction unit 1071 which serves to connect the output speech highway 883(A) of multiplex A (which output speech highway was mentioned earlier in connection with the description of interconnecting unit K/18) to the lead 921 (see FIGURE 19) of the line unit of each subscriber. As with leads 924, leads 921 have, in FIGURE 23, identifying symbols added to their references: thus, in FIGURE 23, the lead connecting subscribers line unit A/0000 to junction unit 1071 is referenced 921(0), and the lead connecting subscribers line unit A/0001 to junction unit 1071 is referenced 921(1).

Junction unit 1070 comprises a cascade arrangement of amplifiers. Line 884(A)/1 is connected to the input of a first amplifier: the output of the said first amplifier is connected to the input of each of five amplifiers, and the output of each of the said five amplifiers is connected to the input of each of ten amplifiers: the output of each of the said ten amplifiers is connected to the input of each of ten further amplifiers (which latter will be referred to as "last-stage amplifiers"). It will thus be seen that there are 500 last-stage amplifiers; and the 500 outputs of the said last-stage amplifiers are respectively connected to one each of the 500 leads 924, one for each of the 500 subscribers connected to the multiplex.

In junction unit 1071, the 500 input leads 921 (one from each of the 500 subscribers connected to the multiplex) are interconnected with speech output highway 883(A) as follows. Ten leads 921 are treated as a group and are respectively connected to a one-gate having ten inputs—there being, of course, 50 such groups and therefore 50 such one-gates (hereinafter referred to as "the first-stage one-gates"). The outputs of the said 50 first-stage one-gates are again treated as five further groups of ten, and the ten outputs of the ten one-gates forming any one such further group are connected to a one-gate having ten inputs (there being, of course, five of the one-gates last mentioned). The output of each of the one-gates last mentioned is connected to a cathode-follower valve stage; and the outputs of the said five cathode-follower stages are respectively connected to five of the inputs of a one-gate having six inputs. The output of the one-gate last mentioned is connected to an amplifier whose output is connected to speech output highway 883(A).

It will usually be advantageous (for economy and to avoid stray electrical couplings and interference) to arrange that the constituent parts of junction unit 1071 are physically separated in space, by arranging that each of of the 50 first-stage one-gates is located reasonably close to those of the subscribers line units to which it is connected.

The manner of grouping and connecting leads and one-gates for a junction unit such as 1071 which is intended to be connected to a multiplex serving a number of subscribers other than 500, will be obvious from the foregoing to all skilled in the art.

In addition to the connections already mentioned in the foregoing description, it will be seen that FIGURE 23 shows two of the leads 938 which are connected to the subscribers line units and to one-gate 1010, viz. lead 938(0) connecting line unit A/0000 to one-gate 1010, and lead 938(1) connecting line unit A/0001 to one-gate 1010. FIGURE 23 also shows lead 1009 connecting one-gate 1010 to tone unit A/19 (shown in detail in FIGURE 21). Furthermore, FIGURE 23 shows lead 979 connecting tone unit A/19 to one input of one-gate 1069 and thus to input speech highway 884(A)/1, and lead 1024 (from tone unit A/19) which is connected to the sixth input of the one-gate described (in the description of junction unit 1071) as having six inputs—lead 1024 being thus connected to output speech highway 883(A). Lead 1065 which connects speech output highway 883(A) to phase changer A/22, and lead 1068 connected from phase changer A/22 to a further input to one-gate 1069, are also shown.

The connections between section control unit A/2 and the speech highways can be seen in FIGURE 23. Speech output highway 883(A) is connected to terminal 380 of sub-unit 198 of unit A/2 by lead 1072, and highway 883(A) is also connected to terminal 290 of sub-unit 195 of section control unit A/2 by lead 1073. Terminal 379 of sub-unit 198 of section control unit A/2 is connected by lead 1074 to a further input of one-gate 1069; and terminal 291 is connected by lead 1075 to the output of any one of the 500 last-stage amplifiers described in the description of junction unit 1070. (It is immaterial to which of the 500 last-stage amplifiers lead 1075 is connected, since all signals appearing on input speech highway 884(A)/1 appear at the output of all the said last-stage amplifiers.) Lead 1075 thus feeds all pulses appearing on the input speech highway of multiplex A to terminal 291 of section control unit A/2 of the said multiplex.

MODE OF OPERATION OF THE EXCHANGE SHOWN IN FIGURES 2 TO 23

The mode of operation of the exchange shown in FIGURES 2 to 23 will now be described as a whole, first for a case in which the calling and called subscribers are connected to the same multiplex (multiplex A being used as the example for this case), and then for a case in which the calling and called subscribers are connected to different multiplexes (a subscriber on multiplex A calling a subscriber on multiplex B being used as the example for this second case). Certain details of the mode of operation of some units of the exchange have already been given in the course of the preceding description: some of these details are briefly repeated in the present section of this specification. It should also be noted that where, for the purpose of the simple preliminary description with reference to FIGURE 1 of the accompanying drawings, any matter has been so abbreviated as to appear at variance with the description of operation about to be given with reference to FIGURES 2 to 23, it is this latter description that is accurate. Where, as in the recapitulation (about to be given) of the pulses applied to converter K/3, the recapitulation is brief, reference should of course be made back to the appropriate part of the preceding description relating to FIGURES 2 to 23 for the full information.

I. Conditions Existing Before Call Is Set Up

I.1. *Conditions due to calls already in progress.*—It is assumed that a number of subscribers of each multiplex are already making calls, and that consequently a number of channels of each multiplex arrangement are in use. There will consequently also be a number of pulses circulating in most of the delay line stores of the exchanges. It will be assumed that some of the registers are busy.

I.2. *Low frequency pulses.*—Recapitulating, all of the C, D and U pulses are applied to the converter. It is convenient to consider that each C pulse represents a number in quinary form, that a pair of D pulses, one of D5 and D6 and one of D0 to D4, represents a decimal number, and that a similar pair of U pulses represents a similar decimal number. A complete cycle of C, D and U pulses occupies 1,001 periods each lasting 233 micro-seconds ($7 \times 11 \times 13 = 1,001$). During 500 of these periods there are coincidences of a C pulse, a pair of D pulses and a pair of U pulses. Each of these coincidences is unique in the cycle and is associated with the number of one of the 500 subscribers connected to each multiplex.

During a period when a coincidence of C, D and U pulses occurs, the pulses are applied to five input terminals of converter K/3 in a manner which represents one of 500 numbers expressed in biquinary form. The purpose of converter K/3 is to change the system of counting to a second system in which each of 500 numbers is represented uniquely by pulses on three of 16 leads T1 to T16 (FIGURE 10). There are 560 possible combinations of three leads, of which 60 combinations are not used.

One thus has, during each of 500 periods of a cycle of 1,001 periods, three leads of the group of 16 leads T1 to T16 from converter K/3 which are "marked" by having voltages applied to them. In each multiplex of the exchange, these voltage signals mark three of 16 delay lines SD1 to SD16 in the channel pulse store (FIGURE 16), a trio of delay line stores being associated with each of the 500 subscribers of the multiplex.

I.3. *Busy channel pulses.*—In the section control unit (FIGURE 4), there is a busy channel store 195 in which pulses of all busy channels of the multiplex circulate. Considering again for convenience the three delay lines of the channel pulse store which are being "marked" at a particular time by signals from converter K/3, it will be assumed that the subscriber associated with the delay lines is busy. Pulses corresponding with the channel being used by the subscriber circulate in the three delay lines. They are allowed to circulate by the action of three of the two-gates (SG1/1 to SG16/1) shown on the left of the delay lines since these gates are connected to output terminal 292 of busy channel store 195 and corresponding pulses are circulating in that store. Pulses of other phases may be circulating in each of the particular 3 delay lines of the channel pulse store (e.g. A/1), but only those used by any one subscriber will be common to his three delay lines. These pulses are passed to that subscriber's line unit to operate three-gate 914 (FIGURE 19) and thence passed to his modulator gate 918 and his demodulator gate 923.

The three signals from converter K/3 applied to three of the two-gates (SG1/4 to SG16/4) shown on the right of the channel pulse store cause the pulses circulating in the particular 3 delay lines to pass to the three-gate 822 shown on FIGURE 16. It is arranged that these pulses are of uniform amplitude.

An output pulse from three-gate 822 operates multivibrator 834 which in turn operates two inhibiting gates (837 and 839) which protect the busy subscriber's delay lines from being seized again. Multivibrator 834 may be operated at any time during the first half of the period of 233 micro-seconds; but the protection against improper seizure of his delay lines is not lost owing to the incertitude of the starting time of the pulse from multivibration 834, since a subscriber's delay lines can be seized only during the occurrence of a Q pulse, which occurs during the second half of the said period, and multivibrator 834, once it has started to give an output, will continue to do so during the whole of the next Q pulse.

I.4. *Free register channel pulses.*—Free register channel store sub-unit 197 (FIGURE 4) is a store for circulating a single pulse representing a channel which is free in the particular multiplex and which is also available in the register section of the exchange. The pulse is stored to reserve a register channel for use by the next subscriber of that multiplex to originate a call.

It will be assumed at first that there is no pulse circulating in delay line 355. Multivibrator 357 in the store is operated at the beginning of a period of coincidence of a pair of C and D pulses peculiar to the multiplex, pulses C0 and D0 being (as already explained) the pulses appropriate to multiplex A. This coincidence occurs every few milliseconds. Had a pulse already been circulating in delay line 355, multivibrator 357 would have been reset (i.e. the effect of the C0 and D0 pulses would have been undone) to its normal condition during the next 100 micro-seconds. With no pulse circulating in the delay line, multivibrator 357 is still in its operated condition at the time of the beginning of the next Q pulse. Four-gate 369 will then give an output corresponding with a clock pulse occurring during the period of the Q pulse but representing a channel which is free, since any pulses previously stored in busy channel store 195 inhibit the operation of the four-gate 369.

The pulses from four-gate 369 of all section control units are passed to the register control unit K/7 on lead 404. The signals on lead 404 convey the information that a free register channel pulse is required and also the information that certain channels are free in the multiplex demanding the free register channel pulse (as described earlier).

Register control unit K/7 has to allot a pulse corresponding with a channel which is free in the section demanding a pulse, which is not already in use for any register, and which has not been allotted to some subscriber who is waiting to have a register allotted to him. The suitable pulse is selected by five-gate 408 as already described.

When a clock pulse corresponding with a free register channel appears, it is passed out of register control unit K/7 from five-gate 408. The lagging edge of this pulse operates multivibrator 419 which prevents any further pulses from appearing at the output of the gate during the period of coincidence of the C0 and D0 pulses. Should no pulse be allotted during a particular period of such coincidence, multivibrator 419 is operated by the lagging edge of the Q pulse. Multivibrator 419 is reset by the leading edge of the next Q pulse, to prepare for possible use of five-gate 408 during the next period.

The pulse from register control unit K/7 is passed to all section control units by lead 405.

In the control unit of the multiplex which has demanded the free register pulse, the allotted pulse passes through two-gate 348 to one-gate 351 of the free register channel store. In all other multiplexes multivibrator 357 in the free register channel store is not in the state to which it would be set by the C and D pulses identifying their respective section control units. The pulse from register control unit K/7 then passes through two-gate 349 and one-gate 360 to inhibiting gate 353 of the free register channel store of said other multiplexes. Thus if a pulse of the same phase as that just allotted has previously been allotted as a free register channel pulse to another multiplex, it is allotted to the multiplex which has just made the demand and is effectively withdrawn from the multiplex to which it was previously allotted— as described earlier.

During the period of each Q pulse, by the action of two-gate 375 associated with free register channel store 197 of the section control unit which has received its identifying C and D pulses, an allotted channel pulse is passed to delay line 355 in the channel pulse store. Here, as explained in Section I.3, the pulse will be suppressed at inhibiting gate 839 if the delay lines associated with a busy subscriber are being marked at that time by signals from converter K/3. If the subscriber so marked is not busy, the pulse will be passed to two-gates SG1/3 to SG16/3 associated with each of the 16 delay lines SD1 to SD16. The pulse will be passed by the two-gates of the three marked delay lines of a non-busy subscriber, assuming that three non-busy delay lines are being marked during this period. The same pulse is passed within the section control unit to one-gate 305 in busy channel store sub-unit 195. The pulse consequently appears at the input of two-gates SG1/1 to SG16/1 (FIGURE 16), and so at the outputs of those of the said two-gates which are associated with the three delay lines then being marked by the pulse from converter K/3. The pulse is then passed through the three delay lines concerned to the second input of the appropriate three of two-gates SG1/1 to SG16/1.

The synchronous pulses that enter the said three delay lines pass to terminals 939, 940 and 941 (FIGURE 19), respectively, of the subscriber's line unit associated with the three delay lines in which pulses are travelling, and a corresponding pulse is emitted by three-gate 914; but if the instrument of the corresponding subscriber is on its rest, the bias on two-gate 918 prevents that two-gate from re-emitting the pulse.

II. Performance for a Successful Call Between Subscribers Connected to the Same Multiplex II.1. *Seizure of a register channel.*—It will be assumed that subscriber number 0001 is calling subscriber number 0004.

Both subscribers are connected to the same multiplex of the exchange, and the calling subscriber is identified within this multiplex by the number 001. His subscriber line unit A/0001 is associated with the delay lines SD1, SD6, SD12 of channel pulse store A/1. His number 001 is also associated with the pulse C0, D0 and D5, U0 and U6. At some time within a quarter of a second after the subscriber has lifted his receiver to make a call, a time will occur when these 5 pulses occur simultaneously at the outputs of pulse generator K/1. Provided that converter K/3 is not being used for setting up a call for some other subscriber, these pulses will pass into converter K/3 and will appear at output terminals T1, T6, T12. The calling subscriber's delay lines SD1, SD6, SD12 in channel pulse stored A/1 are thus "marked." As described in Section I.4, provided that a free register channel pulse has been allotted to the multiplex A, an allotted channel pulse will appear at the output of three-gate 914 in the subscribers line unit A/0001.

The subscriber's instrument is not now on its rest; he has lifted it to make his call, thus causing the bias to be removed from his modulator gate 918. The allotted channel pulse is then passed to speech output highway 883(A) (FIGURE 23) of the multiplex A.

A clipping amplifier (viz. clipper 294 in FIGURE 4) of busy channel store 195 in section control unit A/2 is receiving pulses on this highway over lead 1073 (FIGURE 23), and every pulse which is detected on the highway is passed to the said busy channel store. From the busy channel store the freshly registered pulses are passed with pulses of any other busy channels to two-gates SG1/1 to SG16/1 in channel pulse store A/1. The pulses applied to the three delay lines of the calling subscriber then do not as usual pass only once through the delay lines, but are allowed to circulate because, having been able to pass through the speech highway (as a result of the removal of bias on two-gate 918 because of the removal of the subscriber's instrument) and over lead 1073, they are re-emitted at terminal 292 (FIGURE 4) of store 195 and re-appear at the three of the said two-gates synchronously with the application of pulses from the outputs of the delay lines to the three said two-gates. These pulses then appear at the usual pulse repetition interval at the output of three-gate 914 in the calling subscriber's line unit. He has then seized the allotted register channel.

As soon as the seized channel pulse is applied to terminal 290 of the busy channel store it is applied to one-gate 360 of free register channel store 197, causing the said one-gate to apply voltage to one-gate 353 and suppress the pulse from further circulation in the free register channel store; and it is also applied to four-gate 369 in store 197.

Lead 352/1 from one-gate 351 in the free register channel store is connected to two-gate 389 in busy register channel store 198 and comes from a point in the circulating path of free register channel store 197 before inhibiting gate 353. At the time that the pulse is cleared from free register channel store 197 by the action of inhibiting gate 353 there is a second coincidence of the free register channel pulse and the new busy register channel pulse at two-gate 389 which gate provides input pulses to busy register channel store 198. The pulse is thus made to circulate in that store.

Another free register channel pulse will be allotted to the multiplex, ready for the next calling subscriber, within the next few milli-seconds, as described in Section I.4.

II.2. *Seizure of a register.*—Pulses from calling subscriber's line unit A/0001 are present on the speech output highway 883(A) (FIGURE 23) of the multiplex. Corresponding pulses are stored in busy register channel store 198. Two-gate 387 shown at the bottom of the circuits of that store then operates, and feeds the pulses to terminal 378 and thus to lead 438 (FIGURE 6) and thus to terminal 428 on register control unit K/7 whence they pass to and are detected by clipper 426 (see FIGURE 5). The manner in which this results in the allocation to the calling subscriber of a free register, has already been described in connection with FIGURES 5, 6 and 7.

Each register is tested several times per second so that if one register is free when the subscriber lifts his receiver he will not be conscious of any delay before receiving dial tone. If all registers are busy the testing continues until one becomes available.

II.3. *Operation of the register.*—It has now been assumed that the calling subscriber No. 0001 has been allotted a channel, that he is connected by that channel with the speech highways of the multiplex, that these highways have been connected in section control unit A/1 (for that channel) with the register highways 432 and 436 (see FIGURE 6) of the exchange, and that a register has been seized and allotted pulses of the same channel. The calling subscriber now dials the wanted number; and the manner in which this produces the requisite settings of the counters in the register has already been fully described in connection with FIGURE 7.

It is at present being assumed that subscriber No. 0004 is being called. The first dialled digit therefore appears as a train of 10 dialling impulses. Now it has been explained that this digit is recorded by counters 584 and 585 (in FIGURE 7); and it will have been appreciated that the two counters co-operatively count on a biquinary system: they will therefore now be referred to collectively as "the first biquinary counter." Similarly, counters 590 and 591 will be collectively referred to as the "second biquinary counter," counters 596 and 597 as the "third biquinary counter," and counters 601 and 602 as the "fourth biquinary counter." The first biquinary counter then performs a complete cycle of operations, leaving stages 584/0 and 585/0 in the energised condition. The inter-digital pause is then detected, and counter 572 is stepped to its second condition (i.e. with stage 572/2 energised). The impulses of the second dialled digit are then passed to the second biquinary counter, and this counter is also stepped to the condition corresponding with the biquinary number 00. The same procedure is repeated with the third biquinary counter for the third dialled digit. The fourth dialled digit is a 4, so the fourth biquinary counter is left with stages 601/4 and 602/0 energised. Stage 5 of counter 572 is then energised.

The stored numbers are not passed out of the register until four-gate 580 operates. This gate has inputs peculiar to the register which has been seized, as already described.

The output signals from the register are controlled by multivibrator 595 which is operated by four-gate 580 as previously described in detail. When operated, signals representing the stored number are passed to converter K/3 as previously described. For the call now being described, voltage is applied to terminals m0, m5, c0, c5, d0, d5, u4, u5, of the register. While the register is giving output voltages on the said terminals, pulses of the phase of the register channel in use, are applied to one-gate 534 and thus to lead 535 (see FIGURE 8) which is connected to terminal 244 and two-gate 249 in register channel temporary store sub-unit 193 in every section control unit.

At the end of the output from the register, all the counters, and multivibrator 567 concerned with dial tone, are re-set as previously described.

II.4. *Operation of the converter.*—The way in which voltages applied to terminals m0 to m6, c0 to c6, d0 to d6, u0 to u6 of a register, cause voltages to appear at the output terminals of converter K/3 and of MC unit K/2, has already been explained in detail. For the present call, voltages appear on terminals T1, T6, T15 of converter K/3 (FIGURE 10).

These voltages persist through a single period of 233 micro-seconds during which a register gives an output, after which the converter reverts to its "preparation state."

II.5. *Recognition of the call as being between subscribers on the same multiplex.*—It will have been noted, in connection with FIGURE 15, that every cell (I(6, 8), for example) of interconnecting unit K/18, is connected to the section control unit of one multiplex and to terminals on MC unit K/2 which identify some other multiplex. Accordingly, no cell in unit K/18 can be receiving pulses from multiplex A and from terminals m"0 and 790 of MC unit K/2, since no cell suitably connected exists.

Speech channel control sub-unit 192 of section control unit A/2 in multiplex A, however, has its terminals 209 and 210 connected to terminals m"0 and 790, and two-gate 235 (FIGURE 4) accordingly gives an output.

While two-gate 235 is giving an output, pulses of the channel used for the register are applied to lead 535 as described in Section II.3. These pulses are of the same phase as the register channel being used by the calling subscriber. The pulses applied to lead 535 and thus to two-gate 249, synchronise with the register pulses being repeated in busy register channel store 198 and applied therefrom over lead 268 to the second input of two-gate 249, so that pulses of this phase are caused to be repeated in delay line 256 in sub-unit 193 of unit A/2 in multiplex A—and only in unit A/2 (and not in any other multiplex) since only in unit A/2 does the busy register channel repeat pulses of the correct phase. Multivibrator 252 in store 193 of unit A/2 (FIGURE 4) is also operated by the output from gate 249 to apply voltage to one input of six-gate 213 in speech channel control sub-unit 192 in section control unit A/2, and two-gate 235 also gives an input on lead 217 to six-gate 213. This combination of signals indicates that a call is about to be set up for which both parties are connected to this section.

II.6. *Selection of speech channels.*—For this call two speech channels having a phase difference of 50 channels are required, one for the calling and one for the called subscriber.

A channel pulse for the called subscriber's line unit A/0004 is to be applied to his delay lines in channel pulse store A/1 once only from six-gate 213. This pulse is delayed by 50 micro-seconds in delay line 225 (in sub-unit 192) as compared with the channel pulses subsequently to be used by the calling subscriber. The pulse must not be applied to the called subscriber's delay lines in channel pulse store A/1 during the first half of the period of the register output, since the circuits of the channel pulse store might not then have determined whether the called subscriber is busy. For this reason Q pulses (which occur during the second half of the said period) are applied to six-gate 213 by lead 219.

It has already been explained that pulses of all channels in use on either speech highway of the multiplex are passed through clippers 294 and 297 to delay line 303 in the busy channel store of section control unit A/2. Pulses of corresponding phases circulate in delay line 303 in this store until the respective channels are cleared. Any channel for which there is not a pulse circulating in the said busy channel pulse store is then a free speech channel. Delay line 303 is centre tapped. Absence of pulses at the end and at the centre tap of this delay line during the period of a clock pulse applied from lead 212 to six-gate 213 then indicates the existence of two suitable free channels. Six-gate 213 detects the presence of such a pair of free channels, if there is such a pair, during the period of a Q pulse occurring during a period of output voltage from the register. As the performance of a successful call is being described, it is to be assumed that there is such a pair of channels. Also as free channels having a phase difference of 50 channels are being detected, the output pulse from six-gate 213 will occur during the first 50 micro-seconds of the Q pulse.

The pulse from six-gate 213 passes through one-gates 271 and 276 to circulate in delay line 282 in the speech channel temporary store. The lagging edge of this pulse is made to reset multivibrator 252 in the register channel temporary store, thus preventing any further pulses from appearing at the output of six-gate 213.

The pulse from six-gate (passing through delay line 225 and delayed 50 micro-seconds) is applied to terminal 201 which is connected to lead 997 on tone unit A/19 (FIGURE 21), and to terminal 865 on unit A/1 (FIGURE 16); and the said pulse is also applied to one-gate 305 (in busy channel store 195 of unit A/2) and thence to terminal 292 and so to terminal 819 (FIGURE 16) of unit A/1.

II.7. *Selection and function of a phase changer sub-unit.*—As a successfull call is being described, it is assumed that at least one phase changer sub-unit is free. For the purpose of description it is being assumed that in fact the second and fifth sub-units are both free and the rest busy.

The pulse from terminal 206 of the speech channel control section of section cnntrol unit A/2 is applied to lead 1039 and thus to one-gate 1049 and every one-gate 1037 of phase changer A/22 (see FIGURE 22).

Because sub-unit 1033 is busy, slow-release device 1048 in that sub-unit is giving an output. The pulse on lead 1039 therefore does not pass through one-gate 1049. Also, because of the output from device 1048, one-gate 1051 does not give an output.

In sub-unit 1034 there is no signal at either inhibiting input of one-gate 1037. The pulse on lead 1039 is therefore passed to the delay line 1044 of this sub-unit, which, the first free one of the column, is thus seized for this call. At the instant of arrival of the pulse on lead 1039, there was no output from slow release device 1048 in this sub-unit. A voltage is consequently present at the output of one-gate 1050 of sub-unit 1034. This signal is applied to an inhibiting input of one-gate 1037 in the third sub-unit. Here it has no effect since this sub-unit is assumed to be busy, and there is a signal at the other inhibiting input of its gate 1037. The signal from the second sub-unit is passed through one-gate 1050 in the third sub-unit to one of the inhibiting inputs of one-gate 1037 of the fourth sub-unit. The fourth sub-unit, being busy, behaves like the third. The output from gate 1050 in the fourth sub-unit is applied to an inhibiting input on gate 1037 in the fifth sub-unit and prevents the latter from being seized although free. The sixth sub-unit is again busy.

The presence of a signal on lead 1054 from the sixth sub-unit indicates that a free sub-unit has been present. This load is connected to lead 970 on "Busy 1" of tone unit A/19 and indicates that busy tone should not be sent to the calling subscriber unless the called subscriber is actually busy.

The ½ micro-second pulse on lead 1039 is in phase with the pulses of the speech channel which it has, as already described, been determined can be made available to the calling subscriber, and the said pulse has been applied by lead 1038 to one-gate 1037 in sub-unit 1034 and thus to one-gate 1041, leads 1042 and 1043 and thus to the input of delay line 1044 (which, to recapitulate as a reminder of a process many times already described, will, after traversing delay line 1044, be re-applied to the second input of one-gate 1041, and thus be re-applied to the input of the said delay line—so as to result in repetition of the said pulse at the train repetition interval). Accordingly, at the instant at which the said pulse is repeatedly applied to lead 1043 and therefore to one input to two-gate 1045 (in sub-unit 1034, of course), synchronous pulses will appear at the second input to two-gate 1045 from lead 1065 which is connected to output speech highway 883(A) (see FIGURE 23), as soon as the calling subscriber is actually supplied with his speech channel, since pulses of that channel will then be present on speech highway 883(A). Two-gate 1045 has thus, by the application to it from lead 1043 of the pulses which are being repeated in delay line 1044, been made ready to emit (once synchronous pulses appear on output speech highway 883(A)) pulses in phase with those of the calling subscriber's speech channel.

Similarly, two-gate 1056 in sub-unit 1034 is receiving pulses from the tap on delay line 1044 over lead 1055 and is thus made ready to pass to widener 1057 pulses which (being delayed in phase by 50 channels in comparison with those applied to two-gate 1045) will synchronise with pulses on lead 1066 to the second input of two-gate 1056, when such pulses appear on lead 1065, being applied to lead 1065 from lead 1024 on "Ringing" sub-unit of tone unit A/19 (FIGURE 21), being transmitted (as shown in FIGURE 23) via junction unit 1071 and speech output highway 883(A) to lead 1065. Such pulses have the phase of the channel to be used by the called subscriber.

The purpose of wideners 1057 and 1063 (which are identical) is to provide an economical means of providing an output which effectively endures for a time of 50 micro-seconds (i.e. the time elapsing between the occurrence of a pulse of the calling subscriber's channel and the occurrence of the next pulse of the called subscriber's channel). They consist of a condenser which is charged by the pulse from the relevant two-gate (1045 or 1056, as the case may be) which condenser is shunted by a resistance arranged to give the resistance-capacity combination a time constant equal to the said 50 micro-seconds. Each resistance-capacity combination is connected to the input of the two-gate that it feeds, through a cathode-follower circuit. The output voltage from each of the said resistance-capacity combinations (and therefore from the associated cathode-follower of each) depends on the amplitude of pulses input to it, this being necessary in order that the output of the two-gate fed by it shall reproduce any speech modulations imposed on the speech channel fed to the combination.

Thus the signal from the output of two-gate 1062 (whose second input is connected to the tap on delay line 1044) will be the modulated speech pulses of the calling subscriber, but with the pulses of said output delayed by 50 micro-seconds to be in phase with the channel intended for the called subscriber, while the output of two-gate 1058 will be the modulated speech pulses of the called subscriber, but with the pulses of said latter output delayed to 50 micro-seconds later than the pulses of the called subscriber's speech channel and therefore in phase with the pulses of the calling subscriber's speech channel.

II. 8. *Identification and speech-connection of the called subscriber.*—The output signals from converter K/3 occurring during the output period of a register identify the number of the called subscriber within his multiplex. For the call being considered, terminals T1, T6, T15 of converter K/3 are energised. This causes signals to be applied to two-gates SG1/3, SG6/3, SG15/3, and two-gates SG1/4, SG6/4, SG16/4, associated with delay lines SD1, SD6, SD16, (see FIGURE 16) in the subscriber's channel pulse store (A/1, B/1, and so on) in every multiplex in the exchange. Since it is only in multiplex A that pulses are being repeated in delay line 282 in speech channel temporary store sub-unit 194 (see Section II.6 above), it is only in channel pulse store A/1 that the aforementioned voltage outputs from converter K/3 can result in the admission of pulses to delay lines SD1, SD6, SD15 from a speech channel temporary store. As regards all multiplexes other than multiplex A, the application of voltages from terminals T1, T6 and T15 merely has the effect of applying them as though they were "preparation" pulses omitted by converter K/3 in the normal course and the effect of such "preparation" pulses has already been described.

The pulse from terminal 201 (FIGURE 16) of speech channel control sub-unit 192 (which pulse has the phase of the speech channel intended for the called subscriber) is applied to terminal 865 on unit A/1 and then via one-gates 837 and 859 to lead 860, whence it is applied to two-gates SG1/3, SG6/3, SG15/3, which (because now "marked" by voltages on their respective second inputs from converter K/3) apply voltages through one-gates SG1/2, SG6/2, SG15/2 (respectively) to inputs of two-gates SG/1, SG6/1, SG15/1 (respectively). The latter two-gates are receiving synchronous pulses through terminal 819 from terminal 292 on busy channel sub-unit 195; and the latter two-gates therefore each pass a pulse to their respectively associated delay lines, for the called subscriber. Re-circulation of these pulses will be permitted because pulses modulated with ringing tone are (as described in Section II.10 below) emitted on lead 1024 from tone unit A/19 (see FIGURE 21) which lead is connected to junction unit 1071 (see FIGURE 23) and as there shown to terminal 290 on unit A/2. This impresses pulses of the phase of the called subscriber (through clipper 294, FIGURE 4) on delay line 303 in busy channel store 195; and pulses of this phase are accordingly now emitted from terminal 292 in sub-unit 195 and thus applied to terminal 819 on unit A/1 (FIGURE 16)—and now continue to circulate in the called subscriber's delay lines therein, in manner already explained in the description of the delay line pulse stores.

In called subscribers line unit A/0004 pulses corresponding with those applied from the delay lines appear at the output of three-gate 914. The pulses thence applied to modulator gate 918 have no effect yet, since the called subscriber has not yet lifted his receiver and the bias on gate 198 has not yet been removed. The pulses applied by gate 914 to demodulator gate 923 also have no effect yet, since pulses of the calling subscriber's speech channel are not yet being applied to lead 924.

II.9. *Identification and speech-connection of the calling subscriber.*—When, as described in Section II.5, a pulse is emitted by two-gate 249, that pulse is also passed to be repeated in delay line 256 in register channel temporary store 193 (FIGURE 4); and pulses are so repeated while converter K/3 is giving its output. Pulses of the calling subscriber's speech channel are also being repeated in delay line 282 in speech channel temporary store 194, as described in Section II.6. Register channel pulses circulating in delay line 256 are applied to terminal 247, and thus (FIGURE 16) to terminal 849 and one input of two-gate 833 in unit A/1; and pulses of this same channel will be received by three-gate 822 (as set out in the description of subscribers channel pulse store A/1) from delay lines SD1, SD6, SD12 (which are those—see Table A—associated with calling subscriber 0001), and will cause three-gate 822 to emit pulses of the phase of the calling subscriber's register channel and to apply them to two-gate 833, as soon as pulses of that channel are next permitted to pass through two-gates SG1/4, SG6/4, SG12/4. This next occurs when voltages are next applied by converter K/3 to its terminals T1, T6, T12 in the course of its cyclical emission of pulses during its "preparation" state. When this occurs, the pulse emitted by two-gate 833 is, as one effect, applied to lead 853 and to terminal 246 on unit A/2 where (inter alia) it causes one-gate 264 to apply voltage to the inhibitory input of one gate 254 (see FIGURE 4) and stop pulse circulation in delay line 256 in register channel temporary store 193.

Returning to FIGURE 16, it will be seen that the said pulse from two-gate 833 is applied to multivibrator 846, causing the latter to apply voltage to two-gate 854, which is also receiving pulses of the calling subscriber's speech channel from terminal 280 on speech channel temporary store 194 in section control unit A/2. Two-gate 854 there applies the pulse to one-gate 859, which transmits the said pulse to two-gates SG1/3, SG6/3, SG12/3—which at this time are also receiving voltage on their respective second inputs, from terminals T1, T6, T12 of converter K/3.

Now it was explained in Section II.8 that pulses of the speech channel of the called subscriber are being repeated in delay line 303 in busy channel store 195. The pulses emitted on lead 1024 from tone unit A/19 in the phase of the speech channel of the called subscriber and applied to output speech highway 883(A)—as described in Section II.7—are transmitted from highway 883(A), as shown in FIGURE 23, by lead 1065 to phase changer A/22 and are therefore repeated on lead 1068 (after a phase delay of 50 channels, thereby re-appearing in the phase of the speech channel of the calling subscriber) to one-gate 1069) whence they are emitted to junction unit 1070 and thus to lead 1075 and applied to terminal 291 of section control unit A/2. As seen in FIGURE 4, from terminal 291 of busy channel store 195 the pulses in the phase of the calling subscriber's channel pass through clipper 297 and one-gate 299 to be stored in delay line 303. They are therefore emitted from terminal 292 and applied (see FIGURE 16) to terminal 819 on unit A/2 and thus to two-gates SG1/1, SG6/1, SG12/1. It has been explained above how pulses of this phase have been applied to two-gates SG1/3, SG6/3, SG12/3, and that these two gates have voltages from converter K/3 on their respective second inputs. The pulses from the latter two-gates therefore pass via one-gates SG1/2, SG6/2, SG12/2 to the second inputs of two-gates SG1/1, SG6/1, SG12/1, respectively, which accordingly pass these pulses in the phase of the speech channel of the calling subscriber to the inputs of calling subscriber's delay lines SD1, SD6, SD12.

Multivibrator 846 is then re-set by the lagging edge of the Q pulse (applied to terminal 844 as shown in FIGURE 16) occurring at the end of the period during which converter K/3 has been applying voltage (as mentioned in the first paragraph of this Section II.9) to terminals T1, T6, T12.

The following four operations now need to be performed, in addition to the clearance of register channel temporary store 193 which was mentioned above, viz:

(i) Clearance of speech channel temporary store 194,
(ii) Clearance of the register which has been in use by the calling subscriber,
(iii) Clearance of converter K/3,

135

(iv) *Clearance of register channel.*

(i) Speech channel temporary store 194 is cleared because, the pulses just described as applied to delay lines SD1, SD6, SD12, are applied to terminals 939, 940, 941, respectively, of line unit A/0001 (see earlier description of subscribers line units and FIGURE 19), where they pass through three-gate 914 and are thence passed through modulator 918 (since, this being the calling subscriber, he has removed his instrument and thus removed bias from the said modulator gate 918). The pulses of the calling subscriber's speech channel are thus applied to lead 921 (1)—see FIGURE 13—to junction unit 1071, and thus by lead 1073 to terminal 290 on a busy channel store 195 in section control unit A/2. They thence pass (see FIGURE 4) to clipper 294, and so to one-gate 285 in speech channel temporary store 194, which one-gate thus applies a pulse of the phase of the calling subscriber's speech channel to the inhibitory input of one-gate 278, thus suppressing pulses of this phase from further circulation in delay line 282.

(ii) The register which has been in use is cleared via register control unit K/7, as already mentioned towards the end of the description of that unit before the description of the forced release procedure. It was there stated that a ½ micro-second pulse is applied to terminal 490 of unit K/7 to effect the clearance. This clearing pulse is derived as follows.

Terminal 490 is connected (as stated in the description of FIGURE 9) to lead 615/1, which is in turn connected to lead 615 and thereby to terminal 245 of register channel temporary store 193. Terminal 245 is connected to the output of two-gate 265, as shown in FIGURE 4. Now when one-gate 264 emits the ½ microsecond pulse above referred to which is applied to the inhibitory input of one-gate 254, the same pulse is applied from the output of one-gate 264 to one input of two-gate 265 to the second input of which are being applied pulses of the same phase from busy register channel store 198. Two-gate 265 accordingly emits the required ½ microsecond pulse to terminal 245, and thus applies to terminal 490 the ½ micro-second pulse (in the phase of the then-existing register channel) to clear this channel from unit K/7 in the way previously described—i.e. suppresses pulses of this phase in the three of delay lines RD1 to RD8 which will be the only delay lines in register control unit K/7 which are repeating a channel pulse of this phase at this time. This, as already explained, causes the pulses of this channel to cease to be repeated in the register which has been using them up till then. As also explained previously, this cessation of pulses in a register, constitutes the release of that register.

(iii) Terminal 245 which emits the ½ micro-second clearing pulse whose effect on control unit K/7 has just been explained, is (since it has connected to it lead 615 shown in FIGURE 9) connected to terminal 614 on converter K/3—shown also in FIGURE 10. The ½ microsecond pulse which cleared the register, is therefore also applied from terminal 614 to multivibrator 757. It was stated in the description of the operation of the register that when dialling has been completed and a register is ready to give an output, it waits until the appropriate three pulses are applied to four-gate 580 (in FIGURE 7), and that the resulting application of voltage to one or other of terminals u'5, u'6 (FIGURE 10) causes multivibrator 757 to cease to apply voltage to lead 759. To clear the converter K/3, it is now necessary to restore multivibrator 757 to the condition in which it does apply voltage to lead 759, thus restoring converter K/3 to the condition in which a D5 or D6 pulse (applied to terminal 541, or terminal 548, respectively) can be transmitted to some register to cause it to give an output when required. This restoration of multivibrator 757 will, as will be seen from FIGURE 10, result from the application of the said clearing pulse to terminal 614. The said pulse therefore clears converter K/3.

(iv) It will be seen from FIGURES 6 and 7 that when a register is released, the register channel pulses previously applied to two-gate 557, cease to be applied to that two-gate: the reason is explained in detail in the description of the registers. Accordingly, pulses of the corresponding register channel cease to appear on register highway 436 shown in FIGURE 6. The register channel is, however, only partially cleared (so far as multiplex A is concerned), because pulses of the phase of this channel are still being repeated in delay line 399 in busy register channel store 198 (FIGURE 4) and in delay lines SD1, SD6, SD12 in unit A/1.

To follow the rest of the clearing operation, it is convenient next to consider the operation of release control sub-unit 196 in FIGURE 4. When a Z pulse is next emitted by pulse generator K/1, it is applied as there shown to terminal 309 and thus to one input of three-gate 316. Pulses of the phase of the register channel now undergoing suppression are applied to three-gate 316 from one-gate 301 in busy channel store 195, and to its third input from one-gate 336 which is being fed with such pulses from busy register channel store 198. Three-gate 316 accordingly feeds a pulse of the phase of this channel to be repeated in delay line 322. (Previously, pulses of this phase fed to delay line 322 during successive Z pulses, have been cleared by register channel pulses which have appeared on both speech highways and been fed through clippers 294 and 297 to two-gate 333, one-gate 329, and thus to the inhibitory input of one-gate 320. Dialling impulses temporarily suppress the register channel pulses, appearing on the output speech highway; but such suppressions always last a shorter time than the time elapsing between a Z pulse and the next X pulse, and therefore suppression at one-gate 320 has time to be effected before the next X pulse. As will be seen shortly, release control subunit 196 only carries out its functions if pulses are still present in delay line 322 when the next X pulse occurs.) However, a time has now come when the register channel pulses under consideration have disappeared from the output speech highway, and therefore the pulse last referred to before the parenthesis continues to circulate in delay line 322. Therefore, when the next X pulse is applied to two-gate 324, that two-gate emits a pulse in the phase of the pulse circulatinig in delay line 322. The emitted pulse is applied by lead 403 and one-gate 402 to the inhibitory input of one-gate 401, suppressing this register channel pulse from continuing to circulate in delay line 399 in busy register channel store 198. The said emitted pulse is also applied from lead 403 through lead 308 to the inhibitory input of one-gate 301, so suppressing further repetition of pulses of this phase in delay line 303 in busy channel store 195. These pulses are therefore no longer emitted from terminal 292 on store 195, and therefore (see FIGURE 16) cease to be applied to one input each of two-gates SG1/1, SG6/1 and SG12/1, thus suppressing the pulses of this channel in the delay line of the calling subscriber.

This completes the clearance of the register channel.

II.10 *Ringing and metering.*—Ringing current is to be supplied to a subscriber's line when a series of pulses is present at the output of three-gate 914 in the called subscriber's line unit (viz. A/0004) and his instrument is on its rest. The speech channel pulses applied to three-gate 914 (see FIGURE 16) are accordingly applied to to ringing control unit 913 and cause his bell to ring. The lifting of his receiver stops the ringing of his bell, the change of D.C. voltage of terminal 910/1 being used to bring about the suppression of the discharge through the cold cathode tube which was triggered off to start the ringing.

Speech channel pulses in the phase of the called subscriber now coming from three-gate 914 in line unit A/0004 of the called subscriber also pass by lead 922 and lead 938(4) to one-gate 1010 (FIGURE 23) and thus by lead 1009 to two-gate 999 in "Ringing" sub-unit of tone unit A/19. The first such pulse coincides with a pulse applied by leads 997 and 998 to two-gate 999 from terminal 201 of speech channel control sub-unit 192 in section control unit A/2, which accordingly passes a pulse of the phase of this speech channel to be repeated in delay line 1006 in the said "Ringing" sub-unit. From the output of one-gate 1007 (which feeds the input of delay line 1006) the repeated pulse also passes through two-gate 1016 where (as stated in the description of tone unit A/19) the voltage input on lead 1019 modulates the pulses emitted by two-gate 1016 to one-gate 993, from which one-gate the modulated pulses are applied by lead 1024 to junction unit 1071 (FIGURE 23). They then pass over highway 883(A) and lead 1065 to phase changer A/22 and are returned, changed by A/22 to the phase of the calling subscriber, over lead 1068 to one-gate 1069, and thence via junction unit 1070 to lead 924(1) to demodulator two-gate 923 in subscribers line unit A/0001 (FIGURE 19).

From two-gate 923 aforesaid, the pulses pass through lead 926, widener 927, amplifier 928 and filter 929 (being thus demodulated as mentioned in the description of subscribers line units) and the resulting signal applied to hybrid 911 appears on line 0001 and is heard in the instrument of calling subscriber 0001 as conventional ringing tone.

A stage has thus been reached at which the bell of the called subscriber has been rung, and the calling subscriber (whose instrument was earlier removed from its rest) is hearing ringing tone.

It may here be remarked that all of the pulses modulated with "tones" are suppressed during the period of each Z pulse. This interruption of the signals carrying tones has two purposes, one of which is about to be described while the other has to do with the clearing circuits and will be described later.

When called subscriber 0004 lifts his receiver, the bias is removed from his modulator two-gate 918 (FIGURE 19) and the speech channel pulses applied to two-gate 918 are emitted to his lead 921 and thus (FIGURE 23) applied to output highway 883(A) and thus (after changing phase in passing through phase changer A/22) applied through one-gate 1069 to the input highway. These pulses from the called subscriber's modulator gate are not interrupted by the Z pulses (as are the above mentioned pulses which have been modulated by "tones"); and pulses of the speech channels allotted to these two subscribers, and originating from the called subscriber's delay lines, therefore now for the first time appear on the speech highways during the period of a Z pulse. (Pulses modulated by "tones" also originated, somewhat indirectly, from the called subscriber's delay lines; but such pulses have, as mentioned in the preceding paragraph, been interrupted during Z pulses.)

The pulses emitted as above described and appearing on speech output highway 883(A) are transmitted by lead 1073 (see FIGURE 23) to terminal 290 on busy channel store 195 of section control unit A/2 and thus (FIGURE 4) are detected by clipper 294 and passed by leads 295, 295/1 and 339 to terminal 310, to which is connected, see FIGURE 21, lead 1032 to four-gate 1018 in "Metering" sub-unit of tone unit A/19. Accordingly during the next coincidence of a Z pulse and a Q pulse (applied to four-gate 1018 by leads 1023 and 1032, respectively) there will, since pulses are being applied on lead 1017 from the input lead to delay line 1006, be a pulse from four-gate 1018 which is applied (as shown) to, and repeated in, delay line 1014. The repetition of the pulse in delay line 1014, causes that pulse to be applied to lead 1013, one-gate 1012 and lead 1011 and thus to the inhibitory input of one-gate 1007—thus suppressing circulation in delay line 1006 and thus ending the "ringing tone" in the calling subscriber's receiver.

(It is now necessary to revert to the earlier instant at which a pulse on lead 997 was applied by lead 998 to two-gate 999. That same pulse was applied by lead 997 to one-gate 996 and thus started to be repeated in delay line 994 of "NU 2." However, as soon as the pulse which was fed to delay line 1006 in "Ringing" sub-unit is emitted from the output of that delay line, it is applied by lead 1005 to one-gate 1001 and thence to the inhibitory input of one-gate 995, thus preventing repetition of the pulse in delay line 994 in "NU 2." Had the called number been "unobtainable" in the sense used in the telephony art (though belonging to an installed multiplex), no pulse would have been emitted by two-gate 999 (since it would have had no input from lead 1009) and the pulse in "NU 2" would then not have been suppressed in the way just described. The advantage of this arrangement by which a pulse is fed to "NU 2" but immediately suppressed if ringing tone can be emitted, is that, as against most eventualities which do not result in a major failure of the installation, the equipment has been made ready to emit "number unobtainable" without its having first been necessary to make ad hoc arrangements for providing number-unobtainable tone to be supplied in relation to subscribers' numbers individually.)

Turning back to the point reached immediately before the foregoing parenthetical paragraph, there had just been described the beginning of the repetition of ½ micro-second pulses (of the phase of the called subscriber's speech channel) in delay line 1014 (FIGURE 21). These pulses are repeated at a pulse repetition interval of 200 micro-seconds; but to prevent the circulation of a second pulse 100 micro-seconds after the first (if such a second pulse be injected) the central tap on delay line 1014 is connected to an input on one-gate 1027 and thus to an inhibiting input on one-gate 1026.

These pulses with a repetition interval of 200 micro-seconds constitute the metering control signal and are applied by lead 1030 to one-gate 993 and thus to lead 1024 and (see FIGURE 23) to speech channel highway 883(A) and phase changer A/22 (as for pulses modulated with ringing tone as described above) and return on lead 1068 in the phase of the calling subscriber's speech channel and thus to calling subscriber's line unit A/0001 (as above described for the supply ringing tone to that unit). The said pulses are thus applied to gate 923 and thus to leads 925, 932 and widener 933 in the said line unit, and thence to meter control unit 935 thus setting it into operation. The input to the cold cathode tube previously referred to in connection with the said unit 935, is applied through a band pass filter passing a frequency of 5 kc./s., thus taking advantage of the fact that the pulses to operate unit 935 have a pulse repetition frequency of 200 micro-seconds, and are therefore indistinguishable (for this purpose) from pulses of the usual 100 micro-seconds repetition period heavily modulated at 5 kc./s.

The purpose of this metering unit is merely to record that a call has been made, and not its duration. Once the metering unit has been operated, therefore, it is unnecessary for pulses to continue to be circulated in delay line 1014. Accordingly, these pulses are suppressed when a Y pulse is next applied to lead 1029, which causes one-gate 1027 to apply voltage to the inhibitory input of one-gate 1026.

II.11. *Clearing.*—It will be seen from FIGURE 4 that pulses from busy register channel store 198 are fed by one-gate 392 to lead 268 and thence by lead 338 to one-gate 336 and to one input of three-gate 316. Pulses circulating in busy channel store 195 are fed from one-gate 299 to one-gate 301 and thence via leads 302, 302/2, 307 and 307/2 to a second input of three-gate 316.

Pulses of register channels which are busy in any multiplex appear in both the stores just mentioned in the section control unit of that multiplex, and the pulses of any one such channel thus appear simultaneously at two inputs of three-gate 316. Accordingly when a Z pulse is emitted and (as shown in FIGURE 4) applied to terminal 309 of the said section control unit and thus to the third input of three-gate 316, that three-gate emits a pulse in the phase of such busy register channel.

Similarly, three-gate 316 is receiving from one-gate 301 (over the leads traced out above) all other pulses circulating in delay line 303 in busy channel store 195—these other pulses being the speech channel pulses in use in the multiplex in question. These speech channel pulses which are in use in the multiplex may or may not also be appearing on the speech output highway of the multiplex in question—which will again be supposed to be multiplex A as the typical example chosen for the explanation. Pulses on speech output highway 883(A) (FIGURE 23) are (as several times already mentioned) applied to terminal 290 of busy channel store 195 in section control unit A/2 and thus to clipper 294. The speech channel pulses are thence applied via leads 295, 295/1 and 335 to the negatory input of one-gate 336 (where they cannot coincide with a busy register channel pulse on lead 338 to one-gate 336). Accordingly, one-gate 336 does not give an output when a speech channel pulse has been applied to it; but at instants when no such speech channel pulse is being applied to one-gate 336, it does give an output to three-gate 316; and again therefore, when a Z pulse is applied to the third input of three-gate 316, the latter gives an output pulse if a pulse is being applied to it from busy channel store 195 in the absence of a corresponding pulse on the speech output highway of the multiplex.

Pulses of the two classes which have just been specified are therefore fed by three-gate 316 to one-gate 318 and thus caused to be repeated in delay line 322.

When, following the Z pulse just referred to, an X pulse is emitted about 200 milli-seconds later (see detailed description of pulse generator K/1), it is applied as shown in FIGURE 4 to one input of two-gate 324, which will therefore emit (during the 233 micro-seconds that the X pulse endures) any pulse applied to the second input of two-gate 324, i.e. any pulse still then circulating in delay line 322.

Now the inhibitory input to one-gate 320 is supplied from one-gate 329, to one of whose inputs are applied pulses from two-gate 333. The two inputs to two-gate 333 are respectively fed with pulses from clippers 294 and 297 (i.e. with pulses from the two speech highways, as previously described). Any pulse simulaneously appearing on both speech highways therefore causes a pulse to be applied to the inhibitory input of one-gate 320, thus suppressing any pulse of the same phase circulating in delay line 322. Accordingly, any busy register channel pulse, and any speech channel pulse actually in use on both speech channel highways of this multiplex, will be suppressed from circulation in delay line 322 during the said period of about 200 milli-seconds elapsing between the Z pulse and the X pulse above referred to.

Pulses still circulating in delay line 322 at the end of the said period of about 200 milli-seconds, belong to channels no longer in use and need to be cleared from the busy register channel and busy channel stores. The clearing operation, and the consequences in other parts of the exchange, of the clearing operation will now be described. When this clearing operation has been completed the next ensuing Y pulse, applied as shown in FIGURE 4 to one-gate 329, causes the application of voltage to the inhibitory input of one-gate 320 and suppress the pulses previously circulating in delay line 322.

It has been stated above that any pulse still circulating in delay line 322 while an X pulse is being applied, causes two-gate 324 to emit a synchronous pulse. Such pulses (being, as stated, pulses of the phase of channel no longer in use) are applied to lead 327 and terminal 313. The resulting clearing operations will now be described.

(i) CLEARANCE OF BUSY CHANNEL STORE 195

The pulse applied on lead 327 passes via lead 308 to the inhibitory input of one-gate 301.

(ii) CLEARANCE OF REGISTER CHANNEL TEMPORARY STORE 193

The pulse from lead 327 passes on lead 403 to one-gate 264 and thence by lead 263 to the inhibitory input of one-gate 254. The pulse from one-gate 264 also passes via lead 263/1 to one input of two-gate 265. If the pulse in question is a register channel pulse, a simultaneous pulse will be applied to the second input of two-gate 265 by leads 268/1 and 268 from busy register channel store 198, thus causing the emission of the pulse on lead 266 to terminal 245; and the clearing effect of the transmission of a pulse from terminal 245 via leads 651/1 and 651 to terminal 490 of register control unit K/7 (FIGURE 5) and to terminal 541 of converter K/3 (FIGURE 9) has already been described in Section II, 9 above.

(iii) CLEARANCE OF BUSY REGISTER CHANNEL STORE 198

The pulse from lead 327 passes on lead 403 (left-hand part) to one-gate 402 and thus to the inhibitory input of one-gate 394. It will be noted that this suppresses the pulse which otherwise would at this instant have entered the input of delay line 399: it does not suppress the pulse which is at this instant emerging from the output of delay line 399 and which latter is the pulse which, applied substantially instantaneously via one-gate 392 and lead 268 to two-gate 265, permits that two-gate to apply a voltage pulse to terminal 245 as mentioned in the preceding paragraph.

(iv) CLEARANCE OF SPEECH AND/OR REGISTER CHANNEL PULSES FROM CHANNEL PULSE STORE IN SUBSCRIBERS' MULTIPLEX

In Section II.9, subsection (iv), it was explained how it comes about that when a register channel pulse ceases to be repeated in delay line 303 in busy channel store 195, the corresponding channel is suppressed in channel pulse store A/1 in multiplex A. In precisely the same way the suppression of any pulse in busy channel store 195 as a result of a clearing operation as described in sub-section (i) above of this Section II.11, will suppress a corresponding channel (if there be one) in the channel pulse store of the multiplex where busy channel store 195 is being so cleared.

(v) CLEARANCE OF TONE UNIT

Terminal 313 of release control sub-unit 196 is connected to lead 987 of the tone unit in the multiplex to which the said sub-unit and tone unit belong (see FIGURE 21 and the corresponding description). The pulse applied to terminal 313 is accordingly applied by lead 987 to lead 962 and thus, as shown in FIGURE 21, to the inhibitory input of one-gates 957, 972, 983, 995 and 1007—suppressing corresponding pulses in their respectively associated delay lines. (The application of the said pulse from lead 962 to one-gate 985 takes place through one-gate 990 as shown).

Only delay line 1014 of "Metering" sub-unit in the tone unit is not cleared by this operation. The pulse in delay line 1014 is cleared by the application of the next Y pulse to lead 1029.

(vi) CLEARANCE OF PHASE CHANGER

Terminal 313 is also connected to lead 1047 (see FIGURE 22 and the description thereof), and the pulse emitted by terminal 313 is accordingly applied to the inhibitory input of the one-gate 1041 in every sub-unit of the phase changer. It suppresses pulses of the channel of the corresponding phase from that sub-unit (of the phase changer) that has been repeating pulses of this phase.

Where a call is between subscribers connected to the same multiplex (which is the case primarily being dealt

141 with in this Section II), pulses of the channel of the calling subscriber, and pulses of the channel of the called subscriber, will both be cleared when a clearance operation takes place. It may be remarked, for clarification, that the pulse from terminal 313 which clears the phase changer, is in the phase of the speech channel of the calling subscriber.

(vii) CLEARANCE OF INTERCONNECTING UNITS

It has been mentioned that since the call being described in this Section II is between subscribers connected to the same multiplex, no interconnecting unit is concerned. It will be convenient however, here to explain how the emission of a pulse from terminal 313 on release control sub-unit 196 clears the appropriate interconnecting cell when interconnecting unit K/18 is involved.

Lead 810 for each multiplex is connected (see FIGURES 15 and 17) to terminal 313 of the section control unit of that multiplex. Lead 810 for each multiplex is connected (FIGURE 17) to an inhibitory input of one-gate 875 of every cell by which the said multiplex can be connected with any other multiplex. The emission of a clearing pulse from terminal 313 accordingly suppresses pulse repetition in delay line 877 in that cell which is repeating pulses of a channel of the same phase as the said clearing pulse. No cell connected to the lead 810 from an assigned multiplex will be repeating pulses of the same phase as that of the channel which is being cleared, other than the cell handling the call which is being cleared. Accordingly, only the appropriate interconnecting cell is cleared by the clearing pulse.

(viii) CLEARANCE OF SPEECH CHANNEL TEMPORARY STORE 194

A distinct form of clearance will now be dealt with.

In the normal course of setting up a connection between two subscribers, a pulse of the calling subscriber's speech channel is fed into, and repeated in, delay line 282 in speech channel temporary store 194 (FIGURE 4). It is there repeated, and thence applied to the delay lines (in the channel pulse store in the multiplex of the calling subscriber) associated with the calling subscriber. The calling subscriber may, however, by a remote chance, replace his instrument (thus abandoning the call) during the fraction of a second which elapses between the feeding of the pulse to the speech channel temporary store and the application of the pulse to his said delay lines. In that event, it is necessary to clear the pulse from delay line 282 by means of slow release device 288.

Now, when, in the course of setting up of a call, register channel pulses start to be repeated in delay line 256 in register channel temporary store 193, such pulses are applied also to leads 260 and 289 to the input of slow release device 288, which immediately now starts to give an output and continues to do so for so long as the input pulses are repeated at intervals of 100 micro-seconds. The output voltage of device 288, applied to the negatory input of one-gate 285, stops the output that one-gate had previously been giving on lead 284 to the inhibitory input of one-gate 278. It is now possible for pulses to be repeated in delay line 282 as referred to in the preceding paragraph.

If the remote chance referred to in the preceding paragraph should occur, there must come a subsequent time when pulses cease (in the register channel temporary store) for a time long enough for device 288 to cease to give an output. One-gate 285 then applies voltage to the inhibitory input of one-gate 278 and suppresses any pulses then still circulating in delay line 282.

It will be noted that the clearance of speech channel temporary store 194 just described, is not the result of the application of pulses to lead 327 or terminal 313; but it was convenient to deal with it at this juncture, when dealing with other clearing operations.

142

III. *Performance for a Successful Call Between Subscribers Connected to Different Multiplexes*

III.1 *Seizure of a register channel.*—The operations are the same as those described in Section II.1.

III.2 *Seizure of a register.*—The operations are the same as those described in Section II.2.

III.3 *Operation of a Register.*—It will be assumed that subscriber 0001 is making a call to subscriber 2504 (connected to multiplex F).

A different number having been dialled from that supposed to be dialled in Section II, a different number is stored in the register which is being used. The register (FIGURE 7) now applies voltage to terminals m2, m5, c0, c6 (terminal c5 having had voltage applied to it in the previous example), d0, d5, u0, u5 (as before). Other matters are the same as those described in the previous example.

III.4 *Operation of the converter.*—For the present call, voltages appear on terminals T1, T6, T15 of converter K/3 as before.

III.5 *Recognition of the call as being between subscribers connected to different multiplexes.*—For this call, terminals m'2, m'5 and c'6 of MC unit K/2 have voltages applied to them, from the corresponding terminals of the register, when voltages appear at the said register terminals. Consequently, voltages are applied to terminals m"2 and 792 of MC unit K/2 (FIGURE 14).

Accordingly, voltages appear on the leads connecting terminals m"2 and 792 to every cell by which multiplex F is capable of being connected with any other multiplex (as stated in the general rule at the end of the description of interconnecting unit K/18). They are thus applied, inter alia, to two inputs of three-gate 872 (FIGURE 17) in cell I(1, 6).

In the section control unit of the calling subscriber, i.e. unit A/2 since the calling subscriber is the same as in the previous example, matters have been proceeding as described in Section II.5 up to the point at which (as described in the third paragraph of Section II.5) it is stated that multivibrator 252 is operated by the output from two-gate 249. The operation of multivibrator 252 applies voltage to one input of six-gate 213, and four-gate 231; but six-gate 213 this time has no input on lead 217, since two-gate 235 is not receiving voltage from MC unit K/2 (this call not being one to multiplex A). Six-gate 213 therefore does not, for this call, give an output. Four-gate 231 (again because there is no output from two-gate 235) has no voltage on its negatory input—thus identifying that the call from multiplex A is for a subscriber on another multiplex.

Turning now to speech channel control sub-unit 192 in section control unit F/2 in multiplex F, two-gate 235 has received voltages from terminals m"2 and 792 of MC unit K/2. Four-gate 231 and six-gate 213 in unit F/2 cannot give an output because they are not receiving voltage from multivibrator 252 in unit F/2 (since no register channel pulse of the phase in use by the calling subscriber in multiplex A can be present in busy register channel store 198 in unit F/2 in multiplex F); but four-gate 214 in sub-unit 192 in unit F/2, is receiving an input from two-gate 235, and during the application of the next Q pulse to lead 221, four-gate 214 will emit such clock pulses (applied by lead 212/2) as are not prevented by any pulses already occurring in busy channel store in unit F/2—such latter pulses being applied to the negatory input of four-gate 214 by lead 223 which can be traced back as connected to the output of one-gate 301 in busy channel store 195.

The output from two-gate 235 is also applied by lead 234/2 to lead 239, and thus via one-gate 360 in free register channel store sub-unit 197 to the inhibitory input of one-gate 353, thus suppressing the free register channel pulse previously circulating in delay line 355. (This also occurred in the operation described in Section II.5, but was not there mentioned, to avoid complicating the long description of the series of operations.)

Accordingly, the said pulses emitted by four-gate 214 in unit F/2, are applied to terminal 202 and thence by lead 903(F)—see description of speech channel auxiliary K/15 and FIGURE 18—to one input of one-gate 899 from whose output they are applied to the input of two-gate 902 whose second input is supplied with clock pulses as shown in FIGURE 18. Two-gate 902 applies each pulse it emits to lead 910(A) which is connected to terminal 208 on speech channel control sub-unit 192 of section control unit A/2 of multiplex A. These pulses emitted from K/15 are accordingly applied to one input of four-gate 231 in section control unit A/2.

As already mentioned, four-gate 231 has voltage applied to a second input, from multivibrator 252: it is (as has also been mentioned) receiving no negatory input on lead 234: it receives a negatory input on lead 230 for every pulse already occurring in delay line 303 in busy channel store 195 of this section control unit A/2; but on the first occasion when it receives from K/15 a pulse not of the phase of any channel already in use in multiplex A, four-gate 231 re-emits that pulse—thus having found a speech channel which is free both in multiplex A and multiplex F.

III.6 *Selection of a speech channel.*—In thus describing the manner in which the system "recognises" that the call is between subscribers connected to different multiplexes by transmitting the pulses through circuits different from those used in the call described in Section II.6, the point has been reached at which four-gate 231 has been shown to be able to emit such pulses as are free in both the multiplexes concerned. In fact, the first of such pulses is "seized" by both the multiplexes concerned, in manner about to be described, and will constitute the first pulse of the common speech channel.

In the calling subscriber's multiplex (multiplex A), the first pulse emitted by four-gate 231 is applied by leads 232 and 272 to one-gate 271 and thus, via lead 275, firstly to one-gate 276 (causing the pulse to circulate in delay line 282), and secondly (from lead 275 via lead 270) to the re-setting input of multivibrator 252—thus causing the latter to cease to apply voltage to the input of four-gate 231 and preventing that four-gate from emitting further pulses.

Also, the first pulse emitted by four-gate 231 is applied to terminal 204 and thus to lead 904(A) and to one input of one-gate 900 in speech channel auxiliary K/15 (see FIGURE 18 again). The pulse is applied by one-gate 900 to one input of two-gate 901 (whose second input is receiving clock pulses from CPU/3) and applied by two-gate 901 to lead 909(F) which is connected to terminal 207 on speech channel control sub-unit 192 in section control unit F/2 which is in the multiplex of the called subscriber.

In the called subscriber's section control unit F/2 (FIGURE 4), two-gate 235 is still receiving voltage on both inputs (since these operations are taking place while the operating register and MC unit K/2 are still giving output voltages) and therefore still applying voltage to one input of two-gate 238. The pulse applied from terminal 207 to the second input of two-gate 238, which applies the pulse to lead 241 and one-gate 227, causes the latter to re-emit this pulse.

III.7 *Selection and function of an interconnecting unit.*—It was explained in the second paragraph of Section III.5, that MC unit K/2 applied voltage to two inputs of three-gate 872 (FIGURE 17) in cell I(1, 6). The calling subscriber's section control unit (viz. unit A/2 in multiplex A) now completes the setting-up of the interconnection by means of cell I(1,6).

A pulse of the speech channel just allotted as described in Section III.6, emitted by four-gate 231 in speech channel control sub-unit 192 (FIGURE 4) of the calling subscriber's multiplex A and thus applied to terminal 204, is transmitted by lead 808(A)—FIGURES 15 and 17—to lead 891 in (inter alia) cell I(1, 6) (FIGURE 17) and there applied to the third input of three-gate 872 (which, as already described, already has voltages on its other two inputs). No other cell connected to lead 808(A) will be receiving voltages from MC unit K/2 on two inputs of its three-gate 872 (for reasons already explained in the description of interconnecting unit K/18): therefore in cell I(1, 6) alone does three-gate 872 emit the speech channel pulse above referred to.

It will be seen from FIGURE 17, that the emission of the pulse from three-gate 872 causes pulses of the same phase to be repeated in delay line 877.

Had a subscriber on multiplex F been calling a subscriber on multiplex A (i.e. the converse direction to that of the present call) it can readily be seen that it would have been three-gate 869 which would (at this stage of the operation) have fed the speech channel pulse to delay line 877 in cell I(1, 6).

III.8 *Identification and speech connection of the called subscriber.*—In the last sentence of Section III.6, the stage had been reached at which one-gate 227 (FIGURE 4) of section control unit F/2 in the called subscriber's multiplex had emitted a pulse in the phase of the selected speech channel. That pulse is applied by two-gate 227 to terminal 201.

The first sentence of the second paragraph of Section II.8 described the effect of the emission of a pulse from terminal 201 in setting up the speech connection of a subscriber connected to the multiplex to which belongs the section control unit which has emitted a pulse from its terminal 201. Called subscriber 2504 in multiplex F has, therefore, now reached the same state as had called subscriber 0004 at the end of Section II.8.

III.9 *Identification and speech connection of the calling subscriber.*—In the second paragraph of Section III.6, a stage had been reached in which pulses of the speech channel had started to be repeated in delay line 282 in section control unit A/2 in the calling subscriber's multiplex A.

This is also the state of affairs described at the beginning of the first paragraph of Section II.9 (relating to the case where the call was between subscribers connected to the same multiplex). In the present case, therefore, though the subscribers are connected to different multiplexes, the operations which now take place in section control unit A/2 of calling subscriber 0001 are the same as those which were described in Section II.9.

In the penultimate paragraph of Section III.7, it was described how pulses of the phase of the common speech channel had been caused to be repeated in delay line 877 in interconnecting cell I(1, 6). As can be understood from the typical cells shown in FIGURE 17, in conjunction with FIGURE 23, speech channel pulses from calling subscriber 0001 on multiplex A are connected over output speech highway 883(A) to lead 885 of cell I(1, 6) and thus to one input of two-gate 880, to whose second input pulses of the same phase are applied by lead 879 from lead 881 and thus from delay line 877. Two-gate 880 accordingly emits these pulses on lead 889 which (in cell I(1, 6)) is connected to input speech highway 884(F), so that these speech pulses from subscriber 0001 are transmitted over speech highway 884(F) to Subscriber 2504 on multiplex F—being transmitted to him from highway 884(F) in manner already described. Speech channel pulses from subscriber 2504 to subscriber 0001 will be transmitted in precisely analogous manner, except that, as can readily be traced from the figures, they are transmitted via two-gate 882 in cell I(1, 6).

III.10 *Ringing and metering.*—The operations described in Section II.10 involved pulses belonging to channels of different phases which were being handled by the same multiplex. Since all circuits except those of the phase changers (which are not taking part in the present call)

deal with pulses of different phases quite independently, it makes no difference to the operations for ringing and metering whether the calling and called subscribers are using a single channel which is connecting two different multiplexes, or different channels which are occurring in the same multiplex. The operations for ringing and metering are thus the same as those described in Section II.10, except that the signals pass through interconnecting cell I(1, 6) instead of through a sub-unit of the phase changer.

III.11 *Clearing.*—On the completion of the call, the clearing operations are performed as described in Section II.10.

IV. *Performance for Unsuccessful Calls*

IV.1 *The called subscriber is busy.*—A call proceeds normally until the time arrives when, as in a successful call, the delay lines of the called subscriber are "marked" (in his channel pulse store, A/1 for example) by voltages (resulting from a register output) applied by converter K/3 to terminals such as 826, 827 and 828 (FIGURE 16). If the called subscriber is busy, the pre-existing pulses in his three delay lines will cause three-gate 822 to emit a pulse which will cause multivibrator 834 to apply voltage to its output and thus to the inhibitory input on one-gate 837 and one-gate 839. It also applies voltage to one input of two-gate 835.

Accordingly, when, during the period of the next Q pulse, the selected speech channel pulse is applied to terminal 865 (on unit A/1, for example) that pulse is not re-emitted by one-gate 837, but is emitted by two-gate 835 and thence passes to terminal 868 which is connected to lead 985 of "Busy 2" in FIGURE 21. Delay line 982 accordingly repeats this pulse at 100 micro-second intervals, and applies the pulses to two-gate 989, where they are modulated with busy tone applied to lead 991 and applied by lead 992 to one-gate 993 and emitted therefrom (in the same way as ringing tone would have been emitted in the case of a successful call) and supplied to the calling subscriber. As with a successful call, pulses have also been applied to delay line 994 in "NU 2," but are cleared by the pulses from "Busy 2" applied (over lead 988/1) to one-gate 990 and thus to the inhibitory input of one-gate 995.

IV.2 *The called subscriber's line (on an installed multiplex) is unserviceable or disconnected.*—In this case, no pulse is fed to "Ringing" sub-unit in the tone unit (FIGURE 21). Accordingly, as will be understood from the description in Section II.10, no pulse from delay line 1006 is available to clear the pulse in delay line 994 in "NU 2," and the calling subscriber is accordingly supplied with number-unobtainable tone.

IV.3 *There is no available speech channel.*—When no speech channel is available, neither four-gate 231 nor six-gate 213 (FIGURE 4) can emit a "common free pulse." Accordingly, there is no input to one-gate 271 in speech channel temporary store 194, and multivibrator 252 continues to apply voltage to one input of three-gate 261. Therefore, when the next X pulse occurs and is applied to the second input of three-gate 261, the register channel pulse which is being repeated in delay line 256 is applied over lead 269 to the third input of three-gate 261 and is applied (via leads 262 and 273) to one-gate 271 and thus to delay line 282 in speech channel temporary store 194 (incidentally re-setting multivibrator 252). The pulse from the said three-gate is also applied to terminal 242.

So far as the calling subscriber is concerned, the emission from terminal 280 of the pulse now being repeated in delay line 282, causes a pulse of this phase to be repeated in his delay lines in the channel pulse store in his multiplex (A/1, for example), exactly as described in Section II.9, save for the present abnormality of the phase of the pulse, and the register and converter are cleared.

Terminal 242 is connected to lead 964 in "Busy 1" in the tone unit (FIGURE 21), and the pulse applied to terminal 242 is therefore applied via one-gate 963 to delay line 956 and thus to two-gate 960 whence, modulated with busy tone from lead 961, it passes to one-gate 967 and thus to the input highway of the multiplex and so to the calling subscriber.

IV.4 *The number dialled is on an uninstalled multiplex.*—It was explained in the description of MC unit K/2, that if a subscriber dials the number of a subscriber who would (ultimately) be connected to a multiplex which has in fact not yet been installed, this results in the application of voltage to terminal $m''5$ (FIGURE 14) and that this terminal is connected to the tone unit. The said terminal $m''5$ is connected to the tone unit by lead 965 (FIGURE 21) which is connected to two-gate 966 in "Busy 1" and to the inhibitory input of one-gate 963. Two-gate 966 is also receiving an input from lead 964 (as in Section IV.3, preceding, since there can be no "common free pulse" with a non-existent multiplex); and two-gate 966 therefore gives an output which is applied by lead 973 to one-gate 973 in "NU 1" and causes pulses to be repeated in delay line 971. Pulses from delay line 971 are applied to one input of two-gate 976 where they are modulated with number-unobtainable tone from lead 977 and passed via one-gate 967 to lead 979 and to the input highway of the calling subscriber as in Section IV.3.

IV.5 *No phase changer sub-unit is available.*—If no sub-unit is available, there will be no output voltage on lead 1054 (FIGURE 22), as will be understood from the description of the mode of operation of the sub-units in Section II.7. This lead is, as there stated, connected to terminal 970 on "Busy 1" in the tone unit (FIGURE 21). Lead 969 on "Busy 1," is connected to lead 1039 and thus not only to the phase changer but (as stated in the description of the latter) to terminal 206 on speech channel control unit 192 in the section control unit concerned. Accordingly, two-gate 968 now has no voltage applied to its negatory input but a pulse of the speech channel allotted for the call is applied to lead 969 and is repeated in delay line 956.

The calling subscriber receives busy tone exactly as when there is no available speech channel.

IV.6 *Effect of forced release of register.*—It has been explained in the description of register control unit K/7 that in the event of a forced release of a register, pulses appear on lead 492, which are thus applied to terminal 493 (which is the uppermost terminal on the right-hand side of unit K/7 in FIGURE 5).

Terminal 493 is connected to terminal 381 on the left of busy register channel store sub-unit 198 of every section control unit—A/2, for example, see FIGURE 4. In the section control unit of the calling subscriber's multiplex, these pulses are of the same phase as the pulses which are being repeated in delay line 399. Two-gate 395 accordingly applies corresponding pulses to terminal 382 which is connected to lead 974 in "NU 1" on the tone unit of the multiplex concerned (FIGURE 21).

The calling subscriber accordingly receives number-unobtainable tone in the way described in Section IV.4.

In the section control unit (FIGURE 4), the pulses applied to terminal 381 are also applied thence to one-gate 402 and thus to the inhibitory input of one-gate 394, suppressing the register channel pulse circulating in delay line 399 and interrupting the supply of pulses to one input each of two-gates 384 and 387. These two-gates accordingly cease to apply pulses, respectively, to terminals 379 and 378, and pulses are no longer supplied to (respectively) the input speech highway (FIGURE 23) and the register highway 432 (FIGURE 6).

The calling subscriber is thus effectively isolated from the register section of the exchange and it merely remains for him to replace his instrument.

The various constituent parts of the exchange illustrated in FIGURES 24 to 36 (i.e. the second form of exchange, which (as stated earlier) has 2,500 installed subscribers and a phase difference of 50 channels between that used by the calling and that used by the called subscriber) will now be described, with their mode of operation.

Pulse Generator

The pulse generator, the wave S, and the pulses emitted by it, are identical with those used in the form of exchange previously described. FIGURES 2 and 3, and the related description already given, are accordingly applicable to this second form of exchange and need not here be repeated. This pulse generator is again given the reference K/1 where it appears as a whole in the drawings.

Section Control Unit

Figure 24:
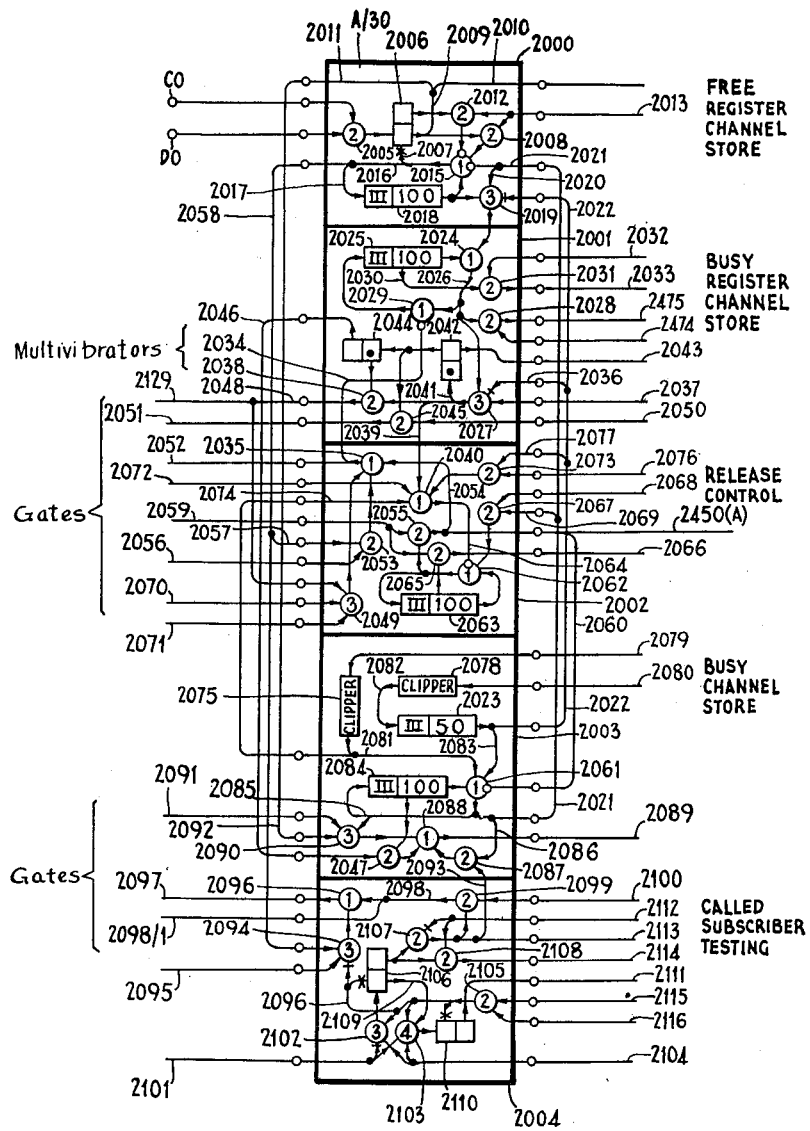

The section control unit in every multiplex is the same as for every other multiplex. Its construction is, however, simplified as compared with the section control unit previously described, since the fact that channels (a) and (b) have a constant phase difference of 50 channels, irrespective of whether the calling and called subscribers are connected to the same or a different multiplex, enables more of the apparatus to be incorporated in the equipment common to all subscribers. The typical section control unit, here referenced as A/30 (as though it belonged to multiplex A of the exchange) is shown in FIGURE 24. It is, as shown, partitioned into the following sub-units:

Free register channel store, 2000
Busy register channel store, 2001
Release control sub-unit, 2002
Busy channel store, 2003
Called subscriber testing sub-unit, 2004

Free register channel store 2000

Each section control unit is "tested" in turn by the simultaneous application of a C and a D pulse, as for the first form of exchange. A C0 and a D0 pulse are allocated to the testing of section control unit A/30, and, of course, a different combination of a C and a D pulse for each other control unit. Accordingly, near the top left-hand corner of store 2000, there is shown in FIGURE 24 a pair of terminals, marked C0 and D0 respectively, which are respectively connected (by leads not shown) to terminals C0 and D0 on pulse generator K/1. These terminals on store 2000 are respectively connected to the two inputs of two-gate 2005 whose output is connected to multivibrator 2006. Multivibrator 2006 is also connected to lead 2007 on which appear ½ micro-second pulses of any free register channel allotted to the section control unit, and said multivibrator is operated (as shown by the "x" on lead 2007) by the lagging edge of such pulses. On receiving an input from two-gate 2005, multivibrator 2006 will apply an output voltage to one input of two-gate 2008 and also on lead 2009 to leads 2010 and 2011. Lead 2010 is connected to channel allotter K/30 described below, thereby demanding the allocation of a free register channel pulse.

Figure 26:
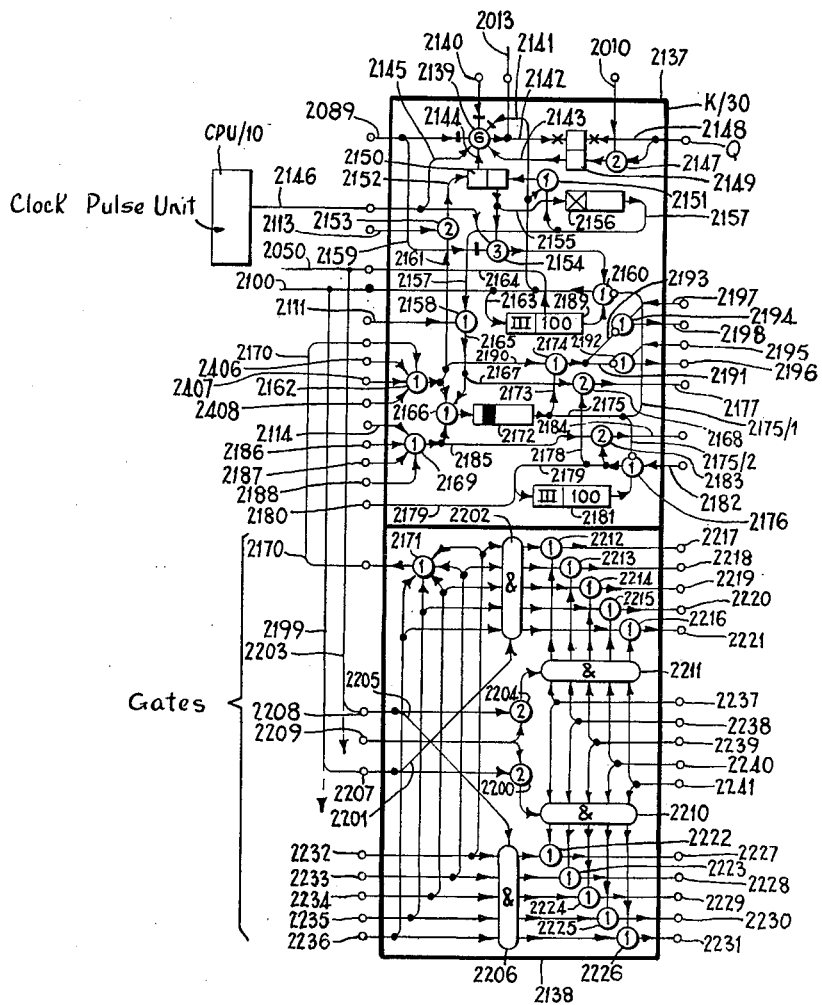

When multivibrator 2006 is receiving pulses of lead 2007, it gives, for each pulse, a corresponding pulse output to two-gate 2012 whose other input is connected to lead 2013 which is connected to a negatory input of six-gate 2014 to be found near the top left-hand corner of channel allotter K/30 in FIGURE 26: two-gate 2012 accordingly gives an output at each repetition of a free register channel pulse in store 2000 and prevents six-gate 2014 from supplying it with a further free register channel pulse. The output of two-gate 2012 is connected to an inhibitory input of one-gate 2015; so that if two-gate 2012 receives a pulse from multivibrator 2006 in phase with a free register channel pulse circulating in store 2000 (and therefore passing through one-gate 2015, as described below), and at the same time receives a pulse on lead 2013 (this latter then indicating the emission of a pulse of that phase by six-gate 2014 in response to a demand from some other section control unit), two-gate 2012 will give an output voltage and section control unit A/30 will lose the free register channel pulse previously stored in it, which will be acquired by the section control unit thus demanding it.

Two-gate 2008 has, as stated, one input connected to receive voltage from multivibrator 2006 when two-gate 2005 applies voltage to that multivibrator. Accordingly, on receipt of the appropriate pair of C and D pulses (viz. C0 and D0 for unit A/30), two-gate 2008 will, on receiving a free register channel pulse on lead 2013, give an output to one-gate 2015 (if store 2000 is not already repeating a free register channel pulse), which will then transmit a pulse to lead 2016, and thence via lead 2017 to the input of magnetostrictive delay line 2018 (which has a delay time of 100 micro-seconds). The output from delay line 2018 is connected to one input of one-gate 2015 (forming a system capable of repeating ½ microsecond pulses, at intervals of 100 micro-seconds, of the kind frequently already described), and also to one input of three-gate 2019. One input of three-gate 2019 is connected by lead 2020 to lead 2021, which latter lead is also connected to an inhibitory input on one-gate 2015 as shown. The input end of lead 2021 is connected as shown to busy channel store 2003. Three-gate 2019 has also a negatory input connected to lead 2022 and thus to the output of delay line 2023 in busy channel store 2003 (said delay line being a magnetostrictive delay line having a delay period of 50 micro-seconds).

Busy register channel store 2001 is provided with a one-gate 2024 having one of its inputs connected as shown to the output of three-gate 2019 and its other input connected to the output of magnetostrictive delay line 2025 (having a delay period of 100 micro-seconds). The output of one-gate 2024 is connected by lead 2026 to the input of three-gate 2027, and by the branch lead shown to one input of two-gate 2028, and by branch lead 2029 to the input of delay line 2025 (forming therewith a repeating system of the kind frequently described previously). Delay line 2025 is tapped by lead 2030 to provide connection with one input of two-gate 2031 whose other input is connected by lead 2032 to the main cable along which "tone" (i.e. modulations indicating dialling, number unobtainable, and called number busy, as the case may be) is conveyed to each multiplex. The output of two-gate 2031 is connected by lead 2033 to the main cable over which pass the channels conveying speech to subscribers connected to the multiplex of which the section control unit belongs. The above mentioned one-gate 2024 is also provided with an inhibitory input connected by lead 2034 to the output of one-gate 2035 in release control sub-unit 2002, so that the emission of a pulse of appropriate phase by the said sub-unit can suppress, in store 2001, the pulses of the channel which is being released.

Three-gate 2027 is provided with a negatory input on lead 2036 which is connected to lead 2022, and with a third input from lead 2037 which is connected to channel allotter K/30 and carries pulses of the phase of the register channel being used by each calling subscriber at any time. The output of three-gate 2027 is connected to two-gate 2038 in store 2001, and by lead 2039 to one-gate 2040 in release control sub-unit 2002, and by lead 2041 to multivibrator 2042 which (as indicated by the "dot" on the section to which the input lead is connected) will, on receiving a ½ micro-second voltage pulse from its input, give an output from its other section for a period of 120 micro-seconds, whereafter it reverts to the condition it had before receiving the said pulse provided it has not in the meantime received a further pulse on lead 2041: if it has received any such a further pulse before reverting, it will wait until 120 micro-seconds have elapsed from receipt of the last such pulse before reverting. (This conventional use of a "dot" to indicate reversion, where a multivibrator is of the reversive type, is employed throughout the figures relating to the form of exchange now being described.)

On receiving a pulse on lead 2041, multivibrator 2042 applies voltage to lead 2043 which is connected to channel allotter K/30 and there records (by applying voltage to the appropriate input of a gate) the multiplex to which belongs a calling subscriber making a call at that time. On receiving a pulse on lead 2041, multivibrator 2042 also applies voltage to multivibrator 2044 and to one input of two-gate 2045.

Multivibrator 2044 is also of the reversive type. After receiving an input from multivibrator 2042, multivibrator 2044 gives an output on lead 2046 to two-gate 2047 in busy channel store 2003. Multivibrator 2044 has a reversion time of 1 milli-second from the beginning of the receipt of an input voltage from multivibrator 2042. On reversion, multivibrator 2044 applies voltage to the second input of two-gate 2038, whose output is connected by lead 2048 to one input of three-gate 2049 in release control sub-unit 2002.

The second input to two-gate 2045 is connected by lead 2050 to channel allotter K/30, and the output of two-gate 2045 is connected by lead 2051 to the channel pulse store belonging to the multiplex to which the section control unit belongs (i.e. multiplex A in the present example).

In release control sub-unit 2002, there is one-gate 2035 which has been mentioned above as connected to the inhibitory input of one-gate 2024. The output of one-gate 2035 is also connected by lead 2052 to supply clearing pulses to the inhibitory inputs of the one-gates (referred to later) in the channel pulse store of the multiplex to which the section control unit belongs (the one-gates last mentioned being those connected to the delay lines in the channel pulse store and described later). A first input to one-gate 2035 is connected to the output of three-gate 2049, and a second input to one-gate 2035 is connected to the output of two-gate 2053, while a third input to one-gate 2035 is connected by lead 2054 to the output of two-gate 2055.

One input of two-gate 2053 is connected by lead 2056 to terminal P of pulse generator K/1; and the second input of two-gate 2053 is connected by leads 2057 and 2058 to lead 2016 in store 2000. One input of two-gate 2055 is, as shown, connected to lead 2059 which is connected to terminal X on pulse generator K/1; and the output of two-gate 2055, in addition to being connected to one-gate 2035, is connected by lead 2060 to an inhibitory input on one-gate 2061 in busy channel store 2003. The second input of two-gate 2055 is connected, as shown, to the output of one-gate 2062, which, in conjunction with magnetostrictive delay line 2063 (which has a delay period of 100 micro-seconds), forms a pulse-repeating system of the kind already described.

The output of delay line 2063 feeds the input of one-gate 2062, and the output of one-gate 2062 feeds the input of said delay line. One-gate 2062 is also provided with an inhibitory input connected by lead 2064 with one output of one-gate 2040 already mentioned. In addition, delay line 2063 is tapped, as shown, and connected to one input of two-gate 2065, whose second input is connected to lead 2059 and thus to terminal X on pulse generator K/1. The output of two-gate 2065 is connected to lead 2066 which is connected to all interconnecting units (described below) which are connected to the multiplex to which the section control unit belongs.

A further input to one-gate 2062 is supplied from the output of two-gate 2067, one of whose inputs is connected by lead 2068 to terminal Z on pulse generator K/1, and the other of whose inputs is connected to lead 2069 and thus to lead 2021.

One input (by lead 2048) to three-gate 2049 has already been mentioned. A second input is provided by lead 2070 which is connected to the channel pulse store of the multiplex to which the section control unit belongs. The third input to three-gate 2049 is provided by lead 2071 which is connected to terminal Q on pulse generator K/1.

Reverting now to one-gate 2040, of which one input on lead 2039 has already been mentioned, it will be seen that the said one-gate has a second input connected by lead 2072 which is connected to terminal Y on pulse generator K/1, a third input connected to the output of two-gate 2073, and a fourth input connected by lead 2074 to the output of a clipper 2075 in busy channel store 2003. Two-gate 2073 has one input connected to lead 2076 which is connected to a ringing and metering unit for its own multiplex, while its second input is connected to lead 2022 by lead 2077.

In busy channel store 2003 clipper 2075 has already been mentioned. This store contains a second clipper 2078. The input of clipper 2075 is supplied by lead 2079 which is connected to the incoming speech highway of the multiplex to which the section control unit belongs: the input of clipper 2078 is supplied by lead 2080 which is connected to the outgoing speech highway of the multiplex to which the section control unit belongs. These clippers perform the same function (viz. of removing modulation from the pulses they receive) as do clippers 294 and 297 shown in, and described in connection with, FIGURE 4.

In addition to applying voltage pulses to lead 2074, clipper 2075 applies those pulses to lead 2081 and thus to one input of one-gate 2061. Clipper 2078 is connected by lead 2082 to the input of delay line 2023 already mentioned (which has a delay period of 50 micro-seconds) whose voltage output, in addition to being applied to lead 2022, is applied therefrom by lead 2083 to a second input of one-gate 2061. A third input to one-gate 2061 is applied by the voltage pulses output from magnetostrictive delay line 2084, whose input is connected by lead 2085 with the output of one-gate 2061: delay line 2084 has a delay period of 100 micro-seconds, forming with one-gate 2061 a pulse-repeating system of the kind several times already described, and is tapped and connected with the second input of two-gate 2047 already mentioned. Lead 2085 is also connected, as shown, with lead 2021, and a branch lead 2086 connects leads 2021 and 2085 to one input of two-gate 2087. The output of two-gate 2047 and the output of two-gate 2087 are each connected to respective inputs of one-gate 2088, whose output is connected by lead 2089 to channel allotter K/30, so as to apply to the latter all pulses belonging to all channels in use in the section control unit. (Every section control unit is, of course, similarly connected to channel allotter K/30, so that the latter is "notified" of all pulses in use from time to time in all multiplexes.)

A further input of one-gate 2088 is connected as shown to the output of three-gate 2090 whose other inputs are respectively connected to lead 2091 which is connected to terminal Q on pulse generator K/1, and to lead 2092 which is connected to lead 2011 in free register channel store 2000.

The second input to two-gate 2087 is connected to lead 2093 and thence to unit 2004 which is about to be described.

Called subscriber testing sub-unit 2004 is provided with three-gate 2094 one of whose inputs is connected to lead 2058 from free register channel store 2000. A second input to three-gate 2094 is connected to lead 2095 which is connected to terminal Q on pulse generator K/1. The third input to three-gate 2094 is connected to lead 2096, this being a negatory input. The output of three-gate 2094 is connected to one input of one-gate 2096, whose output is connected to lead 2097 and thus to the channel pulse store of the multiplex to which the section control unit belongs. The input of one-gate 2096 is connected by lead 2098 to the output of two-gate 2099, one of whose inputs is connected by lead 2100 to channel allotter K/30, by which lead are conveyed the speech channel pulses from time to time allotted to the multiplex to which the section control unit belongs. To lead 2098 there is also connected branch lead 2098/1 which is connected to the ringing and metering unit of the multiplex to which the section control unit belongs.

At the bottom left-hand corner of sub-unit 2004 will be found lead 2101, which receives pulses from the channel pulse store (of its own multiplex) in phase with every pulse in use by any subscriber connected to that multiplex (thus indicating whether any subscriber is "busy"). Lead 2101 is connected, as shown, to a negatory input on three-gate 2102 and to one input of four-gate 2103. A second input of three-gate 2102, and a second input of four-gate 2103, are each connected to lead 2104 which is connected to terminal Q on pulse generator K/1. The third input to three-gate 2102 is connected, as shown, to lead 2096 and by that lead to the output of two-gate 2105. The output of three-gate 2102 is connected to one input of multivibrator 2106 which has also a re-setting input connected to lead 2096, being reset by the lagging edge (indicated by the "$x$") of a pulse on lead 2096.

The effect of these connections to multivibrator 2106 is that multivibrator 2106 gives, on receiving a pulse from three-gate 2102, a voltage output from its upper stage (as viewed in FIGURE 24) which is applied, as shown, to one input of two-gate 2107 and to one input of two-gate 2108. When, however, a pulse is applied from lead 2096 to multivibrator 2106, multivibrator 2106 ceases to give an output to the said two-gates and applies voltage via lead 2109 to the fourth input of four-gate 2103.

The output of four-gate 2103 is applied as shown to the input of multivibrator 2110, which is provided with a re-setting input, as shown, from two-gate 2105, resetting taking place at the lagging edge of the input voltage (as indicated by the "$x$"). An input from four-gate 2103 causes multivibrator 2110 to apply voltage to lead 2111 which is connected to channel allotter K/30 and (when voltage is present) indicates that a called subscriber is busy, multivibrator 2110 being re-set by the lagging edge of the pulse which caused four-gate 2103 to give an output.

The second input to two-gate 2107 is a negatory input connected to lead 2112 which is connected to a unit which indicates when a dialled number is unobtainable because belonging to a multiplex not yet installed. Lead 2112 is also connected as shown to the second input of two-gate 2108. The output of two-gate 2107 is connected to lead 2113 which is connected to channel allotter K/30 to indicate when a called subscriber is free; and lead 2113, in addition to being connected to lead 2093 already mentioned, is connected to the second input of two-gate 2099. The output of two-gate 2108 is connected to lead 2114, which is connected to channel allotter K/30 to indicate an "unobtainable" subscriber on the installed multiplex to which the section control unit belongs.

Input leads 2115 and 2116 to two-gate 2105 receive from MC unit K/34 (described below) pulses which identify the multiplex to which a called subscriber belongs.

*Channel Pulse Store in Subscribers' Multiplex*

Figure 25:
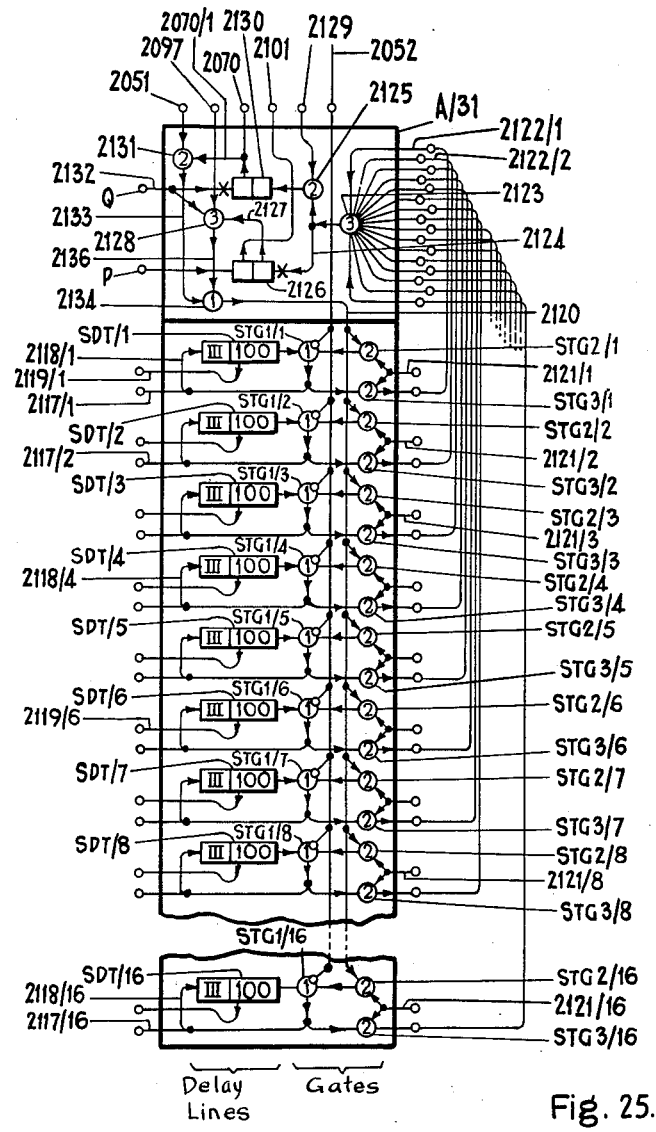

FIGURE 25 shows the channel pulse store A/31 for each multiplex. Like the corresponding unit A/1 in the FIGURE 16, it contains 16 magnetostrictive delay lines (each having a delay period of 100 micro-seconds) of which the first 8 and the last one are shown in the figure (the remainder of the figure being broken away)—each delay line, however, in this figure is tapped. Every other channel pulse store in every other multiplex is identical. As in the exchange described earlier, each subscribers line unit is connected to a trio of three delay lines in this channel pulse store, the trio associated with each subscriber being chosen in the same way as in the exchange described earlier.

The delay lines are consecutively referenced SDT/1, SDT/2, and so on as indicated in the figure, up to SDT/16. Since all delay lines in A/31 are similarly arranged, it is only necessary to describe one of them with its associated gates, in detail. The scheme adopted for the sequential referencing of delay lines, leads, and gates, will be clear from the figure. References to circuit elements of more than one delay line are occasionally here repeated for emphasis.

The ouput of delay line SDT/1 is connected to one input of one-gate STG1/1, the output of delay line SDT/2 to one input of one-gate STG1/2, and so on. A second input to one-gate STG1/1 is connected to the output of two-gate STG2/1, a second input of one-gate STG1/2 being connected to the output of two-gate STG2/2, and so on; and each of one-gates STG1/1 to STG1/16 has an inhibitory input connected as shown to lead 2052 (which is referenced at the top of the figure).

One-gate STG1/1 has its output connected to lead 2117/1, one end of which lead is connected to one input of two-gate STG3/1, and which lead is also connected by lead 2118/1 to the input of delay line SDT/1. Delay line SDT/1 is tapped by lead 2119/1. (It will be remembered that the statement that a delay line is tapped implies, when not qualified, that the tap is connected to a point at which the delay is one-half of the delay for the complete line, so that the delay from input to tap is 50 microseconds for delay lines SDT/1 to SDT/16.)

One input of each of two-gates STG2/1 is connected to lead 2120. The second input of two-gate STG2/1 is connected to lead 2121/1; the second input of two-gate STG2/1 is connected to lead 2121/2, and so on.

The output of two-gate STG3/1 is connected by lead 2122/1 to three-gate 2123; the output of two-gate STG3/2 is connected by lead 2122/2 to three-gate 2123. Accordingly, like three-gate 822 in the top section of unit A/1 in FIGURE 16, three-gate 2123 only gives an output when it receives synchronous pulses from a trio of delay lines, and the construction of three-gate 2123 is similar to that of three-gate 822.

It will be seen that, in the upper section of subscribers channel pulse store A/31, the output of three-gate 2123 is connected by lead 2124 to one input of two-gate 2125 and to one input of multivibrator 2126—it being the lagging edge of the pulse on lead 2124 that operates the said multivibrator. When operated by the lagging edge of such a pulse, multivibrator 2126 applies voltage to lead 2101 on section control unit A/30 (FIGURE 24). Multivibrator 2126 is re-set, after such a pulse, on receiving a pulse from terminal P which is connected to terminal P on pulse generator K/1. When in the state to which it is so re-set, multivibrator 2126 applies voltage by lead 2127 to one input of three-gate 2128.

The second input of two-gate 2125 is connected to lead 2129 which is connected to lead 2048 (FIGURE 24) and thus to the output of two-gate 2038 in busy register channel store in section control unit A/30. The output of two-gate 2125 is connected to one input of multivibrator 2130. After receiving a pulse from two-gate 2125, multivibrator 2130 applies voltage to lead 2070 and thus (FIGURE 24) to one input of three-gate 2049 in release control sub-unit in section control unit A/30. Voltage on lead 2070 is also applied by branch lead 2070/1 to one input of two-gate 2131. Multivibrator 2130 is re-set, after receiving a pulse from two-gate 2125, by a pulse on lead 2132 which is connected to terminal Q, which latter terminal is connected to terminal Q on pulse generator K/1. When in the state to which it is re-set (by the lagging edge of a Q pulse) multivibrator 2130 gives no voltage output on any lead.

The second input to two-gate 2131 is connected by lead 2051 to the output of two-gate 2045 in busy register channel store sub-unit in section control unit A/30 (FIGURE 24). The output of two-gate 2131 is connected by lead 2133 to one input of one-gate 2134, whose output is connected to lead 2120 mentioned earlier in this section.

Lead 2132 from terminal Q is connected by lead 2135 to a second input of three-gate 2128; and the third input of three-gate 2128 is connected to lead 2097 and thus to the output of one-gate 2096 in "called subscriber testing" sub-unit of section control unit A/30 (FIGURE 24). The output of three-gate 2128 is connected by lead 2136 to the second input of one-gate 2134.

*Channel Allotter*

It has already been stated that, in the exchange now being described there are 5 installed multiplexes having 500 subscribers each (making 2,500 subscribers in all), the exchange being intended to be extensible to a total of 20 multiplexes to accommodate a total of 10,000 subscribers. It is now convenient to turn to the description of certain of the common equipment of the exchange, and it will be seen in FIGURE 26 of the accompanying drawings, which shows channel allotter K/30, that this unit is shown as consisting of two sub-units, viz. the control sub-unit 2137 at the top and interconnecting sub-unit 2138 at the bottom. (These sub-units will generally themselves be hereinafter referred to as "units," for brevity, where no confusion will arise from the omission of the prefix "sub.")

One interconnecting unit 2138 is capable of dealing with five multiplexes of 500 subscribers each. When a further multiplex capable (when all subscribers are connected to it) of accommodating 500 subscribers is installed at the exchange, a further interconnecting unit 2138 is added, below the unit 2138 shown in the figure, and connected up as described later. Such further unit 2138 will serve up to 2,500 more subscribers—and so on, further units 2138 being added up to the total of four units 2138 needed to serve 10,000 subscribers.

As shown in FIGURE 26, control unit 2137 is provided (near the top left-hand corner) with six-gate 2139, one of whose inputs is a negatory input connected to lead 2089 which is connected to the output of one-gate 2088 in the busy channel store of every multiplex when installed. Six-gate 2139 has (going clock-wise) a second, negatory, input connected to lead 2140 along which pass busy register channel pulses from register control unit K/31 to be described later. Six-gate 2139 has a third, negatory, input connected to lead 2141 and has its output connected to lead 2013 which is connected to two-gates 2008 and 2012 in the section control unit (such as A/30 in FIGURE 24) of every multiplex when installed. The output of six-gate 2139 is also connected to lead 2142. Continuing clockwise, a fourth input to six-gate 2139 is connected to lead 2143, its fifth input to lead 2144, and its sixth input to lead 2145. Lead 2145 is connected to lead 2146 and thence to a local clock pulse generator unit CPU/10 (which is of course connected to terminal S on pulse generator K/1, like the clock pulse units referred to earlier, though here the connecting lead is not shown). Lead 2010 is shown at the top right-hand corner of the figure, this lead being connected to the free register channel store in section control unit A/30 as shown in FIGURE 24 and in the section control unit of every multiplex which is installed.

Lead 2010 is shown in FIGURE 26 connected to one input of two-gate 2147, whose other input is shown connected to lead 2148 and thus to terminal Q which is connected to terminal Q on pulse generator K/1. The output of two-gate 2147 is connected to one input of multivibrator 2149, which, on receiving a pulse from two-gate 2147 applies voltage to lead 2143. Multivibrator 2149 can be re-set (to cease to apply voltage to lead 2143) either by the lagging edge of a Q pulse on lead 2148, or by the lagging edge of a pulse on lead 2142.

Voltage is applied to lead 2144 by multivibrator 2150 after said multivibrator has received an input from one-gate 2151. Multivibrator 2150 ceases to apply voltage to lead 2144 after receiving a pulse on lead 2152 from two-gate 2153 and then applies voltage (as shown) to one input of three-gate 2154 and by lead 2155 to the input of slow-to-operate device 2156 described later in this specification. The output voltage given by the latter is applied to lead 2157, and thus to one input of one-gate 2151 which has a second input connected as shown to lead 2141. The remote end of lead 2157 is connected to one input of one-gate 2158.

The second input of three-gate 2154 is connected to lead 2146 from clock pulse unit CPU/10; and the third input of three-gate 2154, which is a negatory input, is connected by lead 2159 to lead 2089. The output of three-gate 2154 is connected as shown to one input of one-gate 2160, whose output is connected to lead 2100 of called subscriber testing sub-unit of unit A/30 and in every other section control unit for every multiplex which is installed. Lead 2100 is connected as shown to lead 2141.

Two-gate 2153 has one input connected to lead 2113 and thus to the output of two-gate 2107 in called subscriber testing sub-unit of unit A/30 and of every other section control unit which is installed. The other input of two-gate 2153 is connected by lead 2161 to the output of one-gate 2162.

A second input to one-gate 2160 is connected to the output of tapped delay line 2189, which has a delay period of 100 micro-seconds, the input of said delay line being connected by lead 2163 to lead 2100. The tap on delay line 2189 is connected by lead 2164 to lead 2050 and thus to two-gate 2045 in busy register channel store in unit A/30 and in every other section control unit for every multiplex which is installed.

One-gate 2158, which (as already stated) has one of its inputs connected to lead 2157, has its second input connected by lead 2111 from multivibrator 2110 in called subscriber testing sub-unit of unit A/30 and in every other section control unit for every multiplex which is installed. The output of one-gate 2158 is connected by lead 2165 to one input of one-gate 2166 and (from lead 2165) by lead 2167 to one input of two-gate 2168. One input of one-gate 2166 is connected as shown to the output of one-gate 2162, and the other input of one-gate 2166 is connected as shown to the output of one-gate 2169.

One-gate 2162 illustrates one advantageous feature of this form of the channel allotter shown in this FIGURE 26. It is shown as a one-gate having four inputs—intended for connection one to each of the four interconnecting sub-units 2138 which are needed to accommodate the full 10,000 subscribers the exchange is designed to serve. Since, however, only 2,500 subscribers and only one interconnecting sub-unit 2138 is supposed at present installed, only one input of one-gate 2162 is shown connected to a lead beyond its immediate terminal, viz. the input connected to lead 2170 and thus to the output of one-gate 2171 at the top left-hand corner of the installed unit 2138. The remaining inputs to one-gate 2162 would be respectively connected one to each of the corresponding one-gates 2171 in each of the remaining units 2138 when each such unit 2138 came to be installed.

The output of one-gate 2166 is shown connected to the input of trailing edge pulse former 2172 which gives an output voltage (lasting about 1 milli-second) at the lagging edge of a pulse applied to its input, the said output voltage being applied by lead 2173 to one input of one-gate 2174 and by lead 2175 (and branch leads 2175/1 and 2175/2, respectively) to an inhibitory input of one-gate 2160 and an inhibitory input of one-gate 2176.

The output of two-gate 2168 is connected to lead 2177 which is connected to register control unit K/31. The second input of two-gate 2168 is connected to lead 2178 which is connected to lead 2179 from the output of one-gate 2176. Lead 2179 is connected at its terminal 2180 to lead 2037 to the input of three-gate 2027 in busy register channel store in unit A/30 and in every other section control unit for every multiplex which is installed.

Lead 2179 is also connected as shown to the input of magnetostrictive delay line 2181 (having a delay period of 100 micro-seconds) whose output is connected to one input of one-gate 2176. The other input of one-gate 2176 is connected to lead 2182 which is connected to every register (such as K/32) in the exchange.

Lead 2179 is also connected, as shown, to one input of two-gate 2183, whose output is connected by lead 2184 to register control unit K/31. The second input of two-gate 2183 is connected to lead 2185 from the output of one-gate 2169.

One-gate 2169 has four inputs, the uppermost being connected to lead 2114 and thus to the output of two-gate 2108 in called subscriber testing sub-unit in unit A/30 and in every other section control unit for every multiplex which is installed. The other three inputs of one-gate 2169 are respectively connected to leads 2186, 2187, 2188 and thence to MC unit K/34 described later.

Reverting to one-gate 2174, it will be seen that its second input is connected by lead 2190 to lead 2181 and thus to the output of one-gate 2162. The output of one-gate 2174 is connected by lead 2191 to an inhibitory input on one-gate 2192 and from lead 2191 by lead 2193 to an inhibitory input on one-gate 2194. The input of one-gate 2192 is connected to lead 2195 and the output of one-gate 2192 is connected to lead 2196. The input of one-gate 2194 is connected to lead 2197 and the output of one-gate 2194 is connected to lead 2198 which (for so long as only the first five multiplexes have been installed) is connected to every register of the exchange. (The method of connection will be fully explained later.)

Turning now to interconnecting unit 2138, the arrangement is so symmetrical that, in view of the many examples of somewhat similar arrangements of cross-connected one-gates and of composite gates that have already been described in detail, it seems more perspicuous to leave this part of the figure as free as possible from reference numbers and leading lines, and to reference only the terminals, gates, and a minimum of leads.

Lead 2170 from the output of one-gate 2171 has already been mentioned, this gate having, as will be seen, five inputs. Lead 2199 connects lead 2100 to one input of two-gate 2200; and there is a cross-connection by lead 2201 to the permissory input of composite gate 2202 near the top of unit 2138. Similarly, lead 2203 connects lead 2050 to one input of two-gate 2204; and there is a cross-connection by lead 2205 to the permissory input of composite gate 2206 near the bottom of unit 2138. Leads 2199 and 2203 are, when further units 2138 are installed, extended downwards as indicated by the arrows and connected to the respective terminals, on each additional unit 2138, corresponding to the points respectively indicated by the circles 2207 and 2208.

Lead 2209 is connected to MC unit K/34 and is connected to the second input to each of two-gates 2200 and 2204. The output of two-gate 2200 is connected to the permissory input of composite gate 2210, and the output of two-gate 2204 is connected to the permissory input of composite gate 2211.

The respective outputs of composite gates 2202 and 2211 are respectively connected as shown to two inputs on each of one-gates 2212, 2213, 2214, 2215, 2216; and the outputs of the said one-gates are respectively connected as shown to terminals 2217, 2218, 2219, 2220, 2221. The respective outputs of composite gates 2206 and 2210 are respectively connected as shown to two inputs on each of one-gates 2222, 2223, 2224, 2225, 2226; and the outputs of these said one-gates are respectively connected as shown to terminals 2227, 2228, 2229, 2230, 2231.

Terminals 2232, 2233, 2234, 2235, 2236 (at the bottom left-hand side of FIGURE 26) are, as shown, respectively connected to the first, second, third, fourth and fifth inputs of composite gate 2202, to the first, second, third, fourth and fifth inputs of composite gate 2206, and to the first, second, third, fourth and fifth inputs of one-gate 2171. (It will be remembered that with composite gates as here shown, if there is a voltage input applied to the permissory input of the gate, then the application of a voltage input to its first input will result in the appearance of a voltage output on its first output, application of a voltage input to the second input of the gate will result in the appearance of a voltage output on the second output of the gate, and so on. Thus, for example, with composite gates 2202 and 2206, if there is voltage on lead 2201 to the permissory input of gate 2202, the application of voltage to input terminal 2233 causes the application of voltage to the second input of composite gate 2202 and thus causes the application of voltage to its second output and thus to the input of one-gate 2213 and thus to terminal 2218. Similarly, if there is voltage on lead 2205 to the permissory input of composite gate 2206, the application of voltage to terminal 2236 causes the application of voltage to the fifth input of composite gate 2206 and thus causes the application of voltage to its fifth output and thus to the input of one gate 2226 and thus to terminal 2231. It will also be noted, in connection with the foregoing examples, that the application of voltage to terminal 2233 results in the application of voltage to the second input of one-gate 2171, and that the application of voltage to terminal 2236 results in the application of voltage to the fifth input of one gate 2171.)

Terminals 2237, 2238, 2239, 2240, 2241, are respectively connected to the first, second, third, fourth, fifth inputs of both composite gate 2211 and composite gate 2210. As shown, the first, second, third, fourth, fifth outputs of gate 2211 are respectively connected to the inputs of one-gates 2212, 2213, 2214, 2215, 2216, while the first, second, third, fourth, fifth outputs of gate 2210 are respectively connected to the inputs of one-gates 2222, 2223, 2224, 2225, 2226.

*Register Control Unit*

Figure 27:
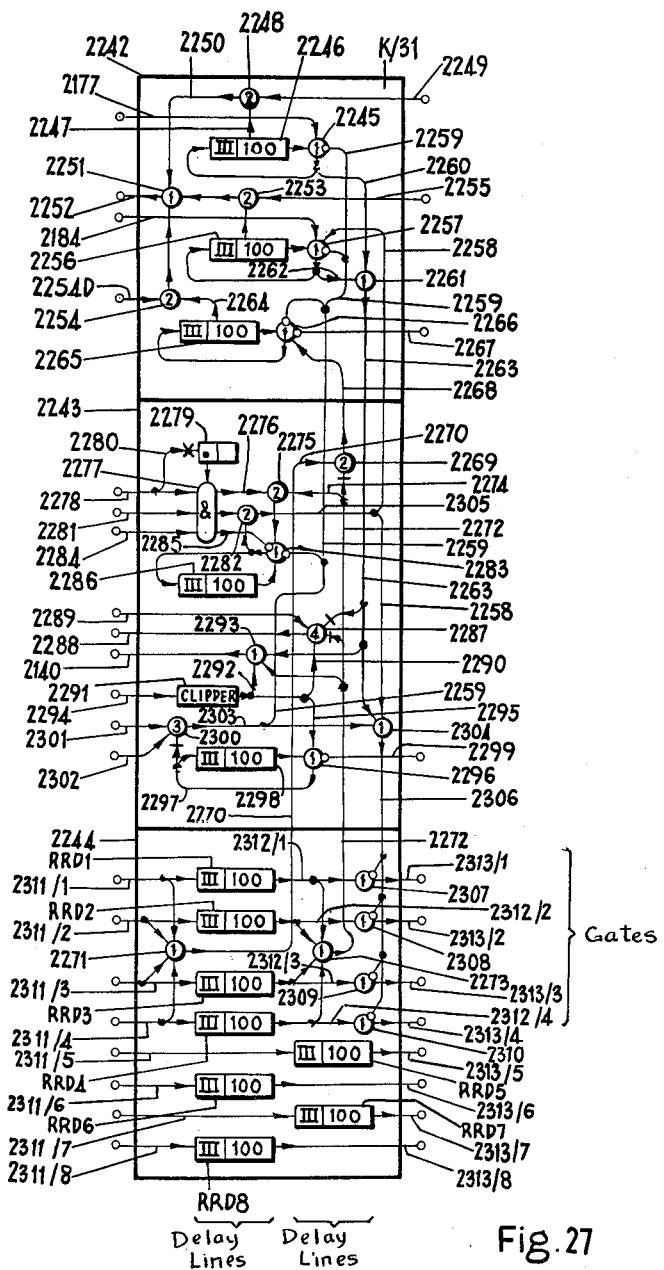

FIGURE 27 of the accompanying drawings shows the register control unit K/31 for the form of exchange now being described. Unit K/31 consists of three sub-units, tone sub-unit 2242, sub-unit 2243 which in fact forms the register control section proper, and register channel pulse store (hereinafter sometimes abbreviated to "RCPS") sub-unit 2244. (These sub-units are again sometimes referred ot as "units," for brevity, where no confusion will be caused by so doing.)

In tone unit 2242, there will be found at the top left-hand corner lead 2177 which is connected to channel allotter K/30. Lead 2177 is connected to one input of one-gate 2245 whose second input is connected to the output of magnetostrictive delay line 2246 (delay period 100 micro-seconds), the output of one-gate 2245 being connected to the input of the said delay line. Delay line 2246 is tapped, the tap being connected by lead 2247 to one input of two-gate 2248 whose second input is connected by lead 2249 to a source of "busy tone" signals (not shown). The output of two-gate 2248 is connected by lead 2250 to the input of one-gate 2251 whose output is connected to lead 2252 which lead is the main tone-carrying cable (hereinafter usually referred to as the "tone highway") of the exchange.

One-gate 2251 has two other inputs, one connected to the output of two-gate 2253 and the other connected to the output of two-gate 2254. One input of two-gate 2253 is connected to lead 2255 to which is connected a source of "number-unobtainable tone" signals. The second input of two-gate 2253 is connected to the tap on magnetostrictive delay line 2256, whose output is connected to one input of one-gate 2257, and whose input is connected to the output of one-gate 2257. A second input to one-gate 2257 is connected to lead 2184 from channel allotter K/30. A third input to one-gate 2257 is connected to lead 2258. One-gates 2245 and 2257 each have an inhibitory input connected as shown to lead 2259. It will further be seen that the output of one-gate 2245 is connected by lead 2260 to one input of one-gate 2261, and that the output of one-gate 2257 is likewise connected by lead 2262 to a second input of the same one-gate. The output of one-gate 2261 is connected to lead 2263.

One input of two-gate 2254 is connected to lead 2254D to which is connected a source of "dial tone" signals. The second input to two-gate 2254 is connected by lead 2264 to the tap on magnetostrictive delay line 2265 whose output is connected to one-gate 2266 and whose input is connected to the output of the said one-gate. One-gate 2266 has two inhibitory inputs, one connected as shown to lead 2259 and the other connected to lead 2267 which is connected (as described later) to every register (such as K/32 described later) in the exchange.

One-gate 2266 has a second (ordinary) input connected by lead 2268 to the output of two-gate 2269 in register control section 2243. Two-gate 2269 has two-inputs—one an ordinary input connected by lead 2270 to the output of one-gate 2271 in RCPS unit 2244, and the other a negatory input connected to lead 2272 and thus to the ouput of one-gate 2273 which is also in RCPS unit 2244.

Lead 2272 is also connected by lead 2274 to one input of two-gate 2275, whose second input is connected by lead 2276 to the first output of composite gate 2277, whose corresponding first input is connected to lead 2278 to terminal Z on pulse generator K/1. The permissory input of composite gate 2277 is connected to the output of multivibrator 2279 which, as shown, is of the reversive type, and has a reversion period of 20 seconds: since the period is so long, a Miller integrator circuit is used to reset this multivibrator. The input of multivibrator 2279 is connected by lead 2280 to lead 2278. Multivibrator 2279 is operated by the lagging edge of a Z pulse to cease to apply voltage to the permissory input of gate 2277 and, as stated, after being so operated, reverts to applying voltage to the said permissory input after 20 seconds have elapsed.

The second input to composite gate 2277 is connected to lead 2281 and thus to terminal X on pulse generator K/1. The corresponding second output of the said gate is connected as shown to one input of two-gate 2282, whose second input is connected to the output of one-gate 2283. The third input to composite gate 2277 is connected by lead 2284 to terminal Y on pulse generator K/1. The corresponding third output of the said gate is connected by lead 2285 to a first inhibitory input on one-gate 2283. The second inhibitory input of one-gate 2283 is connected as shown to lead 2259. One input of one-gate 2283 is connected (as shown) to the output of two-gate 2275 (lying immediately above it in the figure); and a second input to one-gate 2283 is connected to the output of magnetostrictive delay line 2286, (delay period 100 micro-seconds) whose second input is shown connected to the output of one-gate 2283.

Towards the right-hand side of the control section 2243 now being described, lies four-gate 2287, whose output is connected to lead 2288 which is connected (as described later) to every register (such as K/32) in the exchange. Four-gate 2287 has a first negatory input connected as shown to lead 2263, and a second negatory input connected as shown to lead 2272. A third input of four-gate 2287 is connected to lead 2289 (shown just above the output lead of the said gate), which lead 2289 is connected to terminal P on pulse generator K/1. The fourth input to four-gate 2287 (at the six o'clock position) is connected by lead 2290 to the output of clipper 2291, the said lead being also connected by lead 2292 to one input of one-gate 2293. The input of clipper 2291 is connected to lead 2294. Lead 2290 is also connected by lead 2295 to one input of one-gate 2296.

The output of one-gate 2293 is connected to lead 2140 which is connected to the negatory input to six-gate 2139 at the top of channel allotter K/30.

The output of one-gate 2296 (above-mentioned) is connected by lead 2297 to the input of magnetostrictive delay line 2298 whose output is connected as shown to a second input of one-gate 2296. One-gate 2296 has also an inhibitory input connected by lead 2299 to terminal Z on pulse generator K/1.

Lead 2297 above-mentioned is also connected as shown to a negatory input on three-gate 2300, whose second input is connected by lead 2301 to terminal X on pulse generator K/1, and whose third input is connected by lead 2302 to a local clock pulse generator unit (not shown). The output of three-gate 2300 is connected by lead 2303 to lead 2259 and to one input of one-gate 2304, whose second and third inputs are respectively connected to leads 2263 and 2258. Lead 2258 is connected by lead 2305 to the output of two-gate 2282.

The output of one-gate 2304 is shown as connected by lead 2306 to an inhibitory input on each of one-gates 2307, 2308, 2309, 2310 in RCPS unit 2244.

Turning then to RCPS unit 2244, it will be seen that, as shown, it is provided with eight magnetostrictive delay lines RRD1, RRD2, RRD3, RRD4, RRD5, RRD6, RRD7, RRD8, each having a delay period of 100 micro-seconds. Now, the number of multiplexes at present installed in the exchange undergoing description, is 5; and, on the same considerations that led, in the case of the exchange with 20 multiplexes, to the decision that 50 registers would be needed to give the desired service, so, here, it is ascertained that twenty registers are sufficient to deal adequately with the 5 installed multiplexes. These delay lines are to be associated in trios with each register (a different trio being, of course, associated with each register), and the number $n$ of delay lines needed to deal with 20 registers must (as will be clear from the previous explanation) be such that $^nC_3$ is not less than 20, when the exchange is first installed. Since $^6C_3$ is equal to 20, six delay lines would, initially, be sufficient, therefore. The manufacturer (or purchaser) of the exchange can therefore make a choice between, on the one hand, initially installing the full number, viz. 8 as in the previous arrangement, of delay lines which will be needed to deal with all the registers (viz. 50 as in the previous example) which will be needed when the exchange is extended to its full capacity, and, on the other hand, initially installing 6 delay lines to deal with the original 20 registers and then adding two more delay lines when an additional register or registers is installed.

Now it will be seen from FIGURE 26 that each of the first four delay lines is provided with a lead (2311/1, 2311/2, 2311/3, 2311/4, respectively) connected to its input, and each of said four leads is connected to one input of one-gat 2271 already mentioned. The first four delay lines have their respective outputs connected to leads 2312/1, 2312/2, 2312/3, 2312/4, which leads are respectively connected to the inputs of one-gates 2307, 2308, 2309, 2310; and the inputs of the one-gates last mentioned are respectively connected to leads 2313/1, 2313/2, 2313/3, 2313/4 as shown. Each of leads 2312/1, 2312/2, 2312/3, 2312/4 is, as shown, connected to an input of one-gate 2273 already mentioned.

It will be realised that it has been assumed, for the purposes of FIGURE 27, that it has been chosen to install the full number of eight delay lines initially; and it will be seen that delay lines RRD5, RRD6, RRD7, RRD8, respectively have their inputs connected to leads 2311/5, 2311/6, 2311/7, 2311/8, and respectively have their outputs connected to leads 2313/5, 2313/6, 2313/7, 2313/8.

It is necessary that every register shall be associated with at least one of delay lines RRD1, RRD2, RRD3, RRD4, i.e. that one of the trio of delay lines associated with each register shall be one of the four delay lines just enumerated, in order that every register shall be associated with a circuit containing at least one of the four one-gates 2307, 2308, 2309, 2310 provided with an inhibitory input—because it is by applying voltage to at least one such inhibitory input that pulse repetition is suppressed in a trio of delay lines when the associated register is to be released. It will be seen from the table contained in the description of register control unit K/7, being the table giving the numbers of the trio of delay lines associated with each register, that the condition set out in the preceding sentence is satisfied by the list of connections there given for registers 1 to 20. Accordingly where (as shown in FIGURE 27) the full 8 delay lines are installed in the first instance, the first 20 registers to be installed are connected to the delay lines in accordance with the scheme set out in the said table. As further registers are installed, they are also connected as shown in the said table—with the exception of the fiftieth register to be installed. It will be seen from the said table that if the scheme of connections there shown were adopted for the fiftieth register, it should be connected to delay lines RRD5, RRD6, RRD7—which set does not include one of delay lines RRD1, RRD2, RRD3, RRD4. Instead, the fiftieth register would be connected to a trio of delay lines not listed as a trio in the said table, being a trio which does include one of the first four delay lines—viz. the fiftieth register should be connected to delay lines RRD3, RRD4, RRD5.

If, on the other hand, it is decided to install only six delay lines (RRD1, RRD2, RRD3, RRD4, RRD5, RRD6) initially (delay lines RRD7, RRD8, and their loads 2311/7, 2311/8, 2313/7, 2313/8, would then simply be omitted), the scheme of connections shown in the following table is adopted for connecting them to the 20 registers intially installed:

| Register No. | Associated delay lines No. | Register No. | Associated delay lines No. |
|---|---|---|---|
| 1 | 1, 2, 3 | 11 | 2, 3, 4 |
| 2 | 1, 2, 4 | 12 | 2, 3, 5 |
| 3 | 1, 2, 5 | 13 | 2, 3, 6 |
| 4 | 1, 2, 6 | 14 | 2, 4, 5 |
| 5 | 1, 3, 4 | 15 | 2, 4, 6 |
| 6 | 1, 3, 5 | 16 | 2, 5, 6 |
| 7 | 1, 3, 6 | 17 | 3, 4, 5 |
| 8 | 1, 4, 5 | 18 | 3, 4, 6 |
| 9 | 1, 4, 6 | 19 | 3, 5, 6 |
| 10 | 1, 5, 6 | 20 | 4, 5, 6 |

When additional multiplexes need to be added, and additional delay lines and registers installed, suitable trios of delay lines may be selected from the aforementioned table for 50 registers (modified by the substitution of the trio 3, 4, 5 for the trio 5, 6, 7) and the wiring re-connected accordingly.

It will be seen that the choice between installing 8 delay lines initially, and installing 6 delay lines initially, involves the choice between installing (and maintaining) an unnecessarily large number of delay lines initially, and, on the other hand, the nuisance of re-connecting the delay lines and registers when additional delay lines and registers are installed. The choice between these alternatives must be left to the manufacturer or purchaser to be made according to the circumstances and location of the exchange.

Registers

Figure 28:
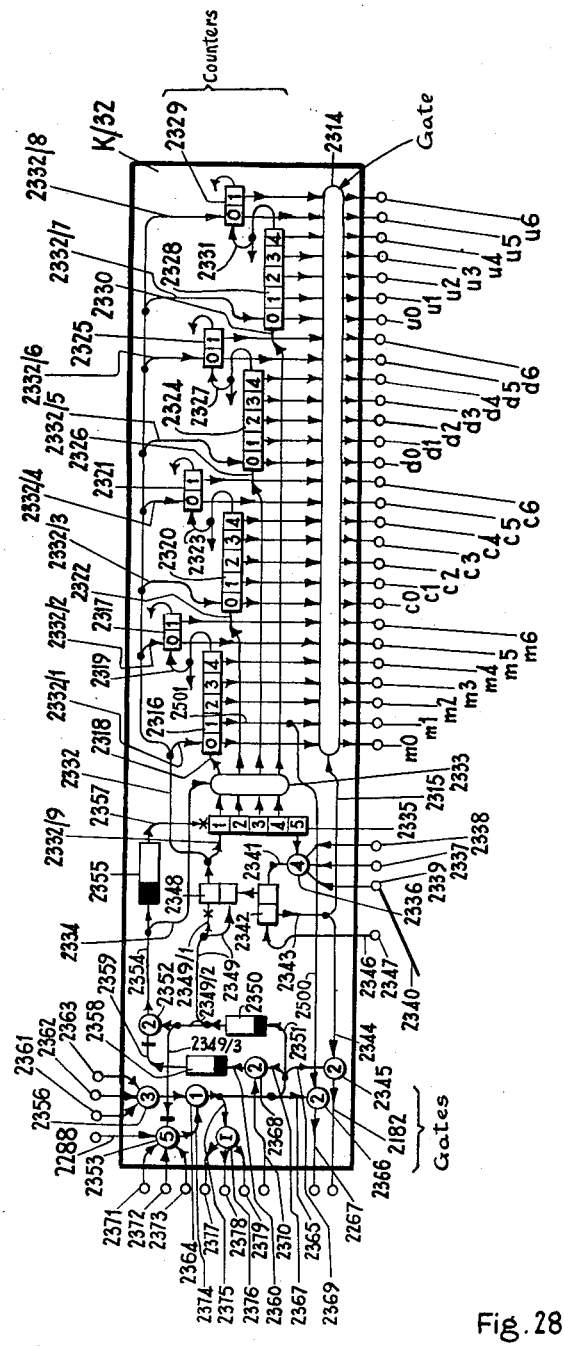

The register used in this second form of exchange are shown in FIGURE 28 of the accompanying drawings, the typical register K/32 being illustrated. (In order to assist the reader in finding the various devices included in unit K/32, phrases are sometimes used such as the statement that lead 2288 is found "at the top left-hand corner of the register": in all phrases of this kind describing the position of a device in the register, it is implied that FIGURE 28 is so viewed that the numerals inscribed in the counters described later, to identify their several stages, are positioned the right way up.)

It will be seen that the register K/32 has output terminals $m0$, $m1$, $m2$, $m3$, $m4$, $m5$, $m6$, $c0$, $c1$, $c2$, $c3$, $c4$, $c5$, $c6$, $d0$, $d1$, $d2$, $d3$, $d4$, $d5$, $d6$, $u0$, $u1$, $u2$, $u3$, $u4$, $u5$, $u6$, precisely corresponding to the terminals on register K/7 bearing the same reference numbers in FIGURE 7. Now it will have been noted that, in FIGURE 7, composite gates 588, 593, 599, 604 all give their output voltages simultaneously, and that they could therefore have been arranged as a single composite gate controlled by a single permissory input. It will be seen that this arrangement has been adopted in FIGURE 28, and that terminals $m0$ to $u6$ are respectively connected to the 28 outputs of composite gate 2314 having its permissory input connected to lead 2315. Above composite gate 2314 lie counters 2316 and 2317, the first being a five-stage and the second a two-stage, counter, as shown, which together form the "first-biquinary counter" in this register in exactly the same way as counters 584 and 585 formed the first biquinary counter in register K/7. The mode of operation of counters 2316 and 2317 is also exactly similar to that of counters 584 and 585 in FIGURE 7. That is to say, in their unoperated conditions, stages 2316/0 and 2317/0 are energised: the application of a voltage pulse to counter 2316 by input lead 2318 causes stage 2316/0 to become de-energised and stage 2316/1 to become energised, the application of a further voltage pulse on lead 2318 causes stage 2316/1 to become de-energised and stage 2316/2 to become energised—and so on, the application of further pulses on lead 2318 causing stages 3 and 4 of counter 2316 to become energised in succession, the previously-energised stage being de-energised when the next stage is energised (as for counter 584) until stage 2316/4 has been energised; and the application of a further pulse on lead 2318 then causes stage 2316/0 to become re-energised and stage 2316/4 to become de-energised, and it also causes counter 2316 to apply a voltage pulse on lead 2319 which (assuming stage 2317/0 to have been energised before the appearance of the said pulse on lead 2319) de-energises stage 2317/0 and energises stage 2317/1. The application of four further pulses on lead 2318 again energise successive stages of counter 2316 (de-energising each preceding stage) until stage 2316/4 was energised. The application of a still further pulse on lead 2318 would then energise stage 2316/0 and de-energise stage 2316/4; and counter 2316 would again (on the de-energisation of stage 2316/4) apply a pulse on lead 2319 to counter 2317 which would de-energise stage 2317/1 and re-energise stage 2317/0. This "cyclical stepping" of counters 2316 and 2317 in response to repeated pulses on lead 2318 will be seen to be exactly the same as the cyclical stepping of counters 584 and 585 in response to repeated pulses on lead 575 in FIGURE 7.

Five-stage counter 2320 and two-stage counter 2321 (which correspond with counters 590 and 593 in FIGURE 7) will likewise be seen lying above composite gate 2314. Counter 2320 has an input lead 2322 (corresponding to lead 576 to counter 590), and is connected to counter 2321 by lead 2323, so that each time stage 2320/4 is de-energised and stage 2320/0 re-energised (as the result of a voltage pulse on lead 2322), counter 2321 receives a voltage pulse on lead 2323, which causes stages 2321/0 and 2321/1 to be alternately de-energised and re-energised exactly as for counter 2317 when that receives successive pulses on lead 2319. Counters 2320 and 2321 together form the "second bi-quinary counter" of register K/32 and, as will be appreciated, are arranged to carry out cyclical stepping in response to repeated pulses on lead 2322 in the same way that the first bi-quinary counter carries out cyclical stepping in response to repeated pulses on lead 2318.

Again it will be seen that five-stage counter 2324 and two-stage counter 2325 (which correspond with counters 596 and 597 in FIGURE 7) lie above composite gate 2314. Counter 2324 has an input lead 2326 (corresponding to lead 577 to counter 596), and is connected to counter 2325 by lead 2327, so that each time stage 2324/4 is de-energised and stage 2324/0 re-energised (as the result of a voltage pulse on lead 2326), counter 2325 receives a voltage pulse on lead 2327, which causes stages 2325/0 and 2325/1 to be alternately de-energised and re-energised exactly as for counter 2317 when that counter receives successive pulses on lead 2319. Counters 2324 and 2325 together form the "third bi-quinary counter" of register K/32 and, as will be appreciated, are arranged to carry out cyclical stepping in response to repeated pulses on lead 2326 in the same way that the first bi-quinary counter carries out cyclical stepping in response to repeated pulses on lead 2318.

Likewise it will be seen that five-stage counter 2328 and two-stage counter 2329 (which correspond with counters 601 and 602 in FIGURE 7) lie above composite gate 2314. Counter 2328 has an input lead 2330 (corresponding to lead 578 to counter 601), and is connected to counter 2329 by lead 2331, so that each time stage 2328/4 is de-energised and stage 2328/0 re-energised (as the result of a voltage pulse on lead 2330), counter 2329 receives a voltage pulse on lead 2331, which causes stages 2329/0 and 2329/1 to be alternately de-energised and re-energised exactly as for counter 2317 when that counter receives successive pulses on lead 2319. Counters 2328 and 2329 together form the "fourth bi-quinary counter" of register K/32 and, as will be appreciated, are arranged to carry out cyclical stepping in response to repeated pulses on lead 2330 in the same way that the first bi-quinary counter carries out cyclical stepping in response to repeated pulses on lead 2318.

In their unoperated conditions, stages 2316/0, 2317/0, 2320/0, 2321/0, 2324/0, 2325/0, 2328/0, 2329/0, of these respective counters, are energised. If, at this time, voltage is applied to lead 2315 to the permissory input of composite gate 2314, stage 2316/0 applies voltage to the first input of the said gate, and the gate applies voltage to its first output and thus to terminal $m0$. Similarly, stage 2317/0 applies voltage to the sixth input of gate 2314, and that gate (for so long as voltage is applied to its permissory input by lead 2315) applies voltage to its sixth output and thus to terminal $m5$— and so on for each other stage which is energised, in exact parallelism to the register shown in FIGURE 7. The complete list of correspondences between energised stages and the respective terminals to which voltage is applied when there is voltage applied by lead 2315 to the permissory input of composite gate 2314, is as follows:

| Energised stage | Terminal receiving voltage | Energised stage | Terminal receiving voltage |
| --- | --- | --- | --- |
| 2316/0 | $m0$ | 2324/0 | $d0$ |
| 2316/1 | $m1$ | 2324/1 | $d1$ |
| 2316/2 | $m2$ | 2324/2 | $d2$ |
| 2316/3 | $m3$ | 2324/3 | $d3$ |
| 2316/4 | $m4$ | 2324/4 | $d4$ |
| 2317/0 | $m5$ | 2325/0 | $d0$ |
| 2317/1 | $m6$ | 2325/1 | $d1$ |
| 2320/0 | $c0$ | 2328/0 | $u0$ |
| 2320/1 | $c1$ | 2328/1 | $u1$ |
| 2320/2 | $c2$ | 2328/2 | $u2$ |
| 2320/3 | $c3$ | 2328/3 | $u3$ |
| 2320/4 | $c4$ | 2328/4 | $u4$ |
| 2321/0 | $c5$ | 2329/0 | $u5$ |
| 2321/1 | $c6$ | 2329/1 | $u6$ | as will be seen from FIGURE 28 by following the leads through.

Each of counters 2316, 2317, 2320, 2321, 2324, 2325, 2328, 2329 is provided with a re-setting input—these re-setting inputs being respectively connected to leads 2332/1, 2332/2, 2332/3, 2332/4, 2332/5, 2332/6, 2332/7, 2332/8, all of which are connected to lead 2332. The application of voltage to lead 2332 has the effect that if any stage other than stage 0 in any counter aforementioned is energised at the time of application of such voltage, that stage is de-energized and stage 0 of the counter in question is re-energised: any stage 0 which is energised at the time of application of voltage to lead 2332, remains energised.

Leads 2318, 2322, 2326, 2330 are respectively connected as shown to the first, second, third and fourth outputs of composite gate 2333 whose permissory input is connected to lead 2334. Associated with gate 2333 is a counter 2335 so arranged that when its stage 1 is energised it applies a voltage to the first input of gate 2333: similarly, when stages 2, 3, 4 of counter 2335 are respectively energised, they respectively apply voltage to the second, third and fourth inputs of gate 2333. If, when voltage is applied to any input of composite gate 2333, voltage is also applied to its permissory input, the gate will of course apply voltage to the respectively corresponding output. Stage 2335/5 of counter 2335 is, as shown, connected to one input of four-gate 2336.

Let it now be supposed temporarily that all 50 registers for the complete exchange have been installed: a description will then be given of the connections to the other three inputs of four-gate 2336. It will then be described how the connections to four-gate 2336 need to be modified when only 20 registers have been installed.

Now it will be remembered, from the description of the register shown in FIGURE 7, that there is a four-gate 580 at the right-hand side, near the top, which is so arranged that it only gives an output when three-pre-assigned pulses (a different combination being used for each register) are applied to its three input terminals 529, 530, 531. It will further be remembered that the purpose of that arrangement in FIGURE 7 was to ensure that no register could apply voltage to any of its twenty-eight output terminals $m0$, $m1$, to $u6$ at a time when some other register had started to operate the converter but had not finished so doing. Four-gate 2336 serves a similar purpose in register K/32 (and, of course, the corresponding four-gate in every other register in the exchange now in course of being described serves a like purpose, since all registers on this said exchange are constructionally identical).

Near the beginning of the description of the registers for the previous exchange, when FIGURE 8 was being explained, a table was given setting out the three identifying pulses (i.e. one of pulses C0 to C4, one of pulses D0 to D4, and either a D5 or a D6 pulse—or, more precisely, a pulse derived from a D5 or a D6 pulse) used to control each register. The same table of identifying pulses is applicable to the registers now being described. Thus, register K/32, being the first of the 50 registers assumed (temporarily) to have been installed is identified by a C0 pulse, a D0 pulse, and a pulse derived from pulse D5 (as can be ascertained from the said table). In order that this may be done, terminal 2337 on register K/32 is connected to terminal C0 on pulse generator K/1, and terminal 2338 on register K/32 is connected to terminal D0 on pulse generator K/1—terminals 2337 and 2338 being respectively connected to two of the inputs of four-gate 2336 as shown. Terminal 2339, which is connected as shown to the fourth input of four-gate 2336, has connected to it lead 2340 which is connected to lead 2198 and thus to the output of one-gate 2194 in the control sub-unit 2137 (i.e. the upper sub-unit) of channel allotter K/30 (see FIGURE 26). Lead 2197 (adjacent to lead 2198 in FIGURE 26) is connected to terminal D5 on pulse generator K/1. Similarly (still on the temporary assumption that all 50 registers have been installed) terminal 2337 on each register is connected to that one of the C terminals on pulse generator K/1 whose identifying number is given in the table above-mentioned as having been given in the course of the description of FIGURE 8; and terminal 2338 on each register is connected to that one of the D terminals on pulse generator K/1 whose identifying number is given in the said table. Likewise, terminal 2339, on each register that has D5 listed as an identifying pulse in the said table, is connected to lead 2198 on channel allotter K/30; while for each register that has D6 listed as an identifying pulse in the said table, the terminal 2339 on that register is connected to lead 2196 on channel allotter K/30 and thus to the output of one-gate 2192 in channel allotter K/30. Lead 2195 to the input of one-gate 2192 is connected to terminal D6 on pulse generator K/1.

Having thus specified the connections that are to be used when the full 50 registers have been installed, one can revert to the description of the connections used when only 20 registers have been installed. Terminal 2339 on each of the 20 registers is then connected to lead 2340 and thus to lead 2198; and lead 2197 on channel allotter K/30 is then connected to a source of D.C. potential sufficient to cause one-gate 2194 to give an output voltage when there is no voltage on its inhibitory input. The scheme of connections from terminals 2337 and 2338 (for each of the 20 installed registers) to the appropriate C or D terminal on pulse generator K/1 is as follows:

| Register No. | Terminal for terminal 2337 | Terminal for terminal 2338 | Register No. | Terminal for terminal 2337 | Terminal for terminal 2338 |
| --- | --- | --- | --- | --- | --- |
| 1 | C0 | D0 | 11 | C2 | D2 |
| 2 | C0 | D1 | 12 | C2 | D3 |
| 3 | C0 | D2 | 13 | C3 | D0 |
| 4 | C0 | D3 | 14 | C3 | D1 |
| 5 | C1 | D0 | 15 | C3 | D2 |
| 6 | C1 | D1 | 16 | C3 | D3 |
| 7 | C1 | D2 | 17 | C4 | D0 |
| 8 | C1 | D3 | 18 | C4 | D1 |
| 9 | C2 | D0 | 19 | C4 | D2 |
| 10 | C2 | D1 | 20 | C4 | D3 |

When more than 20 registers needed to be installed, because of the installation of more multiplexes, the pre-existing 20 registers would be re-wired according to the table given previously, and each additional register would be wired in accordance with that table. Obviously, too, when only 20 registers are installed, none is connected to lead 2196 on channel allotter K/30, and lead 2195 is not connected to terminal D6 on pulse generator K/1.

The output of four-gate 2336 is connected by lead 2341 to one input of multivibrator 2342 which at the leading edge of a pulse on lead 2341, is triggered to apply voltage to lead 2343 and thus to lead 2315 to the permissory input of composite gate 2314. The voltage applied to lead 2343 is also applied to lead 2344 and thus to one input of two-gate 2345. Multivibrator 2342 is re-set by the application of a C pulse on lead 2346 from terminal 2347, which terminal, for each register is connected to a C terminal on pulse generator K/1 whose reference number can be obtained from the following list and depends on the C terminal to which terminal 2337 for the register in question is connected:

| C terminal for terminal 2337 | C terminal for terminal 2347 |
| --- | --- |
| C0 | C3 |
| C1 | C4 |
| C2 | C0 |
| C3 | C1 |
| C4 | C2 | this rule applying whether there are 20 registers, or more than 20 registers, in the exchange (up to the full 50 registers). Thus, for example for the set of connections tabulated in the preceding paragraph for an exchange with only 20 installed registers, terminal 2337 of register No. 9 is connected to terminal C2 on pulse generator K/1, and terminal 2347 is accordingly (from the foregoing list) connected to terminal C0 on pulse generator K/1: similarly, as a second example, for an exchange having 50 installed registers, terminal 2337 of register No. 42 would be connected to terminal C4 on pulse generator K/1 (see the table previously referred to, given in connection with the description of FIGURE 8), and therefore, from the list given in the present paragraph, terminal 2347 on register No. 42 would be connected to terminal C2 on pulse generator K/1.

At the leading edge of a re-setting C pulse on lead 2346, multivibrator 2342 applies a pulse voltage as shown to one input of multivibrator 2348, thus causing the latter multivibrator (at the leading edge of the pulse so applied to it) to apply voltage to lead 2332 and thus to the re-setting inputs of counters 2316, 2317, 2320, 2321, 2324, 2325, 2328, 2329: voltage applied to lead 2332 is also applied by branch lead 2332/9 to a re-setting input on counter 2335, so that if any stage of that counter other than stage 2335/1 is energised at the time of the said re-setting input, that other stage will be de-energised and stage 2335/1 will be re-energised—whilst if stage 2335/1 is energised at the time of the said re-setting input, stage 2335/1 will remain energised.

Multivibrator 2348 has a second input on lead 2349 which is connected to the output of slow-release device 2350; and at the leading edge of a voltage signal on lead 2349, multivibrator 2348 is triggered to apply voltage to leads 2332 and 2332/1. Multivibrator 2348 is re-set by the lagging edge of the pulse on lead 2349 aforementioned (the upper stage of multivibrator 2348 being connected as shown to lead 2349 by branch lead 2349/1).

Slow-release device 2350 has (when the register is seized, i.e. allotted to a calling subscriber) ½ microsecond register channel pulses applied to it at 100 microsecond intervals on lead 2351 and is arranged to give an output immediately the first of such pulses is applied and to continue to maintain a steady output voltage on lead 2349 for so long as such pulses are not interrupted for less than 200 micro-seconds. The repetition of these pulses continues from the time a register is seized until it is released, and when a register is released, therefore, device 2350 ceases to give an output voltage, and such cessation constitutes the trailing edge of a pulse on leads 2349 and 2349/1. Lead 2349 is also connected by lead 2349/2 to one input of two-gate 2352; and lead 2349/2 is connected by lead 2349/3 to a negatory input on five-gate 2353. The output of two-gate 2352 is connected by lead 2354 to lead 2334 and to the input of slow-release device 2355.

Slow-release device 2355 has applied to it (as will appear shortly) on lead 2354 a voltage input which starts when, after register channel pulses have been applied from register control unit K/31 to the three-gate 2356, a subscriber begins to dial the wanted number. The purpose of device 2355 is to distinguish between inter-digital pauses and the interruptions of the register channel pulses which occur (as explained in the earlier description of the register shown in FIGURE 7) during dialling and correspond in number to the number of the dialled digit. It will be remembered from the earlier description that the maximum period of restoration of register channel pulses which can occur (with British Post Office equipment) between the successive interruptions in the dialling of a single digit, is 53 milli-seconds, and the minimum duration of an inter-digital pause is 400 milli-seconds: accordingly, device 2355 is arranged to give an output voltage immediately a pulse is applied to it and to maintain that voltage for so long as its input is not interrupted for less than 200 milli-seconds, but to cease to give an output if its input is interrupted for more than 200 milliseconds. Such cessation of output constitutes the trailing edge of a pulse on lead 2357, which is connected between the output of device 2455 and the input to counter 2335, whose operation is about to be described—and it will be noted, from the "x" on lead 2357, that counter 2335 is operated by the trailing edge of a pulse on its input lead.

The unoperated state of counter 2335 is one in which stage 2335/1 is energised; and when in this state, the appearance of a trailing edge of a pulse on lead 2357 will cause stage 2335/1 to become de-energised and stage 2335/2 to become energised. The application of a further pulse on lead 2357 has the effect that, at the trailing edge of such pulse, stage 2335/2 becomes de-energised and stage 2335/3 becomes energised—two further such trailing edges of pulses of lead 2357 causing stages 2335/4 and 2335/5 to become energised in succession and stages 2335/3 and 2335/4 to become de-energised in succession. It has already been explained that the trailing edge of a pulse will appear on lead 2357 during each interdigital pause and after the completion of dialling: accordingly it will be seen that stage 2335/1 of counter 2335 is energized during the dialling of the first digit of a subscriber's number, stage 2335/2 is energised during the dialing of the second digit of a subscriber's number, and stages 2335/3 and 2335/4 are energised during the dialling of the third and fourth digits of a subscriber's number, respectively, and stage 2335/5 becomes energised after the dialling of four digits for a subscriber's number has been completed.

To the left (and slightly above) slow-release device 2350 lies a third slow-release device bearing the reference number 2358. The purpose of this device is to detect the number of interruptions in the register channel pulse train which are caused by the dialling of each digit of a wanted number. It is accordingly arranged to give a steady voltage output on lead 2359 for so long as ½ micro-second pulses are applied to its input lead 2360 at 100 micro-second intervals, but to cease to give an output if such application of pulses is interrupted for appreciably more than 100 micro-seconds (an interruption of 200 micro-seconds being a convenient value for the minimum period of interruption needed to cause device 2358 to cease to give an output). Lead 2359 is, as will be seen, connected to a negatory input on two-gate 2352.

Near the top left-hand corner of the register will be seen three terminals respectively bearing references 2361, 2362, 2363 which are respectively connected to the three inputs of three-gate 2356. The three said terminals, on each register, are respectively connected to those three leads, out of the set referenced 2313/1, 2313/2, 2313/3, 2313/4, 2313/5, 2313/6, 2313/7, 2313/8 (in FIGURE 27) which are connected to the trio of delay lines associated with the register in question. Two examples will make this rule clear.

In the penultimate paragraph of the description of register control unit K/31 a list is given of the delay lines associated with each register when 20 registers have been installed, if only six delay lines are initially installed. From that list it will be seen that delay lines RRD2, RRD4, RRD5, are associated with register No. 14; and from FIGURE 27 it will be seen that the leads (out of the set enumerated above) that are connected to the trio of delay lines RRD2, RRD4, RRD5, are, respectively, leads 2313/2, 2313/4 and 2313/5. Accordingly, in this example, terminals 2361, 2362, 2363 on register No. 14, would be respectively connected to leads 2313/2, 2313/4, 2313/5.

Suppose, as the second example, that all eight of delay lines RRD1 to RRD8 have been installed and that register No. 17 is considered. Then, in accordance with the instructions given in the description of register control unit K/31 (and by reference to the list, already referred to, of delay lines to be associated with register, as given in the description of register control unit K/7), register No. 17 is associated with delay lines RRD1, RRD5, RRD8; and the leads (out of the set enumerated above) that are connected to this trio of delay lines are, as will be seen from FIGURE 27, leads 2313/1, 2313/5, 2313/8 respectively. Accordingly, in this case, terminals 2361, 2362, 2363, on register No. 17, would be respectively connected to leads 2313/1, 2313/5, 2313/8.

The output of three-gate 2356 is connected as shown to one input of one-gate 2364 whose output is connected by lead 2365 to one input of two-gate 2366. Lead 2365 also has lead 2351 connected to it; and lead 2351 is connected by lead 2367 to one input of two-gate 2368 and by lead 2369 to the second input of two-gate 2345.

The second input to two-gate 2368 is connected to lead 2370 and thus to the main co-axial cable carrying register channel pulses for the exchange (hereinafter generally referred to as the "register highway"). (All registers are, of course, similarly connected to the said register highway, and where, hereinafter, it is necessary individually to identify the lead 2370 which is connected to some assigned register, this will be done by adding the number of the register to the lead reference number: thus, for example, the lead 2370 which is connected to register No. 1 will be identified as 2370/1, the lead 2370 which is connected to register No. 20 will be identified as lead 2370/20, and so on.)

The second input to two-gate 2366 is connected to lead 2500 which, as shown, is connected to lead 2501 by which stage 2316/1 of counter 2316 is connected to the second input of composite gate 2314. The output of two-gate 2366 in each register is connected to lead 2267 and thus to the inhibitory input of one-gate 2266 in tone unit 2242 of register control unit K/31 (FIGURE 27).

The output of two-gate 2345 is connected to lead 2182 and thus to the input of one-gate 2176 in control sub-unit 2137 in channel allotter K/30 (FIGURE 26).

At the top left-hand corner of the register there will be seen lead 2288 which is connected to one of the inputs of five-gate 2353 (the negatory input of this five-gate connected to lead 2349/3 having already been mentioned). Lead 2288 has already been mentioned (in the description of register control unit K/31, FIGURE 27) as connected to every register in the exchange. The other three inputs of five-gate 2353 are respectively connected to leads 2371, 2372, 2373. On every register, lead 2371 is connected to the same terminal on pulse generator K/1 as is terminal 2337, lead 2372 is connected to the same terminal on pulse generator K/1 as is terminal 2338, and lead 2373 is (when the full 50 registers are installed) connected to terminal D5 or terminal D6 on pulse generator K/1 according to whether terminal 2339 on the said register is connected to lead 2198 or lead 2196 on channel allotter K/30. When only 20 registers have been installed, so that lead 2340 is connected to lead 2198 and lead 2197 is connected to a source of D.C. potential as already explained, lead 2373 is connected to a source of D.C. potential sufficient to ensure that five-gate 2353 gives an output voltage when it receives voltage on leads 2288, 2371 and 2372 and has no voltage applied to lead 2349/3 which is connected to its negatory input. Thus five-gate 2353 on each register effectively has applied to it the same three identifying pulses as are applied to three of the inputs of four-gate 2336. The output of five-gate 2353 is connected by lead 2374 to the second input of one-gate 2364; and the output of one-gate 2364 is connected to lead 2375 as well as to lead 2369 already mentioned.

Lead 2375 is connected to device 2376. Device 2376 consists of three diodes each having its anode connected to lead 2375. The cathode of the first of these diodes is connected to terminal 2377: the cathode of the second of these diodes is connected to terminal 2378; and the cathode of the third of these diodes is connected to terminal 2379. Terminals 2377, 2378, 2379 on each register are respectively connected to those three leads, out of the set referenced 2311/1, 2311/2, 2311/3, 2311/4, 2311/5, 2311/6, 2311/7, 2311/8 (in FIGURE 27) which are connected to the trio of delay lines associated with the register in question. Two examples will make this rule clear.

In the description above-given of the connections to be made to terminals 2361, 2362, 2363, it was explained that if 20 registers had been installed and only six delay lines had been installed, delay lines RRD2, RRD4, RRD5 would be associated with register No. 14: accordingly, in this example, it will be seen from FIGURE 27 that the leads (out of the set enumerated in the preceding paragraph) that are connected to the trio of delay lines RRD2, RRD4, RRD5 are, respectively 2311/2, 2311/4, and 2311/5. Accordingly, in this example, terminals 2377, 2378, 2379, on register No. 14, would be respectively connected to leads 2311/2, 2311/4, 2311/5.

In the second of the examples above-given of the connections to be made to terminals 2361, 2362, 2363, it was explained that if all eight of delay lines RRD1 to RRD8 had been installed, register No. 17 would be associated with delay lines RRD1, RRD5, RRD8: accordingly, in this second example, it will be seen from FIGURE 27 that the leads (out of the set 2311/1 to 2311/8 enumerated above) that are connected to delay lines RRD1, RRD5, RRD8 are, respectively, 2311/1, 2311/5, 2311/8. Therefore, in this example, terminals 2377, 2378, 2379, on register No. 17, would be respectively connected to leads 2311/1, 2311/5, 2311/8.

In view of the very full description of the operation, by the dialling impulses, of the registers for the form of exchange previously described, a rather shorter description of the corresponding operation of the typical register shown in FIGURE 28 will make matters clear.

As will later appear from the description of the mode of operation of this exchange, the effect of the allocation of a register to the use of a calling subscriber is that, a fraction of a second later, pulses of the allotted register channel begin to be repeated in the trio of delay lines associated with the register in question, and accordingly, as will be appreciated from the description of connections to these delay lines which has just been given, the corresponding pulses appear synchronously at terminals 2361, 2362 and 2363, are emitted at the output of three-gate 2356 and applied to the input of one-gate 2364, by which gate they are applied to one input of each of two-gates 2345, 2366 and 2368. They are also applied to slow release device 2350, which accordingly starts to give an output, which output lasts until the release of the register by the cessation of the application of the register channel pulses to terminals 2361, 2362, 2363. The output voltage from device 2350 is applied as shown to one input of two-gate 2352 and (by lead 2349) to the resetting input of multivibrator 2348, ensuring that this multivibrator cannot be applying voltage to lead 2332 (or any of its branch leads) at this time. Device 2350 also at the same time applies voltage to the negatory input of five-gate 2353.

By the time the foregoing state of affairs has been reached, lead 2370 will be receiving from the register highway the pulses which constitute the register channel for the register now under consideration and the subscriber's line unit (to be described later) for the calling subscriber will have been made ready to modulate, with dialling impulses, the pulses of the said register channel as soon as the calling subscriber begins to dial the wanted number. Accordingly, two-gate 2368 will be receiving (from lead 2370) register channel pulses which synchronise with the register channel pulses that are being applied to the other input of two-gate 2368 by lead 2365.

Two-gate 2368 accordingly applies a ½ micro-second pulse to slow release device 2358 at the instant when each of the said register channel pulses occurs; and device 2358 applies voltage continuously to the negatory input of two-gate 2352 for so long as the said register channel pulses are not interrupted by dialling impulses. In the absence of such interruptions, therefore, two-gate 2352 gives an output voltage. When, however, the calling subscriber dials the first digit of the wanted number, the pulses of the register channel he is using are suppressed to produce as many interruptions of the register channel as the number of the digit he is dialling (e.g. if he dials the digit 7, there will be seven interruptions of the register channel). At each such interruption, register channel pulses cease to appear on lead 2360 and two-gate 2368 ceases to give an output (having lost the input voltage on one of its inputs) on lead 2360 to slow release device 2358; and since (as already explained) device 2358 is so designed that each interruption is long enough to permit device 2358 to stop giving an output voltage, there are as many interruptions of the voltage applied (by lead 2359) to the negatory input of two-gate 2352 as there are interruptions of the register channel, and, at each interruption, two-gate 2352 gives a voltage pulse output, which is applied to lead 2354 and, by lead 2334, to the permissory input of composite gate 2333.

The voltage pulses last-mentioned follow each other too rapidly for slow release device 2355 (which has started to apply voltage to lead 2357 as soon as it received its first pulse input) to cease to give an output between the said pulses—as explained in the description of device 2355. But at each voltage input on lead 2334 to the permissory input of composite gate 2333, voltage appears on the first output of the said gate, since counter 2335 is as yet in its "unoperated" condition, and stage 2335/1 is energised. Accordingly, each time a voltage pulse is applied to the permissory input of gate 2333, a voltage pulse appears on lead 2318 and is applied to the input of counter 2316—which thus receives as many pulse inputs as there are interruptions due to dialling impulses. Counters 2316 and 2317 are thus caused to assume states in which one stage of each is left energised in dependence upon the number of voltage pulses applied to lead 2318, these pulses, since it is the first digit which is being dialled, being those representing the thousands digit of the wanted number—in precisely the same way that counters 584 and 585 in FIGURE 7 were "set" by the dialling impulses corresponding to the thousands digit of a wanted number.

Table D of FIGURE 13 can be used to determine which stages of counters 2316 and 2317 are left energised as the result of dialling any thousands digit of a wanted number, and also to determine to which of terminals $m0$, $m1$, $m2$, $m3$, $m4$, $m5$, $m6$, voltage will (as a result of the dialling of that digit) be applied when any register in the present exchange gives its output.

When the first inter-digital pause occurs, the voltage output from two-gate 2352 is interrupted for long enough (since register channel pulses are present on lead 2370 during inter-digital pauses) for slow release device 2355 to cease to give an output. The cessation of the voltage previously applied to lead 2357 constitutes the trailing edge of a pulse on that lead and causes stage 2335/1 of counter 2335 to become de-energised and stage 2335/2 to become energised.

The calling subscriber now dials the second (i.e. hundreds) digit of the wanted number, again causing as many voltage pulses to be applied to leads 2354 and 2334, and thus to the permissory input of composite gate 2333, as are equal to the number of the digit that is being dialled. At each application of a voltage pulse to the permissory input of composite gate 2333, that gate applies a pulse on lead 2322 (since stage 2335/2 of counter 2335 is now energised) to the input of counter 2320—thus causing counters 2320 and 2321 to assume states in which the energised stages are those appropriate to the number of dialling impulses produced during the dialling of the second digit of the wanted number. (Table D of FIGURE 13 can again be used to determine which stages of counters 2320 and 2321 remain energised after the dialling of the second digit.)

During the following inter-digital pause, device 2355 ceases to give an output voltage on lead 2357, and accordingly (as already explained) stage 2 of counter 2335 is de-energised and stage 3 becomes energised.

The dialling of the third digit of the wanted number similarly causes counters 2324 and 2325 to assume states appropriate to the said third digit—since, stage 2355/3 being now energised, the application of voltage pulses to the permissory input of gate 2333 causes voltage pulses to be applied to lead 2326. Which stages of counters 2324 and 2325 are left energised after the dialling of the third digit can again be determined from Table D of FIGURE 13.

During the following inter-digital pause, device 2355 again ceases to apply voltage to lead 2357; and accordingly stage 3 of counter 2335 is de-energised and stage 4 becomes energised.

The dialling of the fourth digit of the wanted number likewise causes counters 2328 and 2329 to assume states appropriate to the said fourth digit—since, stage 2335/4 being now energised, the application of voltage pulses to the permissory input of gate 2333 causes voltage pulses to be applied to lead 2330. Which stages of counters 2328 and 2329 are left energised after the dialling of the fourth digit, can again be determined from Table D of FIGURE 13.

During the time that elapses after the dialling of the fourth digit, device 2355 ceases to apply voltage to lead 2357, and stage 4 of counter 2335 is de-energised and stage 5 becomes energised, applying voltage to one input of four-gate 2336.

The register now waits until its three identifying pulses (as already explained) are applied to terminals 2337, 2338 and 2339, and thus to the three remaining inputs of four-gate 2336. Four-gate 2336 then applies voltage via lead 2341 to multivibrator 2342, causing the latter to apply a voltage pulse to lead 2343 and thus to leads 2315 and 2344.

The resulting application of voltage by lead 2315 to the permissory input of composite gate 2314, causes that gate to apply voltage to that terminal of the set $m0$ to $m4$ which corresponds to the stage left energised in counter 2316, and to that one of terminals $m5$, $m6$ which corresponds to the energised stage of counter 2317: similarly, when the said voltage is applied to the permissory input of gate 2314, that gate applies voltage to those six of terminals $c0$ to $c6$, $d0$ to $d6$, $u0$ to $u6$, which respectively correspond to the then-energised stages of counters 2320, 2321, 2324, 2325, 2328, 2329.

The application of voltage (above-mentioned) to lead 2344, applies voltage to one input of two-gate 2345, which has applied to its second input, from one-gate 2364, pulses of the register channel in use by the register. Two-gate 2345 accordingly applies each such pulse (for so long as voltage continues to be applied to lead 2344) to lead 2182 and thus to one-gate 2176 in control sub-unit 2137 of channel allotter K/30 (FIGURE 26).

It is now necessary to revert to an earlier stage in the operations just described with reference to FIGURE 28, since the omitted matter should be described before a description is given of the completion of the operations of the register.

During the dialling of the thousands digit of the wanted number, at least one dialling impulse will occur, and stage 2316/1 of counter 2316 will therefore at some time have been energised. When energised, stage 2316/1 applies voltage on lead 2501 not only to the second input of composite gate 2314, but also to lead 2500 and thus to one input of two-gate 2366. As register channel pulses are (during the time when voltage is being applied to lead 2500) being applied to the other input of two-gate 2366 (as already explained), two-gate 2366 applies to lead 2267 (and thus to the inhibitory input of one-gate 2266 in tone unit 2242 of register control unit K/31 shown in FIGURE 27) every such register channel pulse occurring during the time when voltage is being applied to lead 2500—thus stopping the emission of dialling tone.

Reverting now to the state of affairs resulting from the application of voltage by four-gate 2336 to multivibrator 2342, it will be remembered that the said application of voltage caused multivibrator 2342 to apply voltage to lead 2343—the multivibrator then applying no voltage from its right-hand stage (with reference to FIGURE 28) to multivibrator 2348. The register then waits for the appropriate resetting C pulse to be applied to terminal 2347 (as already set out above), whereupon multivibrator 2342 is triggered to apply voltage to multivibrator 2348 which responds by applying voltage to lead 2332 and thus resetting all the counters so that stage 1 in counter 2335, and stage 0 in every other counter, is energised.

If the calling subscriber has secured the use of a register but has not dialled (or not completed dialling), stage 5 of counter 2335 will never have become energised, and multivibrator 2342 cannot be triggered by a re-setting C pulse to give an output and thus to cause multivibrator 2348 to re-set the various counters in the way just described. However, sooner or later the register will be released, either because the calling subscriber replaces his instrument or because a forced-clearance operation (described later) takes place. When a register is so released, the voltage output from device 2350 ends, and this constitutes the lagging edge of a signal on leads 2349 and 2349/1, which lagging edge causes multivibrator 2348 to apply a voltage pulse to lead 2332 and thus to re-set all counters.

*Converter*

The circuit arrangement of converter K/33 is the same as that of converter K/3 except for the omission of the following components: (i) terminals 539 and 541 and the circuit components connected thereto, viz. lead 764, pulse former 765, leads 766 and 767, (ii) terminals 546 and 548 and the circuit components connected thereto, viz. lead 761, pulse former 762 leads 763 and 768, and (iii) terminal 614, leads 756, 758 and 759, multivibrator 759, multivibrator 757 and composite gate 760. (The components performing a similar function in the present form of exchange, that is to say, in assisting to determine the times at which registers can start to apply voltage to their output terminals $c0$, $c1$, . . . to $u6$, are incorporated in other units of the present exchange, instead of being incorporated in the converter.) References to terminals and operations of converter K/33 can therefore be understood by reference to the corresponding terminals and operations of converter K/3 as shown in FIGURE 10 and the description relating thereto.

As with converter K/3, so, for converter K/33, terminal $c'0$ on converter K/33 is connected to terminal $c0$ of every register installed in the exchange, terminal $c'1$ is connected to terminal $c1$ of every register installed in the exchange, and so on for terminals $c'2$, $c'3$, $c'4$, $d'0$, $d'1$, $d'2$, $d'3$, $d'4$, $d'5$, $d'6$, $u'0$, $u'1$, $u'2$, $u'3$, $u'4$, $u'5$, $u'6$. (Terminals $c'5$ and $c'6$ do not occur on converter K/33, as will be seen by reference to FIGURE 10.) Terminals C0, C1, C2, C3, C4, D0, D1, D2, D3, D4, D5, D6, U0, U1, U2, U3, U4, U5, U6, on converter K/33 are respectively connected to the terminals bearing those reference numbers on pulse generator K/1.

Now, as already mentioned in the description of the typical channel pulse store for each multiplex of the present exchange, the line unit of each subscriber connected with that multiplex is associated with a trio (peculiar to that subscriber) of the delay lines in the channel pulse store of his multiplex. It was also explained in the description of the channel pulse store for a subscribers' multiplex for the preceding form of exchange, that if a subscriber is associated with an assigned trio of delay lines in the channel pulse store in his multiplex, then his trio of delay lines are repeatedly "prepared" or "tested" by the application to them (via the necessary gates) of voltage from three of terminals T1 to T16 of converter K/3. So equally, in the present form of exchange, if a subscriber belonging to an assigned multiplex, is associated with the trio of delay lines SDT$s$, SDT$t$ and SDT$u$ (where $s$, $t$ and $u$ are, as before, used as general symbols for three of the number 1, 2, 3 . . . to 16) in the channel pulse store in his multiplex, then leads 2121/$s$, 2121/$t$, 2121/$u$, out of the set 2121/1, 2121/2, . . . to 2121/16 in his channel pulse store (see FIGURE 25), will be connected to terminals T$s$, T$t$, T$u$ of converter K/33. The method of determining with which delay lines a subscriber having an assigned number is associated, is explained more than once elsewhere in this specification; but it will be briefly repeated at this point to save reference to and fro, and two examples given to make clear the application of the foregoing rule for the connection of leads 2121/$s$, 2121/$t$, 2121/$u$ to the T terminals of converter K/33.

It will be remembered that Tables A, B and C (FIGURES 11, 12 and 13) give the numbers of the three T terminals on converter K/3 to which voltage is applied as a result of the dialling of any wanted number. To use these tables, one considers the last three digits of the wanted number if those three digits lie between 000 and 499 (inclusive), and if the last three digits lie between 500 and 999 one subtracts 500 from them and considers the three digits of the number remaining after such subtraction. The corresponding numbers of the T terminals are then found in one of the columns headed T in Table A, B or C. This process not only gives the numerical references for the three T terminals, but also the numerical references for the three delay lines in the channel pulse store (A/31, for example, FIGURE 25) associated with the wanted subscriber's number (and therefore, of course, associated with the wanted subscriber).

For example, if the number of the wanted subscriber is 0503, his last three digits are 503, and the subtraction of 500 from the latter number leaves the number 003. Table A shows, in the appropriate T column, that terminals T1, T6, T14 characterise this subscriber; and he is therefore associated with delay lines SDT/1, SDT/6 and SDT/14 in the channel pulse store of the multiplex to which he belongs (i.e. in channel pulse store B/31, since subscriber 0503 belongs to multiplex B, as can be seen from Table F which is given in the next section of this specification). Thus, in terms of the general rule given above, the delay lines SDT/$s$, SDT/$t$, SDT/$u$ are respectively the delay lines SDT/1, SDT/6, SDT/14; and accordingly, carrying out the said general rule, leads 2121/1, 2121/6 and 2121/14 of the channel pulse store of the multiplex to which subscriber 0503 belongs, are respectively connected to terminals T1, T6, T14 on converter K/33.

As a second example, if the number of a subscriber is 2315, the last three digits of his number are 315 and Table B shows that terminals T4, T5, T7 are associated with this subscriber. Accordingly, subscriber 2315 is associated with delay lines SDT/4, SDT/5, SDT/7, in the channel pulse store of his multiplex; and terminals T4, T5, T7 of converter K/33 are connected to leads 2121/4, 2121/5, 2121/7 of the said channel pulse store.

*MC Unit*

Figure 29:
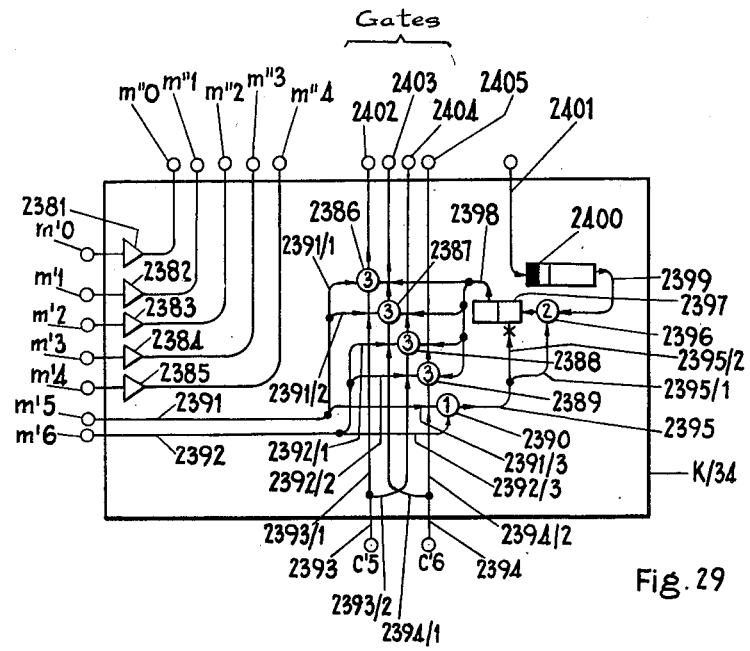

The MC unit K/34 for the present form of exchange is shown in FIGURE 29 of the accompanying drawings. It will be seen that, like MC unit K/2 for the form of exchange previously described, it is provided with terminals $m'0$, $m'1$, $m'2$, $m'3$, $m'4$, $m'5$, $m'6$, which are respectively connected (by leads not shown) to terminals $m0$, $m1$, $m2$, $m3$, $m4$, $m5$, $m6$ on every register (such as K/32) installed in the exchange. Terminals $m'0$, $m'1$, $m'2$, $m'3$, $m'4$ are respectively connected as shown to the inputs of amplifiers 2381, 2382, 2383, 2384, 2385, whose outputs are respectively connected as shown to terminals $m''0$, $m''1$, $m''2$, $m''3$, $m''4$.

Near the centre of MC unit K/34 will be seen four three-gates, 2386, 2387, 2388, 2389, and a one-gate 2390. Terminal $m'5$ is connected to lead 2391, which is connected by branch leads 2391/1, 2391/2 and 2391/3 respectively to one input of three-gate 2386, to one input of three-gate 2387, and to one input of one-gate 2390, as shown. Terminal $m'6$ is connected to lead 2392, which is connected by branch leads 2392/1, 2392/2 and 2392/3 respectively to one input of three-gate 2388, to one input of three-gate 2389, and to a second input of one-gate 2390, as shown.

Terminal $c'5$ on MC unit K/34 (which is connected, by leads not shown, to terminal $c5$ of every register installed in the exchange) is connected to lead 2393, and is thence connected by branch lead 2393/1 to the second input of three-gate 2386 and by branch lead 2393/2 to the second input of three-gate 2388. Terminal $c'6$ on MC unit K/34 (which is connected, by leads not shown, to terminal $c6$ of every register installed in the exchange) is connected to lead 2394, and is thence connected by branch lead 2394/1 to the second input of three-gate 2387 and by branch lead 2394/2 to the second input of three-gate 2389.

The output of one-gate 2390 is connected to lead 2395, to which are connected branch leads 2395/1 and 2395/2. Branch lead 2395/1 is connected to one input of two-gate 2396. Branch lead 2395/2 is connected to a re-setting input of multivibrator 2397, and (as indicated by the "$x$" on lead 2395/2) it is the trailing edge of a pulse on lead 2395/2 which re-sets multivibrator 2397 to cause it to cease to apply voltage to lead 2398. The output of two-gate 2396 is connected to the input of multivibrator 2397, causing that multivibrator to apply voltage to lead 2398. Lead 2398 is connected, as shown, to the third input of each of three-gates 2386, 2387, 2388, 2389.

The second input of two-gate 2396 is connected by lead 2399 to the output of pulse former 2400 which (like pulse formers 762 and 765 in converter K/3, FIGURE 10) is designed to give a short voltage pulse (lasting a time of the order of 5 micro-seconds) at the beginning of the application of voltage to its input lead (viz. lead 2401 in FIGURE 29), which lead 2401 is connected to terminal P on pulse generator K/1.

It will be seen that with the circuit arrangements that must have been described, when any register applies voltage to its terminal $m5$ or its terminal $m6$, one-gate 2390 applies voltage to leads 2395/1 and 2395/2. At the beginning of the next-following P pulse, pulse former 2400 applies a short voltage pulse over lead 2399 to one input of two-gate 2396, which at the same time has voltage applied to its second input by lead 2395/1 from one-gate 2390: two-gate 2396 therefore applies a voltage pulse to the input of multivibrator 2397, causing the latter to apply voltage to lead 2398 and thus to one input of each of three-gates 2386, 2387, 2388, 2389. On the ending of the application of voltage (by the register concerned) to terminal $m'5$ or $m'6$ (as the case may be), one-gate 2390 ceases to apply voltage to lead 2395/2; this cessation consitutes the trailing edge of the voltage pulse on lead 2395/2 and thus re-sets multivibrator 2397 ready to give a new output on lead 2398 when voltage is next applied to its input from two-gate 2396.

It will be seen that the output of three-gate 2386 is connected to terminal 2402, the output of three-gate 2387 is connected to terminal 2403, and the outputs of two-gates 2388 and 2389 are respectively connected to terminals 2404 and 2405. The application of voltage to one of these four terminals, in conjunction with the application of voltage to one of terminals $m''0$, $m''1$, $m''2$, $m''3$, $m''4$, permits the identification of the multiplex to which any called subscriber belongs—or, in the case where, by mistake, a number is dialled which belong to a multiplex not yet installed permits this fact to be identified and a "number-unobtainable" signal to be given to the calling subscriber. The way in which this identification is effected is as follows.

In the earlier section of this specification in which MC unit K/2 was described, it was pointed out that each of the 20 multiplexes A to T which constitute a complete exchange of 10,000 lines, is identified by two $m$ voltages (i.e. a voltage appearing on one of the set of terminals $m0$, $m1$, $m2$, $m3$, $m4$, and a voltage on one or other of the terminals $m5$, $m6$) of a register, together with the appearance of voltage on either terminal $c5$, or $c6$ of the register in question. This, of course, is true also of the form of exchange now being described; and when voltages so appear on one of terminals $m0$, $m1$, $m2$, $m3$, $m4$, they also appear (in view of the circuit arrangements described in the preceding paragraphs of the present section of this specification) on one of terminals $m''0$, $m''1$, $m''2$, $m''3$, $m''4$, on one of terminals $m'5$, $m'6$, and on one of terminals $c'5$, $c'6$. When voltages have appeared on one of terminals $m'5$, $m'6$ and on one of terminals $c'5$, $c'6$. When voltages have appeared on one of terminals $m'5$, $m'6$, and on one of terminals $c'5$, $c'6$, then, when voltage is applied (in the manner already described) on lead 2398 at the beginning of the ensuing P pulse, voltage will be applied to one of terminals 2402, 2403, 2404, 2405 by its associated three-gate (2386, 2387, 2388, 2389, respectively), as can easily be traced out from FIGURE 29. For example, if voltage be applied to terminals $m'5$ and $c'6$, voltage is applied to two inputs of three-gate 2387, and that gate applies voltage to terminal 2403 when voltage is next applied to lead 2398. The effect of any of the other possible combinations can easily be traced out from FIGURE 29; and the result of such tracing out is set out in Table F (corresponding to Table E in the description of MC unit K/2), which gives, for each of the possible 20 multiplexes, the $m''$ terminal, and the terminal belonging to the set 2402, 2403, 2404, 2405 at which voltage appears at the output of MC unit K/34, in consequence of the dialling of a number belonging to such multiplex.

TABLE F

| Multiplex | Range of subscribers' numbers. | Terminals |
|---|---|---|
| A | 0000-0499 | $m''0$, 2402 |
| B | 0500-0999 | $m''0$, 2403 |
| C | 1000-1499 | $m''1$, 2402 |
| D | 1500-1999 | $m''1$, 2403 |
| E | 2000-2499 | $m''2$, 2402 |
| F | 2500-2999 | $m''2$, 2403 |
| G | 3000-3499 | $m''3$, 2402 |
| H | 3500-3999 | $m''3$, 2403 |
| I | 4000-4499 | $m''4$, 2402 |
| J | 4500-4999 | $m''4$, 2403 |
| K | 5000-5499 | $m''0$, 2404 |
| L | 5500-5999 | $m''0$, 2405 |
| M | 6000-6499 | $m''1$, 2404 |
| N | 6500-6999 | $m''1$, 2405 |
| O | 7000-7499 | $m''2$, 2404 |
| P | 7500-7999 | $m''2$, 2405 |
| Q | 8000-8499 | $m''3$, 2404 |
| R | 8500-8999 | $m''3$, 2405 |
| S | 9000-9499 | $m''4$, 2404 |
| T | 9500-9999 | $m''4$, 2405 |

The terminals which are set out in the last column of Table F, are connected to leads on channel allotter K/30 (FIGURE 26) and to leads on the section control unit of each multiplex, in the following manners.

(i) *Connections to Channel Allotter*

It will be seen from Table F that multiplexes A, C, E, G, I, are all identified by the appearance of voltage on terminal 2402, and it will be remembered that five multiplexes are assumed to have been first installed to accommodate the first 2,500 subscribers. The first 2,500 subscribers will be connected to one or other of the five multiplexes A, C, E, G, I, and will be allotted numbers lying in the five corresponding ranges shown in Table F. These subscribers will be served by the first of interconnecting units 2138 in channel allotter K/30 to be installed, and the 2,500 subscribers served by these multiplexes are allotted numbers appropriate, as listed in Table F, to the multiplexes to which they are respectively connected. (It will be remembered that, in the description of the channel allotter, it was explained that five multiplexes are served by one interconnecting unit 2138.) The five multiplexes just enumerated have, as will be seen from Table F, the common feature that the dialling of a number on any one of them leads to the application of voltage to terminal 2402 of MC unit K/34; and terminal 2402 of MC unit K/34 is connected to lead 2209 of the first interconnecting unit 2138 of channel allotter K/30 (FIGURE 26). Accordingly, when the dialling of the number of a subscriber connected to one of multiplexes A, C, E, G, I has led to the appearance of voltage on terminal 2402, that voltage is applied via lead 2209 to one input of each of two-gates 2200 and 2204 of the said first interconnecting unit, as shown in FIGURE 26.

When further subscribers need to be accommodated on the exchange, a second interconnecting unit 2138 is installed to serve the next five multiplexes. These would be multiplexes B, D, F, H, J, which (see Table F) have the common feature that the dialling of a number of any one of them leads to the application of voltage to terminal 2403 of MC unit K/34; and terminal 2403 would accordingly be connected to lead 2209 on the second interconnecting unit 2138 to be installed. The numbers allotted to the subscribers connected to the multiplexes last enumerated are, of course, suitably chosen within the corresponding ranges shown in Table F. The exchange would then accommodate up to 5,000 subscribers in all.

When still further subscribers (up to a total of 7,500) need to be accommodated a third interconnecting unit 2138 would be installed to serve multiplexes K, M, O, Q, S (the new subscribers being, as before, allotted numbers to suit these multiplexes), and terminal 2404 would be connected to lead 2209 of the third interconnecting unit 2138; and when further subscribers (up to the full total of 10,000) need to be accommodated (who would be connected to multiplexes L, N, P, R, T), a fourth interconnecting unit 2138 would be installed, and terminal 2405 on MC unit K/34 would be connected to lead 2209 on this fourth interconnecting unit 2138. Thus it will be seen that all subscribers identified by the appearance of voltage on terminal 2402 are served by the first interconnecting unit 2138, all subscribers identified by the appearance of voltage on terminal 2403 are served by the second interconnecting unit, all subscribers identified by the appearance of voltage on terminal 2404 are served by the third interconnecting unit, and all subscribers identified by the appearance of voltage on terminal 2405 are served by the fourth interconnecting unit. This arrangement gives relative simplicity to the scheme of wiring and merely calls for the allocation of numbers to subscribers in what may appear to them to be a rather unexpected order.

For so long as only the first interconnecting unit 2138 has been installed, terminals 2406, 2407 and 2408 (which are respectively connected, as shown in FIGURE 26, to the second, third and fourth inputs of one-gate 2162 on the left-hand side of control unit 2137 in channel allotter K/30) are left unconnected as shown in FIGURE 26. (The first input to one-gate 2162 is, as will be remembered, connected to the output of one-gate 2171 at the top left-hand corner of the first interconnecting unit 2138, as shown in FIGURE 26.) When the second interconnecting unit 2138 is installed as mentioned above, the corresponding output to one-gate 2171 in the said second interconnecting unit is connected to terminal 2406 of one-gate 2162 in control unit 2137—terminals 2407 and 2408 being left still unconnected. Similarly, when the third interconnecting unit 2138 is installed, the output of one-gate 2171 in the said third interconnecting unit 2138 is connected to terminal 2407 of one-gate 2162 in control unit 2137 (terminal 2408 being left unconnected); and finally, when the fourth interconnecting unit 2138 is installed, the output of one-gate 2171 in the said fourth interconnecting unit is connected to terminal 2408 of one-gate 2162 in control unit 2137.

It is necessary next to describe the connections to one-gate 2169 which lies below one-gate 2162 in control unit 2137. It has already been mentioned, in the description of channel allotter K/30, that the first input of one-gate 2169 is connected by lead 2114 to section control unit A/30 and to every other section control unit which is installed. It is here desired to emphasise that, in the description of the exchange now being given, it is assumed that the multiplexes installed at the time of description, are the first five multiplexes to be installed, viz. multiplexes A, C, E, G, I, and therefore that lead 2114 is connected to the control units A/30, C/30, E/30, G/30, I/30 of all these said multiplexes. At this time, when only these said multiplexes have been installed, leads 2186, 2187, 2188 are respectively connected to terminals 2403, 2404, 2405 on MC unit K/34.

However, when it is desired to extend the exchange to include additional multiplexes, a second interconnecting unit 2138 is provided as described above, and the first additional multiplex is now installed. This is, of course, multiplex B (being the first of the set B, D, F, H, J already mentioned). Terminal 2187 of one-gate 2169 in control sub-unit 2137 now has its connections modified.

Now the purpose of one-gate 2169 is to ensure that a number-unobtainable signal is given to a calling subscriber if he dials a number which is either (a) unobtainable because the called subscriber is individually unobtainable although such subscriber belongs to an installed multiplex, or (b) unobtainable because the dialled number is one which belongs to a multiplex which has not yet been installed. Case (a) is, for multiplexes A, C, E, G, I (being those initially installed), dealt with by the receipt of signals on lead 2114, from the section control unit (A/30 for example) of the multiplex to which the dialled number belongs. For so long as only multiplexes A, C, E, G, I hae been installed, the dialling of a number belonging (when installed) to some other multiplex (i.e. Case (b)) will be dealt with by the receipt of one-gate 2169 of a signal from terminal 2403, 2404, 2405, as the case may be. But when multiplex B has been installed, it is necessary that if a dialled number belonging to multiplex B is individually unobtainable, it shall be dealt with individually, whereas if a dialled number belongs to any still-uninstalled multiplex, the giving of the number-unobtainable signal shall be dealt with on behalf of the multiplex and not on behalf of the individual subscriber. So far as numbers belonging to multiplexes K, M, O, Q, S are concerned, and so far as numbers belonging to multiplexes L, N, P, R, T are concerned, the giving of the number-unobtainable signal can still be dealt with by connecting terminals 2404 and 2405 on MC unit K/34 to terminals 2187 and 2188 on channel allotter K/30—since voltage appears (as shown in Table F) on terminal 2404 when a number belonging to multiplexes K, M, O, Q or S is dialled, and a voltage appears on terminal 2405 when a number belonging to multiplexes L, N, P, R, T is dialled. But the dialling of a number belonging to multiplexes B, D, F, H or J, always leads to the appearance of voltage on terminal 2403, and whereas numbers belonging to multiplex B need to be dealt with individually, numbers belonging to multiplexes D, F, H or J need to be dealt with en bloc, as regards the giving of a number-unobtainable signal. The connections between terminal 2403 on MC unit K/34, and terminal 2186 accordingly need to be modified.

Figure 30:
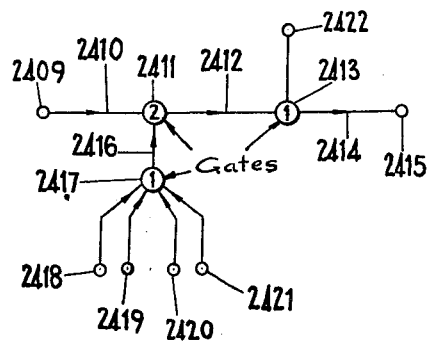

The requisite modifying circuits are shown in FIGURE 30 of the accompanying drawings, which represents an auxiliary connecting unit for use in any instance in which the last interconnecting unit 2138 of channel allotter K/30 has less than five multiplexes connected to it. It will be seen that this unit is provided with terminal 2409 connected by lead 3410 to one input of two-gate 2411 whose output is connected by lead 2412 to one input of one-gate 2413 whose output is in turn connected by lead 2414 to terminal 2415. Two-gate 2411 is provided with a second input connected by lead 2416 to the output of one-gate 2417 which is provided with four inputs respectively connected to terminals 2418, 2419, 2420, 2421 as shown. One-gate 2413 is provided with a second input connected to terminal 2422.

When the afore-mentioned state has been reached at which a second interconnecting unit 2138, and multiplex B, have been installed but multiplexes D, F, H and J have not, terminal 2186 of one-gate 2169 in channel allotter K/30 (FIGURE 26) is disconnected from terminal 2403 of MC unit K/34 (FIGURE 29) and is connected to terminal 2415 of the auxiliary unit (FIGURE 30): terminal 2403 of MC unit K/34 is now connected to terminal 2409 on the said auxiliary unit. Terminal 2422 of the auxiliary unit is connected to lead 2114 on section control unit B/30 in multiplex B (see FIGURE 24, since all section control units are identical in construction): the application of a voltage pulse on lead 2114 from section control unit B/30 accordingly applies voltage to one input of one-gate 2413 and causes this one-gate to apply voltage to lead 2414 and terminal 2415 and thus to one-gate 2169 in channel allotter K/30—resulting (as described later) in the emission of number-unobtainable signals which are individual to the subscribers connected to multiplex B. Terminal 2418 of the auxiliary unit is connected to terminal m″1 on MC unit K/34, terminal 2419 of the said auxiliary unit is connected to terminal m″2 on MC unit K/34, and terminals 2420 and 2421 on the said auxiliary unit are respectively connected to terminals m″3 and m″4 on MC unit K/34.

Now it will be seen from Table F that the dialling of a number belonging to any of multiplexes D, F, H, J (as yet uninstalled) causes voltage to be applied to terminal 2403 and to one of terminals, m″1, m″2, m″3, m″4. Accordingly, with the system of connections described in the preceding paragraph, if a number is dialled belonging to any of multiplexes D, F, H, J, voltage will be applied to terminal 2409, and to one of terminals 2418, 2419, 2420, 2421, of the auxiliary unit shown in FIGURE 30. Accordingly, two-gate 2411 will apply voltage over lead 2412 to one input of one-gate 2413, which again applies voltage via lead 2414 to terminal 2415 and thus to terminal 2186 on channel allotter K/30. The necessary number-unobtainable signal will therefore result when a number is dialled belonging to any of these four uninstalled multiplexes.

When, now, the next additional multiplex (multiplex D) comes to be installed, terminal 2422 of the auxiliary unit is now connected to lead 2114 on section control unit D/30 of the new multiplex (while still remaining connected to lead 2114 on section control unit B/30 as before), and terminal 2418 is disconnected from terminal m″1 on MC unit K/34. The effect of the latter disconnection is that a number-unobtainable signal is no longer given automatically when a number belonging to multiplex D is dialled, whilst the effect of connecting terminal 2422 to lead 2114 on section control unit D/30 is that number-unobtainable signals (in respect of multiplex D) are now individual to the subscribers connected to multiplex D.

Similarly, when the next multiplex (multiplex F) is installed, terminal 2422 of the auxiliary unit is additionally connected to lead 2114 on section control unit F/30, and terminal 2419 is disconnected from terminal m″2 on MC unit K/34. When multiplex H is installed, lead 2114 on section control unit H/30 is connected to terminal 2422 of the auxiliary unit, and terminal 2420 is disconnected from terminal m″4 on unit K/34. When the last multiplex served by the second interconnecting unit 2138 is installed, viz. multiplex J, terminal 2421 is

177 disconnected from terminal m"4 on MC unit K/34; and since the auxiliary unit has now become superfluous, the components shown in FIGURE 30 are disconnected altogether and removed, and each of the leads 2114 from the five section control units of the multiplexes served by the said second interconnecting unit 2131 is connected direct to terminal 2186 of one-gate 2169 in control sub-unit 2137 of channel allotter K/30.

The installation of any further multiplexes will call for the installation of a third interconnecting unit 2138, and the procedure adopted is exactly parallel with that described in the three preceding paragraphs. The five multiplexes to be associated with the said third interconnecting unit 2138 will be multiplexes K, M, O, Q, S—all of which are identified by the appearance of voltage on terminal 2404 of MC unit K/34 (see Table F). Terminal 2404 on MC unit K/34 is now disconnected from terminal 2187 of one-gate 2169 in channel allotter K/30 (FIGURE 26) and is connected to terminal 2409 of the auxiliary unit shown in FIGURE 30, terminal 2415 of the said auxiliary unit is connected to terminal 2187 on channel allotter K/30. The first of the new multiplexes which is now installed (viz. multiplex K) has its lead 2114 of its section control unit (see FIGURE 24) connected to terminal 2422 on the said auxiliary unit: this (as will be understood from the preceding description) permits number-unobtainable signals to be given which are individual to the subscribers connected to multiplex K. Moreover, as will be seen by reference to Table F, multiplex M is identified by the appearance of voltage on terminal m"1 of MC unit K/34, multiplex O is identified similarly by a voltage on terminal m"2, and multiplexes Q and S are respectively identified by voltage on terminal m"3 and on terminal m"4. Accordingly, terminal m"1 is now re-connected to terminal 2418 on the auxiliary unit shown in FIGURE 30, terminal m"2 is re-connected to terminal 2419 on the said unit, and terminals m"3 and m"4 are respectively connected to terminals 2420 and 2421. The dialling of any number belonging to multiplex M, O, Q, or S accordingly will still automatically result in the giving of a number-unobtainable signal.

When the next additional multiplex (multiplex M) is installed, terminal 2422 of the said auxiliary unit is additionally connected to lead 2114 on section control unit M/30, and terminal 2418 is disconnected from terminal m"1. When multiplex O is installed, terminal 2422 of the said auxiliary unit is additionally connected to lead 2114 on section control unit O/30, and terminal 2419 is disconnected from terminal m"2. When multiplex Q is installed, terminal 2422 of the said auxiliary unit is additionally connected to lead 2114 on section control unit Q/30 and terminal 2420 is disconnected from terminal m"3. When the last multiplex served by the said third interconnecting unit 2138 is installed, viz. multiplex S, terminal 2421 is disconnected from terminal m"4 on MC unit K/34, and the lead 2114 from the section control unit of each of the multiplexes K, M, O, Q, S is connected direct to terminal 2187 of one-gate 2169 in control sub-unit 2137 of channel allotter K/30.

The installation of any further multiplexes will call for the installation of the fourth (and last) interconnecting unit 2138 in channel allotter K/30, and calls for a procedure exactly parallel to that already described. Multiplexes L, N, P, R, T are all identified by the appearance of voltage on terminal 2405 of MC unit K/34 (see Table F). When multiplex L is installed, terminal 2405 is disconnected from terminal 2188 of channel allotter K/30 and is connected to terminal 2409 of the auxiliary unit shown in FIGURE 30, and terminal 2415 on the said auxiliary unit is connected to terminal 2188 on channel allotter K/30. In addition, lead 2114 of section control unit L/30 is connected to terminal 2422, while terminals m"1, m"2, m"3, m"4, are respectively connected to terminals 2418, 2419, 2420, 2421 on the said auxiliary unit.

178

When multiplex N is installed, terminal 2422 of the said auxiliary units is additionally connected to lead 2114 on section control unit N/30 and terminal 2418 is disconnected from terminal m"1. When multiplex P is installed, lead 2114 on section control unit P/30 is connected to terminal 2422 on the said auxiliary unit and terminal 2419 is disconnected from terminal m"2. When multiplex R is installed, lead 2114 on section control unit R/30 is connected to terminal 2422 and terminal 2420 is disconnected from terminal m"3. Finally, when multiplex T is installed, thus completing the full 20 multiplexes for the exchange, the said auxiliary unit is removed, and the lead 2114 from the section control unit of each of multiplexes L, N, P, R, T is connected direct to terminal 2188 on channel allotter K/30.

(ii) *Connections to Section Control Units*

The connections from channel allotter K/30 to the several section control units (A/30, B/30, and so on) have been described in the foregoing, but the connections between the section control units and MC unit K/34 have not yet been described. They are relatively simple and will now be explained.

Each multiplex is identified by the appearance of voltage on a corresponding pair of terminals, listed in Table F, of MC unit K/34. Accordingly, when each section control unit is installed, leads 2115 and 2116 (see FIGURE 24) of called subscriber testing sub-unit 2004 of that section control unit are respectively connected to that terminal of the set m"0, m"1, m"2, m"3, m"4, and to that terminal of the set 2402, 2403, 2404, 2405, which identify the multiplex to which the said section control unit belongs. Thus, for example, since multiplex A is identified by voltages on terminals m"0 and 2402, lead 2115 on section control unit A/30 is connected to terminal m"0 and lead 2116 on section control unit A/30 is connected to terminal 2402: similarly lead 2115 on section control unit C/30 is connected to terminal m"1 and lead 2116 on section control unit C/30 is connected to terminal 2402: likewise, lead 2115 on section control unit J/30 (when installed) is connected to terminal m"4 and lead 2116 on section control unit J/30 is connected to terminal 2403.

*Interconnecting Unit and Cells*

Figure 31:
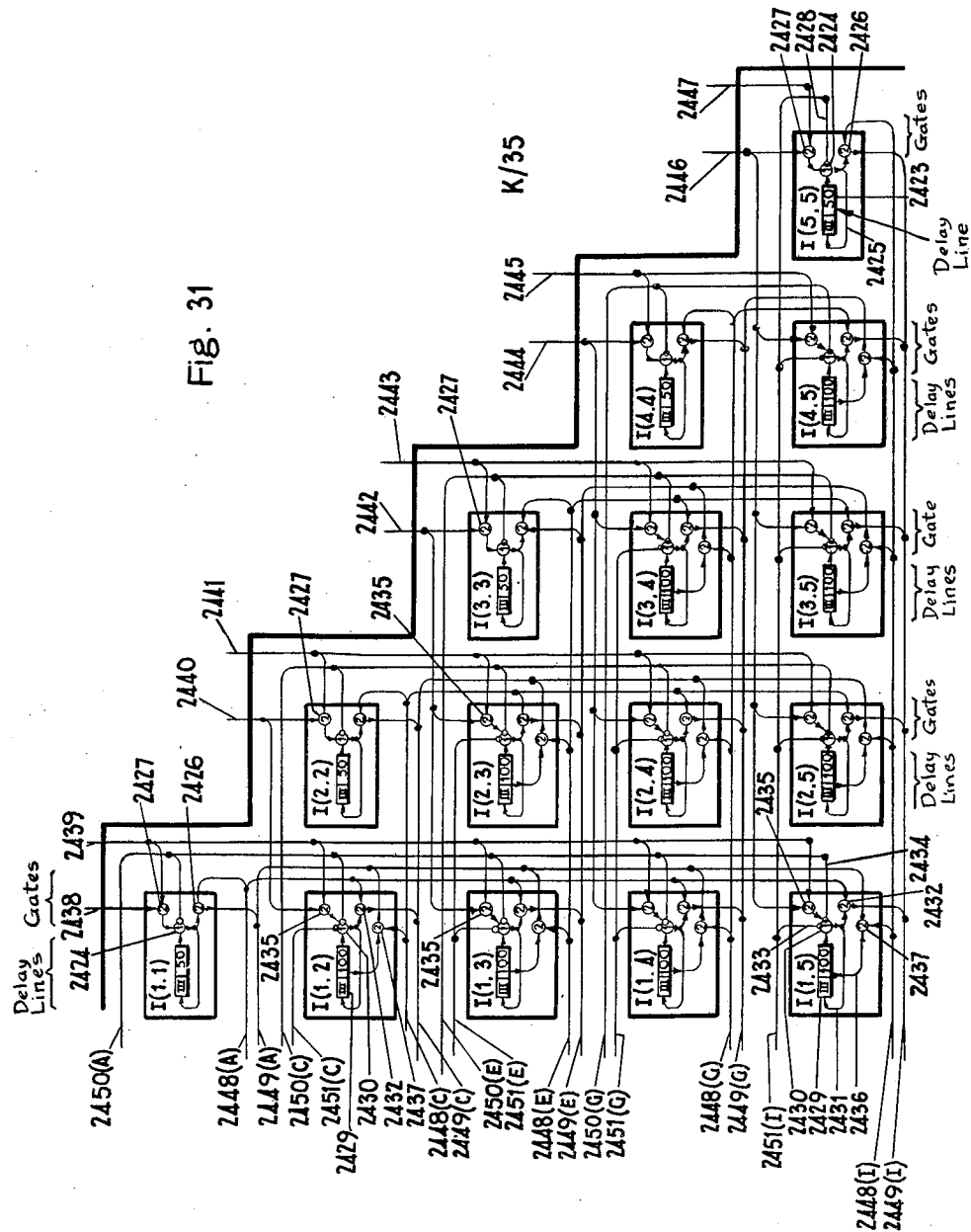

The interconnecting unit K/35 for this form of exchange is shown in FIGURE 31 of the accompanying drawings. Here again, the unit shown is that which is installed when the first five multiplexes are installed, and the manner of expanding it, when further multiplexes are installed, will be explained later. Like interconnecting units K/18, unit K/35 consists of a plurality of cells, which serve for the interconnection of one installed multiplex with some other installed multiplex; but in the present exchange, every call, even if between subscribers connected to the same multiplex, passes through an interconnecting cell: accordingly, in the present arrangement, if there are $n$ multiplexes, interconnecting unit K/35 will comprise ½$n$ ($n+1$) interconnecting cells.

For the purpose of identifying interconnecting cells already installed and specifying how additional cells are to be installed and connected up when further multiplexes are installed, it is convenient to adopt a system of referencing generally similar to that explained with reference to FIGURE 15, but supplemented by an additional cell at the top of each column, each of which top cells contains the same reference number twice (whereas, in FIGURE 15, the two reference numbers in any one cell are always different from one another). This referencing scheme for the interconnecting cells is shown in FIGURE 32 of the accompanying drawings, in which the interconnecting cells for the five multiplexes initially installed are shown in full line, whereas interconnecting cells for multiplexes to be installed later are shown in dotted line. A vertical band of cells has been shown broken away between the sixth column and the eighteenth column of cells; but the scheme of referencing will be clear—viz. every cell in the first column has "1" as its first reference number, every cell in the second column has "2" as its first reference number, and so on, whilst every cell in the first row has "1" as its second reference number, every cell in the second row has "2" as its second reference number, and so on.

Now it has already been explained, in describing the circuit connections between the channel allotter and MC unit K/34 in sub-section (i) of the foregoing section of this specification, that multiplexes are installed in the following order:

A, C, E, G, I;
B, D, F, H, J;
K, M, O, Q, S;
L, N, P, R, T.

This is reflected in the manner in which multiplexes are connected with interconnecting cells. When, as shown in the figures, only the first five multiplexes (A, C, E, G, I) have been installed, only the cells shown in full line will be installed: multiplex A is then connected to every cell in the first column (headed A), multiplex C is connected to every cell in the column headed C and to cell I(1, 2) lying in the row labelled C at the left-hand side, multiplex E is connected to every cell in the column headed E and to cells I(1, 3) and I(2, 3) in the row labelled E at the left-hand side, multiplex G is connected to every cell in the column headed G and to the three additional cells in the row labelled G at the left-hand side— and similarly for multiplex I. When the exchange needs to be extended and multiplex B is installed, all the cells lying in the row labelled B (at the left-hand side) are added to interconnecting unit K/34, every cell in the new row is connected to multiplex B, and each new cell (except the last in the row, viz. cell I(6, 6)) is also connected to the multiplex whose letter reference lies at the head of the column in which such new cell occurs—for example, new cell I(2, 6) is connected to multiplex C and new cell I(4, 6) is connected to multiplex G. Similarly, when multiplex D is installed, all the cells lying in the row labelled D (at the left-hand side) are added to interconnecting unit K/34 (the last cell in the row, I(7, 7), is shown partly broken away in FIGURE 32, as will be noticed), every cell in row D is connected to multiplex D, and each cell of the new row (except, of course, the last in the row) is connected to the multiplex whose letter reference lies at the head of the column in which such new cell occurs, (for example, new cell I(4, 7) is connected to multiplex G). This process of adding a new row of cells, connecting all new cells to the newly-installed multiplex, and connecting each new cell (except the last in the row, whose two reference numbers are the same as oneanother) to the multiplex whose letter reference stands at the head of the column in which the new cell occurs, is repeated each time an additional multiplex is installed.

The manner in which the key diagram shown in FIGURE 32 is constructed, and the rules specifying to which multiplexes each installed cell is to be connected, having been thus explained, the circuit arrangements of the cells, and the manner in which they are connected to their specified multiplexes will now be explained with reference to FIGURE 31. FIGURE 31 shows, as can be seen by comparison with FIGURE 32, all the cells which are shown in full line in FIGURE 32—the reference symbol having been written within each cell at the top left-hand corner thereof.

It will be seen that all cells which bear a pair of reference numbers which are equal to oneanother, i.e. cells I(1, 1), I(2, 2), I(3, 3), I(4, 4), I(5, 5), are identical with oneanother in their internal circuit arrangements: similarly, all cells which bear a pair of reference numbers which are not equal to oneanother (e.g. cells I(1, 2) and I(3, 5) are identical with one another in their internal circuit arrangements, though the latter circuit arrangements differ from those of cells whose pair of reference numbers are equal to oneanother.

In cell I(5, 5)—chosen as a typical cell having a pair of reference numbers which are equal to one another— there is provided a magnetostrictive delay line 2423 (delay period 50 micro-seconds) having its output connected to one input of one-gate 2424, the output of the said one-gate being connected by lead 2425 to the input of delay line 2423, as shown. The output of one-gate 2424 is also connected as shown to one input of two-gate 2426. One-gate 2424 has a second input connected to the output of two-gate 2427, and the said one-gate has also an inhibitory input connected to lead 2428.

In cell I(1, 5)—chosen as a typical cell having a pair of reference numbers which are not equal to one another—there is provided a magnetostrictive delay line 2429 (delay period 100 micro-seconds) having its output connected to one input of one-gate 2430, whose output is connected by lead 2431 to the input of delay line 2429, and whose output is also connected to one input of two-gate 2432. One-gate 2430 has two inhibitory inputs, as shown, one connected to lead 2433 and the other connected to lead 2434, and one-gate 2430 has also a second input connected to the output of two-gate 2435 as shown. Delay line 2429 is tapped, and the tap is connected by lead 2436 to one input of two-gate 2437.

Before describing the way in which these interconnecting cells are connected to other parts of the apparatus, it is perhaps well to emphasize again that the description about to be given, relates to the state of affairs when only five multiplexes have been installed (viz. multiplexes A, C, E, G, I) and when, therefore, only the first interconnecting sub-unit 2138 has been installed in channel allotter K/30. The modifications needed when further multiplexes, and therefore, further cells, are added, will be described later. (Interconnecting sub-unit 2138 should not be confused with interconnecting unit K/35; and, to prevent confusion, while preserving the descriptive names for the various units and sub-units of the exchange, the prefix "sub-" will not be omitted in the present section of this specification, and the reference "2138" or "K/35," as the case may be, will always be included.)

Now, in principle, the cells forming interconnecting unit K/35 need to have connections of three kinds with other parts of the exchange: they need—

(a) To be connected to the appropriate interconnecting sub-unit 2138;

(b) To be connected to the main co-axial cables respectively forming the output and input speech highways of the multiplexes;

(c) To be connected to the appropriate section control unit.

(a) *Connections to Interconnecting Sub-Unit 2138*

Terminal 2217 on interconnecting sub-unit 2138 of channel allotter K/30 (FIGURE 26) is connected to lead 2438 (FIGURE 31) and thus to one input of two-gate 2427 in cell I(1, 1). (It will be noted that terminal 2217 is the first output terminal associated with the upper group of five one-gates in interconnecting sub-unit 2138.) Terminal 2227 on interconnecting sub-unit 2138 is, as shown, connected by lead 2439 (FIGURE 31) to the second input of two-gate 2427, in cell I(1, 1), to one input of two-gate 2435 in cell I(1, 2), and to one input of the two-gate 2435 in every cell of the first (i.e. left-hand) column of cells. (It will be noted that terminal 2227 is the first output terminal associated with the lower group of five one-gates in interconnecting sub-unit 2138.)

Similarly, terminal 2218 (the second output terminal associated with the upper group of five-one-gates in interconnecting sub-unit 2138) is connected to lead 2440 which is connected to one input of two-gate 2247 in cell I(2, 2) (lying at the top of the second column of cells).

and to one input of two-gate 2435 in cell I(1, 2) lying in the same row (i.e. the second row) as, and to the left of, cell I(2, 2). Equally, terminal 2228 (the second output terminal associated with the lower group of five one-gates in interconnecting sub-unit 2138) is connected to lead 2441 which is connected to the second input of two-gate 2427 in cell I(2, 2), and to one input of the two-gate 2435 in every cell (cell I(2, 3), for example) lying below cell I(2, 2) in the second column of cells.

Figure 35A:
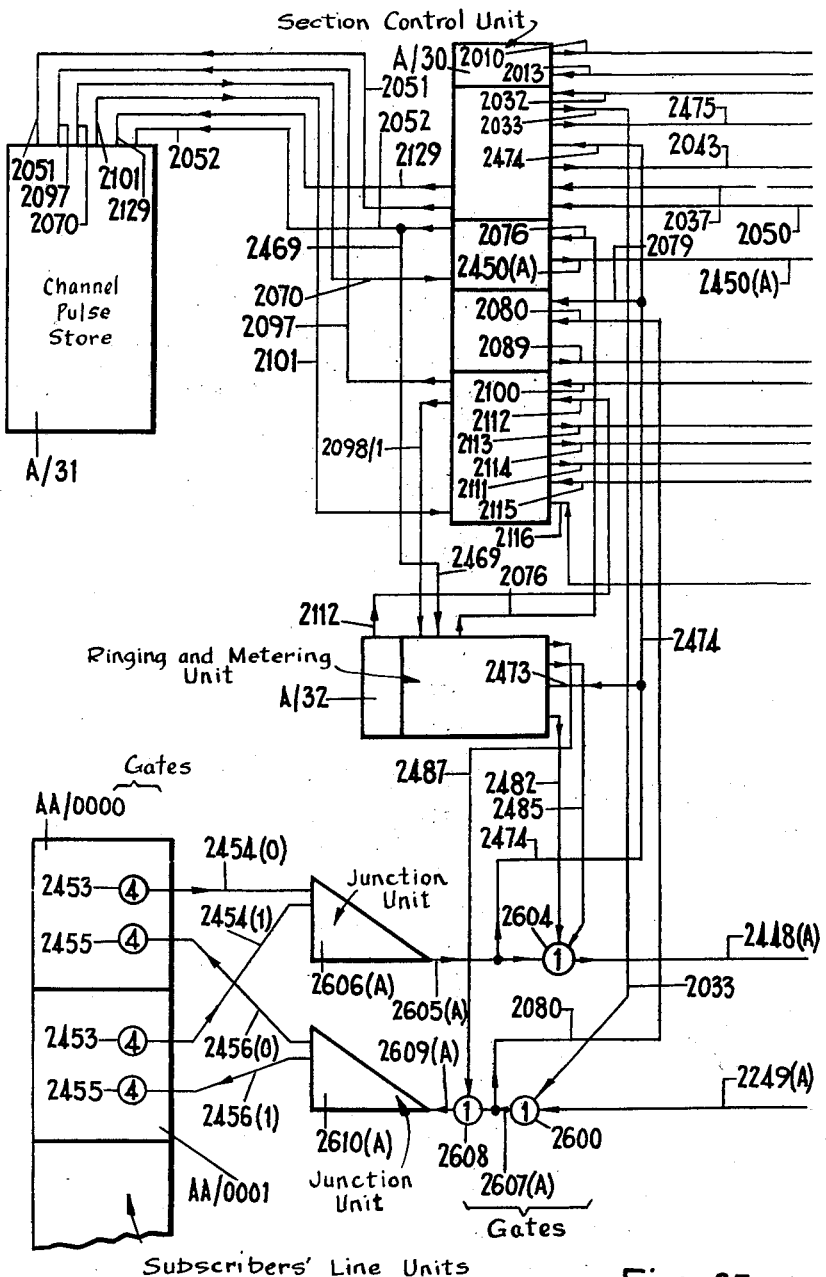
Figure 35B:
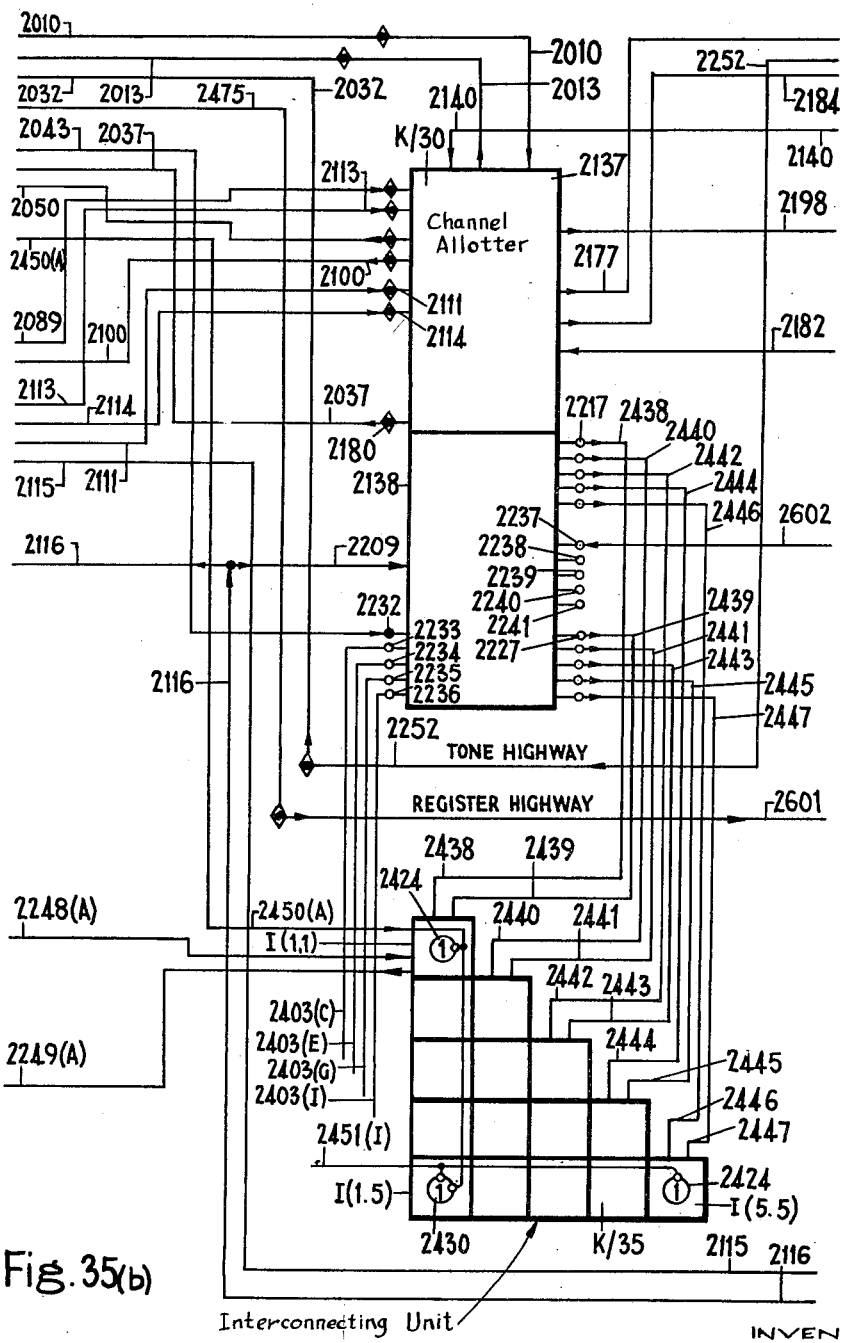
Figure 35C:
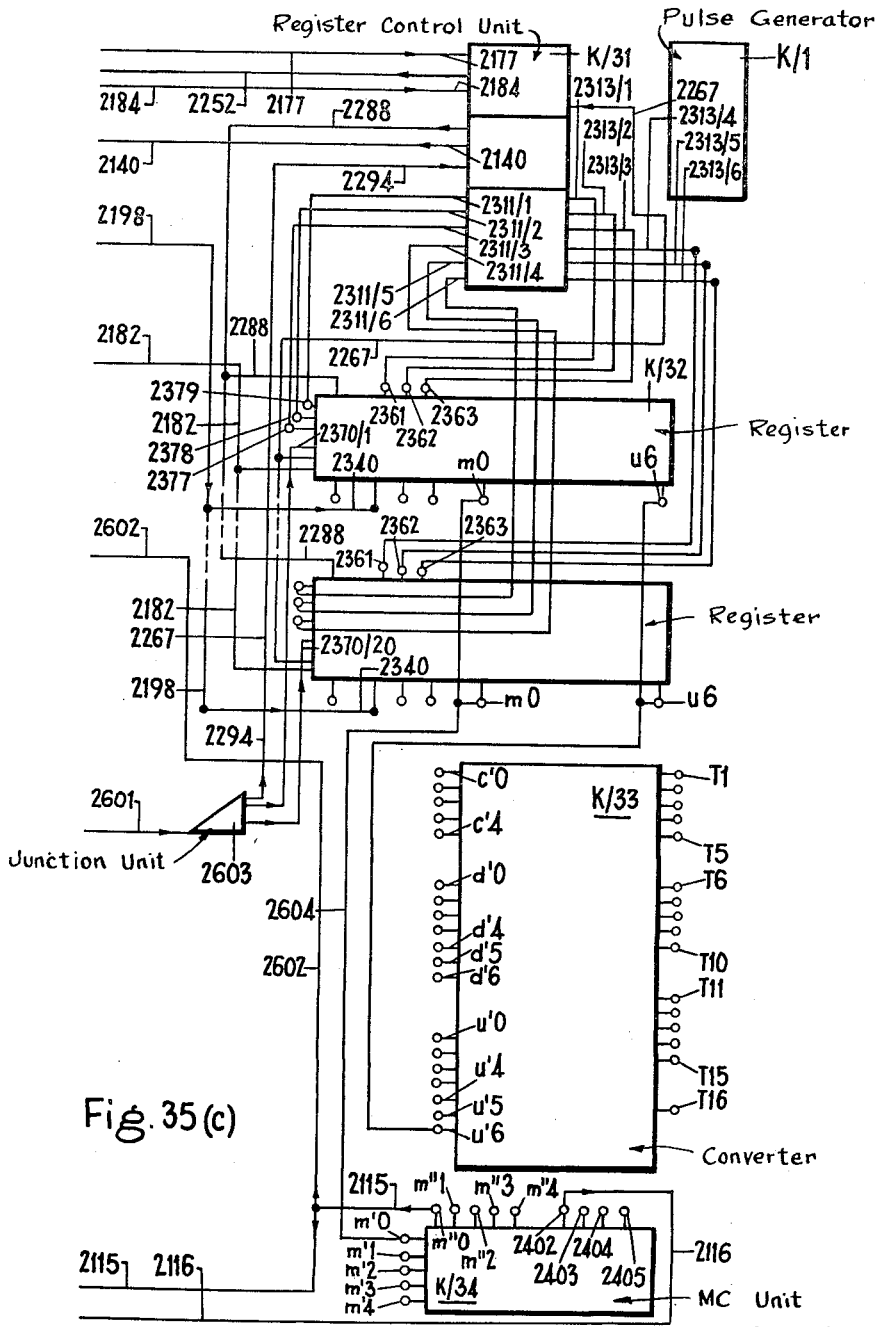

(The understanding of this systematic form of interconnection will be assisted by reference to FIGURES 35(a), 35(b), 35(c) of the accompanying. FIGURES 35(a), (b) and (c) will be described later, and it is sufficient to explain at the moment that it shows many of the main circuits for the exchange at the stage at which it is provided with the first five multiplexes, and that channel allotter K/30 will be found near the top of the central portion, FIGURE 35(b), of the said figure, while interconnecting unit K/35 will be found near the bottom of the central portion of the said figure.)

Again, terminal 2219 (the third output terminal associated with the upper group of five one-gates in interconnecting sub-unit 2138, FIGURE 26) is connected to lead 2442 (FIGURE 31) which is connected to one input of two-gate 2427 in the cell (viz. I(3, 3)) lying at the top of the third column of cells and to one input of the two-gate 2435 in every cell lying to the left of cell I(3, 3) in the third row of cells (viz. is connected to one input of two-gate 2435 in cells I(2, 3) and I(1, 3)). Terminal 2229 (the third output terminal associated with the lower group of five one-gates in interconnecting sub-unit 2138) is connected to lead 2443 which is connected to the second input of two-gate 2427 in cell I(3, 3) and to one input of the two-gate 2435 in every cell lying below cell I(3, 3) in the third column of cells.

In a precisely parallel manner, terminal 2220 (the fourth output terminal associated with the upper group of five one-gates in interconnecting sub-unit 2138) is connected to lead 2444 which is connected to one input of two-gate 2427 in the cell (viz. I(4, 4)) lying at the top of the fourth column of cells and to one input of the two-gate 2435 in every cell lying to the left of cell I(4, 4) in the fourth row of cells. And terminal 2230 (the fourth output terminal associated with the lower group of five one-gates in interconnecting sub-unit 2138) is connected to lead 2445 which is connected to the second input of two-gate 2427 in cell I(4, 4) and to one input of the two-gate 2435 in cell I(4, 5) lying below cell I(4, 4) in the fourth column of cells.

Finally (in exact parallelism, though the parallelism is partially masked by the fact that the fifth column consists of a single cell only), terminal 2221 (the fifth output terminal associated with the upper group of five one-gates in interconnecting sub-unit 2138) is connected to lead 2446 which is connected to one input of two-gate 2427 in cell I(5, 5) (which virtually lies at the top of a fifth column of cells, though that column consists of cell I(5, 5) only) and to one input of the two-gate 2435 in every cell lying to the left of cell I(5, 5) in the fifth row of cells. And terminal 2231 (the fifth output terminal associated with the lower group of five one-gates in interconnecting sub-unit 2138) is connected to lead 2447 which is connected to the second input of two-gate 2427 in cell I(5, 5)—but not, of course, as yet, to cells lying below cell I(5, 5) in the fifth column of cells, since no cells lie below cell I(5, 5) until the exchange is extended and further cells are added..

The manner in which additional cells, when installed, are connected up, will probably already have become apparent. When the next multiplex (viz. multiplex B) is installed—and, of course, the second interconnecting sub-unit 2138 is installed—the first output terminal (viz. terminal 2217) associated with the upper group of five one-gates in the second interconnecting sub-unit 2138 is connected to one input of two-gate 2247 in cell I(6, 6) and to one input of the two-gate 2435 in every cell lying to the left of cell I(6, 6) in the sixth row: the first output terminal (viz. terminal 2227) associated with the lower group of five one-gates in the second inter-connecting sub-unit 2138 is connected to the second input of two-gate 2427 in cell I(6, 6); and the second input of the two-gate 2435 in every cell lying to the left of cell I(6, 6) is respectively connected to the same lead as that to which is connected the second input of the two-gate 2435 in the cell lying immediately above it. Similar instructions apply to the connections for the rows of cells respectively installed when multiplexes D, F, H and J are installed.

When multiplex K is installed, the third interconnecting sub-unit 2138 is installed, and, of course, row K of the interconnecting cells, whose right-hand cell is referenced I(11, 11)—as will become apparent from inspection of FIGURE 32. Output terminal 2217 from the upper group of five-gates in the third interconnecting unit 2138 is connected to one input of two-gate 2427 in cell I(11, 11) and to one input of the two-gate 2435 in every cell lying to the left of cell I(11, 11) in the same row: output terminal 2227 from the lower group of five-gates in the third interconnecting sub-unit 2738 is connected to the second input to two-gate 2427 in cell I(11, 11); and the second input of the two-gate 2435 in every cell lying to the left of cell I(11,11) is respectively connected to the same lead as that to which is connected the second input of the two-gate 2435 in the cell lying immediately above it. In fact, the general rule for connecting the nth row of cells to channel allotter K/30 and to preceding rows of cells, is as follows:

The right-hand cell of the nth row will be referenced I( n, n): let the quotient obtained by dividing n by 5 be r and the remainder s: then the interconnecting sub-unit 2138 with which the cells in row n will be connected, will be the (r+1)th, and one input of two-gate 2427 in cell I(n, n) will be connected to that terminal in the (r+1)th inter-connecting unit 2138 which is given in Table G below (in dependence upon the value of remainder s), one input of the two-gate 2435 in every cell lying to the left of cell I(n, n) in the nth row being likewise connected to the said terminal given in Table G: the second input to two-gate 2427 in cell I(n, n) will be connected to that terminal in the (r+1)th inter-connecting unit 2138 which is given in Table H below (in dependence upon the value of remainder s); and the second input of the two-gate 2435 in every cell lying to the left of cell I(n, n) in the nth row, is respectively connected to the same lead as that to which is connected the second input of the two-gate 2435 in the cell lying immediately above it.

| TABLE G | | TABLE H | |
|---|---|---|---|
| Value of s | Terminal No. | Value of s | Terminal No. |
| 1 | 2217 | 1 | 2227 |
| 2 | 2218 | 2 | 2228 |
| 3 | 2219 | 3 | 2229 |
| 4 | 2220 | 4 | 2230 |
| 5 | 2221 | 5 | 2231 |

The letter reference of the nth multiplex can, of course, be derived from FIGURE 32, but, for convenience, a list for the full 20 multiplexes is given in Table I which follows:

TABLE I

| n | Multiplex reference | n | Multiplex reference | n | Multiplex reference | n | Multiplex reference |
|---|---|---|---|---|---|---|---|
| 1 | A. | 6 | B. | 11 | K. | 16 | L. |
| 2 | C. | 7 | D. | 12 | M. | 17 | N. |
| 3 | E. | 8 | F. | 13 | O. | 18 | P. |
| 4 | G. | 9 | H. | 14 | Q. | 19 | R. |
| 5 | I. | 10 | J. | 15 | S. | 20 | T. |

(b) Connections to speech highways of multiplexes

The connections to the speech highways are relatively simple to describe—and, once again, a description will first be given for the initial installation which comprises multiplexes A, C, E, G, I, with reference to FIGURE 31.

Each multiplex is provided with an output speech highway 2448 and an input speech highway 2449, to which numerical reference will be added a letter reference indicating the multiplex to which the speech highway is connected. Thus, down the left-hand side of FIGURE 31 will be found output speech highway 2448(A) and input speech highway 2449(A) which are connected to multiplex A: similarly there will be found output speech highways 2448(C), 2448(E), 2448(G) and 2448(I) which are respectively connected to multiplexes C, E, G and I; and there will likewise be found input speech highways 2449(C), 2449(E), 2449(G) and 2449(I) which are again respectively connected to multiplexes C, E, G and I. As will be seen, each pair of output and input highways runs horizontally below the cell or row of cells whose second reference number, $n$, is that given in Table I for the multiplex to which the highways are connected, and then, having passed under cell I($n$, $n$) at the right-hand end of the said row of cells, runs vertically downwards to the right of the column of cells at the head of which stands cell I($n$, $n$). (The highways running below the bottom row of cells do not, of course, turn downwards at the end of their horizontal run, since no cells lie beneath them—until further cells lying below them are installed, at which time they are continued vertically downwards as above specified.)

Each lead 2448 is, as shown, connected to one input of the two-gate 2426 in the cell I($n$, $n$) below which it runs, to one input of the two-gate 2437 in each other cell below which the said lead runs, and to one input of the two-gate 2432 in each cell lying to the left of the said lead 2448 during the vertical run of the said lead. Of course, as will be recognised from FIGURE 31, when there is no cell lying to the left of a cell I($n$, $n$)—as occurs with cell I(1, 1)—there is no two-gate 2437 to which lead 2448(A) can be connected; and when there is no cell lying below a cell I($n$, $n$)—as occurs with cell I(5, 5) in FIGURE 31—there is no two-gate 2432 to which lead 2448(I) can be connected. But once a further row or rows of cells has or have been installed, the foregoing rule that each lead 2448 is connected to each cell lying to its left during its vertical run, is reinstated for every cell lying to its left, in every column containing more than one cell: for example when the next row of cells (i.e. the row having cell I(6, 6) at its right-hand end) is added, lead 2448(A) is additionally connected to one input of two-gate 2432 in the new cell I(1,6) which will now lie in the column below cell I(1, 1).

Likewise, every lead 2449 is, as shown, connected to the second input of the two-gate 2426 in the cell I($n$, $n$) below which it runs, to one input of the two-gate 2432 in each other cell (if any) below which it runs, and to the second input of the two-gate 2437 in each cell (if any) lying to the left of the said lead 2449 during the vertical run (if any) of the said lead. When a further row or rows of cells has or have been installed, such additional connections are made to each lead 2449 as are needed to comply with the foregoing rule.

(c) Connections to section control units

It will be seen from FIGURE 31 that each column which contains more than one cell is associated with a lead referenced 2450 which lead is connected to the inhibitory input of the one-gate 2424 in the cell at the top of the respective column, and is connected to one inhibitory input (viz. the inhibitory input shown at the 3 o'clock position) of the one-gate 2430 in every other cell in the respective column. Each lead 2450 in FIGURE 31 is provided with a letter reference indicating the multiplex with which it is associated, which multiplex is that whose letter reference stands at the head (in accordance with the scheme shown in FIGURE 32) of the column of cells with which the lead 2450 is associated. Thus, for example, lead 2250(A) is associated with multiplex A, and therefore with the first column of cells shown in FIGURE 31: accordingly, lead 2450(A) is connected to the inhibitory input of one-gate 2424 in cell I(1, 1) at the head of column A, with one inhibitory input of one-gate 2430 in cell I(1, 2), and with one inhibitory input of the one-gate 2430 of every other cell in the first column of cells, as shown in FIGURE 31. When a further row or rows of cells is or are installed, lead 2450(A) is additionally connected to the corresponding inhibitory input of the one-gate 2430 of each additional cell installed in the first column. Similarly, lead 2450(C) is associated with multiplex C and with the second column of cells shown in FIGURE 31: accordingly, lead 2450(C) is connected to the inhibitory input of one-gate 2424 in cell I(2, 2) at the head of column C, and with one inhibitory input of the one-gate 2430 of every cell lying in column C below cell I(2, 2), as shown. And, by parity with lead 2450(A), when a further row or rows of cells is or are installed, lead 2450(C) is additionally connected to the corresponding inhibitory input of the one-gate 2430 of each additional cell installed in column C.

It will be clear that every other lead 2450 in FIGURE 31 is connected in a similar way; and when a further row or rows of cells is or are installed, each lead 2450 is connected to an inhibitory input of the one-gate 2430 of each additional cell lying vertically below those cells to which the said lead is already connected.

It was stated above that every column which contains more than one cell has a lead 2450 associated with it: accordingly, since cell I(5, 5) at the right-hand end of the fifth row of cells in FIGURE 31, has no cells in the column below it, no lead 2450(I) is shown in that figure. But when the exchange is extended by the installation of multiplex B and its associated row of cells, a lead 2450(I) is also installed, which is connected to the inhibitory input of one-gate 2424 of cell I(5, 5) and to one inhibitory input of one-gate 2430 in cell I(5, 6) which will then lie below cell I(5, 5).

Now just as there is a lead 2450 associated with every column containing more than one cell, so also there is a lead 2451 associated with every row containing more than one cell, i.e. with every row of cells except the first (which first row contains cell I(1, 1) only). These leads 2451 are again provided with a letter reference to indicate the multiplexes with which they are respectively associated. Thus it will be seen that lead 2451(C), which is associated with multiplex C, is associated with all cells in the second row except the right-hand cell in that row: lead 2451(E), associated with multiplex E, is associated with all cells in the third row except the right-hand cell in that row—and so on as shown in FIGURE 31. As will be seen, each lead 2451 is connected to the second inhibitory input of the one-gate 2430 of each cell of the row with which that lead 2451 is associated—but, as shown, no lead 2451 is connected to the cell at the right-hand end of the row with which it is associated, with one exception which will now be explained.

The lead 2451 associated with the last row of cells installed for the time being, is connected to the lead 2428 of the cell at the right-hand end of the said last row of cells, and thus to the inhibitory input of one-gate 2424 of the said cell at the right-hand end of the said last row. Thus since, in FIGURE 31, the fifth row of cells is the last installed row, lead 2451(I) is connected to lead 2428 in cell I(5, 5). When a further (sixth) row of cells comes to be installed (for multiplex B), lead 2451(I) is disconnected from lead 2428, and the said lead 2428 is then used for making connection to the lead 2450(I) which (as mentioned two paragraphs earlier) will then be installed. When a further multiplex (multiplex D) is installed (and with it a seventh row of cells and a lead 2450(D)), lead 2428 of cell I(6, 6) which (for so long as the sixth row was the last) had previously been connected to lead 2451(B) (in accordance with the instruction at the beginning of the present paragraph, that lead 2451 of the last installed row of cells is connected to lead 2428 in the right-hand cell of the last row for the time being) is disconnected from lead 2451(B) and connected to lead 2450(D). This process of disconnecting the lead 2428 of the right-hand cell of what was previously a last row, from the lead 2451 to which it has so far been connected, and connecting said lead 2428 to a newly-installed lead 2450, is repeated each time a new row of cells is installed.

It will be found that systematic application of the foregoing rules for the order of installing additional multiplexes and cells, and for connecting the said cells to the multiplexes, to the speech highways, and to the appropriate terminals of the several interconnecting sub-units 2138 in channel allotter K/30, when installed, will automatically result in the correct connections being provided at each stage of the growth of the exchange up to its full size. It remains, however, to specify to which leads of the several section control units the leads 2450 and 2451 are to be connected, now that the connections of these leads to the cells have been described.

Lead 2450(A) is connected, as shown in FIGURE 24, to lead 2060 of section control unit A/30 of multiplex A, and thus to the output of two-gate 2055 lying near the centre of the release control sub-unit of this section control unit. Similarly, lead 2450(C) is connected to lead 2060 of section control unit C/30, and lead 2450(E) is connected to lead 2060 of section control unit E/30— and so on, each lead 2450 being, according to its supplementary letter reference, connected to lead 2060 of the section control unit of the multiplex having the same letter reference.

Similarly, lead 2451(C) is connected to lead 2066 (and thus to the output of two-gate 2065) of section control unit C/30 (c.f. FIGURE 24), lead 2451(E) is connected to lead 2066 of section control unit E/30— and so on, each lead 2451, according to its supplementary letter reference, being connected to lead 2066 of the section control unit of the multiplex having the same letter reference.

*Subscribers Line Units*

Two of the subscribers line units for this form of exchange are shown in FIGURE 33 of the accompanying drawings. The two units chosen for illustration are line units AA/0000 and AA/0001, being the line units, respectively, for subscriber 0000 and subscriber 0001, both of whom are connected to multiplex A. Line units AA/0000 and AA/0001 are, of course, identical with one another (and with the line unit of every other subscriber) in their circuit arrangements save that, naturally, incoming line 0000 is connected to the individual instruments (hand sets, bells, and similar equipment customarily provided for each subscriber) of subscriber 0000, while incoming line 0001 is connected to the individual instruments of subscriber 0001, and the corresponding line for each other line unit is similarly connected to the individual instruments of the subscriber whom that line unit serves. Lines, such as 0000 and 0001 thus contain, like the corresponding lines in FIGURE 19, all the leads necessary for making connections to such instruments but are once again (being well known to all skilled in the telephone art) represented as single lines. Corresponding parts in line unit AA/0000 and in line unit AA/0001 are, as will be seen, given the same reference number.

Turning, then, to line unit AA/0000, it will be seen that line 0000 is connected to terminal 910 of hybrid 911—which, like other parts corresponding exactly to the similar parts in FIGURE 19, are given the same reference numbers as the respectively similar parts in FIGURE 19—and terminal 910 is likewise connected by lead 912 to ringing control unit 913, lead 912 again serving to impress on line 0000 the currents by which the bell of subscriber 0000 may be rung. (Line 912 in line unit AA/0001 of course serves to impress on line 0001 the currents needed to ring the bell of subscriber 0001; but it seems superfluous to continue to repeat, on every future occasion, the distinction that when a component in unit AA/0000 is described, the corresponding component in some other line unit carries currents destined to serve the subscriber connected to that other line unit: the distinction will in general therefore, only be mentioned when a failure to mention it would be misleading.) Terminal 910 is also connected to terminals 910/1 and 910/2 on hybrid 911, which hybrid is (as with the hybrid shown in FIGURE 19) provided with two other terminals 920 and 931 respectively. Hybrid 911 again has the circuit arrangement described with reference to FIGURE 20, and the description need not be repeated.

Terminal 920 is connected by lead 2452 to one input of four-gate 2453, whose output is connected (in line unit AA/0000) to lead 2454(0)—the parenthetical number indicating the number of the subscriber served by the lead 2454 concerned—and thus, as will be explained later, with the speech output highway of multiplex A. Similarly, the output of four-gate 2453 in line unit AA/0001 is connected to lead 2454(1) and thus again to the speech output highway of multiplex A. The general rule is, as will doubtless already have been recognised from the two foregoing examples, that output lead 2454 serving each of the subscribers in any one multiplex, is connected with the speech output highway of the multiplex to which each such subscriber belongs.

The other three inputs to four-gate 2453 in the line unit of any subscriber are respectively connected to those three leads belonging to the set 2117/1, 2117/2, 2117/3 . . . to 2117/16 which are respectively connected (via the corresponding lead 2118/1, 2118/2, 2118/3 . . . to 2118/16, respectively) with the inputs of the trio of delay lines which are associated with that subscriber in the channel pulse store of the multiplex to which that subscriber belongs. (See FIGURE 25 for the drawing of the typical channel pulse store, in which leads 2117/1 etc. and leads 2118/1 etc., will be found on the left-hand side.) The trio of delay lines associated with any subscriber can (as previously explained) be determined from Tables A, B and C, and two examples will suffice to refresh the reader's memory. If the last three digits of a subscriber's number fall in the range 000 to 499 (inclusive) the numbers of the delay lines with which he is associated are given in the appropriate column T of one of the said three tables: if the last three digits of a subscriber's number fall in the range 500 to 999 (inclusive), 500 is subtracted from his last three digits and the three delay line numbers are those given in the column T adjacent to the number resulting from such subtraction. For example, the last three digits in the number of subscriber 1245 are 245, and, from Table B, the numbers in column T adjacent to number 245 are 3, 4, 10: accordingly, subscriber 1245 is associated with delay lines SDT/3, SDT/4 and SDT/10 in the channel pulse store in his multiplex; and leads 2117/3, 2117/4 and 2117/10 in the channel pulse store in that multiplex would accordingly be respectively connected to three inputs of four-gate 2453 in the line unit of subscriber 1245 (the remaining input of the four-gate being, of course, connected to the associated lead 2452). Similarly, as a second example, the last three digits in the number of subscriber 2972 are 972, and (after subtracting 500 from those digits, since they lie in the range 500 to 999) the number resulting from the subtraction is 472: the numbers in column T of Table C adjacent to number 472 are 5, 13, 14: accordingly, subscriber 2972 is associated with delay lines SDT/5, SDT/13 and SDT/14 in the channel pulse store in his multiplex; and leads 2117/5, 2117/13 and 2117/14 in the channel pulse store in that multiplex would accordingly be respectively connected to three inputs of four-gate 2453 in the line unit of subscriber 1245. (The multiplex to which each subscriber belongs can, it will be remembered, be ascertained from Table F, which shows subscriber 1245 to belong to multiplex C, and subscriber 2972 to belong to multiplex F.)

In FIGURE 33, the line units of subscribers 0000 and 0001 are shown; and since, from Table A, subscriber 0000 is associated with the "T numbers" 1, 6, 11, and subscriber 0001 is associated with the "T numbers" 1, 6, 12, the leads shown connected to four-gate 2453 in line unit AA/0000 are 2117/1, 2117/6 and 2117/11, and the leads shown connected to four-gate 2453 in line unit AA/0001 are 2117/1, 2117/6 and 2117/12. Moreover, since subscriber 0000 and subscriber 0001 both belong to multiplex A, the said leads 2117/1, 2117/6, 2117/11 and 2117/12, are all of them leads coming from channel pulse store A/31, that being the channel pulse store in multiplex A.

Four-gate 2453, like two-gate 918 in FIGURE 19, serves to impress on the speech channel pulses it emits, modulations resulting from speech signals appearing at terminal 920, and is accordingly sometimes hereinafter referred to as the modulator gate of the line unit.

Reverting now to the other components contained in line unit AA/0000, it will be seen that, below four-gate 2453 is a second four-gate 2455 whose output is (like that of two-gate 923 in FIGURE 19) connected through widener 927, amplifier 928 and low-pass filter 923 to lead 930 and thus to terminal 931 on hybrid 911. (Here again, widener 927 and filter 929 together act as a demodulator, and gate 2455 which feeds them is sometimes referred to hereinafter as the demodulator gate of the line unit.) The other three inputs of four-gate 2455 in each subscriber's line unit are respectively connected to those three leads belonging to the set 2119/1, 2119/2, 2119/3 . . . to 2119/16 (see FIGURE 25 again) which are respectively connected with the taps on the trio of delay lines which are associated with that subscriber in the channel pulse store of the multiplex to which that subscriber belongs. In view of the very full directions and examples just given of the method of determining the trio of delay lines (and, accordingly, the trio of associated leads) associated with any one subscriber, it is unnecessary to give further examples in detail: it should be sufficient to point out that since subscriber 0000 belongs to multiplex A and is associated with delay lines SDT/1, SDT/6 and SDT/11 of the channel pulse store A/31 of that multiplex; leads 2119/1, 2119/6 and 2119/11, from channel pulse store A/31, are shown connected to three inputs of four-gate 2455 in line unit AA/0000; and similarly, since subscriber 0001 belongs to multiplex A and is associated with delay lines SDT/1, SDT/6 and SDT/12 of channel pulse store A/31, leads 2119/1, 2119/6 and 2119/12 from that channel pulse store are shown connected to three inputs of four-gate 2455 in line unit AA/0001.

The fourth input of four-gate 2455 in each line unit is connected to a lead which bears the reference 2456, together with a parenthetical number reference indicating the subscriber served by that lead 2456; and each lead 2456 is connected, as will be explained later, with the speech input highway of the multiplex to which such subscriber belongs. Thus, in line unit AA/0000 of subscriber 0000, the fourth input of four-gate 2455 is shown connected to lead 2456(0); and the fourth input of four-gate 2455 in line unit AA/0001 of subscriber 0001 is shown connected to lead 2456(1).

It will also be seen that lead 2457 is connected from the output of amplifier 928 to, firstly, lead 2458 which is connected to the input of band-pass filter 2459 whose output is connected to the input of ringing control unit 913, and, to secondly, lead 2460 which is connected to the input of band-pass filter 2461 whose output is connected to the input of meter control unit 935 (which, as in the form of exchange described previously, supplies current over the conductors in line 936 to operate a conventional metering device 937).

In the form of exchange now being described, the operations of ringing and metering are controlled by the imposition of suitable modulations (the ringing control modulations being chosen, for this exchange, to be effectively of 3.3 kc./s., and the metering control modulations being chosen to be effectively 5 kc./s.) on the pulses of the speech channel allotted to the called subscriber, this imposition of the control modulations being effected by a "ringing and metering unit," in each multiplex, which unit is described in the next section of this specification. It will suffice at this point to say that when it has been ascertained that the called subscriber is free, so that pulses of his speech channel are fed to (and start to be repeated in) his associated trio of delay lines in the channel pulse store of the multiplex to which that called subscriber belongs, a pulse of the phase of his speech channel is passed by the section control unit of his multiplex to (and starts to be repeated in) the ringing and metering unit of his multiplex. These speech channels are modulated in the said ringing and metering unit by ringing control modulations of effectively 3.33 kc./s. and applied by that unit to the input highway of the called subscriber and thus to one input of four-gate 2455 in his line unit (which will now be supposed, by way of example, to be line unit AA/0000 in FIGURE 33), from which four-gate the modulated signals pass through widener 927, amplifier 928, and leads 2457 and 2458 to the input of band-pass filter 2459, which is designed to have the mid-frequency of its pass range at 3.33 kc./s. These signals, though also applied to lead 2460 to band-pass filter 2461, are not passed by the latter since it is designed to have the mid-frequency of its pass range at 5 kc./s. The 3.33 kc./s. signals passed by filter 2439 are applied as shown in FIGURE 33 to the input of ringing control unit 913 where they trigger-off a cold-cathode tube, as set out in the earlier description of subscriber's line unit A/0000, and cause the said unit to apply ringing current to lead 912 and thus cause the bell of subscriber 0000 to be rung (it being assumed that subscriber 0000 is the called subscriber in this example, as already implied).

When the called subscriber lifts his receiver, the anode of diode 943 in hybrid 911 (see FIGURE 20) is, as in the previously described exchange, raised to a mean voltage great enough for the said diode to conduct, and the mean potential of terminal 920 of hybrid 911 rises to about +5 volts (as in the previous description); and this change in the bias on modulator gate 2453 in the called subscriber's line unit renders the said gate capable of giving an output—in the same way that modulator two-gate 918 in FIGURE 19 was rendered capable of giving an output when the bias on its input from terminal 920 was changed. Accordingly, pulses of the called subscriber's speech channel are now applied (on the continuing assumption that the called subscriber is subscriber 0000, by way of example) to the output speech highway of his multiplex (by lead 2454(0), in the assumed example) and are thence applied to the ringing and metering unit of his multiplex, in which unit the said pulses now synchronise with the pulses already being repeated in that unit. When the next Z pulse is emitted by pulse generator K/1, it is applied to all ringing and metering units in the exchange; and in that unit in which the aforementioned synchronised pulses are occurring, their synchronised existence during a Z pulse has the effect that a pulse (synchronous with one pair of the synchronised pulses aforementioned) is applied to (and starts to be repeated in) a second delay line in the ringing and metering unit concerned, and the repetition of the speech channel pulses which had previously been going on in the said unit is suppressed.

The suppressed pulses (which were those which were modulated with the 3.33 kc./s. ringing control signal) are therefore no longer applied to the input speech highway of the called subscriber, and are therefore no longer applied by his four-gate 2455 to lead 2457 in his line unit; and the 3.33 kc./s. control signal is therefore no longer applied to ringing control unit 913 in the called subscriber's line unit. The called subscriber's bell therefore ceases to ring when he lifts his receiver.

But, as mentioned above, pulses are now being repeated in a second delay line in the ringing and metering unit of the called subscriber's multiplex. These pulses are repeated at intervals of 200 micro-seconds, so that they effectively form a pulse train with a train repetition interval of 100 micro-seconds which has been heavily modulated with a control signal of 5 kc./s.; and they are arranged to be applied to the output speech highway of the called subscriber's multiplex and thence (after passing through the appropriate interconnecting cell) to re-appear on the input speech highway of the calling subscriber in the phase of the pulses of his speech channel on that highway. These heavily modulated pulses are therefore applied to one input of four-gate 2455 in the calling subscriber's line unit. For the purposes of an example, it will now be supposed that the calling subscriber is subscriber 0001; and it will accordingly be seen from FIGURE 33 that these heavily modulated pulses are applied by lead 2456(1) to four-gate 2455 in line unit AA/0001 and are thence applied via widener 927 and amplifier 928 to lead 2457 in the said line unit. Since the pulses on lead 2457 are characterised by the modulation frequency of 5 kc./s., they will not pass through band-pass filter 2459, but do pass via lead 2460 to band-pass filter 2461 (whose pass band is centered at 5 kc./s. as already explained), from which the resulting 5 kc./s. control current is passed to meter control unit 935 where (in the manner described in connection with unit 935 in the description of FIGURE 19), it triggers off a cold-cathode tube and thus causes metering device 937 to record that a successful call has been made.

*Ringing and Metering Unit*

The ringing and metering unit used in each multiplex of the exchange now being described, is shown in FIGURE 34 and is, as a unit, referenced A/32, as though belonging to multiplex A, though identical units B/32, C/32 and so on, would be respectively used in the corresponding other mutliplexes of the exchange. In addition to containing, in its right-hand section (referenced 2462) the equipment (referred to in the preceding description of the subscribers line units) for controlling the signals which cause the ringing of an individual subscriber's bell and the operation of an individual subscriber's meter, unit A/32 also contains, in its left-hand section (referenced 2463) the equipment needed to permit number-unobtainable signals to be given (when needed) which are individual to the several subscribers connected to the multiplex to which the ringing and metering unit belongs.

As will be seen from FIGURE 34, right-hand section 2462 is provided with a magnetostrictive delay line 2464 (delay period 100 micro-seconds) whose output is connected by lead 2465 to one input of one-gate 2466. The output of one-gate 2466 is connected to lead 2467, as shown, and thus (i) via branch lead 2467/1 to the input of delay line 2464, (ii) via branch lead 2467/2 to one input of two-gate 2468, and (iii) to lead 2076 which is connected to one input of two-gate 2073 in the release control sub-unit of the section control unit (see FIGURE 24) of the multiplex to which the ringing and metering unit belongs. One-gate 2466 has a second input connected to lead 2098/1 and thus to the output of two-gate 2099 in the called subscriber testing sub-unit of the section control unit of the multiplex to which the ringing and metering unit belongs.

One-gate 2466 also has two inhibitory inputs: one is connected to lead 2469 which is connected to lead 2052 and thus to the output of one-gate 2035 in release control sub-unit in the section control unit of the multiplex to which the ringing and metering unit belongs: the other inhibitory input is connected by lead 2470 to the output of two-gate 2471.

One input of two-gate 2471 is connected to lead 2472, which is connected to terminal Z on pulse generator K/1. The second input of two-gate 2471 is connected, as shown, to lead 2473 which, as shown in FIGURE 35(a), is connected to lead 2474, one end of which is connected (see FIGURE 24) to one input of two-gate 2028 (in busy register channel store sub-unit of the section control unit of the multiplex to which the ringing and metering unit belongs), the output of two-gate 2028 being connected by lead 2475 to the register highway of the exchange. (Lead 2474 also has connected to it lead 2079 to clipper 2075 in busy channel store sub-unit of the section control unit to which the ringing and metering unit belongs, which lead 2079 is shown in FIGURES 24 and 35(a); and the other end of lead 2474 is connected to the speech output highway of the multiplex to which the ringing and metering unit belongs, as will be further explained later in connection with FIGURE 35.)

Lead 2473 is also connected, as shown, to one input of three-gate 2476, which has a second input connected by lead 3477 to terminal Z of pulse generator K/1, and a third input connected to lead 2478 and thus to lead 2465 and the output of delay line 2464. The output of three-gate 2476 is connected as shown to one input of one-gate 2479, the output of which is shown connected to lead 2480, which is connected to magnetostrictive delay line 2481 (delay period 200 micro-seconds) whose output is connected to a second input of one-gate 2479. Lead 2480 is connected to lead 2482, which is connected (as described later in connection with FIGURE 35) to the output speech highway of the multiplex to which the ringing and metering unit belongs. One-gate 2479 is also provided with an inhibitory input connected by lead 2483 with terminal X on pulse generator K/1.

Reverting to two-gate 2468: it has already been remarked that one of its inputs is connected to load 2467/2; and its second input is connected by lead 2484 to a voltage source which, when speech channel pulses are applied on load 2467/2, so modulates them that the voltage at the output of two-gate 2468 (which is connected by lead 2485 to the output speech highway of the multiplex to which the ringing and metering unit belongs) causes the relevant calling subscriber to hear the usual ringing tone. (The relevant calling subscriber is, of course, that subscriber who initiated the call which led, in due course, to the emission of modulated speech channel pulses on lead 2485. The manner of interconnection between the ringing and metering unit concerned, and the relevant calling subscriber, will be explained later.)

It will also be seen from FIGURE 34 that delay line 2464 is tapped, and the tap is connected by lead 2486 to one input of two-gate 2487, whose output is connected by lead 2488 with the input speech highway of the multiplex to which the ringing and metering unit belongs. The second input of two-gate 2487 is connected by lead 2489 to a voltage source generating ringing control signals having a frequency of 3.33 kc./s., so that when speech channel pulses are applied to two-gate 2847 by lead 2846, they are re-emitted by gate 2847 modulated at 3.33 kc./s. by the ringing control signals.

It is now possible to describe in detail the manner in which ringing and metering operations, which were briefly outlined in the preceding section of this specification, are carried out. If a called subscriber is free, pulses of his speech channel appear on lead 2098/1 (from called subscriber testing sub-unit, see FIGURE 24, in the channel pulse store of the multiplex to which the called subscriber belongs) and are thus applied to one input of one-gate 2466 in the ringing and metering unit of the multiplex to which the called subscriber belongs. They are then repeated in delay line 2464 and one-gate 2466 at 100 micro-second intervals, as will be obvious from the several descriptions already given of pulse-repeating circuits of this kind. These pulses in delay line 2464 are applied by lead 2486 (from the tap on the said delay line) to one input of two-gate 2487, where they are modulated by the 3.33 kc./s. ringing control signals applied on lead 2489, and the pulses so modulated are emitted on lead 2488. (It will be noted that the modulated pulses so emitted are, since they are derived from the tap on delay line 2464, delayed by 50 micro-seconds as compared with the pulses on lead 2098/1, and are now accordingly of the phase of the speech channel to be used by the calling subscriber.) The modulated pulses emitted on lead 2488 are applied by it to the input speech highway of the called subscriber's multiplex and thus appear on lead 2456 to his demodulator gate 2455 (see FIGURE 33); and they are then applied to cause the called subscriber's bell to be rung in the way already described in the preceding section of this specification. (It may be noted that the said modulated pulses applied to the input speech highway of the called subscriber's multiplex, are also applied from that highway to the lead 2456 and demodulator gate 2455 of every subscriber belonging to the called subscriber's multiplex; but only at the gate 2455 of the called subscriber do the said modulated pulses synchronise with the pulses which are being applied to the other three inputs of gate 2455, and therefore it is only the called subscriber's gate 2455 which passes on those pulses so that they may cause his bell to be rung.)

It will also be seen from FIGURE 34 that pulses applied to the input of delay line 2464 are at the same time applied to two-gate 2463, which has a modulating voltage applied to its second input by lead 2484, and as already mentioned, therefore now emits to lead 2485 speech channel pulses modulated by ringing tone. These speech channel pulses are (as already mentioned) applied to the output speech highway of the multiplex to which the ringing and metering unit belongs, and are accordingly passed through the appropriate interconnecting cell to the input speech highway of the calling subscriber. They are accordingly applied from that highway to lead 2456 and demodulator gate 2455 in the line unit (FIGURE 33) of the calling subscriber, whence the said pulses (modulated with ringing tone) are transmitted through widener 927, amplifier 928 and low-pass filter 2461 (during which transmission they are demodulated), and accordingly passed via lead 930, hybrid 911 and the calling subscriber's line (for example, line 0001) to the calling subscriber's instrument, so that he hears the sound of ringing tone.

Now it was also explained in the preceding section of this specification, that when the called subscriber lifts his instrument, his bell is caused to stop ringing, the supply of ringing tone to the calling subscriber is interrupted, and the calling subscriber's meter is operated to record the fact that a successful call has been made. These operations are effected as follows:

When the called subscriber lifts his instrument, pulses of his speech channel are applied (as explained in the earlier description of FIGURE 33) to his lead 2454 and thus to the output speech highway of his multiplex. They are therefore applied, as explained above in connection with FIGURE 34, on lead 2473 and are therefore applied to one input of two-gate 2471 and one input of three-gate 2476. When the next Z pulse is omitted by pulse generator K/1, it is applied by lead 2472 to the second input of two-gate 2471 and by lead 2477 to the second input of three-gate 2476. Accordingly when, after the start of a Z pulse, the next of the said speech channel pulses is applied to two-gate 2472 and three-gate 2476, two-gate 2472 has voltages on both its inputs and applies a corresponding voltage pulse to lead 2470; and three-gate 2476 is receiving voltages on all three of its inputs because, at the same time that a speech channel pulse is applied to this three-gate from lead 2473, a synchronous pulse is applied to the said three-gate by leads 2465 and 2478 from the output of delay line 2464. Accordingly, two-gate 2471 and three-gate 2476 simultaneously each apply a voltage pulse to their respective outputs.

The pulse from two-gate 2471 is applied by lead 2470 to one of the inhibitory inputs of one-gate 2464 and accordingly suppresses the further repetition, in delay line 2464, of pulses of the speech channel now being considered. Two-gates 2487 and 2468 therefore cease to give an output and therefore respectively stop (as already explained in the preceding section of this specification) the ringing of the called subcriber's bell and the sound of ringing tone in the calling subscriber's instrument.

The pulse from three-gate 2476 is applied to one input of one-gate 2479, and is thence fed to delay line 2481 and is accordingly repeated at intervals of 200 microseconds. Each time a pulse repeatedly appears at the output of delay line 2481, it is re-applied to one-gate 2479 and is not only thence fed to the input of delay line 2481 but also to lead 2482—which latter lead is, a mentioned above, connected to the output speech highway of the multiplex to which the ringing and metering unit belongs, and is therefore transmitted, via the appropriate interconnecting cell, on the input speech highway of the multiplex to which the calling subscriber belongs. The pulses on lead 2482 (which are, as previously mentioned, effectively pulses of 100 micro-seconds train repetition interval heavily modulated by a 5 kc./s. signal), are applied, from the input speech highway of the multiplex to which the calling subscriber belongs, to the lead 2456 (FIGURE 33) of all the subscribers belonging to that multiplex; but it is only in the line unit of the calling subscriber that pulses of the speech channel now concerned are being applied to the other three inputs of four-gate 2455. Accordingly, it is only in the line unit of the calling subscriber that four-gate 2455 gives an output, and only, therefore, the calling subscriber's meter that is actuated in the way already described in connection with FIGURE 33.

It will have been noted that when pulses cease (as above described) to be repeated in delay line 2464, they cease to be applied to the third input of three-gate 2477; and three-gate 2477 therefore passes only one pulse (during the course of the operations now being described) to one-gate 2479. Therefore, when the next X pulse occurs and is applied by lead 2483 to the inhibitory input to one-gate 2479, the said X pulse suppresses the further repetition of pulses (for the time being) in delay line 2481 and on lead 2482—thus cutting off the further supply of 5 kc./s. control signals to unit 935 in the line unit of the calling subscriber. The metering operation has, therefore, been completed for the time being, and the pulses have been suppressed in delay line 2481 as well as in delay line 2464.

It may be also here noted that when pulses were suppressed, as above described, in delay line 2464, they ceased to be applied to lead 2076 and thus ceased to be applied to one input of two-gate 2073 as mentioned above in the description of the leads to which lead 2467 is connected.

The mode of operation of the right-hand section (2462) of the ringing and metering unit having thus been described, the left-hand section (2463) will now be described. As will be seen in FIGURE 34, this left-hand section is provided with 16 bus-bars such as 2490. Each of these bus-bars is continuous horizontally across the left-hand section of the figure, but is shown "broken" to indicate that each is made long enough for up to (say) 60 connections to be made to it ad hoc if a considerable number of the subscribers belonging to any one multiplex are "unobtainable" at any one time. Each bus-bar is shown provided at its left-hand end with a terminal, these terminals being serially numbered 2491/1, 2491/2, 2491/3 . . . to 2491/16—though only some of the said terminals are actually referenced in the figure, to avoid obscuring it. These terminals 2491/1, 2491/2, 2491/3 . . . to 2491/16 are respectively connected to terminals T1, T2, T3 . . . to T16 on converter K/33.

If a subscriber having a number belonging to the multiplex to which the ringing and metering unit belongs, is "unobtainable" (for example, because there is, for the time being, no subscriber of that number connected to the said multiplex), section 2463 is used to provide for the giving of a number-unobtainable signal, if a calling subscriber dials the number of the said unobtainable subscriber, in the following way.

As already explained, each subscriber belonging to a multiplex is associated with three delay lines in the channel pulse store of the multiplex to which he belongs and with three T terminals on converter K/33. Once again using the symbolism explained in the description given above of converter K/33, if the number of an unobtainable subscriber is such that he is associated with delay lines SDT$s$, SDT$t$, SDT$u$ in the channel pulse store of the multiplex to which he belongs, he will be associated with terminals T$s$, T$t$, T$u$ on converter K/33; and to cause a number-unobtainable signal to be given when the number of that unobtainable subscriber is dialled, a three-gate is brought into use and its three inputs are respectively connected to bus-bars 2491/$s$, 2491/$t$, 2491/$u$. Two examples of such three-gates are shown in FIGURE 34, it having been supposed, for the purposes of the example, that the subscriber associated with delay lines SDT/3, SDT/5 and SDT/8, and the subscriber associated with delay lines SDT/11, SDT/12 and SDT/14, are both unobtainable. Accordingly, three-gate 2492 has its three inputs connected by leads 2493/1, 2493/2, 2493/3 to bus-bars 2491/3, 2491/5, 2491/8 respectively (to deal with calls to the first of the said unobtainable subscribers), and three-gate 2494 has its three inputs connected by leads 2495/1, 2495/2, 2495/3 to bus-bars 2491/11, 2491/12, 2491/14 respectively (to deal with calls to the second of the said unobtainable subscribers). The output of three-gate 2492 is connected by lead 2496 to one input of one-gate 2497; and the output of three-gate 2494 is connected by lead 2498 to another input of one-gate 2497. The output of one-gate 2497 is connected to lead 2112, and thus to the negatory input of two-gate 2107 and to one input of two-gate 2108, both of which two-gates will be found in the called subscriber testing sub-unit of the section control unit (FIGURE 24) of the multiplex to which the ringing and metering unit belongs.

One-gate 2497 may on occasion need a large number of inputs (if a considerable number of subscribers happen to be unobtainable at the same time); but since this gate can use silicon or cheap selenium diodes, additional inputs can readily be added, if necessary, by maintenance staff when installing the necessary three-gates. (The necessary instructions for the circuit arrangement of such a one-gate having a large number of inputs are given later in this specification, with reference to FIGURE 42—each additional input merely involving the provision of an additional rectifier and its leads, as there explained.)

The effect of the provision of these three-gates and the associated circuits, will probably be obvious. When, for example, the unobtainable number associated with delay lines SDT/3, SDT/5, SDT/8, is dialled, voltage appears on terminals T3, T5, T8 of converter K/33 and is therefore applied to bus-bars 2491/3, 2491/5 and 2491/8 and therefore to the three inputs of three-gate 2492, which accordingly applies voltage to the input of one-gate 2497 which in turn applies voltage to lead 2112. The way in which this leads to the giving of number-unobtainable tone to the calling subscriber is described later in this specification. Similarly, the dialling of the unobtainable number associated with delay lines SDT/11, SDT/12, SDT/14, results in the appearance of voltage on terminals T11, T12, T14 of converter K/33 and thus in the application of voltage to the three inputs of three-gate 2494 and, in consequence, to the appearance of voltage on lead 2112.

*Speech, Register, and Tone Highways, and General Arrangement*

The general arrangement of the main interconnections (other than connections from pulse generator K/1 to converter K/33, from converter K/33 to channel pulse stores and ringing and metering units in multiplexes, and between channel pulse stores and subscribers line units) between the units forming the initial installation of the present form of exchange (viz. the installation which comprises 5 multiplexes of 500 subscribers each) is shown in FIGURES 35($a$), 35($b$) and 35($c$) of the accompanying drawing, these together constituting a single diagram of which FIGURE 35($a$) is the left-hand portion, FIGURE 35($b$) the central portion, and FIGURE 35($c$) the right-hand portion. It will be seen, however, that only the units forming multiplex A are represented in FIGURE 35, multiplexes C, E, G, I (which consist of units similar to those of multiplex A and are installed at the same time as multiplex A) being not shown, since they are similar to multiplex A and the connections to be made to them have been specified in detail in the course of describing this form of exchange. It will be found in FIGURE 35($b$) that certain terminals, and certain leads, are provided with a symbol consisting of a lozenge having a central dot, this symbol indicating that such terminals and leads are connected to each of multiplexes C, E, G, I in the same manner that they are respectively connected to multiplex A—the use of this symbol making it possible to avoid obscuring FIGURE 35 by an undue multiplicity of leads. (Attention will be drawn to this symbol on the first occasion when it occurs but not, in general, on subsequent occasions.)

Figure 36:
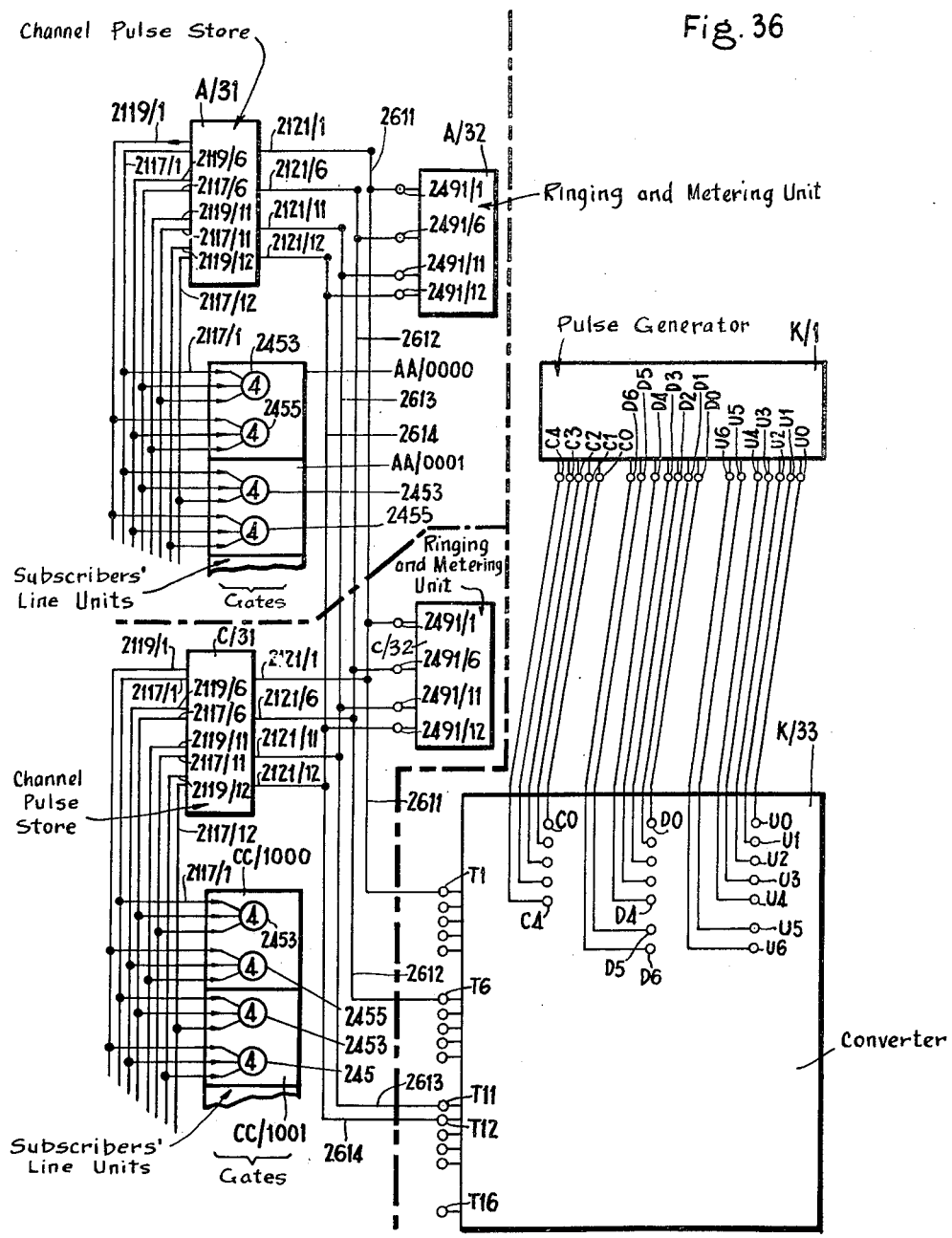

FIGURE 36 of the accompanying drawings shows typical connections between pulse generator K/1 and converter K/33, between converter K/33 and channel pulse stores A/31 and C/31 (respectively) and ringing and metering units A/32 and C/32 (respectively), and between the channel pulse store and the subscribers line units in each of multiplexes A and C.

The common equipment for the exchange is shown in FIGURES 35($b$) and 35($c$), and the equipment for multiplex A is shown in FIGURE 35($a$).

At the top right-hand corner of FIGURE 35($c$), pulse generator K/1 is represented by a rectangle, but neither the terminals of this pulse generator nor the leads connecting it to other parts of the equipment are shown, since straightforward connections are all that is needed, and as the connections to be made have already been stated in the course of the preceding description the showing of the additional leads would confuse rather than assist the reader. To the left of pulse generator K/1, will be found register control unit K/31; and to the left of the latter unit (approximately on the centre-line of FIGURE 35($b$)) lies channel allotter K/30.

Below register control unit K/31 will be found the first and last of the twenty identical registers K/32 initially installed, and below the registers lie converter K/33 and MC unit K/34. Below channel allotter K/30 in FIGURE 35($b$) is shown interconnecting unit K/35 (which, since at present only 5 multiplexes have been installed, is shown as comprising 15 interconnecting cells only).

In the equipment for multiplex A, channel pulse store A/31 for multiplex A will be found near the top left-hand corner of FIGURE 35($a$); and to its right lies section control unit A/30, while below the latter lies ringing and metering unit A/32, for multiplex A. Two of the 500 subscribers line units for multiplex A (i.e. one line unit for each subscriber belonging to the multiplex) are shown below channel pulse store A/31 and respectively referenced AA/0000 and AA/0001.

Turning next to the interconnections, it will be seen that leads 2051, 2097, 2070, 2101 2129 and 2052, interconnecting channel pulse store A/31 with section control unit A/30, are marked, as also is lead 2469, which is shown connected (as set out in the course of the description of FIGURE 34) to lead 2052, the point at which leads 2052 and 2469 are connected being shown just to the left of the left-hand side of section control unit A/30. Issuing from the lowest section (i.e. called subscriber testing sub-unit 2004, as referenced in FIGURE 24) of section control unit A/30 will also be found lead 2098/1, which is connected to ringing and metering unit A/32 (FIGURE 34).

On the right-hand side of section control unit A/30, there will be found the following leads, taking them in order from top to bottom of the said unit:

(i) Lead 2010, by which section control unit A/30 sends to channel allotter K/30 a signal demanding a free register channel pulse when such a pulse is needed by multiplex A: as shown by the lozenge symbol, lead 2010 is also connected similarly to every other section control unit (units C/30, E/30, G/30, I/30) of the first five installed multiplexes; and lead 2010 will (since it is connected to control sub-unit 2137 of the channel allotter, which control sub-unit serves every multiplex when installed) in due course be connected similarly to every other section control unit as additional multiplexes are installed.

(ii) Lead 2013, which is likewise connected to control sub-unit 2137 of channel allotter K/30, and which serves to convey a free register channel pulse (if one is available) to the section control unit: it will again be seen that the said lead 2013 is similarly connected to the section control unit of each of the other four multiplexes which are initially installed; and the said lead is likewise connected similarly to the section control unit of every additional multiplex that is installed.

(iii) Lead 2032, which is connected to tone highway 2252 and thus to tone sub-unit 2242 of register control unit K/31: tone highway 2252 is similarly connected to the other four of the multiplexes initially installed; and, since the said tone sub-unit is common to the whole of the exchange, tone highway 2252 will in due course be similarly connected to the section control unit of every other multiplex as it is installed.

(iv) Lead 2033, which is connected to one-gate 2600 (which, as described below, is connected with the input speech highway of the multiplex to which the section control unit belongs—there being, of course, a similar connection between every other section control unit and the input speech highway of the multiplex to which such section control unit belongs).

(v) Lead 2475, which (as incidentally mentioned in the description of ringing and metering unit A/32) connects the output of two-gate 2028 in section control unit A/30 to the register highway (now referenced in FIGURE 35 as 2601) of the exchange—there being a corresponding lead 2475 belonging to the section control unit of every installed multiplex, and each such lead 2475 being connected to register highway 2601.

(vi) Lead 2474, which is connected to the output speech highway of the multiplex to which the section control unit belongs—there being a similar connection between every other section control unit and the output speech highway of the multiplex to which such section control unit belongs.

(vii) Lead 2043, which is connected to terminal 2232 on the first control sub-unit 2138 of channel allotter K/30: similarly, terminal 2233 on the said first control sub-unit 2138 is connected to lead 2043 from section control unit C/30 of multiplex C, and terminals 2234, 2235, 2236 of first control sub-unit 2138 are connected, respectively, to the lead 2043 from each of the other section control units of the other three multiplexes that are initially installed (viz. multiplexes E, G and I)—these last four leads 2043 being respectively referenced 2043(C), 2043(E), 2043(G), 2043(I) in FIGURE 35: the method of connecting up the leads 2043 from the section control unit of each further multiplex, when installed, will be explained at the end of the present account of the leads connected to section control unit A/30. (The appearance of a signal on the lead 2043 connected to any multiplex, indicates to the channel allotter which multiplex it is to which a calling subscriber belongs, and causes, as will be seen from FIGURE 26, voltage to be applied to the appropriate input of composite gate 2206 in the interconnecting sub-unit 2138 which serves that multiplex, and thus, in due course, resulting in the application of voltage to the input of the appropriate one of one-gates 2222, 2223, 2224, 2225, 2226, and therefore to the appropriate lead 2227, 2228, 2229, 2230, or 2231 and thence to interconnecting unit K/35 on the appropriate one of leads 2439, 2441, 2443, 2445, 2447—which latter leads are shown in FIGURE 35.)

(viii) Lead 2037 is connected to terminal 2180 on channel allotter K/30—to which terminal, as will be seen, is connected lead 2037 from the section control unit of the other four multiplexes initially installed, and to which said terminal will be connected lead 2037 from the section control unit of every other multiplex as it is installed: every pulse of every register channel from time to time in use in the exchange is applied to the said terminal 2180.

(ix) Lead 2050 is connected to the tap on delay line 2189 in control unit 2137 of channel allotter K/30 (see FIGURE 26), as is lead 2050 from the other four multiplexes that are initially installed and the lead 2050 from every other multiplex which is later installed.

(x) Lead 2076 is connected (as shown in FIGURE 34) to the input of one-gate 2466 in the ringing and metering unit of the multiplex to which the section control unit belongs.

(xi) Lead 2450(A) is connected to interconnecting unit K/35: the method of connecting this lead, and the corresponding lead of other section control units, to interconnecting unit K/35, has already been explained in detail in the course of describing the said interconnecting unit.

(xii) Lead 2079 is shown connected to lead 2474.

(xiii) Lead 2080 is connected to clipper 2078 from the output of one-gate 2600 mentioned above and thus with the input speech highway of the multiplex to which the section control unit belongs.

(xiv) Lead 2089 from busy channel store sub-unit in each installed multiplex (and in each subsequently installed multiplex) is connected to channel allotter K/30; and it will thus be seen (on referring back to FIGURE 26) that every pulse in use in every multiplex from time to time is applied to the negatory input of six-gate 2139, and to the negatory input of three-gate 2154, in control sub-unit 2137 of channel allotter K/30.

(xv) Lead 2100 is connected to the output of one-gate 2160 in control sub-unit 2137 of channel allotter K/30, as is the lead 2100 from each other section control unit of the other four multiplexes initially installed, and the lead 2100 from each additional section control unit as installed: (it may perhaps be convenient to mention at this point that leads 2050 and 2100, being connected the one to the tap on delay line 2189 and the other to the output of one-gate 2160, convey to every section control unit every pulse from time to time being repeated in delay line 2180 (the pulses on leads 2050 and 2100 having a phase difference of 50 channels), that is to say, the said leads convey to every section control unit all the pulses of every speech channel in use by every calling and called subscriber—each section control unit then "accepting" (i.e. passing through the respective two-gates to which leads 2050 and 2100 are connected) those pulses whose phases correspond with the speech channels that have been allotted to the section control unit concerned).

(xvi) Lead 2112 is connected to the left-hand section (2463) of the ringing and metering unit of the multiplex to which the section control unit belongs.

(xvii) Lead 2113 is connected to one input of two-gate 2153 in control sub-unit 2137 of channel allotter K/30, as is the lead 2113 of every other of the originally-installed multiplexes and of every multiplex subsequently installed—a signal on lead 2113 indicating that a called subscriber (belong to the multiplex on whose lead 2113 the signal appears) is free.

(xviii) Lead 2114 is connected to one-gate 2169 in control sub-unit 2137 of channel allotter K/30, as is the lead 2114 of every other of the five section control units first to be installed; and the manner of connecting each section control unit of later-installed multiplexes to one-gate 2169 has already been explained in the course of describing MC unit K/34 and need not be repeated here.

(xix) Lead 2111 is connected to one-gate 2157 in control sub-unit 2137 of channel allotter K/30, as is lead 2111 of every section control unit when installed, and serves to give a signal when a called subscriber (belonging to the multiplex from whose section control unit the lead 2111 has received a signal) is busy.

(xx) Lead 2115 and 2116 are respectively shown as connected to terminals m″0 and 2402 of MC unit K/34: since no other multiplex than multiplex A has been shown in FIGURE 35, these leads 2115 and 2116 are the only pair shown connecting MC unit K/34 to a section-control unit, but they are entirely typical and will make the interconnections clear in the light of the complete instructions contained in the sub-section (ii) of the section of this specification dealing with MC unit K/34: it is also stated, at the beginning of the sub-section (i) of the description of MC unit K/34, that lead 2209 of the first interconnecting sub-unit 2138 of channel allotter K/30 is connected to terminal 2402 of MC unit K/34, and the latter connection is shown in FIGURE 35 as being effected by connecting lead 2209 to lead 2116—general instructions for connecting up the lead 2209 of each interconnecting sub-unit 2138 (when installed) being contained in the said sub-section (i).

It was stated above that, at the end of the foregoing description of leads connected to section control unit A/30, it would be explained how to connect the lead 2043 from each additional section control unit belonging to each additional, newly-installed multiplex. The explanation is as follows.

It will be remembered from the description of MC unit K/34, that it was explained that when it is desired to install further multiplexes in addition to the original five, a second interconnecting sub-unit 2138 is added to channel allotter K/30. The next five multiplexes to be installed are, in order, multiplexes B, D, F, H, J, these being served by the said second interconnecting sub-unit. Accordingly, lead 2043 from section control unit B/30 of multiplex B is connected to terminal 2232 of the said second interconnecting sub-unit, lead 2043 from section control unit D/30 of multiplex D is connected to terminal 2233 of the said second interconnecting sub-unit, and leads 2043 respectively connected to section control units F/30, H/30, J/30, are respectively connected in turn to terminals 2234, 2235, 2236 of the said second interconnecting sub-unit 2138 by which they are served. Likewise, when a third interconnecting sub-unit 2138 is installed to serve five further multiplexes (as described in connection with MC unit K/34), the lead 2043 from the section control unit of each such multiplex is connected, in order of installation, with terminal 2232, 2233, 2234, 2235, 2236 of the interconnecting sub-unit 2138 by which such further multiplexes are served. The same procedure is followed each time a further interconnecting sub-unit 2138 (and the multiplexes associated with it) is installed.

The foregoing having thus dealt with leads shown in FIGURE 35 which are connected to the left-hand side of channel allotter K/30, it is convenient to deal with those of the remaining leads which, shown connected elsewhere to the channel allotter, have not yet been dealt with.

The remaining lead (lead 2140) shown at the top of channel allotter K/30 connects the output of one-gate 2293 (in register control section 2243 of register control unit K/31, see FIGURE 27) to the negatory input of six-gate 2130 in channel allotter K/30 which is shown connected to the said six-gate at the 12 o'clock position. Lead 2140 applies to the said negatory input of six-gate 2139 every pulse occurring in every busy register channel from time to time in use in register control unit K/31.

Lead 2198 (i.e. the uppermost lead shown in FIGURE (35b) as connected to the right-hand side of channel allotter K/30), is for so long as the state of affairs shown in FIGURE 35 endures (viz. for so long as only the initial 20 registers have been installed) connected as shown to lead 2340 of each of the said 20 registers. The way in which the connection to lead 2198 is altered (and the connection to be made to lead 2196 of channel allotter K/30), when additional registers are installed, has already been exlained earlier in this specification in the section dealing with register K/32. (A connection to the said lead 2196 is, of course, not shown in FIGURE 35, since that figure shows the state of the interconnections at the time when only 5 multiplexes and 20 registers have been installed.)

Lead 2177 is connected from the output of two-gate 2168 in control sub-unit 2137 of channel allotter K/30 (FIGURE 26) to the input of one-gate 2245 in tone sub-unit 2242 of register control unit K/31 (FIGURE 27). If a called subscriber is busy, channel allotter K/30 emits on lead 2177 a pulse of the phase of the register channel being used by the calling subscriber, and this pulse, applied to one-gate 2245, causes the said pulse to be repeated in delay line 2246 in tone sub-unit 2242 (as will be clear from the circuits shown in FIGURE 27, in view of the many previous descriptions of pulse-repeating circuits of this design); and the said pulse is then applied by lead 2247 from the tap on delay line 2247 to two-gate 2248 whence, modulated by busy tone applied to two-gate 2248 by lead 2249, it is emitted on lead 2250 to one-gate 2251 and thence to lead 2252, which (as already mentioned) is the tone highway of the exchange (and is the next lead, below lead 2177, shown issuing from the left-hand side of register control unit K/31 in FIGURE 35(c).

In FIGURE 35(b), the next lead issuing from the right-hand side of channel allotter K/30, is lead 2184 which is connected to the output of two-gate 2183 in control sub-unit 2137 (FIGURE 26) and to one input of one-gate 2257 in tone sub-unit 2242 of register control unit K/31 (FIGURE 27). Reference has already been made to one-gate 2169 in channel allotter K/30 (see reference (xviii) above, in connection with lead 2114 and the explanation of the connections to gate 2169 given earlier in sub-section (i) of the description of MC unit K/34), and it will have been appreciated that one-gate 2169 gives an output pulse when it is necessary that a number-unobtainable signal should be sent to a calling subscriber. It will be seen from FIGURE 26 that the output of one-gate 2169 is applied to one input of two-gate 2183, to whose second input pulses of the phase of the calling subscriber's register channel (which are repeated in delay line 2181 in the said control sub-unit 2137) are being applied by one-gate 2176 which is associated with delay line 2181; and accordingly, on receiving an input from one-gate 2169, two-gate 2183 emits on lead 2184 pulses of the phase of the calling subscriber's allotted register channel and those pulses are applied to one-gate 2257 aforementioned in register control unit K/31 and therefore start to be repeated in delay line 2256 (see FIGURE 27). Pulses undergoing repetition in delay line 2256 are, as will be seen from FIGURE 27, applied from the tap on delay line 2256 to one input of two-gate 2253 to whose other input number-unobtainable tone is being applied by lead 2255. Two-gate 2253 accordingly re-emits the said pulses modulated with number-unobtainable tone and applies them to one-input of one-gate 2251 and thus to tone highway 2252.

It has already been mentioned that tone highway 2252 is connected to the lead 2032 of section control unit A/30 and to the section control unit of every other installed multiplex. In the circumstances mentioned in the two last-preceding paragraphs, therefore, register channel pulses modulated with busy tone, or with number-unobtainable tone, are, as the case may be, applied to the section control unit of every installed multiplex, and are effective in that section control unit which belongs to the multiplex to which is connected the calling subscriber using the said register channel.

The next lead (working downwards) shown entering the right-hand side of channel allotter K/30 in FIGURE 35(b), is lead 2182, which (as already stated towards the end of the description of the registers) is connected to the output of the two-gate 2345 of every register. Lead 2182 is accordingly shown, in FIGURES 35(b) and (c), as connected to each of the two representative registers illustrated in that figure.

As already mentioned, since only the first five multiplexes are deemed to have been installed at the stage shown in FIGURE 35, only the first interconnecting sub-unit 2138 is shown in that figure as being incorporated in channel allotter K/30. On the right-hand side of the said interconnecting sub-unit 2138, will be seen leads 2438, 2440, 2442, 2444, 2446, and leads 2439, 2441, 2443, 2445, 2447, whose mode of connection to interconnecting unit K/35 has already been described in sub-section (a) of the section of this specification which describes interconnecting unit K/35 (in which sub-section reference has already been made to this FIGURE 35).

FIGURE 35(b) also shows, on the right-hand side of first interconnecting sub-unit 2138 of channel alloter K/30, the five terminals 2237, 2238, 2239, 2240, 2241—the connection of which terminals to MC unit K/34 has so far been deferred pending the description of the present figure. Terminal 2237 is, as shown, connected to terminal $m''0$ on MC unit K/34, the connection being shown as effected, in this instance, by connecting lead 2602 to lead 2115, which latter lead is connected to terminal $m''0$. Terminals 2238, 2239, 2240, 2241 are respectively connected, by leads not shown (to avoid unhelpful congestion of the figure) to terminals $m''1, m''2, m''3, m''4$, respectively, of MC unit K/34. When each additional interconnecting sub-unit 2138 of channel alloter K/30 is installed, terminals 2237, 2238, 2239, 2240, 2241 of the said additional sub-unit, are respectively connected to terminals $m''0, m''1, m''2, m''3, m''4$, of MC unit K/34.

Turning now to register control unit K/31, of the leads seen in FIGURE 35(c) as entering or leaving its left-hand side, leads 2177, 2252, 2184, 2140 have already been mentioned in the course of the foregoing description of FIGURE 35. Lead 2288, which is connected to the output of four-gate 2287 in control section 2243 of register control unit K/31, is connected to one input of the five-gate 2353 in every register installed in the exchange (see FIGURE 28).

The function of five-gate 2353 is that of assisting in selecting which register shall handle a call when a calling subscriber demands that a register shall be allotted to him. It does so in the following way. Terminal 2371 and terminal 2372 have, as will be remembered, applied to them a C pulse and a D pulse from pulse generator K/1, and terminal 2373 has applied to it a D5 pulse (or a D6 pulse, when there are more than 20 registers) from channel allotter K/30. The trio of pulses applied to each register is different; and since pulse generator K/1 is successively emitting different combinations of C and D pulses, the fact that the trio of pulses is different for each register, has the result that each register will (in some order determined by the order in which the various trios of pulses are emitted) be given the opportunity of handling a call which a calling subscriber at that time desires to make. If at the time when a trio of pulses is applied to any one register, that register is not handling a call for some other subscriber, five-gate 2353 will not have voltage applied to its negatory input from slow-release device 2350; and accordingly, the appearance of a pulse on lead 2288 (which pulse will be of the phase of the register channel allotted to the calling subscriber) will cause five-gate 2353 to emit a pulse of the said phase. The emission of the pulse last mentioned causes it to be applied to one-gate 2364 and thus to slow-release device 2350, which, as already described in the course of the description of the registers, starts to apply voltage to lead 2349/2 and thus, inter alia, to the negatory input of five-gate 2353 in the register now under consideration, so preventing the said register from accepting new register channel pulses (from another calling subscriber) until the said register has completed the handling of the call to which it has now been allocated.

(If the register now under consideration had been already engaged in handling a call during the time when the aforementioned trio of pulses were being applied to terminals 2371, 2372, 2373, there would, as will be appreciated from the description in the preceding paragraph, have been a voltage applied to the negatory input of five-gate 2353, and that five-gate could not then have re-emitted the pulse applied to it by lead 2288. In that event, the calling subscriber would have waited a further fraction of a second until some free register had been tested by some other trio of pulses, when such free register would have performed the operations described in the preceding paragraph and thus been allocated to the subscriber trying to make a call.)

A register having been allocated to the calling subscriber as described in the last paragraph but one, the said pulse emitted by one-gate 2364 is also applied by lead 2375 to device 2376 and thus, as described in the description of the registers, to the three delay lines in register control unit K/31 that are associated with the allocated register. As will be seen from FIGURE 27, the applied pulse traverses the three delay lines in question, re-appearing after a delay of 100 micro-seconds at the appropriate three of leads 2313/1, 2313/2, 2313/3 . . . (see description of registers for details) and being thus applied to terminals 2361, 2362, 2363 of the allocated register, see FIGURE 28. As will appear from the figure last mentioned, these pulses (which are applied synchronously by terminals 2361, 2362, 2363 to three-gate 2356) cause the latter to emit a pulse (of the phase of the register channel allotted to the calling subscriber) which is applied to the second input of one-gate 2364 already mentioned, and thus re-applied to the inputs of the three associated delay lines. Pulses of the allotted register channel accordingly continue to be repeated in the three associated delay lines until the register in question has completed its functions in setting up the desired call or is released for some other reason.

In FIGURE 35, it is assumed that only six delay lines have been initially installed in register control unit K/31, so that, as set out in the description of the said unit, the first register is associated with delay lines RRD1, RRD2, RRD3, while the last (i.e. the twentieth, on this assumption) register is associated with delay lines RRD4, RRD5, RRD6. Accordingly, in accordance with the prescriptions given in the description of the registers, the upper register is shown as having its terminals 2361, 2362, 2363, respectively, connected to leads 2313/1, 2313/2, 2313/3 (shown on the right of register control unit K/31), while the lower register shown in FIGURE 35 (being the twentieth) has its terminals 2361, 2362, 2363, respectively, connected to leads 2313/4, 2313/5, 2313/6. Similarly, in accordance with the prescriptions given in the descriptions of the registers, leads 2311/1, 2311/2, 2311/3 (on the left of register control unit K/31) are shown respectively connected to terminals 2377, 2378, 2379 of the first register, while leads 2311/4, 2311/5, 2311/6 are shown respectively connected to the corresponding terminals (viz. 2377, 2378, 2379, not referenced in FIGURE 35) of the twentieth register.

Coming now to the remaining lead (viz. lead 2267) shown connected to the right-hand side of register control unit K/31, this lead is, as will be seen from FIGURE 27, connected to an inhibitory input on one-gate 2266 in tone sub-unit 2242 of unit K/31 and to the output (see FIGURE 28) of two-gate 2366 of every register. Now it was explained above that delay line 2265, in FIGURE 27, repeats pulses of the phase of the register channel allocated to a calling subscriber and causes dialling tone to be emitted to that subscriber. It will now be appreciated, on referring back to the third paragraph from the end of the description of the registers, that when a calling subscriber dials the first digit of the wanted number (causing voltage to be applied, as there described, via leads 2501 and 2500 from stage 1 of counter 2316 to two-gate 2366 and thus to lead 2267, the application of voltage by lead 2267 to the inhibitory input of one-gate 2226 in register control unit K/31 suppresses the circulation of pulses in delay line 2265 and thus stops the supply of dial tone to the calling subscriber.

The other lead shown in FIGURE 35(c) as connected to register control unit K/31, but to which reference has not yet been made in connection with that figure, is lead 2294 shown on the left of the said unit. Lead 2294 is connected to clipper 2291 in control section 2243 of register control unit K/31 (see FIGURE 27) and is at its other end connected as shown in FIGURE 35(c) to register highway junction unit 2603. Junction unit 2603 is constructed on exactly the same principle as junction unit 1070, save that, instead of having to feed 500 leads to the 500 subscribers line units belonging to a multiplex (and lead 1075, as shown in FIGURE 23), it has only (even when all registers have been installed in the exchange now being described) to feed 50 lines each connected to one register (and lead 2294). Accordingly, register highway 2601 is connected to the input of a first-stage amplifier, whose output is connected to the input of each of ten second-stage amplifiers, the output of each of which is connected to five registers—any one of the said second stage amplifiers also having lead 2294 connected to its output. When only the first twenty registers have been installed, each said second-stage amplifier may have only two registers connected to it, or only four second-stage amplifiers (each supplying five registers, and any one having lead 2294 connected to it) may be initially installed (further second-stage amplifiers being installed when needed), according to which alternative is more convenient in the local circumstances of the exchange.

It was mentioned in the description of the registers, that lead 2370/1 from the first register, lead 2370/2 from the second register, lead 2370/3 from the third register, and so on, are each connected to register highway 2601. It will doubtless have been realised, in the course of the preceding paragraph, that these said leads 2370 are connected (in groups of five, or two) to the outputs of the said ten (or four, according to whether ten or only four are initially installed) second-stage amplifiers. Accordingly, in FIGURE 35(c), the representative leads 2370/1 and 2370/20 are shown connected to register highway junction unit 2603.

Each register such as K/32 has, as will be remembered, twenty-eight output terminals, $m0$, $m1$, $m2$, $m3$, $m4$, $m5$, $m6$, $c0$, $c1$, $c2$, $c3$, $c4$, $c5$, $c6$, $d0$, $d1$, $d2$, $d3$, $d4$, $d5$, $d6$, $u0$, $u1$, $u2$, $u3$, $u4$, $u5$, $u6$. Of these, only the first and the last terminals, $m0$ and $u6$, on each of the registers shown in FIGURE 35(c), are there illustrated; and terminal $m0$ on the rst register and terminal $m0$ on the last register are shown connected by lead 2604 to terminal $m'0$ on MC unit K/34, while terminal $u6$ on the first register and terminal $u6$ on the last register, are shown connected by lead 2605 to terminal $u'6$ on converter K/33. The remaining terminals $m1$, $m2$, $m3$, $m4$, $m5$, $m6$, of each installed register, are connected respectively to terminals $m'1$, $m'2$, $m'3$, $m'4$, $m'5$, $m'6$ on MC unit K/34 (by leads not shown in FIGURE 35) in the way set out in the foregoing description of MC unit K/34; and terminals $c0$, $c1$, ... to $u5$ of each installed register are respectively connected to terminals $c'0$, $c'1$ ... to $u'5$ of converter K/33 (by leads not shown in FIGURE 35) in the way set out in the foregoing description of converter K/33.

Most of the leads shown in FIGURE 35(b) connected to interconnecting unit K/35 have already been mentioned—the leads already mentioned being those connecting unit K/35 with channel allotter K/30, and lead 2450(A) from section control unit A/30. Lead 2451(I), which is connected to section control unit I/30 (not shown) of the multiplex I (which, it will be remembered, is the last of the five multiplexes initially installed), is also shown in FIGURE 35(b)—lead 2451(I) being connected to lead 2066 of section control unit I/30, as will be remembered from the detailed instructions given in connection with FIGURE 31. By way of typical illustrations of the said instructions, lead 2450(A) is, in FIGURE 35(b), shown connected to the inhibitory input of one-gate 2424 in cell I(1, 1) and to one inhibitory input of one-gate 2430 in cell I(1, 5) while lead 2451(I) is, in FIGURE 35(b), shown connected to the other inhibitory input of one-gate 2430 in cell I(1, 5) and to the inhibitory input of one-gate 2424 in cell I(5, 5).

The manner of connecting the speech highways of each multiplex has been described in detail in subsection (b) of the description of interconnecting unit K/35. By way of typical examples, output speech highway 2448(A), and input speech highway 2449(A), are shown in FIGURE 35(b) as connected to cell I(1, 1) of interconnecting unit K/35.

Output speech highway 2448(A) is, in FIGURE 35(a), shown connected to the output of one-gate 2604 which has three inputs, one connected to lead 2485 from the output of two-gate 2484 in ringing and metering unit A/32, one connected to lead 2482 from the output of one-gate 2479 in ringing and metering unit A/32 (see FIGURE 34), and the third connected to co-axial cable 2605(A)—which in effect forms an extension of output speech highway 2448(A). It will be noted from FIGURE 35(a) that lead 2474 (whose connections have already been described), is connected to cable 2605(A).

Cable 2605(A) is connected to the output of output speech highway junction unit 2606(A), there being, of course, a similar junction unit, similarly connected, for every installed multiplex. Junction unit 2606(A) is of exactly the same construction as junction unit 1071 described in connection with FIGURE 23 and need not, therefore, be described again. To junction 2606(A) are connected lead 2454(0) from subscribers line unit AA/0000, lead 2454(1) from subscribers line unit AA/0001, and the corresponding lead 2454 from every subscriber's line unit belonging to this multiplex, as described in connection with FIGURE 33.

Speech input highway 2449(A) is, as shown in FIGURE 35(a), connected to one input of one-gate 2600 (already mentioned) to whose other input lead 2033 has already been described as connected. The output of one-gate 2600 is connected to co-axial cable 2607(A), to which is connected lead 2080 already mentioned; and cable 2607(A) is connected to one input of one-gate 2608, whose other input is connected to lead 2487 already mentioned. The output of one-gate 2608 is, as shown, connected by lead 2609(A) (which should again be co-axial cable if of any length, but normally need not be, since one-gates 2600 and 2608 will usually be so mounted that lead 2609(A) is too short for co-axial cable to be necessary) to the input of input speech highway junction unit 2610(A), there being, of course, a similar junction unit, similarly connected, for every installed multiplex. Junction unit 2610(A) is of exactly the same construction as junction unit 1070 described in connection with FIGURE 23 (save that no lead such as lead 1075 is connected to junction unit 2610(A)) and need not be described again. To junction unit 2610(A) are connected lead 2456(0) to subscribers line unit AA/0000, lead 2456(1) to subscribers line unit AA/0001, and the corresponding lead 2456 to every subscribers line unit belonging to this multiplex, as described in connection with FIGURE 33.

Turning now to FIGURE 36, it will be seen that, as has already been remarked, it shows certain of the connections to two of the five multiplexes originally installed, the connections to these two multiplexes being typical of the corresponding connections to all of the multiplexes.

It will be seen that FIGURE 36 is divided into a right-hand portion and a left-hand portion by a chain-dotted line which runs vertically for most of its course, and the common equipment is shown to the right, viz. pulse generator K/1 lying in the upper part of the right-hand portion, and converter K/33 lying in the lower part of the right-hand portion. The left-hand portion of the figure is divided into an upper part and a lower part by a chain-dotted line which runs horizontally for most of its course, equipment belonging to multiplex A being shown in the part above the chain-dotted line last-mentioned, and equipment belonging to multiplex C being shown in the part below.

Terminals C0, C1, C2, C3, C4, D0, D1, D2, D3, D4, D5, D6, U0, U1, U2, U3, U4, U5, U6 are shown on pulse generator K/1 (though it will be noted that, to avoid crossing of leads, the order in which these terminals are shown is not the same as the order in which they appear on the diagram of the said pulse generator given in FIGURE 2). The said terminals are shown respectively connected to the corresponding terminals C0 to C4, D0 to D6, U0 to U6 of converter K/33 (cf. FIGURE 10).

In multiplex A there are shown channel pulse store A/31, ringing and metering unit A/32, and typical subscribers line units AA/0000, AA/0001, respectively serving subscribers 0000 and 0001, these being the first two subscribers belonging to multiplex A. Similarly, in multiplex C there are shown channel pulse store C/31, ringing and metering unit C/32, and typical subscribers line units CC/1000 and CC/1001, respectively serving subscribers 1000 and 1001, these being the first two subscribers belonging to multiplex C (cf. Table F in the description of MC unit K/34 above). In each subscribers line unit there is shown modulator gate 2453 and demodulator gate 2455.

As has been several times explained already, a subscriber the last three digits of whose number are 000 is identified by voltages appearing on terminals T1, T6, T11 of converter K/33, while a subscriber the last three digits of whose number are 001 is identified by voltages appearing on terminals T1, T6, T12. Accordingly, three of the inputs of modulator gate 2453 in subscribers line unit AA/0000 are shown respectively connected to leads 2117/1, 2117/6 and 2117/11 shown on the left of channel pulse store A/31 belonging to the same multiplex; and three of the inputs of modulator gate 2453 in subscribers line unit CC/1000 are shown respectively connected to leads 2117/1, 2117/6, 2117/11 from channel pulse store C/31 belonging to the second multiplex. Similarly, three of the inputs of modulator gate 2453 in subscriber's line unit AA/0001 are shown respectively connected to leads 2117/1, 2117/6, 2117/12 of channel pulse store A/31, while three of the inputs of modulator gate 2453 in subscribers line unit CC/1001 are shown respectively connected to lead 2117/1, 2117/6, 2117/12 of channel pulse store C/31. Likewise, demodulator gate 2455 in unit AA/0000 is connected to leads 2119/1, 2119/6, 2119/11 of channel pulse store A/31, demodulator gate 2455 in unit CC/0000 is connected to leads 2119/1, 2119/6, 2119/11 of channel pulse store C/31: demodulator gate 2455 in unit AA/0001 is connected to leads 2119/1, 2119/6, 2119/12 of channel pulse store A/31, demodulator gate 2455 in unit CC/0001 is connected to leads 2119/1, 2119/6, 2119/12 of channel pulse store C/31.

It will be seen that the foregoing strictly complies with, and illustrates, instructions previously given. To complete the illustration, it is merely necessary to note:

(a) The instructions given at the end of the section dealing with converter K/33, viz. that lead 2121/s of each channel pulse store is to be connected to terminal Ts of converter K/33, are illustrated by the fact that lead 2121/1 of channel pulse store A/31 and lead 2121/1 of channel pulse store C/31 are connected to lead 2611 and thus to terminal T1 of converter K/33, lead 2121/6 of channel pulse store A/31 and lead 2121/6 of channel pulse store C/31 are connected to lead 2612 and thus to terminal T6, lead 2121/11 from channel pulse store A/31 and lead 2121/11 from channel pulse store C/31 are connected to lead 2613 and thus to terminal T11, and lead 2121/12 of channel pulse store A/31 and lead 2121/12 of channel pulse store C/31 are connected to lead 2614 and thus to terminal T12, of converter K/33.

(b) The instructions given in the description of the ringing and metering unit regarding the connections between terminals 2491/1, 2491/2, . . . and terminals T1, T2, . . . are illustrated by the fact that, on ringing and metering unit A/32, terminals 2491/1, 2491/6, 2491/11, 2491/12 are respectively connected to leads 2611, 2612, 2613, 2614 and thus respectively to terminals T1, T6, T11, T12, while, on ringing and metering unit C/32, terminals 2491/1, 2491/6, 2491/11, 2491/12 are likewise respectively connected to leads 2611, 2612, 2613, 2614 and thus respectively to terminals T1, T6, T11, T12.

*Timing Devices*

Before giving a description of the mode of operation, as a whole, of the form of exchange which has been described with reference to FIGURES 24 to 36, it is desirable to give particulars of the construction and mode of operation of slow-to-operate device 2156 which is referred to in the fifth paragraph of the description of channel allotter K/30 (shown in FIGURE 26); and, having described device 2156, it will be convenient also to give, in the present section of this specification, supplementary particulars about other timing devices used in this or in the form of exchange described earlier in the specification. It is convenient to deal with the said other devices at this point, and in this order, because, as will be seen, certain of the circuit subassemblies forming part of device 2156 are used for other purposes elsewhere in both forms of the exchange, and because the description of the connection of device 2156 conveniently illustrates a number of details regarding the connections used in these exchanges.

Device 2156 is intended to time the period during which three-gate 2154 in channel allotter K/30 can determine whether or not free speech channels (having a phase difference of 50 channels) are available for use by a calling and a called subscriber. The said three-gate does so, as will be seen from FIGURE 26, by emitting the first clock pulse received on lead 2146, from clock pulse unit CPU/10, that does not synchronise with a pulse applied from lead 2089 to lead 2159 (and thus to the negatory input of three-gate 2154). Pulses appear on lead 2089 from every section control unit in the exchange which is, at the relevant time, either (i) involved in the finding of a speech channel for a subscriber belonging to the multiplex to which that section control unit belongs, or (ii) demanding a free register channel pulse (as described later). It may happen, therefore, that during a train repetition interval in which an attempt is being made to find the appropriate speech channels for a calling and a called subscriber, that attempt is frustrated by the appearance on lead 2089 of pulses from another section control unit which is in the process of demanding a free register channel pulse. Accordingly, device 2156 allows a period equal to the duration of two train repetition intervals, plus a margin (to allow for the inevitable variations in timing which may result, for example, from the replacement of its valves), during which the attempt may be made, so that a second attempt may be made to find suitable speech channels if they have not been found during the preceding train repetition interval. Device 2156 performs its function by giving an output voltage pulse on lead 2157 if the application of voltage to its input lead 2155 has persisted for 250 micro-seconds, but it gives no voltage pulse on lead 2157 if the voltage on input lead 2155 is interrupted before the said 250 micro-seconds have elapsed; and the said output pulse, if given, endures for 150 micro-seconds, and indicates that no suitable speech channels have been found. The aforesaid period of 250 micro-seconds is chosen as giving a reasonable margin for variations in timing. The period of 150 micro-seconds for the duration of the output pulse from device 2156, is chosen as giving an adequate margin of time for such operations as clearing stored pulses from the circuits in which they are being repeated, while not being so long as to slow down the overall speed of operation.

Device 2156 will now be described with reference to FIGURE 37 of the accompanying drawings; but it may assist in the understanding of the circuit arrangements if, before the device is described in detail, it is explained that, in essence, it consists of a transitron Miller integrator circuit which prevents the giving of an output until the input signal has endured for 250 micro-seconds, and that this integrator then actuates a mono-stable multi-vibrator (i.e. a multivibrator of the reversive type, such as has already been several times referred to), triggering the latter to give the said output pulse lasting for 150 micro-seconds.

Figure 37:
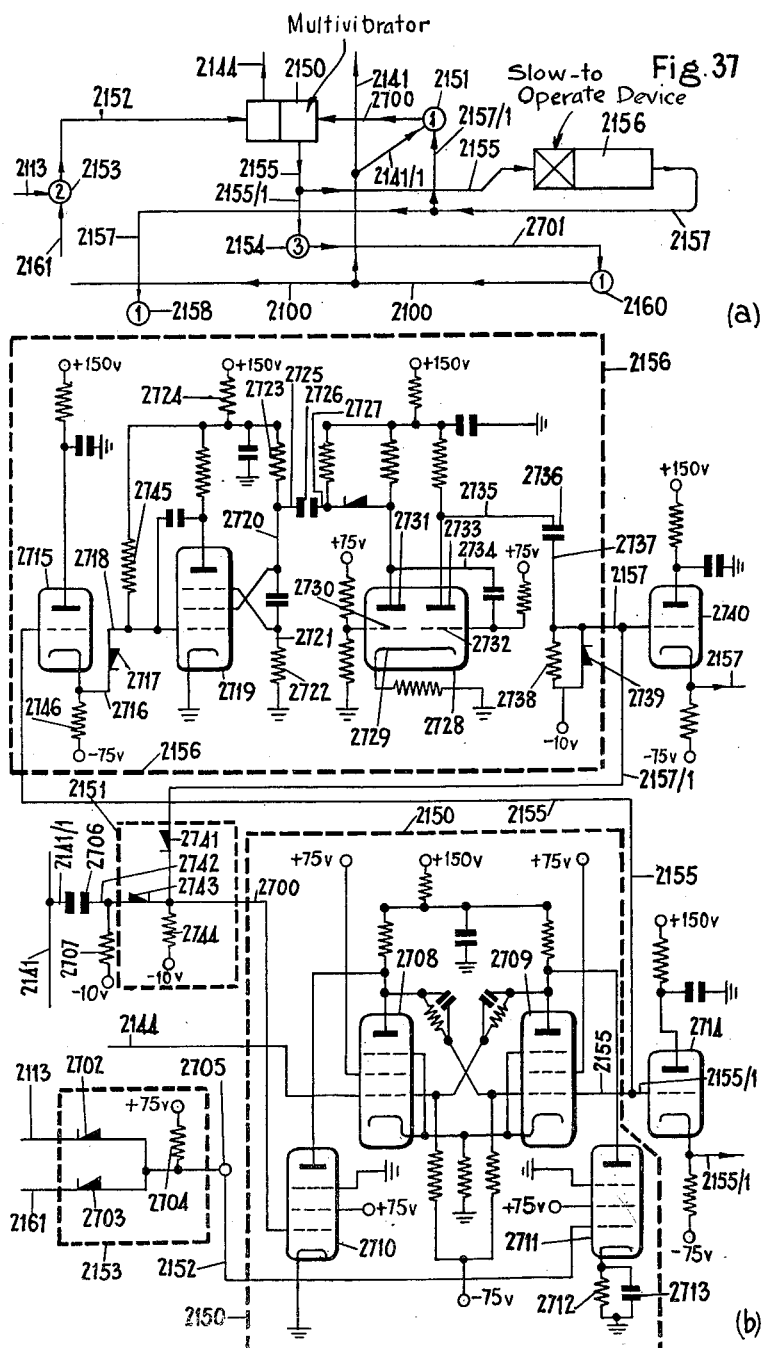

Turning then to FIGURE 37, it will be found that the top of this figure is occupied by FIGURE 37(a) which shows, at a slightly enlarged size, device 2156 (and certain associated gates and loads, and multivibrator 2150) as represented in FIGURE 26; while the lower four-fifths of FIGURE 37, forming FIGURE 37(b) show in detail the circuit arrangements of device 2156, multivibrator 2150, one-gate 2151, and two-gate 2153.

FIGURE 37(a) is included for convenience, to save repeated reference back to FIGURE 26. It will be seen that it shows two-gate 2153 (at the left-hand side) with its two inputs connected respectively to leads 2113 and 2161, and its output connected by lead 2152 to one input of bi-stable multivibrator 2150. The output lead 2144 from the left-hand stage of multivibrator 2150 is shown, together with its second input lead (here referenced 2700) from one-gate 2151, and output lead 2155 from its right-hand stage, which lead is connected to the input of device 2156, whose output is shown connected by lead 2157 to one input of one-gate 2158. FIGURE 37(a) also shows the branch lead (here referenced 2157/1) from lead 2157 to one input of one-gate 2151, and the branch lead (here referenced 2155/1) which connects lead 2155 to one input of three-gate 2154, whose output is connected (by the lead here referenced 2701) to one input of one-gate 2160, and output lead 2100 from the latter gate. Finally, lead 2141 from lead 2100 is shown, together with the branch lead (here referenced 2141/1) that connects lead 2141 to the second input of one-gate 2151.

Turning, then, to FIGURE 37(b), there will be found at the bottom left-hand corner two-gate 2153, here shown enclosed in a square dotted "box" enclosing the circuit components forming the said gate. On the left-hand side of the "box" will be seen leads 2113 and 2161 cf. FIGURE 37(a)), these leads being respectively connected to the cathodes of diodes 2702 and 2703 whose anodes are connected to one another and to one end of resistor 2704, whose other end is connected to a positive source of potential of 75 volts, as shown. The end of resistor 2704 to which are connected the anodes of diodes 2702 and 2703, is connected to terminal 2705, which is the output of the said two-gate.

Two-gate 2153 is a typical two-gate, and the construction of gates is described in detail later in this specification. It will be sufficient, therefore, to say at this point that in the later description of a three-gate with reference to FIGURE 43, it is explained how that three-gate can be converted into a two-gate by the omission of one of the diodes there shown (and the leads connected to that diode); and it will be found, by comparison with FIGURE 41 and the relevant section of description, that two-gate 2153 exactly complies with the prescriptions there given.

Connected to terminal 2705 on the right-hand side of two-gate 2153, will be found lead 2152 (cf. FIGURE 37(a), where lead 2152 is shown connected to two-gate 2153 at the 12 o'clock position), the said lead 2152 being shown in FIGURE 37(b) entering the dotted "box" which encloses the components which form multivibrator 2150. From the left-hand side of "box" 2153, about half way up the side, will be found issuing lead 2144; and issuing from the right-hand side of the "box" containing the components of multivibrator 2150, will be found lead 2155 which, immediately after issuing from the multivibrator "box," turns vertically upwards and may then be traced up and to the left across the figure until it enters dotted "box" 2156 from below, which box encloses the components forming device 2156. At the point at which lead 2155 turns upwards after issuing from multivibrator "box" 2150, the first section of lead 2155/1 will be found—about which more will be said later, as illustrating the general prescription (given earlier in this specification) for the incorporation of a cathode-follower circuit in any lead where desirable—and the second section of lead 2155/1 (which is connected to one input of three-gate 2154, as shown in FIGURE 37(a)) will be found just below, and to the right of, the cathode-follower valve to whose grid the first section of lead 2155/1 is connected.

Issuing from the right-hand side of the dotted "box" containing the components which constitute device 2156, will be found the first section of lead 2157, in which lead will be found incorporated another cathode-follower circuit, the second section of lead 2157 being found just below the cathode-follower valve to whose grid the first section of lead 2157 is connected. Just to the right of the point at which lead 2157 emerges from device 2156, lead 2157/1 will be found connected to lead 2157. Lead 2157/1 is, as shown in FIGURE 37(a), connected to one of the two inputs of one-gate 2151 (which gate is again enclosed in a dotted "box" in FIGURE 37(b)), the second of the said inputs being connected to lead 2141/1 and thus to lead 2141; and in FIGURE 37(b) a part of lead 2141 and lead 2141/1 will be found shown just below the bottom left-hand corner of "box" 2156. Lead 2141/1 will be seen connected with "box" 2156 via condenser 2706, the lead between condenser 2706 and one-gate 2151 being connected through resistor 2707 to a D.C. source of potential of −10 volts with respect to earth, as indicated in the figure. The output lead from one-gate "box" 2151 (viz. lead 2700) will be seen issuing from the right-hand side and entering multivibrator "box" 2150.

The reason for the negative bias on the end of resistor 2707 will be explained later, in the course of the description of other components. But it is desired to state here, that the appropriate D.C. potentials (with respect to earth) to be applied to the various terminals are, in FIGURE 37(b) (and in subsequent figures described in this section of this specification), indicated on the figure itself, and will not generally be repeated in the description unless repetition is desirable for the purpose of explaining the operation of the circuits.

Having thus described the lay-out of FIGURE 37(b) and related the various leads shown in that figure to those leads as shown in FIGURE 37(a) (and thus in FIGURE 26), the components shown in FIGURE 37(b) will be described in detail.

Two-gate 2153 has already been described, and its connection by lead 2152 to multivibrator "box" 2150. Multivibrator 2150 will at once be recognised as a typical, conventional bi-stable multivibrator provided with pentodes 2708 and 2709, having grids and anodes cross-connected in the well-known manner, the left-hand and right-hand stages being provided with conventional trigger pentodes 2710 and 2711. The control grid of trigger pentode 2710 is connected to lead 2700 from one-gate 2151, as shown; and the control grid of trigger pentode 2711 is connected to lead 2152 from two-gate 2153. The control grid of pentode 2710 will receive a suitable bias from lead 2700 (as will become apparent later, when one-gate 2151 and device 2156 are described): the requisite bias for the control grid of pentode 2711, relative to the cathode of the said pentode, is obtained by connecting the said cathode to earth, as shown, through resistor 2712, which has a value of 100 kilohms, this resistor being shunted by condenser 2713 having a capacity of 0.002 microfarad.

Figure 39:
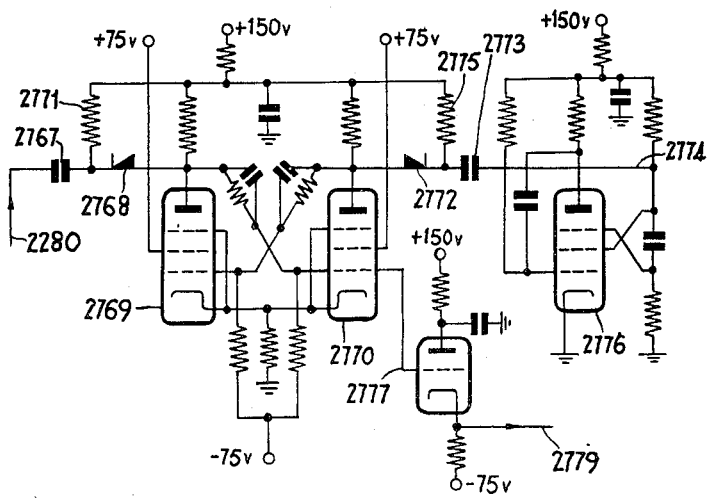

All other circuit components in this multivibrator are entirely conventional; and a multivibrator of this conventional bi-stable type will serve for all the cases where, in this specification, a multivibrator (not stated to be of the reversive, i.e. mono-stable, type) is referred to and is not specified to be triggered by the lagging edge of the pulse which is to operate it—in which latter case minor modifications have to be made. (It will doubtless have been noted that all pulses used in the forms of exchange above described, are positive-going at their leading edge: the modifications to be made if it is desired to use pulses that are negative-going at their leading edge will be obvious to those skilled in the art in the light of the descriptions already given.) Where, in an exchange such as those that have been described which are so designed that the leading edges of pulses are positive-going, it is desired that a multivibrator should be triggered at the lagging (i.e. negative-going) edge of a pulse, the minor modifications above-mentioned that need to be made are:

(a) Where the pulse is a short pulse such as a ½ micro-second pulse, the lead conveying that pulse to the multivibrator should be connected to it through one of the well-known delay elements (for example, a lumped-constant delay element consisting of a plurality of inductances which are connected in series and which have connected to the junction between each pair of inductances a capacitor connected to earth) having a delay period equal to the duration of the pulse; and (b) Where the pulse is one of the pulses of substantially longer duration which are used in the exchanges (for example, 5 milli-seconds or more) the lead conveying that pulse to the multivibrator should be connected to it through a differentiating circuit of the kind shown in FIGURE 39 (yet to be described) of the accompanying drawings and consisting of the combination of condenser, diode and resistor shown at the left-hand side of the said figure and there referenced 2767, 2768, 2771, respectively—this differentiating circuit being connected to the anode lead of, for example, pentode 2708 (or of pentode 2709 if the other stage of the multivibrator is to be triggered by the said pulse) in the same way that the said differentiating circuit is connected to the anode lead of pentode 2769 in FIGURE 39. The corresponding trigger pentode (2710, for example, if the anode of pentode 2708 is that which has the anode of the said diode connected to it) is then omitted if not required for triggering the multivibrator by the application of positive-going pulses to the same stage from some other lead.

Reverting to the description of FIGURES 37(a) and 37(b), it will be seen that the output from the left-hand stage of multivibrator 2150 is shown in FIGURE 37(a) as connected to lead 2144; and lead 2144 is therefore shown in FIGURE 37(b) as connected to the control grid of pentode 2708. The output from the right-hand stage of multivibrator 2150 is (again see FIGURE 37(a)) connected to lead 2155; and lead 2155 is accordingly shown connected to the control grid of pentode 2709 in FIGURE 37(b).

It is almost superfluous to describe the operation of so conventional a bi-stable multivibrator. It will be sufficient merely to recapitulate (in order to link the normal operating behaviour with the description of the operation of device 2156 as a whole) that the application of a positive-going pulse on lead 2152 from two-gate 2153, to the control grid of trigger pentode 2711, increases the current through that pentode, thus lowering the potential of the anode of pentode 2709 and the potential of the control grid of pentode 2708, leading to cut-off of current through pentode 2708 and a rise of its anode potential which, communicated through the cross-connection, raises the potential of the control grid of pentode 2709. Since lead 2155 is, as already mentioned, connected to the said control grid of pentode 2709, lead 2155 accordingly experiences a positive-going voltage pulse.

The positive-going pulse on lead 2155 also appears, of course, on lead 2155/1 (i.e. on the first section of the said lead, which is connected to lead 2155). As is shown in FIGURE 37(b), a cathode-follower circuit is incorporated in lead 2155/1 by connecting the first section of lead 2155/1 to the control grid of triode 2714 and connecting the second section of lead 2155/1 to the cathode of the said triode. Accordingly, when the positive-going pulse appears on the first section of lead 2155/1, the said positive-going pulse equally appears on the second section of lead 2155/1—whence it is communicated to one input of three-gate 2154. This cathode-follower circuit is, as will be seen, of entirely conventional design and does not call for further description.

Lead 2155 is connected, as already stated, to device 2156. Device 2156, as will be seen from FIGURE 37(b) is provided with a cathode-follower valve 2715, to whose control grid is connected lead 2155, and to whose cathode is connected lead 2716. (This cathode-follower circuit is again of entirely conventional design.) Lead 2716 is in turn connected to the cathode of diode 2717 whose anode is connected to lead 2718.

Load 2718 is connected to the control grid of pentode 2719 and constitutes a control lead for a transitron Miller integrator circuit of well-known form, having its screen grid and suppressor grid cross-connected, as shown, to leads 2720 and 2721, respectively, lead 2721 being connected through resistor 2722 to earth, and lead 2720 being connected as usual through resistors 2723 and 2724 to the H.T. supply. Lead 2720 has connected to its lead 2725 which constitutes the output lead from the integrator, Lead 2725 is connected via condenser 2726 to lead 2727, which, as will again be recognised by all skilled in the art, is the input lead to a conventional mono-stable multivibrator provided with a double-triode valve 2728, whose left-hand stage (consisting of cathode 2729, control grid 2730 and anode 2731) is, in the stable state, in the cut-off condition, while its right-hand stage (consisting of cathode 2729, control grid 2732 and anode 2733) passes current. Since this mono-stable multivibrator is as conventional in construction and operation as bi-stable multivibrator 2150, again a very brief recapitulation of its operation will be sufficient to link it with the operation of the other parts which combine to form device 2156. Assuming the mono-stable multivibrator to be in its stable condition with its right-hand stage passing current and its left-hand stage cut-off, this multivibrator will assume a state in which (with the customary circuit components and with voltages applied to its terminals of the magnitudes shown in FIGURE 37(b)) cathode 2728 assumes a potential of about 78 volts, right-hand control grid 2732 a potential of about 75 volts, and left-hand control grid 2729 a potential sufficiently below 75 volts for current in the left-hand stage to be cut off. If, now, a negative-going pulse be applied to input lead 2727, the potential of left-hand anode 2731 falls and with it the potential of right-hand control grid 2732 (being connected to anode 2731 via lead 2734 and the associated condenser as shown). Current now, as usual, becomes cut-off in the right-hand stage, since the fall in potential of grid 2733 causes a reduction of current in the right-hand stage and a consequential reduction in potential of cathode 2729, bringing the left-hand stage into a conducting condition—whereupon the potential of left-hand anode 2731 falls, carrying with it the potential of grid 2732 until the right-hand stage reaches the cut-off condition. The resulting rise of potential of right-hand anode 2733 applies a positive-going pulse, via lead 2735, condenser 2736, and lead 2737, to lead 2157—which constitutes the output lead of this mono-stable multivibrator. (The cutting-off of current in the right-hand stage is, of course, followed by a rise in potential of grid 2732 until the right-hand stage again begins to conduct and the left-hand stage resumes its stable, cut-off condition.)

It is probably convenient at this point to complete the description of the circuit arrangement before completing the description of the combined mode of operation of the transitron Miller integrator and the mono-stable multivibrator.

Firstly, it will be noted that to the point of junction of leads 2737 and 2157 is connected resistor 2738, whose other end is connected to a D.C. source of potential of −10 volts, resistor 2738 being shunted by diode 2739. By this means, in conjunction with two other biassing connections about to be described, the appropriate bias potential is applied to the control grid of trigger pentode 2710 in multivibrator 2150—diode 2739 ensuring that lead 2157 returns rapidly to its normal potential after an output pulse has been applied by the mono-stable multivibrator to lead 2157.

Secondly, it will be noted that a cathode-follower circuit (including triode 2740) has been incorporated in lead 2157 in the same way that a cathode-follower circuit was incorporated in lead 2155/1 as described above. The first section of lead 2157 is, of course, connected to the control grid of triode 2740, and the second section of lead 2157 is of course connected as shown to the cathode of triode 2740 and thence to one input of one-gate 2158 (as shown in FIGURE 37(a)).

Thirdly, lead 2157/1 is connected to one input of one-gate 2151, viz. to the anode of diode 2741, while lead 2141/1 is connected to the second input of one-gate 2151 via condenser 2706 (already mentioned) and lead 2742, being thus connected to the anode of diode 2743. The cathodes of diodes 2741 and 2743 are, as will be seen, connected together and to one end of resistor 2744, whose other end is connected to a D.C. source of potential of −10 volts. Lead 2700 is connected to that end of resistor 2744 to which are connected the cathodes of diodes 2741 and 2743. One-gate 2151 is a perfectly typical one-gate with two inputs, as will be found from the description of one-gates given later in this specification—as may be seen in due course by comparing it with the one-gate with three inputs shown in FIGURE 42. It will be noted, however, in regard to one-gate 2151, that the connection to a potential of −10 volts of one end of resistor 2744, and the similar connection to a potential of −10 volts of one end of resistor 2707 (lying to the left of resistor 2744) and of one-end of resistor 2738 (at the bottom right-hand corner of "box" 2156), has the effect of putting a bias of −10 volts on leads 2157/1 and 2700, and thus applying this bias to the control grid of trigger pentode 2710 of bi-stable multivibrator 2150, as mentioned earlier.

One can now conveniently revert to the description of the mode of operation of device 2156.

When a positive-going pulse is applied to lead 2155 from multivibrator 2150, then (provided this positive-going pulse does not end before the transitron Miller integrator has completed the operations about to be described) the application of the said positive-going pulse by cathode-follower 2715 and lead 2716 the cathode diode 2717 stops the passage of the current previously flowing through the said diode. The potential of the said control grid can now rise, and the potential of the anode of pentode 2719 can fall, substantially linearly with time, in manner well known for this integrator. The constants of the circuit components of the integrator are so chosen that the time taken for the anode thus to fall linearly (to about 30 volts, with the applied potentials shown in FIGURE 37(b)) is about 250 micro-seconds. At this stage of the operation, the majority of the current flowing in pentode 2719 starts to flow to the screen grid of pentode 2719; and the potential of the said screen grid now falls very rapidly, and with it the potential of the suppressor grid of pentode 2719, the current to the anode of pentode 2719 being cut off. At this point, the normal cycle of operations of a transitron Miller integrator circuit is interrupted. For when the potential of the screen grid fell rapidly as above described (i.e. after a positive-going pulse had persisted on lead 2155, and therefore on input lead 2718 to the integrator circuit, for about 250 micro-seconds), this fall of potential was communicated via leads 2720 and 2725, and condenser 2726, to the input lead 2727 of the mono-stable multivibrator— thus constituting a negative-going pulse on input lead 2727, which causes current flow in the right-hand stage of the said mono-stable multivibrator to be cut off, and current to flow in the left-hand stage of the said multivibrator, as already described. The values of the circuit components of the said monostable multivibrator are so chosen that current flowing in the said left-hand stage endures for about 150 micro-seconds before the multivibrator reverts to the stable condition in which it is the right-hand stage which carries current. It will be remembered that it was pointed out that the cutting-off of current in the right-hand stage results in the application of a positive-going pulse to lead 2157; and it will now be seen that this pulse endures for 150 micro-seconds— i.e. until the said multivibrator reverts to its stable state.

The application of the said positive-going pulse to lead 2157 applies the pulse also to lead 2157/1 and thus to one input of one-gate 2151 which (as will be seen from the circuits in "box" 2151 in FIGURE 37(b)) raises the potential of the junction of resistor 2744 and lead 2700, thus applying a positive-going pulse to the control grid of trigger pentode 2710 of multivibrator 2150. This pulse, when so applied to bi-stable multivibrator 2150, has the usual consequence of lowering the potential of the control grid of right-hand pentode 2709, thus somewhat raising its anode potential and (with the latter) the potential of the control grid of left-hand pentode 2708, so that a positive-going pulse is applied to lead 2144 and the potential of the anode of pentode 2708 falls—the latter causing a corresponding fall in the potential of the control grid of right-hand pentode 2709 and of lead 2155 which is connected to it.

This lowering of the potential of lead 2155 correspondingly lowers the potential of the cathode of cathode-follower triode 2715 and with it the potential of the cathode of diode 2717 so that the latter again becomes conducting, and the potential of the control grid of pentode 2719 in the transitron Miller integrator falls to a value at which further flow of current through the pentode is cut off.

The foregoing paragraphs have set out the series of operations which take place if the initial positive-going pulse is maintained on lead 2155 for the 250 micro-seconds (approximately) needed to permit the transitron Miller integrator to reach the stage at which the rapid fall in voltage of the screen grid of pentode 2719 can trigger the mono-stable multivibrator. If, however, before this triggering action takes place, the pulse previously applied to lead 2155 comes to an end, so that its negative-going edge appears on the said lead, the operation of the said integrator is reversed rapidly. In the present circuit, use is made of this fact in the following way. It has already been explained that device 2156 is part of the equipment concerned with ascertaining whether appropriate speech channels are available for both the calling and called subscriber. If there is no suitable pair of speech channels available, no pulse appears on lead 2141 during the 250 micro-seconds that elapse after an input starts to be applied by lead 2155 to device 2156, and device 2156 then gives an output (as above described) in due course on lead 2157; but if suitable speech channels are available, a pulse of the phase of one such channel will appear on lead 2141 at some instant which is less than 250 micro-seconds after the said input voltage was first applied to lead 2155. If and when such a pulse appears on lead 2141, it is applied (see FIGURE 37(b)) via lead 2141/1, condenser 2706 and lead 2742 to one input of one-gate 2151, so that a positive-going pulse is applied by lead 2700 to the control grid of trigger pentode 2710.

It was explained a few paragraphs earlier that the application of a positive-going pulse on lead 2700 led to the appearance of the negative-going edge of the pulse previously existing on lead 2155 and thus to a lowering of the potential of the cathode of cathode-follower valve 2715; but the consequences of that fall of potential of lead 2155, were the consequences produced when the said pulse was applied at a time when more than 250 micro-seconds (or thereabouts) had elapsed after the start of the input to device 2156, and when, therefore, the screen grid of pentode 2719 had already undergone its rapid fall of potential. If, however, the fall of potential of lead 2155 occurs during the time while the anode of pentode 2719 is executing its nearly linear drop in potential (already described as the result of the application of a positive-going pulse on lead 2716), the result is different from that previously described: what now happens, is that the potential of the cathode of triode 2715 drops to a value such that the resulting current flow through diode 2177 causes the potential of the control grid of pentode 2719 to stop rising and to fall to a value at which the flow of current through the pentode is cut off—this fall taking place relatively rapidly, as will be clear to those skilled in the art from the consideration that, in this form of integrator, resistor 2745 has a value of the order of 1 megohm whereas resistor 2746 will, for the purpose of handling signal pulses of the durations here concerned, have a value of the order of 10 kilohms.

It will thus have been seen that the effects of the application of the pulse from lead 2141 before the transitron Miller integrator has applied a negative-going pulse to the mono-stable multivibrator in device 2156, are (a) to prevent the latter device from giving an output pulse, and (b) to cause a positive-going pulse to appear on lead 2144 (since the said lead is connected to the control grid of left-hand pentode 2708 in bi-stable multivibrator 2150).

The individual operations of bi-stable multivibrator 2150, of the transitron Miller integrator, and of the mono-stable multivibrator have perhaps been described with more detail than would have been warranted for such well-known devices, had it not been for the extensive use made of these devices in the form of exchange last described and in the form of exchange described in the earlier part of this specification. But it will be appreciated that conventional bi-stable multivibrators substantially identical with multivibrator 2150 may be used where ever in this specification a multivibrator of the reversive type is called for. Similarly, a mono-stable multivibrator of the kind using a double triode and described above in connection with device 2156 may be used as reversive multivibrator 2044 in busy register channel store 2001 in section control units such as A/30 (FIGURE 24); but this type of double-triode multivibrator is unsuitable for use as reversive multivibrator 2042 in the said busy register channel store, or for use as reversive multivibrator 2279 in register control unit K/31 (FIGURE 27), or for use as the corresponding slow-release device 521 in register control unit K/7 (FIGURE 5), about which three devices information will now be given.

Attention has already been drawn to the characteristics required of reversive multivibrator 2042—namely, that on receiving a ½ micro-second pulse on its input, it must give an output lasting 120 micro-seconds, and that if it receives a further such pulse or pulses before it has ceased to give an output, it must wait until 120 micro-seconds have elapsed since the receipt of the last such pulse before reverting to giving no output. A form of mono-stable multivibrator device suitable for this purpose will now be described with reference to FIGURE 38 of the accompanying drawings, from which it will be seen that it is provided with input terminal 2747 (at the bottom left-hand corner of FIGURE 38) which is connected through condenser 2748 to the control grid (negatively biassed as shown) of trigger pentode 2749, whose cathode is earthed and whose screen and suppressor grids are connected as shown. The anode circuit of trigger pentode 2749 is connected through transformer 2750 and thermionic diode 2751 to the control grid of pentode 2752 of the left-hand stage of the mono-stable multivibrator proper, which control grid is also connected, as will be seen, by condenser 2753 to the anode of pentode 2754 of the right-hand stage of the multivibrator proper. The control grid of pentode 2754 is connected by resistor 2755 and shunt condenser 2756 to the anode of pentode 2752, and is also connected through resistor 2757 to a negative bias potential of —150 volts as shown. The ratio of the resistance of resistor 2756 to that of resistor 2757 should be about 2:3: suitable values for these resistances, and particulars of various other components used in this multivibrator, are given below. It will also be seen that the control grid of pentode 2752, in addition to having the connections already mentioned, is connected to the cathode of thermionic diode 2758 whose anode has applied to it a negative bias (—20 volts). The remaining electrodes of pentodes 2752 and 2754 are connected as shown in the figure: the values of anode resistors 2759 and 2760 and of resistor 2761 through which bias is applied to the control grid of pentode 2752, will be given below when values for other components are being given. Finally, it will be seen that the control grid of pentode 2754 is connected by lead 2762 to the control grid of a conventional cathode-follower triode 2763 having its cathode connected by lead 2764 to the output terminal 2765 of this multivibrator device.

In constructing this multivibrator device, pentodes 2749 and 2754 should each be a medium power pentode capable of passing 30 to 40 milliamperes with zero bias on its control grid, pentode 2752 being an ordinary low power pentode. Condenser 2753 should have a capacity of 100 picofarads, and resistor 2761 a resistance of 2.2 megohms, so that the period during which the multivibrator remains in its unstable condition after receiving a triggering pulse is 120 micro-seconds or slightly more. Anode resistor 2759 of pentode 2752 should have a resistance large enough to ensure that, when the left-hand stage of the multivibrator is carrying current, the anode potential is low enough for the valve to be working below the knee of its characteristic curve—a resistance of about 33 kilohms being suitable. Anode resistor 2760 should be relatively small, to allow condenser 2753 to be discharged during the period when the ½ micro-second pulse is applied on lead 2747 to trigger the multivibrator (it also being required that the time interval that elapses between the application of a triggering pulse and the carrying out of the triggering action shall be between ½ and 1 microsecond, in contrast with the mono-stable multivibrator previously described using a double triode, for which latter the said time interval is of the order of 3 microseconds)—a resistance of about 2.2 kilohms being suitable. Resistances of 470 kilohms and 680 kilohms are suitable for resistors 2756 and 2757, respectively; and a capacity of 22 picofarads is suitable for condenser 2755. The resistance of resistor 2766, through which the cathode of pentode 2754 is connected to earth should be chosen to suit the characteristics of the pentode selected as pentode 2754, being such that, when pentode 2754 has been triggered and is conducting current (in the circuit shown) its cathode potential is about +10 volts.

It will be appreciated from the foregoing particulars that if, at a time when pentode 2752 of the left-hand stage of this multivibrator is passing current, a negative-going pulse is applied to the control grid of pentode 2752 in consequence of the application of a positive-going pulse to input terminal 2747 (transformer 2750 being so wound as to produce this result), the resulting rise in the potential of the anode of pentode 2752, which is communicated to the control grid of pentode 2766, causes current to flow in the latter and current to be cut-off in pentode 2752 within a period of from ½ to 1 microseconds. The resulting rise of potential of the anode of pentode 2752, communicated to the control grid of pentode 2754 and to lead 2762 and the control grid of cathode-follower triode 2763, causes a positive-going pulse to be applied to output terminal 2765. Condenser 2753, however, discharges within a period of 120 microseconds (or slightly more), and restores the control grid of pentode 2752 to a value at which the said pentode is again triggered to pass current (current flow in pentode 2754 then effectively ceasing) unless, before the said period of 120 micro-seconds (approximately) has elapsed, there is a further input pulse applied to input terminal 2747. If such a further pulse occurs, the device is restored to the state it had immediately after the application of the first input pulse to terminal 2747, since the presence of diode 2758 prevents the potential of the control grid of pentode 2752 from remaining for any appreciable time at a potential lower than −20 volts: accordingly, after the application of each input pulse the device starts to measure a time interval of 120 micro-seconds (approximately) and then reverts to its stable state unless, before such reversion, a further input pulse has occurred. When the device reverts to its stable state and current again flows in left-hand pentode 2752, its anode potential falls and with it the potential of the control grid of pentode 2754 and lead 2762, thus ending the output voltage that was applied to output terminal 2765 for so long as the multivibrator remained in its unstable state.

Figure 38:
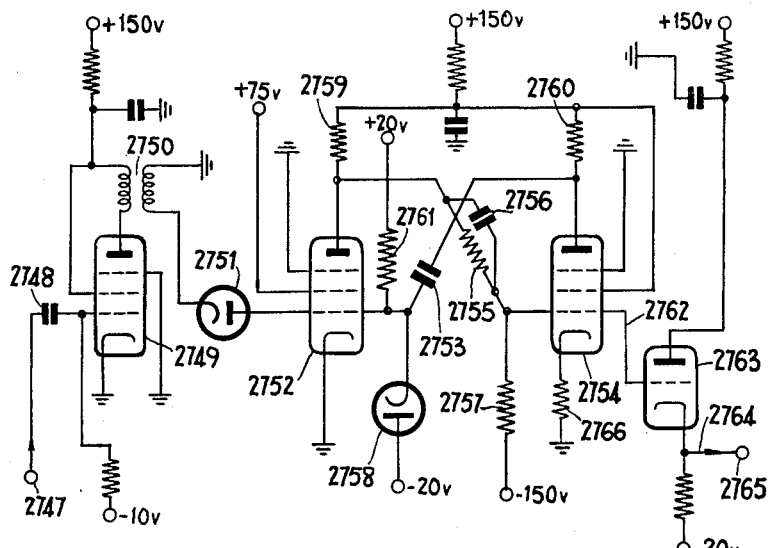

As will no doubt have become obvious, lead 2041 from three-gate 2027 in busy register channel store sub-unit 2001 of section control unit A/30, see FIGURE 24, is connected to terminal 2747 of the device shown in FIGURE 38; and terminal 2765 of the said device is connected, as shown in FIGURE 24, to the input of multivibrator 2044, to the input of two-gate 2045, and to lead 2043.

Having thus described the form of reversive multivibrator circuit shown in FIGURE 38, reversion there being obtained by modification of one of the cross-connections between the pentodes of a bi-stable multivibrator, it will next be convenient to describe the form of reversive multivibrator referenced 2279 in register control unit K/31 (this multivibrator being found near the top left-hand corner of control section 2243 in unit K/31, see FIGURE 27), and then to describe slow-release device 521 in register control unit K/7 (the said device being shown at the top left-hand corner of the latter said unit as shown in FIGURE 5). It is convenient to deal with them in this inverse order because slow-release device 521 incorporates most of the circuit elements which constitute device 2279. Devices 2279 and 521 both serve the purpose of measuring a time interval of 20 seconds, for the purpose of regulating the carrying out of forced-clearance operations.

It will be recollected in connection with FIGURE 27 that multivibrator device 2279 is required to cease to apply voltage to the permissory input of composite gate 2277 when the trailing edge (i.e. the negative-going edge) of a Z pulse appears on input lead 2280, and is required to revert to the application of voltage to the said permissory input approximately 20 seconds later. Turning, then, to FIGURE 39 of the accompanying drawings, which shows the modified multivibrator circuit used for device 2279, it will be seen to consist, in essence, of a bi-stable multivibrator of the kind already described, which has been converted into a mono-stable multivibrator by controlling the triggering of one stage by means of a transitron Miller integrator; and it is also modified in that, since both triggering actions are effected by negative-going edges of pulses, trigger pentodes 2710 and 2711 as used in multivibrator 2150 in FIGURE 37(b) are no longer needed.

In detail, lead 2280 (on which the trailing edge of the Z pulse appears) is shown at the left-hand side of FIGURE 39 as connected via condenser 2767 to the cathode of diode 2768 whose anode is connected to the anode of pentode 2769, the latter forming, with pentode 2770 and the usual circuit connections as shown, a conventional bi-stable multivibrator circuit. The lead connecting condenser 2767 to diode 2768 is, as shown, connected via resistor 2771 to a point on the anode lead of pentode 2769; and it will accordingly be seen that, as usual, if it be assumed that current is flowing through pentode 2770, the appearance of the negative-going edge of the Z pulse on lead 2280 will lower the potential of the control grid of pentode 2770 and, in the usual way, cause the flow of current in pentode 2770 to stop and current to flow in pentode 2769. This normally bi-stable multivibrator is, however, rendered mono-stable by the connection to the anode of pentode 2770 (and therefore to the control grid of pentode 2769) of a transitron Miller integrator, as shown, by means of diode 2772 (whose anode is connected to the anode of pentode 2770, and whose cathode is connected via condenser 2773 to the output lead 2774 of the said integrator) and resistor 2775.

The said integrator is, as will be recognised, of entirely conventional form. It differs from the integrator incorporated in device 2156 only in that, instead of its circuit constants being so chosen that the integrator has a cycle time of about 250 micro-seconds, the present integrator has a cycle time of 20 seconds. In addition, since the control grid of pentode 2776 in the integrator in FIGURE 39, is not connected to an external control lead (as was the grid of pentode 2719 in the integrator in FIGURE 37(b)), the integrator in FIGURE 39 continually repeats its cycle of oscillation in the normal manner; and each time that the screen and suppressor grids of pentode 2776 undergo the fall of potential characteristically present in the normal operating cycle of this type of integrator, a negative-going pulse is applied to lead 2774 and thus to the anode of pentode 2770 and the control grid of pentode 2769 of the multivibrator proper, which is thereby triggered to revert to the condition in which current flows in pentode 2770.

It will thus be seen that the circuit arrangement shown in FIGURE 39 constitutes a mono-stable multivibrator device in which, in the absence of disturbance by the application of Z pulses, the stable condition is one in which current flows in right-hand pentode 2770—since, when current is flowing in pentode 2770, the application of a pulse from the integrator circuit has no effect. But since Z pulses regularly recur at intervals of slightly less than ¼ second (as set out in the description of pulse generator K/1), this "stable" state is upset, within ¼ second of the time when it has been achieved, by the trailing edge of the next Z pulse. Current then again starts to flow in left-hand pentode 2769 and current in right-hand pentode 2770 is cut off; and this state of affairs continues for approximately 20 seconds, until the integrator applies the next negative-going pulse to lead 2774—and so on. (The duration of current flow in pentode 2769 will be very nearly 20 seconds when the repetition time of the integrator is 20 seconds, but will be less than 20 seconds by a fraction somewhat less than ¼ second, the difference being negligible, as compared with 20 seconds, depending on the exact relative timing of the Z pulses and the pulses emitted by the integrator.)

The output from device 2279 as shown in FIGURE 39 is obtained by connecting lead 2777 to the control grid of right-hand pentode 2770 and to the control grid of cathode-follower triode 2778, and by connecting lead 2779 to the cathode of the said triode—lead 2779 thus forming the output lead of the device. Accordingly, each time the trailing edge of a Z pulse appears on lead 2280 and triggers pentode 2769, the resulting drop in the potential of the anode of pentode 2769 and of the control grid of pentode 2770, causes a negative-going pulse to appear on leads 2777 and 2779. Lead 2779 is connected to the permissory input of composite gate 2277 (see FIGURE 27); and accordingly, each time the trailing edge of a Z pulse appears on lead 2280, device 2279 ceases to apply voltage by lead 2779 to the said permissory input, but applies such voltage again 20 seconds (approximately) later, when the integrator emits its ensuing negative-going pulse.

Slow-release device 521 makes use of the device shown in FIGURE 39; but its circuit connections are modified in order that device 521 may give the appropriate voltage outputs—which are, as will be remembered from the description of FIGURE 5, that device 521 shall, on receiving a voltage input on lead 516 from multivibrator 515, immediately apply voltage to lead 520 to the inhibitory input of one-gate 518 and shall continue to apply such voltage until 20 seconds have elapsed from the time when the voltage input on lead 516 ended.

Figure 40:
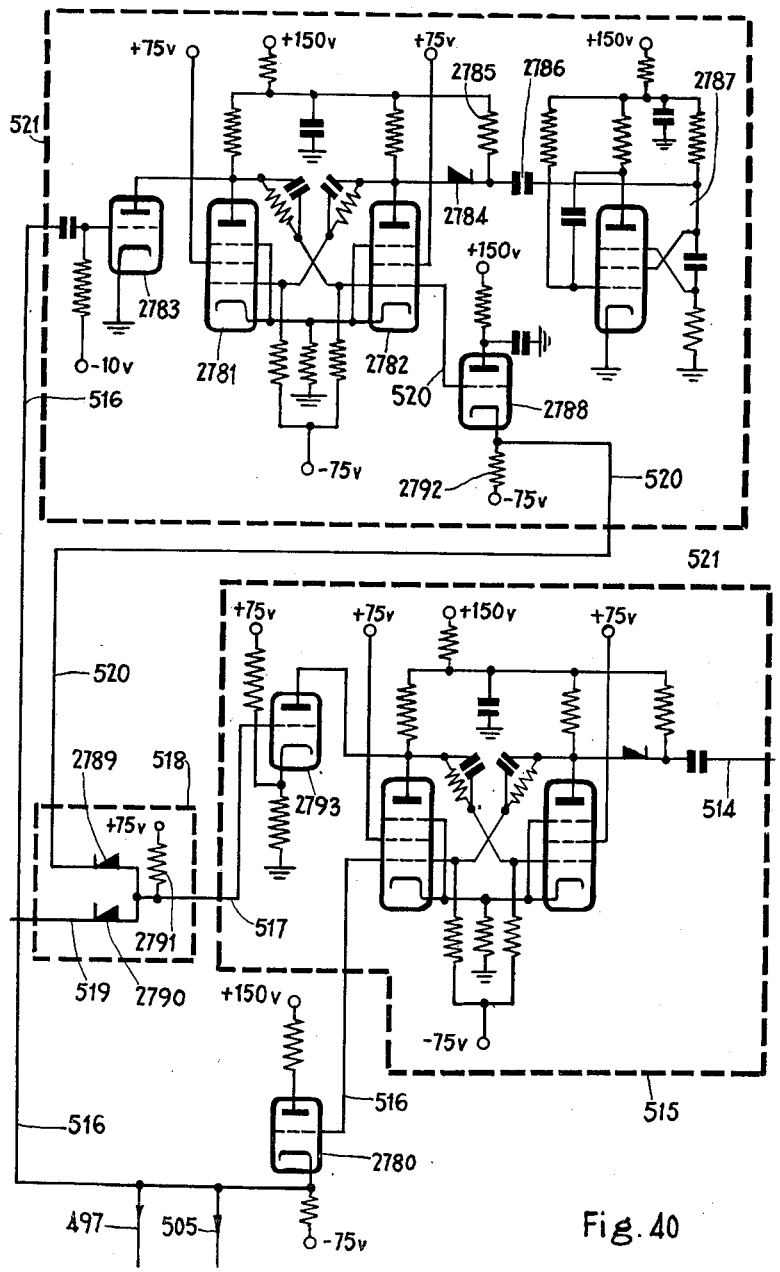

FIGURE 40 of the accompanying drawings shows device 521 and also includes multivibrator 515 and one-gate 518. In that figure, device 521 comprises the circuit arrangement shown in the dotted "box" marked 521 and occupying the upper part of the figure, multivibrator 515 is shown within the dotted "box" marked 515 which occupies most of the lower part of the figure, and the dotted "box" marked 518, in the lower part of the figure and lying to the left of "box" 515, contains one-gate 518 which (as shown in FIGURE 5) is provided with an inhibitory input.

In FIGURE 5, the input lead 516 to device 521 is shown so connected to multivibrator 515 that the receipt of a pulse on lead 517 causes multivibrator 515 to apply voltage to lead 516 and thus to the input of slow release device 521; and it will be remembered that device 521 is required, on receiving an input on lead 516, immediately to apply voltage by lead 520 to the inhibitory input of one-gate 518 and to maintain that voltage for a period of 20 seconds from the time when the input on lead 516 began. Lead 516 will be seen, in FIGURE 40, entering "box" 521 near the middle of the left-hand side of the "box"; and, tracing lead 516 away from "box" 521, it will be seen to run downwards along the left-hand side of the figure, then to the right and to have leads 497 and 505 connected to it. This section of lead 516 is then connected to the cathode of cathode-follower valve 2780, and the second section of lead 516 is connected to the control grid of valve 2780 and then rises to enter "box" 515. Lead 516 is, it will be seen, the output lead from multivibrator 515 and again illustrates the incorporation of a cathode-follower circuit in any lead where such incorporation is desirable in order to give impedance-matching.

Turning, then, to device 521, it will be seen to consist of a conventional multivibrator provided with a pair of pentodes 2781 and 2782, interconnected in the conventional manner, and with a trigger triode 2783 connected to the anode circuit of the left-hand stage and a triggering circuit including diode 2784, resistor 2785 and condenser 2786 connected to the anode circuit of the right-hand stage. The last-mentioned triggering circuit is, it will be seen, precisely similar to that connected to the anode circuit of pentode 2770 in FIGURE 39, and, again in close similarity to the circuit of FIGURE 39, condenser 2786 is connected to a transitron Miller integrator (indicated as a whole by the reference number 2787) of the kind shown in FIGURE 39. The circuit constants of this transitron Miller integrator shown in FIGURE 40 are, however, so chosen that the cycle-time of the present integrator is 20 seconds. Accordingly, if a positive-going pulse be applied on lead 516 when device 521 is in the condition in which current is flowing in pentode 2782, the resulting drop of potential of the control grid of pentode 2782 raises its anode potential and that of the control grid of pentode 2781, thus triggering the flow of current in pentode 2781. The anode potential of pentode 2781 accordingly falls, and with it the potential of the control grid of pentode 2782, thus reducing the potential of the section of lead 520 that is connected to the said control grid. The potential of the section of lead 520 which is connected to the cathode of cathode-follower triode 2788 therefore falls likewise.

In due course, after the lapse of about 20 seconds, integrator 2787 triggers-off the flow of current once again in pentode 2782, and the potentials of both sections of lead 520 again rise to their normal values—the action of integrator 2787 rendering device 521 mono-stable in exactly the same way that the circuits shown in FIGURE 39 constitute a monostable device, as already described.

Lead 520 is, as shown, connected to the cathode of diode 2789 in one-gate 518, whose anode, like the anode of diode 2790, is connected to one end of resistor 2791 and to lead 517 (the latter lead being shown in FIGURE 5 also). The cathode of diode 2790 is connected to lead 519 (also shown in FIGURE 5).

Gate 518 accordingly forms a one-gate with an inhibitory input connected to the output lead 520 from device 521. For if current is flowing in pentode 2782, lead 520 possesses its normal potential (which is conveniently about 10 volts positive with respect to earth) and the application of a positive-going pulse on lead 519 will then cause the potential of lead 517 to rise. On the other hand, if a positive-going pulse has been applied to lead 516, triggering the flow of current in pentode 2781, the resultant lowering of the potential of lead 520 to a negative potential with respect to earth ensures that (until integrator 2787 again triggers current flow in pentode 2782) the application of a pulse on lead 519 produces no effective output signal.

Lead 517 is connected, as shown, to the control grid of trigger triode 2793 of multivibrator 515 which is again a conventional bi-stable multivibrator and need not be again described. The other input to multivibrator 515 is connected to lead 514, as shown, by a resistance-diode-condenser combination of the kind already several times referred to. The output lead from multivibrator 515, lead 516, is, as shown, connected to the control grid of the left-hand pentode in the said multivibrator and to the control grid of cathode-follower triode 2780 as already mentioned. Accordingly, the application of a positive-going pulse on lead 517 will trigger multivibrator 515 to apply a positive-going pulse to lead 516 and thus to device 521. Equally, the trailing (negative-going) edge of a pulse on lead 514 triggers the flow of current in the right-hand pentode of multivibrator 515, thus lowering the potential of the anode of the said pentode and of the control grid of the left-hand pentode and thus re-sets this multivibrator so that it no longer applies an output voltage on lead 516.

It will thus be seen that device 521, arranged and constructed in accordance with FIGURE 40, so co-operates with multivibrator 515 and one-gate 518, that these devices collectively co-operate to act in the manner described with reference to FIGURE 5. It may also perhaps be commented that, since one-gate 518 is so connected in FIGURE 40 that device 521 applies a negative-going voltage to the inhibitory input of the said gate, it is unnecessary to provide a supplementary valve analogous to pentode 4027 in the gate circuit shown in FIGURE 46.

Slow-operate device 570 in the register shown in FIGURE 7, and slow-release device 2355 in the register shown in FIGURE 28 can each be constructed in the form of the device whose circuit is shown in FIGURE 41 of the accompanying drawings. The reason for this apparent anomaly is that, with device 570, one is concerned with the application of voltage to the output lead 571 of the device, whereas with device 2355, one is concerned with the trailing edge (i.e. the ending of voltage previously applied) of the voltage on lead 2357.

As shown in FIGURE 41, the device is provided with input terminal 2794 which is connected via condenser 2795 and resistor 2796 to the trigger electrode of cold cathode gas-discharge triode 2797, the common point of condenser 2795 and resistor 2796 being connected as shown through resistor 2798 to a positive D.C. source of potential of 50 volts. The anode of triode 2797 is connected by lead 2799 to the anode of each of two other cold cathode gas discharge triodes 2800 and 2801, respectively, and through anode resistance 2802 to a positive D.C. source of potential of 240 volts, as shown. The cathode of each of the said triodes 2797, 2800, 2801 is connected to earth lead 2803 through a resistance-capacity network of which that connected to the cathode of triode 2797 is typical, consisting, as shown, of resistors 2804 and 2805 and condenser 2806; and it is arranged that if, at a time when any one of the said triodes is conducting, any other triode is triggered to conduct, current flow in the previously-conducting triode shall cease. The condition that this shall be so is, as is well known, that (taking typical triode 2797 and its cathode circuit, for example) the time constant of the circuit consisting of resistors 2804 and 2805 and condenser 2806 shall be large enough to ensure that, if triode 2797 be extinguished by the triggering of any other of the said triodes, normal operating voltages are only restored on triode 2797 after a time greater than the de-ionization time of triode 2797—the same condition being satisfied in respect of each triode and its corresponding network.

The remaining circuit connections will be cleared from FIGURE 41, and it is more convenient to refer to them in the course of the description of the operation of the circuit than to enumerate them beforehand. It should be noted, however, that (as will appear in the course of the description) if the circuit is left undisturbed for a sufficient period, it assumes a state in which current flows in triode 2801 but not in either of the other triodes.

If, when triode 2801 is conducting, the positive going edge of a pulse is applied to terminal 2794, triode 2797 is triggered to conduct and current flow in triode 2801 ceases. The potential of the cathode of triode 2801 therefore falls, producing a negative-going pulse edge on terminal 2807, which is connected to the cathode of triode 2801 as shown. Since triode 2797 is now conducting, its cathode potential rises, condenser 2808 charges, and the potential of the trigger electrode of triode 2800 rises until triode 2800 is triggered to conduct and current flow in triode 2797 ceases. The potential of the cathode of triode 2800 now rises and condenser 2809 charges until the potential of the trigger electrode of triode 2801 has risen to a point at which triode 2801 starts to conduct and current flow in triode 2800 ceases. When triode 2801 conducts, its cathode potential rises, applying the positive-going edge of a pulse to terminal 2807.

The foregoing description has assumed that no further pulse was applied to input terminal 2794 after triode 2800 started to conduct. If, however, such a pulse had been applied while triode 2800 was conducting, triode 2797 would have been again triggered to conduct, triode 2800 would have been extinguished, its cathode potential would have fallen and condenser 2809 would discharge (mainly through diode 2810 and resistor 2811 belonging to the cathode connection of triode 2800). When, therefore, owing to the flow of current through triode 2797, the potential of the trigger electrode of triode 2800 rises for a second time to a value at which triode 2800 is triggered to conduct and current flow in triode 2797 ceases, condenser 2809 has to be re-charged, so that (assuming no further pulse appears on terminal 2795), substantially the same time will elapse between this second triggering of triode 2800 and the triggering of triode 2801, as elapsed between the triggering of triode 2800 and the triggering of triode 2801 under the conditions assumed in the preceding paragraph—viz. that no second pulse was applied to terminal 2794. (Similarly, of course, when triode 2800 is triggered and current flow in triode 2797 ceases, condenser 2808 discharges through diode 2812 and resistor 2804, and has to be re-charged, if and when the next pulse occurs on terminal 2794, before triode 2800 is again triggered to conduct.)

The values of the circuit components are so chosen for the present uses of this circuit arrangement, that the time elapsing between the triggering of triode 2797 and the triggering of triode 2800 is 5 milli-seconds, and the time elapsing between the triggering of triode 2800 and the triggering of triode 2801 (assuming that the circuit is not disturbed by the application of any further pulse to terminal 2794) is 195 milli-seconds.

Consider, then, the action of the circuit arrangement shown in FIGURE 41 when used as device 570 in the register shown in FIGURE 7, lead 566 being connected to terminal 2794 and lead 571 being connected to terminal 2807. After register channel pulses have been first applied to terminal 429, in FIGURE 7, and widener 565 has first applied voltage to lead 566 and thus to terminal 2794 of device 570, there is, before the first dialling impulse, a period of more than 200 milli-seconds, as explained in the description of FIGURE 7. Accordingly, the first application of voltage to terminal 2794 triggers triode 2797 and stops current flow in triode 2801 (the resulting negative-going voltage pulse edge on lead 2807 producing no effect on counter 572); but more than 200 milliseconds now elapse before the first dialling impulse, and device 570 reverts to the condition in which triode 2801 passes current, applying a positive-going pulse to terminal 2807 and lead 571, thus deenergising stage 0 and energising stage 1 of counter 572. It will be remembered that, at the beginning of each dialling impulse, the voltage previously applied to lead 566 is removed, and voltage is restored at the end of each dialling impulse; and the positive going pulse edge occurring at the end of each dialling impulse, triggers triode 2797 and leads to the subsequent triggering of triode 2800; but each dialling impulse (except the last, which is followed by an inter-digital pause) is followed by a further impulse in not more than 53 milliseconds, which again triggers triode 2797 and stops current flow in triode 2800. Accordingly, voltage is not restored to terminal 2807 during any dialling impulse, and is only restored during an inter-digital pause or on the completion of dialling. The device shown in FIGURE 41 accordingly, in this circuit, behaves as a slow-operate device of the kind specified in connection with FIGURE 7.

In the circuit shown in FIG. 28, it will be remembered, two-gate 2352 gives no output voltage until the beginning of the first dialling impulse; and when it starts to give an output, the positive-going edge of the pulse triggers triode 2797, stops the flow of current in triode 2801 (in which, until then, current has been flowing), and so produces a negative going pulse on lead 2357. Each of the successive dialling impulses produces on lead 2354 (in FIGURE 28) a positive-going pulse which triggers triode 2797; but unless an inter-digital pause occurs, each such pulse is followed by another before there is time for current flow to be re-established in triode 2801, so that the negative-going pulse on lead 2357 is maintained until an inter-digital pause occurs on dialling ends. There is then enough time for triode 2801 to be triggered, thus restoring voltage to lead 2357 and ending the negative-going pulse previously applied to lead 2357. This positive-going, trailing edge of the said pulse, de-energises stage 1, and energises stage 2, of counter 2335.

It will be recognised that the dialling of each succeeding digit of a wanted number, produces similar operations in the circuit shown in FIGURE 41, and, thus produces the successive "steppings" of counter 572 or counter 2355, as the case may be. It will also be recognised by those skilled in the art, that because the cathode of triode 2801 is connected with terminal 2807 by means of condenser 2813 and resistor 2814, the output voltage applied to terminal 2807 when triode 2801 is triggered, takes the form of a short positive-going pulse, which may conveniently be made to have an effective duration of about 5 milli-seconds—which is suitable for actuating counters of well-known types.

The remaining slow-release devices referred to in one or the other of the forms of exchange that have been described are:

(i) Device 288 in speech channel temporary store subunit 194 of the section control unit shown in FIGURE 4. The multivibrator device described with reference to FIGURE 38 is suitable for use as slow-release device 288.

(ii) Devices 2356 and 2358 used in the form of register shown in FIGURE 28. The conventional form consisting of a condenser charged by each ½ micro-second pulse applied to it and discharging through a resistance giving the discharge a time-constant relatively long in comparison with the pulse repetition interval, is suitable—for example, where, as in the two exchanges here described, the pulse repetition interval is 100 micro-seconds, a time-constant of 200 micro-seconds is suitable. This resistance-capacity combination has already been referred to as suitable for the slow-release devices 1048 shown in FIGURE 22. In all cases, the resistance-capacity combination should be connected to a cathode-follower circuit acting as an impedance-matching device, when impedance-matching is necessary.

Leading-edge pulse formers 762 and 765, shown in FIGURE 10, and leading-edge pulse former 2400, shown in FIGURE 29, are constituted by the well-known differentiating circuit already referred to in connection with FIGURE 41 and constituted by condenser 2813 and resistance 2814. They are designed to give an output pulse having an effective duration of about 5 micro-seconds.

Trailing-edge pulse former 612, in FIGURE 7, is designed to give an output pulse lasting about 5 milli-seconds and trailing-edge pulse former 2172, in FIGURE 26, is designed to give an output pulse lasting about 1 milli-second, at the trailing (i.e. negative-going) edge of a pulse applied to its input lead. The mono-stable multi-vibrator shown in FIGURE 37(b) is a suitable circuit device for these trailing-edge pulse formers, because, when this multivibrator is in its stable state, the application of the leading (i.e. positive-going) edge of a pulse to the input lead (viz. lead 2727 in FIGURE 37(b)) of the multivibrator does not disturb that stable state, whereas the negative-going trailing edge of the pulse causes the said multivibrator to give a pulse on the output lead of the multivibrator (viz. lead 2737 in FIGURE 37(b)). The circuit constants for this multivibrator, when it is used as device 612 or device 2172, should of course be so chosen that the multivibrator gives an output pulse which endures for the requisite time.

MODE OF OPERATION OF THE EXCHANGE SHOWN IN FIGURES 24 TO 36

The mode of operation of the exchange shown in FIGURES 24 to 36 will now be described as a whole. For convenience of reference, since the sections of the description of the mode of operation of the previous form of exchange were numbered from I to IV, the numbers of the sections of the present description will be numbered from V onwards.

Recapitulating briefly, this exchange as described and as illustrated in the drawings is one consisting of five multiplexes (multiplexes A, C, E, G, I) each of 500 subscribers, and is intended to be extended by the addition of the equipment needed for 15 more multiplexes, bringing the total number of subscribers up to 10,000. All the additional multiplexes operate, as will have been gathered, in a manner precisely similar to that in which the original five multiplexes operate. As in the form of exchange previously described, 100 channels of communication are provided, each constituted by a train of ½ micro-second pulses with a train repetition interval of 100 micro-seconds, the trains being time-interlaced. When a speech channel is allotted to a calling subscriber, the pulses of the channel allotted to the called subscriber will differ in phase by 50 channels (i.e. 50 micro-seconds) from those of the channel allotted to the calling subscriber.

It will be appreciated that when a conversation is going on between a pair of subscribers, pulses of the channel referred to as having been allotted to the calling subscriber appear on the modulator gate (2453, FIGURE 33) of his subscribers line unit, and also appear on the demodulator gate (2455, FIGURE 33) of the called subscribers line unit: similarly, pulses of the channel allotted to the called subscriber appear on his modulator gate and on the demodulator gate of the calling subscriber. Both subscribers in effect, therefore, make use of both channels, since if the calling subscriber transmits his speech on one of the channels, he receives the speech of the called subscriber on the other channel; and the called subscriber receives speed on the second-mentioned of the said channels and transmits his speech on the first-mentioned of the said channels. The channel on which a subscriber's speech is transmitted will, for the purpose of this description, be regarded as the channel allotted to that subscriber, the phase of his speech channel thus being that of the phase of the pulses appearing on his modulator gate.

To prevent misunderstanding, however, it may be pointed out that the fact that a pair of subscribers need a pair of channels, and there are only 100 channels available, does not prevent 100 conversations from being carried on simultaneously in most circumstances; for if, for example, subscriber M belonging to multiplex A is talking to subscriber N on multiplex C, and subscriber M has pulses of channel m appearing on his modulator gate and pulses of channel n appearing on his demodulator gate (subscriber N, conversely, having pulses of channel m appearing on his demodulator gate and pulses of channel n appearing on his modulator gate), there is nothing to prevent a subscriber P (also belonging to multiplex A) from carrying on a conversation with a subscriber Q (also belonging to multiplex C, or, for that matter to any multiplex other than multiplex A) by the use of the same pair of channels m and n, though, in order that subscriber P may do so, it will be pulses of channel n which then appear on the modulator gate of subscriber P (belonging to multiplex A). In other words, it is only necessary that two subscribers belonging to the same multiplex shall not have pulses of the same phase appearing on the modulator gate of each of them. The possible number of simultaneous conversations may, however, occasionally be somewhat reduced if very unlikely conditions arise, for example, if 98 subscribers belonging to one and the same multiplex are carrying on conversations with one another, no further calling subscriber belonging to that multiplex can set up a call to another subscriber connected to that same multiplex—though that calling subscriber could still set up a call to a subscriber belonging to some other multiplex, provided that an appropriate channel were free in that other multiplex.

Abuse of the telephone facilities, for example, if a subscriber fails to replace his instrument at the end of a conversation, will naturally reduce the facilities available to others just as in an ordinary electro-mechanical exchange.

One further preliminary point may be mentioned before starting the further description. In the form of exchange previously described, two forms of call were described, one between subscribers belonging to the same multiplex, and one between subscribers belonging to different multiplexes—because the operations were not the same in these two cases.

In the present exchange, where there is always a phase difference of fifty channels between the phase of the channel allotted to the calling subscriber and the phase of the channel allotted to the called subscriber, irrespective of whether the calling and called subscribers belong to the same multiplex or to different multiplexes, the operations are the same in either case. Accordingly, the following description of the mode of operation will be given in relation to a call between two subscribers connected to the same multiplex—i.e. multiplex A.

V. *Pulses Used in the Exchange*

The pulses in this form of exchange are the same as those used in the form previously described and are set out in detail in the description relating to FIGURES 2 and 3.

VI. *Conditions Existing Before a Call Is Set Up*

VI.1. *Conditions due to calls alreadys in progress.*—It is again assumed that a number of subscribers of each multiplex are already making calls, and that a number of channels in each multiplex are therefore already in use.

VI.2. *Low frequency pulses.*—As before, all of the C, D and U pulses are applied to the converter (converter K/33, in this exchange). Again, each C pulse in effect represents a number in quinary form, a pair of D pulses represents a number in decimal form, and a pair of U pulses represents a number similarly in decimal form. A complete cycle of C, D and U pulses again occupies 1,001 periods each lasting 233 micro-seconds; and during 500 of these periods there are coincidences of a C pulse, a pair of D pulses and a pair of U pulses—each of these coincidences being unique in the cycle and being associated with the number of one of the 500 subscribers connected to each multiplex.

During a period when a coincidence of C, D and U pulses occurs, the pulses are applied to five input terminals of converter K/33 in a manner which represents one of 500 numbers expressed in biquinary form; and converter K/33 changes the system of counting to one in which each of the 500 numbers is represented uniquely by pulses on three of the 16 terminals T1 to T16 (FIGURE 10). As before, of the 560 possible combinations of three terminals 60 combinations are not used.

As before, during each of 500 periods of a cycle of 1,001 periods, three terminals of the group of 16 terminals T1 to T16 from converter K/33 are "marked" by having voltages applied to them. In each multiplex of the exchange, these voltage signals mark three of 16 delay lines SDT/1 to SDT/16 in each channel pulse store such as A/31, a trio of delay lines being associated with each of the 500 subscribers belonging to each multiplex.

VI.3. *Busy channel pulses.*—Each subscriber in a multiplex is, as already described, associated with three delay lines in the busy channel store in his own multiplex. Subscriber 000 belonging to multiplex A, for example, is associated with delay lines SDT/1, SDT/6, SDT/11, as already described in connection with FIGURE 36. Supposing, to continue the example, that subscriber 0000 is busy, pulses of the channel he is using (whether it be a speech channel or a register channel) are applied from the output delay line SDT/1 (FIGURE 25) to one input of one-gate STG1/1, and from the output of one-gate STG/1 again to the input of delay line SDT/1 (for so long as no input voltage is applied to the inhibitory input of the said one-gate in synchronism with one of the said pulses). The pulses accordingly continue to be repeated in the delay line SDT/1 (and repeated in like manner in delay lines SDT/6 and SDT/11—the necessary amplifiers to make good the losses being included in the circuit arrangements of the delay lines as will appear from the later description thereof.

Each time converter K/33 (as a result of the cyclical emission of C, D and U pulses from pulse generator K/1, as already described, or because the converter is endeavouring to set up a call between two subscribers) applies voltage to those three of its T terminals which are associated with a busy subscriber—viz. terminals T1, T6, T11 for subscriber 0000—those voltages are applied (see FIGURE 36) to the corresponding leads (2121/1, 2121/6, 2121/11) of the channel pulse store (A/31, for example, see FIGURE 25) of the multiplex to which the said busy subscriber belongs; and when a pulse is emitted by e.g. one-gate STG1/1 and re-applied to the input of delay line SDT/1 that pulse is simultaneously applied to two-gate STG3/1 which (when receiving an input voltage from terminal T1 via lead 2121/1) emits a pulse (having the phase of the busy channel in question) which is applied by lead 2122/1 to one input of three-gate 2123. A pulse is applied at the same time from the other two two-gates of the busy subscriber (STG3/6, STG3/11) to two other inputs of three-gate 2123, which applies voltage as shown in FIGURE 25 to one input of two-gate 2125 and to one input of multivibrator 2126.

The pulse input to two-gate 2125 has no effect unless the busy channel in question is a register channel and the stage has been reached at which a speech channel pulse is to be fed to the delay lines of a calling subscriber. The operations which then take place will be described later.

At the lagging edge of the pulse applied to multivibrator 2126, that multivibrator ceases to apply voltage to lead 2127 and three-gate 2128, which then cannot apply to lead 2136 any new pulse during the time that the next Q pulse is applied by lead 2132 to the said three-gate. Since, as will appear later, new pulses (other than speech channel pulses needed by a calling subscriber to complete the process of connecting him with a called subscriber) are fed to these delay lines only during the existence of Q pulses, no new pulse (other than a speech pulse for the purpose just mentioned) can be fed to a busy trio of delay lines—since the existing pulses in the busy trio will repeatedly "block" the action of three-gate 2128 (so far as that trio is concerned) just before each Q pulse and the "block" is not removed until after the Q pulse has ended. After the end of each Q pulse, the next-occurring P pulse re-sets multivibrator 2126 to apply voltage once again to lead 2127, thus "unblocking" three-gate 2128.

As has been mentioned in connection with FIGURE 35(*a*), the input speech highway of each multiplex is connected by lead 2080, and the output speech highway of each multiplex is connected by leads 2474 and 2079, to the section control unit of that multiplex; and since all the busy channel pulses of a multiplex (whether speech channels or register channels) appear on the said highways, all the busy channel pulses in any multiplex are applied to the section control unit of that multiplex. Thus, turning to FIGURE 24, pulses from both the said highways are fed, in one case via clipper 2078 and delay line 2023 and lead 2083, and in the other case via clipper 2075 and lead 2081, to the inputs of one-gate 2061, thus causing all such busy channel pulses to be repeated in delay line 2084 which forms, with the said one-gate, the busy channel store of the multiplex. (The purpose of delay line 2023, which has a delay period of 50 microseconds, is of course to ensure that pulses belonging to channels having a phase difference of 50 channels and arriving from the input speech highway, on the one hand, and from the output speech highway, on the other hand, shall be applied synchronously to one-gate 2061.)

VI.4. *Free register channel pulses.*—As with the form of exchange described previously, a pulse is, in the present exchange, repeated in the free register channel store sub-unit of each section control unit, so as to be ready for a subscriber who is initiating a call and needs the use of a register. And, also as in the form of exchange previously described, repetition of that pulse in any free register channel store can be suppressed to make pulses of that phase available to another section control unit or because it is made use of by a calling subscriber belonging to the multiplex to which the said free register channel store belongs. It will therefore be supposed, as was done in the earlier description, that such a stored free register channel pulse has just been suppressed, and a description will now be given of the way in which a new free register channel pulse is secured.

When a free register channel pulse is being repeated (for example in free register channel store 2000 in section control unit A/30, see FIGURE 24), it is repeated by delay line 2018 and one-gate 2015; and when the pulse is being so repeated, multivibrator 2006 is set (by the lagging edge of the pulse when emitted from one-gate 2015) to the condition in which it gives no output to two-gate 2008. When pulses C0 and D0 are applied as shown to the two inputs of two-gate 2005, that two-gate gives an output which, applied to multivibrator 2006, causes it to apply voltage to one input of two-gate 2008 and to lead 2009; but if pulses are circulating in delay line 2018, multivibrator 2006 will be re-set in not more than 100 micro-seconds. If, however, no pulse is circulating in delay line 2018, the application of the C0 and D0 pulses to two-gate 2005, and the resulting triggering of multivibrator 2006 to apply voltage to lead 2009, persists for more than 100 micro-seconds; and the voltage applied by lead 2009 to leads 2010 and 2011 persists correspondingly.

Lead 2010 is connected (FIGURES 35(b) and 26) to one input of two-gate 2147 (near the top right hand corner of channel allotter K/30 as shown in FIGURE 26). When the next Q pulse is applied to two-gate 2147, that two-gate applies voltage on lead 2143 to one input of six-gate 2139. Now, as will appear later, delay line 2189 is repeating pulses of all speech channels which have been selected as suitable for use by subscribers who are in process of setting up calls but which have not yet been transmitted to such calling subscribers; and all such pulses are applied as shown to one negatory input of six-gate 2139. Lead 2140, connected to a second negatory input of six-gate 2139 carries pulses of all channels already in use in any register.

Lead 2089 to a third negatory input of six-gate 2139 is connected to the output of one-gate 2088 in (see FIGURE 24) busy channel store sub-unit in section control unit A/30 (which, being typical, will continue to be used, by way of example for the purpose of the present description), which one-gate 2088 has one input connected to three-gate 2090. Now since three-gate 2090 has voltage applied to it by lead 2092 from lead 2011 at the time now being considered, and has applied to its second input every pulse occurring at this time in delay line 2084 (and delay line 2084 is, as mentioned in Section VI.3, repeating every pulse of every channel in use in multiplex A), therefore, when the same Q pulse is applied to three-gate 2090 (by lead 2091) as is being applied to two-gate 2147 in channel allotter K/30 as aforementioned, three-gate 2090 applies to one-gate 2088 and one-gate 2088 applies to lead 2089, every busy channel pulse occurring the multiplex (viz. multiplex A in this example) which is needing a free register channel pulse. Thus every busy channel pulse so occurring is applied to the third negatory input of six-gate 2139.

Lead 2144 (to the "6 o'clock" input of six-gate 2139) normally applies voltage to the said input (ceasing to do so only for short periods while speech channels are being allotted); and clock pulses are being applied to the sixth input of six-gate 2139 by lead 2145. Accordingly, six-gate 2139 emits the first clock pulse which does not occur at a time when a pulse is being applied to lead 2089, to lead 2139 or lead 2141. The pulse so emitted is applied to lead 2013 which (see FIGURES 35(a) and (b)) is connected to the section control unit concerned (A/30 in this example) and thus, see FIGURE 24, once more, to two-gates 2012 and 2008. (Two-gate 2012 gives no output in section control unit A/30 which is demanding a free register channel pulse: its action in the control units of multiplexes not demanding such a pulse is described below.)

Two-gate 2008, having voltage at present applied to its second input by multivibrator 2006 by the lead shown in FIGURE 24, applies the free register channel pulse to one-gate 2015, whence it is applied to, and stored by being repeated in, delay line 2018 until needed by a subscriber belonging to multiplex A or until "stolen" for storage as a free register channel pulse in some other section control unit.

If a synchronous free register channel pulse is already stored in some section control unit of some other multiplex, then (since that section control unit will not be demanding a free register channel pulse at that time) multivibrator 2006 in the said section control unit will be applying voltage to one input of two-gate 2012; and when the free register channel pulse is emitted by the channel allotter as described above and applied to lead 2013 of section control unit A/30, it will (as will be seen from FIGURE 35(b)) be applied to the lead 2013 of every other section control unit and cause two-gate 2012 in such other section control units to apply voltage to the inhibitory input of one-gate 2015 in such other section control units. This will suppress the stored free channel pulse in that section control unit which has in store the pulse which synchronises with the pulse now being allotted to section control unit A/30—this being the stealing operation referred to at the end of the preceding paragraph.

Once the new free register channel pulse has been applied to the input of one-gate 2015, it is applied, it should be noted, not only to the input of delay line 2018, but also to lead 2007; and multivibrator 2006 is re-set at the time of the lagging edge of the pulse on lead 2007.

There is a small chance that no free register channel pulse may be available during the existence of the Q pulse above mentioned. If that small chance came about, multivibrator 2006 would not be re-set, and section control unit A/30 would continue to demand a free register channel pulse. If then, by the time the next Q pulse occurred, some other section control unit had also started to demand a free register channel pulse, and such a pulse were then allotted, it might be allotted to both section control units, and a number of complicated (but remotely unlikely) forms of misbehaviour of the exchange might then arise. If it is desired to guard against very unlikely mischances of this kind, this can be done by connecting terminal C0 on section control unit A/30 to the upper stage of multivibrator 2006, the connection being such that the said multivibrator is re-set at the lagging edge of the C0 pulse. A corresponding connection would, of course, then be made between the C terminal of each section control unit and the upper stage of multivibrator 2006 of that section control unit.

The pulse now being repeated in delay line 2018 in section control unit A/30 is applied to lead 2058 each time it is emitted by one-gate 2015 and thus to one input of three-gate 2094. Provided the section control unit is not setting up a connection to a called subscriber, there will be no voltage applied to the negatory input of the said three-gate; and accordingly, during the application of the next Q pulse to three-gate 2094 by lead 2095, that three-gate will emit a pulse to one-gate 2096 which is applied thereby to lead 2097 and thus, as will be seen on reference to FIGURE 25, to one input of three-gate 2128 in channel pulse store A/31.

As will be remembered, the delay lines in channel pulse store A/31 are being periodically "tested" by the application of voltage from converter K/33; and it will also be remembered from Section VI.3 that if a trio of delay lines is repeating pulses in synchronism with one another, multivibrator 2126 is triggered to remove voltage temporarily from one input of three-gate 2128. But assuming that multivibrator is in the condition in which it applies a voltage to three-gate 2128, then, at the time of the Q pulse referred to at the end of the preceding paragraph, the same Q pulse will be applied to the third input of three-gate 2128 also, and the pulses applied to it on lead 2097 will be re-emitted by the said three-gate on lead 2136 to one-gate 2134 and thus applied to one input of each of the two-gates of the set STG2/1 to STG2/16. Such of the said two-gates as are at the same time having voltage applied to their other input from converter K/33 will then emit to their associated one-gate (belonging to the set STG1/1 to STG1/16) and to their associated delay line, a pulse of the phase of the free register channel pulse which has been applied to lead 2097 as above described; but when the next P pulse occurs and is applied by lead 2056 to two-gate 2053 (in release control sub-unit, FIGURE 24), that gate will, since it also is receiving free register channel pulses on lead 2057 from lead 2058, emit a pulse to one-gate 2035 which in turn applies it to lead 2052. This lead, as will be seen from FIGURE 25, is connected to the inhibitory input of all of one-gates STG1/1 to STG1/16, thus suppressing the free register channel pulse fed into them during the last preceding Q pulse. The only circumstance in which the pulse thus fed to a trio of delay lines will not be cancelled during the next ensuing P pulse, is that in which, between the occurrence of the Q pulse and the occurrence of the P pulse, the former free register channel pulse has been acquired by a subscriber (belonging to the multiplex in question) who has started to make a call and has been allotted that pulse for his register channel. If a calling subscriber does so acquire a free register channel pulse, it ceases to be "free," is suppressed in the free register channel store sub-unit, and is caused to be repeated in the busy register channel store and in the busy channel store; and since it has then been suppressed in the free register channel store, it is no longer available to produce the pulse above referred to on the inhibitory inputs to one-gates STG1/1 to STG1/16. The manner in which the operations described in the preceding sentence are performed, will be described in the next section of this description.

VII. *Performance for a Successful Call*

VII.1. *Seizure of a register channel.*—It will be assumed that subscriber 0001 is calling subscriber 0499.

Subscriber 0001 is, as several times explained already, associated with delay lines SDT/1, SDT/6, SDT/12, in channel pulse store A/31 of multiplex A. When he lifts his instrument to make the call, he removes the bias from modulator four-gate 2453 in subscribers line unit AA/0001 (FIGURE 33) as already explained. Accordingly, when his said delay lines are next "tested" by the application of voltage from terminals T1, T6, T12 of converter K/33, and the free register channel pulse is fed to those three delay lines as above described, and is applied by leads 2117/1, 2117/6, 2117/12 to his four-gate 2453, that four-gate emits this register channel pulse on lead 2454/1. The pulse is thence applied, as shown in FIGURE 35, via junction unit 2606 to the output speech highway of multiplex A and thus to lead 2474 and to lead 2079.

The application of the pulse to lead 2079 causes the pulse to be applied (via clipper 2075) to lead 2081 and to the input of one-gate 2061, so that the pulse of what was previously the free register channel starts to be repeated in delay line 2084. The pulse is also fed from the output of one-gate 2061 to lead 2021 to the inhibitory input of one-gate 2015 in the free register channel store sub-unit (thus suppressing repetition of this pulse in the store last-mentioned, as referred to at the end of the preceding section of this description), and also from lead 2021 by lead 2020 to one input of three-gate 2019 in the said free register channel store. The last pulse from delay line 2018 also appears on the second input to three-gate 2019 simultaneously with the application of the pulse on lead 2020 to that gate. There can be no input to the negatory input of the said three-gate on lead 2022, since such an input would have come from the speech input highway of the multiplex (via lead 2080, see FIGURE 35(a) and thence via clipper 2078, see FIGURE 24 again, lead 2082 and delay line 2023 to lead 2022). For, in the first place, as already explained, the free register channel pulse was originally selected not to coincide with any pulse occurring on either highway at the time of selection; and, in the second place, if a pulse synchronising with the allotted free register channel pulse had subsequently appeared on either highway, it would have suppressed the further circulation of the said pulse in the free register channel store, because pulses from both highways are fed, via lead 2079 and clipper 2075, or via lead 2080 and clipper 2078, to the input of one-gate 2061—and therefore, from whichever highway pulses arrive, they result in an inhibitory input to one-gate 2015 as described above.

Since, therefore, three-gate 2019 receives a pulse on two of its inputs, and no pulse on its negatory input, it emits a pulse of the phase of the former free register channel to one-gate 2024, causing a pulse of the said phase now to be repeated in delay line 2025 in busy register channel store sub-unit of section control unit A/30.

The pulse thus being repeated in delay line 2025, is each time applied from the output of one-gate 2024 to (inter alia) one input of two-gate 2028, which is synchronously receiving pulses on its second input over lead 2474. Two-gate 2028 accordingly applies pulses of this phase (which will now be referred to as the allotted register channel) to lead 2475 and thus (see FIGURES 35 (a) and (b)) to register highway 2601. From register highway 2601, pulses of the allotted register channel are applied via junction unit 2603 and lead 2294 to register control unit K/31. From lead 2294, as will be seen from FIGURE 27, the pulse passes through clipper 2291 in the control section of unit K/31, and thus (a) by lead 2295 to one-gate 2296 and delay line 2298 (where it is repeated in the usual way), and (b) by lead 2290 to one input of four-gate 2287.

Four-gate 2287 will not at this time be receiving pulses on either of its negatory inputs (for reasons which will appear later); and therefore, when a P pulse is next applied to the fourth input of four-gate 2287 by lead 2289, this four-gate emits the pulse on lead 2288 and thus applies it (see FIGURE 35(c) and the description thereof) to one input of five-gate 2353 (see FIGURE 28) of every register in the exchange.

VII.2. *Seizure of a register.*—The way in which a register is selected and seized when pulses are applied to the five-gates 2353, and the way in which dial tone is supplied to a calling subscriber and then cut off when he dials the first digit of the wanted number, have already been described in the course of the description of FIGURE 35, and therefore need not be repeated.

A register having thus been allocated to the calling subscriber, and pulses of his alloted register channel having started to be repeated in the three of delay lines RRD1 to RRD6 associated with that register, pulses of the said register channel will be applied to at least one input of one-gate 2273 in register control unit K/31 as shown in FIGURE 27. This one-gate now applies pulses of this channel to the negatory input of four-gate 2287 (mentioned above), so that this four-gate ceases to emit pulses on lead 2288 to the various registers and no other register can be seized for this call.

It is now necessary to revert to the instant, 100 microseconds before one-gate 2273 started to emit pulses as above mentioned. When pulses first appeared at the inputs of the trio of delay lines concerned, they were also applied to inputs of one-gate 2271 lying to the left of the delay lines; and the first of those pulses, when emitted by the latter one-gate, is applied on lead 2270 to one input of two-gate 2269, which at this time has no pulse on its negatory input and therefore emits a pulse on lead 2268 to one input of one-gate 2266, so that the pulse starts to be repeated in delay line 2265. (No second pulse is emitted, in the phase of the register channel now concerned, during the setting up of the call now under consideration, since when every later pulse of this register channel is applied by one-gate 2271 to two-gate 2269, a synchronous pulse is applied to the negatory input of the said two-gate from one-gate 2273.) Pulses circulating in delay line 2265 are applied from the tap on that delay line by lead 2264 (and therefore delayed by 50 micro-seconds as compared with their time of application to the input of the said delay line) to one input of two-gate 2254, where (as mentioned earlier in this specification) they are modulated by dial tone applied to the other input of the said two-gate by lead 2254D, and the modulated pulses are emitted by two-gate 2254 and applied to one input of one-gate 2251 and re-emitted on tone highway 2252 and applied by each lead 2032 to each section control unit in the exchange.

However, it is only in section control unit A/30 that when (see FIGURE 24) the said pulses are applied to one input of two-gate 2031, pulses of the same phase are being applied to the second input of two-gate 2031 by lead 2030 (connected to the tap on delay line 2025—which latter is, as already explained, now repeating pulses of the phase of the register channel which is in use for the call now being described). Accordingly, it is only two-gate 2031 in section control unit A/30 which emits on its lead 2033 these pulses modulated by dial tone. These pulses are applied by lead 2033 to one-gate 2600 (see FIGURE 35) and thus (as described in the earlier descripiton of the said figure) to the demodulator gate of all subscribers line units of multiplex A; but it is only in the line unit of the calling subscriber that modulated pulses thus appearing on all the leads 2456 of multiplex A, are applied to a demodulator gate which is receiving pulses of the same phase from its three associated delay lines. Accordingly, it is only the pulses on lead 2456(1) that are effective to produce an output from demodulator gate 2453 in subscribers line unit AA/0001 and to be heard (as described in the course of the description of FIGURE 33) in the instrument of the calling subscriber.

The dialling of the first digit by the calling subscriber then cuts off the supply of dial tone as already mentioned.

VII.3. *Operation of the register.*—The way in which pulses are applied from the delay lines in register control unit K/31 to the operating register and are reapplied from the register to the inputs of the said delay lines, the way in which interruptions (by dialling impules) of the register channel pulse trains applied to lead 2370 cause the counters in the register to be set in accordance with the dialling impulses, and the way in which (at the appropriate time) the application of the appropriate pulses to the inputs of four-gate 2336 in the register (see FIGURE 28) cause the register to apply voltage to its output terminals $m0$ to $u6$ (and thus to corresponding terminals on converter K/33 and on MC unit K/34), have already been described. It has not yet been described, however, precisely how the dialling interruptions are caused to appear in the register channel pulses on register highway 2601.

In precisely the same way that dialling impulses in the form of exchange previously described, interrupted the output from modulator gate 918 in subscribers line unit A/0001 in FIGURE 19, so do dialling impulses from subscriber 0001 interrupt the output of register channel pulses from modulator gate 2453 in subscribers line unit AA/0001 in FIGURE 33, i.e. interrupt the output on load 2454(1). These interrupted register channel pulses are accordingly applied to lead 2474 and thus to two-gate 2031 in section control unit A/30 (FIGURE 24); and the output from two gate 2028 to lead 2475 is therefore correspondingly interrupted. That is to say, since lead 2475 is connected (as shown in FIGURE 35) to register highway 2601, the register channel pulses being used by the calling subscriber appear on the register highway as interrupted by his dialling impulses during the time he is dialling. The appropriate setting of the counters in the relevant register is therefore produced as mentioned in the preceding paragraph.

VII.4. *Operation of the converter.*—The way in which voltages applied to terminals $m0$ to $m6$, $c0$ to $c6$, $d0$ to $d6$, $u0$ to $u6$ of a register, cause voltages to appear at the output terminals of converter K/33 and of MC unit K/34, has already been explained—the explanation for MC unit K/34 having been given in detail in the description of that unit, and the explanation for converter K/33 being the same as for converter K/3 since converter K/3 and converter K/33 are identical as regards their respective response to the application of voltages to them from the registers.

(The difference between converter K/33 and converter K/3, lies in that converter K/3 assists in determining when a register gives its output, whereas the function of assisting in determining when a register gives its output has, in the form of exchange now being described, been transferred to the channel allotter.)

For the present call to subscriber 0499, voltages appear on terminals T10, T15, T16 (see Table C, FIGURE 13). When voltages cease to be applied to converter K/33 by a register, converter K/33 reverts to its preparation state.

VII.5. *Recognition and testing of called subscriber.*—It has been explained in the description of MC unit K/34 that each multiplex is identified by two $m$ voltages (i.e. a voltage appearing on one of the set of terminals $m0$, $m1$, $m2$, $m3$, $m4$, and a voltage appearing on terminal $m5$ or $m6$) of a register, together with the appearance of a voltage on either terminal $c5$ or $c6$ of the register in question. And it was there further explained how the possible combinations of an $m5$ or an $m6$ voltage, with a $c5$ or a $c6$ voltage, lead to the application of voltage to one of terminals 2402, 2403, 2404, 2405 on MC unit K/34. Table F, in the description of MC unit K34, lists to which output terminals of the set $m''0$, $m''1$, $m''2$, $m''3$, $m''4$, and of the set 2402, 2403, 2404, 2405, voltage is applied for the identification of any multiplex. Accordingly, since subscriber 0499 is now being called, voltage is applied to terminals $m''0$ and 2402, as set out in Table F.

Voltage is therefore applied, as can be seen from FIG-

URE 35(c), by leads 2115 and 2116 to two inputs of two-gate 2105 in the called subscriber testing sub-unit (see FIGURE 24) of the multiplex to which the called subscriber belongs, viz. multiplex A. (The fact that this multiplex happens, in this example, to be the same as that of the calling subscriber makes no difference to this stage of the operations of setting up a call.) Two-gate 2105 therefore applies voltage to multivibrator 2110 (where it produces no effect, since multivibrator 2110 is not, with a successful call, at any time triggered to apply voltage to lead 2111), to one input of four-gate 2103, to one input of three-gate 2102, to the negatory input of three-gate 2094, and to one input of multivibrator 2106 (on which multivibrator the application of voltage produces no effect, since, as will be seen from FIGURE 24, it is the lagging edge of a pulse applied from lead 2096 to multivibrator 2106 that is effective to trigger that multivibrator).

It will be remembered from the description of MC unit K/34, that that unit started to apply voltage to terminal 2402 at the beginning of a P pulse, at which time voltage had already been applied to terminal $m''0$. It will also be seen from FIGURE 24, that Q pulses are applied by lead 2104 to one input of four-gate 2103 and to one input of three-gate 2102. Accordingly, when the next Q pulse occurs after the P pulse just referred to, the said four-gate and the said three-gate have voltage applied to two inputs of each of them; and which of the said gates gives an output, depends on whether the called subscriber is busy or not.

Now it will be remembered from the description in Section VI.3 above, that if a subscriber is busy at the time when his identifying voltages appear on a trio of terminals T1 to T16, multivibrator 2126 (see FIGURE 25) is triggered (by the lagging edge of a pulse from three-gate 2123) not to apply voltage to one input of three-gate 2128 and that this condition persists during the next-ensuing Q pulse; and it will now also be seen from FIGURE 25 that when multivibrator 2126 does not apply voltage to three-gate 2128, it does apply voltage to lead 2101 and therefore, as shown in FIGURE 24, to one input of four-gate 2103 and to the negatory input of three-gate 2102. Such a state of affairs would indicate that a called subscriber was busy—as is further explained below.

But in the present case, it is assumed that a successful call is going to be made to subscriber 0499: accordingly, multivibrator 2126 (in FIGURE 25) has not been triggered in the way above mentioned, and it is applying voltage to lead 2127 and not to lead 2101. Therefore, referring to FIGURE 24, there is no voltage applied by lead 2101 to the negatory input of three-gate 2102 and no voltage applied by that lead to four-gate 2103. Four-gate 2103 therefore cannot give an output at this time. But three-gate 2102 has voltage applied (as just described) to its two "ordinary" inputs, and no voltage applied to its negatory input, and it therefore gives an output which is applied to trigger multivibrator 2106, causing the latter to apply voltage to one input of each of two-gates 2107 and 2108, and removing the voltage input from the fourth input of four-gate 2103. (The purpose of thus removing the voltage from the fourth input of four-gate 2103, is to prevent that gate from giving an output—which would lead to the giving of a busy signal to the calling subscriber—when the called subscriber becomes busy by reason of the fact that the call now in progress is being set up in the equipment which is serving this called subscriber.) Multivibrator 2106 is in due course re-set, by the lagging edge of the voltage pulse on lead 2096, which lagging edge occurs when, at the end of the output from MC unit K/34, two-gate 2105 ceases to give an output voltage.

If the called subscriber were "unobtainable," voltage would by now have been applied to lead 2112. (The means by which voltage would have been so applied has already been described in the course of the description of ringing and metering unit A/32: the precise way in which these means are caused to operate will be described later.) But since it is assumed, for the purposes of the present explanation, that a successful call is in process of being set up, it is assumed that subscriber 0499 is not "unobtainable"; and accordingly, there is no voltage on lead 2112. Two-gate 2108 therefore has no voltage applied to its second input and cannot give an output. Two-gate 2107 has no voltage applied to its negatory input and therefore, on receiving voltage from multivibrator 2106, applies voltage to leads 2093 and 2113. The effect of the application of voltage to lead 2093 will be described later, it being concerned with the selection of suitable speech channels.

The effect of applying voltage to lead 2113, is that voltage is applied to one input of two-gate 2153 in channel allotter K/30. This in effect "notifies" the channel allotter that the called subscriber is free—and also, in effect, that he is not unobtainable, since no such signal would have been applied to the channel allotter if the called subscriber were unobtainable. The operations which follow upon this application of voltage to two-gate 2153 will be described in Section VII.7, it being first necessary to describe the manner in which the channel allotter "recognises" from which multiplex the call has originated.

VII.6. *Recognition of the multiplex to which the calling subscriber belongs.*—While the relevant register is applying voltage to the appropriate output terminals of the set $m0$ to $u6$, voltage is also, as shown in FIGURE 28, being applied by lead 2344 to one input of two-gate 2345, which is receiving on its second input the pulses of the register channel that is being used by that register. These pulses are accordingly being applied (see FIGURES 35(c) and (b) by lead 2182 to (see FIGURE 26) one-gate 2176 shown (at the bottom right-hand corner) in control sub-unit 2137 of channel allotter K/30. Pulses of this register channel are accordingly repeated in delay line 2181 and are also applied by lead 2179 to terminal 2180—whence they are applied (see FIGURE 35(b)) by lead 2037 to section control unit A/30 and similarly applied to every other section control unit. The lead 2037 for each section control unit applies these pulses to the three-gate 2027 in that section control unit; but only in section control unit A/30 do the said pulses synchronise with pulses being applied to the said three-gate from one-gate 2024.

Pulses of this phase will not, for the time being, be applied to the negatory input of three-gate 2027; and three-gate 2027 accordingly re-emits pulses of the phase of the register channel concerned, to one input of two-gate 2038 and to the input of multivibrator 2042.

The effect of the input of ½ micro-second pulses to multivibrator 2042 is to cause that multivibrator to give a continuous output, to multivibrator 2044 and to lead 2043, for so long as such ½ micro-second pulses continue to be received by multivibrator 2042 at intervals of 100 micro-seconds. The voltage applied to lead 2043 is applied (see FIGURES 35(a) and (b)) to terminal 2232 on the interconnecting sub-unit 2138 which serves the multiplex to which the calling subscriber belongs, and indicates (since it is appearing on terminal 2232 and not one of the other terminals of the group of five to which terminal 2232 belongs) the actual multiplex (viz. multiplex A) to which the calling subscriber belongs.

At this stage, however, the application of voltage to terminal 2232 causes voltage to be applied (as will be seen from FIGURE 26) to one input of one-gate 2171 and therefore by lead 2170 to one input of one-gate 2162. This causes the latter one-gate to apply voltage to the second input of two-gate 2153. The channel allotter has thus had voltages applied to a selection of its circuit components which selection is peculiar to the multiplex to which the calling subscriber belongs; and multivibrator 2150 is triggered by the voltage from two-gate 2150 to apply voltage to one input of three-gate 2154.

The next stage is to select suitable speech channels for use by the calling and called subscribers.

VII.7. *Selection of speech channels.*—The selection of suitable speech channels is effected by causing the section control unit of the multiplex to which the called subscriber belongs, and the section control unit of the multiplex to which the calling subscriber belongs, to transmit to the channel allotted pulses indicating what channels are busy in each of these multiplexes. This is done as follows.

In the section control unit of the called subscriber, voltage is being applied (as mentioned in section VII.5 above) to one input of two-gate 2087 (see FIGURE 24) in the busy channel store sub-unit of the section control unit of the called subscriber. Pulses are also being applied to two-gate 2087 by lead 2086 from the output of one-gate 2061 which is repeating every pulse of every channel in use in the multiplex to which the called subscriber belongs. Accordingly, two-gate 2087 now applies to one input of one-gate 2088 every pulse of every channel which is busy in the multiplex to which the called subscriber belongs, and one-gate 2088 in turn applies every such pulse to lead 2089 and thus (see FIGURES 35(a) and (b)) to lead 2159 in channel allotter K/30 (see FIGURE 26) and thus to the negatory input to three-gate 2154. (Leads 2089 and 2159 are found near the top left-hand corner of the channel allotter.)

In the section control unit of the calling subscriber, multivibrator 2044 has been triggered by multivibrator 2042 (both which multivibrators are in busy register channel store in the section control unit of the calling subscriber) to apply voltage on lead 2046 to one input of two-gate 2047 (in the busy channel store of the section control unit last mentioned), as mentioned in Section VII.6 above. Two-gate 2047 is receiving on its second input pulses from the tap on delay line 2084 in the said busy channel store: accordingly two-gate 2047, since it is receiving voltages on both its inputs, omits every pulse of every channel which is in use in the multiplex to which the calling subscriber belongs. It will be noted that these pulses are derived from the tap on delay line 2084 and therefore have a phase difference of 50 channels from the phase in which the said pulses appear on the modulator gates of the subscribers who belong to the calling subscriber's multiplex and are using the said channels in the calling subscribers multiplex. The pulses thus omitted by two-gate 2047 in the section control unit of the multiplex to which the calling subscriber belongs, are applied to one input of one-gate 2088 in the section control unit of the multiplex to which the calling subscriber belongs, and are therefore applied to the lead 2089 from that section control unit and are accordingly applied to the negatory input of three-gate 2154 in channel allotter K/30—in the same way that busy channel pulses were applied to the said three-gate from the section control unit in the multiplex to which the called subscriber belongs.

Three-gate 2154 in channel allotter K/30 (FIGURE 26) thus has applied to its negatory input every pulse of every channel which is busy in either the section control unit of the called subscriber or the section control unit of the calling subscriber. (It may be remarked at this point that, in the present example, the called and the calling subscriber belong to the same multiplex, viz. multiplex A; and it will also be seen from the explanation in the two foregoing paragraphs that no difference is made by the fact that the two subscribers do belong to the same multiplex.) Three-gate 2154 also has applied to it, by lead 2146, clock pulses from clock pulse unit CPU/10 and will be receiving voltage on its third input from multivibrator 2150 (since this is assumed to be a successful call, and multivibrator 2150 ceases to apply voltage to three-gate 2154 only if there is no suitable pair of speech channels available); and the said three-gate accordingly emits the first of these clock pulses that does not synchronise with any pulse applied to its negatory input—i.e. the said three-gate emits a pulse belonging to a channel which is not in use either in the multiplex to which the calling subscriber belongs or to the multiplex to which the called subscriber belongs. It will be seen that, owing to the way in which the pulses were derived which are applied to the negatory input of three-gate 2154, a pulse can only be emitted by it if there are two free channels with a phase difference of 50 channels, one such channel being in the multiplex to which the calling subscriber belongs and the other such channel being in the multiplex to which the called subscriber belongs.

The pulse emitted by three-gate 2154 is applied, as will be seen from FIGURE 26, to one input of one-gate 2160 and thus starts to be repeated in delay line 2189. As these pulses are repeated in delay line 2189, they are applied to leads 2050 and 2100, appearing on lead 2050 in the phase of the speech channel which will be used by the calling subscriber, and appearing on lead 2010 in the phase of the speech channel which will be used by the called subscriber. The said pulse emitted by one-gate 2160 is also applied (see FIGURE 37(a)) by leads 2100, 2141 and 2141/1 to one-gate 2151 and thus to multivibrator 2150, causing the latter to cease to apply voltage to one input of three-gate 2154 and preventing the latter from emitting a further speech channel pulse for the present call. (Multivibrator 2150 should, of course, not be designed to trigger so rapidly that it removes voltage from the third input to three-gate 2154 before it has completed the emission of the ½ microsecond pulse which that three-gate has to apply to one-gate 2160.)

VII.8. *Speech connection of the called subscriber.*— The speech channel pulses now being emitted (as described at the end of the last section) on lead 2100 are applied thereby (see FIGURE 35) to (see FIGURE 24) one input of two-gate 2099 in called subscriber testing sub-unit of the section control unit of the called subscriber (and to the corresponding two-gate in every other section control unit). Now when two-gate 2107 gave an output as described in the penultimate paragraph of Section VII.5 (which output was given only in the section control unit of the multiplex to which the called subscriber belongs), that voltage was applied, as can be seen from FIGURE 23, to the other input to two-gate 2099; and two-gate 2099 accordingly now emits on lead 2098 a pulse of the phase of the called subscriber's speech channel, which pulse, being applied to one-gate 2096, is applied to lead 2097 and thus, see FIGURE 25, to one input of three-gate 2128, which, since the called subscriber is not busy, has voltage applied to its second input on lead 2127.

Now the foregoing operation of finding suitable speech channels was described as effectively starting with the application of a Q pulse on lead 2104 to three-gate 2102 and four-gate 2103 in the section control unit of the multiplex to which the called subscriber belongs. That Q pulse is still being applied also to three-gate 2128 in the channel pulse store of the multiplex to which the called subscriber belongs, at the time when the aforesaid speech channel pulse is applied to three-gate 2128 above-mentioned; and three-gate 2128 accordingly emits the said speech channel pulse on lead 2136 to one-gate 2134, which re-emits the pulse on lead 2120 and thus applies it to one input of each two-gate of the set STG2/1 to STG2/16. The pulse is re-emitted by those three of the said two-gates which are being "marked" by voltage applied from converter K/33, i.e. by the three of the said two-gates which are associated with the delay lines associated with the called subscriber, and therefore starts to be repeated in the delay lines (in the channel pulse store) which are associated with the called subscriber. Pulses of the phase of the called subscriber's speech channel accordingly now appear on three inputs of the modulator gate of the called subscriber—in the manner already described earlier.

VII.9. *Speech connection of the calling subscriber.*— The speech channel pulses which are, as described in the last paragraph of Section VII.7, being emitted on lead 2050 are applied thereby (see FIGURES 35(b) and (a)) to (see FIGURE 24) one input of two-gate 2045 in busy register channel store sub-unit in the section control unit of the calling subscriber (and to the corresponding two-gate in the section control unit of every other subscriber). Only in the section control unit of the calling subscriber is there voltage applied to the second input of two-gate 2045 (that voltage being applied from multivibrator 2042); and therefore only in the section control unit of the multiplex to which the calling subscriber belongs does two-gate 2045 re-emit speech channel pulses on lead 2051. Pulses so applied to lead 2051 in the multiplex to which the calling subscriber belongs are applied to two-gate 2131 (see FIGURE 25) of the channel pulse store of the said multiplex.

At the end of a period of 1 milli-second from the time when, as described in the third paragraph of Section VII.6, multivibrator 2042 applied voltage to multivibrator 2044 (thereby causing the latter multivibrator to cease to apply voltage to lead 2046), multivibrator 2044 reverts to the condition in which it applies voltage to two-gate 2038. Register channel pulses of the calling subscriber are still being applied to three-gate 2027 and therefore applied to the second input of two-gate 2038. Accordingly when, as just mentioned, voltage is re-applied to the other input of two-gate 2038, it emits the pulses of the phase of the calling subscriber's register channel of the lead 2048 (FIGURE 24) to which lead is connected (as mentioned in the description of channel pulse store A/31) lead 2129. Lead 2131, as shown in FIGURE 25, applies the said pulses of the phase of the said register channel to one input of two-gate 2125 in the said channel pulse store.

Converter K/33 will, by the end of the afore-mentioned period of 1 milli-second, have reverted to its "preparation" state, and will, within a quarter of a second, "test" the delay lines associated with the calling subscriber in the channel pulse store of the multiplex to which he belongs; and the trio of delay lines associated with the calling subscriber will then simultaneously apply a voltage pulse to three inputs of three-gate 2123, causing the latter to emit the said pulse and apply it to the second input of two-gate 2125 where it will synchronise with one of the pulses being applied to the other input of two-gate 2125 by lead 2129. This output from two-gate 2125 will occur during the first 100 micro-seconds of the period during which the delay lines associated with the calling subscriber are being "tested" as just mentioned, so that there is a margin of time, before the end of the period during which the delay lines of the calling subscriber are being "tested" by voltages applied by converter K/33, during which the arrival of a pulse of the phase of the calling subscriber's speech channel on lead 2051 can be awaited.

Accordingly, two-gate 2125 having been caused to give an output as described in the preceding paragraph, and having thus triggered multivibrator 2130 to apply voltage to lead 2070/1 and thus to one input of two-gate 2131, the latter two-gate gives an output pulse (of the phase of the calling subscriber's speech channel) when a pulse of the phase of that channel is next applied on lead 2051 to the other input of two-gate 2131. The pulse so emitted by two-gate 2131 is applied as shown in FIGURE 25 to one-gate 2134 and re-applied by the latter to lead 2120 and thus to one input of each two-gate of the set STG2/1 to STG2/16. It is re-emitted by the three of the said two-gates that are being "tested" by voltage applied from converter K/33, i.e. by the three of the said two-gates which are associated with the delay lines of the calling subscriber; and pulses of the speech channel of the calling subscriber accordingly now begin to be repeated in the three delay lines associated with the calling subscriber. (Multivibrator 2130 will, it will be noted, be re-set by the trailing edge of the Q pulse next occurring after the aforesaid pulse from two-gate 2125.)

At the same time that voltage was applied as just mentioned to lead 2070/1, it of course appeared on lead 2070 and was thus applied (see FIGURE 35) to (see FIGURE 24) one input of three-gate 2049 in release control sub-unit in the section control unit of the multiplex to which the calling subscriber belongs. Three-gate 2049 is also receiving pulses from two-gate 2038 (since two-gate 2038 is now again receiving voltage from multivibrator 2044 and is still receiving register channel pulses from three-gate 2027) on its second input; and during the period during which the foregoing events are occurring, a Q pulse will also be applied to three-gate 2049 from lead 2071. Three-gate 2049 accordingly emits a pulse of the register channel to one input of one-gate 2035. The pulse consequentially emitted by one-gate 2049 is: (a) applied by lead 2034 to the inhibitory input of one-gate 2029, thus suppressing this register channel pulse from further repetition in delay line 2025 in the busy register channel store of the calling subscriber's section control unit; (b) applied by lead 2052 (see FIGURE 35(a)) to (see FIGURE 25) to the inhibitory input of each of one-gates STG1/1 to STG1/16, thus suppressing pulses of this register channel from further circulation in the delay lines in which those pulses are occurring, viz. the delay lines associated with the calling subscriber.

The suppression of the repetition of pulses in delay line 2025 ends the emission of pulses from one-gate 2024 and therefore ends the application of pulses to one of the inputs of three-gate 2027, which accordingly ceases to apply pulses on lead 2041 to multivibrator 2042. The latter therefore reverts, 120 micro-seconds later, to the condition in which it no longer applies voltage to two-gate or to multivibrator 2044. Multivibrator 2042 also ceases to apply voltage via lead 2043 to terminal 2232 on channel allotter K/30. It should be understood, however, that before voltage has disappeared from terminal 2232, other operations have been performed elsewhere in the equipment, which operations will now be described.

VII.10. *Selection and function of an interconnecting unit.*—As mentioned in the last paragraph of Section VII.7, pulses of the two allotted speech channels appear, respectively, on leads 2050 and 2100 when those speech channels are allotted; the said pulses accordingly appear on leads 2203 and 2199, respectively, as will be seen from FIGURE 26. Pulses on lead 2203 are applied to one input of two-gate 2204 and to the permissory input of composite gate 2202. Pulses on lead 2199 are applied to one input of two-gate 2200 and to the permissory input of composite gate 2202.

It was explained in Section VII.6, that when the multiplex to which the calling subscriber belong was "recognised," voltage was applied to terminal 2232 in interconnecting sub-unit 2138 of channel allotter K/30, because the calling subscribe belongs to multiplex A. Had the calling subscriber belonged to some other multiplex, instead of voltage having been applied to terminal 2232 of the first interconnecting sub-unit 2138 of channel allotter K/30, that calling subscriber's section control unit would have applied voltage to the appropriate terminal (out of the group 2232 to 2236) on the sub-unit 2138 which serves the multiplex to which that calling subscriber belonged—as will be clear from the earlier description of the way in which the section control units are connected to the channel allotter. Because voltage is thus applied to terminal 2232 and thus to the first input of each of composite gates 2202 and 2206, each of these gates is prepared to emit a pulse each time a voltage pulse is applied to its permissory input.

235

Consider, then, the effect of the pulses of the phase of the speech channel allotted to the calling subscriber, the which pulses are appearing on lead 2050 and therefore on lead 2203, and therefore to one input of two-gate 2204 and to the permissory input of composite gate 2206. Since the voltage identifying the calling subscriber's multiplex is applied to terminal 2232, and therefore to the first input of composite gate 2206, that gate emits a pulse to one input of one-gate 2222, which in turn applies that pulse to terminal 2227, each time a pulse of the calling subscriber's speech channel appears on lead 2203. Similarly, pulses of the phase of the called subscriber's speech channel are appearing on lead 2100 and therefore on lead 2199, and are accordingly being applied to one input of two-gate 2200 and to the permissory input of composite gate 2202. Here again, in virtue of the fact that the calling subscriber's multiplex is, in this example, multiplex A, so that the identifying voltage for the calling subscriber's multiplex is applied to terminal 2232 in the interconnecting sub-unit 2138 which serves the calling subscriber's multiplex, that identifying voltage is applied to the first input of composite gate 2202 in the said sub-unit 2138: therefore, each time a pulse of the phase of the called subscriber's speech channel appears on lead 2199, a pulse of the same phase is (in the sub-unit 2138 which serves the calling subscriber's multiplex) emitted by composite gate 2202 to one input of one-gate 2212 and re-applied by the latter one-gate to terminal 2217.

It will be noted that, in the interconnecting sub-unit 2138 which serves the calling subscriber, pulses of the phase of the called subscriber's speech channel appear on terminal 2217 (i.e. one of the terminals of the upper group 2217 to 2220), while pulses of the phase of the calling subscriber's speech channel appear on terminal 2227 (i.e. one of the terminals of the lower group 2227 to 2230).

Consider next the effect of the identification of the multiplex to which the called subscriber belongs, by the application of voltage from one of terminals $m''0$, $m''1$, $m''2$, $m''3$, $m''4$, and one of terminals 2402, 2403, 2404, 2405, to, respectively, one of terminals 2237 to 2241 of the interconnecting sub-unit 2138 (in channel allotter K/30) which serves the multiplex to which the called subscriber belongs. In the present example, the said identifying terminals are $m''0$, so that voltage is applied to terminal 2237 of the interconnecting sub-unit 2138 which serves the called subscriber, and 2402, which applies voltage to terminal 2209 of the first of the said sub-units 2138. Now leads 2203 and 2199 are connected, in the way already described, to every interconnecting sub-unit 2138; and since, in the present example, it is the first of the said sub-units which has been identified by the identifying voltages just mentioned, it is the operations in the first interconnecting sub-unit 2138 that need to be considered (though the operations would be of an exactly similar kind if some other sub-unit 2138 were involved).

As shown in FIGURE 26, the speech channel pulses of the phase of the calling subscriber are applied from lead 2050 via lead 2203 to one input of two-gate 2204 and to the permissory input of composite gate 2206 in the sub-unit 2138 that serves the called subscriber; and in the said sub-unit that serves the called subscriber, two-gate 2204 has one of the aforesaid identifying voltages applied to its second input. Two-gate 2204, in the sub-unit 2138 serving the called subscriber, therefore emits pulses of the calling subscriber's speech channel and applies them to the permissory input of the associated composite gate 2211. That composite gate has applied to one of its inputs, the identifying voltage from one of terminals $m''0$, $m''1$, $m''2$, $m''3$, $m''4$ of MC unit K/34: in this example the identifying voltage is applied by terminal $m''0$, and it is therefore applied to terminal 2237 of the sub-unit 2138 which serves the called subscriber.

236

Accordingly, the said identifying voltage is applied in this example to the first input of composite gate 2211; and each time a pulse of the phase of the calling subscriber's speech channel is applied to the permissory input of gate 2211, that gate re-emits such pulse on its first output and applies it to one input of one-gate 2212, whence each of the said pulses is re-emitted and applied to terminal 2217. Similarly, pulses of the phase of the called subscriber's speech channel are being applied from lead 2100 by lead 2199 to one input of two-gate 2200 and to the permissory input of composite gate 2202 in the interconnecting sub-unit 2138 that serves the called subscriber; and in that sub-unit 2138, since it is receiving identifying voltages (from MC unit K/34) on its leads 2209 and 2237, two-gate 2200 emits pulses of the phase of the called subscriber's speech channel, applies them to the permissory input of composite gate 2210, and the latter gate re-emits such pulses on its first output to one input of one-gate 2222 which re-applies them to terminal 2227.

This time, it will be noted that, in the interconnecting sub-unit 2138 which serves the called subscriber, pulses of the phase of the calling subscriber's speech channel appear on terminal 2217 (i.e. one of the terminals of the upper group 2217 to 2221), while pulses of the phase of the called subscriber's speech channel appear on terminal 2227 (i.e. one of the terminals of the lower group 2227 to 2231).

It will be noted that the statement in the preceding paragraph can be regarded as the inverse of the corresponding statement regarding the appearance of speech channel pulses on the terminals of the interconnecting sub-unit 2138 which serves the calling subscriber. This is because, as will be seen, the distribution of pulses in the interconnecting sub-unit which serves the calling subscriber, is controlled by composite gates 2202 and 2206 and these are cross-connected as shown in FIGURE 26 to leads 2203 and 2199, whereas the distribution of pulses in the interconnecting sub-unit which serves the called subscriber, is controlled by two-gates 2204 and 2200, and these two-gates are not cross-connected, but connected in that order, to leads 2203 and 2199, respectively.

In general, owing to the prescriptions already given for connecting each section control unit to channel allotter K/30, and for connecting MC unit K/34 to channel allotter K/30, it may be stated that:

(a) In the interconnecting sub-unit 2138 which serves the calling subscriber, pulses of the phase of the speech channel allotted to the calling subscriber appear on one of terminals 2227 to 2231 forming the lower group of terminals, and pulses of the phase of the speech channel allotted to the called subscriber appear on one of terminals 2217 to 2221 forming the upper group of terminals:

(b) In the interconnecting sub-unit 2138 which serves the called subscriber, pulses of the phase of the speech channel allotted to the calling subscriber appear on one of terminals 2217 to 2221 forming the upper group of terminals, and pulses of the phase of the speech channel allotted to the called subscriber appear on one of terminals 2227 to 2231 forming the lower group of terminals:

(c) The terminal, out of the group 2217 to 2221, and out of the group 2227 to 2231, on which any of the said speech channel pulses respectively appear, is the first, second, third, fourth or fifth terminal, according to whether the multiplex which is served by the sub-unit 2138 concerned is the first, second, third, fourth or fifth multiplex served by the said sub-unit.

(As an example of rule (c), suppose the calling subscriber belonged to multiplex E, then, as explained earlier, multiplex E is served by the first interconnecting sub-unit 2138, to which are connected multiplexes A, C, E, G, I; and since multiplex E is the third of the said multiplexes, taken in order, the pulses referred to in rule (c) would appear on the third of terminals 2217 to 2221, and on the third of terminals 2227 to 2231, i.e. on terminals 2219 and 2229, respectively.)

An explanation and rules having thus been given by means of which it can be determined on which terminals of which interconnecting sub-units 2138 the respective speech channel pulses occur, it is next necessary to explain which speech channel pulses are effective to bring into use the interconnecting cell in interconnecting unit K/35.

The result of the system of interconnections described with reference to FIGURES 31 and 32, is that, to find the interconnecting cell which will be concerned in a call between any two subscribers, one determines the letter designating the multiplex to which each belongs, and finds from FIGURE 32 which cell lies at the intersection of the column headed by the letter designating one of the multiplexes and the row labelled (on the left) by the letter designating the other of the multiplexes. Thus, by way of examples, a call between a subscriber belonging to multiplex G and a subscriber belonging to multiplex J is dealt with by cell I(4, 10), since this cell lies at the intersection of the column headed G and the row labelled J: a call between a subscriber belonging to multiplex B and a subscriber belonging to multiplex E is dealt with by cell I(3,6), this cell lying at the intersection of the column headed E and the row labelled B; and a call between two subscribers both connected to multiplex C is dealt with by cell I(2, 2), this cell lying at the intersection of the column headed C and the row labelled C.

As already explained in the description of FIGURE 31, each cell such as I(5, 5) whose two reference numbers are equal to one another, contains a two-gate 2427 having its output connected to a one-gate 2424, whose output is connected to a delay line 2423 (the said one-gate and delay line being connected to form a system capable of repeating ½ micro-second pulses at intervals of 50 micro-seconds. Accordingly, if the two inputs of any two-gate 2427 simultaneously receive a pulse of the phase of any speech channel, that pulse is emitted by the said two-gate and applied to the associated one-gate 2424, whence the pulse is emitted to the associated delay line 2423 and starts to be repeated by the said delay line and one-gate.

Similarly, each cell such as I(1, 5) whose two reference numbers are not equal to one another, contains a two-gate 2435 having its output connected to a one-gate 2430, whose output is connected to a delay line 2429 (the said one-gate and delay line being connected to form a system capable of repeating ½ micro-second pulses at intervals of 100 micro-seconds). Accordingly, if the two inputs of any two-gate 2435 simultaneously receive a pulse of the phase of any speech channel, that pulse is emitted by the said two-gate and applied to the associated one-gate 2430, whence the pulse is emitted to the associated delay line 2429 and starts to be repeated by the said delay line and one-gate.

Now it will have been noted from rules (a) and (b) above, that pulses of the phase of both the relevant speech channels are emitted both by the sub-unit 2138 which serves the calling subscriber and by the sub-unit 2138 which serves the called subscriber. It might therefore appear at first sight that the relevant interconnecting cell in interconnecting unit K/35 could be caused to repeat pulses of either speech channel, more or less accidentally. In fact, with the mode of connecting up interconnecting unit K/35 that has been specified earlier, the position is that the pulse which is repeated in the delay line in the relevant interconnecting cell (i.e. in the delay line 2429, if the relevant cell is one interconnecting subscribers belonging to different multiplexes, or in the delay line 2423, if the relevant cell is one interconnecting subscribers belonging to the same multiplex), is given by the following rule:

If the relevant interconnecting cell belongs to the column (in FIGURE 32) headed with the letter designating the multiplex to which the calling subscriber belongs, then the delay line in the said cell repeats pulses in the phase of the calling subscriber's speech channel; and if the relevant interconnecting cell belongs to the row labelled with the letter designating the multiplex to which the calling subscriber belongs, then the delay line in the said cell repeats pulses in the phase of the called subscriber's speech channel. (As elsewhere in this specification, the phase of a pulse which is being repeated in a delay line is to be determined from the instant at which the said pulse is applied to the delay line and not, where a delay line is tapped, from the instant at which the said pulse appears on the tap.)

Before examples are given to illustrate this rule, it may be well to comment that the rule appears superficially ambiguous when applied to cases in which the calling and called subscribers both belong to the same multiplex, since the relevant interconnecting cell then lies both in the row and the column which, in FIGURE 32, are associated with the calling subscriber. But in fact the rule remains true and unambiguous in this case also; for in this case the delay line in the relevant interconnecting cell repeats its pulse every 50 micro-seconds, and therefore repeats it both in the phase of the calling subscriber's speech channel and in the phase of the called subscriber's speech channel. It may also have been realised that where both the calling and the called subscriber belong to the same multiplex, that terminal from group 2217 to 2221, and that terminal from group 2227 to 2231, which (in the sub-unit 2138 which is serving the multiplex to which the calling and the called subscriber both belong) respectively emit speech channel pulses, each emit pulses of both the calling and the called subscriber's speech channel. (Thus in the call which has been taken as an example, from subscriber 0001 to subscriber 0499, both subscribers belong to multiplex A; and it will be found, on looking back, that terminal 2217 emits pulses of the phase of the speech channel of the calling subscriber and pulses of the phase of the speech channel of the called subscriber, while terminal 2227 likewise emits pulses of the phase of the speech channel of the calling subscriber and pulses of the phase of the speech channel of the called subscriber.)

Two examples will make the foregoing rule clear. Suppose a subscriber belonging to multiplex A is calling a subscriber belonging to multiplex B. From FIGURE 32, the relevant interconnecting cell is I(1, 6) and this cell belongs to the column headed with the letter A designating the multiplex to which the calling subscriber belongs: accordingly, the delay line 2429 in cell I(1, 6) will repeat pulses of the phase of the calling subscriber's speech channel. If, on the other hand, a subscriber belonging to multiplex B is calling a subscriber belonging to multiplex A, the relevant interconnecting cell is still I(1, 6); but the calling subscriber now belongs to multiplex B, and cell I(1, 6) belongs to the row of the calling subscriber (in FIGURE 32): accordingly, delay line 2429 in cell I(1, 6) will for this second call repeat pulses of the phase of the called subscriber's speech channel.

VII.11. *Order of operations.*—Having thus explained in detail the operations that are carried out up to the stage reached in the foregoing paragraphs, it will probably be helpful to put them into the order in which they occur in time, starting from the instant at which, the calling subscriber having completed dialling, the identifying pulses are applied to terminals 2337, 2338, 2339 of the relevant register (see FIGURE 28) to cause that register to apply voltage to its appropriate output terminals ($m0$ to $u6$) and thus to apply voltage to the input terminals of converter K/33 and MC unit K/34, respectively.

The immediate result of the application of voltage to the input terminals ($c'0$ to $u'6$) of converter K/33 is to cause the converter to apply voltage to the appropriate set of its output terminals T1 to T16 and thus to leads (as already specified) connected to the two-gates in the channel pulse store of the called subscriber. This application of voltage lasts until the register ceases to give its output, this output ceasing at the end of a period lasting about one millisecond. During a period of the order of 100 microseconds, starting from the instant when converter K/33 starts to apply voltage to its output terminals, it will have been determined that the called subscriber is free (this example having been assumed to be a successful call). At about the end of the said period of 100 micro-seconds during which it has been determined that the called subscriber is free, the section control unit of the called subscriber applies to channel allotter K/30 the voltage indicating that the called subscriber is free.

When channel allotter K/30 receives the voltage signal indicating that the called subscriber is free, the channel allotter selects appropriate speech channels for the calling and called subscribers, and the pulses of the selected speech channels are communicated to, and begin to be repeated in, the appropriate interconnecting cell as described in the preceding section of this specification. When channel allotter K/30 sends pulses of the selected speech channels to the interconnecting cell, it sends pulses of the called subscriber's speech channel to the called subscriber's section control unit by which those pulses are transmitted to the ringing and metering unit (A/32 in the present example) of the multiplex to which the called subscriber belongs: the results produced by this transmission of pulses to said ringing and metering unit will be dealt with in Section VII.12 of this specification. Also, when channel allotter K/30 emits the pulses of the speech channel of the called subscriber as above mentioned, it applies the said pulses via the section control unit of the called subscriber's multiplex to the delay lines associated with the called subscriber in the channel pulse store of the multiplex to which the called subscriber belongs; and pulses of the called subscriber's speech channel will begin to be repeated in the said delay lines within about 300 micro-seconds of the instant when the register started to apply voltage to its output terminals.

The next main operation is that the register ceases to apply voltage to its output terminals, multivibrator 2342 (see FIGURE 28) having been re-set by a pulse applied to terminal 2347 from pulse generator K/1 in the way set out in the description of the register. Accordingly, when the register ceases to apply voltage to its output terminals, MC unit K/34 ceases to apply voltage to its output terminals, and converter K/33 reverts to its "preparation" state. This reversion of converter K/33 to its "preparation" state, takes place at a time which is roughly 1 milli-second after the time when the register started to apply voltage to its output terminals.

Once converter K/33 has reverted to its "preparation" state, the main operations affecting the calling subscriber begin.

Now, at this moment, delay line 2181 in channel allotter K/30 (FIGURE 26) has circulating through it only the pulses of the phase of the register channel which was being used by the register which has just given its output; and the only section control unit which has circulating in its busy register channel store pulses of the phase of the register channel which was being used by the register which has just given its output, is the section control unit of the multiplex to which belongs the calling subscriber at present concerned. And, in the channel pulse store of the multiplex to which the calling subscriber belongs, the only trio of delay lines in which will be circulating pulses of the said register channel, are the trio of delay lines associated with the calling subscriber. Because of the three qualifications set out in the two preceding sentences, it results that as converter K/33 carries out routing "preparation" of delay lines in the channel pulse stores of the several multiplexes, only in the apparatus associated with the calling subscriber concerned, are conditions right for the next set of operations to be carried out. These operations consist in the suppression from further circulation of the register channel pulses in question, and the feeding to the delay lines associated with the calling subscriber of pulses of the phase of the speech channel which has been allotted to him.

Having thus outlined in temporal order the operations set out in detail in earlier sections of this description of the mode of operation of the exchange, it is now convenient to take up again the description of the operations at the point at which they were left at the end of Section VII.9—viz. at the point at which voltage disappears from terminal 2232 (see FIGURE 26) of channel allotter K/30. And in taking up the description at this point, it should also be remembered that (as stated in the foregoing outline) voltage will also have ceased to be applied to channel allotter K/30 from MC unit K/34. It will accordingly be seen from FIGURE 26 that a state has been reached at which none of the gates in any control sub-unit 2133 can at this time apply voltage to any output terminal of any sub-unit 2138.

In particular, one-gate 2171 ceases to apply voltage to one input of one-gate 2162, and one-gate 2162 accordingly ceases to apply voltage to one input of one-gate 2166. One-gate 2166 accordingly likewise ceases to give an output. The cessation of the output voltage from one-gate 2166 causes trailing-edge pulse former 2172 to emit a pulse lasting about 1 milli-second, which pulse is applied to lead 2175 and thus (i) by lead 2175/1 to the inhibitory input of one-gate 2160 thus suppressing further circulation of pulses of the speech channels that have just been allotted, in delay line 2189, (ii) by lead 2175/2 to the inhibitory input of one-gate 2176, thus suppressing the further circulation of pulses of the register channel that has just been used, in delay line 2181, and (iii) to one input of one-gate 2174 causing that one-gate to continue the application by leads 2191 and 2193 to the inhibitory inputs of one-gates 2192 and 2194 of the voltage previously applied to the said inhibitory inputs from one-gate 2162 via one-gate 2174. (The purpose of the said inhibitory inputs on one-gates 2192 and 2194 is to prevent any other register from giving an output while the register here concerned was completing its operations. The said inhibitory inputs started to be applied as soon as voltage was applied to terminal 2232 and led to the giving of an output from one-gate 2171.) The inhibitory inputs to one-gates 2192 and 2194 mentioned in (iii) above, end when the 1 milli-second pulse from pulse former 2172 ends.

The common equipment of the exchange has now reverted to a condition in which it is ready to handle a call for any other subscriber, although the register so far in use has not yet been released and that particular register is not yet available for use by other subscribers. The release of the said register will be described later.

VII.12. *Ringing and metering.*—A stage has thus been reached at which pulses of the speech channel allotted to the called subscriber are being repeated in the trio of delay lines associated with the called subscriber in the channel pulse store of the multiplex to which he belongs, pulses of the speech channel allotted to the calling subscriber are likewise being repeated in the trio of delay lines associated with him in the channel pulse store of the multiplex to which he belongs, and the appropriate interconnecting cell is repeating pulses of the phase of one or other of these speech channels (determined in the way already described)—or, where the call is between subscribers belonging to the same multiplex, is repeating pulses of the phase of each channel, since the interconnecting cell (cell I(1, 1) in the present example) which connects subscribers belonging to the same multiplex contains a delay line 2423 which repeats pulses at 50 micro-second intervals. It will also be remembered, from the description of the ringing and metering unit given earlier, that when speech channel pulses begin to be repeated in the delay lines associated with the called subscriber, his bell starts to ring, and when speech channel pulses begin to be repeated in the delay lines associated with the calling subscriber, he starts to hear ringing tone. From the point of view of the two subscribers, it merely remains for the called subscriber to lift his instrument and for them to talk to one another; and when the called subscriber lifts his instrument, his bell ceases to ring, ringing tone ceases to be heard by the calling subscriber, and metering is completed—all as described in the description of the ringing and metering unit.

In the meantime, however, the pulses which are modulated with ringing tone and which have been emitted by the ringing and metering unit belonging to the called subscriber's multiplex, are used to ensure that, in the section control unit of the multiplex to which the calling subscriber belongs, the pulse (if any) then being repeated as a free register channel pulse, is not a pulse of the phase of the speech channel now to be used by the calling subscriber. This safeguard is provided as follows.

When pulses of the called subscriber's speech channel, modulated with ringing tone, are emitted by two-gate 2468 (see FIGURE 34) of the ringing and metering unit of the called subscriber, these modulated pulses are, as will be remembered, transmitted by lead 2485 to one-gate 2604 (FIGURE 35a) and thus to the speech output highway of the called subscriber, whence they pass through the appropriate interconnecting cell to the speech input highway of the calling subscriber and are thence applied by lead 2080 (FIGURE 35a) to the section control unit, see FIGURE 24, of the multiplex to which the calling subscriber belongs. From lead 2080 these pulses pass, as shown in FIGURE 24, through clipper 2078, lead 2082, delay line 2023, lead 2083 and one-gate 2061 to lead 2021, and by lead 2021 these pulses are applied to one of the inhibitory inputs of one-gate 2015 in free register channel store sub-unit 2000 of the section control unit of the calling subscriber. Now it will be remembered that when the call now being described was initiated by the lifting of his instrument by the calling subscriber, the free register channel pulse then circulating in delay line 2018 was allotted to the calling subscriber and then suppressed from further circulation in delay line 2018. The free register channel store would then obtain a new free register channel pulse from channel allotter K/30, and while the present call has been in process of completion, further free register channel pulses may have been supplied to the said free register channel store. It is thus possible that by the time the speech channels for the present call have been allotted, the free register channel pulse circulating in the said free register channel store of the calling subscriber, may be of the phase of the speech channel allotted to the present calling subscriber. It will be seen that, if this state of affairs has come about, the operation described in the earlier part of the present paragraph will suppress a free register channel pulse of the phase of the speech channel of the present calling subscriber from further circulation in delay line 2018.

It is possible that a similar state of affairs might exist in the section control unit of the called subscriber—that is to say that the free register channel pulse circulating in the free register channel store sub-unit of the section control unit of the multiplex to which the called subscriber, could be of the same phase as the speech channel allotted to the called subscriber. Now as soon as pulses of the speech channel allotted to the calling subscriber begin to be repeated in the trio of delay lines associated with the calling subscriber (in the channel pulse store of the multiplex to which he belongs), those pulses appear on the output speech highway of the multiplex to which the calling subscriber belongs; and these pulses duly appear, therefore, on the input speech highway of the called subscriber's multiplex—in manner precisely similar to that described, in the converse direction, in the preceding paragraph. Having thus appeared on lead 2080 of the section control unit of the multiplex to which the called subscriber belongs, the said pulses will likewise be applied to the corresponding inhibitory input of one-gate 2015 in the free register channel store sub-unit of the section control unit of the called subscriber's multiplex, and will suppress from further circulation the free register channel pulse which is circulating in the said delay line if it is of the phase of the speech channel of the called subscriber. It will be realised, however, that there may be a delay of up to 233 milli-seconds between the time when the speech channels for the call are allotted by channel allotter K/30 and the time when pulses of the speech channel allotted to the calling subscriber begin to be repeated in the afore-mentioned trio of delay lines associated with him. During this delay period, there is a possibility, though not a large one, that, not only may there be the allocation to the said section control unit of the called subscriber of a free register channel pulse of the phase of the speech channel of the called subscriber, but that that free register channel pulse may be seized as a register channel pulse by some other subscriber (belonging to the multiplex to which the called subscriber belongs). If it is desired to guard against this possibility, this may be done by providing one-gate 2015 in the free register channel store of each section control unit with an additional inhibitory input, and connecting that input to lead 2076 of the said section control unit. Since lead 2076 is connected (FIGURE 35a) to the ringing and metering unit of the multiplex to which the called subscriber belongs, the additional connection mentioned in the preceding sentence will ensure that the necessary inhibitory input is applied to one-gate 2015 in the said section control unit of the called subscriber's multiplex without waiting during the afore-mentioned delay period of possibly 233 milliseconds.

It was commented in the opening words of the present section that it merely remained for the called subscriber to lift his instrument and for the two subscribers to talk to one another. The manner in which their speech channel pulses pass through the relevant interconnecting cell has not been described in detail.

In the call now being described by way of example, the interconnecting cell concerned is I(1, 1), and speech channel pulses of the calling and of the called subscriber appear on speech highway 2448(A) and are thus applied as shown in FIGURE 31 to one-input of two-gate 2426. Each time a pulse of the speech channel of either the calling or the called subscriber is thus applied to two-gate 2426, a synchronous pulse is applied to the said two-gate from one-gate 2424; and two-gate 2426 accordingly re-emits each such pulse, duly modulated, of course, with the speech signals of the subscriber concerned. The pulse so re-emitted is applied by two-gate 2426 to input speech highway 2449(A) and is thus transmitted to the subscriber for whom it is intended.

Had the call been one between subscribers belonging to different multiplexes, for example between a subscriber belonging to multiplex A and a subscriber belonging to multiplex C, then interconnecting cell I(1, 2) would have been concerned. In that case, pulses of the speech channel allocated to the subscriber belonging to multiplex A would be applied from output speech highway 2448(A) to one input of two-gate 2432 in cell I(1, 2), which pulses would synchronise with pulses applied by one-gate 2430 to the second input to two-gate 2432; and that two-gate would re-emit such pulses to input speech highway 2449(C) and thus to the subscriber belonging to multiplex C. Pulses of the speech channel allocated to the subscriber belonging to multiplex C would be applied from output speech highway 2448(C) to one input of two-gate 2437 in cell I(1, 2), and these pulses would synchronise with pulses applied to the second input of the said two-gate from the tap on delay line 2429 of cell I(1, 2) and would therefore be re-emitted by two-gate 2437 to input speech highway 2449(A) and thus to the subscriber belonging to multiplex A.

VII.13. *Clearing.*—Clearing operations for each multiplex are controlled by the section control unit for that multiplex, the method of control being, in general terms, that during the period of each Z pulse, pulses of every channel apparently in use in the multiplex are fed from the busy channel store sub-unit, see FIGURE 24, of the section control unit to the release control sub-unit of the section control unit, and a check is then made to find out which of such channels is not actually in use and can therefore be cleared, the clearance being carried out during the next X pulse which occurs approximately 200 milli-seconds after the said Z pulse. In detail, the control is carried out as follows, and will be described by way of example with reference to multiplex A.

Two-gate 2067 in the release control sub-unit of the section control unit has, as shown in FIGURE 24, applied to it by leads 2069 and 2021, every pulse emitted by one-gate 2061 in the busy channel store sub-unit of the section control unit—i.e. pulses of every channel apparently busy in the multiplex and therefore being repeated in delay line 2084 of the said busy channel store sub-unit. When a Z pulse is applied to two-gate 2067 by lead 2068, two-gate 2067 therefore emits every pulse so applied to it and applies every such pulse to one-gate 2062 and such pulses accordingly start to be repeated in delay line 2063 unless they synchronise with the application of corresponding pulses to the inhibitory input of one-gate 2062.

The inhibitory input to one-gate 2062 is connected by lead 2064 to the output of one-gate 2040 whose inputs are connected as follows:

(i) Cable 2605(A), forming part of the output speech highway of the multiplex, is connected (FIGURE 35a) by lead 2474 to lead 2079 and thus, see FIGURE 24, through clipper 2075 and leftwards to lead 2074, which is connected to one input of one-gate 2040. Pulses of channels in use in the subscribers line units belonging to the multiplex are therefore not passed to delay line 2063 unless temporarily suppressed on cable 2605(A) by dialling impulses: if pulses temporarily suppressed in this way are passed to delay line 2063, they will be suppressed from further circulation in delay line 2063 as soon as such pulses re-appear on cable 2605(A), since one-gate 2040 will then apply them to the inhibitory input of one-gate 2062.

(ii) Lead 2039 from the busy register channel store sub-unit applies to one-gate 2040 every pulse omitted by three-gate 2027. The purpose of this connection is to ensure that the working of the exchange is not deranged if a calling subscriber replaces his instrument during the fraction of a second that elapses between the time when he has finished dialling and the time when the register which is serving him applies voltage to its output terminals. The way in which this safeguard operates, will be described later.

(iii) During the period during which the bell of the called subscriber is being run before he lifts his instrument, pulses of his speech channel are occurring on the input speech highway of the multiplex to which he belongs and are therefore passed, see FIGURE 24, via lead 2080, clipper 2078 and delay line 2023 to one-gate 2061 to be repeated in delay line 2084 of the section control unit of the said multiplex. Such pulses must not be repeated in delay line 2063 in the release control sub-unit of the said section control unit lest they should then cause a clearance operation (during the next X pulse) while the called subscriber's bell is still being rung. Accordingly, lead 2022 from the output of clipper 2023 is connected by lead 2077 to one input of two-gate 2073, of which the other input is connected by lead 2076 to the ringing and metering unit of the called subscriber's multiplex, so that two-gate 2073 applies pulses during the said period to one-gate 2040.

It should be noted, however, that if the calling subscriber should replace his instrument while the bell of the called subscriber is being rung, then it is proper that the pulses above referred to should be repeated in delay line 2063; and it will be seen that if the calling subscriber does so replace his instrument, the pulses of the called subscriber's speech channel will disappear from the input speech highway of the called subscriber's multiplex, two-gate 2073 will then be unable to apply pulses to one-gate 2040, and the pulses in question will, properly, be subjected to the next-ensuing clearance operation.

(iv) One-gate 2040 also has an input from lead 2072, which is connected to terminal Y on pulse generator K/1. When an X pulse has occurred, and has led to clearance operations controlled by the pulses which are, at the time of the X pulse, being repeated in delay line 2063, it is necessary that delay line 2063 should be cleared of those pulses, in order that a new sequence of clearance operations should start: the Y pulse next occurring after the said X pulse, causes one-gate 2040 to apply voltage to the inhibitory input of one-gate 2062 for a period of 233 micro-seconds and thus suppresses from further repetition the pulses previously undergoing repetition in delay line 2063.

The result of the circuit connections that have just been described, is that, when an X pulse begins, there are circulating in delay line 2063 in the section control unit of each multiplex, those pulses, and only those pulses, which belong to channels which are no longer needed in the multiplex in question. When an X pulse occurs, it is applied from lead 2059 to one input of each of two-gates 2055 and 2065. Two-gate 2055 has applied to its second input every pulse emitted by one-gate 2062 and applied thereby to the input of delay line 2063. Two-gate 2065 has applied to its second input every pulse appearing on the tap of delay line 2063.

In the description of interconnecting unit K/35, instructions were given as to how the leads 2450 and 2451 were to be connected to the section control units of the various multiplexes. In view of the instructions there given, it follows that the emission of pulses by two-gates 2055 and 2065 suppresses further repetition of speech channel pulses in any of delay lines 2423 or 2429 in which such repetition is no longer necessary.

The pulses emitted by two-gate 2055 are also applied via lead 2054, one-gate 2035, and lead 2034 to the inhibitory input of one-gate 2029 in the busy register channel store sub-unit and suppress from repetition any register channel pulse which is no longer required and is of the phase of a pulse emitted by two-gate 2055. Similarly, any pulse which is being repeated in delay line 2084 and which had become unwanted by the time of starting of the Z pulse which initiated the clearance operation now being described, will be cleared by the application of the pulses from two-gate 2055 via lead 2060 to the inhibitory input of one-gate 2061; and any such unwanted pulse in delay line 2084 which is also being repeated in the channel pulse store of the multiplex, will be suppressed via lead 2054, one-gate 2035 and lead 2052 which is connected (FIGURE 35(a)) to the said channel pulse store and (see FIGURE 25) to the inhibitory inputs of all one-gates of the set STG1/1 to STG1/16. Finally, since lead 2052 is connected by lead 2469 (FIGURE 35) to an inhibitory input on one-gate 2466 (FIGURE 34) in the ringing and metering unit of the multiplex concerned, corresponding pulses will be suppressed in delay line 2464 of the said unit.

Reverting now to lead 2039 mentioned in paragraph (ii) above of the list of leads connected to one-gate 2040, it was mentioned that this lead is concerned with instances in which a calling subscriber replaces his instrument between the time when he has finished dialling and the time when the register which is serving him applies voltage to its output terminals. If a calling subscriber so replaces his instrument, the pulses of his register channel cease to appear on the speech input highway of the multiplex to which he belongs and therefore no corresponding pulses are applied to the inhibitory input of one-gate 2062 as described in paragraph (i) of the said list of leads. Accordingly, pulses of the calling subscriber's register channel, which are being repeated in delay line 2084, are fed from that delay line to delay line 2063 and would continue, if lead 2039 were absent, to be repeated in delay line 2063 until the next clearing operation occurred.

That clearing operation might occur at a time after the register had started to apply voltage to its output terminals but before pulses of the calling subscriber's speech channel had been fed to the trio of delay lines associated with him in the channel pulse store of the multiplex to which he belongs. But when the clearance operation occurred, the register channel pulses which had so far been undergoing repetition in the said trio, would have been cleared from the said trio as above described. Accordingly, no pulses from the said trio would then be available to trigger multivibrator 2130 in the channel pulse store of the multiplex to which the calling subscriber belongs—see FIGURE 25, and the description in Section VII.9 of the manner in which the speech connection of the calling subscriber is carried out. This would disrupt the normal sequence of operations described in Section VII.11 and would therefore be calculated to interfere with the proper operation of the exchange.

To prevent such a disruption from taking place, it is arranged that three-gate 2027 shall, as soon as the calling subscriber's register begins to apply voltage to its output terminals, apply pulses of the register channel in question to one-gate 2040 via lead 2039. The resulting output from one-gate 2040 to the inhibitory input of one-gate 2062 then suppresses the repetition in delay line 2063 of the pulses of the register channel concerned and therefore prevents the premature suppression of pulses of the phase of that register channel in the said trio of delay lines associated with the calling subscriber. Operations then proceed as described in Section VII.11, and will be followed by the normal form of clearance (referred to below) resulting from the replacement of a subscriber's instrument.

It was described in the penultimate paragraph of Section VII.9 that when the pulses of the speech channel of the calling subscriber begin to be repeated in the trio of delay lines associated with him in the channel pulse store of the multiplex to which he belongs, the pulses of the register channel that he has been using are suppressed from further repetition in the said trio of delay lines and in delay line 2025 in the busy register channel store sub-unit of the section control unit (FIGURE 24) of the multiplex to which he belongs. The said register channel pulses were not at that time suppressed from repetition in delay line 2084 in the busy channel store sub-unit of the said section control unit. Because the said register channel pulses are no longer being repeated in the said trio of delay lines, they cease to appear on the output speech highway of the multiplex to which the calling subscriber belongs and therefore cease to appear on leads 2474 and 2079 (see FIGURES 35(a) and 24) and therefore cease to be applied by lead 2074 to one input of one-gate 2040 in the release control sub-unit of the section control unit concerned. Therefore, there are no longer inhibitory pulses applied by one-gate 2040 to prevent these register channel pulses from being fed (during the next Z pulse) by the said one-gate to be repeated in delay line 2063 in the said release control sub-unit. The said register channel pulses are accordingly now fed to delay line 2063 and are in consequence then cleared (in the manner already described) from delay line 2084.

It will have become apparent from the preceding description that if a subscriber has once removed his instrument and then replaces it, pulses of his speech channel will cease to appear on the output speech highway of the multiplex to which he belongs and cease to appear on lead 2079 of the busy channel store sub-unit of the section control unit of his multiplex: such disappearance leads, as already described, to the clearance of the said pulses from his multiplex. Accordingly, when both subscribers have replaced their receivers, all speech channel pulses will be cleared, and clearance of speech pulses is complete. In addition, it will also have been seen that, provided the call is a successful one, the register channel pulses previously used by the calling subscriber will have been cleared within a short time of his having completed dialling. If the call is unsuccessful, so that register channel pulses are still being repeated at the time the calling subscriber replaces his instrument, they will, up to that time (save for temporary interruptions by dialling impulses as already mentioned) have been appearing on the speech output highway of the multiplex to which the calling subscriber belongs; and when the calling subscriber replaces his instrument, so that the said register channel pulses disappear from the said speech output highway, the said pulses are passed to delay line 2063 as indicated in paragraph (i) of the list of leads connected to the inputs of one-gate 2040, and will then be suppressed during the next clearance operation. It will further be seen that, when both subscribers have replaced their instruments, the relevant interconnecting cell will also have been cleared—and in fact the relevant interconnecting cell will be cleared when the first of the subscriber's instruments is replaced.

One matter remains, however, to be explained: the clearance of register channel pulses from register control unit K/31 (thereby also preventing the continued application of such pulses to the register which has been allocated to a call).

It will be seen from FIGURES 35 and 27 that all pulses appearing on register highway 2601 are applied to lead 2294 and are thence applied via clipper 2291 to one-gate 2296 and are then repeated in delay line 2298. When a Z pulse occurs, it is applied by lead 2299 to the inhibitory input of one-gate 2296 and clears delay line 2298 of all pulses then being repeated in it. At the end of the said Z pulse, register channel pulses appearing on register highway 2601, which pulses are supplied to the said highway from the section control unit of each multiplex and are therefore pulses still occurring in the busy register channel store sub-units of the several multiplexes, are again fed to and begin to be repeated in delay line 2298. About 200 milli-seconds after the occurrence of the said Z pulse, an X pulse occurs and is applied to one input of three-gate 2300, to whose second input are being applied clock pulses by lead 2302. During the said X pulse, therefore, three-gate 2300 emits every clock pulse which does not synchronise with a pulse which is being repeated in delay line 2298 and thereby applied to the negatory input of three-gate 2300—i.e. three-gate 2300 emits every clock pulse which does not synchronise wise pulses currently recorded (as a result of having appeared on register highway 2601 since the end of the said Z pulse) as being in use as register channel pulses in one or other of the section control units. All pulses emitted by three-gate 2300 are applied, as will be seen from FIGURE 27, to the inhibitory input of each of one-gates 2245, 2257, 2266, 2283, and to one input of one-gate 2304 and thence to the inhibitory input of each of one-gates 2307, 2308, 2309, 2310. Accordingly, every pulse which has previously been undergoing repetition in register control unit K/31 but which is not currently recorded as just mentioned, is suppressed from further repetition in the said unit—and, of course, releasing any register to which any such now suppressed pulse had previously been repeated.

VIII. *Performance for Unsuccessful Calls*

It may be useful, as a preliminary point, to mention one contrast between the operations of the form of exchange now being described, and the operations of the form of exchange described in the earlier example given in this specification. In the present form of exchange, speech channels are not allotted unless it has been established that the call will be successful, whereas in the form of exchange described earlier, a speech channel would (provided a free speech channel were available) be allotted and then used for conveying busy tone or number-unobtainable tone to the calling subscriber. In the present form of exchange, for an unsuccessful call, busy tone or number-unobtainable tone are conveyed on the register channel that has been allotted to the calling subscriber.

VIII.1. *The called subscriber is busy.*—It was mentioned in paragraph 4 of Section VII.5 that when a called subscriber is busy, multivibrator 2126 (FIGURE 25) applies voltage to the negatory input of three-gate 2102 and to one input of four-gate 2103 in the called subscriber testing sub-unit of the called subscriber's section control unit as shown in FIGURE 24. Accordingly, when MC unit K/34 applies voltage on leads 2115 and 2116 of the called subscriber's section control unit, and two-gate 2105 therefore applies voltage to a second input of four-gate 2103, it will follow that when the next Q pulse is applied on lead 2104 to four-gate 2103, that four-gate will give an output voltage since multivibrator 2106 will not (for reasons already explained) have been triggered to remove voltage from the fourth input to the said four-gate. Multivibrator 2110 is accordingly triggered to apply voltage to lead 2111 (and continues to do so until MC unit K/34 ceases to apply voltage to its output terminals).

The voltage applied to lead 2111 is thence applied (FIGURES 35(a) and (b)) to one-gate 2158 in channel allotter K/30, as shown in FIGURE 26; and one-gate 2158 gives an output voltage which is applied to one-gate 2166 which applies voltage to trailing edge pulse former 2172 and to two-gate 2168 which has applied to its second input pulses of the register channel which is being used by the calling subscriber—the latter pulses being applied from delay line 2181 by lead 2178. Pulses of the said register channel are accordingly applied to lead 2177 and thus (FIGURES 35(b) and (c)) to one-gate 2245 in register control unit K/31 as shown in FIGURE 27. This, as described in the earlier description in the section entitled "Speech, Register and Tone Highways, and General Arrangement," causes pulses modulated with busy tone and derived from the calling subscriber's register channel (but displaced in phase by 50 channels because they are derived from the tap on delay line 2246) to be applied to tone highway 2252 (FIGURE 35(b)). They are thence applied to all leads 2032 and, in the way already described in connection with the supply of dialling tone to a calling subscriber, these pulses modulated with busy tone are now supplied to the calling subscriber.

At the time when, as mentioned above, one-gate 2245 applies the said pulses, these pulses are applied by lead 2260 to one-gate 2261 and thence by lead 2263 to one input of one-gate 2304; and their re-emission from one-gate 2304 clears these pulses from further repetition in the relevant trio of delay lines in RCPS sub-unit 2244—in the way previously described as resulting from an emission of pulses from one-gate 2304. The application of these pulses to lead 2263 also causes them to be applied to the negatory input of four-gate 2287, as shown. The purpose of this negatory input is to ensure that, although pulses of the register channel in question are still appearing on register highway 2691, this does not lead to the allocation of another register to this call in place of the register that has just been released.

Returning now to channel allotter K/30 (FIGURE 26), it will be seen that when MC unit K/34 ceases to apply voltage to its output terminals and the voltage applied to lead 2111 therefore ends, the voltage applied to the input of one-gate 2166 as above mentioned ends; and trailing edge pulse former 2172 accordingly emits a pulse which has the same results as those described in the penultimate paragraph of Section VII.11, save of course, that since no speech channel has been allotted there are no speech channel pulses to be cleared from delay line 2189 in channel allotter K/30.

VIII.2. *The called number is unobtainable.*—It has already been explained in the course of the description of the ringing and metering unit, how it is arranged that, if a calling subscriber dials the number of an unobtainable subscriber belonging to an installed multiplex, voltage is caused to be applied to lead 2112 of the section control unit (FIGURE 24) of the multiplex to which the called subscriber belongs. In addition, it was explained in Section VII.5 above, that if a subscriber is obtainable, the absence of voltage on lead 2112 permits two-gate 2107 to give an output and prevents two-gate 2108 from giving an output (both gates being in the called subscriber testing sub-unit of the said section control unit). Accordingly, where a subscriber belonging to an installed multiplex is unobtainable, the dialling of his number leads, at the stage of operations reached in paragraph 6 of Section VII.5, to the appearance of a voltage on lead 2114 which is connected (FIGURE 35(b)) to one input of one-gate 2169 in control sub-unit 2137 of channel allotter K/30.

It was also explained in the description of MC unit K/34 how it is that if the number of a subscriber belonging to an uninstalled multiplex is dialled, the MC unit will then apply voltage to one of the inputs of one-gate 2169.

Accordingly it will be seen that, whenever the number of an unobtainable subscriber is dialled, one-gate 2169 applies voltage to one input of one-gate 2166 and to one input of two-gate 2183. The second input of two-gate 2183 has applied to it, from one-gate 2176, the pulses of the register channel that is being used by the calling subscriber; and two-gate 2183 therefore applies to lead 2184 the pulses of the calling subscriber's register channel. Lead 2184 is (FIGURE 35(b) and (c)) connected to one input of one-gate 2257, see FIGURE 27, of register control unit K/31. The pulses of the calling subscriber's register channel accordingly start to be repeated in delay line 2256 and are applied from the tap on that delay line to one input of two-gate 2253 whence they are re-emitted modulated with number-unobtainable tone. These modulated pulses are applied to one input of one-gate 2251, and are transmitted from that one-gate to the calling subscriber in the same way that pulses modulated with busy tone were described in Section VIII.1 as being transmitted to the calling subscriber when the called subscriber is busy.

Pulses from one-gate 2257 are also applied, as will be seen from FIGURE 27, to one input of one-gate 2261 and cause the same effects as were described in Section VIII.1 as being produced by the application to that one-gate of pulses from one-gate 2245.

When the voltage applied to one-gate 2169 (in channel allotter K/30, FIGURE 26) ends, one-gate 2166 ceases to apply voltage to trailing edge pulse former 2172, and the latter then emits a pulse which has the same effects as those mentioned in the last paragraph of Section VIII.1.

VIII.3. *There is no available speech channel.*—In Section VII.6 it was explained that, when the multiplex to which the calling subscriber belongs is recognised, the result is that a pulse is applied to multivibrator 2150 in control sub-unit 2137 of channel allotter K/30, FIGURE 26, triggering that multivibrator to apply voltage to one input of three-gate 2154; and it was explained in Section VII.7 that if suitable speech channels are found, three-gate 2154 will emit a pulse which, interalia, re-sets the said multivibrator. But it will also be seen from FIGURE 26 that when multivibrator 2150 is triggered to apply voltage to three-gate 2154, it also applies voltage on lead 2155 to the input of slow-to-operate device 2156; and it will be remembered from the description of that device that when voltage is applied to its input, it does not give an output if that voltage is removed before 250 micro-seconds have elapsed, but does apply a 150 microsecond pulse to lead 2157 if its input voltage endures uninterruptedly for 250 micro-seconds.

Accordingly, therefore, if no suitable speech channels are found within 250 micro-seconds from the time when multivibrator 2150 was triggered, device 2156 emits an output pulse which is applied to one input of one-gate 2151 and to one input of one-gate 2158.

The result of the giving of an output by one-gate 2158 was described in Section VIII.1 above—namely the supply of busy tone to the calling subscriber. The result of the giving of an output from one-gate 2151 is that multivibrator 2150 is triggered to cease to apply voltage either to the input of device 2156 or to three-gate 2154: three-gate 2154 accordingly ceases to search for suitable speech channels. And, of course, as in other cases where the calling subscriber receives busy tone or number-unobtainable tone, the subsequent replacing of his instrument puts into effect the usual clearance operations which have been described earlier.

VIII.4. *Forced release of registers.*—It will be remembered that in the form of exchange described earlier, provision was made for the forced release of the register allocated to a calling subscriber, if that subscriber, having thus secured the use of a register, either does not dial, or does not complete the dialling of, the wanted number within 20 seconds. Similar provision is made in the present form of exchange.

It will be seen from FIGURE 27 that, in the upper half of sub-unit 2243 (the register control section proper of register control unit K/31) there is a composite gate 2277 having three inputs connected to leads 2278, 2281, 2284, to which Z pulses, X pulses and Y pulses are respectively applied from pulse generator K/1, and having its permissory input connected to the output of multivibrator 2279. It will also be remembered from the earlier description that multivibrator 2279 is so arranged that it is triggered by the lagging edge of a pulse on lead 2280 to cease to apply voltage to the permissory input of composite gate 2277, but, having been so triggered, to revert to applying voltage to the said permissory input after the lapse of a period of 20 seconds.

Suppose, now, that multivibrator 2279 is applying voltage to the permissory input of composite gate 2277 and that a Y pulse occurs and is applied to the lowest input of gate 2277 by lead 2284. Gate 2277 will then apply voltage to lead 2285 and thus to the inhibitory input of one-gate 2283, which will suppress the further repetition in delay line 2286 of any pulses then being repeated in it.

When the next Z pulse occurs after the Y pulse just mentioned, multivibrator 2279 will still be applying voltage to the permissory input of gate 2277 and will continue to do so until the end of the said Z pulse, when multivibrator 2279 will be triggered by the lagging edge of the said Z pulse. During the period of 233 micro-seconds that the Z pulse endures, gate 2277 will accordingly apply voltage by lead 2276 to one input of two-gate 2275; and to the second input of two-gate 2275 there is being applied, by leads 2274 and 2272, every pulse then being repeated in each trio of delay lines RRD1 to RRD8 in use in connection with any busy register. Accordingly, two-gate 2275 re-emits every such pulse, applies it to one input of one-gate 2283, and thus causes every such pulse to begin to be repeated in delay time 2286. By the end of the said Z pulse, therefore, every pulse in use in connection with any register during the 233 micro-seconds which the Z pulse endures, has been "recorded" in delay line 2286; but after the end of the Z pulse, owing to the triggering of multivibrator 2279, no further pulses are fed to delay line 2286 for the time being.

Now it will be remembered from the description of the way in which register channel pulses are suppressed by the clearing operation of pulses emitted by three-gate 2300, that each time a pulse is cleared from further repetition in any trio of delay lines, the clearing pulse is also applied to the inhibitory input of one-gate 2283: accordingly, when any trio of delay lines is cleared, the corresponding pulse is suppressed from further repetition in delay line 2286. It therefore follows that, by the time that multivibrator 2279 next reverts to applying voltage to the permissory input of gate 2277, any pulse at that time still being repeated in delay line 2286, must have been undergoing repetition for substantially 20 seconds— indicating that the register channel in which any such pulse is occurring has been in use for a quite unreasonable length of time.

In general, multivibrator 2279 will revert to applying voltage to the permissory input of gate 2277 at some instant between the occurrence of a Z pulse and an X pulse (because the period between a Z pulse and an X pulse is about six times the period between an X pulse and a Z pulse); and it will be supposed that multivibrator 2279 does so revert during the period between a Z pulse and an X pulse. (If it reverts during the period between an X pulse and a Z pulse, it will merely mean that the release operation about to be described, does not take place as soon as it should, but will take place later.)

Reversion having taken place during the period between a Z pulse and an X pulse, when the next X pulse occurs, that pulse is applied to composite gate 2279 on lead 2281 and thence re-applied to one input of two-gate 2282. To the second input of gate 2282 is applied, from one-gate 2283, every pulse still being repeated in delay line 2286; and each time such a pulse is applied from one-gate 2283, it is accordingly re-emitted by two-gate 2282 and applied via lead 2305 to lead 2258 and thus to one input of one-gate 2304 and to the input of one-gate 2257. The application of each pulse to one-gate 2304 causes a corresponding clearing operation to be performed in the way already described, thus releasing any register that has been retained for an unreasonable length of time. The application of each pulse to one-gate 2257 results (in the way already described) in the giving of a number-unobtainable signal to each subscriber who has been using his register channel for an unreasonable length of time.

On the occurrence of the Y pulse next following the X pulse that caused to be performed operations described in the preceding paragraph, delay line 2286 is cleared of pulses then being repeated in it (as was mentioned near the beginning of the description of this forced release operation). The recording process, and forced release operations (if needed) then start de novo when the next Z pulse occurs.

Reference will now be made to FIGURES 42 to 48 of the accompanying drawings, which show various forms of gate suitable for use in exchanges in accordance with the present invention, and to FIGURES 49 and 50, which show delay lines and their associated circuits for use in such exchanges.

Figure 42:
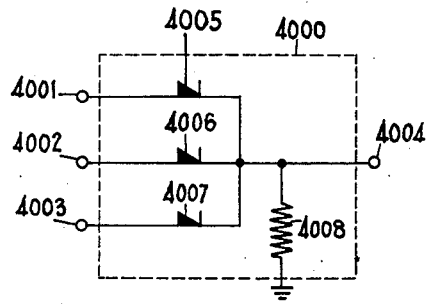

Referring to FIGURE 42, a one-gate, represented within the broken line 4000, and which will be referred to hereinafter as "the one-gate 4000," has three input terminals 4001, 4002 and 4003, and an output terminal 4004. The anodes of three rectifiers 4005, 4006 and 4007 are connected to the input terminals 4001, 4002 and 4003 respectively. The output terminal 4004 is connected to the cathode of each of the rectifiers 4005, 4006 and 4007, and also through a resistor 4008 to earth.

In operation the potential with respect to earth of the output terminal 4004 is zero, except when a positive-going pulse is applied between one or more of the input terminals 4001, 4002 or 4003 and earth. In this latter case the potential of the output terminal 4004 with respect to earth is caused to rise to, for example, between 10 and 20 volts, for the duration of the pulse. The gate 4000 thereby fulfills the function required of a one-gate as previously defined, that is, it produces an output pulse only when a pulse is applied to one or more of its input terminals.

If, for example, a positive-going pulse is applied between the terminal 4002 and earth, the rectifier 4006, which is normally non-conducting, is caused to pass current in its forward (i.e. low impedance) direction, thereby producing a voltage drop across the resistor 4008 which raises the potential of the terminal 4004 as required. When the pulse applied to the terminal 4002 ceases, the potential of the output terminal 4004 returns to that of earth, since no current then flows in the resistor 4008. If pulses are applied simultaneously to more than one of the input terminals 4001, 4002 and 4003, the resulting current through the resistor 4008 causes the potential of the terminal 4004 to rise above that of earth, and thereby produces an output pulse from the gate 4000.

In order that the output pulse from the gate 4000 may be of sufficient amplitude it is preferable that the sources of pulses connected to the input terminals 4001, 4002 and 4003 should have low impedance, which will be necessary in any case if the duration of the pulses to be applied to the gate 4000 is small (for example of the order of ½ micro-second) in order to overcome the effects of stray capacities in the wiring of the associated circuits.

If desired the earth connection to the resistor 4008 may be replaced by a connection to the negative terminal of a suitable source of potential (not shown), the positive terminal of this source being connected to earth. In this manner the transient response of the gate 4000 may be improved; however, this is not normally necessary in practice. In addition the potential of the output terminal 4004 may be held constant while no pulses are applied to any of the input terminals 4001, 4002 and 4003, by the provision of a further rectifier (not shown) having its cathode connected to output terminal 4004 and its anode connected to earth.

It will be appreciated by those skilled in the present art that, although a one-gate having three inputs has been described with reference to FIGURE 42, further inputs to this one-gate may be provided merely by connecting the cathodes of further rectifiers to the output terminal 4004, and a one-gate having only two inputs would be obtained by omitting rectifier 4005.

Figure 43:
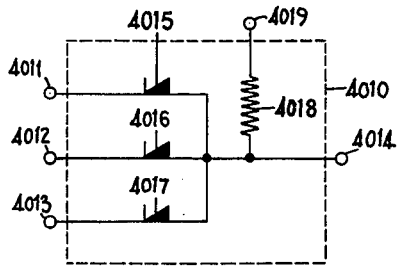

Referring now to FIGURE 43 a three-gate, shown within the broken line 4010, and which will be referred to hereinafter as "the three-gate 4010," has three input terminals 4011, 4012 and 4013, and an output terminal 4014. The cathodes of the three rectifiers 4015, 4016 and 4017 are connected to the input terminals 4011, 4012 and 4013 respectively. The output terminal 4014 is connected to the anodes of the rectifiers 4015, 4016 and 4017, and through a resistor 4018 to the positive terminal 4019 of a suitable source of potential (not shown), the negative terminal of the source being connected to earth.

In operation, three sources of pulses (not shown) are connected one to each of the input terminals 4011, 4012 and 4013, these sources being such that the impedance to earth at the input terminals 4011, 4012 and 4013 is low compared with the resistance of the resistor 4018. Hence, in operation each of the rectifiers 4015, 4016 and 4017 conducts in its forward direction while no pulse is applied to any of the input terminals 4011, 4012 and 4013, the potential with respect to earth of the output terminal 4014 being maintained at a value which is only just above that of earth.

Moreover, even if pulses are applied to one or more of the input terminals 4011, 4012, 4013, it is still true that the potential of terminal 4014 remains substantially equal to the potential of that one of terminals 4011, 4012, 4013 which has the lowest potential with respect to earth (since rectifiers 4015, 4016 and 4017 will pass such current as is necessary to maintain this equality). Accordingly, if pulses are not applied to all three of terminals 4011, 4012, 4013, the potential of terminal 4014 remains substantially unchanged; but if positive-going pulses are applied simultaneously to all three of terminals 4011, 4012, 4013, then the three-gate 4010 gives an output pulse as required.

Figure 44:
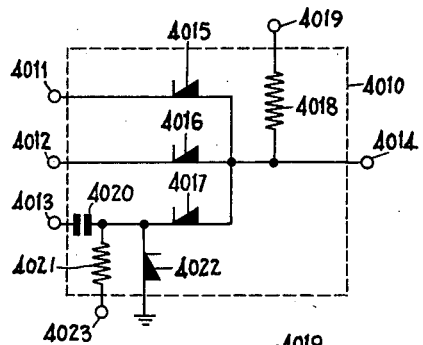

If the impedance of the source of pulses connected to the input terminal 4013, for example, is high, then the circuit of the three-gate may be modified as shown in FIGURE 44 by the provision of a capacitor 4020 connected between the terminal 4013 and the cathode of the rectifier 4017 together with a resistor 4021 and a rectifier 4022, each connected to the cathode of the rectifier 4017, and to a terminal 4023 and earth, respectively. The terminal 4023 is maintained in operation at a negative potential with respect to earth, the value of the resistor 4021 being such that the rectifier 4022 which has the anode thereof connected to earth, is normally conducting when no pulse is applied to the input terminal 4013. When a positive-going pulse is applied to the input terminal 4013 however, the rectifier 4022 is rendered non-conducting for the duration of that pulse, the operation of the three gate 4010 in other respects being the same as that of the circuit described with reference to FIGURE 43.

Figure 45:
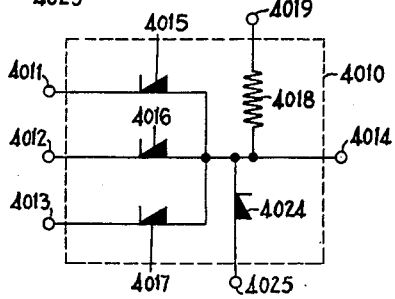

The three-gate 4010 described with reference to FIGURE 43 may also be modified, as shown in FIGURE 45, by the provision of a rectifier 4024 having the cathode thereof connected to the output terminal 4014 and the anode thereof connected to a terminal 4025. If the pulses applied to one or more of the input terminals 4011, 4012, and 4013 are such that they seek to cause the potentials of the one or more input terminals 4011, 4012 and 4013 to go negative with respect to earth (as, for example, in the case where these pulses are supplied by a transformer which produces a relatively large distortion of the pulses) the connection of terminal 4025 to earth potential will overcome this effect (which would otherwise influence the operation of the three gate 4010), since, because the source of pulses will itself have appreciable impedance, the connection through rectifier 4024 will ensure that none of terminals 4011, 4012, 4013 can assume an appreciably negative potential with respect to earth.

Figure 46:
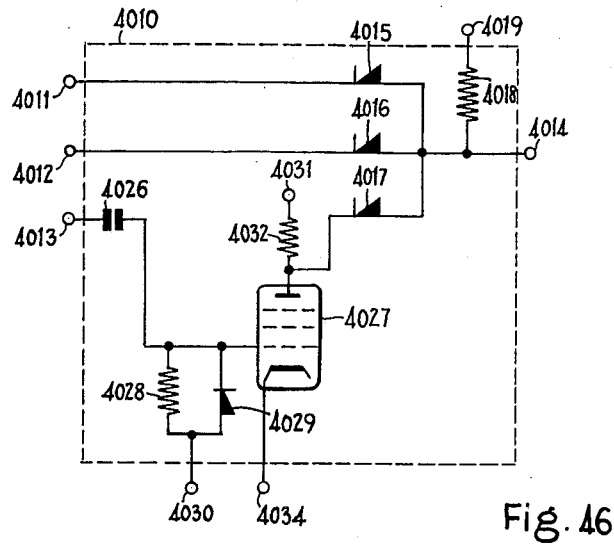

Alternatively, rectifier 4024 may be inverted (i.e. its cathode connected to terminal 4025 and its anode to terminal 4014) and the potential of the terminal 4025 with respect to earth may be maintained at a value which is slightly less than the least voltage amplitude of any pulse which may be applied to any of the terminals 4011, 4012 and 4013 in operation. In this case the amplitude of the pulse appearing at the output terminal as a result of the simultaneous application of pulses to each of the input terminals 4011, 4012 and 4013, will be substantially constant and independent of the amplitude of the pulses applied to the input terminals 4011, 4012 and 4013.

Where one or more of the inputs to the three-gate 4010 described with reference to FIGURE 43 is required to be a negatory input, then the circuit of the three-gate 4010 is modified in a manner similar to that shown in FIGURE 46. In FIGURE 46 the three-gate 4010 is provided with one negatory input terminal, this terminal being constituted by the input terminal 4013. The terminal 4013 in this circuit is connected through a capacitor 4026 to the control grid of a pentode valve 4027. The control grid of the valve 4027 is also connected, through a resistor 4028 and a rectifier 4029 connected in parallel, to a terminal 4030. The terminal 4030 is maintained in operation at a negative potential with respect to earth which is sufficient to bias the valve 4027 off, except when positive-going pulses are applied between the input terminal 4013 and earth.

The anode of the valve 4027, to which the cathode of the rectifier 4017 is directly connected, is connected to a terminal 4031 through a resistor 4032, the terminal 4031 being maintained at a positive potential with respect to earth during operation. The cathode of the valve 4031, to which the suppressor grid of that valve is directly connected, is connected to a terminal 4034 which during operation is maintained at a negative potential with respect to earth. The screen grid of the valve 4027 is connected directly to earth.

In operation the potential of the anode of the valve 4027, when no positive-going pulse is being applied to the terminal 4013, is arranged to be such that the rectifier 4017 is non-conducting. When a positive-going pulse of sufficient amplitude is applied to the input terminal 4013, the valve 4027 conducts and the potential of the anode of the valve 4027 falls as a result. Hence during the application of a positive-going pulse to the terminal 4013 the rectifier 4017 conducts, and it is not until pulses are applied simultaneously to the input terminals 4011 and 4012 and no pulse is then being applied to the input terminal 4013 that a pulse will appear at the output terminal 4014.

In the circuit of FIGURE 46 the potentials with respect to earth of the terminals 4019, 4030, 4031 and 4034 may be, for example, +75 volts, −75 volts, +20 volts and −70 volts respectively.

It will be apparent to those skilled in the present art, that, although examples of the construction of three-gates have been given with reference to FIGURES 43 and 46, the construction of any other n-gate is similar in principle. For example a five-gate having two negatory inputs will include five rectifiers, three of which are connected directly between an output terminal and an individual one of three input terminals, and the other two of which are each connected, in the manner of the rectifier 4017 of FIGURE 46, to the anode of a valve the condition of which is controlled by the pulses applied to one of the negatory inputs of that five-gate.

It will also be appreciated that the construction of a one-gate having an inhibitory input is the same as that of a two-gate having a negatory input. The construction of such a one-gate may therefore be the same as that of the three-gate 4010 described with reference to FIGURE 46, except that in this case one of the input terminals 4011 and 4012, together with its associate one of the rectifiers 4015 and 4016, will not be provided in that circuit.

The circuit of a modulator gate such as modulator gate 918 in subscribers line unit A/0000, is the same as that of an n-gate the greatest potential normally applied to the audio input terminal being arranged to be less that the least pulse potential applied to any of the other inputs of that n-gate.

Figure 47:
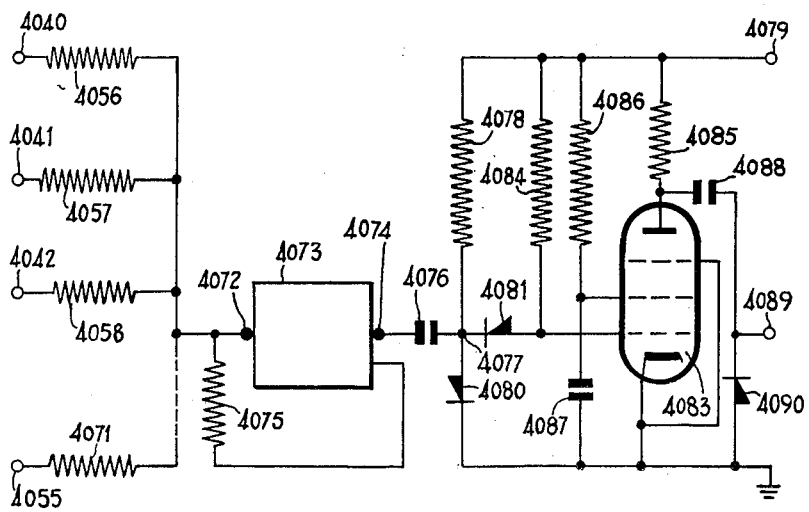

The construction of a three-gate having a large number of input terminals such as, for example, the three-gate 822 in the top section of unit A/1 (see FIGURE 16) may be substantially as shown in FIGURE 47. The three-gate shown in FIGURE 47 has sixteen input terminals 4040–4055 (some only of which are shown) each of which is connected through an individual one of sixteen similar resistors 4056–4071 (some only of which are shown) to the input terminal 4072 of an amplifier 4073. The amplifier 4073, which has an output terminal 4074, has a negative feedback path which includes the resistor 4075, and which causes there to be a very low apparent impedance between terminal 4072 and earth. The amplifier 4073 is so arranged that the current at the output terminal 4074 (during the subsistence of current pulses in resistors 4056 to 4071) is proportional to the sum of the current 5 in the said resistors 4056–4071. This is facilitated by the provision of a feedback path for the amplifier 4073 which includes the resistor 4075.

The output terminal 4074 is connected through a capacitor 4076 to a terminal 4077 which is connected through a resistor 4078 to a terminal 4079. The terminal 4079 is connected in operation to the positive terminal of a source of direct current (not shown), the negative terminal of this source being connected to earth. The terminal 4077 is also connected to the anode of a rectifier 4080 and to the cathode of a rectifier 4081. The cathode of the rectifier 4080 is connected to earth and the anode of the rectifier 4081 is connected to the control grid of a pentode valve 4083, and also to the terminal 4079 through a resistor 4084.

The cathode and suppressor grid of the valve 4083 are connected directly to earth, the anode of this valve being connected through a resistor 4085 to the terminal 4079. The screen grid of the valve 4083 is connected through a resistor 4086 to the terminal 4079, and through a capacitor 4087 to earth.

The anode of the valve 4083 is also connected through a capacitor 4088 to an output terminal 4089, the terminal 4089 being connected to the cathode of a rectifier 4090 which has the anode thereof connected directly to earth.

The rectifier 4080 is normally conducting and remains so until pulses are applied simultaneously to three or more of the input terminals 4040–4055.

When pulses are applied to three or more of the input terminals 4040–4055 it is arranged that the resulting positive-going pulse applied to the input terminal 4072 causes the current drawn by the terminal 4074 through the resistor 4078 to exceed that normally passed by the rectifier 4080. The rectifier 4080 is thereby cut-off and the rectifier 4081 then commences to pass appreciable current, this causing the potential of the control grid of the valve 4083 to fall. This fall in potential of the control grid of the valve 4083 is arranged to cause the valve 4083 to cut-off, thereby passing a positive-going pulse to the output terminal 4089.

If pulses are applied to less than three of the input terminals 4040–4055, the rectifier 4080 is not cut-off, and as a result no pulse appears at the output terminal 4089.

Since the operation of the three-gate described with reference to FIGURE 47 is dependent upon the magnitude of the currents passing through each of the resistors 4056–4071, it will be necessary to ensure that the amplitudes of the pulses applied to the input terminals 4041–4055 of that three-gate should be stabilised to a given value, otherwise the correct operation of this gate might be seriously affected. In order to ensure that this requirement is met the pulses applied to the three-gate 822 in the unit A/1 of FIGURE 16, are made substantially independent of the amplitude of the pulses applied to the two-gates such as SG1/4 in the lower section of unit A/1 (FIGURE 16) by adopting for these two-gates a circuit of the kind described above as the modified form of FIGURE 45—that is to say, terminal 4013 and rectifier 4017 would be omitted (converting into a two-gate the three-gate shown in FIGURE 45), and rectifier 4024 would have its cathode connected to terminal 4025 and its anode to terminal 4014 (a suitable positive potential being applied to terminal 4025).

A gate of the kind described with reference to FIGURE 46 is, however, not suitable if a negatory or inhibitory input signal may need to persist for longer than about 10 milli-seconds. The gates, in the forms of exchange which have been described, which may have such persistent negatory or inhibitory signals applied to them, are:

(1) One-gate 285 in speech channel temporary store sub-unit 194 in FIGURE 4:

(2) One-gates 1050 and 1051, and 1037 and 1049 in FIGURE 22:

(3) One-gates 2192 and 2194 in control sub-unit 2137 in FIGURE 26:

(4) Two-gate 2352 and five-gate 2353 in the register shown in FIGURE 28.

A circuit suitable for such gates will now be described with reference to FIGURE 48 of the accompany drawings, which shows a five-gate such as five-gate 2353 having four ordinary inputs and one negatory input. As will be seen from this figure, the gate has output terminal 4014, terminal 4019 (to which a positive potential of 75 volts may suitably be applied, as indicated) and resistor 4018, connected to the anodes of five diodes, 4091/1, 4091/2, 4091/3, 4091/4, 4091/5, the cathodes of diodes 4091/1 to 4091/4 being connected respectively to ordinary input terminals 4092/1, 4092/2, 4092/3, 4092/4. The cathode of diode 4091/5 is connected to terminal 4093, which is intended to be maintained at a positive potential of about 20 volts when no signal is applied to terminal 4094, which is the negatory input to the gate. Terminal 4094 is connected through resistor 4095/1 to the control grid of pentode 4096, which control grid is connected by resistor 4095/2 to terminal 4097 and by resistor 4095/3 to terminal 4093. The remaining connections of pentode 4096 are such as to form a conventional "see-saw" or "anode-follower" circuit, in which negative feed-back causes it to behave as an inverter with low output impedance.

The magnitudes of resistors 4095/1, 4095/2 and 4095/3, and the potential applied to terminal 4097, are so chosen (according to the potential of terminal 4094 and of any other input terminals connected, as mentioned below, to the control grid of pentode 4096) that when no signal is applied to terminal 4094, terminal 4093 assumes the desired positive potential of about 20 volts and that when a positive-going signal is applied to terminal 4094 (the magnitude of the signal available depending, of course, on the design of the circuits applying the said signal to terminal 4094), terminal 4093 assumes earth potential or a potential which is negative with respect to earth.

As will be obvious, this circuit may be converted into a two-gate with one negatory input (and, therefore, into a one-gate with one ordinary and one inhibitory input) by omitting terminals 4092/1 to 4092/3 and their associated diodes, leaving only terminal 4092/4 as a normal input. Additional inhibitory inputs for this one-gate, may be provided by connecting additional terminals and resistors, similar to terminal 4094 and resistor 4095/1, to the control grid of pentode 4096.

Delay lines and their associated circuits will now be described.

Where it is necessary to provide a delay line having an output circuit connected to the input circuit end of the delay line, as for example in the channel pulse store A/31 described above, a circuit such as that shown in FIGURE 21 may be employed.

Figure 49:
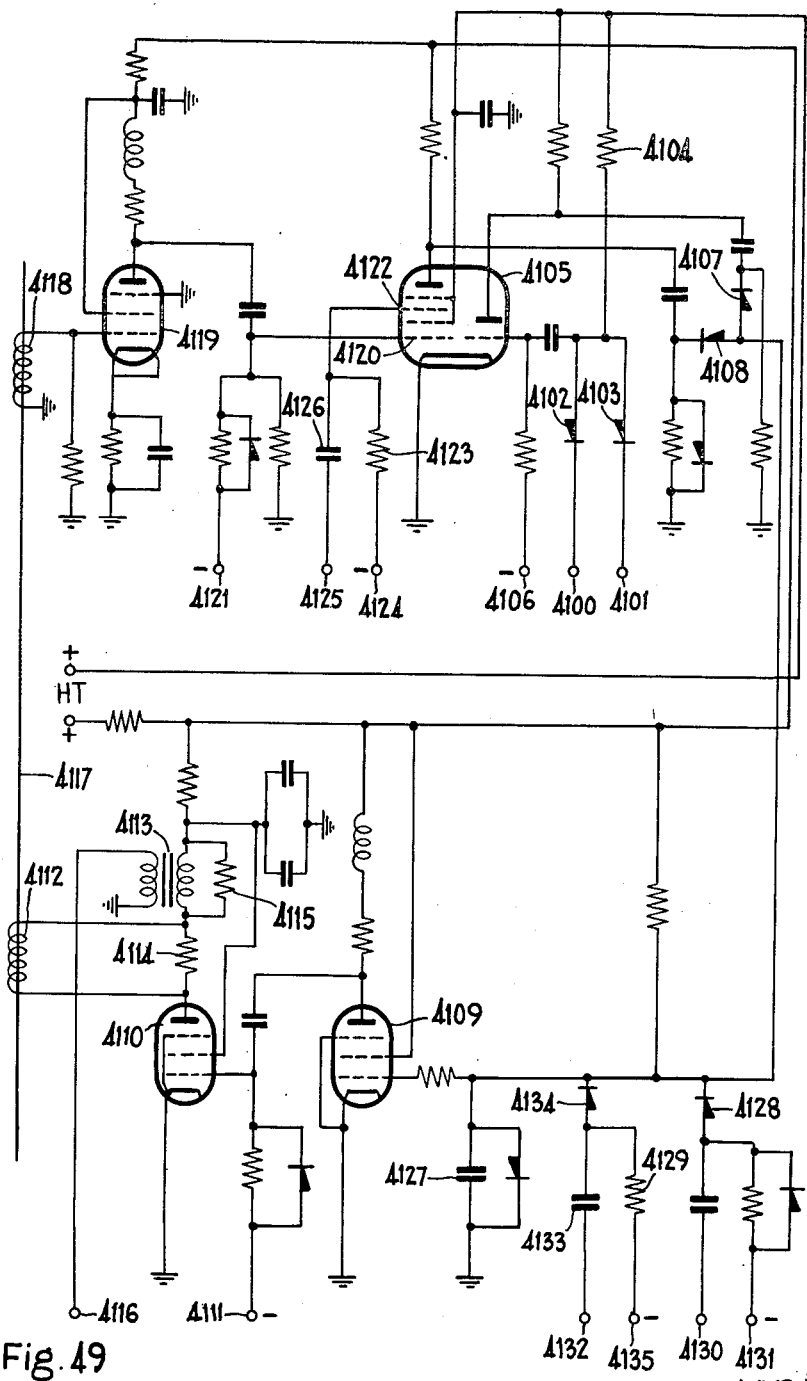

Referring now to FIGURE 49, two input terminals 4100 and 4101 constitute the input terminals of a two-gate which comprises two rectifiers 4102 and 4103, and a resistor 4104. This two-gate, for example, corresponds to the two-gate to the extreme right of each delay line in channel pulse store A/31.

When positive-going pulses are applied simultaneously to the input terminals 4100 and 4101, a positive-going pulse is applied as a result to the control grid of the triode section of a triode-hexode valve 4105. The triode section of the valve 4105 is normally cut-off due to the bias potential applied to the control grid thereof from a terminal 4106 and is arranged to be cut-on by the application of this positive-going pulse.

The resulting negative-going pulse appearing at the anode of the triode section of the valve 4105 is passed to the cathode of a rectifier 4107. The rectifier 4107 has the anode thereof connected to the anode of a rectifier 4108, the rectifiers 4107 and 4108 forming part of a one-gate which constitutes the one-gate lying immediately to the right of each delay line in the channel pulse store A/31.

The negative-going pulse which appears at the anode of the rectifier 4107 is passed to the control grid of a pentode valve 4109, which is normally fully conducting, to render this valve cut-off for the duration of that pulse. The resulting positive-going pulse which appears at the anode of the valve 4109 is passed to the control grid of a pentode valve 4110 which is normally cut-off due to the negative bias applied thereto from a terminal 4111. As a result, a negative-going pulse appears at the anode of the valve 4110, this pulse being an amplified version of the pulse appearing at the anode of the triode section of the valve 4105.

The anode of the valve 4110 is connected through a coil 4112 and the primary winding of the transformer 4113. A resistor 4114 and a resistor 4115 are connected across the coil 4112 and the primary winding of the transformer 4113, respectively, for damping purposes.

The secondary winding of the transformer 4113 is connected so that a positive-going pulse will appear between an output terminal 4116 and earth, when a positive-going pulse appears at the anode of the valve 4110. Output terminal 4116 constitutes the output terminal to which are connected the lead or leads feeding signals to associated circuits.

The coil 4112 is situated at one end of a length of wire 4117, the wire 4117 passing through the centre of the coil 4112. The wire 4117 is made of an alloy containing 49% of cobalt, 49% of iron and 2% of vanadium, and has a diameter of 0.005 inch.

When a pulse is applied to the coil 4112 a magnetic flux is produced thereby in the wire 4117. Due to the magnetostrictive effect in the wire 4117 a wave passes along the length of the wire 4117 to a coil 4118 which is positioned at the end of the wire 4117 remote from the coil 4112.

The coil 4118, through the centre of which the wire 4117 passes, is similar to the coil 4112 except that the coil 4118 has associated therewith a permanent magnet (not shown) which produces a polarizing magnetic field in that portion of the wire 4117 which is surrounded by the coil 4118. Thus, when the wave produced in the wire 4117, as a result of the pulse applied to the coil 4112, reaches the portion of the wire 4117 which is surrounded by the coil 4118, a voltage waveform is produced across the coil 4118.

The voltage waveform produced across the coil 4118 is applied to the control grid of a pentode valve 4119 at the anode of which an amplified, though inverted, form of this waveform is obtained. This amplified waveform, which comprises two negative portions and one positive portion having a relatively large amplitude, is applied to a grid 4120 of the hexode section of the valve 4105, this hexode section of the valve 4105 being normally cut-off, due, in part, to the negative bias applied to the grid 4120 from a terminal 4121.

A grid 4122 of the hexode section of the valve 4105 is connected through a resistor 4123 to a terminal 4124 which is maintained at a negative bias potential with respect to earth, in operation. The grid 4122 is also connected to a terminal 4125 through a capacitor 4126.

Check pulses, consisting of a train of regularly recurring pulses having a recurence time of 1 microsecond, are applied to the terminal 4125 during operation, each check pulse having a duration of 0.1 microsecond.

It is arranged that the hexode section of the valve 4105 is only cut-on during the simultaneous application of a check pulse to the grid 4122 and the positive portion of the waveform applied to the grid 4120. The hexode section of the valve 4105 therefore acts as a two-gate, the output pulse from the anode of the hexode section of the valve 4105 being applied to the cathode of the rectifier 4108, and thereby to the control grid of the valve 4109.

The short, negative-going pulse applied to the control grid of the valve 4109 causes a capacitor 4127 to discharge, thereby reducing the potential of the control grid of the valve 4109, and rendering the valve 4109 cut-off.

The control grid of the valve 4109 is also connected, through a rectifier 4128 and a capacitor 4129, to a terminal 4130 to which check pulses are applied. The anode of the rectifier 4128 is connected to a terminal 4131 which is maintained at a negative potential with respect to earth in operation.

The check pulses applied to the terminal 4130 are constituted by a train of positive-going pulses which has a recurrence time of 1 microsecond, each of these pulses having a duration of 0.1 microsecond. The positions in time of the check pulses are arranged so that each check pulse is applied to the terminal 4130 ½ microsecond after the application of a check pulse to the terminal 4125.

Until the application of the next check pulse to the terminal 4130, after the valve 4109 has been cut-off by the pulse applied to the control grid thereof from the anode of the hexode section of the valve 4105, the capacitor 4127 remains in a discharged condition, since the charging circuit thereof is of high resistance. However, when this next check pulse is applied to the terminal 4130 the capacitor 4127 charges and the valve 4109 is again cut-on. Thus the output from the anode of the valve 4109 is a ½ microsecond pulse, which is substantially rectangular.

This ½ microsecond pulse is passed to the coil 4112 and to the terminal 4116 through the amplifying stage which includes the valve 4110.

Figure 50:
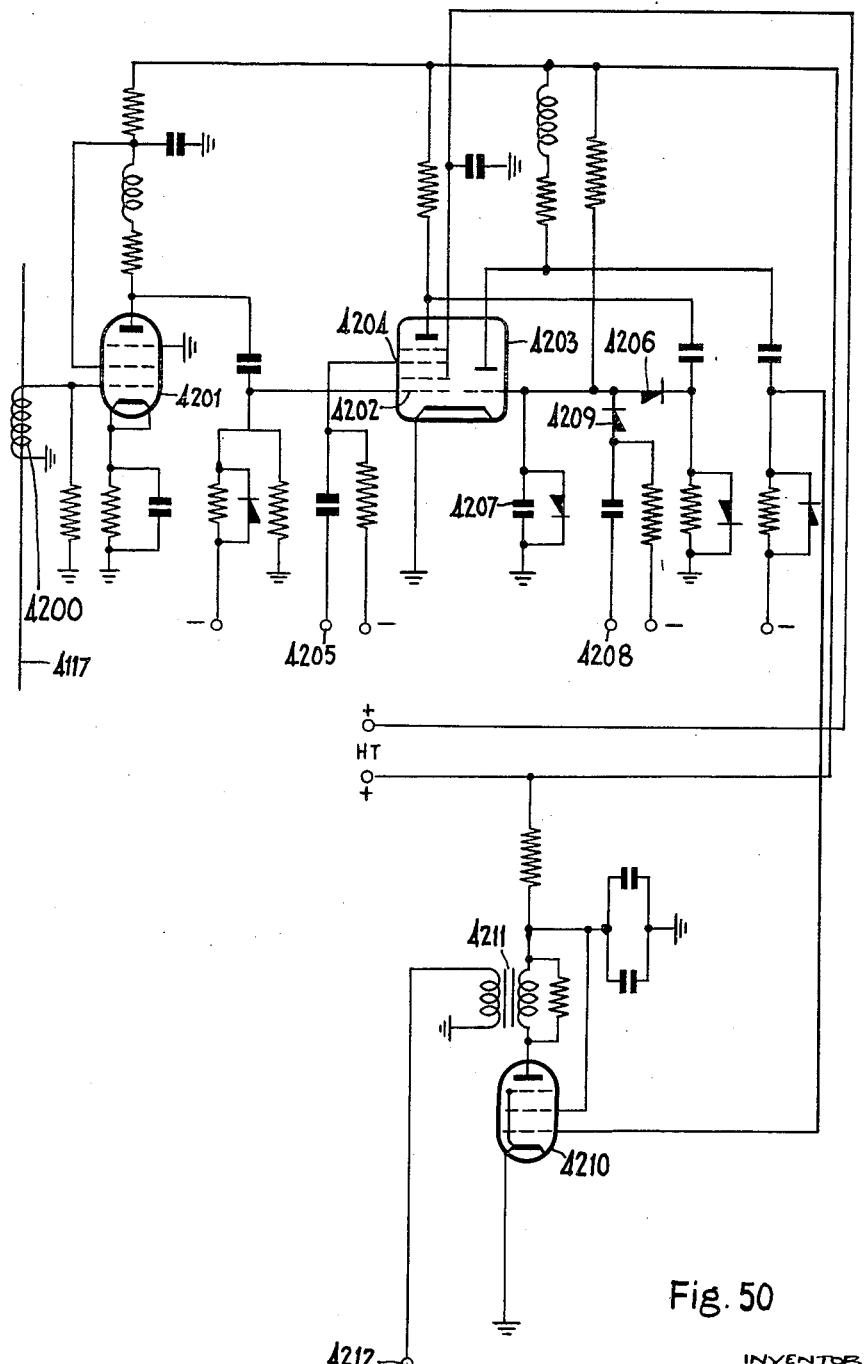

In this manner the pulse originally applied to the control grid of the triode section of the valve 4105 is caused to circulate around the circuit described above with reference to FIGURE 49, this pulse appearing at the output terminal 4116 at regular time intervals determined by the delay of the delay line which is constituted by the wire 4117. This delay may be varied by varying the relative positions of the coils 4112 and 4118 along the length of the wire 4117. The circulation of the pulse may be stopped by the application of a positive-going pulse to a terminal 4132 which is connected, through a capacitor 4133 and a rectifier 4134, to the control grid of the valve 4109, the anode of the rectifier 4134 being connected to a terminal 4135 which is maintained in operation at a negative potential with respect to earth. During the application of this positive-going pulse to the terminal 4132, the control grid of the valve 4109 will be maintained at a potential which is sufficient to prevent the valve 4109 being cut-off by any pulses appearing at the cathode of the rectifier 4108. Hence, by applying a positive-going pulse to the terminal 4132 at the correct time, that is at a time at which the circulating pulse would normally cause the valve 4109 to be cut-off, the circulation of a pulse may be stopped.

Where it is necessary to provide a centre tap on the delay line as in the case of delay lines of channel pulse store A/31, the circuit shown in FIGURE 50 may be used for this purpose.

Referring now to FIGURE 50, a coil 4200 which is similar to the coil 4118 of FIGURE 49 is arranged to lie approximately mid-way between the coils 4112 and 4118 of FIGURE 49 along the line 4117 (only a portion of which is shown in FIGURE 50). The coil 4200 has a polarizing magnet (not shown) associated therewith which produces a polarizing magnetic field in the line 4117 where this is surrounded by the coil 4200. In this manner it is arranged that a voltage waveform is produced across the coil 4200 at a given time after the application of a pulse to the coil 4112 (FIGURE 49). The actual length of time between the application of the pulse to the coil 4112 (FIGURE 49) and the appearence of the resulting voltage waveform across the coil 4200, is dependent upon the position of the coil 4200 along the length of the line 4117 with respect to that of the coil 4112 (FIGURE 49), and in practice the position of the coil 4200 is adjusted to give the required delay.

The voltage waveform appearing across the coil 4200 is first amplified by a pentode valve 4201 and then passed to a grid 4202 of the hexode section of a triode-hexode valve 4203. To a grid 4204 of the triode hexode valve 4203, positive-going check pulses are applied from a terminal 4205, these check pulses being identical in form and timing with those applied to the grid 4122 from the terminal 4125 of FIGURE 49. The hexode section of the valve 4203 functions in exactly the same manner as the hexode section of the valve 4125 of FIGURE 49 and "gates" the waveform from the valve 4201 with one of the check pulses applied to the terminal 4205, the output pulse which is negative-going from the anode of the hexode section of the valve 4201 being passed to the cathode of a rectifier 4206.

The negative-going pulse applied to the cathode of the rectifier 4206 causes a capacitor 4107 to discharge so that the triode section of the valve 4203, which is normally cut-on, is, as a result, cut-off.

The triode section of the valve 4203 remains cut-off for ½ micro-second, at the end of which time one of a train of positive-going check pulses is applied to a terminal 4208. The check pulses applied to the terminal 4208 are identical in form and timing with the check pulses applied to the terminal 4130 of FIGURE 49, and are applied to the control grid of the triode section of the valve 4203 through a rectifier 4209.

The resulting pulse at the anode of the triode section of the valve 4203 is applied to the control grid of a pentode valve 4210 which is connected in an amplifier stage, the pulse output from the anode of the valve 4210 being applied through a transformer 4211 to an output terminal 4212.

Where it is necessary to provide delay lines having output circuits connected to other than the input end of the delay line, it will be apparent to those skilled in the present art that circuits such as that described with reference to FIGURE 50 may be employed to provide such output circuits.

The circuit of the starter 123 described with reference to FIGURE 2 will now be described in greater detail with reference to FIGURE 51 of the accompanying drawings. FIGURE 51 also shows, in addition to the circuit of starter 123, that part of the circuit of FIGURE 2 which includes one-gate 117, lead 118, two-gate 104, and the circuit arrangement for feeding pulses to lead 106 from two-gate 104. The said circuit arrangement shown in FIGURE 51 for feeding pulses to lead 106 from two-gate 104, is the apparatus referred to in the description of FIGURE 2, which ensures that only one pulse emitted by two-gate 104 during the pulse from starter 123 is passed to delay line 107.

As shown in FIGURE 51, starter 123 of FIGURE 2 includes a cold cathode gas-discharge triode 4251 the anode of which is connected directly to terminal 4252 which is itself connected, in operation, to the positive terminal of a source of direct current (not shown), the negative terminal of this source being connected to earth. The trigger electrode of triode 4251 is connected through resistor 4253 to terminal 4252, and also through a capacitor 4254 to earth.

The cathode of triode 4251 is connected to earth through a resistor 4255 and through a capacitor 4256 to one of the two inputs of one-gate 117, this input of one-gate 117 being connected to earth through a resistor 4257. The other input of the one-gate 117 is, as will be remembered, connected to receive pulses from lead 116.

The output from one-gate 117 is passed over lead 118 to an input of two-gate 104, the other input (lead 4267 in FIGURE 51) of two-gate 104 being connected to receive pulses, as described with reference to FIGURE 2, from squarer 103. The output of two-gate 104 is connected to the control grid of a triode section 4258a of a double triode 4258.

The cathode of the triode section 4258a is connected through a capacitor 4259 and a resistor 4260, in parallel, to earth, the anode of the triode section 4258a being connected directly to the anode of the other triode section 4258b of the double triode 4258. The cathode of the triode section 4258b is connected directly to earth whilst the anode thereof is connected through the primary winding 4261a of a transformer 4261, and a resistor 4262 to terminal 4252. The junction of winding 4261a and resistor 4262 is decoupled by a capacitor 4263.

Transformer 4261 has, in addition to the winding 4261a, two secondary windings 4261b and 4261c, winding 4261b having one terminal thereof connected directly to the control grid of the triode section 4258b and the other terminal thereof connected through a resistor 4264 to terminal 4265. Terminal 4265 is maintained, in operation, at a negative potential with respect to earth, and the junction of winding 4261b and resistor 4264 is connected to earth through a capacitor 4266.

The winding 4261c of transformer 4261 has one terminal thereof connected directly to earth and the other terminal thereof connected to leads 106 and 112.

As described above with reference to FIGURE 2, starter 123 is used to set pulse generator K/1 into operation when first starting up or on starting up after a shutdown. Before pulse generator K/1 is first started up or re-started after a shut-down, terminal 4252 will be disconnected from the positive terminal of the direct current source aforementioned to which terminal 4252 is normally connected when in operation. Accordingly, before starting up, capacitor 4254 will be in a discharged condition; but when, in starting up, terminal 4252 is connected to the positive terminal of the direct current source, capacitor 4254 will charge through resistor 4253. It is arranged that the time constant of the series combination of resistor 4253 and capacitor 4254 is such that the potential of the trigger electrode of triode 4251 with respect to earth, becomes sufficient to cause the main discharge path through triode 4251 to fire only at the end of a period of approximately 200 micro-seconds after the connection of terminal 4252 to the positive terminal of the direct current source.

The firing of the main discharge path through triode 4251 results in a rise in the voltage across resistor 4255, and therefore in the appearance of a positive-going pulse at the cathode of triode 4251, this pulse being applied to lead 118 through one-gate 117.

As described above with reference to FIGURE 2, generator 100 supplies the wave S to the squarer 103, and as a result squarer 103 supplies clock pulses of ½ micro-second duration to the input lead 4267 of two-gate 104 (and to the two-gate 105 also). Hence, when a pulse from the starter 123 appears on lead 118 after starting up, a pulse from squarer 103 is applied to two-gate 104 and gates the pulse on lead 118. A pulse having a duration of ½ micro-second is, as a result, applied between the control grid of the triode section 4258a and earth.

The ½ micro-second pulse applied to the control grid of the triode section 4258a results in the triggering of the blocking oscillator circuit formed by the triode section 4258b, the transformer 4261, the resistor 4264 and the capacitor 4266. By reason of the normal operation of this blocking oscillator circuit therefore, a pulse is applied after starting up to leads 106 and 112, and is passed, as described with reference to FIGURE 2, to delay line 107 and multivibrator 111.

The blocking oscillator will remain "blocked," in the normal manner, for a period after the application thereby of a pulse to leads 106 and 112, that is, the blocking oscillator will, for a determinate period after the application of a pulse to delay line 107 and multivibrator 111, remain in a condition in which it is unresponsive to the application of pulses to the control grid of the triode section 4258a. In this manner therefore, a pulse will appear on lead 106 in response to the first pulse applied to the control grid of the triode section 4258a after starting up, but no pulses will appear on leads 106 and 112 as a result of pulses, after the first, applied to the control grid of the triode section 4258a during the period in which the blocking oscillator is blocked.

It is arranged that the duration of the blocked period is sufficiently long to ensure that the pulse which appears at the cathode of triode 4251 as a result of starting up, has disappeared before the blocking oscillator returns to its normal "unblocked" condition, that is, until the blocked period ends. As stated above in connection with FIGURE 2, therefore, only one pulse will be passed to delay line 107 during the pulse from starter 123. It will be appreciated also that the blocked period of the blocking oscillator, whilst being of sufficient duration to ensure that only one pulse is applied to delay line 107 on starting up, must not be so long that the blocking oscillator is unresponsive to pulses which, in normal operation, are applied to the control grid of the triode section 4258a as a result of the passage of pulses from lead 106, through delay lines 107 and 115 of FIGURE 2, and one-gate 117, to lead 118. Accordingly, the said blocked period must be less than 233 micro-seconds—and the time needed for the aforementioned pulse to disappear from the cathode of triode 4251 must, as already mentioned, be less than the blocked period.

Reference has been made in the foregoing description to local clock pulse generator units—see references to unit CPU/1 in FIGURE 4, unit CPU/2 in FIGURE 5, unit CPU/3 in FIGURE 18, unit CPU/10 in FIGURE 26, and the unit to be connected to lead 2302 in FIGURE 27—which, like squarer 103 in FIGURE 2, emit clock pulses of the kind shown in FIGURE 3(b). Each of the clock pulse generator units comprises, as shown in FIGURE 52 of the accompanying drawings, a phase-changer 4271 and a squarer 4272.

As shown in FIGURE 52, the wave S having a frequency of 1 megacycle per second and generated at terminal S of sine wave generator 100 as described in connection with FIGURE 2, is applied between an input terminal 4273 of phase-changer 4271 and earth and is passed to the control grid of a pentode 4274 which acts as an amplifier. The amplified wave S which appears across resistor 4275 connected in the anode circuit of pentode 4274, is applied to delay line 4276.

The delay line 4276 is of the well-known lumped constant type and has an overall delay time of 1 microsecond, that is, a delay time equal to the period of oscillation of the wave S. Any one of twelve tappings 4277 on delay line 4276 may be selected by a switch 4278, it being arranged that there is a 30° phase difference in the wave S between adjacent tappings 4277 of delay line 4276. The wave S, in the particular phase selected by the switch 4278 from delay line 4276, is applied to the control grid of a pentode 4279 through the parallel combination of a fixed capacitor 4280 and a variable capacitor 4281. Adjustments to the phase of the wave S applied to the control grid of the pentode 4279 can be made by means of the variable capacitor 4281, a change in phase of up to 30° being obtainable thereby.

In the above manner therefore, the phase of the wave S applied to the control grid of pentode 4279 may be adjusted to differ from that of the wave S as applied to the control grid of pentode 4274 by any value within the range 0° to 360°.

The wave S applied to the control grid of pentode 4279 is amplified by pentode 4279 and appears across a parallel tuned circuit formed by a capacitor 4282 and the primary winding 4283a of a transformer 4283. Transformer 4283 has, in addition to the primary winding 4283a, a secondary winding 4283b connected so that the waves as amplified by pentode 4279 appears between an output terminal 4284 and earth.

The wave S appearing between the output terminal 4284 of the phase-changer 4271, and earth, is applied between an input terminal 4285 of the squarer 4272, and earth.

The amplified wave S in the required phase, appearing at terminal 4285, is passed to the control grid of a pentode 4286 which is arranged in an amplifier stage. As a result, the wave S is further amplified and appears across a parallel tuned circuit formed by parallel connected capacitors 4287 and 4288 and the primary winding 4289a of a transformer 4289.

The transformer 4289 has, in addition to the primary winding 4289a, a secondary winding 4289b, one terminal of which is connected directly to earth, and the other of which is connected to the cathode of a diode 4290. The anode of diode 4290 is connected directly to the control grid of a pentode 4291 and, through a resistor 4292, to the high tension lead 4293 of squarer 4272.

As a result of the appearance of the wave S across the primary winding 4289a of transformer 4289, that wave S also appears across the secondary winding 4289b and is applied, therefore, between the cathode of diode 4290 and earth. During those half-cycles of the wave S when the potential of the cathode of the diode 4290 is caused to be positive with respective to earth, there is a relatively large voltage difference between the anode and the cathode of the diode 4290, this resulting in an increase in the potential, with respect to earth, of the control grid of valve 4291. However, during those half-cycles of the wave S when the potential of the cathode of the diode 4290 is caused to be negative with respect to earth, there is a relatively small voltage difference between the anode and the cathode of diode 4290, the potential (with respect to earth) of the control grid of pentode 4291 decreasing in consequence.

It is arranged that pentode 4291 is cut-off for those half-cycles of the wave S during which the potential of the cathode of diode 4290 is negative with respect to earth. In this manner a positive-going pulse train appears at the anode of pentode 4291, the anode circuit of pentode 4291 including a compensating inductor 4294. The pulses of this pulse train have a duration of ½ micro-second and have a repitition period of 1 micro-second.

The pulse train appearing at the anode of pentode 4291 is passed to the control grid of a pentode 4295 which is connected in the cathode follower stage. The pulse train so applied to the control grid of pentode 4295 is D.C. restored in the well-known manner by a diode 4296 which has its cathode connected to the control grid of pentode 4295 and its anode connected to terminal 4297, which is maintained in operation at a negative potential with respect to earth.

The squared output pulse train appearing across a resistor 4298 connected between the cathode of pentode 4295 and earth, is applied between an output terminal 4299 of the squarer 4272 and earth.

It will be appreciated that the clock pulse generator unit described above with reference to FIGURE 52 includes phase-changer 4271 in order that compensation may be made for any undesirable phase delay imposed upon the wave S in transmission from generator 100 to that clock pulse generator unit. The phase of the wave S (as received on terminal 4273 in any one such generator unit) is suitably adjusted, by means of switch 4278 and condenser 4281 in phase-changer 4271 (of the unit concerned) before application to terminal 4285, so as to obtain the appropriate relative timing of the clock pulses emitted at output terminal 4299 of each squarer 4272 throughout the exchange.

The squarer 103 of FIGURE 2 has a circuit which is the same as the circuit of squarer 4272 described with reference to FIGURE 52. In this case the wave S, generated by generator 100 and applied to lead 102 of FIGURE 2, is applied directly to the input terminal 4285, it being unnecessary in this instance to provide a phase-changer such as phase-changer 4271, connected between generator 100 and squarer 103. The output pulse train for squarer 103 will appear at an output terminal corresponding to the output terminal 4299 of FIGURE 52 and will be applied from that terminal to each of the two gates 104 and 105 as shown in FIGURE 2.

Each of the counters 130 to 132, 145, 151 to 153, 167, and 174 to 176, of FIGURE 2, is of the well-known type using a bi-stable multivibrator—see, for example, Sections 5.4 and 17.3 of volume 19 (Waveforms) of the Massachusetts Institute of Technology Radiation Laboratory Series, published by McGraw-Hill Book Company Inc., which set out the general principles and various circuit arrangements. Since it is desirable to incorporate a cathode-follower circuit in the output lead from each stage of such counters (in accordance with the general instructions given earlier in this specification), it is convenient to combine each cathode-follower triode with the valve associated with it in the multivibrator circuit. FIGURE 53 of the accompanying drawings accordingly shows a counter arrangement in which a double-triode valve is used to provide this combination conveniently.

As shown in FIGURE 53, the triode section 4311b and the triode section 4312a of the double triodes 4311 and 4312 respectively, have the cathodes thereof connected directly to earth. The anode of triode section 4311b is connected, through resistor 4313, to a terminal 4314, and, through resistor 4315 and capacitor 4316 in parallel, to the control grid of triode section 4312a. Similarly, the anode of triode section 4312a is connected, through resistor 4317, to terminal 4314, and, through resistor 4318 and capacitor 4319 in parallel, to the control grid of triode section 4311b.

The control grids of the triode sections 4311b and 4312a are connected directly to the control grids of the triode sections 4311a and 4312b respectively, and also, through resistors 4320 and 4321 respectively, to a terminal 4322.

The cathode of triode section 4311a is connected to a terminal 4323, and, through resistor 4324, to the terminal 4322. Similarly, the cathode of triode section 4312b is connected to a terminal 4325, and, through resistor 4326 to terminal 4322. The anodes of the triode sections 4311a and 4312b are connected directly to terminal 4314.

A terminal 4327 is connected through a capacitor 4328 and a resistor 4329 to a terminal 4330, and, through the capacitor 4328, to crystal diodes 4331 and 4332 which are connected to the anodes of the triode sections 4311b and 4312a respectively.

A terminal 4333 is connected through a capacitor 4334 to the control grid of each of the triode sections 4311a and b, and a terminal 4335 is connected directly to the anode of the triode section 4311b.

In operation one of the triode sections 4311b and 4312a is in a conducting condition whilst the other is in a non-conducting condition, the circuit in which the triode sections 4311b and 4312a are connected being that of a bi-stable multivibrator. The condition of this multivibrator circuit is changed from one stable state to the other by the application of a negative-going pulse to terminal 4327.

It will be assumed for the purposes of explanation that the triode section 4311b is conducting in the initial condition of the multivibrator circuit and thus that the triode section 4312a is then non-conducting. Initially therefore, the application of a negative-going pulse to terminal 4327 causes a negative-going pulse to appear at the anodes of each of the triode sections 4311b and 4312a. The negative-going pulse at the anode of the non-conducting triode section 4312a does not affect its condition, but, via the parallel connected resistor 4318 and capacitor 4319, a negative-going pulse is applied as a result to the control grid of the conducting triode section 4311b. Triode section 4311b therefore becomes non-conducting, the resultant rise in potential at the anode of triode section 4311b overriding the negative-going pulse applied thereto from terminal 4327, and also applying a positive-going pulse to the control grid of the triode section 4312a. The triode section 4312a as a result, becomes conducting. The multivibrator is now in that stable state in which the triode section 4312a is conducting and the triode section 4311b is non-conducting.

If now another negative-going pulse is applied to terminal 4327, the resultant negative-going pulse applied to the anode of triode section 4311b causes triode section 4312a to become non-conducting, this resulting in the application of a positive-going pulse to the control grid of triode section 4311b. As a result therefore, the multivibrator is restored to its initial condition, that is, that in which triode section 4311b is conducting and triode section 4312a is non-conducting; the application of a still further negative-going pulse to the input terminal 4327 would now result in a repetition of the events described in the preceding paragraph.

It will be appreciated from the above description that the condition of the multivibrator is changed from one stable state to the other on the successive application of negative-going pulses to terminal 4327.

When the multivibrator is in that stable state in which triode section 4311b is non-conducting, the triode section 4311a will be non-conducting also, and therefore the potential of the terminal 4323 will be that of earth. However, when triode section 4311b is conducting in the other stable state of the multivibrator, triode section 4311a will also be conducting, and the potential of terminal 4323 is then positive with respect to earth. Similarly, when the multivibrator is in the stable state in which triode section 4312a is non-conducting, triode section 4312b is non-conducting also, and the potential of terminal 4325 is that of earth; and when the multivibrator is in the stable state in which triode section 4312a is conducting, triode section 4312b is conducting, and the potential of terminal 4325 is positive with respect to earth. Hence, in the first stable state of the multivibrator there is a positive potential with respect to earth at the terminal 4323 and earth potential at the terminal 4325, whilst in the second stable state of the multivibrator, there is earth potential at the terminal 4323 and a positive potential with respect to earth at the terminal 4325.

The multivibrator may be set to an initial datum condition, in actual fact the said first stable state (in which the triode section 4311b is conducting and the triode section 4312a is non-conducting), by the application of a positive-going pulse, with respect to earth, to the terminal 4333. If, on the application of this positive-going pulse to terminal 4333, triode section 4311b is non-conducting and therefore triode section 4312a is conducting, that is, if the multivibrator is in the said second stable state, the condition of the multivibrator will change to the said first condition. However there will be no change in the condition of the multivibrator if, at the time of application of the positive-going pulse to terminal 4333, it is already in the said first stable state. It follows from the foregoing description that the potential of terminal 4323 will be positive with respect to earth, whilst terminal 4325 will be at earth potential, when the multivibrator is in the initial datum condition.

The waveform applied to terminal 4335 from the anode of the triode section 4311b is substantially rectangular there being a negative-going change in this waveform when triode section 4311b becomes conducting after a period in which it has been in a non-conducting condition, that is, when the multivibrator reverts, from said second condition, to said first, or initial, condition. In those circumstances therefore, where it is necessary to apply a pulse to another counter similar to that shown in FIGURE 53, on the change from the stable state in which triode section 4312a is conducting (the said second stable state) to the stable state in which triode section 4311b is conducting (the said first stable state), it is only necessary to connect terminal 4335 to the terminal of that other counter circuit which corresponds to terminal 4327 of FIGURE 53. The waveform so applied to this terminal of that other counter will be differentiated in that counter by the capacitor and resistor which correspond to the capacitor 4328 and the resistor 4329, respectively, of FIGURE 53, the negative-going portion of this differentiated waveform causing a change from one stable state to the other stable state of the multivibrator in this other counter in a similar manner to the change caused, as described above, by the application of a negative-going pulse to terminal 4327 of the counter of FIGURE 53. This negative-going pulse of the differentiated waveform and therefore this latter change of state in this other counter, will occur on a change from the said second stable state to the said first stable state in the condition of the multivibrator of FIGURE 53.

It will be appreciated from the above description that when the counter circuit described with reference to FIGURE 53 constitutes, for example, the counter 130 of FIGURE 2, then lead 139 is connected to apply to terminal 4327 the pulses which appear (as described above with reference to FIGURE 2) on lead 110. In addition, in this example, leads 133 and 134 (of FIGURE 2) are connected to terminals 4323 and 4325 respectively, whilst lead 141 is connected to terminal 4335 and lead 140/1 is connected to terminal 4333. When, for example, the circuit described with reference to FIGURE 53 constitutes the counter 131 of FIGURE 2, lead 141 is connected to terminal 4327, leads 135 and 136 are connected to terminals 4323 and 4325 respectively, whilst lead 142 is connected to terminal 4335 and lead 140/3 is connected to the terminal 4333. In this latter case terminal 4335 remains unconnected since pulses are not required to be passed from counter 132 to any other counter.

It will be understood that the circuit described above with reference to FIGURE 53 may be utilised also in the above manner to constitute each of the counters 145, 151 to 153, 167, and 174 to 176 of FIGURE 2 and that it will be necessary to ensure that the pulses appearing on lead 110 from the delay line 107 of FIGURE 2 are negative-going pulses, whilst those appearing on leads 140, 161 and 184 of FIGURE 2 are positive-going. It should also be noted that, for counter 145 and 167, re-setting pulses are applied to stages 145/1 and 167/1: accordingly, when the circuit shown in FIGURE 53 is used for these two counters, terminal 4333 is connected via condenser 4334 to the control grid of the triode sections 4312a and 4312b.

Each of the counters 572, 584, 585, 590, 591, 596, 597, 601 and 602 of FIGURE 7, and each of the counters 2316, 2317, 2320, 2321, 2324, 2325, 2328, 2329 and 2335 of FIGURE 28, is of the type well known to those skilled in the present art constructed according to the general principles set out in an article by W. A. Depp and W. H. T. Holden in "Electrical Manufacturing," published by The Gage Publishing Company, New York, volume 44 for July 1949, pages 92 to 97, the article being entitled "Circuits for cold cathode glow tubes." The above article forms the subject of the Bell Telephone System Monograph B-1685, and reference is directed particularly to the circuit of the counter described with reference to FIGURE 8 of that monograph.

By way of example a detailed circuit of a counter which may constitute any one of the counters 584, 590, 596 and 601 of FIGURE 7, and the counters 2316, 2320, 2324 and 2328 of FIGURE 28, and which is constructed according to the above general principles, will be described with reference to FIGURE 54 of the accompanying drawings.

As shown in FIGURE 54, the counter includes five identical counter stages 4350 to 4354 (indicated within broken lines), the corresponding elements in each of the stages 4350 to 4354 being referred to, where necessary, by the same reference numeral.

Each of the stages 4350 to 4354 comprises a cold cathode gas discharge triode 4355 which has its cathode connected to earth through a parallel connected resistor 4356 and capacitor 4357. A resistor 4358 is connected to the cathode of each triode 4355 also, and a capacitor 4359 is connected to the trigger electrode of the triode 4355 through a resistor 4360.

The anode of each triode 4355 is connected, through a resistor 4361 common to each of the triodes 4355, to a terminal 4362 which is itself connected, in operation, to the positive terminal of a direct current source (not shown) the negative terminal of which is connected to earth.

A terminal 4363 is connected to each of the stages 4350 to 4354 in order that pulses applied to terminal 4363 during operation shall be applied, through capacitor 4359 and resistor 4360, to the trigger electrode of triode 4355 in each of those stages.

Pulses appearing, in operation, at the cathode of triode 4355 in each one of the stages 4350 to 4354, are applied to an individual one of five output terminals 4364 to 4368, and are also applied through the resistor 4358 in that stage, to the trigger electrode of the triode 4355 in the next succeeding stage, these pulses being applied to that trigger electrode through the resistor 4360 in that next succeeding stage. For example, stage 4350 has an individual output terminal 4364 connected to the cathode of the triode 4355 in that stage, the cathode of this triode 4355 being connected, through the resistor 4358 of stage 4350, and the resistor 4360 of stage 4351, to the trigger electrode of the triode 4355 of stage 4351; stage 4351 has an individual output terminal 4365 connected to the cathode of the triode 4355 in that stage, the cathode of this triode 4355 being connected, through the resistor 4358 of stage 4351, and the resistor 4360 of stage 4352, to the trigger electrode of the triode 4355 of stage 4352; and stage 4354 has an individual output terminal 4368 connected to the cathode of the triode 4355 in that stage, the cathode of this triode 4355 being connected, through the resistor 4358 of stage 4354, over a connection 4372, and through the resistor 4360 of stage 4350, to the trigger electrode of the triode 4355 of stage 4350.

A terminal 4369 is connected, through a capacitor 4370, to the junction of the capacitor 4359 and the resistor 4360 in stage 4350, and a terminal 4371 is connected to the cathode of the triode 4355 in the stage 4350.

In order to describe the operation of the counter of FIGURE 54 it will be assumed that initially the triode 4355 of stage 4350 is fully conducting whilst each of the other triodes 4355 is non-conducting. It will be apparent from the following description, that this condition of the counter is its normal initial condition.

In the initial condition of the counter of FIGURE 54 therefore, the potential of the cathode of the triode 4355 of stage 4350 is positive with respect to earth, owing to the conducting condition of that triode. Thus the trigger electrode of the triode 4355 in stage 4351 is biased in a positive sense due to this potential at the cathode of the triode 4355 in stage 4350.

Since the triodes 4355 in stages 4351 to 4354 are non-conducting, the cathodes of these triodes are at earth potential, and therefore there is no positive bias applied to the trigger electrodes of the triodes 4355 in stages 4350 and 4352 to 4354.

Pulses to be counted by the counter are applied in a positive-going sense to terminal 4363, and thus to the trigger electrode of the triode 4355 in each of stages 4350 to 4354 through the associated capacitors 4359 and resistors 4360. It is arranged that the amplitude of such pulses as applied to the trigger electrode of any one of the triodes 4355 is insufficient to cause that triode 4355 to fire, except in those circumstances in which that trigger electrode is biassed in a positive sense due to the conduction of the triode 4355 in the preceding one of the stages 4350 to 4354. Thus, only one of the triodes 4355 will be fired in response to the application of a pulse to terminal 4363, this triode 4355 being in the next succeeding stage to that which includes a triode 4355 which is already conducting.

It follows from the above description that while the counter is in its initial condition, that is, in the condition in which the triode 4355 of stage 4350 only, is conducting, and there is, as a result, a positive bias on the trigger electrode of the triode 4355 of stage 4351, the application of a pulse to the terminal 4363 causes the triode 4355 of stage 4351 to fire.

The firing of the triode 4355 of stage 4351 results in an increase of current through the resistor 4361, since, in effect, there are now two triodes 4355 in a conducting condition, that of stage 4350 and that of stage 4351. As a result of this increase in current therefore, the anode voltage of each of the triodes 4355 falls, and it is arranged, by the choice of a suitable value for the resistor 4361, that the resultant value of this anode voltage, in these circumstances, is normally insufficient to maintain a discharge in any of those triodes 4355. The triode 4355 of stage 4350 is therefore rendered non-conducting, thereby causing the anode voltage of the triode 4355 in stage 4351 to rise to the normal value which will maintain a discharge in that triode. Since the triode 4355 of stage 4351 is at this time being triggered by the application of the pulse from the terminal 4363, together with the positive bias, to the trigger electrode thereof, this triode becomes conducting. Hence the application of the pulse to the terminal 4363 causes the triode 4355 in stage 4351 to become conducting and the triode 4355 in stage 4350 to become non-conducting.

In a similar manner to that described above, the application of the next pulse to the terminal 4363 causes the triode 4355 in stage 4352 to become conducting and the triode 4355 in stage 4351 to become non-conducting. In this manner therefore, there will be a change from one stage to the next in the conducting condition of the triodes 4355 in response to the application of successive positive-going pulses to terminal 4363; that is, for each pulse so received the conducting condition of the triode 4355 which is at that time conducting, is passed, in effect, to the triode 4355 of the next succeeding stage.

It will be appreciated from the foregoing description, that the first pulse applied to the terminal 4363 when the counter is in its normal initial condition, will cause the triode 4355 of stage 4351 to become conducting; that the application of the second pulse will cause the triode 4355 of stage 4352 to become conducting; that the application of the third pulse will cause the triode 4355 of stage 4353 to become conducting; that the application of the fourth pulse will cause the triode 4355 of stage 4354 to become conducting; and that the application of the fifth pulse will cause the triode 4355 of stage 4350 to become conducting once again. In addition it will be appreciated that there is a positive-going change in the potential of terminal 4371 on each occasion when the triode 4355 of stage 4350 becomes conducting, that is, when the counter is returned to its initial condition. The above sequence will be repeated on the reception of further pulses at the terminal 4363.

Each of the terminals 4364 to 4368 is connected directly to the cathode of an individual one of the triodes 4355 in stages 4350 to 4354, and will therefore be at earth potential when that individual triode 4355 is non-conducting, and at a positive potential with respect to earth when that triode 4355 is conducting. Hence, terminal 4364 will be at a positive potential with respect to earth in the initial condition of the counter and also as a result of every fifth successive pulse applied to terminal 4363. Similarly, terminals 4365, 4366, 4367 and 4368 will be at a positive potential only as a result of the first, second, third and fourth pulses, respectively, applied to terminal 4363 after the counter has been set or re-set to its initial condition.

The counter may be re-set to the initial condition thereof at any time by the application of a positive-going re-setting pulse of sufficient amplitude to terminal 4369. The application of this pulse causes the triode 4355 in stage 4350, if not already fired, to be fired, and, due to the action of resistor 4361 in the manner described above, to cause that triode 4355 which is at that time conducting to be rendered non-conducting.

When the counter circuit of FIGURE 54 constitutes the counter 584 of FIGURE 7, lead 575 is connected to terminal 4363, re-setting lead 587/1 to terminal 4369, lead 586 to terminal 4371, and terminals m0 to m4 of FIGURE 7 are connected to terminals 4364 to 4368 of FIGURE 54 (respectively) through composite gate 588. When the counter circuit of FIGURE 54 constitutes counter 590 of FIGURE 7, lead 576 is connected to the terminal 4363, lead 587/3 to terminal 4369, lead 592 to terminal 4371, and the terminals c0 to c4 to terminals 4364 to 4368 (respectively) through composite gate 593. The counter circuit of FIGURE 54 may constitute in a similar manner either of the counters 596 and 601 of FIGURE 7 and any one of the counters 2316, 2320, 2324 and 2328 of FIGURE 28, it being appreciated that the stages 0, 1, 2, 3 and 4 of counters 584, 590, 596 and 601 of FIGURE 7, and of the counters 2316, 2320, 2324 and 2328 of FIGURE 28, correspond to the stages 4350, 4351, 4352, 4353 and 4354, respectively, of the counter of FIGURE 54.

The counter of FIGURE 54 may constitute counter 2335 of FIGURE 28, stages 4350 to 4354 of the counter of FIGURE 54 corresponding to the stages 1 to 5, respectively, of counter 2335. It will be understood that when the counter of FIGURE 54 so constitutes counter 2335, terminal 4363 is connected to lead 2357 (it being arranged, as described earlier, that the trailing edge of a pulse on lead 2357 is positive-going), that terminal 4369 is connected to lead 2332/9, that terminals 4364 to 4367 are connected to the four input leads to composite gate 2333, and that terminal 4368 is connected to an input lead of four-gate 2336. In addition, it will be appreciated that in this case terminal 4371 will remain unconnected, and that the circuit of FIGURE 54 will be modified by the omission therefrom of the connection 4372 between the cathode of the triode 4355 in stage 4354 and the trigger electrode of the triode 4355 in stage 4350. The reason for the above modification of the circuit of FIGURE 54, resides in the fact that counter 2335 is not of the kind which, if its last stage (stage 5 in this case) is already energised, the receipt of a further pulse to be counted will automatically set the counter to the condition in which its first stage (stage 1 in this case) is energised. Thus connection 4372 is not required for counter 2335, since it is the function of the connection 4372 to provide the bias necessary to cause the triode 4355 in stage 4350 to become conducting on the next application of a pulse to terminal 4363 after that condition (of the counter shown in FIGURE 54) in which the triode 4355 of stage 4354 is conducting.

The counter circuit shown in FIGURE 54 may be modified to constitute the counter 572 of FIGURE 7, the required modification being the addition (to the circuit of FIGURE 54) of a further stage identical with each of the stages 4350 to 4354 already shown in FIGURE 54, and also the omission (as in the case of counter 2335 of FIGURE 28) of the connection 4372. The addition of a further stage identical with each of the stages 4350 to 4354 is required since counter 572 comprises six stages 0 to 5. This modification involves merely the connection of the further stage, between, for example, the stages 4353 and 4354 of the counter of FIGURE 54, so that this further stage corresponds to stage 4 of counter 572, and that therefore the stages 4350, 4351, 4352, 4353 and 4354 correspond to the stages 0, 1, 2, 3 and 5 respectively, of counter 572. It will be necessary to omit the connection 4372 from the counter circuit of FIGURE 54 when constituting counter 572 of FIGURE 7, for similar reasons to those given in connection with the above reference to the use of the circuit of FIGURE 54 as counter 2335 of FIGURE 28.

When the counter circuit of FIGURE 54, modified as described above, constitutes counter 572 of FIGURE 7, terminal 4363 is connected to lead 571, terminal 4369 is connected to lead 573, terminal 4368 is connected to lead 579, and terminals 4365, 4366 and 4367, together with the output terminal (corresponding to the terminals 4364 to 4368) of the further stage, are respectively connected to individual input leads of composite gate 574. Terminals 4364 and 4371 remain unconnected in this case.

Each of the counters 585, 591, 597 and 602 of FIGURE 7, and each of the counters 2317, 2321, 2325 and 2329 of FIGURE 28, comprises two stages, 0 and 1, only, and may therefore be constituted by stages 4350 and 4354 only, of the counter circuit of FIGURE 54. In this case therefore, the resistor 4358 of stage 4350 is connected to the junction of the capacitor 4359 and the resistor 4360 of stage 4354, the intermediate stages 4351 to 4353 of FIGURE 54 being omitted, but the connection 4372 is retained. When the stages 4350 and 4354 of FIGURE 54 are so connected to constitute counter 585 of FIGURE 7, terminal 4363 is connected to the lead 586, the terminal 4369 is connected to lead 587/2, and terminals 4364 and 4368 are connected to the terminals m5 and m6, respectively, through composite gate 588, terminal 4371 remaining unconnected in this case. The stages 4350 and 4354 of FIGURE 54 may constitute in a similar manner, any one of the counters 591, 597 and 602 of FIGURE 7 and any one of the counters 2317, 2321, 2325 and 2329 of FIGURE 28, it being appreciated that the stages 0 and 1 of the counters 585, 591, 597 and 602 of FIGURE 7, and the counters 2321, 2325 and 2329 of FIGURE 28 correspond to the stages 4350 and 4354, respectively, of the counter of FIGURE 54 as modified in the above manner.

It may be convenient to mention a further detail in regard to the operation of the pair of counters 584 and 585 of FIGURE 7. It will have been noticed that when a re-setting pulse is applied on lead 587/1 to terminal 4369 of counter 584, the energisation of stage 0 of that counter (if deenergised before the receipt of the re-setting pulse) is manifested by a positive-going change in the potential of the cathode of the triode 4355 in that stage (i.e. stage 4350 as represented in FIGURE 54). Accordingly, there is a positive-going change of potential of terminal 4371 of counter 584 which is applied by lead 586 (FIGURE 7) to the input to counter 585, i.e. to terminal 4363 of the counter circuit (as described in the last preceding paragraph) which forms counter 585. But at the same time that the re-setting pulse appeared on lead 587/1 to counter 584, a re-setting pulse appeared on lead 587/2 to re-set counter 585—it being applied by lead 587/2 to terminal 4369 of the counter circuit forming counter 585. Counter 585 thus has, simultaneously, an input pulse on its terminal 4363 and an input pulse on its terminal 4369. However, it has already been explained that the positive-going re-setting pulses are arranged to be of sufficiently large amplitude to fire the triode of the first stage of any of these counters (if the said first stage is not already passing current) irrespective of which other stage of the counter may be energised at the time when the re-setting pulse is received. Accordingly, in the case just envisaged, the re-setting pulse on terminal 4369 of counter 585 over-rides the effect of the pulse applied to terminal 4363 of counter 585, and it is the re-setting pulse which is effective and stage 585/0 of counter 585 which becomes energised. Had there been no simultaneous re-setting pulse on lead 587/2, then, of course, the positive-going change in the potential of terminal 4371 of counter 584 would have had the normal effect on counter 585.

It will be clear from the description in the foregoing paragraph, that similar considerations apply to the operation of the other pairs of counters (590 and 591, 596 and 597, 601 and 602) of FIGURE 7, and that similar considerations likewise apply to the operation of the pairs of counters (2316 and 2317, 2320 and 2321, 2324 and 2325, 2328 and 2329) of FIGURE 28.

The modifications that need to be made in a multiplex in order to enable subscribers to get into touch with an operator at the exchange will now be described with reference of FIGURES 55, 56 and 57 of the accompanying drawings.

FIGURE 55 shows a circuit arrangement suitable for the form of exchange described with reference to FIGURES 2 to 23. A subscriber needing the attention of an operator lifts his instrument (causing himself to be allotted a register in the way previously described) and, on hearing dialling tone, dials 01. Each register is provided with an ancillary circuit (described below with reference to FIGURE 57) which, when the dialling impulses for 01 are received, causes (without its being necessary for the calling subscriber to dial two further zeroes) the counters in the allotted register to be set as though the dialled number had been 0100. One hundred "subscribers line units" in multiplex A, corresponding to the subscribers' numbers 0100 to 0199 (inclusive) are allotted to the operators at the exchange) and accordingly none of the numbers in the range 0100 to 0199 is allotted to an ordinary subscriber); and when converter K/3, in its "interconnection state," applies voltages to those of its output terminals which correspond to dialled number 0100 (i.e. applies voltage to terminals T2, T6, T11), the speech channel pulse which (see Sections II.8 and III.8 of the description of the "Mode of Operation of the Exchange Shown in FIGURES 2 to 23" given earlier in this specification) is emitted from terminal 201 (FIGURE 16) of section control unit A/2 is (in view of the arrangements about to be described) not fed automatically to the three delay lines (SD2, SD6, SD11) in channel pulse store A/1 which would be associated with a normal subscriber whose number was 0100, but instead the pulse is fed to an operator's supplementary unit and there repeated in a delay line whence the pulse is fed to those three delay lines in channel pulse store A/1 that are associated with whichever free line unit (for the use of an operator) is next "tested" by converter K/3. The feeding of a speech pulse to the three delay lines of such a free line unit then causes speech communication to be established between the calling subscriber and the operator concerned in the same manner (already described) as though that operator had been any ordinary called subscriber.

Turning then to FIGURE 55, it will be seen that a representative selection of terminals T1 to T16 of converter K/3 is shown connected to the respectively corresponding terminals on pulse store A/1 by which voltages from the T terminals are respectively applied to the two-gates of the series SG1/4 to SG16/4 as already described in connection with FIGURE 16: for example, terminal T2 is connected by lead 5000/2 to terminal 826, terminal T4 is connected by lead 5000/4 to terminal 827, terminal T/15 by lead 5000/15 to terminal 828—the other leads from the T terminals being referenced similarly. It will be remembered from FIGURE 16 that terminal 826 is connected to two-gates SG2/3 and SG2/4 and thus associated with delay line SD2, terminal 827 is connected with two-gates SG4/3 and SG4/4 and thus associated with delay line SD4, and so on—and, in short, it will be remembered that delay line SD$n$ is associated with two-gates SG$n$/3 and SG$n$/4 and is thus (via lead 5000/$n$) associated with terminal T$n$. (The "subscribers" line units A/0100 to A/0199, inclusive, used by the operators, are connected to channel pulse store A/1 exactly in the same way as the remaining subscribers line units such as A/0000 and A/0001.)

It will be remembered from the previous description that the dialling of 01 as the first two digits of a wanted number ensures that the called subscriber is identified as belonging to multiplex A. It is now necessary to ensure that the appearance of voltage on terminals T2, T6, T11 of converter K/3 can cause a speech pulse to be fed to any one of the triads of delay lines which are associated with subscribers line units A/0100 to A/0199, inclusive.

Now it will be seen from Tables A, B and C (FIGURES 11, 12 and 13) that:

(a) For all numbers whose last three digits lie in the range 100 to 199, inclusive, there is no voltage on terminal T1, (b) All numbers for which (there being no voltage on T1) there is a voltage on T2 but no voltage on T5, lie in the said range, (c) All numbers for which (there being no voltage on T1) there is a voltage on T12 but no voltage on T3, T4, T5, T11 or T15, lie in the said range, and (d) The numbers which satisfy either (b) or (c) above, together constitute the whole of the numbers whose last three digits lie in the range 100 to 199 inclusive.

Accordingly, the operators' supplementary unit above mentioned is so arranged that when converter K/3 applies voltage to a triad of T terminals satisfying condition (b) or condition (c) above, the pulse which is being repeated in the delay line in the said supplementary unit is fed to the triad of delay lines (in channel pulse store A/1) associated with that triad of T terminals.

For this purpose, the said supplementary unit (represented as enclosed in "box" 5001 in FIGURE 55) is provided with three one-gates 5002, 5003, 5004, respectively. One-gate 5002 has: (1) an inhibitory input connected by lead 5002/1 to lead 5000/1 and thus to terminal T1 on converter K/3, (2) an input connected by lead 5002/2 to lead 5000/2 and thus to terminal T2, and (3) an inhibitory input connected by lead 5002/5 to lead 5000/5 and thus to terminal T5. Accordingly, if any trio of voltages complying with condition (b) above appears on the T terminals of converter K/3, the voltage applied by lead 5002/2 to one-gate 5002 will cause that gate to give an output voltage. One-gate 5002 has a further input connected by lead 5005 to the output of one-gate 5003. One-gate 5003 has one input connected by lead 5003/12 to lead 5000/12 and thus to terminal T12 of converter K/3; and the said one-gate also has an inhibitory input connected by lead 5006 to the output of one-gate 5004. One-gate 5004 has four inputs, respectively connected as shown to leads 5000/3, 5000/4, 5000/11 and 5000/15, and thus respectively connected to terminals T3, T4, T11 and T15 of converter K/3. Accordingly, if there be voltage applied to T12, one-gate 5003 will give an output unless one-gate 5004 is giving an output by reason of voltage applied from one or more of terminals T3, T4, T11, T15; and an output from one-gate 5003 will cause one-gate 5002 to give an output unless there is an inhibitory input to one-gate 5002 from terminal T5 (or T1). Thus, if any trio of voltages complying with condition (c) above appears on the terminals of converter K/3, one-gate 5002 will apply voltage to its output.

The output of one-gate 5002 is connected as shown to one input of three-gate 5007 and to one input of two-gate 5008 (both belonging to "box" 5001); and the output of one-gate 5002 is also connected to lead 5009. Lead 5009 is connected to an inhibitory input on one-gate 5010, is connected by branch lead 5009/1 to an inhibitory input on one-gate 5011, and by branch lead 5009/2 to an inhibitory input on one-gate 5012. One-gate 5010 is "interpolated" in lead 864 as shown in FIGURE 55—that is to say, the first portion of lead 864 from terminal 201 on section control unit A/2 (see FIGURE 16) is connected to the other input of one-gate 5010 and the second portion of lead 864 connects the output of one-gate 5010 with terminal 865 as shown in FIGURE 16. Somewhat similarly, one-gate 5011 is interpolated in lead 861; for, as shown in FIGURE 55, the first portion of lead 861 from terminal 344 on section control unit A/2 is connected to the second input of one-gate 5011, the output of one-gate 5011 is connected by lead 5013 to one input of one-gate 5014, the other input of one-gate 5014 being connected by lead 5015 to the output of three-gate 5007 in "box" 5001. The output of one-gate 5014 is connected to the second portion of lead 861, as shown in FIGURE 55, and the other end of lead 861 is connected to terminal 862 on channel pulse store A/1 as shown in FIGURE 16. Again, one-gate 5012 is interpolated in lead 985; as shown in FIGURE 55, the first portion of lead 985 (which is connected to terminal 868 on channel store A/1) is connected to the second input of one-gate 5012, and the output of one-gate 5012 is connected to the second portion of lead 985 and thereby to "Busy 2" in the tone unit (see FIGURE 21).

Reverting now to the circuits constituting "box" 5001, it will be seen that the second input of two-gate 5008 is connected by lead 5016 to terminal 201 on section control unit A/2 and the output of two-gate 5008 is connected to one input of one-gate 5017 whose output is connected to one input of one-gate 5018. The output of one-gate 5018 is connected to the input of magneto-strictive delay line 5019 (having a delay period of 100 micro-seconds) whose output is connected, firstly, to the second input of one-gate 5017, and secondly (by lead 5020) to the second input of three-gate 5007. Delay line 5019, with one-gates 5017 and 5018 and associated leads, accordingly form a system of the kind many times previously described capable of repeating at 100 micro-second intervals any ½ micro-second pulse fed to it from two-gate 5008.

Lead 5020 is further connected by lead 5021 to one input of bi-stable multivibrator 5022, which has a second input connected by lead 5023 to terminal Q on pulse generator K/1. The receipt of a Q pulse from terminal Q triggers multivibrator 5022 to apply voltage to lead 5024 which is connected to the third input of three-gate 5007: the lagging edge of a pulse (indicated by an "x") on lead 5021, triggers multivibrator 5022 to cease to apply voltage to lead 5024 if it has previously been doing so.

It will also be seen from FIGURE 55 that one-gate 5018 is provided with an inhibitor input to which is connected lead 5025 from the output of one-gate 5026 which has one input connected to lead 5027 and thus to terminal 313 of release control sub-unit 196 of section control unit A/1. One-gate 5026 has a second input connected by lead 5028 to the output of one-gate 5029 which has an input connected to the terminal 938 (see FIGURE 19) of every operator's line unit—exemplified in FIGURE 55 by operators' line units A/0110 and A/0111 which are shown as each having its terminal 938 connected (by leads 5030 and 5031, respectively) to an input of one-gate 5029. Lead 5028 is also connected by lead 5032 to an additional input on one-gate 1010 (whose other connections are described with reference to FIGURE 23, where one-gate 1010 is to be found immediately to the right of subscribers line units A/0000 and A/0001).

The mode of operation of the circuit arrangement shown in FIGURE 55 is as follows. It has already been stated that when a subscriber dials 01, converter K/3 in due course applies voltages to terminals T2, T6, T11, as though the calling subscriber had dialled 0100. Voltage is accordingly applied by leads 5000/2 and 5002/2 to one input of one-gate 5002; and since no voltages appear at the same time on terminals T1 and T5, there are no voltages applied to the inhibitory inputs of one-gate 5002. One-gate 5002 accordingly applies a voltage to one input of two-gate 5008, and when the allotted ½ micro-second speech pulse is emitted from terminal 201, that pulse is applied by lead 5016 to the second input of two-gate 5008 which accordingly re-emits the pulse and applies it to one-gate 5017. (It may be noted that, because of the voltage applied by one-gate 5002 to lead 5009 and thus to the inhibitory input to one-gate 5010, the said pulse emitted by terminal 201 is not applied to lead 864.) The pulse applied to one-gate 5017 is re-emitted and applied to one-gate 5018 and thus to the input to delay line 5019, which accordingly begins to repeat, at 100 micro-second intervals, pulses of the phase of the pulse emitted from terminal 201. (It will be assumed, for the moment, that the pulse just fed to delay line 5019 is the only pulse being repeated in this delay line system.) At the time when the said pulse was emitted from delay line 5019 and re-applied to one-gate 5017, it was also applied to one input of three-gate 5007; and since three-gate 5007 will have voltage applied to its third input on lead 5024 from multivibrator 5022) the said multivibrator having been triggered to apply such voltage by the preceding Q pulse), three-gate 5007 emits the said pulse on lead 5015, applies it to one-gate 5014, and one-gate 5014 applies the pulse to lead 861. Now converter K/3 will (in general) at this time still be applying voltage to terminals T2, T6, T11, and if the line unit A/0100 (serving an operator) is free, the pulse will be fed (in manner already described in connection with this form of exchange) to his associated delay lines SD2, SD6, SD11 in channel pulse store A/1. The setting-up of the call from the subscriber to the operator is then completed as for a call to any other called subscriber. If, however, the operator served by line unit A/0100 is busy, the pulse is not accepted by his delay lines; but the pulse continues to be repeated in delay line 5019 until the time comes when converter K/3, in its repeated "testing" of delay lines in channel pulse store A/1, next tests a trio of delay lines associated with a free line unit for an operator. When this occurs, there will be an output from one-gate 5002 (either by reason of voltages applied to it by converter K/3 or by reason of voltage applied by the converter to one-gate 5003 that cause the latter to apply voltage to one-gate 5002). The voltage output from one-gate 5002 is again applied to three-gate 5007, and the latter in due course emits the pulse which has been undergoing repetition in delay line 5019; and the call to the operator is accordingly set up.

Once one of the operator's line units has become busy by the emission of the pulse to the triad of associated delay lines in the way just described, pulses appear on terminal 938 of the line unit concerned, are applied (for example, by lead 5031, if line unit A/0111 has so become busy) to the corresponding input of one-gate 5029, and are thus applied to one-gate 5026 and thence to the inhibitory input of one-gate 5018, thus suppressing the pulse of this phase from further repetition in delay line 5019. Similarly, if the calling subscriber should replace his instrument before securing the services of an operator, the clearing pulse emitted by terminal 313 of section control unit A/2 following the occurrence of such replacement (as previously described) is applied by lead 5027 to the other input of one-gate 5026 and likewise suppresses the pulse from further repetition in delay line 5019.

It will also have been noticed from FIGURE 55 that in each period during which one-gate 5002 is giving an output (i.e. each occasion when three-gate 5007 is rendered potentially capable of emitting a pulse which has been undergoing repetition in delay line 5019 and feeding that pulse via lead 861 to channel pulse store A/1), the voltages applied by lead 5009 to leads 5009/1 and 5009/2 are applied to the inhibitory inputs of one-gates 5011 and 5012, respectively, thus ensuring that no free register channel pulse applied to terminal 344 (during the said period) can be transmitted by lead 861 to channel pulse store A/1 (see FIGURE 16), and also ensuring that no pulse applied to terminal 868 of channel pulse store A/1 (during the said period) is transmitted by lead 985 to tone unit A/19.

It has been assumed in the foregoing that only one pulse is being repeated in delay line 5019. Suppose, now, that the pulse above referred to (hereinafter referred to as "pulse b") is, when fed to delay line 5019, fed at a time when there is already a pulse (hereinafter referred to as "pulse $a$") in the delay line resulting from a previous call for an operator which has not yet received attention. Then pulse $a$ from the previous call will reach the output of delay line 5019 before pulse $b$ reaches the output of that delay line; and when pulse $a$ reaches the output of delay line 5019 it is not only applied to three-gate 5007 by lead 5020, but is also applied from lead 5020 by lead 5021 to multivibrator 5022, and the lagging edge of pulse $a$ accordingly triggers multivibrator 5022 to cease to apply voltage to lead 5024 until the multivibrator is re-set by the next ensuing Q pulse applied to terminal Q. Accordingly, pulse $b$, following pulse $a$ along the delay line at an interval of less than 100 micro-seconds, will be applied to three-gate 5007 at a time when pulse $a$ has so set multivibrator 5022 that three-gate 5007 cannot give an output; and therefore three-gate 5007 cannot emit pulse $b$ to the same triad of delay lines as the triad to which pulse $a$ is emitted. Pulse $b$ continues, meanwhile, to be repeated in delay line 5019. It will continue to do so until a time comes when the line unit of an operator is free and pulse $b$ is the first pulse to reach the output of delay line 5019 after the beginning of a Q pulse.

The line units such as A/0110 which serve the operators are, it will be noted, so connected to multiplex A that while they can receive calls from subscribers, an operator could not originate a call from them (since such a call could not be set up through "box" 5001). (Line units connected in this way, so that operators may receive on them calls from subscribers but cannot originate calls through them, are hereinafter referred to as "operators' incoming line units.") Operators at the exchange are accordingly provided with the use of normally-connected "subscribers line units" (connected like those of any ordinary subscriber) belonging to multiplex A, for use when an operator is originating a call to one of the ordinary subscribers. (The "telephone numbers" of these last-mentioned, normally-connected line units provided for the use of operators are, of course, not available for allocation to ordinary subscribers connected to the exchange.) An operator can then dial a subscriber, and a call originating with an operator is handled by the exchange in exactly the same way as any other call which is being made by an ordinary calling subscriber. An operator receiving a call from a subscriber who wants to call a subscriber on another exchange will, on having established a connection to the wanted subscriber, complete the connection between the calling and called subscriber by connecting the speech line from the operators' incoming line unit concerned (the said speech line being the line on the said incoming line unit equivalent to line 0000 or 0001 of the ordinary line units shown in FIGURE 19) by a cord circuit to a conventional manual board to which is connected the junction line to the exchange to which the called subscriber belongs.

It should be noted in connection with the foregoing description that it has been assumed that 100 operators' incoming line units have actually been installed in the multiplex. Unless the average rate at which calls are made to operators is so heavy as to justify the employment of 100 operators (which would be abnormal), it will usually be desired that the number of operators' incoming line units actually installed shall not be greater than the largest number of operators who will be on duty at the exchange at any one time. If the said number of operators is less than 100, a correspondingly smaller number of operators' incoming line units is installed—though, since an operators' services are secured by dialling 01 and this is automatically made equivalent to dialling 0100, telephone numbers 0100 to 0199 (inclusive) will still not be available for allocation to ordinary subscribers. Now it will have been understood from the description of FIGURE 55 that the principle on which one-gates 5002, 5003 and 5004 are connected to the T terminals on converter K/3, is that one-gate 5002 is caused to give an output voltage each time a triad of T terminals have applied to them a triad of voltages corresponding to any digits in the range 100 to 199 (inclusive). Accordingly, if a lesser number than 100 of operators' incoming line units is actually installed, the input connections to one-gate 5002 are so modified that it gives an output voltage whenever a triad of voltages appears on the T terminals corresponding to the "telephone number" of any operators' incoming line unit which has actually been installed. The "telephone numbers" of the line units which are actually to be installed are chosen in such a way as to make the circuit connections relatively simple. It is thought that the following three examples will make clear how this can be achieved in practice.

As a first example, consider that it can be seen from Table A (FIGURE 11) that there are 75 telephone numbers (in multiplex A) lying in the range 0100 to 0199 which are characterised by the application of voltage to T2 when no voltage is being applied to T1 to T5—these numbers being (to quote the last three digits only) numbers 100 to 154 inclusive, plus numbers 170 to 174 inclusive, plus numbers 180 to 184 inclusive, plus numbers 190 to 194 inclusive. Accordingly, if one-gates 5003 and 5004 (and their connecting leads) are omitted, only 75 operators' incoming line units need be actually installed, these line units being so connected as to be respectively associated with the triads of delay lines (in channel pulse store A/1) corresponding with the ranges of numbers set out at the end of the preceding sentence, i.e. range 100 to 154, range 160 to 164, range 170 to 174, range 180 to 184 and range 190 to 194.

As a second example, it may be noted that if, out of the ranges quoted in the preceding sentence, one excluded those numbers for which voltage appears on terminal T6 (viz. ranges 100 to 109 inclusive, and numbers 107, 108, 109, 138, 147), a further twelve numbers would be excluded. Accordingly, by omitting one-gates 5003 and 5004 (and their connecting leads) from the circuit shown in FIGURE 55, and providing one-gate 5002 with an inhibitory input connected to terminal T6, the number of operators' incoming line units that need actually be installed is reduced to 63.

As a third example, suppose one-gate 5003 and its input lead 5003/12 be omitted, and suppose the output of one-gate 5004 be connected by lead 5006 to an inhibitory input on one-gate 5002, then, of the 75 triads of voltages capable of causing one-gate 5002 (when connected only to leads 5002/1, 5002/2 and 5002/5) to give an output voltage, the said connection of lead 5006 to an inhibitory input on one-gate 5002 will cause all those triads which involve a voltage on any of terminals T3, T4, T11, T15 to be ineffective. Accordingly, 42 such triads will be ineffective; and only 33 triads remain effective, so that only 33 operators' incoming line units need actually be installed (being then associated, of course, with the triads of delay lines in channel pulse store A/1 which respectively correspond with numbers—in Table A—which involve T2 but not T1, T3, T4, T5, T11 or T15).

The circuit arrangements shown in FIGURE 55 can be used with relatively slight modifications in conjunction with the exchange described with reference to FIGURES 24 to 36 to enable subscribers connected to this second form of exchange to get into touch with an operator at the exchange. Once again, each register in the exchange is provided with an ancillary circuit of the kind shown in FIGURE 57 so that, when a subscriber dials 01 to secure the services of an operator, the counters in the register allotted to the subscriber are caused to be set as though the dialled number had been 0100; and, once again, telephone numbers 0100 to 0199 (inclusive) are allotted to the operators at the exchange and not allotted to ordinary subscribers.

FIGURE 56 of the accompanying drawings shows how the arrangements illustrated in FIGURE 55 are adapted for use with the said second form of exchange. Once again, the components contained in "box" 5001 of FIGURE 55 are used, and these various components are given the same reference numerals in FIGURE 56 as in FIGURE 55 and need not be again described. In the bottom right-hand corner of FIGURE 56 will be found converter K/33 and in the bottom left-hand corner of that figure will be found channel pulse store A/31 of multiplex A. It will be remembered that in FIGURE 36, terminal T1 of converter K/33 is shown connected by lead 2611 to lead 2121/1 on pulse store A/31, terminal T6 of converter K/33 is connected by lead 2612 to lead 2121/6 of pulse store A/31, terminal T11 of converter K/33 is connected by lead 2613 to lead 2121/11 of pulse store A/31, and terminal T12 of converter K/33 is connected by lead 2614 to lead 2121/12 of pulse store A/31. It is convenient for the purpose of describing FIGURE 56 to give a new system of reference numerals to leads 2611, 2612, 2613, 2614 (and other leads similarly connecting the T terminals of converter K/33 to pulse store A/31), so as to indicate explicity to which T terminal each such lead is connected. The system now adopted is that in which the lead connecting terminal T$n$ on converter K/33 to lead 2121/$n$ on pulse store A/31 is referenced 5033/$n$ — so that the lead previously referenced 2611 is now referenced 5033/1, the lead previously referenced 2612 is now referenced 5033/6, and the leads previously referenced 2613 and 2614 are now respectively referenced 5033/11 and 5033/12. Representative leads referenced according to this new system are shown in FIGURE 56.

Reverting now to the connections to "box" 5001, it will be seen from FIGURE 56 that the leads to one-gate 5002 are connected as follows:

Lead 5002/1 to lead 5033/1,
Lead 5002/2 to lead 5033/2,
Lead 5002/5 to lead 5033/5.

Similarly lead 5003/12 to one-gate 5003 is connected to lead 5033/12. Again, the leads to one-gate 5004 are, in like manner, connected as follows:

Lead 5004/3 to lead 5033/3,
Lead 5004/4 to lead 5033/4,
Lead 5004/11 to lead 5033/11,
Lead 5004/15 to lead 5033/15.

Turning now to the leads emerging horizontally to the right from "box" 5001, it will be remembered that in FIGURE 55 that lead was connected to terminal 313 on section control unit A/2, terminal 313 being the terminal by which clearing pulses are emitted from section control unit A/2. Similarly, in FIGURE 56, lead 5027 from "box" 5001 is connected to lead 2052 from section control unit A/30, so that clearing pulses emitted by section control unit A/30 are applied to lead 5021 and thus to one input of one-gate 5026.

It will also be remembered that in FIGURE 55, lead 5016 was connected to terminal 201 on section control unit A/2 (terminal 201 being the terminal by which a speech channel pulse is emitted from section control unit A/2); and lead 5015 in FIGURE 55 was so connected to the second portion of lead 861 that lead 5015 could apply a pulse from "box" 5001 to the said second portion but that, during a period during which such a pulse would be applied, one-gate 5011 would prevent the application (to the said second portion of lead 861) of a free register channel pulse from terminal 344 of section control unit A/2. Now, in section control unit A/30, free register channel pulses and speech channel pulses are both emitted on lead 2097 from one-gate 2096 (in the top left-hand corner of called subscriber testing sub-unit 2004 at the bottom of section control unit A/30, FIGURE 24). Accordingly it is necessary, in FIGURE 56, that when three-gate 5007 emits a pulse that pulse shall be applied (via lead 5015) to the second portion of lead 2097, but that a speech pulse applied to the first portion of lead 2097 by one-gate 2096 shall not (while "box" 5001 is actively performing its function in setting up a call to an operator) be applied to the second portion of lead 2097; and it is also necessary to ensure that when one-gate 2096 emits a speech pulse for a call from a subscriber to an operator, that speech pulse shall be applied to lead 5016 (and thus to two-gate 5008 in "box" 5001), but that no free register channel pulse appearing on lead 2097 (while "box" 5001 is actively performing its function) shall be fed by lead 2097 to channel pulse store A/31 and that a free register channel pulse shall not be at any time fed to one input of two-gate 5008. The requirements set out in the foregoing sentence are, as will be seen, precisely equivalent to the requirements (as regards speech channel pulses and free register channel pulses) satisfied by the arrangements shown in FIGURE 55. In FIGURE 56, the said requirements are achieved as follows:

As in FIGURE 55, lead 5014 will (in FIGURE 56) be seen connected to one input of one-gate 5014, and the other input of one-gate 5014 is connected by lead 5013 to the output of one-gate 5011. The input of one-gate 5011 is connected to the first portion of lead 2097 and thus to the output of one-gate 2096; the output of one-gate 5014 is connected to the second portion of lead 2097, and thus (see FIGURE 25) to one input of three-gate 2128 in channel pulse store A/31. Now as will be seen from FIGURE 56, the first portion of lead 2097 is also connected by lead 5034 to the input of one-gate 5035; and the output of one-gate 5035 is connected to lead 5016 and thus to one input of two-gate 5008 in "box" 5001. Accordingly, any speech pulse, and any free register channel pulse, applied by one-gate 2096 to the first portion of lead 2097 is applied by lead 2097 to one-gate 5035; but to prevent the emission by one-gate 5035 of any free register channel pulse, one-gate 5035 is provided with an inhibitory input connected to lead 5036 which is in turn connected to lead 2508 (FIGURE 56) and thus (FIGURE 24) to the output of one-gate 2015 in free register channel store 2000 in section control unit A/30. Since one-gate 2015 is repeating each free register channel pulse occurring in the said section control unit, the application of the latter pulses to the inhibitory input of one-gate 5035 in FIGURE 56, prevents any free register channel pulse from being applied to two-gate 5008 in 'box" 5001.

Lead 5009 in FIGURE 56 from "box" 5001 is connected by branch lead 5009/1 to an inhibitory input on one-gate 5011, and by branch lead 5009/2 to an inhibitory input on one-gate 5012. Accordingly, when one-gate 5002 gives an output, the resulting voltage applied via leads 5009 and 5009/1 to the inhibitory input of one-gate 5011 prevents any pulse emitted by one-gate 2096 from being applied via one-gate 5011, lead 5013 and one-gate 5014 to the second portion of lead 2097. One-gate 5012 is "interpolated" in lead 2101 in FIGURE 56 (in the same way that one-gate 5012 was "interpolated" in lead 985 in FIGURE 55); and accordingly, when one-gate 5012 (in the circuit shown in FIGURE 56) has a voltage applied to its inhibitory input because one-gate 5002 is giving an output, no signal can be transmitted from channel pulse store A/31 to the second portion of lead 2101 (via section control unit A/30, as described in Section VIII.1 of the "Mode of Operation of the Exchange Shown in FIGURES 24 to 36" given earlier in this specification) and thus cause a "busy" signal to be given.

One-gate 5029 of FIGURE 55, its input leads such as 5030 and 5031, and lead 5032 to one-gate 1010, are not used in the arrangement shown in FIGURE 56. Instead, in FIGURE 56, lead 5028 is connected to the output of one-gate 5037, with which are associated one-gates 5038 and 5039. One-gate 5037 has: (1) an inhibitory input connected by lead 5037/1 to lead 2171/1 on channel pulse store A/31, (2) an input connected by lead 5037/2 to lead 2171/2 on channel pulse store A/31, and (3) an inhibitory input connected by lead 5037/5 to lead 2171/5 on channel pulse store A/31. (Leads 2171/1, 2171/2 and 2171/5 are, as will be remembered from FIGURE 25, connected to receive pulses appearing at the respective outputs of delay lines SDT/1, SDT/2, SDT/5.) One-gate 5038 has one input connected by lead 5038/12 to lead 2171/12 on channel pulse store A/31. One-gate 5039 has four inputs respectively connected by leads 5039/3, 5039/4, 5039/11, 5039/15, to leads 2171/3, 2171/4, 2171/11, 2171/15 on channel pulse store A/31. The output of one-gate 5038 is connected by lead 5040 to a further input of one-gate 5037. The output of one-gate 5039 is connected by lead 5041 to an inhibitory input on one-gate 5038.

It will be seen from FIGURE 56 that the connections to one-gates 5037, 5038 and 5039, respectively "mirror" the connections to one-gates 5002, 5003 and 5004 in "box" 5001: in other words, if (but only if) the application of voltage to any triad of leads 5033/a, 5033/b, 5033/c, is capable of causing one-gate 5002 to apply voltage to its output, the appearance of voltage pulses on leads 2171/a, 2171/b, 2171/c (from their respective associated delay lines in pulse store A/31) will cause one-gate 5037 to apply voltage to its output. Accordingly, if a speech pulse is applied by three-gate 5007 to lead 5015 and accepted by three delay lines in channel pulse store A/31, one-gate 5037 will apply a pulse of that phase to lead 5028 and thus to one-gate 5026, which then applies that pulse by lead 5025 to the inhibitory input of one-gate 5018 and so stops the further repetition of pulses of that phase in delay line 5019.

The circuit arrangement shown in FIGURE 56 so closely parallels the circuit arrangement shown in FIGURE 55, that a repetitive detailed description of the mode of operation of the circuits of FIGURE 56 seems superfluous.

In the foregoing description of FIGURE 56 it has tacitly been supposed that 100 operators' incoming line units are actually installed in multiplex A. If it is desired to reduce the number of operators' incoming line units actually installed, this may be done by modifying the arrangement of one-gates 5002, 5003 and 5004 exactly in the manner described above in connection with FIGURE 55, and at the same time making modifications to the arrangement of one-gates 5037, 5038 and 5039 so that they continue to "mirror" the modified arrangement of one-gates 5002, 5003 and 5004. A single example will suffice to make this clear. Suppose (as in the third example given in connection with FIGURE 55) it is desired that only 33 operators' incoming line units shall be actually installed. Then (in the circuit shown in FIGURE 56) one-gate 5003 and its input lead 5003/12 are omitted, and the output of one-gate 5004 is connected by lead 5006 to an inhibitory input on one-gate 5002. At the same time, one-gate 5038 and its input lead 5038/12 is omitted, and the output of one-gate 5039 is connected by lead 5041 to an inhibitory input on one-gate 5037.

In order that operators at this second form of exchange may originate calls to ordinary subscribers, these operators are provided with the use of normally-connected subscribers line units, exactly in the way already described in relation to FIGURE 55; and calls from a subscriber to one connected to another exchange are likewise handled by means of cord connections to a manual board in the manner described in relation to FIGURE 55.

There will now be described with reference to FIGURE 57 of the accompanying drawings, the ancillary circuit which, when the dialling impulses for 01 are received, causes the counters in the register allotted to the calling subscriber to be set as through the dialled number had been 0100. In FIGURE 57 this ancillary circuit is shown as connected to typical register K/5 (FIGURE 7) of the form of exchange described with reference to FIGURES 2 to 23, but it will be understood that a similar ancillary circuit is provided for and connected to every register installed in the exchange.

The ancillary circuit will be seen to comprise a five-gate 5042 having its inputs respectively connected as follows:

(1) By lead 5043 to the lead connecting stage 584/0 (of counter 584) to the corresponding input of composite gate 588, (2) By lead 5044 to the lead connecting stage 585/0 (of counter 585) to the corresponding input of composite gate 588, (3) By lead 5045 to the lead connecting stage 590/1 (of counter 590) to the corresponding input of composite gate 593, (4) By lead 5046 to the lead connecting stage 591/0 (of counter 591) to the corresponding input of composite gate 593, (5) By lead 5047 to lead 571 which connects the output of slow operate device 570 to the input of counter 572.

The output of five-gate 5042 is so connected by lead 5048 to stage 572/5 of counter 572 that the application of voltage to lead 5048 causes the said stage 572/5 to become energised.

Now it will be remembered from the description of the operation of typical register K/5 with reference to FIGURE 7, that when a calling subscriber dials a first digit 0, stage 584/0 of counter 584 and stage 585/0 of counter 585 are those ultimately energised, and they then apply voltage to the leads respectively connecting them to the corresponding inputs of composite gate 588. Accordingly, when the dialling of first digit 0 has been completed, voltage is applied by leads 5043 and 5044, respectively, to two inputs of five-gate 5042. There then follows an inter-digital pause, during which device 570 temporarily applies voltage to lead 571 and thus to an additional input of five-gate 5042; but five-gate 5042 does not at this time apply voltage to its output because that gate has no voltage applied to its other two inputs. The calling subscriber then dials the second digit 1, which (it will be remembered) causes stage 590/1 of counter 590 and stage 591/0 of counter 591 to become energised and to apply voltage to their respective output leads and thus by leads 5045 and 5046 to the third and fourth inputs of five-gate 5042. The calling subscriber now dials no further digits, and accordingly device 570 after the appropriate lapse of time again applies voltage to lead 571, and thus by lead 5047 to the fifth input of five-gate 5042. Accordingly, when device 570 thus gives an output for a second time, five-gate 5042 has voltages applied to all five of its inputs and applies voltage to lead 5048 and thus energises stage 572/5 of counter 572. Since counters 596, 597, 601 and 602 (shown in FIGURE 7 but not in FIGURE 57) have received no dialling impulses, they remain in the condition in which, respectively, stages 596/0, 597/0, 601/0 and 602/0 are energised: accordingly all the counters in the register are in the state they would have assumed if 0100 had been dialled. Moreover, stage 572/5 of counter 572 being now energised, the register is prepared to apply voltages (corresponding to a dialled number 0100) to the appropriate terminals of MC unit K/2 and of converter K/3 as soon as the register receives the appropriate C and D pulses from pulse generator K/1—as has been described earlier in this specification.

When ancillary circuits of the kind shown in FIGURE 57 are required to be used with the form of exchange described with reference to FIGURES 24 to 36, every register installed in the exchange again has one of these ancillary circuits connected to it, the mode of connection being as follows. Referring to FIGURE 28 (which shows a typical register) in conjunction with FIGURE 57, the following connections are made:

(1) Lead 5043 is connected to the lead by which stage 2316/0 (of counter 2316) is connected to the corresponding input of composite gate 2314, (2) Lead 5044 is connected to the lead by which stage 2317/0 (of counter 2317) is connected to the corresponding input of composite gate 2314, (3) Lead 5045 is connected to the lead by which stage 2320/1 (of counter 2320) is connected to the corresponding input of composite gate 2314, (4) Lead 5046 is connected to the lead by which stage 2321/0 (of counter 2321) is connected to the corresponding input of composite gate 2314, (5) Lead 5047 is connected to lead 2357 which connects the output of slow-release device 2355 to the input of counter 2335, (6) Lead 5048 from the output of five-gate 5042 is so connected to stage 2335/5 of counter 2335 that the application of voltage to lead 5048 causes the said stage 2335/5 to become energised.

The mode of operation when dialling impulses corresponding to digits 01 are received by the typical register shown in FIGURE 28, will be readily understood from the description above given of FIGURE 57 when read in conjunction with the description given earlier of the mode of operation of the register shown in FIGURE 28. And, once again, the receipt of the dialling impulses corresponding to digits 01 (as the first two or only two digits of a dialled number) will cause the counters in the register shown in FIGURE 28 to assume the same respective states as though 0100 had been dialled.

I claim:

1. In a switching system, a plurality of lines respectively individual one to each subscriber, means for generating a plurality of time-interlaced voltage pulse trains each having an assigned train repetition interval, a plurality of repeater means respectively individual one to each subscriber for repeating any of said pulse trains, free-pulse selecting means having a first input connected to said pulse-generating means and at least one gating input for preventing the emission of pulses from said pulse-selecting means, circuit connections for applying to such gating input each pulse of each train undergoing repetition in a plurality of groups of said individual repeater means, means individual to each subscriber for modulating pulse trains and mean individual to each subscriber for demodulating modulated pulse trains, and circuit connections from the output of such free-pulse selecting means to at least one of the said groups of individual repeater means.

2. In a switching system according to claim 1, circuit connections as aforesaid from said output of said free-pulse selecting means, said circuit connections comprising interconnecting means comprising a circuit connection to the output of said free-pulse selecting means, means for repeating at the assigned train repetition interval each pulse applied thereto by said circuit connection, and connections from said repeating means to said groups of individual repeater means.

3. In a switching system according to claim 2, interconnecting means comprising a plurality of interconnecting units for repeating pulses at the assigned train repetition interval, means connecting each such unit to the output of said free-pulse selecting means, means connecting such units to pulse repeating equipments respectively associated with each group of individual repeater means, each such interconnecting unit being connected to a pair of groups of individual repeater means and every distinct pair of said groups being connected to a different interconnecting unit.

4. In a switching system according to claim 3, additional interconnecting units connected one to each group of individual repeater means.

5. In a switching system, a plurality of lines respectively individual one to each subscriber, a plurality of groups of pulse-repeaters one such pulse-repeater being individually associated with each subscriber, pulse generating means, free-pulse selecting means having an input connected to said pulse generating means and at least one gating input, leads therefrom connected to each group of pulse repeaters, means for rendering the circuit connections to each group to which a calling and a called subscriber respectively belong operative to apply to the respective gating input leads each pulse of each train undergoing repetition in each such group, and timing means having an input connected to the output of said free-pulse selecting means, said timing means including a delay device to re-emit such pulse after an assigned time-delay together with a connection from the output of said delay device to the input of said timing means.

6. In a switching system, a plurality of lines respectively individual one to each subscriber, a plurality of groups of pulse-repeaters one such pulse-repeater being individually associated with each such line, pulse generating means, pulse-selecting means having a first input connected to said pulse generating means and at least one gating input, leads connecting the output of each group of pulse-repeaters to said gating input, at least one register, a pulse-repeating equipment associated therewith, a connection between said pulse-repeating equipment and a gating input as aforesaid, means connecting an output of said pulse-selecting means with a pulse-repeating device associated with a said group having connected thereto a calling line, and a connection between an output of said pulse-selecting means and said pulse-repeating equipment.

7. In a switching system, a combination according to claim 6 wherein at least one of said devices adapted to receive pulses includes at least one interval-determining device for determining the interval between successive pulses intended to be separated by a time interval equal to the train repetition interval of pulse trains to be used in the system, the said interval-determining device including, in combination, a magnetostrictive delay line such that the delay between the feeding of a pulse to the input of said line and the consequential reappearance of a pulse at the output of said line is equal to the train repetition interval, means for feeding a pulse to the input of said delay line, and means for deriving from the output of said delay line the pulse consequentially appearing at said output, and means for feeding back to the input of said delay line the pulse so derived.

8. In a switching system according to claim 6, a combination including a plurality of registers each connected with said pulse-repeating equipment and an additional voltage generator having a plurality of voltage output terminals, each said register comprising: at least one input terminal connected to at least one selected terminal amongst said voltage output terminals, a plurality of output terminals on said register, signal recording means, circuits connecting said signal recording means to assigned selections from said plurality of output terminals, and release means connected to said input terminal and operable to cause said recording means to apply voltage to any assigned selection of said output terminals of said register when voltage is applied to said input terminal.

9. In a switching system, a plurality of lines respectively individual to each subscriber, a plurality of groups of pulse repeaters one such pulse repeater being individually associated with each such line, pulse generating means, pulse-selecting means having a first input connected to said pulse-generating means and at least one gating input, leads connecting the output of each group of pulse repeaters to said gating input, a plurality of registers, a further pulse repeater to which the registers of said plurality are connected, a connection between said further pulse repeater and a gating input on said pulse-selecting means, an additional voltage generator having a plurality of output terminals and including means for applying voltage to selections of said terminals, a plurality of input terminals on each of said registers the number of said input terminals on each register being less than the number of output terminals on said voltage generator, connections between said plurality of input terminals and selected terminals of said plurality of output terminals on said voltage generator, the selection of said output terminals for each register being different from the selection of said output terminals for each other register, a plurality of output terminals on each register, circuits in each register selectively connecting recording means in such register to assigned selections of said output terminals on such register, output-controlling means for each register connected to said plurality of input terminals on such register and operable, when voltage is simultaneously applied to all terminals of said plurality last mentioned, to cause said recording means to apply voltage to all terminals of such one of said assigned selections of output terminals as is determined by the state of said recording means, connections from each said assigned selection of output terminals to one pulse repeater in each group of pulse repeaters aforesaid such one pulse repeater in each group respectively corresponding to such assigned selection, means connecting an output of said pulse-selecting means with each pulse repeater in each said group of pulse repeaters, and means to gate the voltage pulse emitted by said pulse-selecting device with the voltages applied in accordance with the state of said recording means to said connections.

10. A switching system according to claim 9 wherein said further pulse repeater to which said plurality of registers is connected includes a plurality of pulse-repeating circuits, and there is provided a register-connecter individual to each register and operable to be energised by the application of voltage simultaneously applied to a plurality of input terminals equal in number to an assigned selection from a plurality of output terminals on a said additional voltage generator, respective connections between said input terminals and the output terminals constituting said assigned selection, and gating means connected to said register connector to inhibit its energization, said gating means being connected with an assigned plurality selected from said plurality of pulse-repeating circuits, said assigned plurality being individual to each register.

11. In an automatic switching system, a plurality of lines repectively individual one to each subscriber, a plurality of groups of modulator-demodulator devices, one such device being individual to each line, a plurality of groups of pulse-repeater circuits, the number of groups of such circuits being equal to the number of groups of modulator-demodulator devices but the number of said circuits contained in a group of circuits being less than the number of modulator-demodulator devices contained in a corresponding group of devices, connections from each modulator-demodulator device in any device group to a selected plurality of pulse-repeater circuits chosen from the plurality of circuits constituting the corresponding circuit group, no one such selected plurality consisting of a selection all of whose members are the same as any other selection constituting any other selected plurality of circuits belonging to the same circuit group, a voltage-generator having a plurality of voltage output terminals, and a switching-unit having a plurality of inputs equal in number to the number of said voltage output terminals and a plurality of output leads equal in number to the number of pulse-repeater circuits constituting each circuit group and arranged to connect each of a set of selected pluralities of said inputs of said switching unit to one each of a set of selected pluralities of said output leads, said selected pluralities of output leads having a one-to-one correspondence with and being respectively connected to the aforesaid selected pluralities of pulse-repeater circuits.

12. In a switching system according to claim 11, a plurality of registers less in number than the number of lines, each register including counting means for recording the address of a wanted line and having a plurality of terminals constituted by a first set determinative of the group to which belongs the modulator-demodulator device individual to said wanted line and by a second set determinative of the address of said wanted line within said group, connections providing a one-to-one correspondence between each of a plurality of sub-sets of terminals chosen from said first set and each of the groups of pulse-repeater circuits, and connections providing a one-to-one correspondence between each of a sub-set of terminals chosen from said second set and respectively corresponding sub-pluralities of inputs to the switching-unit aforesaid.

13. In a switching system, a plurality of lines respectively individual one to each subscriber, a plurality of groups of devices which each comprises a modulator and demodulator and one of which is individual to each line, means to supply pulse trains selected from a plurality of time interlaced pulse trains each having an assigned train repetition interval to those of said modulators and demodulators associated with lines between pairs of which communication is required at any time, interconnecting means selectively to establish a connection between pairs of said devices so as to provide pulse communication channels between said pairs of lines, at least two registers, means operable in response to a signal from a calling subscriber to allot to that subscriber and to a free one of said registers for the purpose of establishing a pulse communication channel between that subscriber and the free register, one of said trains of pulses which at that time is not supplied to the modulator of any of the devices of the group of the calling subscribers device and is not allotted to a register.

14. An automatic switching system employing trains of pulses on the time-division multiplex principle, said system comprising a plurality of lines respectively individual one to each subscriber, a plurality of groups of devices which each comprises a pulse modulator and pulse demodulator and one of which is individual to each line, and control apparatus for setting up connection between the lines of a calling and of a called subscriber, said control apparatus comprising a plurality of registers, pulse-allotting means to allot to a calling subscriber a pulse of a train of voltage pulses which is free in the calling subscriber's group and in the registers, means to cause repetition of said allotted pulse for the purpose of establishing a pulse communication channel between the calling subscriber and a free register, means to record the identity of said calling subscriber, means for selecting a first pulse train not in use in said calling subscriber's group to convey signal modulations originating with any other subscriber belonging to said calling subscriber's group and for selecting a second pulse train which is not in use in said called subscriber's group to convey signal modulations originating with any other subscriber belonging to said called subscriber's group and which has an assigned phase relationship to said first pulse train, interconnecting means connected to receive a pulse of one of said trains and to repeat pulses of both of said trains, and connections from said interconnecting means to apply to the device individual to each said subscriber a pulse of the train respectively not in use in the group to which such subscriber belongs.

15. An automatic switching system employing trains of pulses on the time-division multiplex principle, said system comprising a plurality of lines respectively individual one to each subscriber, a plurality of groups of devices which each comprises a pulse modulator and pulse demodulator and one of which is individual to each line, and control apparatus for setting up connection between the lines of a calling and of a called subscriber, said control apparatus comprising a plurality of registers, means for repeatedly testing the registers in cyclic order to ascertain whether each register is free, means to allot to a calling subscriber a train of voltage pulses which is free in the calling subscriber's group and in the registers for the purpose of establishing a pulse communication channel between the calling subscriber and a free register, means to record the identity of said calling subscriber, means for selecting a first pulse train not in use in said calling subscriber's group to convey signal modulations originating with any other subscriber belonging to said calling subscriber's group and for selecting a second pulse train which is not in use in said called subscriber's group to convey signal modulations originating with any other subscriber belonging to said called subscriber's group and which has an assigned phase relationship to said first pulse train, interconnecting means connected to receive a pulse of one of said trains and to repeat pulses of both of said trains, and connections from said interconnecting means to apply to the device individual to each said subscriber a pulse of the train respectively not in use in the group to which such subscriber belongs.

16. An automatic switching system employing trains of pulses on the time-division multiplex principle, said system comprising a plurality of lines respectively individual one to each subscriber, a plurality of groups of devices which each comprises a pulse modulator and pulse demodulator and one of which is individual to each line, and control apparatus for setting up connection between the lines of a calling and of a called subscriber, said control apparatus comprising a register, means for individually testing repeatedly in cylic order in each group the device individual to each subscriber to ascertain whether such subscriber is endeavouring to initiate a call to another subscriber, means to allot to a calling subscriber a train of voltage pulses which is free in the calling subscriber's group and in the register to establish a pulse communication channel between the calling subscriber and the register, means to record the identity of said calling subscriber, means for selecting a first pulse train not in use in said calling subscriber's group to convey signal modulations originating with any other subscriber belonging to said calling subscriber's group and for selecting a second pulse train which is not in use in said called subscriber's group to convey signal modulations originating with any other subscriber belonging to said called subscriber's group and which has an assigned phase relationship to said first pulse train, interconnecting means connected to receive a pulse of one of said trains and to repeat pulses of both of said trains, and connections from said interconnecting means to apply to the device individual to each said subscriber a pulse of the train respectively not in use in the group to which such subscriber belongs.

17. An automatic switching system employing trains of pulses on the time-division multiplex principle, wherein the subscribers are divided into groups and control apparatus is provided for setting up connection between a calling and a called subscriber, said control apparatus comprising: a plurality of registers, counting means in each register, means to allot to a calling subscriber a pulse train which is free in the calling subscriber's group and in one of said registers, calling means individual to said calling subscriber to set said counting means to a condition characteristic of the identity of said called subscriber by modulation of said pulse train, a plurality of terminals on each register each said plurality of register terminals comprising a first set for indicating the group to which a called subscriber belongs and a second set for indicating the address of a called subscriber within his group, timing means to establish for each register in turn a connection between said counting means and a selection of said terminals the terminals constituting said selection being determined by the condition to which such counting means has been set by a calling subscriber to identify a called subscriber, a pulse-repeating unit common to the calling subscriber's group and to the called subscriber's group, connections between a selection of terminals from said first set of terminals and said pulse-repeating unit, said selection being a selection characteristic of the group to which said called subscriber belongs, a pulse repeater individual to the called subscriber's group and connections between said pulse repeater and those of said first set of terminals which constitute the selection characteristic of the called subscriber's group, a set of pulse-repeating circuits for each group of subscribers, a modulator-demodulator device individual to each subscriber each such modulator-demodulator device including a modulator connected to a subset of said set of pulse-repeating circuits and each subset consisting of a selection individual to the subscriber connected thereto, circuit connections from the subset characteristic of said called subscriber to a selection of register terminals belonging to said second set of register terminals, said selection being the selection characteristic of the address of said called subscriber within his group, means for generating a plurality of time-interlaced pulse trains having an assigned train repetition interval, means for selecting from said trains a first train not in use to convey signal modulations originating with any subscriber in said calling subscriber's group and for selecting from said trains a second train not in use to convey signal modulations originating with any subscriber in said called subscriber's group, circuit connections from said pulse-repeating unit common to the calling and called subscribers' groups to the demodulator included in said modulator-device individual to the calling subscriber and circuit connections from the pulse-repeating unit last mentioned to the demodulator included in said modulator-demodulator device individual to the called subscriber, and circuit connections from said last-mentioned pulse-repeating unit to the modulator included in said modulator-demodulator device individual to the calling subscriber.

18. An automatic switching system according to claim 17 wherein at least one of said pulse-repeating devices includes as a means for controlling the repetition interval between successive pulses forming a pulse train, at least one magneto-strictive delay line such that the delay between the feeding of a pulse to the input of said line and the consequential reappearance of a pulse at the output of said line is equal to the train repetition interval, means for applying an input pulse to the input of said delay line, means for deriving from the output of said delay line the output pulse appearing at said output in consequence of the application of said input pulse, and feedback means for applying said output pulse to the input of said delay line, said feedback means including at least one gate having an input connected to the output of said delay line, a gating input connected to a control lead for suppressing by the application of a suitable change in voltage thereto repetition of pulses, and an output connected to the input of said delay line.

References Cited in the file of this patent

UNITED STATES PATENTS

| | | |
|---|---|---|
| 2,754,367 | Levy | July 10, 1956 |
| 2,773,934 | Trousdale tt al. | Dec. 11, 1956 |
| 2,830,125 | Elliott | Apr. 8, 1958 |
| 2,876,284 | Harris | Mar. 3, 1959 |
| 2,953,749 | Beesley | Sept. 20, 1960 |